United States Patent
Eibl

(10) Patent No.: US 12,227,853 B2
(45) Date of Patent: Feb. 18, 2025

(54) THERMAL SPRAY IRON-BASED ALLOYS FOR COATING ENGINE CYLINDER BORES

(71) Applicant: Oerlikon Metco (US) Inc., Westbury, NY (US)

(72) Inventor: Cameron Eibl, Encinitas, CA (US)

(73) Assignee: Oerlikon Metco (US) Inc., Westbury, NY (US)

( * ) Notice: Subject to any disclaimer, the term of this patent is extended or adjusted under 35 U.S.C. 154(b) by 586 days.

(21) Appl. No.: 17/442,532

(22) PCT Filed: Mar. 25, 2020

(86) PCT No.: PCT/US2020/024611
§ 371 (c)(1),
(2) Date: Sep. 23, 2021

(87) PCT Pub. No.: WO2020/198302
PCT Pub. Date: Oct. 1, 2020

(65) Prior Publication Data
US 2022/0251697 A1    Aug. 11, 2022

Related U.S. Application Data

(60) Provisional application No. 62/825,221, filed on Mar. 25, 2019.

(51) Int. Cl.
| | |
|---|---|
| C23C 4/08 | (2016.01) |
| C22C 38/02 | (2006.01) |
| C22C 38/04 | (2006.01) |
| C22C 38/06 | (2006.01) |

(Continued)

(52) U.S. Cl.
CPC ............... *C23C 4/08* (2013.01); *C22C 38/02* (2013.01); *C22C 38/04* (2013.01); *C22C 38/06* (2013.01); *C22C 38/32* (2013.01); *C23C 4/123* (2016.01)

(58) Field of Classification Search
CPC .................. C22C 38/00; C23C 4/08
See application file for complete search history.

(56) References Cited

U.S. PATENT DOCUMENTS

| | | | |
|---|---|---|---|
| 2,043,952 | A | 6/1936 | Ffield |
| 2,156,306 | A | 5/1939 | Rapatz |
| 2,507,195 | A | 5/1950 | Winearls |

(Continued)

FOREIGN PATENT DOCUMENTS

| | | |
|---|---|---|
| CN | 86102537 | 9/1987 |
| CN | 1033292 | 6/1989 |

(Continued)

OTHER PUBLICATIONS

DE102014013538a1, Machine translation. (Year: 2014).*

(Continued)

*Primary Examiner* — Robert A Vetere
(74) *Attorney, Agent, or Firm* — Knobbe, Martens, Olson & Bear, LLP

(57) ABSTRACT

Disclosed herein are embodiments of iron-based alloys. The alloys can be powders used as a feedstock for plasma or thermal spray processes. In some embodiments, the alloys can have low or no chromium, provided improvements from an environmental and worker health perspective. In some embodiments, the powder can have a generally large particle size.

17 Claims, 3 Drawing Sheets

(51) Int. Cl.
*C22C 38/32* (2006.01)
*C23C 4/123* (2016.01)

(56) References Cited

U.S. PATENT DOCUMENTS

| | | |
|---|---|---|
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Buckingham et al. |
| 3,554,792 A | 1/1971 | Johnson |
| 3,650,734 A | 3/1972 | Kantor et al. |
| 3,663,214 A | 5/1972 | Moore |
| 3,724,016 A | 4/1973 | Kumar et al. |
| 3,819,364 A | 6/1974 | Frehn |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Peterson |
| 4,017,339 A | 4/1977 | Okuda et al. |
| 4,042,383 A | 8/1977 | Petersen et al. |
| 4,064,608 A | 12/1977 | Jaeger |
| 4,066,451 A | 1/1978 | Rudy |
| 4,110,514 A | 8/1978 | Nicholson |
| 4,214,145 A | 7/1980 | Zvanut et al. |
| 4,235,630 A | 11/1980 | Babu |
| 4,240,827 A | 12/1980 | Aihara |
| 4,255,709 A | 3/1981 | Zatsepium et al. |
| 4,277,108 A | 7/1981 | Wallace |
| 4,285,725 A | 8/1981 | Gysel |
| 4,297,135 A | 10/1981 | Giessen et al. |
| 4,318,733 A | 3/1982 | Ray et al. |
| 4,362,553 A | 12/1982 | Ray |
| 4,365,994 A | 12/1982 | Ray |
| 4,415,530 A | 11/1983 | Hunt |
| 4,419,130 A | 12/1983 | Slaughter |
| 4,576,653 A | 3/1986 | Ray |
| 4,596,282 A | 6/1986 | Maddy et al. |
| 4,606,977 A | 8/1986 | Dickson et al. |
| 4,635,701 A | 1/1987 | Sare et al. |
| 4,638,847 A | 1/1987 | Day |
| 4,639,576 A | 1/1987 | Shoemaker |
| 4,666,797 A | 5/1987 | Newman et al. |
| 4,673,550 A | 6/1987 | Dallaire et al. |
| 4,762,681 A | 8/1988 | Tassen et al. |
| 4,803,045 A | 2/1989 | Ohriner et al. |
| 4,806,394 A | 2/1989 | Steine |
| 4,818,307 A | 4/1989 | Mori et al. |
| 4,822,415 A | 4/1989 | Dorfman et al. |
| 4,888,153 A | 12/1989 | Yabuki |
| 4,919,728 A | 4/1990 | Kohl et al. |
| 4,943,488 A | 7/1990 | Sung et al. |
| 4,957,982 A | 9/1990 | Geddes |
| 4,966,626 A | 10/1990 | Fujiki et al. |
| 4,981,644 A | 1/1991 | Chang |
| 5,094,812 A | 3/1992 | Dulmaine et al. |
| 5,252,149 A | 10/1993 | Dolman |
| 5,280,726 A | 1/1994 | Urbanic et al. |
| 5,306,358 A | 4/1994 | Lai et al. |
| 5,375,759 A | 12/1994 | Hiraishi et al. |
| 5,424,101 A | 6/1995 | Atkins |
| 5,495,837 A | 3/1996 | Mitsuhashi |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,837,326 A | 11/1998 | Dallaire |
| 5,843,243 A | 12/1998 | Kawasaki et al. |
| 5,858,558 A | 1/1999 | Zhao et al. |
| 5,861,605 A | 1/1999 | Ogawa et al. |
| 5,907,017 A | 5/1999 | Ober et al. |
| 5,911,949 A | 6/1999 | Ninomiya et al. |
| 5,935,350 A | 8/1999 | Raghu et al. |
| 5,942,289 A | 8/1999 | Jackson |
| 5,976,704 A * | 11/1999 | McCune ............ C23C 4/06 428/323 |
| 5,988,302 A | 11/1999 | Sreshta et al. |
| 6,071,324 A | 6/2000 | Laul et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,238,843 B1 | 5/2001 | Ray |
| 6,306,524 B1 | 10/2001 | Spitsberg et al. |
| 6,326,582 B1 | 12/2001 | North |
| 6,331,688 B1 | 12/2001 | Hallén et al. |
| 6,332,936 B1 | 12/2001 | Hajaligo et al. |
| 6,375,895 B1 | 4/2002 | Daemen |
| 6,398,103 B2 | 6/2002 | Hasz et al. |
| 6,441,334 B1 | 8/2002 | Alda et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,507,305 B2 | 3/2009 | Kawasaki et al. |
| 7,553,382 B2 | 6/2009 | Branagan et al. |
| 7,569,286 B2 | 8/2009 | Daemen et al. |
| 7,754,152 B2 | 7/2010 | Riebel et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,662,143 B1 | 3/2014 | Foster |
| 8,669,491 B2 | 3/2014 | Menon et al. |
| 8,702,835 B2 | 4/2014 | Yu et al. |
| 8,703,046 B2 | 4/2014 | Hanejko et al. |
| 8,704,134 B2 | 4/2014 | Branagan et al. |
| 8,777,090 B2 | 7/2014 | Miller et al. |
| 8,801,872 B2 | 8/2014 | Wright et al. |
| 8,808,471 B2 | 8/2014 | Wright et al. |
| 8,858,675 B2 | 10/2014 | Larsson |
| 8,870,997 B2 | 10/2014 | Klekovkin et al. |
| 8,901,022 B2 | 12/2014 | Francy et al. |
| 8,911,662 B2 | 12/2014 | Larsson |
| 8,920,938 B2 | 12/2014 | Hesse et al. |
| 8,961,869 B2 | 2/2015 | Kapoor et al. |
| 8,973,806 B2 | 3/2015 | Cheney |
| 8,992,659 B2 | 3/2015 | Larsson et al. |
| 9,051,635 B2 | 6/2015 | Jou |
| 9,095,932 B2 | 8/2015 | Miller et al. |
| 9,145,598 B2 | 9/2015 | Oshchepkov |
| 9,174,293 B2 | 11/2015 | Meyer |
| 9,193,011 B2 | 11/2015 | Mars et al. |
| 9,233,419 B2 | 1/2016 | Gries |
| 9,255,309 B2 | 2/2016 | Aimone |
| 9,309,585 B2 | 4/2016 | Cheney et al. |
| 9,314,848 B2 | 4/2016 | Larsson |
| 9,340,855 B2 | 5/2016 | Schade et al. |
| 9,394,591 B2 | 7/2016 | Deodeshmukh et al. |
| 9,399,907 B2 | 7/2016 | Mo et al. |
| 9,469,890 B2 | 10/2016 | Bengtsson |
| 9,540,711 B2 | 1/2017 | Fifield |

(56) References Cited

U.S. PATENT DOCUMENTS

| | | |
|---|---|---|
| 9,580,773 B2 | 2/2017 | Aimone et al. |
| 9,631,262 B2 | 4/2017 | Wright et al. |
| 9,724,786 B2 | 8/2017 | Postle et al. |
| 9,725,793 B2 | 8/2017 | Aimone et al. |
| 9,738,959 B2 | 8/2017 | Cheney et al. |
| 9,745,648 B2 | 8/2017 | Olserius et al. |
| 9,802,387 B2 | 10/2017 | Cheney |
| 9,815,148 B2 | 11/2017 | Postle |
| 9,816,164 B2 | 11/2017 | Larsson et al. |
| 9,821,372 B2 | 11/2017 | Gries |
| 9,834,829 B1 | 12/2017 | Aimone et al. |
| 9,845,520 B2 | 12/2017 | Wright et al. |
| 9,856,546 B2 | 1/2018 | Fischer et al. |
| 9,869,132 B2 | 1/2018 | Wyble et al. |
| 9,879,333 B2 | 1/2018 | Gerk et al. |
| 9,908,816 B2 | 3/2018 | Champion et al. |
| 9,914,987 B2 | 3/2018 | Snyder et al. |
| 9,919,358 B2 | 3/2018 | Gries |
| 9,951,413 B2 | 4/2018 | Billieres |
| 9,957,590 B2 | 5/2018 | Mars et al. |
| 9,957,592 B2 | 5/2018 | Aimone et al. |
| 9,970,091 B2 | 5/2018 | Crook et al. |
| 9,994,935 B2 | 6/2018 | Wolverton et al. |
| 10,100,388 B2 | 10/2018 | Cheney |
| 10,105,796 B2 | 10/2018 | Eibl |
| 10,125,412 B2 | 11/2018 | Kaner et al. |
| 10,173,290 B2 | 1/2019 | Cheney |
| 10,252,919 B2 | 4/2019 | Billieres et al. |
| 10,329,647 B2 | 6/2019 | Cheney |
| RE47,529 E | 7/2019 | Johnson |
| 10,351,921 B2 | 7/2019 | Snyder et al. |
| 10,351,922 B2 | 7/2019 | Snyder et al. |
| 10,351,938 B2 | 7/2019 | Schade et al. |
| 10,358,699 B2 | 7/2019 | Srivastava et al. |
| 10,358,701 B2 | 7/2019 | Reed et al. |
| 10,370,740 B2 | 8/2019 | Reed et al. |
| 10,384,313 B2 | 8/2019 | Persson |
| 10,400,314 B2 | 9/2019 | Aimone et al. |
| 10,458,006 B2 | 10/2019 | Bengtsson |
| 10,465,267 B2 | 11/2019 | Cheney |
| 10,465,268 B2 | 11/2019 | Bergman |
| 10,465,269 B2 | 11/2019 | Cheney |
| 10,471,503 B2 | 11/2019 | Wright et al. |
| 10,513,758 B2 | 12/2019 | Mars |
| 10,519,529 B2 | 12/2019 | Wright et al. |
| 10,550,460 B2 | 2/2020 | Nilsson et al. |
| 10,577,680 B2 | 3/2020 | Srivastava et al. |
| 10,597,757 B2 | 3/2020 | Gong et al. |
| 10,702,918 B2 | 7/2020 | Hu |
| 10,702,924 B2 | 7/2020 | Szabo et al. |
| 10,711,329 B2 | 7/2020 | Wright et al. |
| 10,731,236 B2 | 8/2020 | Kaner et al. |
| 10,745,782 B2 | 8/2020 | Wolverton et al. |
| 10,851,444 B2 | 12/2020 | Vecchio et al. |
| 10,851,565 B1 | 12/2020 | Krueger |
| 10,872,682 B2 | 12/2020 | Reed et al. |
| 10,934,608 B2 | 3/2021 | Gu |
| 10,941,473 B2 | 3/2021 | Snyder |
| 10,954,588 B2 | 3/2021 | Cheney |
| 11,001,912 B2 | 5/2021 | Aimone et al. |
| 11,033,998 B2 | 6/2021 | Kavanaugh et al. |
| 11,085,102 B2 | 8/2021 | Cheney |
| 11,111,912 B2 | 9/2021 | Cheney |
| 11,114,226 B2 | 9/2021 | Jayaraman et al. |
| 11,118,247 B2 | 9/2021 | Gong et al. |
| 11,124,429 B2 | 9/2021 | Gore et al. |
| 11,130,205 B2 | 9/2021 | Cheney |
| 11,174,538 B2 | 11/2021 | Kaner et al. |
| 11,253,957 B2 * | 2/2022 | Eibl .................. B23K 35/0261 |
| 2001/0019781 A1 | 9/2001 | Hasz |
| 2002/0054972 A1 | 5/2002 | Charpentier et al. |
| 2002/0060907 A1 | 5/2002 | Saccomanno |
| 2002/0098298 A1 | 7/2002 | Bolton et al. |
| 2002/0148533 A1 | 10/2002 | Kim et al. |
| 2002/0159914 A1 | 10/2002 | Yeh |
| 2003/0013171 A1 | 1/2003 | Yang et al. |
| 2004/0001966 A1 | 1/2004 | Subramanian |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0047952 A1 | 3/2005 | Coleman |
| 2005/0109431 A1 | 5/2005 | Kernan et al. |
| 2005/0139294 A1 | 6/2005 | Kim et al. |
| 2005/0164016 A1 | 7/2005 | Branagan et al. |
| 2006/0063020 A1 | 3/2006 | Barbezat |
| 2006/0093752 A1 | 5/2006 | Darolia et al. |
| 2006/0163217 A1 | 7/2006 | Jiang |
| 2006/0191606 A1 | 8/2006 | Ogawa et al. |
| 2006/0260583 A1 | 11/2006 | Abi-Akar et al. |
| 2007/0026159 A1 | 2/2007 | Deem |
| 2007/0029295 A1 | 2/2007 | Branagan |
| 2007/0090167 A1 | 4/2007 | Arjakine et al. |
| 2007/0125458 A1 | 6/2007 | Kawasaki et al. |
| 2007/0187369 A1 | 8/2007 | Menon et al. |
| 2007/0219053 A1 | 9/2007 | Barufka et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0083391 A1 | 4/2008 | Sawada |
| 2008/0149397 A1 | 6/2008 | Overstreet |
| 2008/0241580 A1 | 10/2008 | Kiser et al. |
| 2008/0241584 A1 | 10/2008 | Daemen et al. |
| 2008/0246523 A1 | 10/2008 | Murakamo et al. |
| 2008/0253918 A1 | 10/2008 | Liang |
| 2009/0017328 A1 | 1/2009 | Katoh et al. |
| 2009/0075057 A1 | 3/2009 | Kulkarni |
| 2009/0123765 A1 | 5/2009 | Branagan |
| 2009/0154183 A1 | 6/2009 | Nagai et al. |
| 2009/0252636 A1 | 10/2009 | Christopherson, Jr. et al. |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0028706 A1 | 2/2010 | Hornschu et al. |
| 2010/0044348 A1 | 2/2010 | Buchmann |
| 2010/0047622 A1 | 2/2010 | Fischer et al. |
| 2010/0055495 A1 | 3/2010 | Sjodin |
| 2010/0101780 A1 | 4/2010 | Ballew et al. |
| 2010/0132408 A1 | 6/2010 | Billieres |
| 2010/0136361 A1 | 6/2010 | Osuki et al. |
| 2010/0155236 A1 | 6/2010 | Lee et al. |
| 2010/0159136 A1 | 6/2010 | Lee et al. |
| 2010/0166594 A1 | 7/2010 | Hirata et al. |
| 2010/0189588 A1 | 7/2010 | Kawatsu et al. |
| 2010/0192476 A1 | 8/2010 | Theisen et al. |
| 2010/0258217 A1 | 10/2010 | Kuehmann |
| 2011/0004069 A1 | 1/2011 | Ochs et al. |
| 2011/0031222 A1 | 2/2011 | Branagan et al. |
| 2011/0048587 A1 | 3/2011 | Vecchio et al. |
| 2011/0064963 A1 | 3/2011 | Cheney et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2011/0308670 A1* | 12/2011 | Branagan ................ C22C 45/02 148/403 |
| 2012/0055899 A1 | 3/2012 | Parmaningsih |
| 2012/0055903 A1 | 3/2012 | Izutani et al. |
| 2012/0100390 A1 | 4/2012 | Kuroda |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0258273 A1 | 10/2012 | Churchill et al. |
| 2012/0288400 A1 | 11/2012 | Hirata et al. |
| 2013/0039800 A1 | 2/2013 | Dolman |
| 2013/0094900 A1 | 4/2013 | Folkmann et al. |
| 2013/0108502 A1 | 5/2013 | Bei |
| 2013/0167965 A1 | 7/2013 | Cheney et al. |
| 2013/0171367 A1 | 7/2013 | Kusinski et al. |
| 2013/0174612 A1 | 7/2013 | Linnot et al. |
| 2013/0216722 A1 | 8/2013 | Kusinski et al. |
| 2013/0220523 A1 | 8/2013 | Cheney |

(56) References Cited

U.S. PATENT DOCUMENTS

| | | |
|---|---|---|
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0266820 A1 | 10/2013 | Kusinski et al. |
| 2013/0294962 A1 | 11/2013 | Wallin et al. |
| 2014/0024509 A1 | 1/2014 | Gerschefske |
| 2014/0044587 A1 | 2/2014 | Crook et al. |
| 2014/0044617 A1 | 2/2014 | Dreisinger |
| 2014/0060707 A1 | 3/2014 | Wright et al. |
| 2014/0066851 A1 | 3/2014 | Cheney, II |
| 2014/0116575 A1 | 5/2014 | Cheney et al. |
| 2014/0131338 A1 | 5/2014 | Postle |
| 2014/0190594 A1 | 7/2014 | Branagan et al. |
| 2014/0219859 A1 | 8/2014 | Cheney |
| 2014/0234154 A1 | 8/2014 | Cheney et al. |
| 2014/0248509 A1 | 9/2014 | Cheney et al. |
| 2014/0263248 A1 | 9/2014 | Postle |
| 2014/0272388 A1 | 9/2014 | Knight et al. |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0114525 A1 | 4/2015 | Valls Anglés |
| 2015/0118098 A1 | 4/2015 | Valls |
| 2015/0122552 A1 | 5/2015 | Wang et al. |
| 2015/0152994 A1 | 6/2015 | Bondil et al. |
| 2015/0252631 A1 | 9/2015 | Miller |
| 2015/0275341 A1 | 10/2015 | Cheney |
| 2015/0284817 A1 | 10/2015 | Snyder et al. |
| 2015/0284829 A1 | 10/2015 | Cheney |
| 2015/0307968 A1 | 10/2015 | Mars et al. |
| 2015/0328680 A1 | 11/2015 | Tuffile |
| 2015/0367454 A1 | 12/2015 | Cheney |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1* | 1/2016 | Cheney ............... C22C 38/26 428/553 |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0138144 A1 | 5/2016 | Olsérius |
| 2016/0144463 A1 | 5/2016 | Hellsten et al. |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0271736 A1 | 9/2016 | Han et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0329139 A1 | 11/2016 | Jayaraman |
| 2016/0376686 A1 | 12/2016 | Jou |
| 2017/0009324 A1 | 1/2017 | Crook et al. |
| 2017/0014865 A1 | 1/2017 | Kusinski et al. |
| 2017/0022588 A1 | 1/2017 | Tang et al. |
| 2017/0044646 A1 | 2/2017 | Gong et al. |
| 2017/0145547 A1 | 5/2017 | Saal et al. |
| 2017/0253950 A1 | 9/2017 | Shinohara |
| 2017/0275740 A1 | 9/2017 | Bergman |
| 2017/0275748 A1 | 9/2017 | Cheney et al. |
| 2018/0016664 A1 | 1/2018 | Hu |
| 2018/0021894 A1 | 1/2018 | Persoon et al. |
| 2018/0066343 A1 | 3/2018 | Bengtsson |
| 2018/0066345 A1 | 3/2018 | Cheney et al. |
| 2018/0094343 A1 | 4/2018 | Gerk et al. |
| 2018/0099877 A1 | 4/2018 | Chang et al. |
| 2018/0135143 A1 | 5/2018 | Snyder et al. |
| 2018/0195156 A1 | 7/2018 | Reed et al. |
| 2018/0216212 A1 | 8/2018 | Reed et al. |
| 2018/0230016 A1 | 8/2018 | Kaner et al. |
| 2018/0230578 A1 | 8/2018 | Srivastava et al. |
| 2018/0245190 A1 | 8/2018 | Snyder et al. |
| 2018/0265949 A1 | 9/2018 | Wolverton et al. |
| 2018/0272423 A1 | 9/2018 | Hu |
| 2019/0017154 A1 | 1/2019 | Kaner et al. |
| 2019/0024217 A1 | 1/2019 | Yolton |
| 2019/0071318 A1 | 3/2019 | Kaner et al. |
| 2019/0084039 A1 | 3/2019 | Hu |
| 2019/0135646 A1 | 5/2019 | Turner et al. |
| 2019/0160603 A1 | 5/2019 | Eibl |
| 2019/0177820 A1 | 6/2019 | Larsson |
| 2019/0300374 A1 | 10/2019 | Shevchenko et al. |
| 2019/0309399 A1 | 10/2019 | Badwe |
| 2019/0323107 A1 | 10/2019 | Srivastava et al. |
| 2019/0368014 A1 | 12/2019 | Liimatainen |
| 2019/0376165 A1 | 12/2019 | Wen |
| 2020/0001367 A1 | 1/2020 | Duffy et al. |
| 2020/0005975 A1 | 1/2020 | Jayaraman et al. |
| 2020/0048743 A1 | 2/2020 | Gong et al. |
| 2020/0063238 A1 | 2/2020 | Yolton |
| 2020/0063239 A1 | 2/2020 | Xu et al. |
| 2020/0078860 A1 | 3/2020 | Wright et al. |
| 2020/0109465 A1 | 4/2020 | Cao et al. |
| 2020/0149141 A1 | 5/2020 | Wu et al. |
| 2020/0172998 A1 | 6/2020 | Crudden et al. |
| 2020/0189918 A1 | 6/2020 | Saeuberlich et al. |
| 2020/0223007 A1 | 7/2020 | Keegan et al. |
| 2020/0308679 A1 | 10/2020 | Nymann |
| 2020/0316718 A1 | 10/2020 | Smathers |
| 2020/0325561 A1 | 10/2020 | Kaner |
| 2020/0370149 A1 | 11/2020 | Gong |
| 2020/0385845 A1 | 12/2020 | Gong |
| 2021/0040585 A1 | 2/2021 | Alabort |
| 2021/0046543 A1 | 2/2021 | Larsson |
| 2021/0062305 A1 | 3/2021 | Fang |
| 2021/0147967 A1 | 5/2021 | Cao et al. |
| 2021/0164081 A1 | 6/2021 | Eibl |
| 2021/0180157 A1 | 6/2021 | Bracci |
| 2021/0180162 A1 | 6/2021 | Vecchio |
| 2021/0180170 A1 | 6/2021 | Pike |
| 2021/0197524 A1 | 7/2021 | Maroli et al. |
| 2021/0222275 A1 | 7/2021 | Saboo et al. |
| 2021/0246537 A1 | 8/2021 | Maroli et al. |
| 2021/0254202 A1 | 8/2021 | Gong et al. |
| 2021/0262050 A1 | 8/2021 | Oshchepkov et al. |
| 2021/0286079 A1 | 9/2021 | Vecchio |
| 2021/0310106 A1 | 10/2021 | Wei et al. |
| 2021/0324498 A1 | 10/2021 | Hericher et al. |
| 2021/0332465 A1 | 10/2021 | Behera et al. |
| 2021/0387920 A1 | 12/2021 | Bouttes et al. |

FOREIGN PATENT DOCUMENTS

| | | | |
|---|---|---|---|
| CN | 1225629 C | 11/2005 | |
| CN | 101016603 | 8/2007 | |
| CN | 101994076 | 3/2011 | |
| CN | 102233490 A | 11/2011 | |
| CN | 102286702 | 12/2011 | |
| CN | 102357750 A | 2/2012 | |
| CN | 103628017 | 3/2014 | |
| CN | 104093510 | 10/2014 | |
| CN | 104625473 | 5/2015 | |
| CN | 104694840 | 6/2015 | |
| CN | 104805391 | 7/2015 | |
| CN | 108607983 | 10/2018 | |
| DE | 27 54 437 | 7/1979 | |
| DE | 33 20 513 | 12/1983 | |
| DE | 42 02 828 | 8/1993 | |
| DE | 4411296 | 7/1995 | |
| DE | 10308563 | 8/2004 | |
| DE | 10 320 397 A1 | 12/2004 | |
| DE | 10329912 | 6/2005 | |
| DE | 202008009963 | 9/2008 | |
| DE | 102014013538 | 4/2015 | |
| DE | 102014013538 A1 * | 4/2015 | ............... C23C 4/08 |

(56) References Cited

FOREIGN PATENT DOCUMENTS

| | | |
|---|---|---|
| EP | 0 346 293 | 12/1989 |
| EP | 0 365 884 | 5/1990 |
| EP | 0 774 528 | 5/1997 |
| EP | 0 740 591 | 3/1999 |
| EP | 0 939 139 | 10/2001 |
| EP | 1 270 755 | 1/2003 |
| EP | 1 279 748 | 1/2003 |
| EP | 1 279 749 | 1/2003 |
| EP | 1 120 472 | 7/2003 |
| EP | 1 361 288 | 9/2006 |
| EP | 1 721 999 | 11/2006 |
| EP | 1 857 204 | 11/2007 |
| EP | 1 694 876 | 1/2008 |
| EP | 2 050 533 | 4/2009 |
| EP | 2 305 415 | 4/2011 |
| EP | 2 388 345 | 11/2011 |
| EP | 2 628 825 | 8/2013 |
| EP | 2 639 323 | 9/2013 |
| EP | 2 660 342 | 11/2013 |
| EP | 2 072 627 | 4/2014 |
| EP | 2 730 355 | 5/2014 |
| EP | 2 743 361 | 6/2014 |
| EP | 2 104 753 | 7/2014 |
| EP | 2 777 869 | 9/2014 |
| EP | 2 778 247 | 9/2014 |
| EP | 2 873 747 | 5/2015 |
| EP | 2 563 942 | 10/2015 |
| EP | 2 064 359 | 4/2016 |
| EP | 3 034 211 | 6/2016 |
| EP | 2 235 225 | 10/2016 |
| EP | 3 093 858 | 11/2016 |
| EP | 2 659 014 | 4/2017 |
| EP | 3 156 155 | 4/2017 |
| EP | 2 147 445 | 5/2017 |
| EP | 2 252 419 | 6/2017 |
| EP | 2 265 559 | 6/2017 |
| EP | 2 329 507 | 6/2017 |
| EP | 2 285 996 | 8/2017 |
| EP | 3 211 108 | 8/2017 |
| EP | 1 700 319 | 10/2017 |
| EP | 2 207 907 | 12/2017 |
| EP | 2 788 136 | 1/2018 |
| EP | 2 414 554 B1 | 2/2018 |
| EP | 3 145 660 | 4/2018 |
| EP | 2 432 908 B1 | 5/2018 |
| EP | 2 181 199 | 8/2018 |
| EP | 2 477 784 | 8/2018 |
| EP | 2 695 171 | 8/2018 |
| EP | 3 354 758 | 8/2018 |
| EP | 1 799 380 | 9/2018 |
| EP | 3 034 637 B1 | 10/2018 |
| EP | 3 266 892 | 10/2018 |
| EP | 3 444 452 | 2/2019 |
| EP | 2 265 739 | 6/2019 |
| EP | 3 259 095 | 6/2019 |
| EP | 1 844 172 | 7/2019 |
| EP | 3 517 642 | 7/2019 |
| EP | 3 115 472 | 10/2019 |
| EP | 2 155 921 | 11/2019 |
| EP | 3 350 354 | 2/2020 |
| EP | 3 354 764 | 3/2020 |
| EP | 3 149 216 | 4/2020 |
| EP | 2 403 966 B1 | 5/2020 |
| EP | 3 362 210 | 5/2020 |
| EP | 3 134 558 | 7/2020 |
| EP | 3 514 253 | 10/2020 |
| EP | 3 333 275 | 11/2020 |
| EP | 3 653 736 | 12/2020 |
| EP | 3 411 169 | 1/2021 |
| EP | 3 590 642 | 1/2021 |
| EP | 3 590 643 | 1/2021 |
| EP | 1 848 836 B1 | 4/2021 |
| EP | 3 822 007 | 5/2021 |
| EP | 2 671 669 | 6/2021 |
| FR | 2055735 | 4/1971 |
| FR | 2218797 | 9/1974 |
| GB | 465999 | 5/1937 |
| GB | 956740 | 4/1964 |
| GB | 1073621 | 6/1967 |
| GB | 2153846 A | 8/1985 |
| GB | 2273109 | 6/1994 |
| GB | 2273109 A | 6/1994 |
| GB | 2579580 | 7/2020 |
| GB | 2567492 | 9/2020 |
| GB | 2584654 | 12/2020 |
| GB | 2584905 | 12/2020 |
| IN | MUMNP-2003-00842 | 4/2005 |
| JP | 43-019745 | 8/1968 |
| JP | 45-026214 | 10/1970 |
| JP | 47-1685 | 1/1972 |
| JP | 49-056839 | 6/1974 |
| JP | 58-132393 | 8/1983 |
| JP | 59-016952 | 1/1984 |
| JP | 60-133996 | 7/1985 |
| JP | 6031897 B1 | 7/1985 |
| JP | 61-283489 | 12/1986 |
| JP | 63-026205 | 2/1988 |
| JP | 63-42357 | 2/1988 |
| JP | 63-65056 | 3/1988 |
| JP | 63-089643 | 4/1988 |
| JP | 03-133593 | 6/1991 |
| JP | 03-248799 | 11/1991 |
| JP | 04-237592 | 8/1992 |
| JP | 04-358046 | 12/1992 |
| JP | 07-179997 | 7/1995 |
| JP | 07-268524 | 10/1995 |
| JP | 08-134570 | 5/1996 |
| JP | 09-95755 | 4/1997 |
| JP | 2001-066130 | 3/2001 |
| JP | 2001-303233 | 10/2001 |
| JP | 2002-241919 | 8/2002 |
| JP | 2003-205352 | 7/2003 |
| JP | 2004-149924 | 5/2004 |
| JP | 2005-042152 | 2/2005 |
| JP | 2005-290406 | 10/2005 |
| JP | 2007-154284 | 6/2007 |
| JP | 2008-261329 | 10/2008 |
| JP | 2010-138491 | 6/2010 |
| JP | 2012-000616 | 1/2012 |
| JP | 2015-083715 | 4/2015 |
| JP | 2015-526596 | 9/2015 |
| JP | 2010-138440 | 6/2019 |
| KR | 10-0935816 B1 | 1/2010 |
| SU | 1706398 | 1/1992 |
| TW | 200806801 A | 2/2008 |
| WO | WO 84/000385 | 2/1984 |
| WO | WO 84/004760 | 12/1984 |
| WO | WO 95/004628 | 2/1995 |
| WO | WO 03/018856 | 3/2003 |
| WO | WO 06/080978 | 8/2006 |
| WO | WO 06/086350 | 8/2006 |
| WO | WO 07/120194 | 10/2007 |
| WO | WO 08/042330 | 4/2008 |
| WO | WO 08/060226 | 5/2008 |
| WO | WO 08/082353 | 7/2008 |
| WO | WO 08/105788 | 9/2008 |
| WO | WO 08/153499 | 12/2008 |
| WO | WO 09/085000 | 7/2009 |
| WO | WO 10/044740 | 4/2010 |
| WO | WO 10/046224 | 4/2010 |
| WO | WO 10/074634 | 7/2010 |
| WO | WO 10/134886 | 11/2010 |
| WO | WO 11/005403 | 1/2011 |
| WO | WO 11/021751 | 2/2011 |
| WO | WO 11/071054 | 6/2011 |
| WO | WO 11/084213 | 7/2011 |
| WO | WO 11/091479 | 8/2011 |
| WO | WO 11/152774 | 12/2011 |
| WO | WO 11/158706 | 12/2011 |
| WO | WO 12/021186 | 2/2012 |
| WO | WO 12/022874 | 2/2012 |
| WO | WO 12/112844 | 8/2012 |
| WO | WO 12/162226 | 11/2012 |
| WO | WO 13/049056 | 4/2013 |

(56) References Cited

FOREIGN PATENT DOCUMENTS

| | | |
|---|---|---|
| WO | WO 13/055652 | 4/2013 |
| WO | WO 13/060839 | 5/2013 |
| WO | WO 13/102650 | 7/2013 |
| WO | WO 13/126134 | 8/2013 |
| WO | WO 13/152306 | 10/2013 |
| WO | WO 13/167580 | 11/2013 |
| WO | WO 13/167628 | 11/2013 |
| WO | WO 13/185174 | 12/2013 |
| WO | WO 14/001544 | 1/2014 |
| WO | WO 14/023646 | 2/2014 |
| WO | WO 14/070006 | 5/2014 |
| WO | WO 14/081491 | 5/2014 |
| WO | WO 14/083544 | 6/2014 |
| WO | WO 14/085319 | 6/2014 |
| WO | WO 14/090922 | 6/2014 |
| WO | WO 14/114714 | 7/2014 |
| WO | WO 14/114715 | 7/2014 |
| WO | WO 14/187867 | 11/2014 |
| WO | WO 14/197088 | 12/2014 |
| WO | WO 14/201239 | 12/2014 |
| WO | WO 14/202488 | 12/2014 |
| WO | WO 15/028358 | 3/2015 |
| WO | WO 15/049309 | 4/2015 |
| WO | WO 15/075122 | 5/2015 |
| WO | WO 15/183955 | 12/2015 |
| WO | WO 16/003520 | 1/2016 |
| WO | WO 16/010599 | 1/2016 |
| WO | WO 16/041977 | 3/2016 |
| WO | WO 16/099390 | 6/2016 |
| WO | WO 16/124532 | 8/2016 |
| WO | WO 16/131702 | 8/2016 |
| WO | WO 17/041006 | 3/2017 |
| WO | WO 17/046517 | 3/2017 |
| WO | WO 17/059026 | 4/2017 |
| WO | WO 17/063923 | 4/2017 |
| WO | WO 17/091743 | 6/2017 |
| WO | WO 17/132286 | 8/2017 |
| WO | WO 17/132322 | 8/2017 |
| WO | WO 17/134039 | 8/2017 |
| WO | WO 17/157835 | 9/2017 |
| WO | WO 17/162499 | 9/2017 |
| WO | WO 17/186468 | 11/2017 |
| WO | WO 17/200797 | 11/2017 |
| WO | WO 18/015547 | 1/2018 |
| WO | WO 18/021409 | 2/2018 |
| WO | WO 18/050474 | 3/2018 |
| WO | WO 18/065614 | 4/2018 |
| WO | WO 18/04179 | 6/2018 |
| WO | WO 18/106978 | 6/2018 |
| WO | WO 18/114845 | 6/2018 |
| WO | WO 18/138247 | 8/2018 |
| WO | WO 18/138270 | 8/2018 |
| WO | WO 18/145032 | 8/2018 |
| WO | WO 18/158509 | 9/2018 |
| WO | WO 18/232618 | 12/2018 |
| WO | WO 18/232619 | 12/2018 |
| WO | WO 19/021015 | 1/2019 |
| WO | WO 19/043219 | 3/2019 |
| WO | WO 19/047587 | 3/2019 |
| WO | WO 19/094506 | 5/2019 |
| WO | WO 19/108596 | 6/2019 |
| WO | WO 19/125637 | 6/2019 |
| WO | WO 19/145196 | 8/2019 |
| WO | WO 19/166749 | 9/2019 |
| WO | WO 19/194869 | 10/2019 |
| WO | WO 19/197376 | 10/2019 |
| WO | WO 19/215450 | 11/2019 |
| WO | WO 20/007652 | 1/2020 |
| WO | WO 20/007654 | 1/2020 |
| WO | WO 20/043718 | 3/2020 |
| WO | WO 20/053518 | 3/2020 |
| WO | WO 20/065296 | 4/2020 |
| WO | WO 20/065297 | 4/2020 |
| WO | WO 20/074241 | 4/2020 |
| WO | WO 20/115478 | 6/2020 |
| WO | WO 20/120563 | 6/2020 |
| WO | WO 20/178145 | 9/2020 |
| WO | WO 20/185641 | 9/2020 |
| WO | WO 20/201437 | 10/2020 |
| WO | WO 20/201438 | 10/2020 |
| WO | WO 21/089851 | 5/2021 |
| WO | WO 21/217512 | 11/2021 |
| WO | WO 21/219564 | 11/2021 |
| WO | WO 21/231285 | 11/2021 |

OTHER PUBLICATIONS

PCT International Search Report and the Written Opinion for Int'l Application No. PCT/US2020/024611, dated Jul. 1, 2020.

Al-Aqeeli et al.: "Formation of an amorphous phase and its crystallization in the immiscible Nb—Zr system by mechanical alloying," Journal of Applied Physics 114, 153512, 2013.

Audouard, et al., Mar. 26-31, 2000, Corrosion Performance and Field Experience With Super Duplex and Super Austenitic Stainless Steels in FGD Systems, Corrosion 2000, 8 pp.

Azo Materials, "Stainless Steel—Grade 420," Oct. 23, 2001, <https://www.azom.com/article.aspx?ArticleID=972>, accessed Aug. 15, 2017.

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

Cheney, et al.: "Development of quaternary Fe-based bulk metallic glasses," Materials Science and Engineering, vol. 492, No. 1-2, Sep. 25, 2008, pp. 230-235.

Cheney: Modeling the Glass Forming Ability of Metals. A Dissertation submitted in partial satisfaction of the Requirements for the degree of Doctor of Philosophy. University of California, San Diego. Dec. 2007.

C-Mo Phase Diagram [online], [retrieved on Jan. 27, 2015]. Retrieved from the Internet: <URL:http://factsage.cn/fact/documentation/SGTE/C-Mo.jpg.

C-Nb Phase Diagram [online], [retrieved on Jan. 27, 2015]. Retrieved from the Internet: <URL:http://www.crct.polymtl.ca/fact/documentation/BINARY/C-Nb.jpg.

Conversion Chart of Vickers Hardness (HV) to Rockwell C (HCR).

Cr-C Phase Diagram [online], [retrieved on Jan. 27, 2015]. Retrieved from the Internet: http://www.azom.com/work/3ud2quvLOU9g4VBMjVEh_files/image002.gif.

Crucible Industries LLC, Jun. 3, 2010, Crucible CPM S90V® data sheet, retrieved from the internet Mar. 14, 2019, https://www.crucible.com/PDFs/DataSheets2010/dsS90v1%202010.pdf, 2 pp.

Davis, Jr, ed. Dec. 1994, Stainless steels. ASM International, Materials Park, OH, p. 447.

Fujiki et al., 1988, The sintering phenomena and heat-treated properties of carbides and borides precipitated p/m alloys made of H.S.S. powder, Japan Society of Powder and Powder Metallurgy, 35(3):119-123.

Gorni, Oct. 9, 2003, Austenite transformation temperatures: ferrite start and finish, in Steel Forming and Heath Treating Handbook, pp. 26-43.

Iron-Carbon (Fe—C) Phase diagram [online], [retrieved on Jan. 27, 2014]. Retrieved from the internet: <URL:http://www.calphad.com/iron-carbon.html>.

Khalifa, et al.: "Effect of Mo-Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.

Kumashiro et al., May 31, 1980, The vickers micro-hardness of nonstoichiometric niobium carbide and vanadium carbide single crystals up to 1500c, Journal of Materials Science, 15(5):1321-1324.

Kushner et al., 1992, Thermal Spray Coatings, in Blau (ed) ASM Handbook, vol. 18, Friction, Lubrication, and Wear Technolgoy, pp. 829-833.

(56) References Cited

OTHER PUBLICATIONS

Li et al., Feb. 28, 2000, Temperature dependence of the hardness of single-phase cementite films prepared by an electron-shower PVD method, Journal of the Japan Institute of Metals and Materials, 64(2):134-140.

Liu et al., Jan. 14, 2000, Measurement of austenite-to-ferrite transformation temperature after multi-pass deformation of steels, Materials Science and Engineering A, 194(1):L15-L18.

Miracle, D.B.: The efficient cluster packing model—An atomic structural model for metallic glasses, Acta Materialia vol. 54, Issue 16, Sep. 2006, pp. 4317-4336.

Miyoshi et al., Apr. 25, 1965, High temperature hardness of WC, TiC, TaC, NbC and their mixed carbides, Journal of the Japan Society of Powder and Powder Metalurgy, 12(2):78-84.

Ohmura, Dec. 2003, Evaluation of temper softening behavior of Fe—C binary martensitic steels by nanoindentation, Scripta Materialia, 49(12):1157-1162.

Senkov et al., Jun. 23, 2010, Refractory high-entropy alloys, Intermetallics, 18:1758-1765.

Teng: "Processing, Microstructures, and Properties of Aluminide-Strengthened Ferritic Steels," The University of Tennessee, Knoxville, Dec. 2011.

Tillack, et al.: "Selection of Nickel, Nickel-Copper, Nickel-Cromium, and Nickel-Chromium-Iron Allows", ASM Handbook, Welding, Brazing and Soldering, vol. 6,Dec. 1, 1993 (Dec. 1, 1993) pp. 586-592, XP008097120, p. 589.

Titanium-Boron (TiB) Phase Diagram [online], [retrieved on Jan. 27, 2015]. Retrieved from the internet:<URL:http://www.calphad.com/titaniumboron.html>.

Tucker , 2013, Introduction to Thermal Spray Technology, ASM Handbook, vol. 5A, pp. 3-9.

Wang et al., Jul. 2014, Effect of molybdenum, manganese and tungsten contents on the corrosion behavior and hardness of iron-based metallic glasses, Materials and Corrosion, 65(7):733-741.

Wank et al., 2007, Behavior of thermally sprayed wear protective coatings exposed to different abrasive wear conditions in comparison to hard chromium platings, 7 pp.

Wikipedia, Refractory metals, https://en/wikipedia.org/wiki/Refractory_metals.

Yamamoto et al., 2014, Influence of Mo and W on high temperature hardness of M7C3 carbide in high chromium white cast iron, Materials Transactions, 55(4):684-689.

Yano et al., Apr. 2011, Modification of NiAl intermetallic coatings processed by PTA with chromium carbides, ASTM International Journal, 8(4):190-204.

Yoo et al., Jun. 2006, The effect of boron on the wear behavior of iron-based hardfacing alloys for nuclear power plants valves, Journal of Nuclear Materials, 352:90-96.

Zhu et al., 2017, Microstructure and sliding wear performance of Cr7C3-(Ni,Cr)3(Al,Cr) coating deposited from Cr7O3 in situ formed atomized powder, J. Therm Spray Tech, 26:254-264.

* cited by examiner

THERMAL SPRAY IRON-BASED ALLOYS FOR COATING ENGINE CYLINDER BORES

INCORPORATION BY REFERENCE TO ANY PRIORITY APPLICATIONS

This application claims from the benefit of U.S. App. No. 62/825,221, filed. Mar. 28, 2019, and entitled "THERMAL SPRAY IRON-BASED ALLOYS FOR COATING ENGINE CYLINDER BORES", the entirety of which is incorporated by reference herein.

BACKGROUND

Embodiments of the disclosure generally relate to iron-based thermal spray feedstocks.

SUMMARY

Disclosed herein are embodiments of a thermal spray feedstock material comprising Fe and, in wt. %, B: about 0.2 to about 2.5, C: about 0.15 to about 2.0, and Si: about 0.0 to about 7.0, wherein the thermal spray feedstock material comprises a powder having ≥7 wt % and ≤80 wt % of particles being larger than about 44 microns and smaller than about 90 microns.

Disclosed herein are embodiments of a thermal spray feedstock material comprising Fe and, in wt. %, Al: about 1.5 to about 4.5; and C: about 0.2 to about 1.6 wherein the thermal spray feedstock material comprises a powder In some embodiments, the thermal spray feedstock material can further comprise about 0.0 to about 0.5 wt. % Cr. In some embodiments, the thermal spray feedstock material can further comprise about 0.0 to about 0.1 wt. % Cr. In some embodiments, the thermal spray feedstock material can further comprise about 0.0 to about 0.5 wt. % Cr and about 0.0 to about 0.5 wt. % Mn. In some embodiments, the thermal spray feedstock material can further comprise about 0.0 to about 4.0 wt. % Mn.

In some embodiments, the thermal spray feedstock material can be selected from the group consisting of, in wt. %: B: about 0.6, C: about 0.3, Cr: about 0, Mn: about 0, Si: about 1.0, Fe: bal, B: about 1.5, C: about 0.2, Cr: about 0, Mn: about 0, Si: about 1.0, Fe: bal, B: about 0.3, C: about 1.4, Cr: about 0, Mn: about 0, Si: about 5.0, Fe: bal, B: about 0.6, C: about 1.8, Cr: about 0, Mn: about 0, Si: about 5.0, Fe: bal, and B: about 2.2, C: about 1.1, Cr: about 0, Mn: about 0, Si: about 6.0, Fe: bal.

In some embodiments, the thermal spray feedstock material is configured to form a matrix and is characterized by having, under thermodynamic equilibrium conditions, a solidus temperature less than or equal to about 1550K, a liquidus temperature less than or equal to about 1750K, between about 5 and about 35 mol % of total hard particles at 1300K, and greater than or equal to about 15 mol % of a mole fraction of liquid 25K above the solidus temperature, wherein a difference between the liquidus temperature and the solidus temperature is between about 30 and about 150K. In some embodiments, the thermal spray feedstock material can be configured to form a matrix and is characterized by having, under thermodynamic equilibrium conditions, a solidus temperature less than or equal to about 1500K, a liquidus temperature less than or equal to about 1700K, and between about 5 and about 35 mol % of total hard particles at 1300K, wherein a difference between the liquidus temperature and the solidus temperature is between about 350 and about 150K.

In some embodiments, the thermal spray feedstock material can be manufactured by water atomization or gas atomization.

Also disclosed herein are embodiments of a coating formed from the thermal spray feedstock material as disclosed herein. In some embodiments, the coating can comprise a bulk coating hardness of between about 290 HV0.3 and about 600 HV0.3, and an individual particle hardness of between 550 HV0.1 and about 950 HV0.1. In some embodiments, the coating can be deposited by atmospheric plasma spraying. In some embodiments, the coating can be deposited on an internal surface of a cylinder bore of an internal combustion engine. In some embodiments, the coating can comprise between about 5 and about 35 vol. % total hard phases, between about 5 and about 35 vol. % of a total spinel phase, and between about 5 and about 35 vol. % of a total aluminum rich oxide phase.

Also disclosed herein are embodiments of an iron based, atomized powder comprising, under equilibrium solidification conditions, greater than or equal to 15.0 mol % of liquid 25K above the solidus temperature.

In some embodiments, the powder can have a liquidus temperature, under equilibrium solidification conditions, less than or equal to 1700K. In some embodiments, the powder can have a solidus temperature, under equilibrium solidification conditions, less than or equal to 1500K. In some embodiments, wherein, under equilibrium solidification conditions, the difference between solidus and liquidus temperatures is between 350K and 120K. In some embodiments, wherein, under equilibrium solidification conditions, the mole fraction of all hard phases is between 5 and 35 mol %.

In some embodiments, the powder can comprise greater than or equal to 7 wt % of the powder larger than 44 microns in diameter. In some embodiments, the powder can have a chemistry comprising: B 0.2 to 2.5 wt %, C: 0.15 to 2.0 wt %, Si: 0.0 to 7.0 wt %, and Fe: balance. In some embodiments, the powder can comprise between 0 to 4 wt % Mn. In some embodiments, the powder comprises less than or equal to 0.5 wt % Cr. In some embodiments, the powder can be deposited by atmospheric plasma spraying.

In some embodiments, the powder can be deposited on an internal surface of a cylinder bore of an internal combustion engine for the purpose of reducing friction during operation. In some embodiments, the powder can be manufactured by water or gas atomization. In some embodiments, the powder can comprise a particle hardness after deposition of between 550 HV0.1 and 950 HV0.1.

Also disclosed herein are embodiments of a method of applying a coating comprising depositing a coating on an internal surface of a cylinder bore used in an internal combustion engine for the purpose of reducing friction during operation, wherein a powder material used to form the coating, under equilibrium solidification conditions, comprises greater than or equal to 15.0 mol; of liquid 25K above the solidus temperature.

In some embodiments, the depositing can comprise plasma spraying. In some embodiments, the powder material can comprise greater than or equal to 7 wt % and less than or equal to 80 wt % particles being larger than 44 microns in diameter. In some embodiments, the powder material can have a liquidus temperature, under equilibrium solidification conditions, of less than or equal to 1700K.

Also disclosed herein are embodiments of a thermal spray feedstock material comprising Fe and, in wt. %, Al: about 1.5 to about 4.5, and C: about 0.2 to about 1.6, wherein the thermal feedstock material comprises a powder that, under equilibrium conditions with 4 wt % oxygen added, forms a matrix having an aluminum rich phase comprising of between about 7.5 and about 0.30 mol %. In some embodiments, the material can include other elements and inevitable impurities at less than 1 wt. %. In some embodiments the aluminum comprising oxide where the aluminum comprising oxide at 1300K is defined as the sum of Spinel, Corundum, and Mullite phases. Some embodiments the aluminum rich oxide comprises iron, aluminum, and oxygen.

In some embodiments, the following elements are present at a maximum of 0.5 wt. %: B, N, Ca, Ti, V, Co, Ni, Cu, Zn, Y, Zr, Nb, Mo, Pd, Ag, Cd, In, Sn, La, Hf, Ta, W, Pt, Au. In some embodiments, the material includes Fe, Al, C, Si, and Mn and all other elements have a maximum of 0.5 wt. %. In some embodiments, the material includes Fe, Al, C, Si, and Mn and all other elements have a maximum of 0.1 wt. %. In some embodiments, a total of all inevitable impurities is less than about 1 wt. %.

Also disclosed herein are embodiments of a coating on an internal bore of an engine formed from the material disclosed herein. In some embodiments, the coating can have a $HV_{0.3}$ hardness in excess of 450.

Further disclosed herein are embodiments of a method of applying a coating as disclosed herein.

Further disclosed herein are embodiments of a thermal spray feedstock as disclosed herein.

Further disclosed herein are embodiments of a coating as disclosed herein.

DETAILED DESCRIPTION

Figure 1:
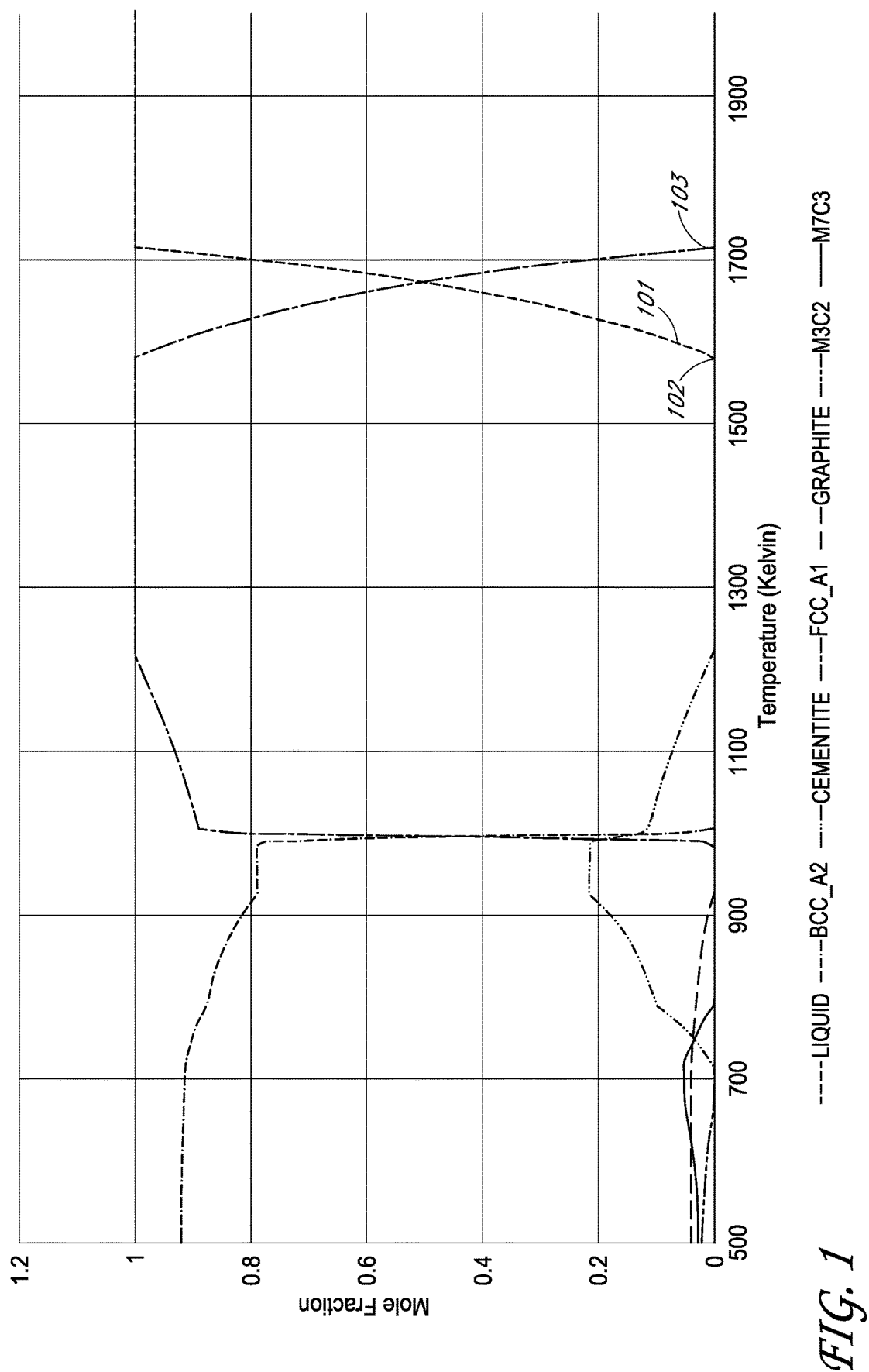
FIG. 1 shows an equilibrium solidification plot of an alloy that does not meet one or more criteria of the following disclosure, described as Standard 1 in Table 1, with a chemistry of carbon 1.2 wt %, manganese 1.4 wt %, chromium 1.4 wt %, and a balance of iron.

Disclosed herein are embodiments of iron-based alloys. In some embodiments, alloys disclosed herein can have a low melting point with a high fraction of liquid. In some embodiments, alloys disclosed herein can incorporate aluminum and have advantageous oxidation thermodynamics. Both types of alloys can include one or more of the disclosed criteria. They can be used for feedstock for plasma spray processes, internal diameter specific plasma spray processes, and thermal spray materials. In some embodiments, they can be applied as coatings for internal combustion engine cylinder bores, though the particular use is not limiting.

Alloys that do not utilize chromium can be advantageous from an environmental and worker health perspective. Chromium bearing iron-based alloys may form hexavalent chromium ($Cr\ 6^+$) fumes and effluent during manufacture, processing, and deposition. Reduction of hexavalent chromium ($Cr\ 6^+$) is being driven by concerns about carcinogenic effects at relatively low doses. As a result, there is increased regulatory pressure from developed and developing countries to dramatically reduce the actual and potential environmental and worker exposure to $Cr\ 6^+$. In one aspect of this disclosure, alloys that have low or no chromium are described.

In certain applications of the disclosure, it can be advantageous to use an iron-based powder feedstock that has a ≥7 wt % and ≤80 wt % of particles being larger than 44 microns or 325 meshform (or larger than about 44 microns or about 325 mesh form). The particles can be used to form a coating, for example using thermal spray. There are cost advantages to having a particle size distribution (PSD) that incorporates larger particles. In typical thermal spray powder, most powder greater than 44 microns is not incorporated into the final product but is sold or reprocessed as scrap. By incorporating powder larger than 44 microns into the final product, less material is scrap, decreasing product cost and reducing scrap percentage. An additional advantage is reduced remelt percentage which can lead to increased yield, improved worker safety, increases equipment life, decreases maintenance, reduced stocking quantities, and reduced fire hazard. For example, remelted powder can cause a combustion risk if it is at too high of a percentage of the melt.

In some embodiments, an iron-based powder feedstock can have a ≥7 wt % and ≤80 wt % of particles with a minimum particle size of 53 microns (or about 53 microns). In some embodiments, an iron-based powder feedstock can have a ≥7 wt % and ≤80 wt % of particles with a minimum particle size of 63 microns (or about 63 microns). In some embodiments, an iron-based powder feedstock can have a ≥7 wt % and ≤80 wt % of particles with a minimum particle size of 75 microns (or about 75 microns).

In some embodiments, an iron-based powder feedstock can have a ≥7 wt % and ≤80 wt % of particles with a maximum particle size of 90 microns (or about 90 microns). In some embodiments, an iron-based powder feedstock can have a ≥7 wt % and ≤80 wt % of particles with a maximum particle size of 75 microns (or about 75 microns). In some embodiments, an iron-based powder feedstock can have a ≥7 wt % and ≤80 wt % of particles with a maximum particle size of 63 microns (or about 63 microns). In some embodiments, an iron-based powder feedstock can have a ≥7 wt % and ≤80 wt % of particles with a maximum particle size of 53 microns (or about 53 microns).

A major obstacle in commercializing coarser powders comprising ≥7 wt % and ≤80 wt % of particles larger than, for example, 44 microns for plasma spraying is the reduction in deposition efficiency and coating quality due to increased unmelted particles formed during spraying compared to standard plasma spray deposition (PSD) powders. These thermodynamic characteristics include melting characteristics such as solidus, liquidus, and fraction of liquid and solid at relative temperatures. Alloys described by this disclosure have improved fluidity at low temperatures predicting the ability of a given alloy to have good deposit characteristics. Essentially, by maintaining both a low solidus temperature and high fraction of liquid just above the solidus, the material can be more fluid at low temperatures compared to alloys not designed with this attribute.

In wear applications, wear resistance and hardness are generally directly correlated. That is, harder materials typically exhibit improved abrasion and sliding wear resistance compared to softer materials. High hardness materials also may hone more readily and resist plastic deformation during honing improving surface quality compared to lower hardness materials. In one aspect of this disclosure, alloy powders and plasma sprayed coatings are described that have improved hardness compared to carbon steel compositions. Alloy powders and coatings described in this disclosure have hardnesses between 600 and 1000 (or between about 600 and about 1000) HV0.1 compared to a reference standard steel with a hardness of ~500 HV0.1.

In some embodiments, iron-based alloys as described herein may serve as effective feedstock for the plasma transferred arc (PTA), laser cladding hardfacing processes including high speed laser cladding, and thermal spray processing including high velocity oxygen fuel (HVOF) thermal spray, though the disclosure is not so limited. Some embodiments include the manufacture of alloys into cored wires for hardfacing processes, and the welding methods of wires and powders using wire fed laser and short-wave lasers.

In some embodiments iron-based alloys of this disclosure can be used for atmospheric plasma spraying (APS). In some embodiments the alloys are feedstock for APS processes configured to coat the internal diameter of a cylinder.

The term alloy can refer to the chemical composition of a powder used to form a metal component, the powder itself, the chemical composition of a melt used to form a casting component, the melt itself, and the composition of the metal component formed by the heating, sintering, and/or deposition of the powder, including the composition of the metal component after cooling, in some embodiments, the term alloy can refer to the chemical composition forming the powder disclosed within, the powder itself, the feedstock itself, the wire, the wire including a powder, the combined composition of a combination of wires, the composition of the metal component formed by the heating and/or deposition of the powder, or other methodology, and the metal component.

In some embodiments, alloys manufactured into sheath containing a powder) for welding or for use as a feedstock for another process may be described by specific chemistries herein. For example, the wires can be used for a thermal spray. Further, the compositions disclosed below can be from a single wire or a combination of multiple wires (such as 2, 3, 4, or 5 wires).

In some embodiments, the alloys can be applied by a thermal spray process to form a thermal spray coating, such as HVOF alloys. In some embodiments, the alloys can be applied as a weld overlay. In some embodiments, the alloys can be applied either as a thermal spray or as a weld overlay, e.g., having dual use.

In some embodiments, the alloy may be manufactured into a powder. Powder may be manufactured by water atomization, gas atomization, spray drying, spray drying followed by sintering, and/or direct reduction of oxides. In some embodiments, the alloys described herein may be used to for a coating via thermal spraying. In some embodiments, the alloys described herein may be used for a coating via plasma spraying. In some embodiments, the alloys described herein may be used to form a coating via atmospheric plasma spraying. In some embodiments, the alloys described herein may be used to form a coating via atmospheric plasma spraying on to an internal diameter of a particular product. Specific applications may include, but would not be limited to, cylinder bores, cylinder sleeves, pump sleeves, pump housings. In some embodiments, the alloys described herein may be used to form a coating via atmospheric plasma spraying on to an internal diameter on a cylinder bore for internal combustion engines.

Metal Alloy Composition

In some embodiments, the alloy can be described by a compositional range which encompasses a set of alloys which can meet the thermodynamic criteria presented in this disclosure. All alloys described in the embodiment of this invention are free of or bear low percentages of Cr. In some embodiments, alloys described in this disclosure may have no or low weight percentages of Mn. Both element ranges are discussed below.

In some embodiments, the composition can have, in weight percent, the following elemental ranges:
Carbon: 1.1 (or about 1.1);
Aluminum: 3.4 (or about 3.4);
Iron: balance;
Other elements and inevitable impurities: <1 (or about 1) each.

In some embodiments, the composition can have, in weight percent, the following elemental ranges:
Carbon: 1.1 (or about 1.1);
Aluminum: 3.4 (or about 3.4);
Iron: balance;
Other elements and inevitable impurities: <0.5 about 0.5) each.

In some embodiments, the composition can have, in weight percent, the following elemental ranges:
Carbon: 1.0 (or about 1.0);
Aluminum: 3.4 (or about 3.4);
Iron: balance;
Other elements and inevitable impurities: <1 (or about 1) each.

In some embodiments, the composition can have, in weight percent, the following elemental ranges:
Carbon: 1.0 (or about 1.0);
Aluminum: 3.4 (or about 3.4);
Iron: balance;
Other elements and inevitable impurities: <0.5 about 0.5) each.

In some embodiments, the composition can have, in weight percent, the following elemental ranges:
Carbon: 0.9 (or about 0.9);
Aluminum: 3.4 (or about 3.4);
iron: balance;
Other elements and inevitable impurities: <1 (or about 1) each.

In some embodiments, the composition can have, in weight percent, the following elemental ranges:
Carbon: 0.9 (or about 0.9);
Aluminum: 3.4 (or about 3.4);
Iron: balance;
Other elements and inevitable impurities: <0.5 (or about 0.5) each.

In some embodiments, the composition can have, in weight percent, the following elemental ranges:
Carbon: 0.9 to 1.4 (or about 0.9 to about 1.4);
Aluminum: 3 to 3.8 (or about 3 to about 3.8);
Iron: balance;
Other elements and inevitable impurities: <1 (or about 1) each.

In some embodiments, the composition can have, in weight percent, the following elemental ranges:
Carbon: 0.9-1.4 (or about 0.9 to about 1.4);
Aluminum: 3 to 3.8 (or about 3 to about 3.8);
Iron: balance;
Other elements and inevitable impurities: <0.5 (or about 0.5) each.

As discussed above, other elements an inevitable impurities can be each limited to a certain maximum. In some embodiments, impurities as a whole can have a maximum of the listed 1.0 or 0.5 wt. %, with the other elements each limited to the 1.0 or 0.5 wt. % maximum. In some embodiments, all other elements are collectively under 1.0 or 0.5 wt. %.

In some embodiments, the composition can have, in weight percent, the following elemental ranges:
Boron: 0.2 to 2.5 (or about 0.2 to about 2.5);
Carbon: 0.15 to 2.0 (or about 0.15 to about 2.0);
Silicon: 0.0 to 7.0 (or about 0.0 to about 7.0); and
Iron: balance.

In some embodiments, the composition can have, in weight percent, the following elemental ranges:
Boron: 0.2 to 2.5 (or about 0.2 to about 2.5);
Carbon: 0.15 to 2.0 (or about 0.15 to about 2.0);
Silicon: 0.0 to 7.0 (or about 0.0 to about 7.0);
Chromium: 0.0 to 0.5 (or about 0.0 to about 0.5);
Iron: balance.

In some embodiments, the composition can have, in weight percent, the following elemental ranges:
Boron: 0.2 to 2.5 (or about 0.2 to about 2.5);
Carbon: 0.15 to 2.0 (or about 0.15 to about 2.0);
Silicon: 0.0 to 7.0 (or about 0.0 to about 7.0);
Chromium: 0.0 to 0.1 (or about 0.0 to about 0.1); and
Iron: balance.

In some embodiments, the composition can have, in weight percent, the following elemental ranges:
Boron: 0.2 to 2.5 (or about 0.2 to about 2.5);
Carbon: 0.15 to 2.0 (or about 0.15 to about 2.0);
Silicon: 0.0 to 7.0 (or about 0.15 to about 2.0);
Chromium: 0.0 to 0.5 (or about 0.0 to about 0.5);
Manganese: 0.0 to 0.5 (or about 0.0 to about 0.5); and
Iron: balance.

In some embodiments, the composition can have, in weight percent, the following elemental ranges:
Carbon: 0.15 to 2.0 (or about 0.15 to about 2.0);
Aluminum: 2.0 to 7.0 (or about 2.0 to about 7.0);
Silicon: 0.0 to 1.5 (or about 0.0 to about 1.5);
Manganese: 0.0 to 2.0 (or about 0.0 to about 2.0); and
Iron: balance.

In some embodiments, any of the disclosed compositions can include chromium and/or manganese in any of the following ranges, in wt. %:
0.0 to 1.0 (or about 0.0 to about 1.0);
0.0 to 0.5 (or about 0.0 to about 0.5);
0.0 to 0.25 (or about 0.0 to about 0.25);
0.0 to 0.1 (or about 0.0 to about 0.1); or
0.0 to 0.05 (or about 0.0 to about 0.05).

In some embodiments, the composition can have, in weight percent, the following elemental ranges:
Aluminum: 1.5 to 4.5 (or about 1.5 to about 4.5);
Carbon: 0.2 to 1.6 (or about 0.2 to about 1.6); and
Iron: Balance In some embodiments, the composition can have, in weight percent, the following elemental ranges:
Aluminum: 1.5 to 4.5 (or about 1.5 to about 4.5);
Carbon: 0.2 to 1.6 (or about 0.2 to about 1.6);
Silicon+Boron: 0.5 to 4.0 (or about 0.5 to about 4.0); and
Iron: Balance In some embodiments, the compositions can have, in weight percent, the following elemental ranges:
Aluminum: 2.7 to 4.1 (or about 2.7 to about 4.1);
Carbon: 0.8 to 1.4 (or about 0.8 to about 1.4).

In some embodiments, the compositions can have, in weight percent, the following elemental ranges:
Aluminum: 3 to 3.8 (or about 3 to about 3.8);
Carbon: 0.9 to 1.2 (or about 0.9 to about 1.2).

Embodiments of the above-described compositions can be particularly advantageous for applying to the internal bore of a combustion engine with plasma spray. In some embodiments, the above-described alloys may only include aluminum, carbon, iron, and inevitable impurities.

In some embodiments it can be advantageous to avoid additional alloying elements, in addition to avoiding Cr, for the purposes of maintaining a low-cost material. In some embodiments, no other elements but carbon or aluminum are present in the material in excess of 5 wt. is (or about 5 wt. %). In some embodiments, no other elements are present in the material in excess of 1 wt. % (or about 1 wt. %). In some embodiments, no other elements are present in the material in excess of 0.5 wt,% (or about 0.5 wt. %). In some embodiments, the following elements, which are alloyed in steels, are found only as impurities and thus have a measurable weight percent below 0.5 wt. %: B, N, Ca, Ti, V, Co, Ni, Cu, Zn, Y, Zr, Nb, Mo, Pd, Ag, Cd, In, Sn, La, Hf, Ta, W, Pt, Au.

In some embodiments, impurities can be less than or equal to 0.25 (or about 0.25) wt %.

In some embodiments, the composition can include a minimum of 0.4 (or about 0.4) wt. % silicon. In some embodiments, the composition can include a maximum of 2 (or about 2) wt. % silicon. In some embodiments, the composition may not include silicon.

TABLE 1

List of Nominal and Measured Experimental Alloy Compositions that Meet the Embodiments of this Disclosure (X2-X7) and alloys outside the scope of this disclosure (Standard 1 and Standard 2), Balance Iron + Minor Impurities

| Alloy | Nominal Chemistry | | | | | | Measured Chemistry | | | | | | |
|---|---|---|---|---|---|---|---|---|---|---|---|---|---|
| | Al | B | C | Cr | Mn | Si | Al | B | C | Cr | Mn | O | Si |
| Standard 1 | | | 1.2 | 1.4 | 1.4 | | | | 1.2 | 1.4 | 1.4 | | |
| Standard 2 | | | 0.8 | 0 | 1.5 | 0.4 | | 0 | 0.74 | 0 | 1.68 | 0.04 | 0.42 |
| P111-X2 | | 0.6 | 0.3 | 0.0 | 0.0 | 1.0 | | 0.52 | 0.32 | 0 | | 0.05 | 0.90 |
| P111-X3 | | 1.5 | 0.2 | 0.0 | 0.0 | 1.0 | | 1.28 | 0.34 | 0 | | 0.03 | 0.99 |
| P111-X4 | | 0.3 | 1.4 | 0.0 | 0.0 | 5.0 | | 0.32 | 1.34 | 0 | | 0.02 | 4.36 |
| P111-X5 | | 0.6 | 1.8 | 0.0 | 0.0 | 5.0 | | 0.48 | 1.74 | 0 | | 0.02 | 4.48 |
| P111-X6 | | 2.2 | 1.1 | 0.0 | 0.0 | 6.0 | | 1.86 | 1.04 | 0 | | 0.03 | 5.49 |
| P111-X7 | 3.4 | 0.0 | 1.1 | 0.0 | | | 3.3 | 0.0 | 1.2 | | | 0.04 | |

In Table 1, all values can be "about" the recited value as well. For example, for P111-X2 Boron 0.6 (or about 0.6). This applies to all tables throughout the disclosure.

In some embodiments, the disclosed compositions can be the wire/powder, the coating or other metallic component, or both.

The disclosed alloys can incorporate the above elemental constituents to a total of 100 wt. %. In some embodiments, the alloy may include, may be limited to, or may consist essentially of the above-named elements. In some embodiments, the alloy may include 2 wt. % (or about 2 or less, 1 wt. % (or about 1 wt. %) or less, 0.5 wt. % (or about 0.5 wt. %) or less, 0.1 wt. % (or about 0.1 wt. %) or less or 0.01 wt. % (or about 0.01 wt. %) or less of impurities, or any range between any of these values. Impurities may be understood as elements or compositions that may be included in the alloys due to inclusion in the feedstock components, through introduction in the manufacturing process.

Further, the Fe content identified in all of the compositions described in the above paragraphs may be the balance of the composition, or alternatively, where Fe is provided as the balance, the balance of the composition may comprise Fe and other elements. In some embodiments, the balance may consist essentially of Fe and may include incidental impurities.

Thermodynamic Criteria

Embodiments of alloys of the disclosure can be fully described by certain equilibrium thermodynamic criteria. The alloys can meet some, or all, of the described thermodynamic criteria.

The first equilibrium thermodynamic criterion predicts the fluidity of an alloy when partially solid and partially liquid during solidification, that is while at a temperature between the liquidus and solidus. This criterion is the modeled fraction of liquid at 25K above the modeled equilibrium solidus temperature. Higher mole fractions of liquid at this temperature may correlate to high deposition efficiency of plasma sprayed alloys. This can be true with a fraction of powder above 44 micron.

Figure 2:
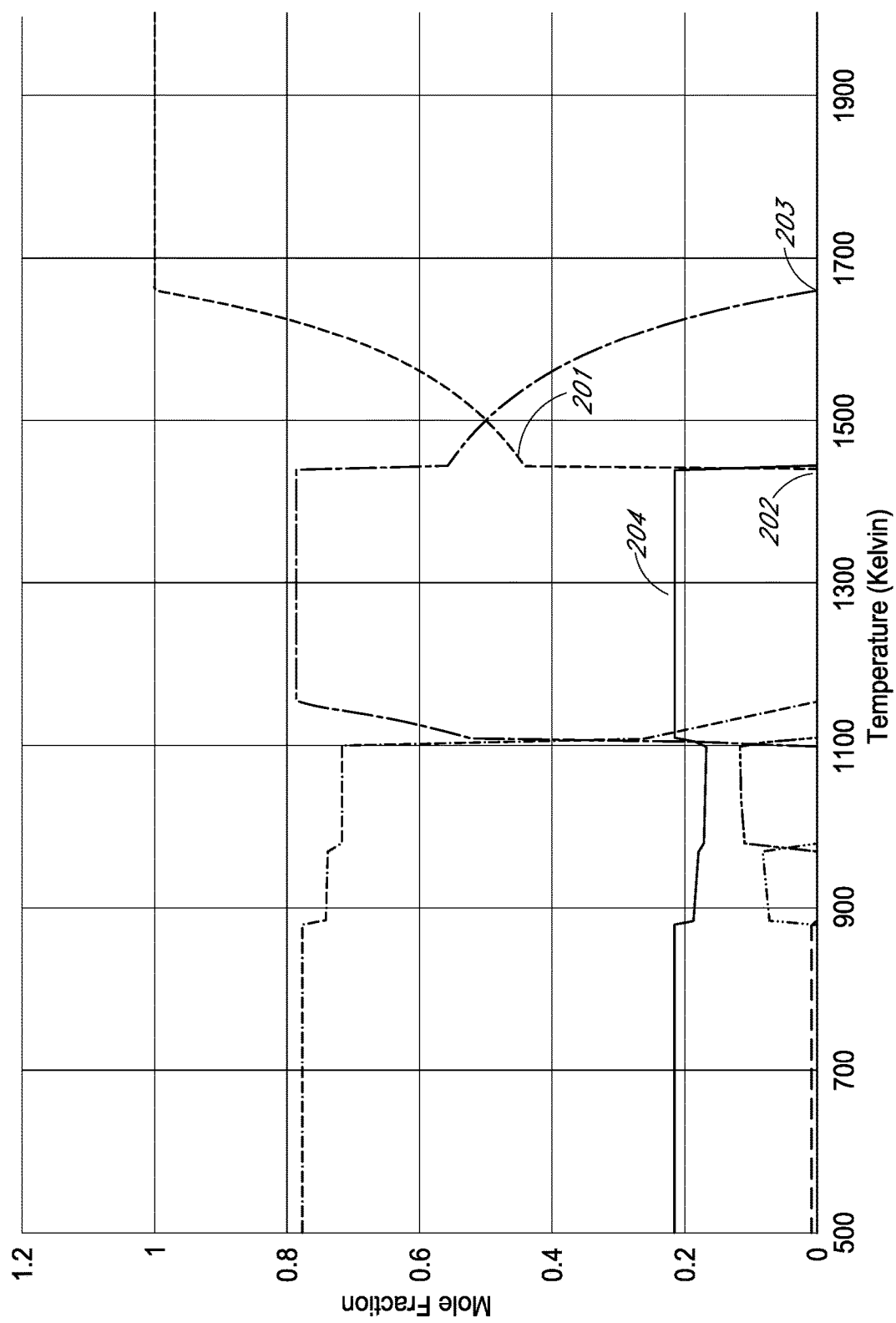
FIG. 2 shows an equilibrium solidification plot of an alloy that meets embodiments of this disclosure, described as P111-X3 in Table 1, with a chemistry of boron 1.5 wt %, carbon 0.2 wt %, silicon 1.0 wt %, and a balance of iron.

The first equilibrium thermodynamic criterion is the mole fraction of liquid at 25K (or at about 25K) [101] [201] above the solidus temperature [102] [202]. This criterion shall be known as mole fraction of liquid 25K above solidus. As shown in FIG. 1, for the alloy outside of this disclosure, Standard 1, this percentage is 9.3 mol % [101]. As shown in FIG. 2, for the alloy P111-X3 this percentage is 46.0 mol % [201].

In some embodiments, the mole fraction of liquid 25K above solidus shall be greater than or equal to 15 mol % (or about 15 mol %). In some embodiments, the mole fraction of liquid 25K above solidus shall be greater than or equal to 20 mol % (or about 20 mol %). In some embodiments, the mole fraction of liquid 25K above solidus shall be greater than or equal to 25 mol % (or about 25 mole %). In some embodiments, the mole fraction of liquid 25K above solidus shall be greater than or equal to 30 mol % (or about 30 mol %). In some embodiments, the mole fraction of liquid 25K above solidus shall be greater than or equal to 35 mol % (or about 35 mol %). In some embodiments, the mole fraction of liquid 25K above solidus shall be greater than or equal to 40 mol % (or about 40 mol %). In some embodiments, the mole fraction of liquid 25K above solidus shall be greater than or equal to 45 mol % (or about 45 mol %).

The second equilibrium thermodynamic criterion relates to the solidification characteristics of an alloy during thermal spraying. This criterion, the solidus temperature, when minimized can predict an increased fluidity of an alloy which allows large particles to comprise a fraction of liquid at a lower temperature than high solidus temperature alloys.

The second equilibrium thermodynamic criterion is the solidus temperature defined as the highest temperature where no liquid is present during equilibrium solidification. As shown in FIGS. 1-2, in alloy Standard 1 and alloy P111-X3 this is calculated as 1580K and 1440K respectively [102] and [202].

In some embodiments, the solidus temperature is less than or equal to 1550K (or about 1550K). In some embodiments, the solidus temperature is less than or equal to 1500K (or about 1500K). In some embodiments, the solidus temperature is less than or equal to 1475K (or about 1475K). In some embodiments, the solidus temperature is less than or equal to 1450K (or about 1450K).

The third equilibrium thermodynamic criterion relates to the solidification characteristics of an alloy during thermal spraying. The third criterion is the liquidus temperature of an alloy which can predict the temperature above which an alloy will be completely liquid. In this disclosure, alloys with lower solidus temperatures can achieve a fully molten state with lower energy input and at a lower liquidus temperature. This can enable high deposition efficiency of coarse powders during thermal spraying at a given plasma temperature due to increased fraction of completely molten powders.

The third equilibrium thermodynamic criterion is the liquidus temperature defined as the highest temperature where an alloy is fully liquid during equilibrium solidification conditions. As shown in FIGS. 1-2, for the alloy Standard 1, the liquidus temperature is 1715 K [103]. In alloy P111-X3, the liquidus temperature is 1665 K [203].

In some embodiments, the liquidus temperature is less than or equal to 1750K (or about 1750K). In some embodiments, the liquidus temperature is less than or equal to 1725K (or about 1725K). In some embodiments, the liquidus temperature is less than or equal to 1700K (or about 1700K). In some embodiments, the liquidus temperature is less than or equal to 1675K (or about 1675K). In some embodiments, the liquidus temperature is less than or equal to 1650K (or about 1650K). In some embodiments, the liquidus temperature is less than or equal to 1625K (or about 1625K). In some embodiments, the liquidus temperature is less than or equal to 1600K (or about 1600K).

The fourth equilibrium thermodynamic criterion relates to the solidification range, defined as the liquidus temperature minus the solidus temperature in kelvin. This criterion will be known as the mushy zone. A wide mushy zone may contribute to a partially molten/partially solid particle during deposition which may lead to a novel splat morphology and/or better deposition characteristics than a fully solid or fully molten particle.

As shown in FIGS. 1-2, in the alloy Standard 1 the mushy zone is 135K [103]-[102]. In the alloy P111-X3, the mushy zone is 225K [203]-[202].

In some embodiments, the mushy zone is between 30 and 150 K (or between about 30 and about 150K). In some embodiments, the mushy zone is between 120 and 350 K (or between about 120 and about 350K). In some embodiments, the mushy zone is between 150 and 350 K (or between about 150 and about 350K).

The fifth equilibrium thermodynamic criterion relates to the total hard phase fraction of the alloy under equilibrium solidification conditions. This criterion correlates to particle hardness as manufactured, after atomization, and/or after deposition via thermal spray even if the phases do not form or do not equal the equilibrium mole percentages due to non-equilibrium solidification conditions The fifth equilibrium thermodynamic criterion is the sum of the mole fractions of all borides, carbides, and silicides at 1300K (or about 1300K). This is known as total hard phases at 1300K. In the alloy Standard 1, the total hard phases at 1300K is 0 mol % as there are no hardphases present. In the alloy of P111-X3, the total hard phases at 1300K is 21.5 mol % as the $M_2B$ phase, a boride, is the only hard phase present at 1300K [204].

In some embodiments of this disclosure, the total hard phases at 1300K (or about 1300K) is between 5 and 35 awl % (or between about 5 and about 35 mol. %). In some embodiments of this disclosure, the total hard phases at 1300K (or about 1300K) is between 7.5 and 30 mol % (or between about 7.5 and about 30 mol %). In some embodiments of this disclosure, the total hard phases at 1300K (or about 1300K) is between 7.5 and 25 mol % (or between about 7.5 and about 25 mol %). In some embodiments of this disclosure, the total hard phases at 1300K (or about 1300K) is between 9 and 25 mol % (or between about 9 and about 25 mol %).

ments, the alloy may have an aluminum rich oxide, including one or more of a spinal, corundum, and mullite.

Figure 3:
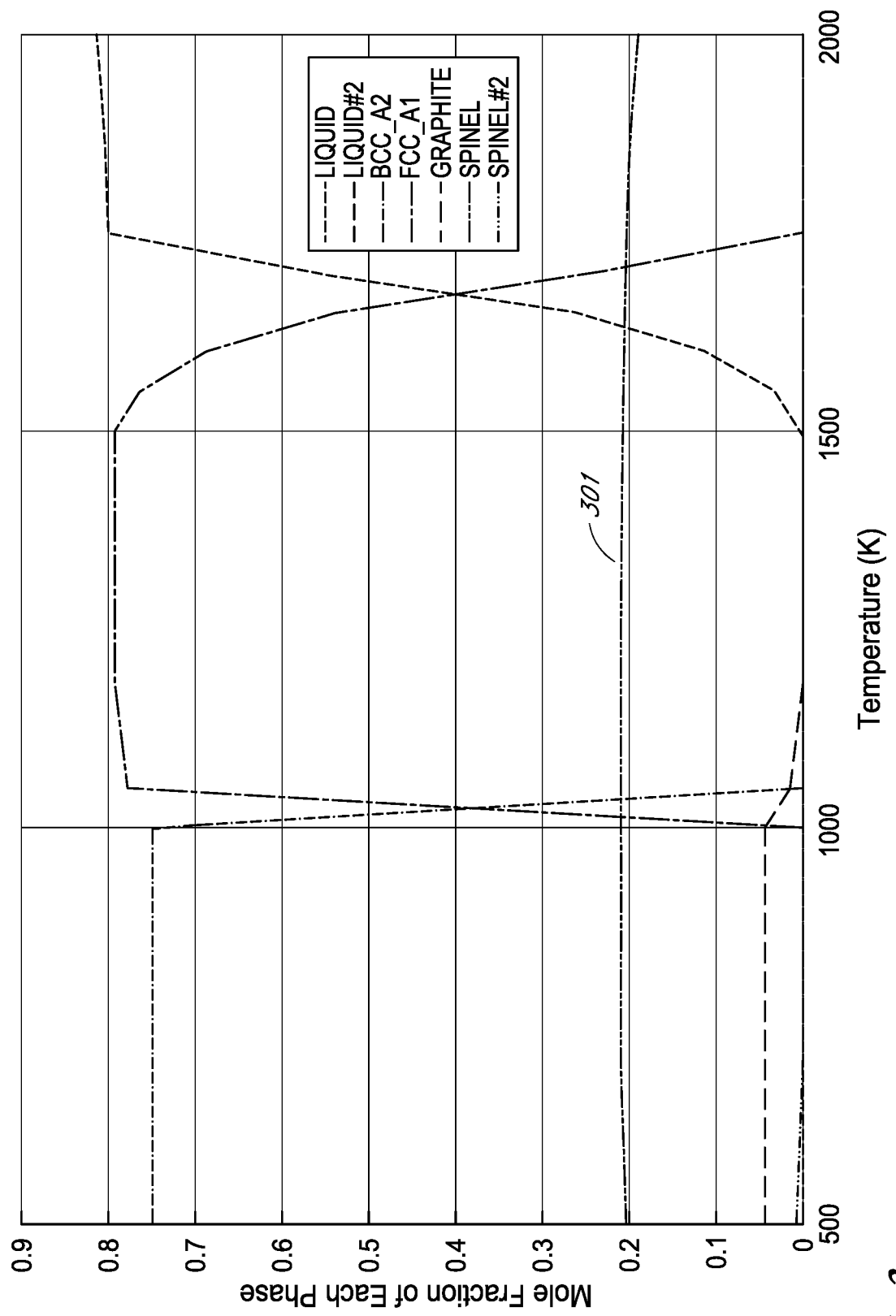
FIG. 3 shows an equilibrium solidification plot of an alloy that meets embodiments of this disclosure, described as P111-X7 in Table 1, with a chemistry of aluminum 3.4 wt %, carbon 1.1 wt %, and a balance of iron to which 4 wt % oxygen has been added.

The sixth equilibrium thermodynamic criterion is the sum of all Fe and Al bearing spinel phase mole fractions including $FeAl_2O_4$ present at 1000K under equilibrium conditions with the addition of 4 wt % (or about 4 wt %) oxygen. This criterion will be known as total spinel mole fraction. As shown in FIG. 3, for the alloy P111-X7 with 4 wt % oxygen, the total spinel mole fraction is 20 enol % as the only spinel phase present at 1000K is FeAl2O4 [301].

In some embodiments of this disclosure, the total spinet phase at 1000K (or about 1000K) is between 5 and 35 mol % (or between about 5 and about 35 mol %). In some embodiments of this disclosure, the total spinel phase at 1000K (or about 1000K) is between 7.5 and 30 mol % (or between about 7.5 and about 30 mol %). In some embodi-

TABLE 2

List of Modeled and Measured (empirical) Thermodynamic Criterion for Alloys that Meet the Embodiments of this Disclosure

| | Modeled | | | | | | Empirical (DSC) | |
|---|---|---|---|---|---|---|---|---|
| Alloy | Liquidus (K) | Solidus (K) | Liquid @ solidus + 25 | Mushy Zone (K) | Total Hard @ 1300K | Graphite @ 1300K | Liquidus (K) | Solidus (K) |
| P111-X2 | 1720 | 1440 | 19% | 280 | 8.9 | 0 | 1628 | 1412 |
| P111-X3 | 1665 | 1440 | 46% | 225 | 21.5 | 0 | 1656 | 1420 |
| P111-X4 | 1565 | 1385 | 32% | 180 | 10.9 | 1.8 | 1644 | 1322 |
| P111-X5 | 1495 | 1375 | 60% | 120 | 21 | 3.5 | 1532 | 1310 |
| P111-X6 | 1405 | 1375 | 100% | 30 | 28.6 | 4.1 | 1494 | 1291 |

TABLE 3

List of Modeled and Measured (empirical) Thermodynamic Criterion for Alloys that do not Meet the Embodiments of this Disclosure

| | Modeled | | | | | | Empirical (DSC) | |
|---|---|---|---|---|---|---|---|---|
| Alloy | Liquidus (K) | Solidus (K) | Liquid @ solidus + 25 | Mushy Zone (K) | Total Hard @ 1300K | Graphite @ 1300K | Liquidus (K) | Solidus (K) |
| Standard 1 | 1715 | 1580 | 9% | 135 | 0 | 0 | 1779 | 1748 |
| Standard 2 | 1745 | 1645 | 11% | 100 | 0 | 0 | 1781 | 1725 |

TABLE 4

List of Modeled Thermodynamic Criterion for Alloys that Meet the Embodiments of this Disclosure with 4 wt % Oxygen

| | | Modeled | | | |
|---|---|---|---|---|---|
| Alloy | Oxygen | Mol % Corundum @ 1300K | Corundum Al wt % @ 1300K | Mol % Spinel @ 1000k | Spinel Al wt % @ 1000K |
| P111-X7 | 4 wt % | 14 | 52.9 | 20 | 29.78 |

The sixth equilibrium thermodynamic criterion relates to the equilibrium or near equilibrium $FeAl_2O_4$ spinel phase content of an alloy when combined with 4 wt % (or about 4 wt %) oxygen, which can be brought into the alloy system via a thermal spraying process. This criterion can relate to the oxide hardness in a coating with increased spinel content correlated to an increase in oxide hardness compared to Wustite and Magnetite Fe oxide phases. In some applications, this may improve wear performance. In some embodiments of this disclosure, the total spinel phase at 1000K (or about 1000K) is between 10 and 25 mol % (or between about 10 and about 25 mol %).

The seventh equilibrium thermodynamic criterion is the sum of all Al rich oxide phase mole fractions including but not limited to spinel, corundum, and mullite present at 1300K under equilibrium conditions with the addition of 4 wt % (or about 4 wt %) oxygen, where aluminum rich is >1.0 wt % Al in the oxide. This criterion will be known as total aluminum rich oxide mole fraction. The alloy P111-X7 with 4 wt % oxygen, the total aluminum rich oxide mole fraction is 14 mol %.

In some embodiments of this disclosure, the total aluminum rich oxide phase at 1300K (or about 1300K) is between 5 and 35 mol % (or between about 5 and about 35 mol %). In some embodiments of this disclosure, the total aluminum rich oxide phase at 1300K (or about 1.300K) is between 7.5 and 30 mol % (or between about 7.5 and about 30 mol %). In some embodiments of this disclosure, the total aluminum rich oxide phase at 1300K (or about 1300K) is between 10 and 25 mol % (or between about 10 and about 25 mol %).

In some embodiments, alloys may meet only the sixth and seventh thermodynamic criteria. For example, alloys having carbon, aluminum, iron, and less than 1% other elements may meet these criteria. In some embodiments, alloys may meet only the first through fifth thermodynamic criteria. For example, alloys having boron, carbon, and iron may meet these criteria. In some embodiments, alloys may meet all of the thermodynamic criteria. In some embodiments, alloys may meet one or more of the thermodynamic criteria.

Microstructural Criteria

Embodiments of alloys of the disclosure can be fully described by certain microstructural criteria. The alloys can meet some, or all, of the described microstructural criteria.

The first microstructural criteria is the bulk hardness of a plasma sprayed coating which correlates to the wear performance in abrasive and sliding wear applications. The bulk hardness is measured as the Vickers hardness using 300 gf load in the middle 80% of a coating in cross section.

In some embodiments of this disclosure, the bulk coating hardness after deposition can be between 290 HV0.3 and 600 HV0.3 (or between about 290 HV0.3 and about 600 HV0.3).

The second microstructural criterion is the individual particle hardness of a plasma sprayed coating. This criterion correlates to wear performance with higher particle hardness being correlated with better wear performance.

In some embodiments of this disclosure, the individual particle hardness after deposition can be between 550 HV0.1 and 950 HV0.1 (or between about 550 HV0.1 and about 950 HV0.1).

TABLE 4

Hardness data for Standard alloys outside of this disclosure and X2-X7 alloys described in the embodiments of this disclosure.

| Alloy | HV0.3 | HV 0.1 |
|---|---|---|
| Standard 1 | 338 | 504 |
| Standard 2 | 425 | |
| P111-X2 | 292 | 612 |
| P111-X3 | 436 | 686 |
| P111-X4 | 412 | 690 |
| P111-X5 | 461 | 744 |
| P111-X6 | 552 | 933 |
| P111-X7 | 499 | |

The third microstructural criterion is the sum of the volume fractions of all borides, carbides, and silicides. This is known as total hard phases.

In some embodiments of this disclosure, the total hard phases is between 5 and 35 vol % (or between about 5 and about 35 vol %). In some embodiments of this disclosure, the total hard phases is between 7.5 and 30 vol % (or between about 7.5 and about 30 vol %). In some embodiments of this disclosure, the total hard phases is between 7.5 and 25 vol % (or between about 7.5 and about 25 vol %). In some embodiments of this disclosure, the total hard phases is between 9 and 25 vol % (or between about 9 and about 25 vol %).

The fourth microstructural criterion relates to the $FeAl_2O_4$ spinel phase content of an alloy when combined with 4 wt % (or about 4 wt %) oxygen, which can be brought into the alloy system via a thermal spraying process. In some embodiments, the alloy may have an aluminum rich oxide, including one or more of a spinel, corundum, and mullite.

The fourth microstructural criterion is the sum of all Fe and Al bearing spinel phase mole fractions including $FeAl_2O_4$ with the addition of 4 wt % (or about 4 wt %) oxygen. This criterion will be known as total spinel mole fraction.

In some embodiments of this disclosure, the total spinel phase is between 5 and 35 vol % (or between about 5 and about 35 vol %). In some embodiments of this disclosure, the total spinel phase is between 7.5 and 30 vol % (or between about 7.5 and about 30 vol %). In some embodiments of this disclosure, the total spinel phase is between 10 and 25 vol % (or between about 10 and about 25 vol %).

The fifth microstructural criterion is the sum of all Al rich oxide phase mole fractions including but not limited to spinel, corundum, and mullite with the addition of 4 wt % (or about 4 wt %) oxygen, where aluminum rich is >10 wt % Al in the oxide. This criterion will be known as total aluminum rich oxide mole fraction.

In some embodiments of this disclosure, the total aluminum rich oxide phase is between 5 and 35 vol % (or between about 5 and about 35 vol %). In some embodiments of this disclosure, the total aluminum rich oxide phase is between 7.5 and 30 vol % (or between about 7.5 and about 30 vol %). In some embodiments of this disclosure, the total aluminum rich oxide phase is between 10 and 25 vol % (or between about 10 and about 25 vol %).

In some embodiments, alloys may meet only the first, second, fourth, and fifth microstructural criteria. For example, alloys having carbon, aluminum, iron, and less than 1% other elements may meet these criteria. In some embodiments, alloys may meet only the third microstructural criteria. For example, alloys having boron, carbon, and iron may meet these criteria. In some embodiments, alloys may meet all of the microstructural criteria. In some embodiments, alloys may meet one or more of the microstructural criteria.

The disclosed composition listing provides a list of alloys that meet one or more criteria of this disclosure.

Applications

The alloys described in this disclosure can be used in a variety of applications and industries, Some non-limiting examples of applications of use include: vehicles, engines, cylinders.

From the foregoing description, it will be appreciated that inventive iron-based alloys and methods of use are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about". "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 4 | 4 | 75 | 2 | 15 | 24.6% | 89.3% | 1330 | 2000 | 670 |
| 4 | 3.7 | 75.3 | 2 | 15 | 24.8% | 90.0% | 1330 | 2000 | 670 |
| 3.9 | 3.6 | 75.5 | 2 | 15 | 24.9% | 89.8% | 1330 | 2000 | 670 |
| 3.4 | 3.9 | 75.7 | 2 | 15 | 18.4% | 87.4% | 1310 | 2000 | 690 |
| 3.5 | 3.7 | 75.8 | 2 | 15 | 18.5% | 88.0% | 1310 | 2000 | 690 |
| 3.5 | 3.6 | 75.9 | 2 | 15 | 18.5% | 88.3% | 1310 | 2000 | 690 |
| 3.4 | 3.6 | 76 | 2 | 15 | 18.6% | 88.2% | 1310 | 2000 | 690 |
| 3.1 | 3.8 | 76.1 | 2 | 15 | 20.6% | 87.5% | 1310 | 2000 | 690 |
| 4 | 2.9 | 76.1 | 2 | 15 | 25.3% | 92.0% | 1330 | 2000 | 670 |
| 3.6 | 3.2 | 76.2 | 2 | 15 | 18.6% | 89.5% | 1310 | 2000 | 690 |
| 2.9 | 3.8 | 76.3 | 2 | 15 | 25.8% | 87.5% | 1315 | 2000 | 685 |
| 3.8 | 2.9 | 76.3 | 2 | 15 | 25.4% | 91.0% | 1330 | 2000 | 670 |
| 3 | 3.6 | 76.4 | 2 | 15 | 24.2% | 88.1% | 1315 | 2000 | 685 |
| 3.8 | 2.8 | 76.4 | 2 | 15 | 25.5% | 91.3% | 1330 | 2000 | 670 |
| 2.9 | 3.6 | 76.5 | 2 | 15 | 26.5% | 88.1% | 1315 | 2000 | 685 |
| 3.7 | 2.8 | 76.5 | 2 | 15 | 20.1% | 90.7% | 1315 | 2000 | 685 |
| 2.6 | 3.8 | 76.6 | 2 | 15 | 25.3% | 87.4% | 1315 | 2000 | 685 |
| 3.5 | 2.9 | 76.6 | 2 | 15 | 20.2% | 90.4% | 1315 | 2000 | 685 |
| 4 | 2.4 | 76.6 | 2 | 15 | 25.6% | 93.4% | 1330 | 2000 | 670 |
| 3.1 | 3.2 | 76.7 | 2 | 15 | 23.0% | 89.3% | 1315 | 2000 | 685 |
| 3.7 | 2.6 | 76.7 | 2 | 15 | 20.2% | 91.4% | 1315 | 2000 | 685 |
| 2.4 | 3.8 | 76.8 | 2 | 15 | 20.4% | 87.3% | 1315 | 2000 | 685 |
| 3.3 | 2.9 | 76.8 | 2 | 15 | 20.3% | 90.3% | 1315 | 2000 | 685 |
| 3.8 | 2.4 | 76.8 | 2 | 15 | 25.8% | 92.3% | 1330 | 2000 | 670 |
| 2.6 | 3.5 | 76.9 | 2 | 15 | 25.9% | 88.3% | 1315 | 2000 | 685 |
| 3.3 | 2.8 | 76.9 | 2 | 15 | 20.3% | 90.6% | 1315 | 2000 | 685 |
| 3.8 | 2.3 | 76.9 | 2 | 15 | 25.8% | 92.6% | 1330 | 2000 | 670 |
| 2.6 | 3.4 | 77 | 2 | 15 | 26.1% | 88.6% | 1315 | 2000 | 685 |
| 3.2 | 3.8 | 77 | 1 | 15 | 15.2% | 87.6% | 1315 | 2000 | 685 |
| 3.7 | 2.3 | 77 | 2 | 15 | 20.4% | 92.3% | 1315 | 2000 | 685 |
| 2.2 | 3.7 | 77.1 | 2 | 15 | 15.6% | 87.5% | 1315 | 2000 | 685 |
| 3 | 3.9 | 77.1 | 2 | 14 | 32.6% | 87.1% | 1315 | 2000 | 685 |
| 3.4 | 3.5 | 77.1 | 2 | 14 | 24.1% | 88.5% | 1315 | 2000 | 685 |
| 3.9 | 3 | 77.1 | 2 | 14 | 20.0% | 90.1% | 1315 | 2000 | 685 |
| 2.4 | 3.4 | 77.2 | 2 | 15 | 21.2% | 88.5% | 1315 | 2000 | 685 |
| 3.1 | 2.7 | 77.2 | 2 | 15 | 24.5% | 90.9% | 1315 | 2000 | 685 |
| 3.5 | 2.3 | 77.2 | 2 | 15 | 20.5% | 92.2% | 1315 | 2000 | 685 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.9 | 1.9 | 77.2 | 2 | 15 | 26.0% | 94.2% | 1330 | 2000 | 670 |
| 2.2 | 3.5 | 77.3 | 2 | 15 | 15.9% | 88.1% | 1315 | 2000 | 685 |
| 2.9 | 2.8 | 77.3 | 2 | 15 | 29.1% | 90.5% | 1315 | 2000 | 685 |
| 3.3 | 2.4 | 77.3 | 2 | 15 | 20.6% | 91.9% | 1315 | 2000 | 685 |
| 3.7 | 4 | 77.3 | 2 | 13 | 24.6% | 87.0% | 1315 | 2000 | 685 |
| 4 | 1.7 | 77.3 | 2 | 15 | 26.1% | 95.2% | 1330 | 2000 | 670 |
| 2.5 | 3.1 | 77.4 | 2 | 15 | 24.3% | 89.5% | 1315 | 2000 | 685 |
| 2.9 | 3.7 | 77.4 | 2 | 14 | 33.3% | 87.7% | 1315 | 2000 | 685 |
| 3.3 | 3.3 | 77.4 | 2 | 14 | 27.1% | 89.0% | 1315 | 2000 | 685 |
| 3.7 | 3.9 | 77.4 | 2 | 13 | 24.9% | 87.3% | 1315 | 2000 | 685 |
| 4 | 1.6 | 77.4 | 2 | 15 | 26.2% | 95.5% | 1330 | 2000 | 670 |
| 2.4 | 3.1 | 77.5 | 2 | 15 | 21.8% | 89.4% | 1315 | 2000 | 685 |
| 2.8 | 2.7 | 77.5 | 2 | 15 | 31.6% | 90.8% | 1315 | 2000 | 685 |
| 3.2 | 3.3 | 77.5 | 1 | 15 | 16.6% | 89.1% | 1315 | 2000 | 685 |
| 3.6 | 1.9 | 77.5 | 2 | 15 | 20.6% | 93.5% | 1315 | 2000 | 685 |
| 3.8 | 3.7 | 77.5 | 0 | 15 | 79.3% | 88.5% | 1400 | 2000 | 600 |
| 1.5 | 3.9 | 77.6 | 2 | 15 | 85.2% | 87.1% | 1340 | 2000 | 660 |
| 2.5 | 3.9 | 77.6 | 2 | 14 | 26.9% | 86.9% | 1315 | 2000 | 685 |
| 2.9 | 3.5 | 77.6 | 2 | 14 | 33.1% | 88.3% | 1315 | 2000 | 685 |
| 3.3 | 3.1 | 77.6 | 2 | 14 | 27.7% | 89.6% | 1315 | 2000 | 685 |
| 3.6 | 2.8 | 77.6 | 2 | 14 | 21.4% | 90.6% | 1315 | 2000 | 685 |
| 3.9 | 2.5 | 77.6 | 2 | 14 | 20.3% | 91.7% | 1315 | 2000 | 685 |
| 1.6 | 3.7 | 77.7 | 2 | 15 | 75.2% | 87.5% | 1335 | 2000 | 665 |
| 2.5 | 3.8 | 77.7 | 1 | 15 | 28.7% | 87.3% | 1330 | 2000 | 670 |
| 2.9 | 2.4 | 77.7 | 2 | 15 | 30.4% | 91.8% | 1315 | 2000 | 685 |
| 3.3 | 2 | 77.7 | 2 | 15 | 21.7% | 93.2% | 1315 | 2000 | 685 |
| 3.5 | 3.8 | 77.7 | 2 | 13 | 30.0% | 87.5% | 1315 | 2000 | 685 |
| 3.8 | 3.5 | 77.7 | 2 | 13 | 23.7% | 88.5% | 1315 | 2000 | 685 |
| 1.2 | 4 | 77.8 | 2 | 15 | 85.9% | 87.2% | 1345 | 2000 | 655 |
| 2.6 | 3.6 | 77.8 | 2 | 14 | 28.3% | 87.9% | 1315 | 2000 | 685 |
| 3 | 3.2 | 77.8 | 2 | 14 | 34.5% | 89.2% | 1315 | 2000 | 685 |
| 3.3 | 2.9 | 77.8 | 1 | 15 | 15.3% | 90.3% | 1315 | 2000 | 685 |
| 3.6 | 1.6 | 77.8 | 2 | 15 | 20.8% | 94.5% | 1315 | 1980 | 665 |
| 3.8 | 3.4 | 77.8 | 0 | 15 | 80.3% | 89.2% | 1400 | 2000 | 600 |
| 1.2 | 3.9 | 77.9 | 2 | 15 | 86.2% | 87.5% | 1345 | 2000 | 655 |
| 2.2 | 3.9 | 77.9 | 2 | 14 | 36.2% | 86.8% | 1320 | 2000 | 680 |
| 2.6 | 2.5 | 77.9 | 2 | 15 | 28.1% | 91.4% | 1315 | 2000 | 685 |
| 2.9 | 3.2 | 77.9 | 2 | 14 | 32.9% | 89.2% | 1315 | 2000 | 685 |
| 3.2 | 2.9 | 77.9 | 1 | 15 | 16.9% | 90.3% | 1315 | 2000 | 685 |
| 3.4 | 3.7 | 77.9 | 2 | 13 | 32.8% | 87.8% | 1315 | 2000 | 685 |
| 3.7 | 2.4 | 77.9 | 2 | 14 | 20.4% | 91.9% | 1315 | 2000 | 685 |
| 1.6 | 3.4 | 78 | 2 | 15 | 75.4% | 88.4% | 1335 | 2000 | 665 |
| 2.3 | 3.7 | 78 | 1 | 15 | 36.8% | 87.5% | 1335 | 2000 | 665 |
| 3 | 3 | 78 | 2 | 14 | 34.4% | 89.9% | 1315 | 2000 | 685 |
| 3.2 | 1.8 | 78 | 2 | 15 | 24.7% | 93.8% | 1315 | 2000 | 685 |
| 3.4 | 2.6 | 78 | 2 | 14 | 26.8% | 91.2% | 1315 | 2000 | 685 |
| 3.7 | 1.3 | 78 | 2 | 15 | 20.9% | 95.5% | 1315 | 1885 | 570 |
| 3.9 | 3.1 | 78 | 0 | 15 | 80.2% | 90.5% | 1400 | 2000 | 600 |
| 1.4 | 3.5 | 78.1 | 2 | 15 | 87.2% | 88.4% | 1340 | 2000 | 660 |
| 2.2 | 2.7 | 78.1 | 2 | 15 | 17.5% | 90.6% | 1315 | 2000 | 685 |
| 2.5 | 3.4 | 78.1 | 1 | 15 | 30.2% | 88.5% | 1330 | 2000 | 670 |
| 2.8 | 3.1 | 78.1 | 2 | 14 | 31.1% | 89.5% | 1315 | 2000 | 685 |
| 3 | 3.9 | 78.1 | 0 | 15 | 23.7% | 88.2% | 1360 | 2000 | 640 |
| 3.2 | 3.7 | 78.1 | 2 | 13 | 31.7% | 87.7% | 1315 | 2000 | 685 |
| 3.5 | 2.4 | 78.1 | 2 | 14 | 24.9% | 91.9% | 1315 | 2000 | 685 |
| 4 | 1.9 | 78.1 | 2 | 14 | 20.5% | 93.6% | 1315 | 2000 | 685 |
| 1.4 | 3.4 | 78.2 | 2 | 15 | 87.5% | 88.7% | 1340 | 2000 | 660 |
| 2.4 | 3.4 | 78.2 | 2 | 14 | 24.7% | 88.4% | 1315 | 2000 | 685 |
| 2.8 | 2 | 78.2 | 2 | 15 | 34.1% | 93.1% | 1315 | 2000 | 685 |
| 3.1 | 3.7 | 78.2 | 0 | 15 | 21.0% | 88.7% | 1360 | 2000 | 640 |
| 3.4 | 1.4 | 78.2 | 2 | 15 | 21.0% | 95.2% | 1315 | 1905 | 590 |
| 3.6 | 3.2 | 78.2 | 2 | 13 | 29.4% | 89.3% | 1315 | 2000 | 685 |
| 3.9 | 1.9 | 78.2 | 2 | 14 | 20.6% | 93.6% | 1315 | 2000 | 685 |
| 4 | 0.8 | 78.2 | 2 | 15 | 22.4% | 97.8% | 1330 | 1750 | 420 |
| 1.7 | 3 | 78.3 | 2 | 15 | 37.0% | 89.5% | 1330 | 2000 | 670 |
| 2.1 | 3.6 | 78.3 | 1 | 15 | 52.5% | 87.8% | 1340 | 2000 | 660 |
| 2.4 | 3.3 | 78.3 | 2 | 14 | 24.6% | 88.7% | 1315 | 2000 | 685 |
| 2.7 | 4 | 78.3 | 1 | 14 | 41.9% | 86.7% | 1335 | 2000 | 665 |
| 2.9 | 2.8 | 78.3 | 2 | 14 | 32.5% | 90.5% | 1315 | 2000 | 685 |
| 3.1 | 2.6 | 78.3 | 2 | 14 | 34.3% | 91.1% | 1315 | 2000 | 685 |
| 3.3 | 2.4 | 78.3 | 1 | 15 | 16.7% | 91.9% | 1315 | 2000 | 685 |
| 3.8 | 2.9 | 78.3 | 2 | 13 | 25.4% | 90.3% | 1315 | 2000 | 685 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.9 | 0.8 | 78.3 | 2 | 15 | 24.8% | 97.3% | 1330 | 1745 | 415 |
| 1.7 | 3.9 | 78.4 | 2 | 14 | 43.9% | 86.6% | 1330 | 2000 | 670 |
| 2.2 | 2.4 | 78.4 | 2 | 15 | 18.2% | 91.6% | 1315 | 2000 | 685 |
| 2.7 | 2.9 | 78.4 | 2 | 14 | 29.3% | 90.1% | 1315 | 2000 | 685 |
| 2.9 | 1.7 | 78.4 | 2 | 15 | 32.7% | 94.1% | 1315 | 1975 | 660 |
| 3.3 | 1.3 | 78.4 | 2 | 15 | 23.8% | 95.5% | 1315 | 1865 | 550 |
| 3.5 | 3.1 | 78.4 | 1 | 14 | 15.6% | 89.7% | 1315 | 2000 | 685 |
| 3.7 | 3.9 | 78.4 | 2 | 12 | 33.6% | 87.2% | 1315 | 2000 | 685 |
| 3.9 | 2.7 | 78.4 | 0 | 15 | 81.6% | 91.6% | 1400 | 2000 | 600 |
| 0.7 | 3.9 | 78.4 | 2 | 15 | 57.6% | 88.2% | 1350 | 2000 | 650 |
| 1.5 | 4 | 78.5 | 2 | 14 | 36.3% | 86.2% | 1330 | 2000 | 670 |
| 1.9 | 3.6 | 78.5 | 2 | 14 | 37.5% | 87.6% | 1325 | 2000 | 675 |
| 2.3 | 3.2 | 78.5 | 1 | 15 | 39.0% | 89.1% | 1335 | 2000 | 665 |
| 2.5 | 4 | 78.5 | 0 | 15 | 39.0% | 88.4% | 1360 | 2000 | 640 |
| 2.7 | 3.8 | 78.5 | 1 | 14 | 42.7% | 87.3% | 1335 | 2000 | 665 |
| 2.9 | 2.6 | 78.5 | 2 | 14 | 32.4% | 91.1% | 1315 | 2000 | 685 |
| 3.1 | 2.4 | 78.5 | 2 | 14 | 35.0% | 91.8% | 1315 | 2000 | 685 |
| 3.5 | 2 | 78.5 | 2 | 14 | 26.1% | 93.2% | 1315 | 2000 | 685 |
| 3.6 | 3.9 | 78.5 | 0 | 14 | 16.2% | 88.0% | 1360 | 2000 | 640 |
| 4 | 3.5 | 78.5 | 1 | 13 | 15.3% | 88.6% | 1315 | 2000 | 685 |
| 1.2 | 3.2 | 78.6 | 2 | 15 | 88.7% | 89.6% | 1345 | 2000 | 655 |
| 2.1 | 2.3 | 78.6 | 2 | 15 | 15.8% | 91.9% | 1315 | 2000 | 685 |
| 2.4 | 3 | 78.6 | 1 | 15 | 42.1% | 89.7% | 1335 | 2000 | 665 |
| 2.7 | 3.7 | 78.6 | 1 | 14 | 43.1% | 87.6% | 1335 | 2000 | 665 |
| 2.9 | 2.5 | 78.6 | 2 | 14 | 32.3% | 91.4% | 1315 | 2000 | 685 |
| 3.3 | 1.1 | 78.6 | 2 | 15 | 24.4% | 96.2% | 1315 | 1795 | 480 |
| 3.4 | 4 | 78.6 | 2 | 12 | 28.8% | 86.8% | 1315 | 2000 | 685 |
| 3.6 | 2.8 | 78.6 | 1 | 14 | 16.9% | 90.6% | 1315 | 2000 | 685 |
| 3.8 | 1.6 | 78.6 | 2 | 14 | 20.8% | 94.5% | 1315 | 1960 | 645 |
| 4 | 1.4 | 78.6 | 2 | 14 | 20.8% | 95.2% | 1315 | 1905 | 590 |
| 0.8 | 3.6 | 78.6 | 2 | 15 | 66.3% | 88.9% | 1350 | 2000 | 650 |
| 1.4 | 3.9 | 78.7 | 2 | 14 | 68.1% | 86.5% | 1335 | 2000 | 665 |
| 1.8 | 3.5 | 78.7 | 1 | 15 | 69.2% | 88.0% | 1345 | 2000 | 655 |
| 2.2 | 3.1 | 78.7 | 1 | 15 | 49.9% | 89.4% | 1340 | 2000 | 660 |
| 2.4 | 2.9 | 78.7 | 2 | 14 | 24.1% | 90.0% | 1315 | 2000 | 685 |
| 2.6 | 1.7 | 78.7 | 2 | 15 | 30.0% | 94.0% | 1315 | 1955 | 640 |
| 2.7 | 3.6 | 78.7 | 2 | 13 | 23.3% | 87.8% | 1315 | 2000 | 685 |
| 3.1 | 1.2 | 78.7 | 2 | 15 | 29.1% | 95.8% | 1315 | 1820 | 505 |
| 3.2 | 3.1 | 78.7 | 0 | 15 | 19.8% | 90.5% | 1360 | 2000 | 640 |
| 3.5 | 3.8 | 78.7 | 2 | 12 | 30.3% | 87.4% | 1315 | 2000 | 685 |
| 3.7 | 2.6 | 78.7 | 1 | 14 | 15.7% | 91.3% | 1315 | 2000 | 685 |
| 0.4 | 3.9 | 78.7 | 2 | 15 | 37.0% | 88.6% | 1355 | 2000 | 645 |
| 1.2 | 4 | 78.8 | 2 | 14 | 61.8% | 86.1% | 1335 | 2000 | 665 |
| 2 | 3.2 | 78.8 | 1 | 15 | 57.8% | 89.0% | 1340 | 2000 | 660 |
| 2.2 | 4 | 78.8 | 2 | 13 | 58.1% | 86.4% | 1325 | 2000 | 675 |
| 2.6 | 1.6 | 78.8 | 2 | 15 | 30.2% | 94.4% | 1315 | 1925 | 610 |
| 2.7 | 3.5 | 78.8 | 2 | 13 | 23.2% | 88.1% | 1315 | 2000 | 685 |
| 3.1 | 1.1 | 78.8 | 2 | 15 | 29.5% | 96.1% | 1315 | 1780 | 465 |
| 3.2 | 3 | 78.8 | 0 | 15 | 20.2% | 90.8% | 1360 | 2000 | 640 |
| 3.3 | 3.9 | 78.8 | 0 | 14 | 26.6% | 88.3% | 1360 | 2000 | 640 |
| 3.5 | 2.7 | 78.8 | 1 | 14 | 15.1% | 90.9% | 1315 | 2000 | 685 |
| 3.6 | 3.6 | 78.8 | 0 | 14 | 17.3% | 88.9% | 1360 | 2000 | 640 |
| 3.8 | 0.4 | 78.8 | 2 | 15 | 19.6% | 98.6% | 1315 | 1595 | 280 |
| 4 | 3.2 | 78.8 | 1 | 13 | 16.1% | 89.5% | 1315 | 2000 | 685 |
| 1.1 | 4 | 78.9 | 1 | 15 | 86.6% | 87.3% | 1360 | 2000 | 640 |
| 1.4 | 3.7 | 78.9 | 2 | 14 | 68.2% | 87.1% | 1335 | 2000 | 665 |
| 1.8 | 3.3 | 78.9 | 1 | 15 | 69.9% | 88.6% | 1345 | 2000 | 655 |
| 2.1 | 4 | 78.9 | 1 | 14 | 62.5% | 86.5% | 1345 | 2000 | 655 |
| 2.3 | 2.8 | 78.9 | 1 | 15 | 40.9% | 90.4% | 1335 | 2000 | 665 |
| 2.6 | 3.5 | 78.9 | 1 | 14 | 46.8% | 88.2% | 1335 | 2000 | 665 |
| 2.8 | 2.3 | 78.9 | 1 | 15 | 31.0% | 92.1% | 1325 | 2000 | 675 |
| 3.1 | 3 | 78.9 | 2 | 13 | 29.4% | 89.8% | 1315 | 2000 | 685 |
| 3.2 | 3.9 | 78.9 | 1 | 13 | 37.4% | 87.1% | 1330 | 2000 | 670 |
| 3.5 | 2.6 | 78.9 | 2 | 13 | 33.8% | 91.2% | 1315 | 2000 | 685 |
| 3.6 | 0.5 | 78.9 | 2 | 15 | 21.4% | 98.2% | 1315 | 1620 | 305 |
| 4 | 3.1 | 78.9 | 2 | 12 | 29.3% | 89.7% | 1315 | 2000 | 685 |
| 1.1 | 2.9 | 79 | 2 | 15 | 83.1% | 90.6% | 1345 | 2000 | 655 |
| 1.7 | 3.3 | 79 | 2 | 14 | 46.4% | 88.5% | 1330 | 2000 | 670 |
| 2 | 4 | 79 | 2 | 13 | 74.4% | 86.3% | 1330 | 2000 | 670 |
| 2.3 | 3.7 | 79 | 0 | 15 | 47.0% | 89.2% | 1360 | 2000 | 640 |
| 2.5 | 3.5 | 79 | 1 | 14 | 51.8% | 88.2% | 1340 | 2000 | 660 |
| 2.8 | 3.2 | 79 | 0 | 15 | 33.7% | 90.6% | 1360 | 2000 | 640 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3 | 3 | 79 | 2 | 13 | 27.8% | 89.8% | 1315 | 2000 | 685 |
| 3.1 | 3.9 | 79 | 1 | 13 | 41.7% | 87.1% | 1335 | 2000 | 665 |
| 3.2 | 3.8 | 79 | 2 | 12 | 25.3% | 87.3% | 1315 | 2000 | 685 |
| 3.3 | 0.7 | 79 | 2 | 15 | 25.6% | 97.5% | 1315 | 1670 | 355 |
| 3.5 | 3.5 | 79 | 1 | 13 | 16.8% | 88.4% | 1320 | 2000 | 680 |
| 3.7 | 1.3 | 79 | 2 | 14 | 23.3% | 95.5% | 1315 | 1855 | 540 |
| 3.9 | 2.1 | 79 | 0 | 15 | 83.8% | 93.1% | 1400 | 2000 | 600 |
| 4 | 0 | 79 | 2 | 15 | 20.2% | 100.0% | 1350 | 1455 | 105 |
| 1.1 | 2.8 | 79.1 | 2 | 15 | 83.3% | 90.9% | 1345 | 2000 | 655 |
| 1.4 | 3.5 | 79.1 | 1 | 15 | 87.7% | 88.4% | 1355 | 2000 | 645 |
| 1.7 | 3.2 | 79.1 | 2 | 14 | 46.8% | 88.8% | 1330 | 2000 | 670 |
| 2.1 | 3.8 | 79.1 | 1 | 14 | 63.4% | 87.1% | 1345 | 2000 | 655 |
| 2.3 | 2.6 | 79.1 | 1 | 15 | 41.9% | 91.0% | 1335 | 2000 | 665 |
| 2.6 | 3.3 | 79.1 | 1 | 14 | 47.6% | 88.8% | 1335 | 2000 | 665 |
| 2.8 | 2.1 | 79.1 | 1 | 15 | 30.8% | 92.7% | 1325 | 2000 | 675 |
| 3 | 3.9 | 79.1 | 0 | 14 | 37.2% | 88.6% | 1360 | 2000 | 640 |
| 3.1 | 0.8 | 79.1 | 2 | 15 | 30.5% | 97.2% | 1315 | 1685 | 370 |
| 3.4 | 2.5 | 79.1 | 2 | 13 | 34.0% | 91.5% | 1315 | 2000 | 685 |
| 3.5 | 3.4 | 79.1 | 0 | 14 | 21.6% | 89.7% | 1360 | 2000 | 640 |
| 3.9 | 3 | 79.1 | 1 | 13 | 15.7% | 90.0% | 1315 | 2000 | 685 |
| 4 | 3.9 | 79.1 | 0 | 13 | 15.7% | 88.0% | 1360 | 2000 | 640 |
| 1.3 | 3.5 | 79.2 | 1 | 15 | 87.9% | 88.5% | 1355 | 2000 | 645 |
| 1.6 | 3.2 | 79.2 | 2 | 14 | 43.1% | 88.8% | 1330 | 2000 | 670 |
| 2 | 3.8 | 79.2 | 2 | 13 | 75.4% | 86.9% | 1330 | 2000 | 670 |
| 2.2 | 2.6 | 79.2 | 1 | 15 | 51.3% | 91.0% | 1340 | 2000 | 660 |
| 2.5 | 3.3 | 79.2 | 1 | 14 | 52.7% | 88.8% | 1340 | 2000 | 660 |
| 2.7 | 2.1 | 79.2 | 1 | 15 | 36.4% | 92.7% | 1330 | 2000 | 670 |
| 2.8 | 3 | 79.2 | 0 | 15 | 34.6% | 91.3% | 1360 | 2000 | 640 |
| 2.9 | 3.9 | 79.2 | 2 | 12 | 35.0% | 86.9% | 1320 | 2000 | 680 |
| 3 | 0.8 | 79.2 | 2 | 15 | 33.1% | 97.2% | 1315 | 1675 | 360 |
| 3.2 | 1.6 | 79.2 | 1 | 15 | 15.2% | 94.5% | 1315 | 1945 | 630 |
| 3.3 | 1.5 | 79.2 | 2 | 14 | 32.9% | 94.8% | 1315 | 1900 | 585 |
| 3.4 | 2.4 | 79.2 | 0 | 15 | 15.4% | 92.5% | 1360 | 2000 | 640 |
| 3.5 | 3.3 | 79.2 | 0 | 14 | 22.0% | 90.0% | 1360 | 2000 | 640 |
| 3.7 | 2.1 | 79.2 | 2 | 13 | 30.4% | 92.8% | 1315 | 2000 | 685 |
| 3.9 | 1.9 | 79.2 | 0 | 15 | 84.7% | 93.7% | 1400 | 2000 | 600 |
| 4 | 2.8 | 79.2 | 2 | 12 | 30.2% | 90.6% | 1315 | 2000 | 685 |
| 1.2 | 2.5 | 79.3 | 2 | 15 | 91.2% | 91.7% | 1345 | 2000 | 655 |
| 1.5 | 3.2 | 79.3 | 1 | 15 | 88.5% | 89.1% | 1355 | 2000 | 645 |
| 1.9 | 3.8 | 79.3 | 1 | 14 | 69.5% | 87.0% | 1345 | 2000 | 655 |
| 2.1 | 1.6 | 79.3 | 2 | 15 | 17.4% | 94.3% | 1315 | 1890 | 575 |
| 2.4 | 2.3 | 79.3 | 2 | 14 | 23.5% | 91.9% | 1315 | 2000 | 685 |
| 2.6 | 1.1 | 79.3 | 2 | 15 | 31.5% | 96.1% | 1315 | 1750 | 435 |
| 2.8 | 3.9 | 79.3 | 1 | 13 | 52.5% | 87.0% | 1340 | 2000 | 660 |
| 2.9 | 3.8 | 79.3 | 2 | 12 | 35.0% | 87.2% | 1320 | 2000 | 680 |
| 3.2 | 1.5 | 79.3 | 1 | 15 | 15.1% | 94.8% | 1315 | 1910 | 595 |
| 3.3 | 1.4 | 79.3 | 2 | 14 | 33.2% | 95.1% | 1315 | 1865 | 550 |
| 3.5 | 3.2 | 79.3 | 2 | 12 | 29.7% | 89.2% | 1315 | 2000 | 685 |
| 3.7 | 2 | 79.3 | 1 | 14 | 17.4% | 93.2% | 1315 | 2000 | 685 |
| 3.9 | 3.8 | 79.3 | 2 | 11 | 30.4% | 87.5% | 1315 | 2000 | 685 |
| 0.4 | 3.3 | 79.3 | 2 | 15 | 37.6% | 90.4% | 1355 | 2000 | 645 |
| 1.2 | 3.4 | 79.4 | 2 | 14 | 62.1% | 88.0% | 1335 | 2000 | 665 |
| 1.6 | 2 | 79.4 | 2 | 15 | 34.0% | 92.8% | 1330 | 1980 | 650 |
| 1.9 | 2.7 | 79.4 | 2 | 14 | 40.7% | 90.5% | 1325 | 2000 | 675 |
| 2.2 | 3.4 | 79.4 | 1 | 14 | 60.2% | 88.3% | 1340 | 2000 | 660 |
| 2.4 | 2.2 | 79.4 | 1 | 15 | 45.3% | 92.3% | 1335 | 2000 | 665 |
| 2.5 | 3.1 | 79.4 | 0 | 15 | 43.1% | 91.3% | 1360 | 2000 | 640 |
| 2.7 | 1.9 | 79.4 | 1 | 15 | 37.2% | 93.4% | 1330 | 2000 | 670 |
| 2.8 | 1.8 | 79.4 | 2 | 14 | 29.9% | 93.7% | 1315 | 1960 | 645 |
| 2.9 | 2.7 | 79.4 | 1 | 14 | 39.6% | 90.8% | 1330 | 2000 | 670 |
| 3 | 2.6 | 79.4 | 0 | 15 | 29.1% | 92.4% | 1360 | 2000 | 640 |
| 3.1 | 3.5 | 79.4 | 1 | 13 | 43.3% | 88.3% | 1335 | 2000 | 665 |
| 3.2 | 3.4 | 79.4 | 0 | 14 | 32.2% | 90.0% | 1360 | 2000 | 640 |
| 3.4 | 1.2 | 79.4 | 1 | 15 | 17.6% | 95.8% | 1315 | 1820 | 505 |
| 3.5 | 1.1 | 79.4 | 2 | 14 | 29.0% | 96.2% | 1315 | 1770 | 455 |
| 3.6 | 3 | 79.4 | 0 | 14 | 19.6% | 90.8% | 1360 | 2000 | 640 |
| 3.7 | 3.9 | 79.4 | 2 | 11 | 27.2% | 87.1% | 1315 | 2000 | 685 |
| 4 | 2.6 | 79.4 | 2 | 12 | 30.8% | 91.3% | 1315 | 2000 | 685 |
| 0.7 | 3.9 | 79.4 | 1 | 15 | 77.0% | 88.1% | 1360 | 2000 | 640 |
| 1.4 | 2.1 | 79.5 | 2 | 15 | 92.2% | 92.7% | 1340 | 1995 | 655 |
| 1.6 | 2.9 | 79.5 | 1 | 15 | 89.4% | 89.9% | 1355 | 2000 | 645 |
| 1.9 | 3.6 | 79.5 | 1 | 14 | 70.5% | 87.6% | 1345 | 2000 | 655 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.1 | 1.4 | 79.5 | 2 | 15 | 17.8% | 95.0% | 1315 | 1820 | 505 |
| 2.4 | 2.1 | 79.5 | 2 | 14 | 23.2% | 92.6% | 1315 | 2000 | 685 |
| 2.5 | 4 | 79.5 | 1 | 13 | 64.0% | 86.5% | 1345 | 2000 | 655 |
| 2.7 | 0.8 | 79.5 | 2 | 15 | 34.1% | 97.1% | 1315 | 1650 | 335 |
| 2.9 | 1.6 | 79.5 | 1 | 15 | 17.5% | 94.4% | 1320 | 1925 | 605 |
| 3.1 | 2.4 | 79.5 | 2 | 13 | 28.9% | 91.7% | 1315 | 2000 | 685 |
| 3.2 | 0.3 | 79.5 | 2 | 15 | 29.5% | 98.9% | 1315 | 1500 | 185 |
| 3.4 | 3.1 | 79.5 | 0 | 14 | 26.3% | 90.7% | 1360 | 2000 | 640 |
| 3.5 | 0 | 79.5 | 2 | 15 | 23.6% | 100.0% | 1325 | 1440 | 115 |
| 3.8 | 2.7 | 79.5 | 2 | 12 | 34.3% | 90.9% | 1315 | 2000 | 685 |
| 3.9 | 3.6 | 79.5 | 0 | 13 | 20.2% | 89.1% | 1360 | 2000 | 640 |
| 0.8 | 3.7 | 79.5 | 1 | 15 | 88.2% | 88.6% | 1360 | 2000 | 640 |
| 1.6 | 2.8 | 79.6 | 1 | 15 | 89.8% | 90.2% | 1355 | 2000 | 645 |
| 1.7 | 3.7 | 79.6 | 0 | 15 | 86.9% | 87.4% | 1365 | 2000 | 635 |
| 1.9 | 3.5 | 79.6 | 1 | 14 | 71.0% | 87.9% | 1345 | 2000 | 655 |
| 2.1 | 1.3 | 79.6 | 2 | 15 | 18.1% | 95.3% | 1315 | 1785 | 470 |
| 2.2 | 3.2 | 79.6 | 2 | 13 | 73.1% | 88.9% | 1330 | 2000 | 670 |
| 2.4 | 2 | 79.6 | 2 | 14 | 23.1% | 92.9% | 1315 | 1995 | 680 |
| 2.5 | 2.9 | 79.6 | 2 | 13 | 63.1% | 90.0% | 1325 | 2000 | 675 |
| 2.6 | 2.8 | 79.6 | 0 | 15 | 41.4% | 92.2% | 1360 | 2000 | 640 |
| 2.7 | 3.7 | 79.6 | 1 | 13 | 56.5% | 87.5% | 1340 | 2000 | 660 |
| 2.9 | 3.5 | 79.6 | 0 | 14 | 42.6% | 90.0% | 1360 | 2000 | 640 |
| 3 | 0.4 | 79.6 | 2 | 15 | 34.5% | 98.6% | 1315 | 1530 | 215 |
| 3.2 | 1.2 | 79.6 | 2 | 14 | 36.3% | 95.8% | 1315 | 1790 | 475 |
| 3.3 | 1.1 | 79.6 | 2 | 14 | 34.2% | 96.1% | 1315 | 1760 | 445 |
| 3.4 | 2 | 79.6 | 0 | 15 | 17.0% | 93.9% | 1360 | 2000 | 640 |
| 3.5 | 2.9 | 79.6 | 2 | 12 | 29.4% | 90.2% | 1315 | 2000 | 685 |
| 3.6 | 2.8 | 79.6 | 2 | 12 | 31.0% | 90.5% | 1315 | 2000 | 685 |
| 3.7 | 3.7 | 79.6 | 1 | 12 | 34.8% | 87.8% | 1330 | 2000 | 670 |
| 4 | 2.4 | 79.6 | 1 | 13 | 16.6% | 91.9% | 1315 | 2000 | 685 |
| 0.5 | 3.9 | 79.6 | 2 | 14 | 41.4% | 86.6% | 1350 | 2000 | 650 |
| 1.2 | 3.1 | 79.7 | 1 | 15 | 89.5% | 89.8% | 1360 | 2000 | 640 |
| 1.4 | 2.9 | 79.7 | 2 | 14 | 68.7% | 89.7% | 1335 | 2000 | 665 |
| 1.7 | 3.6 | 79.7 | 2 | 13 | 87.3% | 87.5% | 1335 | 2000 | 665 |
| 1.9 | 2.4 | 79.7 | 2 | 14 | 57.5% | 91.5% | 1330 | 2000 | 670 |
| 2.2 | 3.1 | 79.7 | 1 | 14 | 63.9% | 89.3% | 1345 | 2000 | 655 |
| 2.3 | 4 | 79.7 | 2 | 12 | 77.6% | 86.4% | 1330 | 2000 | 670 |
| 2.6 | 1.7 | 79.7 | 1 | 15 | 40.5% | 94.0% | 1330 | 1935 | 605 |
| 2.7 | 1.6 | 79.7 | 2 | 14 | 28.0% | 94.3% | 1315 | 1890 | 575 |
| 2.9 | 2.4 | 79.7 | 2 | 13 | 25.4% | 91.7% | 1315 | 2000 | 685 |
| 3 | 2.3 | 79.7 | 0 | 15 | 30.3% | 93.4% | 1360 | 2000 | 640 |
| 3.2 | 2.1 | 79.7 | 0 | 15 | 23.9% | 93.8% | 1360 | 2000 | 640 |
| 3.3 | 3 | 79.7 | 2 | 12 | 26.2% | 89.8% | 1315 | 2000 | 685 |
| 3.5 | 3.8 | 79.7 | 1 | 12 | 41.5% | 87.4% | 1335 | 2000 | 665 |
| 3.7 | 3.6 | 79.7 | 0 | 13 | 27.2% | 89.3% | 1360 | 2000 | 640 |
| 3.9 | 2.4 | 79.7 | 2 | 12 | 34.0% | 91.9% | 1315 | 2000 | 685 |
| 1.2 | 4 | 79.8 | 2 | 13 | 71.8% | 86.0% | 1340 | 2000 | 660 |
| 1.4 | 2.8 | 79.8 | 2 | 14 | 68.7% | 90.0% | 1335 | 2000 | 665 |
| 1.6 | 1.6 | 79.8 | 2 | 15 | 33.9% | 94.2% | 1330 | 1850 | 520 |
| 1.7 | 3.5 | 79.8 | 2 | 13 | 87.9% | 87.8% | 1335 | 2000 | 665 |
| 1.9 | 2.3 | 79.8 | 2 | 14 | 58.0% | 91.8% | 1330 | 2000 | 670 |
| 0.2 | 3 | 79.8 | 2 | 15 | 18.6% | 91.7% | 1355 | 2000 | 645 |
| 2.2 | 2 | 79.8 | 1 | 15 | 53.9% | 92.9% | 1340 | 2000 | 660 |
| 2.3 | 2.9 | 79.8 | 1 | 14 | 59.8% | 90.0% | 1340 | 2000 | 660 |
| 2.5 | 2.7 | 79.8 | 0 | 15 | 45.0% | 92.6% | 1360 | 2000 | 640 |
| 2.6 | 3.6 | 79.8 | 1 | 13 | 60.1% | 87.8% | 1340 | 2000 | 660 |
| 2.8 | 3.4 | 79.8 | 0 | 14 | 46.7% | 90.5% | 1360 | 2000 | 640 |
| 2.9 | 3.3 | 79.8 | 0 | 14 | 43.5% | 90.7% | 1360 | 2000 | 640 |
| 0.3 | 2.9 | 79.8 | 2 | 15 | 28.4% | 91.8% | 1355 | 2000 | 645 |
| 3.1 | 3.1 | 79.8 | 0 | 14 | 37.1% | 91.1% | 1360 | 2000 | 640 |
| 3.2 | 4 | 79.8 | 0 | 13 | 43.3% | 88.6% | 1360 | 2000 | 640 |
| 3.3 | 3.9 | 79.8 | 0 | 13 | 40.1% | 88.8% | 1360 | 2000 | 640 |
| 3.4 | 3.8 | 79.8 | 0 | 13 | 37.0% | 89.0% | 1360 | 2000 | 640 |
| 3.5 | 0.7 | 79.8 | 1 | 15 | 16.5% | 97.5% | 1315 | 1670 | 355 |
| 3.8 | 1.4 | 79.8 | 2 | 13 | 30.1% | 95.2% | 1315 | 1860 | 545 |
| 3.9 | 3.3 | 79.8 | 2 | 11 | 29.9% | 89.0% | 1315 | 2000 | 685 |
| 0.7 | 3.5 | 79.8 | 2 | 14 | 58.7% | 87.5% | 1350 | 2000 | 650 |
| 1.1 | 2 | 79.9 | 2 | 15 | 85.2% | 93.5% | 1345 | 1940 | 595 |
| 1.4 | 2.7 | 79.9 | 2 | 14 | 68.8% | 90.3% | 1335 | 2000 | 665 |
| 1.6 | 1.5 | 79.9 | 2 | 15 | 33.8% | 94.5% | 1330 | 1815 | 485 |
| 1.9 | 2.2 | 79.9 | 2 | 14 | 58.4% | 92.1% | 1330 | 2000 | 670 |
| 0.2 | 2.9 | 79.9 | 2 | 15 | 18.6% | 92.0% | 1355 | 2000 | 645 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.2 | 0.9 | 79.9 | 2 | 15 | 21.7% | 96.7% | 1315 | 1645 | 330 |
| 2.4 | 1.7 | 79.9 | 1 | 15 | 47.4% | 94.0% | 1335 | 1925 | 590 |
| 2.6 | 2.5 | 79.9 | 1 | 14 | 53.0% | 91.3% | 1340 | 2000 | 660 |
| 2.7 | 2.4 | 79.9 | 2 | 13 | 37.2% | 91.6% | 1320 | 2000 | 680 |
| 2.9 | 2.2 | 79.9 | 0 | 15 | 34.5% | 93.8% | 1360 | 2000 | 640 |
| 3.1 | 3 | 79.8 | 1 | 13 | 45.3% | 89.8% | 1335 | 2000 | 665 |
| 3.2 | 2.9 | 79.9 | 1 | 13 | 42.7% | 90.2% | 1335 | 2000 | 665 |
| 3.3 | 2.8 | 79.9 | 1 | 13 | 38.6% | 90.5% | 1330 | 2000 | 670 |
| 3.5 | 2.6 | 79.9 | 2 | 12 | 29.1% | 91.1% | 1315 | 2000 | 685 |
| 3.7 | 3.4 | 79.9 | 1 | 12 | 35.9% | 88.7% | 1330 | 2000 | 670 |
| 3.8 | 3.3 | 79.9 | 2 | 11 | 28.2% | 89.0% | 1315 | 2000 | 685 |
| 4 | 1.1 | 79.9 | 0 | 15 | 71.8% | 96.4% | 1400 | 1800 | 400 |
| 1.2 | 3.8 | 80 | 0 | 15 | 87.4% | 87.7% | 1365 | 2000 | 635 |
| 1.4 | 3.6 | 80 | 1 | 14 | 89.0% | 87.4% | 1350 | 2000 | 650 |
| 1.6 | 2.4 | 80 | 1 | 15 | 88.4% | 91.5% | 1350 | 2000 | 650 |
| 1.7 | 3.3 | 80 | 0 | 15 | 88.2% | 88.6% | 1365 | 2000 | 635 |
| 1.9 | 3.1 | 80 | 1 | 14 | 73.0% | 89.2% | 1345 | 2000 | 655 |
| 2 | 4 | 80 | 2 | 12 | 88.0% | 86.2% | 1335 | 2000 | 665 |
| 2.1 | 3.9 | 80 | 1 | 13 | 76.9% | 86.7% | 1345 | 2000 | 655 |
| 2.3 | 3.7 | 80 | 0 | 14 | 61.9% | 90.1% | 1360 | 2000 | 640 |
| 2.4 | 0.6 | 80 | 2 | 15 | 27.7% | 97.8% | 1315 | 1560 | 245 |
| 2.7 | 1.3 | 80 | 2 | 14 | 27.6% | 95.4% | 1315 | 1790 | 475 |
| 2.8 | 0.2 | 80 | 2 | 15 | 35.4% | 99.3% | 1315 | 1425 | 110 |
| 3 | 2 | 80 | 0 | 15 | 31.7% | 94.4% | 1360 | 2000 | 640 |
| 0.3 | 3.7 | 80 | 2 | 14 | 27.9% | 87.5% | 1355 | 2000 | 645 |
| 3.1 | 0.9 | 80 | 2 | 14 | 34.3% | 96.8% | 1315 | 1665 | 350 |
| 3.2 | 0.8 | 80 | 2 | 14 | 36.0% | 97.2% | 1315 | 1630 | 315 |
| 3.3 | 0.7 | 80 | 1 | 15 | 15.7% | 97.5% | 1315 | 1655 | 340 |
| 3.4 | 0.6 | 80 | 1 | 15 | 17.4% | 97.9% | 1315 | 1630 | 315 |
| 3.5 | 0.5 | 80 | 1 | 15 | 17.1% | 98.2% | 1315 | 1600 | 285 |
| 3.6 | 0.4 | 80 | 2 | 14 | 28.7% | 98.6% | 1315 | 1520 | 205 |
| 3.9 | 3.1 | 80 | 1 | 12 | 16.4% | 89.7% | 1320 | 2000 | 680 |
| 4 | 4 | 80 | 1 | 11 | 36.0% | 86.9% | 1330 | 2000 | 670 |
| 0.9 | 3.1 | 80 | 1 | 15 | 90.1% | 90.3% | 1360 | 2000 | 640 |
| 1.1 | 2.8 | 80.1 | 2 | 14 | 59.0% | 89.9% | 1335 | 2000 | 665 |
| 1.4 | 3.5 | 80.1 | 2 | 13 | 79.0% | 87.7% | 1335 | 2000 | 665 |
| 1.6 | 2.3 | 80.1 | 2 | 14 | 47.0% | 91.7% | 1330 | 2000 | 670 |
| 1.9 | 3 | 80.1 | 2 | 13 | 84.8% | 89.4% | 1335 | 2000 | 665 |
| 2 | 3.9 | 80.1 | 1 | 13 | 79.7% | 86.6% | 1345 | 2000 | 655 |
| 2.2 | 2.7 | 80.1 | 0 | 15 | 55.8% | 92.4% | 1360 | 2000 | 640 |
| 2.3 | 3.6 | 80.1 | 1 | 13 | 72.5% | 87.7% | 1345 | 2000 | 655 |
| 2.5 | 3.4 | 80.1 | 0 | 14 | 57.6% | 90.8% | 1360 | 2000 | 640 |
| 2.8 | 0.1 | 80.1 | 2 | 15 | 28.7% | 99.6% | 1315 | 1425 | 110 |
| 2.9 | 1 | 80.1 | 2 | 14 | 30.9% | 96.4% | 1315 | 1695 | 380 |
| 2.9 | 0 | 80.1 | 2 | 15 | 26.6% | 100.0% | 1325 | 1430 | 105 |
| 3.1 | 2.8 | 80.1 | 0 | 14 | 38.5% | 92.1% | 1360 | 2000 | 640 |
| 3.3 | 2.6 | 80.1 | 0 | 14 | 32.1% | 92.5% | 1360 | 2000 | 640 |
| 3.4 | 2.5 | 80.1 | 0 | 14 | 28.9% | 92.7% | 1360 | 2000 | 640 |
| 3.5 | 2.4 | 80.1 | 0 | 14 | 25.7% | 92.9% | 1360 | 2000 | 640 |
| 3.7 | 3.2 | 80.1 | 1 | 12 | 36.6% | 89.3% | 1330 | 2000 | 670 |
| 3.9 | 0 | 80.1 | 2 | 14 | 23.1% | 100.0% | 1325 | 1445 | 120 |
| 4 | 0.9 | 80.1 | 0 | 15 | 64.1% | 97.0% | 1400 | 1750 | 350 |
| 0.7 | 2.2 | 80.1 | 2 | 15 | 60.4% | 93.4% | 1350 | 1965 | 615 |
| 0.9 | 4 | 80.1 | 2 | 13 | 54.1% | 85.9% | 1340 | 2000 | 660 |
| 1.6 | 2.2 | 80.2 | 2 | 14 | 79.4% | 92.1% | 1335 | 1995 | 660 |
| 1.8 | 1 | 80.3 | 2 | 15 | 21.9% | 96.3% | 1325 | 1655 | 330 |
| 1.9 | 1.9 | 80.2 | 2 | 14 | 59.8% | 93.2% | 1330 | 1925 | 595 |
| 2 | 2.8 | 80.2 | 1 | 14 | 71.4% | 90.2% | 1345 | 2000 | 655 |
| 2.1 | 1.7 | 80.2 | 1 | 15 | 58.5% | 93.9% | 1340 | 1900 | 560 |
| 2.2 | 1.6 | 80.2 | 2 | 14 | 54.3% | 94.2% | 1325 | 1855 | 530 |
| 2.3 | 2.5 | 80.2 | 1 | 14 | 61.7% | 91.3% | 1340 | 2000 | 660 |
| 2.4 | 2.4 | 80.2 | 2 | 13 | 61.2% | 91.6% | 1325 | 2000 | 675 |
| 2.5 | 2.3 | 80.2 | 0 | 15 | 46.9% | 94.0% | 1360 | 2000 | 640 |
| 2.7 | 3.1 | 80.2 | 1 | 13 | 59.2% | 89.4% | 1340 | 2000 | 660 |
| 2.8 | 3 | 80.2 | 0 | 14 | 48.6% | 91.8% | 1360 | 2000 | 640 |
| 3 | 2.8 | 80.2 | 2 | 12 | 35.8% | 90.3% | 1320 | 2000 | 680 |
| 3.1 | 1.7 | 80.2 | 1 | 14 | 37.5% | 94.1% | 1330 | 1935 | 605 |
| 3.3 | 1.5 | 80.2 | 1 | 14 | 17.5% | 94.8% | 1320 | 1885 | 565 |
| 3.3 | 0.5 | 80.2 | 2 | 14 | 36.3% | 98.2% | 1315 | 1535 | 220 |
| 3.4 | 0.4 | 80.2 | 2 | 14 | 34.0% | 98.6% | 1315 | 1500 | 185 |
| 3.5 | 3.3 | 80.2 | 0 | 13 | 35.6% | 90.5% | 1360 | 2000 | 640 |
| 3.7 | 0.1 | 80.2 | 2 | 14 | 27.0% | 99.7% | 1315 | 1430 | 115 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.8 | 1 | 80.2 | 2 | 13 | 31.4% | 96.5% | 1315 | 1715 | 400 |
| 3.9 | 1.9 | 80.2 | 2 | 12 | 35.3% | 93.5% | 1315 | 1990 | 675 |
| 4 | 1.8 | 80.2 | 2 | 12 | 33.4% | 93.8% | 1315 | 1965 | 650 |
| 0.7 | 3.1 | 80.2 | 2 | 14 | 59.3% | 88.8% | 1350 | 2000 | 650 |
| 0.9 | 3.9 | 80.2 | 1 | 14 | 80.9% | 86.3% | 1355 | 2000 | 645 |
| 1.2 | 3.5 | 80.3 | 0 | 15 | 88.5% | 88.6% | 1365 | 2000 | 635 |
| 1.4 | 3.3 | 80.3 | 1 | 14 | 90.0% | 88.4% | 1350 | 2000 | 650 |
| 1.7 | 3 | 80.3 | 0 | 15 | 89.3% | 89.5% | 1365 | 2000 | 635 |
| 1.8 | 3.9 | 80.3 | 2 | 12 | 88.4% | 86.5% | 1335 | 2000 | 665 |
| 2 | 0.7 | 80.3 | 2 | 15 | 21.8% | 97.4% | 1320 | 1555 | 235 |
| 2.1 | 3.6 | 80.3 | 2 | 12 | 87.2% | 87.5% | 1335 | 2000 | 665 |
| 2.3 | 0.4 | 80.3 | 2 | 15 | 25.6% | 98.5% | 1315 | 1470 | 155 |
| 2.6 | 1.1 | 80.3 | 1 | 15 | 44.4% | 96.1% | 1335 | 1735 | 400 |
| 2.7 | 2 | 80.3 | 1 | 14 | 52.0% | 93.0% | 1340 | 2000 | 660 |
| 2.8 | 1.9 | 80.3 | 1 | 14 | 47.4% | 93.4% | 1335 | 1975 | 640 |
| 2.9 | 0.8 | 80.3 | 1 | 15 | 31.2% | 97.2% | 1325 | 1650 | 325 |
| 3.1 | 2.6 | 80.3 | 2 | 12 | 37.4% | 91.0% | 1320 | 2000 | 680 |
| 3.2 | 2.5 | 80.3 | 2 | 12 | 23.9% | 91.4% | 1315 | 2000 | 685 |
| 3.3 | 2.4 | 80.3 | 2 | 12 | 25.5% | 91.7% | 1315 | 2000 | 685 |
| 3.5 | 0.2 | 80.3 | 2 | 14 | 32.0% | 99.3% | 1315 | 1425 | 110 |
| 3.7 | 2 | 80.3 | 0 | 14 | 20.1% | 94.0% | 1360 | 2000 | 640 |
| 3.8 | 2.9 | 80.3 | 1 | 12 | 28.3% | 90.3% | 1325 | 2000 | 675 |
| 3.9 | 2.8 | 80.3 | 2 | 11 | 29.4% | 90.5% | 1315 | 2000 | 685 |
| 0.5 | 3.2 | 80.3 | 1 | 15 | 56.1% | 90.5% | 1360 | 2000 | 640 |
| 0.9 | 3.8 | 80.3 | 1 | 14 | 80.9% | 86.6% | 1355 | 2000 | 645 |
| 1.1 | 2.5 | 80.4 | 1 | 15 | 91.9% | 91.8% | 1360 | 2000 | 640 |
| 1.2 | 3.4 | 80.4 | 0 | 15 | 88.8% | 88.9% | 1365 | 2000 | 635 |
| 1.4 | 3.2 | 80.4 | 1 | 14 | 90.4% | 88.7% | 1350 | 2000 | 650 |
| 1.6 | 2 | 80.4 | 1 | 15 | 90.1% | 92.8% | 1350 | 1960 | 610 |
| 2 | 3.6 | 80.4 | 1 | 13 | 81.3% | 87.6% | 1345 | 2000 | 655 |
| 2.1 | 2.5 | 80.4 | 2 | 13 | 79.3% | 91.1% | 1330 | 2000 | 670 |
| 2.2 | 2.4 | 80.4 | 0 | 15 | 56.9% | 93.6% | 1360 | 2000 | 640 |
| 2.3 | 0.3 | 80.4 | 2 | 15 | 25.9% | 98.9% | 1315 | 1420 | 105 |
| 2.4 | 3.2 | 80.4 | 1 | 13 | 71.2% | 89.0% | 1345 | 2000 | 655 |
| 2.5 | 3.1 | 80.4 | 2 | 12 | 75.9% | 89.2% | 1330 | 2000 | 670 |
| 2.6 | 4 | 80.4 | 1 | 12 | 73.1% | 86.5% | 1345 | 2000 | 655 |
| 2.7 | 3.9 | 80.4 | 1 | 12 | 70.3% | 86.8% | 1345 | 2000 | 655 |
| 2.8 | 2.8 | 80.4 | 0 | 14 | 49.6% | 92.4% | 1360 | 2000 | 640 |
| 2.9 | 2.7 | 80.4 | 2 | 12 | 63.0% | 90.6% | 1325 | 2000 | 675 |
| 3 | 2.6 | 80.4 | 1 | 13 | 51.9% | 91.1% | 1340 | 2000 | 660 |
| 3.1 | 0.5 | 80.4 | 2 | 14 | 33.9% | 98.2% | 1315 | 1515 | 200 |
| 3.2 | 0.4 | 80.4 | 2 | 14 | 35.6% | 98.6% | 1315 | 1485 | 170 |
| 3.4 | 3.2 | 80.4 | 1 | 12 | 46.8% | 89.2% | 1335 | 2000 | 665 |
| 3.5 | 3.1 | 80.4 | 1 | 12 | 44.3% | 89.6% | 1335 | 2000 | 665 |
| 3.7 | 3.9 | 80.4 | 1 | 11 | 46.4% | 87.1% | 1335 | 2000 | 665 |
| 3.8 | 3.8 | 80.4 | 1 | 11 | 43.9% | 87.4% | 1335 | 2000 | 665 |
| 3.9 | 3.7 | 80.4 | 2 | 10 | 33.2% | 87.7% | 1320 | 2000 | 680 |
| 4 | 3.6 | 80.4 | 2 | 10 | 23.8% | 88.0% | 1315 | 2000 | 685 |
| 0.6 | 3 | 80.4 | 1 | 15 | 67.7% | 91.0% | 1360 | 2000 | 640 |
| 0.7 | 3.9 | 80.4 | 0 | 15 | 88.0% | 88.1% | 1365 | 2000 | 635 |
| 0.9 | 3.7 | 80.4 | 1 | 14 | 80.9% | 86.9% | 1355 | 2000 | 645 |
| 1.1 | 2.4 | 80.5 | 1 | 15 | 92.3% | 92.1% | 1360 | 2000 | 640 |
| 1.4 | 3.1 | 80.5 | 1 | 14 | 90.7% | 89.0% | 1350 | 2000 | 650 |
| 1.5 | 4 | 80.5 | 2 | 12 | 78.2% | 86.0% | 1340 | 2000 | 660 |
| 1.8 | 1.7 | 80.5 | 1 | 15 | 75.9% | 93.9% | 1345 | 1880 | 535 |
| 1.9 | 1.6 | 80.5 | 2 | 14 | 61.3% | 94.2% | 1330 | 1830 | 500 |
| 2.1 | 1.4 | 80.5 | 1 | 15 | 59.9% | 95.0% | 1340 | 1805 | 465 |
| 2.2 | 1.3 | 80.5 | 2 | 14 | 55.5% | 95.3% | 1325 | 1755 | 430 |
| 2.4 | 2.1 | 80.5 | 1 | 14 | 61.0% | 92.6% | 1340 | 2000 | 660 |
| 2.6 | 1.9 | 80.5 | 0 | 15 | 45.8% | 95.3% | 1360 | 1980 | 620 |
| 2.8 | 1.7 | 80.5 | 1 | 14 | 48.2% | 94.0% | 1335 | 1915 | 580 |
| 2.9 | 0.6 | 80.5 | 1 | 15 | 31.0% | 97.9% | 1325 | 1585 | 260 |
| 3.1 | 2.4 | 80.5 | 2 | 12 | 37.2% | 91.7% | 1320 | 2000 | 680 |
| 3.2 | 2.3 | 80.5 | 2 | 12 | 23.7% | 92.0% | 1315 | 2000 | 685 |
| 3.3 | 0.2 | 80.5 | 2 | 14 | 37.2% | 99.3% | 1315 | 1425 | 110 |
| 3.5 | 2 | 80.5 | 1 | 13 | 29.0% | 93.1% | 1325 | 2000 | 675 |
| 3.7 | 1.8 | 80.5 | 1 | 13 | 18.0% | 93.8% | 1320 | 1970 | 650 |
| 3.7 | 0.8 | 80.5 | 2 | 13 | 34.7% | 97.2% | 1315 | 1630 | 315 |
| 3.8 | 0.7 | 80.5 | 2 | 13 | 32.4% | 97.5% | 1315 | 1590 | 275 |
| 0.4 | 3.1 | 80.5 | 1 | 15 | 44.9% | 91.0% | 1360 | 2000 | 640 |
| 0.8 | 1.7 | 80.5 | 2 | 15 | 70.0% | 94.9% | 1350 | 1815 | 465 |
| 0.9 | 3.6 | 80.5 | 2 | 13 | 54.2% | 87.1% | 1340 | 2000 | 660 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.1 | 2.3 | 80.6 | 2 | 14 | 77.2% | 91.6% | 1340 | 1985 | 645 |
| 1.4 | 3 | 80.6 | 2 | 13 | 84.1% | 89.3% | 1340 | 2000 | 660 |
| 1.6 | 3.8 | 80.6 | 2 | 12 | 83.7% | 86.7% | 1340 | 2000 | 660 |
| 1.7 | 3.7 | 80.6 | 0 | 14 | 81.9% | 90.2% | 1360 | 2000 | 640 |
| 1.8 | 0.6 | 80.6 | 2 | 15 | 23.1% | 97.8% | 1325 | 1500 | 175 |
| 2 | 1.4 | 80.6 | 1 | 15 | 67.8% | 95.0% | 1345 | 1795 | 450 |
| 0.2 | 3.2 | 80.6 | 1 | 15 | 22.0% | 91.0% | 1360 | 2000 | 640 |
| 2.1 | 3.3 | 80.6 | 0 | 14 | 70.3% | 91.6% | 1360 | 2000 | 640 |
| 2.5 | 0.9 | 80.6 | 1 | 15 | 48.0% | 96.8% | 1335 | 1650 | 315 |
| 2.6 | 3.8 | 80.6 | 0 | 13 | 66.2% | 89.9% | 1360 | 2000 | 640 |
| 2.7 | 3.7 | 80.6 | 2 | 11 | 73.4% | 87.4% | 1330 | 2000 | 670 |
| 2.8 | 3.6 | 80.6 | 1 | 12 | 68.5% | 87.8% | 1345 | 2000 | 655 |
| 2.9 | 2.5 | 80.6 | 0 | 14 | 47.3% | 93.3% | 1360 | 2000 | 640 |
| 3 | 2.4 | 80.6 | 2 | 12 | 35.5% | 91.6% | 1320 | 2000 | 680 |
| 3.1 | 1.3 | 80.6 | 1 | 14 | 39.1% | 95.4% | 1330 | 1800 | 470 |
| 3.1 | 3.3 | 80.6 | 0 | 13 | 50.2% | 90.9% | 1360 | 2000 | 640 |
| 3.2 | 3.2 | 80.6 | 0 | 13 | 47.0% | 91.1% | 1360 | 2000 | 640 |
| 3.3 | 3.1 | 80.6 | 0 | 13 | 43.8% | 91.4% | 1360 | 2000 | 640 |
| 3.4 | 4 | 80.6 | 1 | 11 | 56.9% | 86.7% | 1340 | 2000 | 660 |
| 3.5 | 3.9 | 80.6 | 1 | 11 | 54.3% | 87.0% | 1340 | 2000 | 660 |
| 3.6 | 2.8 | 80.6 | 0 | 13 | 34.2% | 92.0% | 1360 | 2000 | 640 |
| 3.8 | 2.6 | 80.6 | 0 | 13 | 27.8% | 92.4% | 1360 | 2000 | 640 |
| 3.9 | 3.5 | 80.6 | 1 | 11 | 42.1% | 88.4% | 1335 | 2000 | 665 |
| 0.5 | 1.9 | 80.6 | 2 | 15 | 43.5% | 94.8% | 1350 | 1855 | 505 |
| 0.6 | 3.8 | 80.6 | 2 | 13 | 38.7% | 86.4% | 1345 | 2000 | 655 |
| 1 | 1.3 | 80.7 | 2 | 15 | 88.3% | 95.9% | 1350 | 1695 | 345 |
| 1.1 | 3.2 | 80.7 | 2 | 13 | 66.2% | 88.5% | 1340 | 2000 | 660 |
| 1.3 | 2 | 80.7 | 2 | 14 | 66.5% | 92.7% | 1335 | 1910 | 575 |
| 1.4 | 2.9 | 80.7 | 2 | 13 | 84.1% | 89.6% | 1340 | 2000 | 660 |
| 1.5 | 2.8 | 80.7 | 0 | 15 | 90.4% | 90.3% | 1365 | 2000 | 635 |
| 1.6 | 3.7 | 80.7 | 1 | 13 | 89.1% | 87.1% | 1350 | 2000 | 650 |
| 1.7 | 3.6 | 80.7 | 2 | 12 | 89.2% | 87.4% | 1340 | 2000 | 660 |
| 1.8 | 3.5 | 80.7 | 0 | 14 | 79.4% | 91.3% | 1360 | 2000 | 640 |
| 0.2 | 2.1 | 80.7 | 2 | 15 | 19.1% | 94.6% | 1355 | 1890 | 535 |
| 2.1 | 3.2 | 80.7 | 2 | 12 | 88.8% | 88.8% | 1335 | 2000 | 665 |
| 2.3 | 4 | 80.7 | 2 | 11 | 83.3% | 86.3% | 1335 | 2000 | 665 |
| 2.4 | 3.9 | 80.7 | 2 | 11 | 81.4% | 86.6% | 1335 | 2000 | 665 |
| 2.6 | 2.7 | 80.7 | 0 | 14 | 57.6% | 93.0% | 1360 | 2000 | 640 |
| 2.7 | 2.6 | 80.7 | 2 | 12 | 59.4% | 90.9% | 1325 | 2000 | 675 |
| 2.8 | 2.5 | 80.7 | 1 | 13 | 58.7% | 91.3% | 1340 | 2000 | 660 |
| 3 | 1.3 | 80.7 | 2 | 13 | 26.0% | 95.4% | 1315 | 1775 | 460 |
| 3.1 | 0.2 | 80.7 | 2 | 14 | 33.7% | 99.3% | 1315 | 1420 | 105 |
| 3.3 | 2 | 80.7 | 1 | 13 | 43.3% | 93.1% | 1335 | 2000 | 665 |
| 3.4 | 0.9 | 80.7 | 2 | 13 | 32.6% | 96.8% | 1315 | 1650 | 335 |
| 3.6 | 3.7 | 80.7 | 2 | 10 | 44.4% | 87.6% | 1325 | 2000 | 675 |
| 3.8 | 3.5 | 80.7 | 2 | 10 | 30.4% | 88.3% | 1320 | 2000 | 680 |
| 3.9 | 3.4 | 80.7 | 2 | 10 | 32.4% | 88.6% | 1320 | 2000 | 680 |
| 4 | 3.3 | 80.7 | 1 | 11 | 38.5% | 89.0% | 1330 | 2000 | 670 |
| 0.6 | 3.7 | 80.7 | 0 | 15 | 83.0% | 88.9% | 1365 | 2000 | 635 |
| 1 | 2.2 | 80.8 | 1 | 15 | 93.3% | 92.9% | 1360 | 1970 | 610 |
| 1.1 | 3.1 | 80.8 | 0 | 15 | 90.1% | 90.0% | 1365 | 2000 | 635 |
| 1.3 | 1.9 | 80.8 | 1 | 15 | 93.8% | 93.4% | 1360 | 1905 | 545 |
| 1.5 | 2.7 | 80.8 | 1 | 14 | 92.0% | 90.4% | 1350 | 2000 | 650 |
| 1.7 | 2.5 | 80.8 | 0 | 15 | 91.1% | 91.2% | 1365 | 2000 | 635 |
| 1.8 | 3.4 | 80.8 | 1 | 13 | 90.0% | 88.1% | 1350 | 2000 | 650 |
| 1.9 | 3.3 | 80.8 | 1 | 13 | 89.1% | 88.5% | 1350 | 2000 | 650 |
| 2.1 | 2.1 | 80.8 | 1 | 14 | 72.0% | 92.5% | 1345 | 1985 | 640 |
| 2.3 | 1.9 | 80.8 | 0 | 15 | 55.6% | 95.7% | 1360 | 1960 | 600 |
| 2.4 | 1.8 | 80.8 | 2 | 13 | 61.0% | 93.6% | 1325 | 1890 | 565 |
| 2.5 | 1.7 | 80.8 | 1 | 14 | 59.9% | 94.0% | 1340 | 1890 | 550 |
| 2.5 | 0.7 | 80.8 | 2 | 14 | 39.3% | 97.5% | 1320 | 1540 | 220 |
| 2.6 | 0.6 | 80.8 | 1 | 15 | 46.6% | 97.8% | 1335 | 1560 | 225 |
| 2.7 | 3.5 | 80.8 | 0 | 13 | 64.0% | 90.7% | 1360 | 2000 | 640 |
| 3.1 | 3.1 | 80.8 | 1 | 12 | 58.5% | 89.4% | 1340 | 2000 | 660 |
| 3.2 | 3 | 80.8 | 2 | 11 | 58.6% | 89.7% | 1325 | 2000 | 675 |
| 3.3 | 2.9 | 80.8 | 2 | 11 | 34.2% | 90.1% | 1320 | 2000 | 680 |
| 3.4 | 1.8 | 80.8 | 0 | 14 | 31.9% | 95.1% | 1360 | 1965 | 605 |
| 3.5 | 1.7 | 80.8 | 1 | 13 | 37.0% | 94.1% | 1330 | 1925 | 595 |
| 3.5 | 0.7 | 80.8 | 0 | 15 | 18.6% | 98.3% | 1360 | 1655 | 295 |
| 3.6 | 0.6 | 80.8 | 2 | 13 | 35.8% | 97.9% | 1315 | 1530 | 215 |
| 3.7 | 3.5 | 80.8 | 0 | 12 | 41.3% | 90.1% | 1360 | 2000 | 640 |
| 3.8 | 3.4 | 80.8 | 0 | 12 | 38.1% | 90.3% | 1360 | 2000 | 640 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.9 | 3.3 | 80.8 | 1 | 11 | 42.9% | 89.0% | 1335 | 2000 | 665 |
| 4 | 3.2 | 80.8 | 2 | 10 | 22.9% | 89.3% | 1315 | 2000 | 685 |
| 0.5 | 2.7 | 80.8 | 2 | 14 | 42.8% | 90.3% | 1350 | 2000 | 650 |
| 0.7 | 1.5 | 80.8 | 2 | 15 | 61.7% | 95.8% | 1350 | 1740 | 390 |
| 0.8 | 3.4 | 80.8 | 2 | 13 | 48.2% | 87.8% | 1340 | 2000 | 660 |
| 1 | 2.1 | 80.9 | 2 | 14 | 70.7% | 92.3% | 1340 | 1915 | 575 |
| 1.2 | 3.9 | 80.9 | 0 | 14 | 88.5% | 87.3% | 1360 | 2000 | 640 |
| 1.3 | 0.8 | 80.9 | 2 | 15 | 97.7% | 97.1% | 1345 | 1530 | 185 |
| 1.6 | 1.5 | 80.9 | 2 | 14 | 83.5% | 94.5% | 1335 | 1770 | 435 |
| 1.7 | 2.4 | 80.9 | 1 | 14 | 83.2% | 91.4% | 1345 | 2000 | 655 |
| 1.9 | 2.2 | 80.9 | 2 | 13 | 89.2% | 92.1% | 1335 | 1975 | 640 |
| 2 | 2.1 | 80.9 | 0 | 15 | 69.2% | 93.9% | 1360 | 2000 | 640 |
| 2.1 | 1 | 80.9 | 2 | 14 | 53.7% | 96.3% | 1325 | 1635 | 310 |
| 2.1 | 0 | 80.9 | 2 | 15 | 21.0% | 100.0% | 1330 | 1410 | 80 |
| 2.2 | 0.9 | 80.9 | 1 | 15 | 59.0% | 96.7% | 1340 | 1625 | 285 |
| 2.3 | 3.8 | 80.9 | 0 | 13 | 77.5% | 90.2% | 1360 | 2000 | 640 |
| 2.4 | 3.7 | 80.9 | 2 | 11 | 82.1% | 87.2% | 1335 | 2000 | 665 |
| 2.5 | 3.6 | 80.9 | 1 | 12 | 78.4% | 87.7% | 1345 | 2000 | 655 |
| 2.7 | 2.4 | 80.9 | 2 | 12 | 59.3% | 91.6% | 1325 | 2000 | 675 |
| 2.8 | 2.3 | 80.9 | 1 | 13 | 59.7% | 92.0% | 1340 | 2000 | 660 |
| 3 | 0.1 | 80.9 | 2 | 14 | 26.7% | 99.7% | 1315 | 1420 | 105 |
| 0.3 | 1.8 | 80.9 | 2 | 15 | 29.3% | 95.4% | 1355 | 1805 | 450 |
| 3.1 | 2 | 80.9 | 2 | 12 | 36.9% | 93.0% | 1320 | 1965 | 645 |
| 3.2 | 0.9 | 80.9 | 0 | 15 | 29.0% | 98.0% | 1360 | 1690 | 330 |
| 3.4 | 3.7 | 80.9 | 2 | 10 | 60.6% | 88.0% | 1330 | 2000 | 670 |
| 3.5 | 2.6 | 80.9 | 0 | 13 | 38.7% | 92.8% | 1360 | 2000 | 640 |
| 3.6 | 2.5 | 80.9 | 2 | 11 | 24.0% | 91.4% | 1315 | 2000 | 685 |
| 3.8 | 2.3 | 80.9 | 1 | 12 | 37.1% | 92.2% | 1330 | 2000 | 670 |
| 4 | 1.1 | 80.9 | 2 | 12 | 35.8% | 96.2% | 1315 | 1730 | 415 |
| 0.6 | 2.5 | 80.9 | 1 | 15 | 68.7% | 92.6% | 1360 | 2000 | 640 |
| 0.9 | 3.2 | 80.9 | 1 | 14 | 80.8% | 88.5% | 1355 | 2000 | 645 |
| 1.1 | 0.9 | 81 | 2 | 15 | 88.0% | 97.1% | 1345 | 1555 | 210 |
| 1.4 | 1.6 | 81 | 2 | 14 | 73.5% | 94.1% | 1335 | 1790 | 455 |
| 1.6 | 2.4 | 81 | 2 | 13 | 90.9% | 91.3% | 1335 | 2000 | 665 |
| 1.8 | 2.2 | 81 | 0 | 15 | 80.1% | 92.6% | 1360 | 2000 | 640 |
| 2 | 3 | 81 | 0 | 14 | 75.3% | 92.8% | 1360 | 2000 | 640 |
| 2.1 | 1.9 | 81 | 1 | 14 | 73.0% | 93.2% | 1345 | 1925 | 580 |
| 2.1 | 0.9 | 81 | 2 | 14 | 54.1% | 96.7% | 1325 | 1595 | 270 |
| 2.3 | 3.7 | 81 | 0 | 13 | 78.1% | 90.6% | 1360 | 2000 | 640 |
| 2.5 | 3.5 | 81 | 1 | 12 | 78.9% | 88.0% | 1345 | 2000 | 655 |
| 2.6 | 2.4 | 81 | 0 | 14 | 59.2% | 94.1% | 1360 | 2000 | 640 |
| 2.7 | 2.3 | 81 | 2 | 12 | 73.7% | 91.9% | 1330 | 2000 | 670 |
| 2.9 | 1.1 | 81 | 1 | 14 | 47.6% | 96.1% | 1335 | 1715 | 380 |
| 3 | 4 | 81 | 0 | 12 | 64.4% | 89.3% | 1360 | 2000 | 640 |
| 3.1 | 1.9 | 81 | 0 | 14 | 42.7% | 95.1% | 1360 | 1980 | 620 |
| 3.2 | 1.8 | 81 | 1 | 13 | 47.1% | 93.7% | 1335 | 1935 | 600 |
| 3.2 | 0.8 | 81 | 2 | 13 | 29.0% | 97.1% | 1315 | 1595 | 280 |
| 3.3 | 3.7 | 81 | 0 | 12 | 54.8% | 89.9% | 1360 | 2000 | 640 |
| 3.4 | 3.6 | 81 | 1 | 11 | 58.6% | 87.9% | 1340 | 2000 | 660 |
| 3.5 | 2.5 | 81 | 2 | 11 | 37.4% | 91.4% | 1320 | 2000 | 680 |
| 4 | 2 | 81 | 1 | 12 | 31.0% | 93.2% | 1325 | 2000 | 675 |
| 0.4 | 1.6 | 81 | 2 | 15 | 39.5% | 95.9% | 1355 | 1745 | 390 |
| 0.5 | 3.5 | 81 | 2 | 13 | 32.2% | 87.3% | 1345 | 2000 | 655 |
| 0.7 | 2.3 | 81 | 2 | 14 | 54.5% | 91.5% | 1345 | 1945 | 600 |
| 0.9 | 1.1 | 81 | 2 | 15 | 80.1% | 96.8% | 1350 | 1615 | 265 |
| 1 | 2.9 | 81.1 | 0 | 15 | 91.0% | 90.7% | 1365 | 2000 | 635 |
| 1.1 | 3.8 | 81.1 | 1 | 13 | 75.0% | 86.6% | 1350 | 2000 | 650 |
| 1.2 | 3.7 | 81.1 | 2 | 12 | 62.5% | 86.9% | 1340 | 2000 | 660 |
| 1.3 | 3.6 | 81.1 | 0 | 14 | 89.4% | 88.8% | 1360 | 2000 | 640 |
| 1.4 | 0.5 | 81.1 | 2 | 15 | 57.8% | 98.1% | 1335 | 1425 | 90 |
| 1.6 | 1.3 | 81.1 | 1 | 15 | 86.9% | 95.2% | 1345 | 1730 | 385 |
| 1.7 | 1.2 | 81.1 | 2 | 14 | 87.6% | 95.6% | 1335 | 1675 | 340 |
| 1.8 | 1.1 | 81.1 | 2 | 14 | 60.1% | 95.9% | 1330 | 1645 | 315 |
| 1.9 | 2 | 81.1 | 2 | 13 | 90.3% | 92.8% | 1335 | 1915 | 580 |
| 2 | 1.9 | 81.1 | 2 | 13 | 88.0% | 93.1% | 1335 | 1890 | 555 |
| 0.2 | 1.7 | 81.1 | 2 | 15 | 19.3% | 96.0% | 1355 | 1760 | 405 |
| 2.1 | 2.8 | 81.1 | 0 | 14 | 73.1% | 93.3% | 1360 | 2000 | 640 |
| 2.3 | 2.6 | 81.1 | 1 | 13 | 77.7% | 90.9% | 1345 | 2000 | 655 |
| 2.4 | 1.5 | 81.1 | 0 | 15 | 54.3% | 97.0% | 1360 | 1840 | 480 |
| 2.6 | 1.3 | 81.1 | 1 | 14 | 58.5% | 95.4% | 1340 | 1765 | 425 |
| 2.6 | 3.3 | 81.1 | 0 | 13 | 68.8% | 91.5% | 1360 | 2000 | 640 |
| 2.8 | 3.1 | 81.1 | 1 | 12 | 70.9% | 89.3% | 1345 | 2000 | 655 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.9 | 3 | 81.1 | 2 | 11 | 71.4% | 89.6% | 1330 | 2000 | 670 |
| 3 | 2.9 | 81.1 | 1 | 12 | 65.3% | 90.0% | 1345 | 2000 | 655 |
| 0.3 | 2.6 | 81.1 | 1 | 15 | 34.0% | 92.8% | 1360 | 2000 | 640 |
| 3.1 | 2.8 | 81.1 | 0 | 13 | 52.6% | 92.6% | 1360 | 2000 | 640 |
| 3.2 | 2.7 | 81.1 | 1 | 12 | 57.1% | 90.7% | 1340 | 2000 | 660 |
| 3.3 | 1.6 | 81.1 | 2 | 12 | 24.6% | 94.4% | 1315 | 1855 | 540 |
| 3.3 | 0.6 | 81.1 | 0 | 15 | 26.6% | 99.0% | 1360 | 1605 | 245 |
| 3.5 | 3.4 | 81.1 | 2 | 10 | 59.4% | 88.7% | 1330 | 2000 | 670 |
| 3.7 | 2.2 | 81.1 | 1 | 12 | 40.3% | 92.5% | 1330 | 2000 | 670 |
| 3.9 | 2 | 81.1 | 2 | 11 | 28.6% | 93.1% | 1315 | 1985 | 670 |
| 0.4 | 2.5 | 81.1 | 1 | 15 | 45.7% | 92.9% | 1360 | 2000 | 640 |
| 0.5 | 3.4 | 81.1 | 0 | 15 | 69.8% | 89.9% | 1365 | 2000 | 635 |
| 0.7 | 3.2 | 81.1 | 1 | 14 | 70.9% | 88.5% | 1360 | 2000 | 640 |
| 1 | 2.8 | 81.2 | 1 | 14 | 82.2% | 89.9% | 1350 | 2000 | 650 |
| 1.2 | 2.6 | 81.2 | 0 | 15 | 91.7% | 91.3% | 1365 | 2000 | 635 |
| 1.3 | 3.5 | 81.2 | 1 | 13 | 88.1% | 87.6% | 1350 | 2000 | 650 |
| 1.4 | 3.4 | 81.2 | 2 | 12 | 73.4% | 87.9% | 1340 | 2000 | 660 |
| 1.6 | 3.2 | 81.2 | 0 | 14 | 89.7% | 91.6% | 1360 | 2000 | 640 |
| 1.8 | 4 | 81.2 | 0 | 13 | 88.2% | 90.1% | 1360 | 2000 | 640 |
| 1.9 | 3.9 | 81.2 | 0 | 13 | 88.5% | 90.4% | 1360 | 2000 | 640 |
| 2 | 3.8 | 81.2 | 2 | 11 | 88.9% | 87.5% | 1340 | 2000 | 660 |
| 2.2 | 1.6 | 81.2 | 1 | 14 | 71.6% | 94.3% | 1345 | 1835 | 490 |
| 2.3 | 0.5 | 81.2 | 1 | 15 | 57.7% | 98.2% | 1340 | 1495 | 155 |
| 2.5 | 0.3 | 81.2 | 2 | 14 | 39.0% | 98.9% | 1320 | 1405 | 85 |
| 2.7 | 2.1 | 81.2 | 1 | 13 | 66.6% | 92.6% | 1345 | 1990 | 645 |
| 2.9 | 1.9 | 81.2 | 1 | 13 | 58.3% | 93.3% | 1340 | 1945 | 605 |
| 3 | 3.8 | 81.2 | 0 | 12 | 65.4% | 89.9% | 1360 | 2000 | 640 |
| 3.1 | 1.7 | 81.2 | 1 | 13 | 52.7% | 94.0% | 1340 | 1895 | 555 |
| 3.1 | 0.7 | 81.2 | 2 | 13 | 27.1% | 97.5% | 1315 | 1545 | 230 |
| 3.3 | 3.5 | 81.2 | 1 | 11 | 62.7% | 88.2% | 1345 | 2000 | 655 |
| 3.5 | 1.3 | 81.2 | 0 | 14 | 30.4% | 96.7% | 1360 | 1815 | 455 |
| 3.6 | 1.2 | 81.2 | 2 | 12 | 29.5% | 95.8% | 1315 | 1740 | 425 |
| 3.7 | 0.1 | 81.2 | 1 | 14 | 15.1% | 99.7% | 1315 | 1440 | 125 |
| 3.8 | 4 | 81.2 | 1 | 10 | 50.6% | 86.8% | 1340 | 2000 | 660 |
| 4 | 2.8 | 81.2 | 0 | 12 | 33.6% | 92.0% | 1360 | 2000 | 640 |
| 0.4 | 3.4 | 81.2 | 0 | 15 | 55.7% | 90.1% | 1365 | 2000 | 635 |
| 0.6 | 3.2 | 81.2 | 1 | 14 | 62.2% | 88.5% | 1360 | 2000 | 640 |
| 0.8 | 2 | 81.2 | 1 | 15 | 92.8% | 93.9% | 1360 | 1890 | 530 |
| 0.9 | 2.9 | 81.2 | 1 | 14 | 74.9% | 89.5% | 1350 | 2000 | 650 |
| 1 | 2.7 | 81.3 | 2 | 13 | 60.4% | 90.2% | 1340 | 2000 | 660 |
| 1.1 | 2.6 | 81.3 | 0 | 15 | 91.9% | 91.5% | 1365 | 2000 | 635 |
| 1.2 | 3.5 | 81.3 | 1 | 13 | 81.6% | 87.6% | 1350 | 2000 | 650 |
| 1.7 | 4 | 81.3 | 0 | 13 | 88.2% | 90.3% | 1360 | 2000 | 640 |
| 1.8 | 3.9 | 81.3 | 0 | 13 | 88.5% | 90.5% | 1360 | 2000 | 640 |
| 1.9 | 3.8 | 81.3 | 2 | 11 | 87.6% | 87.8% | 1340 | 2000 | 660 |
| 2 | 3.7 | 81.3 | 1 | 12 | 89.2% | 87.2% | 1350 | 2000 | 650 |
| 2.1 | 1.6 | 81.3 | 1 | 14 | 74.6% | 94.2% | 1345 | 1830 | 485 |
| 2.1 | 0.6 | 81.3 | 2 | 14 | 55.4% | 97.8% | 1325 | 1460 | 135 |
| 2.2 | 0.5 | 81.3 | 1 | 15 | 60.9% | 98.2% | 1340 | 1485 | 145 |
| 2.3 | 3.4 | 81.3 | 0 | 13 | 79.8% | 91.6% | 1360 | 2000 | 640 |
| 2.4 | 0.3 | 81.3 | 2 | 14 | 37.1% | 98.9% | 1320 | 1400 | 80 |
| 2.5 | 2.2 | 81.3 | 2 | 12 | 80.4% | 92.2% | 1330 | 1980 | 650 |
| 2.6 | 2.1 | 81.3 | 1 | 13 | 70.0% | 92.6% | 1345 | 1980 | 635 |
| 2.7 | 2 | 81.3 | 2 | 12 | 75.1% | 92.9% | 1330 | 1935 | 605 |
| 2.8 | 1.9 | 81.3 | 1 | 13 | 61.5% | 93.3% | 1340 | 1935 | 595 |
| 2.8 | 0.9 | 81.3 | 2 | 13 | 37.7% | 96.8% | 1320 | 1605 | 285 |
| 2.9 | 3.8 | 81.3 | 0 | 12 | 69.1% | 90.0% | 1360 | 2000 | 640 |
| 3 | 3.7 | 81.3 | 1 | 11 | 68.8% | 87.5% | 1345 | 2000 | 655 |
| 0.3 | 3.4 | 81.3 | 2 | 13 | 19.1% | 87.6% | 1345 | 2000 | 655 |
| 3.1 | 3.6 | 81.3 | 0 | 12 | 62.7% | 90.5% | 1360 | 2000 | 640 |
| 3.2 | 3.5 | 81.3 | 1 | 11 | 64.9% | 88.1% | 1345 | 2000 | 655 |
| 3.3 | 2.4 | 81.3 | 2 | 11 | 59.8% | 91.7% | 1325 | 2000 | 675 |
| 3.4 | 1.3 | 81.3 | 0 | 14 | 34.2% | 96.9% | 1360 | 1805 | 445 |
| 3.5 | 1.2 | 81.3 | 1 | 13 | 38.9% | 95.8% | 1330 | 1760 | 430 |
| 3.6 | 3.1 | 81.3 | 1 | 11 | 54.7% | 89.5% | 1340 | 2000 | 660 |
| 3.7 | 3 | 81.3 | 2 | 10 | 45.3% | 89.8% | 1325 | 2000 | 675 |
| 3.9 | 1.8 | 81.3 | 2 | 11 | 28.4% | 93.8% | 1315 | 1925 | 610 |
| 4 | 1.7 | 81.3 | 1 | 12 | 30.7% | 94.1% | 1325 | 1920 | 595 |
| 0.4 | 1.3 | 81.3 | 2 | 15 | 39.9% | 97.0% | 1355 | 1640 | 285 |
| 0.5 | 3.2 | 81.3 | 2 | 13 | 32.2% | 88.3% | 1345 | 2000 | 655 |
| 0.7 | 2 | 81.3 | 2 | 14 | 54.9% | 92.6% | 1345 | 1855 | 510 |
| 0.8 | 2.9 | 81.3 | 2 | 13 | 48.3% | 89.4% | 1340 | 2000 | 660 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.9 | 2.8 | 81.3 | 0 | 15 | 91.6% | 91.2% | 1365 | 2000 | 635 |
| 1.1 | 3.5 | 81.4 | 2 | 12 | 57.2% | 87.5% | 1340 | 2000 | 660 |
| 1.2 | 3.4 | 81.4 | 0 | 14 | 90.1% | 89.1% | 1360 | 2000 | 640 |
| 1.3 | 3.3 | 81.4 | 0 | 14 | 90.4% | 89.9% | 1360 | 2000 | 640 |
| 1.5 | 0.1 | 81.4 | 2 | 15 | 22.5% | 99.6% | 1330 | 1380 | 50 |
| 1.6 | 1 | 81.4 | 2 | 14 | 86.6% | 96.3% | 1335 | 1590 | 255 |
| 1.7 | 0.9 | 81.4 | 1 | 15 | 83.8% | 96.7% | 1345 | 1585 | 240 |
| 1.9 | 3.7 | 81.4 | 2 | 11 | 87.7% | 88.1% | 1340 | 2000 | 660 |
| 2.1 | 1.5 | 81.4 | 1 | 14 | 75.2% | 94.6% | 1345 | 1795 | 450 |
| 2.2 | 0.4 | 81.4 | 1 | 15 | 61.4% | 98.5% | 1340 | 1445 | 105 |
| 2.4 | 2.2 | 81.4 | 0 | 14 | 67.0% | 95.0% | 1360 | 2000 | 640 |
| 2.6 | 2 | 81.4 | 0 | 14 | 61.3% | 95.5% | 1360 | 1975 | 615 |
| 2.7 | 1.9 | 81.4 | 2 | 12 | 75.6% | 93.2% | 1330 | 1905 | 575 |
| 2.7 | 0.9 | 81.4 | 0 | 15 | 47.8% | 98.8% | 1360 | 1645 | 285 |
| 2.9 | 3.7 | 81.4 | 2 | 10 | 73.7% | 89.7% | 1335 | 2000 | 665 |
| 0.3 | 3.3 | 81.4 | 1 | 14 | 33.6% | 88.6% | 1360 | 2000 | 640 |
| 3.1 | 3.5 | 81.4 | 2 | 10 | 69.8% | 89.8% | 1335 | 2000 | 665 |
| 3.2 | 2.4 | 81.4 | 0 | 13 | 50.8% | 93.8% | 1360 | 2000 | 640 |
| 3.4 | 1.2 | 81.4 | 2 | 12 | 26.0% | 95.7% | 1315 | 1725 | 410 |
| 3.5 | 3.1 | 81.4 | 1 | 11 | 57.8% | 89.5% | 1340 | 2000 | 660 |
| 3.7 | 2.9 | 81.4 | 1 | 11 | 52.4% | 90.2% | 1340 | 2000 | 660 |
| 3.8 | 0.8 | 81.4 | 0 | 14 | 21.3% | 98.1% | 1360 | 1645 | 285 |
| 4 | 3.6 | 81.4 | 0 | 11 | 43.7% | 89.9% | 1360 | 2000 | 640 |
| 0.6 | 4 | 81.4 | 1 | 13 | 41.6% | 86.0% | 1350 | 2000 | 650 |
| 0.7 | 3.9 | 81.4 | 0 | 14 | 78.5% | 86.3% | 1365 | 2000 | 635 |
| 0.8 | 0.8 | 81.4 | 2 | 15 | 71.9% | 98.0% | 1350 | 1485 | 135 |
| 1.1 | 1.4 | 81.5 | 2 | 14 | 78.9% | 94.8% | 1340 | 1695 | 355 |
| 1.3 | 2.2 | 81.5 | 1 | 14 | 94.0% | 92.0% | 1350 | 1950 | 600 |
| 1.4 | 2.1 | 81.5 | 2 | 13 | 84.7% | 92.3% | 1340 | 1900 | 560 |
| 1.5 | 3 | 81.5 | 1 | 13 | 91.4% | 89.3% | 1350 | 2000 | 650 |
| 1.7 | 1.8 | 81.5 | 0 | 15 | 87.6% | 93.8% | 1360 | 1885 | 525 |
| 1.9 | 1.6 | 81.5 | 1 | 14 | 81.0% | 94.2% | 1345 | 1810 | 465 |
| 1.9 | 0.6 | 81.5 | 2 | 14 | 66.3% | 97.8% | 1330 | 1445 | 115 |
| 2 | 0.5 | 81.5 | 1 | 15 | 71.2% | 98.2% | 1345 | 1470 | 125 |
| 2.1 | 2.4 | 81.5 | 1 | 13 | 85.1% | 91.5% | 1345 | 2000 | 655 |
| 2.2 | 1.3 | 81.5 | 0 | 15 | 62.3% | 97.9% | 1360 | 1760 | 400 |
| 2.3 | 1.2 | 81.5 | 2 | 13 | 80.0% | 95.6% | 1330 | 1680 | 350 |
| 2.4 | 0.1 | 81.5 | 1 | 15 | 39.9% | 99.7% | 1340 | 1425 | 85 |
| 2.4 | 3.1 | 81.5 | 0 | 13 | 77.6% | 92.5% | 1360 | 2000 | 640 |
| 2.5 | 4 | 81.5 | 1 | 11 | 81.7% | 86.3% | 1350 | 2000 | 650 |
| 2.9 | 0.6 | 81.5 | 1 | 14 | 49.8% | 97.8% | 1335 | 1520 | 185 |
| 3 | 3.5 | 81.5 | 2 | 10 | 72.1% | 90.1% | 1335 | 2000 | 665 |
| 0.3 | 3.2 | 81.5 | 0 | 15 | 41.9% | 90.8% | 1365 | 2000 | 635 |
| 3.1 | 0.4 | 81.5 | 1 | 14 | 44.3% | 98.6% | 1335 | 1465 | 130 |
| 3.2 | 0.3 | 81.5 | 2 | 13 | 28.5% | 98.9% | 1315 | 1405 | 90 |
| 3.3 | 0.2 | 81.5 | 0 | 15 | 28.4% | 100.0% | 1360 | 1445 | 85 |
| 3.4 | 1.1 | 81.5 | 1 | 13 | 43.9% | 96.1% | 1335 | 1715 | 380 |
| 3.5 | 1 | 81.5 | 2 | 12 | 27.5% | 96.4% | 1315 | 1660 | 345 |
| 3.5 | 4 | 81.5 | 0 | 11 | 58.0% | 89.2% | 1360 | 2000 | 640 |
| 3.6 | 3.9 | 81.5 | 2 | 9 | 59.8% | 90.3% | 1335 | 2000 | 665 |
| 3.7 | 2.8 | 81.5 | 0 | 12 | 44.5% | 92.4% | 1360 | 2000 | 640 |
| 3.8 | 2.7 | 81.5 | 1 | 11 | 48.2% | 90.8% | 1335 | 2000 | 665 |
| 3.9 | 1.6 | 81.5 | 2 | 11 | 28.2% | 94.4% | 1315 | 1860 | 545 |
| 4 | 1.5 | 81.5 | 1 | 12 | 30.4% | 94.8% | 1325 | 1860 | 535 |
| 4 | 0.5 | 81.5 | 0 | 14 | 15.1% | 98.9% | 1360 | 1565 | 205 |
| 0.5 | 3 | 81.5 | 1 | 14 | 53.1% | 89.3% | 1360 | 2000 | 640 |
| 0.6 | 2.9 | 81.5 | 0 | 15 | 84.9% | 91.3% | 1365 | 2000 | 635 |
| 0.7 | 3.8 | 81.5 | 1 | 13 | 48.4% | 86.4% | 1350 | 2000 | 650 |
| 0.8 | 3.7 | 81.5 | 2 | 12 | 43.8% | 87.0% | 1345 | 2000 | 655 |
| 0.9 | 3.6 | 81.5 | 0 | 14 | 89.6% | 87.2% | 1365 | 2000 | 635 |
| 1 | 0.4 | 81.6 | 2 | 15 | 92.5% | 99.1% | 1350 | 1390 | 40 |
| 1.2 | 1.2 | 81.6 | 1 | 15 | 96.7% | 95.9% | 1360 | 1660 | 300 |
| 1.3 | 1.1 | 81.6 | 1 | 15 | 96.8% | 96.1% | 1355 | 1630 | 275 |
| 1.4 | 2 | 81.6 | 1 | 14 | 94.7% | 92.7% | 1350 | 1895 | 545 |
| 1.5 | 0.9 | 81.6 | 2 | 14 | 82.5% | 96.7% | 1335 | 1545 | 210 |
| 1.6 | 0.8 | 81.6 | 1 | 15 | 89.1% | 97.0% | 1345 | 1535 | 190 |
| 1.8 | 3.6 | 81.6 | 2 | 11 | 83.8% | 88.8% | 1340 | 2000 | 660 |
| 1.9 | 3.5 | 81.6 | 1 | 12 | 89.9% | 87.8% | 1350 | 2000 | 650 |
| 2 | 2.4 | 81.6 | 0 | 14 | 78.8% | 94.9% | 1360 | 2000 | 640 |
| 0.2 | 3.2 | 81.6 | 0 | 15 | 27.6% | 91.0% | 1365 | 2000 | 635 |
| 2.1 | 3.3 | 81.6 | 2 | 11 | 90.5% | 89.1% | 1340 | 2000 | 660 |
| 2.2 | 3.2 | 81.6 | 1 | 12 | 89.9% | 88.8% | 1350 | 2000 | 650 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.3 | 2.1 | 81.6 | 0 | 14 | 70.6% | 95.5% | 1360 | 1980 | 620 |
| 2.4 | 3 | 81.6 | 1 | 12 | 83.4% | 89.5% | 1345 | 2000 | 655 |
| 2.5 | 1.9 | 81.6 | 0 | 14 | 65.6% | 96.0% | 1360 | 1935 | 575 |
| 2.6 | 1.8 | 81.6 | 1 | 13 | 71.6% | 93.6% | 1345 | 1890 | 545 |
| 2.7 | 3.7 | 81.6 | 0 | 12 | 76.7% | 90.6% | 1360 | 2000 | 640 |
| 2.8 | 3.6 | 81.6 | 1 | 11 | 73.7% | 87.7% | 1345 | 2000 | 655 |
| 2.9 | 2.5 | 81.6 | 2 | 11 | 73.1% | 91.2% | 1330 | 2000 | 670 |
| 3 | 1.4 | 81.6 | 0 | 14 | 48.9% | 97.1% | 1360 | 1815 | 455 |
| 0.3 | 1.1 | 81.6 | 2 | 15 | 29.9% | 97.9% | 1355 | 1560 | 205 |
| 3.2 | 1.2 | 81.6 | 0 | 14 | 42.2% | 97.5% | 1360 | 1760 | 400 |
| 3.3 | 3.1 | 81.6 | 2 | 10 | 66.5% | 90.5% | 1335 | 2000 | 665 |
| 3.5 | 2.9 | 81.6 | 2 | 10 | 61.0% | 90.6% | 1330 | 2000 | 670 |
| 3.7 | 1.7 | 81.6 | 1 | 12 | 43.9% | 94.1% | 1335 | 1900 | 565 |
| 3.8 | 3.6 | 81.6 | 0 | 11 | 51.0% | 90.1% | 1360 | 2000 | 640 |
| 4 | 2.4 | 81.6 | 0 | 12 | 35.3% | 93.3% | 1360 | 2000 | 640 |
| 0.4 | 3 | 81.6 | 2 | 13 | 25.6% | 88.9% | 1345 | 2000 | 655 |
| 0.5 | 3.9 | 81.6 | 1 | 13 | 34.8% | 86.7% | 1350 | 2000 | 650 |
| 0.7 | 3.7 | 81.6 | 0 | 14 | 78.4% | 86.9% | 1365 | 2000 | 635 |
| 1 | 1.3 | 81.7 | 1 | 15 | 96.8% | 95.9% | 1360 | 1675 | 315 |
| 1.1 | 1.2 | 81.7 | 2 | 14 | 79.0% | 95.5% | 1340 | 1620 | 280 |
| 1.2 | 1.1 | 81.7 | 2 | 14 | 85.7% | 95.9% | 1340 | 1595 | 255 |
| 1.4 | 1.9 | 81.7 | 2 | 13 | 84.8% | 93.0% | 1340 | 1835 | 495 |
| 1.5 | 0.8 | 81.7 | 2 | 14 | 83.1% | 97.0% | 1335 | 1500 | 165 |
| 1.7 | 3.6 | 81.7 | 0 | 13 | 89.5% | 91.6% | 1360 | 2000 | 640 |
| 1.9 | 3.4 | 81.7 | 1 | 12 | 90.2% | 88.1% | 1350 | 2000 | 650 |
| 0.2 | 3.1 | 81.7 | 0 | 15 | 27.7% | 91.3% | 1365 | 2000 | 635 |
| 2.2 | 3.1 | 81.7 | 1 | 12 | 90.3% | 89.1% | 1350 | 2000 | 650 |
| 2.3 | 3 | 81.7 | 2 | 11 | 87.2% | 89.6% | 1335 | 2000 | 665 |
| 2.4 | 2.9 | 81.7 | 1 | 12 | 83.8% | 89.8% | 1345 | 2000 | 655 |
| 2.5 | 0.8 | 81.7 | 0 | 15 | 54.6% | 99.4% | 1360 | 1600 | 240 |
| 2.7 | 3.6 | 81.7 | 2 | 10 | 77.5% | 90.7% | 1335 | 2000 | 665 |
| 2.8 | 2.5 | 81.7 | 0 | 13 | 65.5% | 94.0% | 1360 | 2000 | 640 |
| 2.9 | 2.4 | 81.7 | 1 | 12 | 71.1% | 91.6% | 1345 | 2000 | 655 |
| 3 | 3.3 | 81.7 | 0 | 12 | 68.0% | 91.6% | 1360 | 2000 | 640 |
| 3.1 | 3.2 | 81.7 | 2 | 10 | 70.8% | 90.9% | 1335 | 2000 | 665 |
| 3.2 | 2.1 | 81.7 | 0 | 13 | 52.3% | 94.9% | 1360 | 2000 | 640 |
| 3.3 | 3 | 81.7 | 1 | 11 | 64.2% | 89.7% | 1345 | 2000 | 655 |
| 3.4 | 1.9 | 81.7 | 2 | 11 | 35.1% | 93.3% | 1320 | 1920 | 600 |
| 3.4 | 0.9 | 81.7 | 0 | 14 | 36.0% | 98.3% | 1360 | 1660 | 300 |
| 3.5 | 0.8 | 81.7 | 1 | 13 | 40.5% | 97.2% | 1330 | 1600 | 270 |
| 3.6 | 3.7 | 81.7 | 2 | 9 | 59.9% | 91.0% | 1335 | 2000 | 665 |
| 3.7 | 2.6 | 81.7 | 0 | 12 | 45.4% | 93.0% | 1360 | 2000 | 640 |
| 3.8 | 2.5 | 81.7 | 1 | 11 | 51.1% | 91.5% | 1340 | 2000 | 660 |
| 3.9 | 1.4 | 81.7 | 2 | 11 | 28.0% | 95.1% | 1315 | 1795 | 480 |
| 0.6 | 1.7 | 81.7 | 2 | 14 | 47.5% | 93.6% | 1345 | 1745 | 400 |
| 0.7 | 2.6 | 81.7 | 1 | 14 | 64.9% | 90.5% | 1355 | 2000 | 645 |
| 0.9 | 2.4 | 81.7 | 0 | 15 | 93.1% | 92.4% | 1365 | 2000 | 635 |
| 1 | 2.2 | 81.8 | 0 | 15 | 93.6% | 92.9% | 1365 | 1950 | 585 |
| 1.1 | 3.1 | 81.8 | 1 | 13 | 75.3% | 88.8% | 1350 | 2000 | 650 |
| 1.2 | 3 | 81.8 | 0 | 14 | 91.5% | 90.6% | 1360 | 2000 | 640 |
| 1.3 | 2.9 | 81.8 | 0 | 14 | 91.8% | 91.4% | 1360 | 2000 | 640 |
| 1.4 | 2.8 | 81.8 | 2 | 12 | 73.9% | 89.9% | 1340 | 2000 | 660 |
| 1.5 | 2.7 | 81.8 | 1 | 13 | 92.5% | 90.3% | 1350 | 2000 | 650 |
| 1.6 | 1.6 | 81.8 | 0 | 15 | 94.6% | 94.2% | 1365 | 1810 | 445 |
| 1.7 | 1.5 | 81.8 | 2 | 13 | 96.4% | 94.5% | 1335 | 1735 | 400 |
| 1.8 | 1.4 | 81.8 | 1 | 14 | 85.5% | 94.9% | 1345 | 1735 | 390 |
| 1.8 | 0.4 | 81.8 | 2 | 14 | 63.6% | 98.5% | 1330 | 1380 | 50 |
| 1.9 | 3.3 | 81.8 | 2 | 11 | 88.1% | 89.7% | 1340 | 2000 | 660 |
| 2 | 3.2 | 81.8 | 1 | 12 | 90.8% | 88.8% | 1350 | 2000 | 650 |
| 2.1 | 0.1 | 81.8 | 1 | 15 | 42.6% | 99.7% | 1345 | 1415 | 70 |
| 2.1 | 3.1 | 81.8 | 0 | 13 | 87.9% | 92.8% | 1360 | 2000 | 640 |
| 2.2 | 4 | 81.8 | 1 | 11 | 88.4% | 86.7% | 1350 | 2000 | 650 |
| 2.3 | 2.9 | 81.8 | 0 | 13 | 82.7% | 93.3% | 1360 | 2000 | 640 |
| 2.4 | 2.8 | 81.8 | 1 | 12 | 84.1% | 90.2% | 1345 | 2000 | 655 |
| 2.5 | 1.7 | 81.8 | 2 | 12 | 83.0% | 93.9% | 1330 | 1825 | 495 |
| 2.5 | 0.7 | 81.8 | 0 | 15 | 55.1% | 99.8% | 1360 | 1570 | 210 |
| 2.6 | 0.6 | 81.8 | 1 | 14 | 61.9% | 97.8% | 1340 | 1495 | 155 |
| 2.7 | 3.5 | 81.8 | 2 | 10 | 77.5% | 91.0% | 1335 | 2000 | 665 |
| 2.8 | 2.4 | 81.8 | 0 | 13 | 66.1% | 94.3% | 1360 | 2000 | 640 |
| 2.9 | 2.3 | 81.8 | 1 | 12 | 71.6% | 91.9% | 1345 | 2000 | 655 |
| 3 | 3.2 | 81.8 | 0 | 12 | 68.6% | 91.9% | 1360 | 2000 | 640 |
| 3.1 | 0.1 | 81.8 | 1 | 14 | 34.4% | 99.6% | 1335 | 1425 | 90 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.2 | 3 | 81.8 | 0 | 12 | 62.1% | 92.3% | 1360 | 2000 | 640 |
| 3.3 | 2.9 | 81.8 | 1 | 11 | 64.5% | 90.1% | 1345 | 2000 | 655 |
| 3.4 | 1.8 | 81.8 | 2 | 11 | 35.0% | 93.7% | 1320 | 1885 | 565 |
| 3.4 | 0.8 | 81.8 | 0 | 14 | 36.5% | 98.7% | 1360 | 1615 | 255 |
| 3.5 | 0.7 | 81.8 | 1 | 13 | 40.9% | 97.5% | 1330 | 1560 | 230 |
| 3.6 | 3.6 | 81.8 | 2 | 9 | 59.9% | 91.3% | 1335 | 2000 | 665 |
| 3.7 | 2.5 | 81.8 | 0 | 12 | 45.9% | 93.4% | 1360 | 2000 | 640 |
| 3.8 | 2.4 | 81.8 | 1 | 11 | 51.5% | 91.8% | 1340 | 2000 | 660 |
| 3.9 | 1.3 | 81.8 | 2 | 11 | 27.9% | 95.4% | 1315 | 1760 | 445 |
| 4 | 1.2 | 81.8 | 1 | 12 | 30.1% | 95.8% | 1325 | 1755 | 430 |
| 4 | 3.2 | 81.8 | 0 | 11 | 45.6% | 91.2% | 1360 | 2000 | 640 |
| 0.5 | 1.7 | 81.8 | 1 | 15 | 58.6% | 95.4% | 1360 | 1765 | 405 |
| 0.6 | 1.6 | 81.8 | 2 | 14 | 47.6% | 94.0% | 1345 | 1715 | 370 |
| 0.8 | 2.4 | 81.8 | 2 | 13 | 48.4% | 91.1% | 1340 | 1935 | 595 |
| 0.9 | 2.3 | 81.8 | 0 | 15 | 93.5% | 92.7% | 1365 | 1970 | 605 |
| 1 | 2.1 | 81.9 | 0 | 15 | 94.0% | 93.2% | 1365 | 1920 | 555 |
| 1.1 | 3 | 81.9 | 2 | 12 | 61.2% | 89.1% | 1345 | 2000 | 655 |
| 1.2 | 2.9 | 81.9 | 2 | 12 | 63.0% | 89.5% | 1340 | 2000 | 660 |
| 1.4 | 1.7 | 81.9 | 0 | 15 | 94.7% | 93.9% | 1365 | 1825 | 460 |
| 1.6 | 1.5 | 81.9 | 1 | 14 | 95.3% | 94.5% | 1350 | 1755 | 405 |
| 1.7 | 0.4 | 81.9 | 1 | 15 | 81.5% | 98.5% | 1345 | 1395 | 50 |
| 1.9 | 2.2 | 81.9 | 0 | 14 | 83.4% | 95.7% | 1360 | 1980 | 620 |
| 0.2 | 3.9 | 81.9 | 0 | 14 | 27.2% | 86.9% | 1365 | 2000 | 635 |
| 2.2 | 2.9 | 81.9 | 2 | 11 | 91.8% | 90.3% | 1340 | 2000 | 660 |
| 2.3 | 1.8 | 81.9 | 0 | 14 | 72.3% | 96.6% | 1360 | 1890 | 530 |
| 2.4 | 1.7 | 81.9 | 1 | 13 | 79.1% | 93.9% | 1345 | 1845 | 500 |
| 2.5 | 3.6 | 81.9 | 0 | 12 | 82.0% | 91.2% | 1360 | 2000 | 640 |
| 2.7 | 2.4 | 81.9 | 2 | 11 | 80.0% | 91.5% | 1335 | 2000 | 665 |
| 2.8 | 1.3 | 81.9 | 0 | 14 | 57.2% | 97.7% | 1360 | 1765 | 405 |
| 2.9 | 1.2 | 81.9 | 1 | 13 | 61.6% | 95.7% | 1340 | 1715 | 375 |
| 3 | 2.1 | 81.9 | 0 | 13 | 60.0% | 95.1% | 1360 | 1995 | 635 |
| 3.1 | 3 | 81.9 | 2 | 10 | 71.6% | 91.7% | 1335 | 2000 | 665 |
| 3.3 | 1.8 | 81.9 | 1 | 12 | 58.0% | 93.7% | 1340 | 1905 | 565 |
| 3.4 | 3.7 | 81.9 | 0 | 11 | 61.3% | 90.3% | 1360 | 2000 | 640 |
| 3.6 | 2.5 | 81.9 | 2 | 10 | 60.0% | 91.7% | 1330 | 2000 | 670 |
| 3.8 | 1.3 | 81.9 | 1 | 12 | 40.9% | 95.5% | 1330 | 1775 | 445 |
| 3.8 | 3.3 | 81.9 | 2 | 9 | 58.5% | 92.0% | 1335 | 2000 | 665 |
| 3.9 | 3.2 | 81.9 | 1 | 10 | 50.6% | 89.2% | 1340 | 2000 | 660 |
| 0.4 | 3.7 | 81.9 | 2 | 12 | 21.4% | 88.1% | 1345 | 2000 | 655 |
| 0.6 | 0.5 | 81.9 | 2 | 15 | 56.3% | 99.4% | 1350 | 1415 | 65 |
| 0.8 | 1.3 | 81.9 | 1 | 15 | 94.7% | 96.2% | 1360 | 1660 | 300 |
| 0.9 | 1.2 | 81.9 | 2 | 14 | 65.4% | 95.5% | 1340 | 1605 | 265 |
| 1.1 | 1.9 | 82 | 1 | 14 | 89.6% | 93.0% | 1350 | 1840 | 490 |
| 1.2 | 0.8 | 82 | 1 | 15 | 98.3% | 97.3% | 1360 | 1505 | 145 |
| 1.3 | 3.7 | 82 | 0 | 13 | 89.4% | 91.8% | 1360 | 2000 | 640 |
| 1.5 | 3.5 | 82 | 1 | 12 | 88.5% | 87.6% | 1350 | 2000 | 650 |
| 1.7 | 2.3 | 82 | 2 | 12 | 90.6% | 91.6% | 1340 | 1940 | 600 |
| 1.8 | 0.2 | 82 | 1 | 15 | 56.8% | 99.3% | 1345 | 1400 | 55 |
| 1.9 | 1.1 | 82 | 1 | 14 | 83.9% | 96.0% | 1345 | 1640 | 295 |
| 2 | 1 | 82 | 2 | 13 | 93.2% | 96.3% | 1335 | 1580 | 245 |
| 2 | 4 | 82 | 0 | 12 | 88.4% | 90.4% | 1360 | 2000 | 640 |
| 2.1 | 1.9 | 82 | 2 | 12 | 94.0% | 93.1% | 1335 | 1855 | 520 |
| 2.1 | 0.9 | 82 | 0 | 15 | 68.4% | 99.1% | 1360 | 1600 | 240 |
| 2.2 | 0.8 | 82 | 1 | 14 | 76.0% | 97.1% | 1345 | 1545 | 200 |
| 2.5 | 2.5 | 82 | 1 | 12 | 82.9% | 91.2% | 1345 | 2000 | 655 |
| 2.6 | 1.4 | 82 | 2 | 12 | 81.3% | 94.9% | 1330 | 1735 | 405 |
| 2.7 | 3.3 | 82 | 1 | 11 | 77.2% | 88.6% | 1345 | 2000 | 655 |
| 2.8 | 2.2 | 82 | 2 | 11 | 76.4% | 92.2% | 1330 | 1960 | 630 |
| 3 | 2 | 82 | 1 | 12 | 69.7% | 93.0% | 1345 | 1945 | 600 |
| 3 | 0 | 82 | 2 | 13 | 15.8% | 100.0% | 1325 | 1405 | 80 |
| 0.3 | 0.7 | 82 | 2 | 15 | 30.3% | 99.3% | 1355 | 1420 | 65 |
| 3.1 | 0.9 | 82 | 1 | 13 | 56.4% | 96.8% | 1340 | 1615 | 275 |
| 3.2 | 3.8 | 82 | 2 | 9 | 63.2% | 91.1% | 1335 | 2000 | 665 |
| 3.3 | 2.7 | 82 | 0 | 12 | 59.9% | 93.2% | 1360 | 2000 | 640 |
| 3.4 | 2.6 | 82 | 1 | 11 | 63.2% | 91.0% | 1345 | 2000 | 655 |
| 3.5 | 1.5 | 82 | 2 | 11 | 36.5% | 94.7% | 1320 | 1800 | 480 |
| 3.5 | 0.5 | 82 | 0 | 14 | 34.0% | 99.6% | 1360 | 1525 | 165 |
| 3.6 | 0.4 | 82 | 1 | 13 | 39.0% | 98.6% | 1330 | 1445 | 115 |
| 3.7 | 0.3 | 82 | 2 | 12 | 30.4% | 98.9% | 1315 | 1425 | 110 |
| 3.8 | 0.2 | 82 | 0 | 14 | 23.9% | 100.0% | 1360 | 1450 | 90 |
| 3.9 | 1.1 | 82 | 1 | 12 | 38.7% | 96.2% | 1330 | 1715 | 385 |
| 4 | 1 | 82 | 2 | 11 | 29.4% | 96.5% | 1315 | 1655 | 340 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 4 | 4 | 82 | 0 | 10 | 48.1% | 89.1% | 1360 | 2000 | 640 |
| 0.4 | 3.6 | 82 | 0 | 14 | 49.9% | 87.6% | 1365 | 2000 | 635 |
| 0.5 | 0.5 | 82 | 2 | 15 | 52.6% | 99.6% | 1355 | 1420 | 65 |
| 0.7 | 1.3 | 82 | 1 | 15 | 83.0% | 96.4% | 1360 | 1650 | 290 |
| 0.8 | 1.2 | 82 | 2 | 14 | 58.2% | 95.5% | 1340 | 1595 | 255 |
| 0.9 | 1.1 | 82 | 2 | 14 | 65.4% | 95.8% | 1340 | 1565 | 225 |
| 1 | 2.9 | 82.1 | 1 | 13 | 68.7% | 89.5% | 1350 | 2000 | 650 |
| 1.1 | 1.8 | 82.1 | 0 | 15 | 95.0% | 94.0% | 1365 | 1835 | 470 |
| 1.2 | 1.7 | 82.1 | 2 | 13 | 73.0% | 93.7% | 1340 | 1755 | 415 |
| 1.3 | 1.6 | 82.1 | 1 | 14 | 96.2% | 94.1% | 1350 | 1760 | 410 |
| 1.4 | 0.5 | 82.1 | 1 | 15 | 99.6% | 98.1% | 1355 | 1410 | 55 |
| 1.5 | 3.4 | 82.1 | 0 | 13 | 90.3% | 92.6% | 1360 | 2000 | 640 |
| 1.6 | 0.3 | 82.1 | 2 | 14 | 69.2% | 98.9% | 1335 | 1375 | 40 |
| 1.7 | 2.2 | 82.1 | 2 | 12 | 90.8% | 92.0% | 1340 | 1910 | 570 |
| 1.8 | 2.1 | 82.1 | 1 | 13 | 94.4% | 92.4% | 1350 | 1915 | 565 |
| 2 | 1.9 | 82.1 | 1 | 13 | 94.5% | 93.1% | 1350 | 1875 | 525 |
| 2 | 0.9 | 82.1 | 2 | 13 | 93.8% | 96.7% | 1335 | 1540 | 205 |
| 2.1 | 1.8 | 82.1 | 0 | 14 | 78.9% | 96.9% | 1360 | 1875 | 515 |
| 2.2 | 1.7 | 82.1 | 1 | 13 | 86.1% | 93.9% | 1345 | 1825 | 480 |
| 2.2 | 0.7 | 82.1 | 2 | 13 | 85.9% | 97.4% | 1330 | 1475 | 145 |
| 2.3 | 3.6 | 82.1 | 0 | 12 | 87.0% | 91.4% | 1360 | 2000 | 640 |
| 2.4 | 3.5 | 82.1 | 1 | 11 | 86.2% | 88.0% | 1350 | 2000 | 650 |
| 2.5 | 2.4 | 82.1 | 2 | 11 | 84.8% | 91.5% | 1335 | 1995 | 660 |
| 2.6 | 1.3 | 82.1 | 0 | 14 | 65.1% | 98.0% | 1360 | 1750 | 390 |
| 2.7 | 1.2 | 82.1 | 1 | 13 | 71.2% | 95.7% | 1345 | 1700 | 355 |
| 2.7 | 3.2 | 82.1 | 2 | 10 | 77.5% | 92.2% | 1335 | 2000 | 665 |
| 2.8 | 2.1 | 82.1 | 0 | 13 | 67.7% | 95.4% | 1360 | 1980 | 620 |
| 2.9 | 3 | 82.1 | 1 | 11 | 73.5% | 89.6% | 1345 | 2000 | 655 |
| 3 | 0.9 | 82.1 | 0 | 14 | 51.5% | 98.9% | 1360 | 1630 | 270 |
| 3.1 | 1.8 | 82.1 | 1 | 12 | 67.3% | 93.7% | 1345 | 1890 | 545 |
| 3.1 | 0.8 | 82.1 | 2 | 12 | 35.8% | 97.1% | 1320 | 1550 | 230 |
| 3.2 | 3.7 | 82.1 | 0 | 11 | 66.1% | 90.5% | 1360 | 2000 | 640 |
| 3.3 | 3.6 | 82.1 | 1 | 10 | 64.8% | 89.2% | 1345 | 2000 | 655 |
| 3.5 | 1.4 | 82.1 | 0 | 13 | 44.4% | 96.9% | 1360 | 1810 | 450 |
| 3.6 | 3.3 | 82.1 | 2 | 9 | 60.1% | 92.3% | 1335 | 2000 | 665 |
| 3.8 | 2.1 | 82.1 | 1 | 11 | 52.8% | 92.8% | 1340 | 1990 | 650 |
| 4 | 1.9 | 82.1 | 1 | 11 | 45.5% | 93.5% | 1335 | 1945 | 610 |
| 0.4 | 0.5 | 82.1 | 2 | 15 | 41.9% | 99.8% | 1355 | 1430 | 75 |
| 0.7 | 1.2 | 82.1 | 2 | 14 | 51.0% | 95.4% | 1340 | 1585 | 245 |
| 0.8 | 1.1 | 82.1 | 2 | 14 | 58.4% | 95.8% | 1340 | 1555 | 215 |
| 0.9 | 2 | 82.1 | 2 | 13 | 54.6% | 92.6% | 1340 | 1820 | 480 |
| 1.1 | 1.7 | 82.2 | 1 | 14 | 89.7% | 93.7% | 1350 | 1775 | 425 |
| 1.2 | 0.6 | 82.2 | 1 | 15 | 99.4% | 97.9% | 1360 | 1425 | 65 |
| 1.3 | 3.5 | 82.2 | 0 | 13 | 90.0% | 92.5% | 1360 | 2000 | 640 |
| 1.4 | 3.4 | 82.2 | 2 | 11 | 67.3% | 90.7% | 1340 | 2000 | 660 |
| 1.6 | 2.2 | 82.2 | 1 | 13 | 94.2% | 92.0% | 1350 | 1930 | 580 |
| 1.8 | 2 | 82.2 | 1 | 13 | 94.8% | 92.8% | 1350 | 1885 | 535 |
| 1.9 | 0.9 | 82.2 | 1 | 14 | 85.0% | 96.7% | 1345 | 1560 | 215 |
| 0.2 | 0.6 | 82.2 | 2 | 15 | 19.9% | 99.9% | 1355 | 1440 | 85 |
| 2.2 | 3.6 | 82.2 | 2 | 10 | 72.5% | 92.1% | 1335 | 2000 | 665 |
| 2.4 | 2.4 | 82.2 | 1 | 12 | 85.7% | 91.5% | 1345 | 2000 | 655 |
| 2.5 | 1.3 | 82.2 | 2 | 12 | 84.8% | 95.3% | 1330 | 1690 | 360 |
| 2.5 | 3.3 | 82.2 | 0 | 12 | 83.1% | 92.2% | 1360 | 2000 | 640 |
| 2.7 | 2.1 | 82.2 | 2 | 11 | 81.2% | 92.5% | 1335 | 1920 | 585 |
| 2.9 | 1.9 | 82.2 | 1 | 12 | 73.7% | 93.3% | 1345 | 1905 | 560 |
| 2.9 | 0.9 | 82.2 | 2 | 12 | 62.6% | 96.7% | 1325 | 1575 | 250 |
| 3 | 3.8 | 82.2 | 0 | 11 | 70.7% | 90.4% | 1360 | 2000 | 640 |
| 0.3 | 3.5 | 82.2 | 2 | 12 | 15.9% | 89.2% | 1345 | 2000 | 655 |
| 3.3 | 2.5 | 82.2 | 1 | 11 | 65.8% | 91.3% | 1345 | 2000 | 655 |
| 3.4 | 0.4 | 82.2 | 0 | 14 | 38.4% | 100.0% | 1360 | 1475 | 115 |
| 3.5 | 3.3 | 82.2 | 1 | 10 | 61.1% | 89.8% | 1345 | 2000 | 655 |
| 3.7 | 1.1 | 82.2 | 0 | 13 | 38.2% | 97.7% | 1360 | 1720 | 360 |
| 3.8 | 0 | 82.2 | 2 | 12 | 22.2% | 100.0% | 1325 | 1425 | 100 |
| 3.9 | 3.9 | 82.2 | 0 | 10 | 50.8% | 89.5% | 1360 | 2000 | 640 |
| 4 | 3.8 | 82.2 | 1 | 9 | 41.8% | 90.2% | 1340 | 2000 | 660 |
| 0.4 | 2.4 | 82.2 | 0 | 15 | 57.4% | 93.2% | 1365 | 1955 | 590 |
| 0.5 | 0.3 | 82.2 | 2 | 15 | 55.6% | 100.0% | 1355 | 1440 | 85 |
| 0.6 | 3.2 | 82.2 | 1 | 13 | 41.6% | 88.9% | 1350 | 2000 | 650 |
| 0.7 | 3.1 | 82.2 | 2 | 12 | 38.4% | 89.6% | 1345 | 2000 | 655 |
| 0.8 | 4 | 82.2 | 1 | 12 | 50.1% | 86.8% | 1355 | 2000 | 645 |
| 0.9 | 3.9 | 82.2 | 1 | 12 | 56.5% | 86.7% | 1355 | 2000 | 645 |
| 1 | 2.7 | 82.3 | 0 | 14 | 92.6% | 90.9% | 1360 | 2000 | 640 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.2 | 2.5 | 82.3 | 1 | 13 | 82.2% | 90.9% | 1350 | 1985 | 635 |
| 1.3 | 1.4 | 82.3 | 0 | 15 | 96.1% | 95.0% | 1365 | 1720 | 355 |
| 1.5 | 1.2 | 82.3 | 1 | 14 | 97.6% | 95.6% | 1350 | 1640 | 290 |
| 1.5 | 3.2 | 82.3 | 0 | 13 | 91.0% | 93.3% | 1360 | 2000 | 640 |
| 1.7 | 3 | 82.3 | 0 | 13 | 91.5% | 93.7% | 1360 | 2000 | 640 |
| 1.8 | 2.9 | 82.3 | 2 | 11 | 84.4% | 91.5% | 1340 | 2000 | 660 |
| 2 | 1.7 | 82.3 | 1 | 13 | 95.7% | 93.8% | 1350 | 1810 | 460 |
| 2 | 0.7 | 82.3 | 2 | 13 | 95.0% | 97.4% | 1335 | 1455 | 120 |
| 2.1 | 1.6 | 82.3 | 0 | 14 | 80.1% | 97.6% | 1360 | 1810 | 450 |
| 2.2 | 1.5 | 82.3 | 1 | 13 | 87.3% | 94.6% | 1345 | 1760 | 415 |
| 2.2 | 0.5 | 82.3 | 2 | 13 | 87.0% | 98.2% | 1330 | 1375 | 45 |
| 2.3 | 3.4 | 82.3 | 0 | 12 | 87.8% | 92.1% | 1360 | 2000 | 640 |
| 2.4 | 0.3 | 82.3 | 1 | 14 | 72.3% | 98.9% | 1345 | 1405 | 60 |
| 2.5 | 0.2 | 82.3 | 2 | 13 | 57.3% | 99.3% | 1330 | 1390 | 60 |
| 2.6 | 0.1 | 82.3 | 0 | 15 | 54.2% | 100.0% | 1360 | 1435 | 75 |
| 2.7 | 1 | 82.3 | 1 | 13 | 72.3% | 96.4% | 1345 | 1625 | 280 |
| 2.7 | 4 | 82.3 | 2 | 9 | 83.0% | 91.0% | 1340 | 2000 | 660 |
| 2.8 | 2.9 | 82.3 | 0 | 12 | 77.2% | 93.2% | 1360 | 2000 | 640 |
| 2.9 | 2.8 | 82.3 | 1 | 11 | 74.2% | 90.3% | 1345 | 2000 | 655 |
| 3 | 1.7 | 82.3 | 2 | 11 | 73.7% | 93.9% | 1330 | 1825 | 495 |
| 3 | 0.7 | 82.3 | 0 | 14 | 52.5% | 99.6% | 1360 | 1550 | 190 |
| 3.1 | 1.6 | 82.3 | 1 | 12 | 68.4% | 94.3% | 1345 | 1825 | 480 |
| 3.1 | 0.6 | 82.3 | 2 | 12 | 66.3% | 97.8% | 1325 | 1460 | 135 |
| 3.2 | 3.5 | 82.3 | 0 | 11 | 66.8% | 91.2% | 1360 | 2000 | 640 |
| 3.3 | 3.4 | 82.3 | 1 | 10 | 65.5% | 90.0% | 1345 | 2000 | 655 |
| 3.4 | 2.3 | 82.3 | 2 | 10 | 67.0% | 93.3% | 1335 | 1995 | 660 |
| 3.5 | 1.2 | 82.3 | 0 | 13 | 45.3% | 97.6% | 1360 | 1745 | 385 |
| 3.6 | 0.1 | 82.3 | 1 | 13 | 27.0% | 99.7% | 1330 | 1425 | 95 |
| 3.6 | 3.1 | 82.3 | 2 | 9 | 60.2% | 93.0% | 1335 | 2000 | 665 |
| 3.7 | 3 | 82.3 | 0 | 11 | 56.4% | 92.2% | 1360 | 2000 | 640 |
| 3.8 | 2.9 | 82.3 | 1 | 10 | 55.3% | 90.5% | 1345 | 2000 | 655 |
| 3.9 | 1.8 | 82.3 | 2 | 10 | 48.0% | 93.7% | 1325 | 1885 | 560 |
| 3.9 | 0.8 | 82.3 | 0 | 13 | 32.0% | 98.5% | 1360 | 1615 | 255 |
| 0.4 | 3.3 | 82.3 | 2 | 12 | 21.5% | 89.7% | 1345 | 2000 | 655 |
| 0.5 | 3.2 | 82.3 | 0 | 14 | 59.5% | 88.6% | 1365 | 2000 | 635 |
| 0.7 | 1 | 82.3 | 1 | 15 | 83.7% | 97.5% | 1360 | 1540 | 180 |
| 0.7 | 4 | 82.3 | 0 | 13 | 57.3% | 88.3% | 1360 | 2000 | 640 |
| 0.8 | 3.9 | 82.3 | 0 | 13 | 65.0% | 89.1% | 1360 | 2000 | 640 |
| 1 | 3.6 | 82.4 | 1 | 12 | 58.7% | 87.5% | 1350 | 2000 | 650 |
| 1.1 | 2.5 | 82.4 | 0 | 14 | 93.3% | 92.1% | 1360 | 2000 | 640 |
| 1.2 | 2.4 | 82.4 | 2 | 12 | 67.4% | 91.2% | 1345 | 1920 | 575 |
| 1.3 | 2.3 | 82.4 | 1 | 13 | 88.9% | 91.6% | 1350 | 1930 | 580 |
| 1.4 | 1.2 | 82.4 | 0 | 15 | 96.6% | 95.6% | 1365 | 1655 | 290 |
| 1.6 | 1 | 82.4 | 1 | 14 | 98.3% | 96.3% | 1350 | 1575 | 225 |
| 1.6 | 4 | 82.4 | 2 | 10 | 61.5% | 91.9% | 1335 | 2000 | 665 |
| 1.7 | 3.9 | 82.4 | 1 | 11 | 84.9% | 88.3% | 1350 | 2000 | 650 |
| 1.8 | 2.8 | 82.4 | 2 | 11 | 84.5% | 91.9% | 1340 | 2000 | 660 |
| 1.9 | 1.7 | 82.4 | 0 | 14 | 86.5% | 97.6% | 1360 | 1825 | 465 |
| 2 | 1.6 | 82.4 | 1 | 13 | 96.1% | 94.2% | 1350 | 1775 | 425 |
| 2 | 0.6 | 82.4 | 2 | 13 | 95.7% | 97.8% | 1335 | 1410 | 75 |
| 2.2 | 1.4 | 82.4 | 1 | 13 | 87.9% | 94.9% | 1345 | 1725 | 380 |
| 2.2 | 0.4 | 82.4 | 2 | 13 | 86.9% | 98.5% | 1330 | 1375 | 45 |
| 2.3 | 0.3 | 82.4 | 0 | 15 | 63.9% | 100.0% | 1360 | 1425 | 65 |
| 2.4 | 2.2 | 82.4 | 1 | 12 | 86.4% | 92.2% | 1345 | 1955 | 610 |
| 2.5 | 1.1 | 82.4 | 2 | 12 | 85.5% | 96.0% | 1330 | 1620 | 290 |
| 2.6 | 0 | 82.4 | 1 | 14 | 71.7% | 100.0% | 1355 | 1415 | 60 |
| 2.8 | 2.8 | 82.4 | 0 | 12 | 77.5% | 93.5% | 1360 | 2000 | 640 |
| 3 | 1.6 | 82.4 | 2 | 11 | 74.0% | 94.3% | 1330 | 1790 | 460 |
| 3.1 | 1.5 | 82.4 | 1 | 12 | 68.9% | 94.7% | 1345 | 1795 | 450 |
| 3.2 | 3.4 | 82.4 | 0 | 11 | 67.1% | 91.5% | 1360 | 2000 | 640 |
| 3.4 | 0.2 | 82.4 | 2 | 12 | 24.8% | 99.3% | 1315 | 1415 | 100 |
| 3.5 | 0.1 | 82.4 | 0 | 14 | 35.2% | 100.0% | 1360 | 1435 | 75 |
| 3.6 | 1 | 82.4 | 1 | 12 | 49.9% | 96.5% | 1335 | 1655 | 320 |
| 3.7 | 2.9 | 82.4 | 0 | 11 | 56.7% | 92.5% | 1360 | 2000 | 640 |
| 3.9 | 1.7 | 82.4 | 2 | 10 | 48.3% | 94.1% | 1325 | 1855 | 530 |
| 3.9 | 0.7 | 82.4 | 0 | 13 | 32.4% | 98.9% | 1360 | 1570 | 210 |
| 4 | 0.6 | 82.4 | 1 | 12 | 37.7% | 97.9% | 1330 | 1510 | 180 |
| 0.5 | 3.1 | 82.4 | 0 | 14 | 59.5% | 89.0% | 1365 | 2000 | 635 |
| 0.7 | 3.9 | 82.4 | 2 | 11 | 34.7% | 90.8% | 1340 | 2000 | 660 |
| 0.9 | 2.7 | 82.4 | 0 | 14 | 87.9% | 90.4% | 1360 | 2000 | 640 |
| 1.1 | 2.4 | 82.5 | 1 | 13 | 75.6% | 91.2% | 1350 | 1945 | 595 |
| 1.3 | 1.2 | 82.5 | 2 | 13 | 79.4% | 95.5% | 1340 | 1590 | 250 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.4 | 3.1 | 82.5 | 0 | 13 | 91.3% | 93.7% | 1360 | 2000 | 640 |
| 1.5 | 4 | 82.5 | 1 | 11 | 75.9% | 88.5% | 1350 | 2000 | 650 |
| 1.6 | 2.9 | 82.5 | 0 | 13 | 91.9% | 94.2% | 1360 | 2000 | 640 |
| 1.7 | 2.8 | 82.5 | 1 | 12 | 92.3% | 90.0% | 1350 | 2000 | 650 |
| 1.9 | 0.6 | 82.5 | 1 | 14 | 86.8% | 97.8% | 1345 | 1430 | 85 |
| 0.2 | 3.3 | 82.5 | 0 | 14 | 27.7% | 88.8% | 1365 | 2000 | 635 |
| 2.1 | 0.4 | 82.5 | 1 | 14 | 81.2% | 98.5% | 1345 | 1395 | 50 |
| 2.2 | 0.3 | 82.5 | 2 | 13 | 71.5% | 98.9% | 1330 | 1375 | 45 |
| 2.3 | 0.2 | 82.5 | 0 | 15 | 64.1% | 100.0% | 1360 | 1425 | 65 |
| 2.5 | 1 | 82.5 | 2 | 12 | 85.9% | 96.3% | 1330 | 1580 | 250 |
| 2.6 | 3.9 | 82.5 | 1 | 10 | 80.9% | 90.0% | 1345 | 2000 | 655 |
| 2.8 | 1.7 | 82.5 | 0 | 13 | 69.9% | 96.8% | 1360 | 1860 | 500 |
| 2.9 | 1.6 | 82.5 | 1 | 12 | 75.3% | 94.3% | 1345 | 1810 | 465 |
| 3 | 3.5 | 82.5 | 0 | 11 | 71.8% | 91.4% | 1360 | 2000 | 640 |
| 3.1 | 3.4 | 82.5 | 2 | 9 | 64.6% | 92.5% | 1335 | 2000 | 665 |
| 3.2 | 2.3 | 82.5 | 0 | 12 | 65.8% | 94.7% | 1360 | 2000 | 640 |
| 3.3 | 0.2 | 82.5 | 1 | 13 | 50.6% | 99.3% | 1335 | 1420 | 85 |
| 3.4 | 0.1 | 82.5 | 2 | 12 | 22.9% | 99.7% | 1315 | 1415 | 100 |
| 3.4 | 3.1 | 82.5 | 0 | 11 | 63.2% | 92.2% | 1360 | 2000 | 640 |
| 3.5 | 4 | 82.5 | 1 | 9 | 57.5% | 90.1% | 1345 | 2000 | 655 |
| 3.6 | 2.9 | 82.5 | 2 | 9 | 60.3% | 93.6% | 1335 | 2000 | 665 |
| 3.7 | 1.8 | 82.5 | 0 | 12 | 49.3% | 95.8% | 1360 | 1915 | 555 |
| 3.8 | 1.7 | 82.5 | 1 | 11 | 54.6% | 94.1% | 1340 | 1870 | 530 |
| 3.8 | 0.7 | 82.5 | 2 | 11 | 25.5% | 97.5% | 1315 | 1520 | 205 |
| 3.9 | 3.6 | 82.5 | 0 | 10 | 51.7% | 90.5% | 1360 | 2000 | 640 |
| 4 | 3.5 | 82.5 | 1 | 9 | 41.5% | 91.2% | 1340 | 2000 | 660 |
| 0.4 | 2.1 | 82.5 | 2 | 13 | 25.6% | 92.1% | 1345 | 1800 | 455 |
| 0.6 | 2.9 | 82.5 | 1 | 13 | 41.6% | 90.1% | 1350 | 2000 | 650 |
| 0.7 | 1.8 | 82.5 | 0 | 15 | 95.7% | 94.7% | 1365 | 1795 | 430 |
| 0.9 | 1.6 | 82.5 | 1 | 14 | 74.9% | 94.0% | 1350 | 1720 | 370 |
| 0.9 | 0.6 | 82.5 | 2 | 14 | 65.5% | 97.7% | 1340 | 1400 | 60 |
| 1.1 | 3.3 | 82.6 | 1 | 12 | 64.8% | 88.3% | 1350 | 2000 | 650 |
| 1.2 | 2.2 | 82.6 | 0 | 14 | 94.3% | 93.8% | 1360 | 1920 | 560 |
| 1.3 | 2.1 | 82.6 | 2 | 12 | 69.1% | 92.2% | 1340 | 1840 | 500 |
| 1.4 | 2 | 82.6 | 0 | 14 | 94.9% | 95.4% | 1360 | 1875 | 515 |
| 1.5 | 1.9 | 82.6 | 2 | 12 | 80.2% | 93.0% | 1340 | 1795 | 455 |
| 1.5 | 0.9 | 82.6 | 0 | 15 | 97.6% | 96.7% | 1365 | 1550 | 185 |
| 1.6 | 0.8 | 82.6 | 1 | 14 | 99.0% | 97.0% | 1350 | 1495 | 145 |
| 1.7 | 3.7 | 82.6 | 2 | 10 | 64.9% | 92.9% | 1335 | 2000 | 665 |
| 1.8 | 2.6 | 82.6 | 0 | 13 | 92.9% | 95.0% | 1360 | 2000 | 640 |
| 1.9 | 2.5 | 82.6 | 1 | 12 | 93.3% | 91.0% | 1350 | 2000 | 650 |
| 2 | 1.4 | 82.6 | 2 | 12 | 96.9% | 94.8% | 1335 | 1680 | 345 |
| 2 | 0.4 | 82.6 | 0 | 15 | 74.7% | 100.0% | 1360 | 1415 | 55 |
| 2.1 | 2.3 | 82.6 | 1 | 12 | 93.9% | 91.7% | 1350 | 1960 | 610 |
| 2.2 | 1.2 | 82.6 | 2 | 12 | 94.5% | 95.6% | 1335 | 1630 | 295 |
| 2.2 | 3.2 | 82.6 | 0 | 12 | 90.9% | 92.9% | 1360 | 2000 | 640 |
| 2.3 | 3.1 | 82.6 | 1 | 11 | 90.4% | 89.8% | 1350 | 2000 | 650 |
| 2.4 | 3 | 82.6 | 2 | 10 | 75.3% | 93.9% | 1335 | 2000 | 665 |
| 2.5 | 1.9 | 82.6 | 0 | 13 | 80.7% | 96.5% | 1360 | 1895 | 535 |
| 2.6 | 1.8 | 82.6 | 1 | 12 | 83.2% | 93.6% | 1345 | 1850 | 505 |
| 2.6 | 0.8 | 82.6 | 2 | 12 | 84.4% | 97.1% | 1330 | 1510 | 180 |
| 2.7 | 3.7 | 82.6 | 0 | 11 | 78.7% | 91.1% | 1360 | 2000 | 640 |
| 2.8 | 3.6 | 82.6 | 1 | 10 | 77.1% | 90.5% | 1345 | 2000 | 655 |
| 2.9 | 2.5 | 82.6 | 2 | 10 | 77.5% | 94.4% | 1335 | 2000 | 665 |
| 3 | 1.4 | 82.6 | 0 | 13 | 63.7% | 97.6% | 1360 | 1775 | 415 |
| 0.3 | 0.1 | 82.6 | 2 | 15 | 34.1% | 100.0% | 1360 | 1475 | 115 |
| 3.1 | 1.3 | 82.6 | 2 | 11 | 72.8% | 95.3% | 1330 | 1700 | 370 |
| 3.1 | 3.3 | 82.6 | 0 | 11 | 70.0% | 91.9% | 1360 | 2000 | 640 |
| 3.2 | 3.2 | 82.6 | 1 | 10 | 68.7% | 91.0% | 1345 | 2000 | 655 |
| 3.3 | 2.1 | 82.6 | 2 | 10 | 70.1% | 94.5% | 1335 | 1930 | 595 |
| 3.4 | 2 | 82.6 | 0 | 12 | 59.7% | 95.5% | 1360 | 1955 | 595 |
| 3.5 | 1.9 | 82.6 | 1 | 11 | 61.5% | 93.4% | 1340 | 1910 | 570 |
| 3.5 | 0.9 | 82.6 | 2 | 11 | 36.0% | 96.8% | 1320 | 1580 | 260 |
| 3.6 | 3.8 | 82.6 | 0 | 10 | 58.6% | 90.2% | 1360 | 2000 | 640 |
| 3.8 | 2.6 | 82.6 | 2 | 9 | 60.3% | 94.4% | 1335 | 2000 | 665 |
| 3.9 | 1.5 | 82.6 | 0 | 12 | 43.2% | 96.6% | 1360 | 1835 | 475 |
| 4 | 1.4 | 82.6 | 1 | 11 | 47.6% | 95.1% | 1335 | 1790 | 455 |
| 4 | 0.4 | 82.6 | 2 | 11 | 28.8% | 98.6% | 1315 | 1440 | 125 |
| 0.4 | 4 | 82.6 | 1 | 12 | 24.6% | 88.3% | 1355 | 2000 | 645 |
| 0.6 | 2.8 | 82.6 | 0 | 14 | 68.9% | 89.8% | 1365 | 2000 | 635 |
| 0.7 | 2.7 | 82.6 | 2 | 12 | 38.6% | 91.2% | 1345 | 1960 | 615 |
| 0.8 | 2.6 | 82.6 | 1 | 13 | 55.3% | 90.4% | 1350 | 1975 | 625 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.9 | 1.5 | 82.6 | 0 | 15 | 96.6% | 95.4% | 1365 | 1715 | 350 |
| 1 | 1.3 | 82.7 | 2 | 13 | 61.0% | 95.1% | 1340 | 1595 | 255 |
| 1.1 | 3.2 | 82.7 | 0 | 13 | 87.6% | 93.1% | 1360 | 2000 | 640 |
| 1.2 | 3.1 | 82.7 | 2 | 11 | 58.9% | 92.5% | 1340 | 2000 | 660 |
| 1.3 | 3 | 82.7 | 0 | 13 | 91.7% | 94.2% | 1360 | 2000 | 640 |
| 1.4 | 2.9 | 82.7 | 2 | 11 | 67.5% | 92.7% | 1340 | 2000 | 660 |
| 1.5 | 1.8 | 82.7 | 0 | 14 | 95.6% | 96.7% | 1360 | 1825 | 465 |
| 1.6 | 1.7 | 82.7 | 1 | 13 | 96.0% | 93.8% | 1350 | 1775 | 425 |
| 1.6 | 0.7 | 82.7 | 2 | 13 | 98.0% | 97.4% | 1340 | 1420 | 80 |
| 1.8 | 3.5 | 82.7 | 1 | 11 | 89.7% | 89.6% | 1350 | 2000 | 650 |
| 1.9 | 2.4 | 82.7 | 2 | 11 | 89.1% | 93.2% | 1340 | 1940 | 600 |
| 2 | 1.3 | 82.7 | 0 | 14 | 85.4% | 98.9% | 1360 | 1700 | 340 |
| 0.2 | 0.1 | 82.7 | 2 | 15 | 28.0% | 100.0% | 1365 | 1485 | 120 |
| 2.1 | 0.2 | 82.7 | 2 | 13 | 71.2% | 99.3% | 1335 | 1370 | 35 |
| 2.3 | 1 | 82.7 | 1 | 13 | 86.6% | 96.3% | 1345 | 1590 | 245 |
| 2.3 | 4 | 82.7 | 2 | 9 | 88.8% | 91.4% | 1345 | 2000 | 655 |
| 2.4 | 2.9 | 82.7 | 0 | 12 | 87.2% | 93.7% | 1360 | 2000 | 640 |
| 2.6 | 1.7 | 82.7 | 2 | 11 | 85.2% | 93.9% | 1335 | 1790 | 455 |
| 2.7 | 0.6 | 82.7 | 1 | 13 | 74.4% | 97.8% | 1345 | 1455 | 110 |
| 2.9 | 2.4 | 82.7 | 0 | 12 | 76.5% | 94.8% | 1360 | 2000 | 640 |
| 0.3 | 1 | 82.7 | 2 | 14 | 29.2% | 96.3% | 1355 | 1470 | 115 |
| 3.1 | 1.2 | 82.7 | 1 | 12 | 70.4% | 95.7% | 1345 | 1690 | 345 |
| 3.1 | 3.2 | 82.7 | 2 | 9 | 64.3% | 93.2% | 1335 | 2000 | 665 |
| 3.3 | 3 | 82.7 | 1 | 10 | 67.0% | 91.4% | 1345 | 2000 | 655 |
| 3.4 | 0.9 | 82.7 | 0 | 13 | 50.7% | 98.9% | 1360 | 1625 | 265 |
| 3.5 | 0.8 | 82.7 | 1 | 12 | 56.1% | 97.2% | 1340 | 1565 | 225 |
| 3.6 | 3.7 | 82.7 | 2 | 8 | 71.0% | 91.3% | 1345 | 2000 | 655 |
| 3.8 | 2.5 | 82.7 | 1 | 10 | 56.6% | 92.0% | 1345 | 2000 | 655 |
| 3.9 | 0.4 | 82.7 | 0 | 13 | 33.8% | 100.0% | 1360 | 1460 | 100 |
| 0.4 | 3.9 | 82.7 | 2 | 11 | 19.8% | 91.6% | 1340 | 2000 | 660 |
| 0.7 | 2.6 | 82.7 | 2 | 12 | 38.6% | 91.6% | 1345 | 1930 | 585 |
| 1 | 1.2 | 82.8 | 2 | 13 | 61.1% | 95.5% | 1340 | 1560 | 220 |
| 1.1 | 3.1 | 82.8 | 0 | 13 | 87.6% | 93.5% | 1360 | 2000 | 640 |
| 1.2 | 4 | 82.8 | 1 | 11 | 62.3% | 89.3% | 1350 | 2000 | 650 |
| 1.3 | 2.9 | 82.8 | 0 | 13 | 92.1% | 94.6% | 1360 | 2000 | 640 |
| 1.4 | 2.8 | 82.8 | 1 | 12 | 83.2% | 89.9% | 1350 | 2000 | 650 |
| 1.5 | 0.7 | 82.8 | 0 | 15 | 97.3% | 97.4% | 1360 | 1470 | 110 |
| 1.7 | 3.5 | 82.8 | 2 | 10 | 64.6% | 93.5% | 1335 | 2000 | 665 |
| 1.9 | 2.3 | 82.8 | 1 | 12 | 94.0% | 91.7% | 1350 | 1940 | 590 |
| 2 | 1.2 | 82.8 | 2 | 12 | 97.7% | 95.6% | 1335 | 1610 | 275 |
| 2 | 3.2 | 82.8 | 0 | 12 | 91.0% | 93.1% | 1360 | 2000 | 640 |
| 2.1 | 0.1 | 82.8 | 0 | 15 | 71.7% | 100.0% | 1360 | 1420 | 60 |
| 2.2 | 4 | 82.8 | 2 | 9 | 86.9% | 91.5% | 1345 | 2000 | 655 |
| 2.4 | 2.8 | 82.8 | 1 | 11 | 89.1% | 90.7% | 1350 | 2000 | 650 |
| 2.5 | 0.7 | 82.8 | 0 | 14 | 72.5% | 100.0% | 1360 | 1510 | 150 |
| 2.6 | 0.6 | 82.8 | 1 | 13 | 78.0% | 97.8% | 1345 | 1445 | 100 |
| 2.8 | 2.4 | 82.8 | 0 | 12 | 79.0% | 94.9% | 1360 | 2000 | 640 |
| 3 | 1.2 | 82.8 | 2 | 11 | 75.5% | 95.7% | 1330 | 1655 | 325 |
| 3 | 3.2 | 82.8 | 0 | 11 | 72.9% | 92.4% | 1360 | 2000 | 640 |
| 0.3 | 0.9 | 82.8 | 2 | 14 | 29.2% | 96.6% | 1355 | 1430 | 75 |
| 3.1 | 3.1 | 82.8 | 1 | 10 | 71.5% | 91.6% | 1345 | 2000 | 655 |
| 3.2 | 3 | 82.8 | 2 | 9 | 65.8% | 93.8% | 1335 | 2000 | 665 |
| 3.3 | 1.9 | 82.8 | 0 | 12 | 64.1% | 96.0% | 1360 | 1920 | 560 |
| 3.4 | 1.8 | 82.8 | 1 | 11 | 65.8% | 93.7% | 1345 | 1870 | 525 |
| 3.4 | 0.8 | 82.8 | 2 | 11 | 56.8% | 97.1% | 1325 | 1530 | 205 |
| 3.5 | 3.7 | 82.8 | 0 | 10 | 61.5% | 90.6% | 1360 | 2000 | 640 |
| 3.6 | 3.6 | 82.8 | 1 | 9 | 57.6% | 91.3% | 1345 | 2000 | 655 |
| 3.7 | 2.5 | 82.8 | 2 | 9 | 60.4% | 94.9% | 1335 | 2000 | 665 |
| 3.8 | 1.4 | 82.8 | 0 | 12 | 47.5% | 97.1% | 1360 | 1795 | 435 |
| 3.9 | 1.3 | 82.8 | 1 | 11 | 53.2% | 95.4% | 1340 | 1745 | 405 |
| 3.9 | 3.3 | 82.8 | 2 | 8 | 64.9% | 92.2% | 1345 | 2000 | 655 |
| 4 | 2.2 | 82.8 | 0 | 11 | 50.4% | 94.5% | 1360 | 2000 | 640 |
| 0.4 | 3.8 | 82.8 | 1 | 12 | 24.6% | 89.0% | 1355 | 2000 | 645 |
| 0.6 | 2.6 | 82.8 | 2 | 12 | 32.9% | 91.9% | 1345 | 1920 | 575 |
| 0.7 | 2.5 | 82.8 | 1 | 13 | 48.5% | 91.2% | 1350 | 1935 | 585 |
| 0.9 | 1.3 | 82.8 | 2 | 13 | 54.9% | 95.1% | 1340 | 1585 | 245 |
| 1 | 0.1 | 82.9 | 1 | 15 | 78.3% | 100.0% | 1360 | 1420 | 60 |
| 1.1 | 4 | 82.9 | 1 | 11 | 57.7% | 89.5% | 1350 | 2000 | 650 |
| 1.2 | 2.9 | 82.9 | 0 | 13 | 92.1% | 94.7% | 1360 | 2000 | 640 |
| 1.3 | 2.8 | 82.9 | 1 | 12 | 77.2% | 89.8% | 1350 | 2000 | 650 |
| 1.4 | 1.7 | 82.9 | 2 | 12 | 75.0% | 93.7% | 1340 | 1720 | 380 |
| 1.4 | 0.7 | 82.9 | 0 | 15 | 98.9% | 97.4% | 1365 | 1460 | 95 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.5 | 0.6 | 82.9 | 1 | 14 | 99.9% | 97.8% | 1350 | 1395 | 45 |
| 1.6 | 3.5 | 82.9 | 2 | 10 | 59.9% | 93.7% | 1335 | 2000 | 665 |
| 1.7 | 2.4 | 82.9 | 0 | 13 | 93.6% | 95.9% | 1360 | 1980 | 620 |
| 1.8 | 2.3 | 82.9 | 1 | 12 | 94.0% | 91.7% | 1350 | 1930 | 580 |
| 1.9 | 1.2 | 82.9 | 2 | 12 | 97.8% | 95.6% | 1340 | 1600 | 260 |
| 1.9 | 3.2 | 82.9 | 0 | 12 | 91.1% | 93.3% | 1360 | 2000 | 640 |
| 2 | 3.1 | 82.9 | 1 | 11 | 91.4% | 90.6% | 1350 | 2000 | 650 |
| 2.1 | 1 | 82.9 | 2 | 12 | 97.8% | 96.3% | 1335 | 1545 | 210 |
| 2.1 | 4 | 82.9 | 0 | 11 | 88.6% | 90.8% | 1360 | 2000 | 640 |
| 2.2 | 3.9 | 82.9 | 1 | 10 | 88.9% | 91.0% | 1345 | 2000 | 655 |
| 2.3 | 2.8 | 82.9 | 2 | 10 | 73.4% | 95.0% | 1335 | 2000 | 665 |
| 2.4 | 1.7 | 82.9 | 0 | 13 | 85.9% | 97.4% | 1360 | 1825 | 465 |
| 2.5 | 1.6 | 82.9 | 1 | 12 | 86.4% | 94.2% | 1345 | 1775 | 430 |
| 2.5 | 0.6 | 82.9 | 2 | 12 | 89.7% | 97.8% | 1335 | 1410 | 75 |
| 2.6 | 3.5 | 82.9 | 0 | 11 | 82.2% | 91.9% | 1360 | 2000 | 640 |
| 2.7 | 3.4 | 82.9 | 1 | 10 | 80.4% | 91.6% | 1345 | 2000 | 655 |
| 2.8 | 2.3 | 82.9 | 2 | 10 | 77.5% | 95.5% | 1335 | 1945 | 610 |
| 2.9 | 1.2 | 82.9 | 0 | 13 | 68.8% | 98.5% | 1360 | 1700 | 340 |
| 3 | 0.1 | 82.9 | 1 | 13 | 43.4% | 99.7% | 1340 | 1410 | 70 |
| 3 | 3.1 | 82.9 | 2 | 9 | 78.7% | 93.7% | 1340 | 2000 | 660 |
| 0.3 | 0.8 | 82.9 | 1 | 15 | 35.9% | 98.9% | 1360 | 1420 | 60 |
| 3.1 | 3 | 82.9 | 0 | 11 | 71.1% | 93.0% | 1360 | 2000 | 640 |
| 3.2 | 2.9 | 82.9 | 1 | 10 | 69.8% | 92.1% | 1345 | 2000 | 655 |
| 3.3 | 1.8 | 82.9 | 2 | 10 | 71.2% | 95.7% | 1335 | 1835 | 500 |
| 3.3 | 0.8 | 82.9 | 0 | 13 | 55.1% | 99.4% | 1360 | 1575 | 215 |
| 3.4 | 0.7 | 82.9 | 1 | 12 | 59.9% | 97.5% | 1340 | 1515 | 175 |
| 3.5 | 3.6 | 82.9 | 2 | 8 | 73.2% | 91.7% | 1345 | 2000 | 655 |
| 3.6 | 2.5 | 82.9 | 0 | 11 | 60.3% | 94.0% | 1360 | 2000 | 640 |
| 3.7 | 2.4 | 82.9 | 1 | 10 | 59.3% | 92.6% | 1345 | 2000 | 655 |
| 3.8 | 1.3 | 82.9 | 2 | 10 | 59.4% | 95.7% | 1330 | 1715 | 385 |
| 3.8 | 3.3 | 82.9 | 0 | 10 | 55.2% | 91.6% | 1360 | 2000 | 640 |
| 4 | 2.1 | 82.9 | 2 | 9 | 57.8% | 95.9% | 1335 | 1940 | 605 |
| 0.4 | 2.7 | 82.9 | 0 | 14 | 49.2% | 90.4% | 1365 | 1995 | 630 |
| 0.5 | 2.6 | 82.9 | 2 | 12 | 27.3% | 92.2% | 1345 | 1910 | 565 |
| 0.6 | 2.5 | 82.9 | 1 | 13 | 41.6% | 91.6% | 1350 | 1925 | 575 |
| 0.7 | 1.4 | 82.9 | 0 | 15 | 97.2% | 96.1% | 1365 | 1665 | 300 |
| 0.9 | 1.2 | 82.9 | 1 | 14 | 75.0% | 95.5% | 1350 | 1585 | 235 |
| 0.9 | 3.2 | 82.9 | 0 | 13 | 72.7% | 92.2% | 1360 | 2000 | 640 |
| 1 | 4 | 83 | 1 | 11 | 53.1% | 89.8% | 1350 | 2000 | 650 |
| 1.1 | 2.9 | 83 | 0 | 13 | 87.7% | 94.3% | 1360 | 2000 | 640 |
| 1.2 | 2.8 | 83 | 1 | 12 | 71.2% | 89.9% | 1350 | 2000 | 650 |
| 1.3 | 0.7 | 83 | 0 | 15 | 99.0% | 97.4% | 1365 | 1450 | 85 |
| 1.4 | 0.6 | 83 | 1 | 14 | 99.9% | 97.8% | 1350 | 1385 | 35 |
| 1.5 | 3.5 | 83 | 2 | 10 | 55.0% | 93.8% | 1335 | 2000 | 665 |
| 1.6 | 2.4 | 83 | 0 | 13 | 93.7% | 96.0% | 1360 | 1970 | 610 |
| 1.7 | 2.3 | 83 | 1 | 12 | 94.1% | 91.6% | 1350 | 1920 | 570 |
| 1.8 | 1.2 | 83 | 2 | 12 | 97.6% | 95.5% | 1340 | 1590 | 250 |
| 1.8 | 3.2 | 83 | 0 | 12 | 91.1% | 93.4% | 1360 | 2000 | 640 |
| 2 | 3 | 83 | 2 | 10 | 68.9% | 95.0% | 1335 | 2000 | 665 |
| 0.2 | 2.8 | 83 | 0 | 14 | 27.4% | 90.3% | 1365 | 2000 | 635 |
| 2.1 | 3.9 | 83 | 1 | 10 | 86.9% | 91.3% | 1345 | 2000 | 655 |
| 2.2 | 2.8 | 83 | 2 | 10 | 71.8% | 95.3% | 1335 | 2000 | 665 |
| 2.3 | 1.7 | 83 | 0 | 13 | 89.9% | 97.6% | 1360 | 1815 | 455 |
| 2.4 | 0.6 | 83 | 2 | 12 | 92.1% | 97.8% | 1335 | 1400 | 65 |
| 2.5 | 3.5 | 83 | 0 | 11 | 84.8% | 92.0% | 1360 | 2000 | 640 |
| 2.6 | 3.4 | 83 | 1 | 10 | 83.0% | 91.8% | 1345 | 2000 | 655 |
| 2.8 | 1.2 | 83 | 0 | 13 | 72.8% | 98.7% | 1360 | 1690 | 330 |
| 2.9 | 3.1 | 83 | 2 | 9 | 82.5% | 93.8% | 1340 | 2000 | 660 |
| 0.3 | 2.7 | 83 | 1 | 13 | 20.6% | 91.0% | 1350 | 1955 | 605 |
| 3.2 | 1.8 | 83 | 2 | 10 | 73.6% | 96.1% | 1335 | 1830 | 495 |
| 3.2 | 0.8 | 83 | 0 | 13 | 59.1% | 99.6% | 1360 | 1570 | 210 |
| 3.3 | 0.7 | 83 | 1 | 12 | 63.3% | 97.5% | 1340 | 1505 | 165 |
| 3.5 | 2.5 | 83 | 0 | 11 | 62.7% | 94.1% | 1360 | 2000 | 640 |
| 3.7 | 1.3 | 83 | 2 | 10 | 61.7% | 96.1% | 1330 | 1705 | 375 |
| 3.7 | 3.3 | 83 | 0 | 10 | 57.7% | 91.7% | 1360 | 2000 | 640 |
| 3.8 | 3.2 | 83 | 1 | 9 | 57.7% | 92.4% | 1345 | 2000 | 655 |
| 0.4 | 1.6 | 83 | 1 | 14 | 42.9% | 94.0% | 1360 | 1670 | 310 |
| 0.4 | 0.6 | 83 | 2 | 14 | 35.0% | 97.7% | 1350 | 1445 | 95 |
| 0.6 | 3.4 | 83 | 0 | 13 | 49.5% | 90.1% | 1360 | 2000 | 640 |
| 0.8 | 2.2 | 83 | 2 | 12 | 44.5% | 93.0% | 1345 | 1820 | 475 |
| 1.1 | 1.8 | 83.1 | 0 | 14 | 95.8% | 94.9% | 1360 | 1785 | 425 |
| 1.2 | 0.7 | 83.1 | 2 | 13 | 73.7% | 97.3% | 1340 | 1390 | 50 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.4 | 3.5 | 83.1 | 1 | 11 | 71.6% | 90.7% | 1350 | 2000 | 650 |
| 1.6 | 1.3 | 83.1 | 0 | 14 | 97.3% | 99.2% | 1360 | 1665 | 305 |
| 1.7 | 1.2 | 83.1 | 1 | 13 | 97.8% | 95.5% | 1350 | 1610 | 260 |
| 1.7 | 3.2 | 83.1 | 2 | 10 | 63.9% | 94.6% | 1335 | 2000 | 665 |
| 1.8 | 2.1 | 83.1 | 0 | 13 | 94.6% | 96.8% | 1360 | 1900 | 540 |
| 2 | 1.9 | 83.1 | 2 | 11 | 93.8% | 95.0% | 1340 | 1795 | 455 |
| 2.1 | 2.8 | 83.1 | 1 | 11 | 92.4% | 91.5% | 1350 | 2000 | 650 |
| 2.2 | 0.7 | 83.1 | 0 | 14 | 82.3% | 100.0% | 1360 | 1485 | 125 |
| 2.3 | 0.6 | 83.1 | 1 | 13 | 88.9% | 97.8% | 1345 | 1420 | 75 |
| 2.4 | 3.5 | 83.1 | 2 | 9 | 89.3% | 93.0% | 1345 | 2000 | 655 |
| 2.5 | 2.4 | 83.1 | 0 | 12 | 86.6% | 95.3% | 1360 | 2000 | 640 |
| 2.7 | 1.2 | 83.1 | 2 | 11 | 84.7% | 95.6% | 1335 | 1630 | 295 |
| 2.8 | 3.1 | 83.1 | 1 | 10 | 79.1% | 92.4% | 1345 | 2000 | 655 |
| 3 | 1.9 | 83.1 | 0 | 12 | 75.8% | 96.4% | 1360 | 1895 | 535 |
| 0.3 | 1.6 | 83.1 | 1 | 14 | 33.0% | 94.2% | 1360 | 1660 | 300 |
| 3.1 | 0.8 | 83.1 | 2 | 11 | 74.6% | 97.1% | 1330 | 1510 | 180 |
| 3.3 | 3.6 | 83.1 | 1 | 9 | 72.1% | 91.6% | 1350 | 2000 | 650 |
| 3.4 | 2.5 | 83.1 | 2 | 9 | 61.8% | 95.3% | 1335 | 2000 | 665 |
| 3.5 | 1.4 | 83.1 | 0 | 12 | 59.0% | 97.5% | 1360 | 1775 | 415 |
| 3.6 | 1.3 | 83.1 | 1 | 11 | 61.1% | 95.4% | 1340 | 1725 | 385 |
| 3.6 | 3.3 | 83.1 | 2 | 8 | 72.5% | 92.6% | 1345 | 2000 | 655 |
| 3.7 | 2.2 | 83.1 | 0 | 11 | 58.8% | 94.9% | 1360 | 2000 | 640 |
| 3.8 | 2.1 | 83.1 | 1 | 10 | 57.9% | 93.5% | 1345 | 1955 | 610 |
| 3.9 | 2 | 83.1 | 2 | 9 | 60.5% | 96.4% | 1335 | 1905 | 570 |
| 3.9 | 0 | 83.1 | 0 | 13 | 43.6% | 100.0% | 1380 | 1450 | 70 |
| 4 | 0.9 | 83.1 | 1 | 11 | 49.7% | 96.8% | 1335 | 1605 | 270 |
| 0.4 | 3.5 | 83.1 | 2 | 11 | 20.0% | 93.3% | 1340 | 2000 | 660 |
| 0.5 | 3.4 | 83.1 | 1 | 12 | 31.2% | 90.1% | 1355 | 2000 | 645 |
| 0.6 | 2.3 | 83.1 | 0 | 14 | 68.7% | 91.5% | 1365 | 1895 | 530 |
| 0.7 | 0.2 | 83.1 | 2 | 14 | 47.7% | 99.3% | 1340 | 1455 | 115 |
| 0.8 | 1.1 | 83.1 | 2 | 13 | 52.1% | 95.8% | 1345 | 1505 | 160 |
| 0.9 | 1 | 83.1 | 0 | 15 | 98.6% | 97.1% | 1365 | 1540 | 175 |
| 0.9 | 0 | 83.1 | 1 | 15 | 77.9% | 100.0% | 1380 | 1435 | 55 |
| 1 | 3.8 | 83.2 | 0 | 12 | 71.4% | 92.3% | 1360 | 2000 | 640 |
| 1.1 | 3.7 | 83.2 | 1 | 11 | 57.7% | 90.7% | 1350 | 2000 | 650 |
| 1.3 | 1.5 | 83.2 | 0 | 14 | 96.8% | 97.0% | 1360 | 1705 | 345 |
| 1.4 | 1.4 | 83.2 | 1 | 13 | 96.3% | 94.8% | 1350 | 1655 | 305 |
| 1.5 | 0.3 | 83.2 | 0 | 15 | 94.8% | 99.1% | 1360 | 1395 | 35 |
| 1.6 | 2.2 | 83.2 | 1 | 12 | 94.5% | 92.0% | 1350 | 1880 | 530 |
| 1.8 | 1 | 83.2 | 0 | 14 | 94.6% | 100.0% | 1360 | 1575 | 215 |
| 1.8 | 0 | 83.2 | 1 | 14 | 100.0% | 100.0% | 1365 | 1385 | 20 |
| 1.9 | 3.9 | 83.2 | 2 | 9 | 74.8% | 92.2% | 1345 | 2000 | 655 |
| 2 | 2.8 | 83.2 | 0 | 12 | 92.4% | 94.6% | 1360 | 2000 | 640 |
| 0.2 | 3.6 | 83.2 | 0 | 13 | 16.8% | 87.5% | 1360 | 2000 | 640 |
| 2.1 | 3.7 | 83.2 | 2 | 9 | 83.7% | 92.7% | 1345 | 2000 | 655 |
| 2.2 | 2.6 | 83.2 | 0 | 12 | 93.0% | 95.0% | 1360 | 2000 | 640 |
| 2.3 | 2.5 | 83.2 | 1 | 11 | 93.0% | 92.1% | 1350 | 1990 | 640 |
| 2.4 | 1.4 | 83.2 | 2 | 11 | 91.4% | 95.8% | 1335 | 1670 | 335 |
| 2.4 | 0.4 | 83.2 | 0 | 14 | 77.3% | 100.0% | 1360 | 1410 | 50 |
| 2.5 | 3.3 | 83.2 | 1 | 10 | 83.2% | 92.5% | 1345 | 2000 | 655 |
| 2.6 | 2.2 | 83.2 | 2 | 10 | 77.9% | 96.5% | 1335 | 1895 | 560 |
| 2.7 | 1.1 | 83.2 | 0 | 13 | 77.4% | 99.2% | 1360 | 1645 | 285 |
| 2.8 | 2 | 83.2 | 1 | 11 | 82.1% | 92.9% | 1350 | 1885 | 535 |
| 2.8 | 0 | 83.2 | 2 | 12 | 44.0% | 100.0% | 1340 | 1395 | 55 |
| 2.9 | 3.9 | 83.2 | 0 | 10 | 76.6% | 90.7% | 1360 | 2000 | 640 |
| 3 | 3.8 | 83.2 | 1 | 9 | 79.1% | 91.3% | 1350 | 2000 | 650 |
| 0.3 | 2.5 | 83.2 | 2 | 12 | 16.0% | 93.3% | 1345 | 1860 | 515 |
| 3.1 | 2.7 | 83.2 | 2 | 9 | 78.3% | 94.9% | 1340 | 2000 | 660 |
| 3.2 | 1.6 | 83.2 | 0 | 12 | 69.6% | 97.2% | 1360 | 1820 | 460 |
| 3.3 | 1.5 | 83.2 | 1 | 11 | 69.2% | 94.7% | 1345 | 1770 | 425 |
| 3.3 | 0.5 | 83.2 | 2 | 11 | 52.2% | 98.2% | 1325 | 1405 | 80 |
| 3.4 | 3.4 | 83.2 | 0 | 10 | 65.2% | 91.7% | 1360 | 2000 | 640 |
| 3.5 | 0.3 | 83.2 | 1 | 12 | 58.4% | 98.9% | 1340 | 1420 | 80 |
| 3.6 | 0.2 | 83.2 | 2 | 11 | 37.2% | 99.3% | 1320 | 1420 | 100 |
| 3.7 | 0.1 | 83.2 | 0 | 13 | 42.0% | 100.0% | 1360 | 1435 | 75 |
| 3.8 | 1 | 83.2 | 1 | 11 | 57.5% | 96.5% | 1340 | 1630 | 290 |
| 3.8 | 4 | 83.2 | 2 | 7 | 66.7% | 90.3% | 1350 | 2000 | 650 |
| 3.9 | 2.9 | 83.2 | 0 | 10 | 53.9% | 92.8% | 1360 | 2000 | 640 |
| 4 | 2.8 | 83.2 | 1 | 9 | 55.2% | 93.5% | 1345 | 2000 | 655 |
| 0.4 | 1.4 | 83.2 | 2 | 13 | 25.7% | 94.6% | 1345 | 1570 | 225 |
| 0.5 | 1.3 | 83.2 | 1 | 14 | 52.3% | 95.0% | 1360 | 1580 | 220 |
| 0.5 | 3.3 | 83.2 | 0 | 13 | 41.6% | 90.0% | 1360 | 2000 | 640 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.6 | 3.2 | 83.2 | 2 | 11 | 30.3% | 93.9% | 1340 | 2000 | 660 |
| 0.7 | 3.1 | 83.2 | 1 | 12 | 44.2% | 90.5% | 1355 | 2000 | 645 |
| 0.8 | 3 | 83.2 | 2 | 11 | 40.6% | 94.1% | 1340 | 2000 | 660 |
| 0.9 | 2.9 | 83.2 | 1 | 12 | 57.1% | 90.5% | 1355 | 2000 | 645 |
| 1 | 1.7 | 83.3 | 2 | 12 | 56.4% | 94.4% | 1345 | 1680 | 335 |
| 1 | 0.7 | 83.3 | 0 | 15 | 99.6% | 97.9% | 1365 | 1425 | 60 |
| 1.2 | 3.5 | 83.3 | 2 | 10 | 48.5% | 94.2% | 1340 | 2000 | 660 |
| 1.3 | 2.4 | 83.3 | 0 | 13 | 93.8% | 96.4% | 1360 | 1940 | 580 |
| 1.4 | 2.3 | 83.3 | 1 | 12 | 83.8% | 91.6% | 1350 | 1890 | 540 |
| 1.5 | 1.2 | 83.3 | 2 | 12 | 81.0% | 95.5% | 1340 | 1560 | 220 |
| 1.5 | 3.2 | 83.3 | 0 | 12 | 91.3% | 93.8% | 1360 | 2000 | 640 |
| 1.7 | 3 | 83.3 | 2 | 10 | 63.3% | 95.3% | 1335 | 2000 | 665 |
| 1.8 | 1.9 | 83.3 | 0 | 13 | 95.3% | 97.6% | 1360 | 1835 | 475 |
| 1.9 | 1.8 | 83.3 | 1 | 12 | 95.8% | 93.4% | 1350 | 1785 | 435 |
| 1.9 | 0.8 | 83.3 | 2 | 12 | 99.3% | 97.0% | 1340 | 1445 | 105 |
| 2 | 3.7 | 83.3 | 0 | 11 | 89.6% | 92.0% | 1360 | 2000 | 640 |
| 2.1 | 0.6 | 83.3 | 2 | 12 | 99.6% | 97.8% | 1335 | 1375 | 40 |
| 2.2 | 3.5 | 83.3 | 0 | 11 | 90.2% | 92.4% | 1360 | 2000 | 640 |
| 2.3 | 3.4 | 83.3 | 1 | 10 | 90.2% | 92.7% | 1345 | 2000 | 655 |
| 2.4 | 2.3 | 83.3 | 2 | 10 | 74.6% | 96.8% | 1335 | 1905 | 570 |
| 2.5 | 1.2 | 83.3 | 0 | 13 | 84.9% | 99.1% | 1360 | 1665 | 305 |
| 2.6 | 0.1 | 83.3 | 1 | 13 | 64.6% | 99.7% | 1345 | 1395 | 50 |
| 2.6 | 3.1 | 83.3 | 2 | 9 | 88.2% | 94.2% | 1345 | 2000 | 655 |
| 2.7 | 3 | 83.3 | 0 | 11 | 81.5% | 93.5% | 1360 | 2000 | 640 |
| 2.8 | 2.9 | 83.3 | 1 | 10 | 79.9% | 93.2% | 1345 | 2000 | 655 |
| 2.9 | 1.8 | 83.3 | 2 | 10 | 77.5% | 97.2% | 1335 | 1800 | 465 |
| 2.9 | 0.8 | 83.3 | 0 | 13 | 71.1% | 100.0% | 1360 | 1545 | 185 |
| 3 | 0.7 | 83.3 | 1 | 12 | 76.6% | 97.5% | 1345 | 1485 | 140 |
| 0.3 | 3.4 | 83.3 | 2 | 11 | 15.0% | 94.0% | 1340 | 2000 | 660 |
| 3.2 | 2.5 | 83.3 | 2 | 9 | 65.1% | 95.5% | 1335 | 1990 | 655 |
| 3.3 | 1.4 | 83.3 | 0 | 12 | 66.8% | 97.8% | 1360 | 1760 | 400 |
| 3.4 | 1.3 | 83.3 | 1 | 11 | 67.5% | 95.4% | 1345 | 1710 | 365 |
| 3.4 | 3.3 | 83.3 | 2 | 8 | 76.2% | 92.8% | 1350 | 2000 | 650 |
| 3.5 | 2.2 | 83.3 | 0 | 11 | 63.7% | 95.2% | 1360 | 1985 | 625 |
| 3.7 | 2 | 83.3 | 2 | 9 | 60.7% | 96.6% | 1335 | 1890 | 555 |
| 3.8 | 0.9 | 83.3 | 1 | 11 | 57.8% | 96.8% | 1340 | 1590 | 250 |
| 4 | 2.7 | 83.3 | 0 | 10 | 52.0% | 93.3% | 1360 | 2000 | 640 |
| 0.4 | 2.3 | 83.3 | 1 | 13 | 27.7% | 93.1% | 1350 | 1845 | 495 |
| 0.5 | 1.2 | 83.3 | 0 | 15 | 74.3% | 97.1% | 1365 | 1575 | 210 |
| 0.7 | 1 | 83.3 | 1 | 14 | 59.6% | 96.2% | 1350 | 1490 | 140 |
| 0.7 | 4 | 83.3 | 2 | 10 | 29.8% | 93.0% | 1345 | 2000 | 655 |
| 0.8 | 3.9 | 83.3 | 1 | 11 | 43.7% | 90.7% | 1350 | 2000 | 650 |
| 1 | 1.6 | 83.4 | 0 | 14 | 96.3% | 95.3% | 1360 | 1710 | 350 |
| 1.1 | 1.5 | 83.4 | 1 | 13 | 76.1% | 94.4% | 1350 | 1660 | 310 |
| 1.1 | 0.5 | 83.4 | 2 | 13 | 67.6% | 98.1% | 1340 | 1415 | 75 |
| 1.4 | 0.2 | 83.4 | 2 | 13 | 71.3% | 99.3% | 1340 | 1420 | 80 |
| 1.5 | 0.1 | 83.4 | 0 | 15 | 74.6% | 99.9% | 1360 | 1395 | 35 |
| 1.6 | 1 | 83.4 | 1 | 13 | 98.6% | 96.3% | 1350 | 1530 | 180 |
| 1.7 | 2.9 | 83.4 | 0 | 12 | 92.2% | 94.6% | 1360 | 2000 | 640 |
| 1.8 | 2.8 | 83.4 | 1 | 11 | 90.4% | 92.3% | 1350 | 2000 | 650 |
| 1.9 | 1.7 | 83.4 | 2 | 11 | 89.9% | 96.1% | 1340 | 1720 | 380 |
| 2.1 | 1.5 | 83.4 | 2 | 11 | 96.9% | 96.3% | 1340 | 1675 | 335 |
| 2.2 | 0.4 | 83.4 | 1 | 13 | 93.2% | 98.5% | 1345 | 1380 | 35 |
| 2.4 | 0.2 | 83.4 | 0 | 14 | 77.6% | 100.0% | 1360 | 1415 | 55 |
| 2.6 | 1 | 83.4 | 2 | 11 | 88.1% | 96.8% | 1335 | 1545 | 210 |
| 2.8 | 2.8 | 83.4 | 2 | 9 | 85.5% | 95.0% | 1340 | 2000 | 660 |
| 3 | 1.6 | 83.4 | 1 | 11 | 76.2% | 94.3% | 1345 | 1775 | 430 |
| 0.3 | 3.3 | 83.4 | 1 | 12 | 18.5% | 91.3% | 1355 | 2000 | 645 |
| 3.2 | 2.4 | 83.4 | 0 | 11 | 70.7% | 94.9% | 1360 | 2000 | 640 |
| 3.3 | 2.3 | 83.4 | 1 | 10 | 69.5% | 94.2% | 1345 | 1970 | 625 |
| 3.4 | 1.2 | 83.4 | 2 | 10 | 71.0% | 97.8% | 1335 | 1645 | 310 |
| 3.4 | 3.2 | 83.4 | 0 | 10 | 65.9% | 92.4% | 1360 | 2000 | 640 |
| 3.6 | 3 | 83.4 | 2 | 8 | 73.7% | 93.6% | 1345 | 2000 | 655 |
| 3.8 | 1.8 | 83.4 | 1 | 10 | 58.9% | 94.7% | 1345 | 1865 | 520 |
| 3.9 | 3.7 | 83.4 | 0 | 9 | 58.4% | 89.8% | 1365 | 2000 | 635 |
| 4 | 3.6 | 83.4 | 1 | 8 | 62.2% | 90.6% | 1355 | 2000 | 645 |
| 0.4 | 0.2 | 83.4 | 2 | 14 | 34.7% | 99.3% | 1350 | 1480 | 130 |
| 0.5 | 1.1 | 83.4 | 2 | 13 | 32.3% | 95.8% | 1345 | 1475 | 130 |
| 0.6 | 0 | 83.4 | 1 | 15 | 57.4% | 100.0% | 1380 | 1460 | 80 |
| 0.7 | 3.9 | 83.4 | 0 | 12 | 50.1% | 92.3% | 1360 | 2000 | 640 |
| 0.8 | 3.8 | 83.4 | 1 | 11 | 43.6% | 91.1% | 1350 | 2000 | 650 |
| 0.9 | 2.7 | 83.4 | 2 | 11 | 45.5% | 95.1% | 1340 | 1925 | 585 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1 | 1.5 | 83.5 | 0 | 14 | 96.4% | 95.7% | 1360 | 1680 | 320 |
| 1.1 | 1.4 | 83.5 | 1 | 13 | 76.2% | 94.7% | 1350 | 1625 | 275 |
| 1.1 | 0.4 | 83.5 | 2 | 13 | 67.7% | 98.5% | 1340 | 1425 | 85 |
| 1.2 | 0.3 | 83.5 | 0 | 15 | 100.0% | 99.0% | 1365 | 1390 | 25 |
| 1.3 | 2.2 | 83.5 | 1 | 12 | 78.2% | 92.0% | 1350 | 1850 | 500 |
| 1.4 | 1.1 | 83.5 | 2 | 12 | 75.6% | 95.9% | 1340 | 1515 | 175 |
| 1.5 | 1 | 83.5 | 0 | 14 | 98.5% | 100.0% | 1360 | 1545 | 185 |
| 1.5 | 0 | 83.5 | 1 | 14 | 87.8% | 100.0% | 1365 | 1410 | 45 |
| 1.6 | 3.9 | 83.5 | 2 | 9 | 69.1% | 92.6% | 1350 | 2000 | 650 |
| 1.7 | 2.8 | 83.5 | 0 | 12 | 92.5% | 95.0% | 1360 | 2000 | 640 |
| 1.8 | 2.7 | 83.5 | 1 | 11 | 90.5% | 92.7% | 1350 | 2000 | 650 |
| 1.9 | 1.6 | 83.5 | 2 | 11 | 90.0% | 96.6% | 1340 | 1690 | 350 |
| 1.9 | 0.6 | 83.5 | 0 | 14 | 93.5% | 100.0% | 1360 | 1415 | 55 |
| 2 | 0.5 | 83.5 | 1 | 13 | 100.0% | 98.2% | 1350 | 1375 | 25 |
| 2.1 | 1.4 | 83.5 | 2 | 11 | 97.3% | 96.7% | 1340 | 1640 | 300 |
| 2.1 | 0.4 | 83.5 | 0 | 14 | 87.1% | 100.0% | 1360 | 1400 | 40 |
| 2.2 | 3.3 | 83.5 | 1 | 10 | 90.9% | 93.3% | 1345 | 2000 | 655 |
| 2.3 | 2.2 | 83.5 | 2 | 10 | 73.0% | 97.5% | 1335 | 1865 | 530 |
| 2.5 | 2 | 83.5 | 1 | 11 | 89.9% | 93.5% | 1350 | 1855 | 505 |
| 2.5 | 0 | 83.5 | 2 | 12 | 59.5% | 100.0% | 1345 | 1385 | 40 |
| 2.7 | 3.8 | 83.5 | 1 | 9 | 86.2% | 91.4% | 1355 | 2000 | 645 |
| 2.8 | 2.7 | 83.5 | 2 | 9 | 85.9% | 95.3% | 1340 | 2000 | 660 |
| 3 | 1.5 | 83.5 | 1 | 11 | 76.6% | 94.6% | 1345 | 1745 | 400 |
| 3 | 0.5 | 83.5 | 2 | 11 | 78.1% | 98.2% | 1330 | 1395 | 65 |
| 0.3 | 3.2 | 83.5 | 1 | 12 | 18.6% | 91.7% | 1355 | 2000 | 645 |
| 3.1 | 3.4 | 83.5 | 2 | 8 | 79.4% | 92.8% | 1350 | 2000 | 650 |
| 3.2 | 2.3 | 83.5 | 0 | 11 | 71.0% | 95.3% | 1360 | 1990 | 630 |
| 3.3 | 0.2 | 83.5 | 1 | 12 | 65.0% | 99.3% | 1340 | 1420 | 80 |
| 3.4 | 0.1 | 83.5 | 2 | 11 | 29.6% | 99.7% | 1325 | 1415 | 90 |
| 3.4 | 3.1 | 83.5 | 0 | 10 | 66.3% | 92.7% | 1360 | 2000 | 640 |
| 3.5 | 4 | 83.5 | 1 | 8 | 73.4% | 89.5% | 1355 | 2000 | 645 |
| 3.6 | 2.9 | 83.5 | 2 | 8 | 74.1% | 94.0% | 1345 | 2000 | 655 |
| 3.7 | 1.8 | 83.5 | 0 | 11 | 60.1% | 96.3% | 1360 | 1880 | 520 |
| 3.8 | 1.7 | 83.5 | 1 | 10 | 59.2% | 95.1% | 1345 | 1830 | 485 |
| 3.8 | 0.7 | 83.5 | 2 | 10 | 61.4% | 98.2% | 1330 | 1480 | 150 |
| 3.9 | 3.6 | 83.5 | 0 | 9 | 58.8% | 90.1% | 1365 | 2000 | 635 |
| 4 | 3.5 | 83.5 | 1 | 8 | 62.6% | 90.9% | 1355 | 2000 | 645 |
| 0.4 | 1.1 | 83.5 | 0 | 15 | 59.6% | 97.6% | 1365 | 1525 | 160 |
| 0.5 | 2 | 83.5 | 1 | 13 | 34.7% | 94.0% | 1350 | 1760 | 410 |
| 0.5 | 0 | 83.5 | 2 | 14 | 31.1% | 100.0% | 1360 | 1490 | 130 |
| 0.6 | 0.9 | 83.5 | 1 | 14 | 56.2% | 96.5% | 1355 | 1440 | 85 |
| 0.7 | 3.8 | 83.5 | 2 | 10 | 30.0% | 93.7% | 1345 | 2000 | 655 |
| 0.8 | 2.7 | 83.5 | 0 | 13 | 65.1% | 93.8% | 1360 | 1985 | 625 |
| 0.9 | 2.6 | 83.5 | 1 | 12 | 57.6% | 91.6% | 1355 | 1930 | 575 |
| 1 | 1.4 | 83.6 | 2 | 12 | 56.6% | 95.7% | 1345 | 1580 | 235 |
| 1 | 0.4 | 83.6 | 0 | 15 | 98.1% | 99.0% | 1365 | 1395 | 30 |
| 1.1 | 3.3 | 83.6 | 1 | 11 | 57.8% | 92.3% | 1350 | 2000 | 650 |
| 1.2 | 2.2 | 83.6 | 2 | 11 | 59.0% | 96.2% | 1340 | 1805 | 465 |
| 1.3 | 1.1 | 83.6 | 0 | 14 | 98.3% | 98.7% | 1360 | 1565 | 205 |
| 1.4 | 2 | 83.6 | 1 | 12 | 84.5% | 92.6% | 1350 | 1800 | 450 |
| 1.4 | 0 | 83.6 | 2 | 13 | 67.3% | 100.0% | 1355 | 1440 | 85 |
| 1.5 | 3.9 | 83.6 | 0 | 11 | 82.1% | 91.9% | 1360 | 2000 | 640 |
| 1.6 | 3.8 | 83.6 | 1 | 10 | 69.9% | 92.6% | 1350 | 2000 | 650 |
| 1.7 | 2.7 | 83.6 | 2 | 10 | 62.4% | 96.4% | 1335 | 1955 | 620 |
| 1.8 | 1.6 | 83.6 | 0 | 13 | 96.4% | 98.7% | 1360 | 1740 | 380 |
| 1.9 | 1.5 | 83.6 | 1 | 12 | 96.9% | 94.5% | 1350 | 1685 | 335 |
| 1.9 | 0.5 | 83.6 | 2 | 12 | 96.6% | 98.1% | 1340 | 1375 | 35 |
| 2 | 3.4 | 83.6 | 0 | 11 | 90.6% | 93.0% | 1360 | 2000 | 640 |
| 2.1 | 1.3 | 83.6 | 1 | 12 | 97.5% | 95.2% | 1350 | 1640 | 290 |
| 2.1 | 3.3 | 83.6 | 2 | 9 | 84.5% | 94.1% | 1345 | 2000 | 655 |
| 2.2 | 2.2 | 83.6 | 0 | 12 | 94.3% | 96.4% | 1360 | 1920 | 560 |
| 2.3 | 2.1 | 83.6 | 1 | 11 | 94.8% | 93.7% | 1350 | 1870 | 520 |
| 2.4 | 2 | 83.6 | 2 | 10 | 74.4% | 98.0% | 1335 | 1815 | 480 |
| 2.4 | 0 | 83.6 | 0 | 14 | 93.9% | 100.0% | 1380 | 1415 | 35 |
| 2.6 | 3.8 | 83.6 | 2 | 8 | 84.4% | 92.1% | 1350 | 2000 | 650 |
| 2.7 | 2.7 | 83.6 | 0 | 11 | 82.7% | 94.5% | 1360 | 2000 | 640 |
| 2.8 | 2.6 | 83.6 | 1 | 10 | 81.1% | 94.4% | 1345 | 2000 | 655 |
| 2.9 | 1.5 | 83.6 | 2 | 10 | 77.6% | 98.5% | 1335 | 1705 | 370 |
| 2.9 | 0.5 | 83.6 | 0 | 13 | 72.8% | 100.0% | 1360 | 1410 | 50 |
| 0.3 | 2.1 | 83.6 | 0 | 14 | 38.2% | 92.4% | 1365 | 1800 | 435 |
| 3.1 | 0.3 | 83.6 | 1 | 12 | 74.5% | 98.9% | 1345 | 1410 | 65 |
| 3.2 | 0.2 | 83.6 | 2 | 11 | 48.2% | 99.3% | 1330 | 1405 | 75 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.3 | 0.1 | 83.6 | 0 | 13 | 57.4% | 100.0% | 1360 | 1425 | 65 |
| 3.4 | 1 | 83.6 | 1 | 11 | 68.6% | 96.4% | 1345 | 1600 | 255 |
| 3.5 | 2.9 | 83.6 | 0 | 10 | 64.4% | 93.3% | 1360 | 2000 | 640 |
| 3.6 | 2.8 | 83.6 | 1 | 9 | 67.4% | 94.0% | 1350 | 2000 | 650 |
| 3.7 | 1.7 | 83.6 | 2 | 9 | 60.8% | 97.7% | 1335 | 1795 | 460 |
| 3.7 | 0.7 | 83.6 | 0 | 12 | 54.9% | 99.8% | 1360 | 1525 | 165 |
| 3.8 | 0.6 | 83.6 | 1 | 11 | 58.8% | 97.9% | 1340 | 1460 | 120 |
| 3.9 | 3.5 | 83.6 | 2 | 7 | 66.9% | 91.9% | 1350 | 2000 | 650 |
| 4 | 2.4 | 83.6 | 0 | 10 | 53.0% | 94.4% | 1360 | 2000 | 640 |
| 0.4 | 2 | 83.6 | 1 | 13 | 27.7% | 94.4% | 1350 | 1750 | 400 |
| 0.4 | 0 | 83.6 | 2 | 14 | 26.3% | 100.0% | 1365 | 1500 | 135 |
| 0.5 | 0.9 | 83.6 | 1 | 14 | 47.5% | 96.5% | 1355 | 1430 | 75 |
| 0.6 | 3.8 | 83.6 | 2 | 10 | 26.4% | 93.9% | 1345 | 2000 | 655 |
| 0.7 | 2.7 | 83.6 | 0 | 13 | 57.4% | 93.3% | 1360 | 1975 | 615 |
| 0.8 | 2.6 | 83.6 | 1 | 12 | 51.3% | 92.0% | 1355 | 1920 | 565 |
| 0.9 | 0.5 | 83.6 | 0 | 15 | 98.6% | 98.8% | 1365 | 1395 | 30 |
| 1 | 3.3 | 83.7 | 1 | 11 | 53.0% | 92.5% | 1350 | 2000 | 650 |
| 1.1 | 2.2 | 83.7 | 2 | 11 | 54.5% | 96.6% | 1340 | 1795 | 455 |
| 1.2 | 1.1 | 83.7 | 0 | 14 | 98.4% | 98.3% | 1360 | 1555 | 195 |
| 1.3 | 2 | 83.7 | 1 | 12 | 78.6% | 92.9% | 1350 | 1790 | 440 |
| 1.4 | 3.9 | 83.7 | 0 | 11 | 77.2% | 92.0% | 1360 | 2000 | 640 |
| 1.6 | 2.7 | 83.7 | 2 | 10 | 65.8% | 96.6% | 1340 | 1945 | 605 |
| 1.7 | 1.6 | 83.7 | 0 | 13 | 96.5% | 98.8% | 1360 | 1730 | 370 |
| 1.8 | 1.5 | 83.7 | 1 | 12 | 96.9% | 94.5% | 1350 | 1680 | 330 |
| 1.9 | 3.4 | 83.7 | 0 | 11 | 90.7% | 93.1% | 1360 | 2000 | 640 |
| 2 | 0.3 | 83.7 | 1 | 13 | 100.0% | 98.9% | 1350 | 1370 | 20 |
| 0.2 | 2.1 | 83.7 | 0 | 14 | 26.8% | 92.6% | 1365 | 1790 | 425 |
| 2.2 | 2.1 | 83.7 | 1 | 11 | 94.8% | 94.0% | 1350 | 1860 | 510 |
| 2.3 | 2 | 83.7 | 2 | 10 | 72.8% | 98.2% | 1335 | 1805 | 470 |
| 2.3 | 0 | 83.7 | 0 | 14 | 97.8% | 100.0% | 1380 | 1410 | 30 |
| 2.4 | 0.9 | 83.7 | 1 | 12 | 94.5% | 96.7% | 1350 | 1520 | 170 |
| 2.6 | 2.7 | 83.7 | 0 | 11 | 85.5% | 94.6% | 1360 | 2000 | 640 |
| 2.7 | 2.6 | 83.7 | 1 | 10 | 82.4% | 94.7% | 1345 | 2000 | 655 |
| 2.8 | 1.5 | 83.7 | 2 | 10 | 78.7% | 98.8% | 1335 | 1695 | 360 |
| 3 | 0.3 | 83.7 | 2 | 11 | 70.2% | 98.9% | 1335 | 1400 | 65 |
| 0.3 | 2 | 83.7 | 0 | 14 | 38.1% | 92.8% | 1365 | 1770 | 405 |
| 3.1 | 1.2 | 83.7 | 2 | 10 | 77.5% | 99.0% | 1335 | 1620 | 285 |
| 3.2 | 3.1 | 83.7 | 1 | 9 | 76.8% | 93.4% | 1350 | 2000 | 650 |
| 3.3 | 3 | 83.7 | 2 | 8 | 78.3% | 94.0% | 1350 | 2000 | 650 |
| 3.4 | 1.9 | 83.7 | 0 | 11 | 67.3% | 96.4% | 1360 | 1890 | 530 |
| 3.6 | 3.7 | 83.7 | 0 | 9 | 66.8% | 89.6% | 1365 | 2000 | 635 |
| 3.8 | 2.5 | 83.7 | 2 | 8 | 70.5% | 95.1% | 1345 | 2000 | 655 |
| 4 | 1.3 | 83.7 | 1 | 10 | 55.7% | 96.0% | 1345 | 1715 | 370 |
| 0.4 | 3.9 | 83.7 | 0 | 12 | 28.6% | 91.0% | 1360 | 2000 | 640 |
| 0.7 | 1.6 | 83.7 | 0 | 14 | 71.0% | 94.0% | 1360 | 1680 | 320 |
| 0.8 | 0.5 | 83.7 | 2 | 13 | 52.4% | 98.1% | 1345 | 1440 | 95 |
| 1 | 2.2 | 83.8 | 1 | 12 | 64.8% | 92.9% | 1355 | 1820 | 465 |
| 1.2 | 1 | 83.8 | 0 | 14 | 98.7% | 98.7% | 1360 | 1520 | 160 |
| 1.2 | 0 | 83.8 | 1 | 14 | 72.0% | 100.0% | 1365 | 1435 | 70 |
| 1.3 | 3.9 | 83.8 | 2 | 9 | 73.8% | 92.6% | 1365 | 2000 | 635 |
| 1.4 | 2.8 | 83.8 | 0 | 12 | 92.3% | 95.4% | 1360 | 2000 | 640 |
| 1.6 | 1.6 | 83.8 | 2 | 11 | 77.0% | 97.5% | 1340 | 1655 | 315 |
| 1.7 | 0.5 | 83.8 | 1 | 13 | 100.0% | 98.1% | 1350 | 1370 | 20 |
| 1.9 | 2.3 | 83.8 | 0 | 12 | 94.2% | 96.5% | 1360 | 1920 | 560 |
| 2 | 0.2 | 83.8 | 1 | 13 | 100.0% | 99.3% | 1350 | 1375 | 25 |
| 0.2 | 1 | 83.8 | 0 | 15 | 29.4% | 98.4% | 1365 | 1470 | 105 |
| 2.1 | 2.1 | 83.8 | 1 | 11 | 94.9% | 94.2% | 1350 | 1850 | 500 |
| 2.2 | 0 | 83.8 | 0 | 14 | 100.0% | 100.0% | 1380 | 1405 | 25 |
| 2.3 | 0.9 | 83.8 | 1 | 12 | 97.1% | 96.7% | 1350 | 1510 | 160 |
| 2.4 | 3.8 | 83.8 | 2 | 8 | 87.0% | 92.3% | 1350 | 2000 | 650 |
| 2.5 | 2.7 | 83.8 | 0 | 11 | 88.2% | 94.8% | 1360 | 2000 | 640 |
| 2.6 | 2.6 | 83.8 | 1 | 10 | 82.5% | 95.0% | 1345 | 2000 | 655 |
| 2.7 | 1.5 | 83.8 | 2 | 10 | 79.0% | 99.2% | 1335 | 1685 | 350 |
| 2.7 | 0.5 | 83.8 | 0 | 13 | 81.0% | 100.0% | 1360 | 1405 | 45 |
| 2.8 | 0.4 | 83.8 | 1 | 12 | 83.2% | 98.5% | 1345 | 1400 | 55 |
| 2.9 | 0.3 | 83.8 | 2 | 11 | 68.8% | 98.9% | 1335 | 1395 | 60 |
| 3 | 0.2 | 83.8 | 0 | 13 | 69.1% | 100.0% | 1360 | 1415 | 55 |
| 0.3 | 2.9 | 83.8 | 1 | 12 | 18.8% | 92.9% | 1355 | 1960 | 605 |
| 3.1 | 0.1 | 83.8 | 2 | 11 | 31.5% | 99.7% | 1330 | 1405 | 75 |
| 3.1 | 3.1 | 83.8 | 0 | 10 | 74.4% | 93.1% | 1360 | 2000 | 640 |
| 3.2 | 4 | 83.8 | 1 | 8 | 76.7% | 90.0% | 1355 | 2000 | 645 |
| 3.3 | 2.9 | 83.8 | 2 | 8 | 78.6% | 94.3% | 1350 | 2000 | 650 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.4 | 1.8 | 83.8 | 0 | 11 | 67.7% | 96.7% | 1360 | 1855 | 495 |
| 3.5 | 1.7 | 83.8 | 1 | 10 | 66.7% | 95.9% | 1345 | 1810 | 465 |
| 3.5 | 0.7 | 83.8 | 2 | 10 | 70.4% | 99.5% | 1335 | 1455 | 120 |
| 3.6 | 3.6 | 83.8 | 0 | 9 | 67.2% | 89.9% | 1365 | 2000 | 635 |
| 3.7 | 3.5 | 83.8 | 1 | 8 | 70.6% | 90.8% | 1355 | 2000 | 645 |
| 3.8 | 2.4 | 83.8 | 2 | 8 | 70.9% | 95.4% | 1345 | 1970 | 625 |
| 3.9 | 1.3 | 83.8 | 0 | 11 | 56.8% | 97.8% | 1360 | 1735 | 375 |
| 4 | 1.2 | 83.8 | 1 | 10 | 56.0% | 96.5% | 1345 | 1680 | 335 |
| 4 | 3.2 | 83.8 | 2 | 7 | 66.5% | 92.8% | 1350 | 2000 | 650 |
| 0.4 | 3.8 | 83.8 | 0 | 12 | 28.7% | 91.4% | 1360 | 2000 | 640 |
| 0.6 | 2.6 | 83.8 | 2 | 11 | 30.9% | 96.5% | 1340 | 1865 | 525 |
| 0.7 | 1.5 | 83.8 | 0 | 14 | 71.0% | 94.4% | 1360 | 1650 | 290 |
| 0.8 | 0.4 | 83.8 | 2 | 13 | 52.4% | 98.5% | 1345 | 1450 | 105 |
| 0.9 | 0.3 | 83.8 | 0 | 15 | 86.5% | 99.6% | 1365 | 1415 | 50 |
| 1.1 | 2 | 83.9 | 2 | 11 | 54.6% | 97.4% | 1340 | 1730 | 390 |
| 1.1 | 0 | 83.9 | 0 | 15 | 92.0% | 100.0% | 1385 | 1425 | 40 |
| 1.2 | 0.9 | 83.9 | 1 | 13 | 83.3% | 96.6% | 1350 | 1450 | 100 |
| 1.3 | 3.8 | 83.9 | 2 | 9 | 74.1% | 92.9% | 1365 | 2000 | 635 |
| 1.4 | 2.7 | 83.9 | 0 | 12 | 92.4% | 95.8% | 1360 | 1990 | 630 |
| 1.5 | 2.6 | 83.9 | 1 | 11 | 76.8% | 93.9% | 1350 | 1940 | 590 |
| 1.6 | 1.5 | 83.9 | 2 | 11 | 77.1% | 98.0% | 1340 | 1625 | 285 |
| 1.6 | 0.5 | 83.9 | 0 | 14 | 100.0% | 100.0% | 1360 | 1380 | 20 |
| 1.7 | 0.4 | 83.9 | 1 | 13 | 97.8% | 98.5% | 1350 | 1380 | 30 |
| 1.8 | 0.3 | 83.9 | 2 | 12 | 83.5% | 98.9% | 1340 | 1400 | 60 |
| 1.9 | 0.2 | 83.9 | 0 | 14 | 94.8% | 100.0% | 1360 | 1395 | 35 |
| 2 | 1.1 | 83.9 | 1 | 12 | 98.3% | 95.9% | 1350 | 1555 | 205 |
| 0.2 | 2.9 | 83.9 | 0 | 13 | 16.7% | 90.2% | 1360 | 1985 | 625 |
| 2.1 | 3 | 83.9 | 2 | 9 | 84.2% | 95.2% | 1345 | 2000 | 655 |
| 2.2 | 1.9 | 83.9 | 0 | 12 | 95.4% | 97.5% | 1360 | 1825 | 465 |
| 2.3 | 1.8 | 83.9 | 1 | 11 | 95.8% | 94.9% | 1350 | 1775 | 425 |
| 2.3 | 0.8 | 83.9 | 2 | 11 | 99.3% | 98.7% | 1340 | 1435 | 95 |
| 2.4 | 3.7 | 83.9 | 0 | 10 | 89.7% | 92.0% | 1360 | 2000 | 640 |
| 2.5 | 3.6 | 83.9 | 1 | 9 | 89.2% | 91.9% | 1355 | 2000 | 645 |
| 2.6 | 2.5 | 83.9 | 2 | 9 | 90.2% | 96.3% | 1345 | 1935 | 590 |
| 2.7 | 1.4 | 83.9 | 0 | 12 | 85.5% | 98.7% | 1360 | 1710 | 350 |
| 2.8 | 1.3 | 83.9 | 1 | 11 | 85.0% | 95.5% | 1350 | 1660 | 310 |
| 2.8 | 3.3 | 83.9 | 2 | 8 | 83.5% | 93.5% | 1350 | 2000 | 650 |
| 2.9 | 2.2 | 83.9 | 0 | 11 | 79.4% | 96.0% | 1360 | 1935 | 575 |
| 3 | 2.1 | 83.9 | 1 | 10 | 78.0% | 95.8% | 1345 | 1885 | 540 |
| 0.3 | 2.8 | 83.9 | 2 | 11 | 15.3% | 96.5% | 1340 | 1890 | 550 |
| 3.1 | 1 | 83.9 | 0 | 12 | 76.6% | 99.6% | 1360 | 1600 | 240 |
| 3.1 | 0 | 83.9 | 1 | 12 | 81.7% | 100.0% | 1360 | 1415 | 55 |
| 3.2 | 3.9 | 83.9 | 2 | 7 | 75.1% | 91.2% | 1355 | 2000 | 645 |
| 3.3 | 2.8 | 83.9 | 0 | 10 | 70.1% | 93.9% | 1360 | 2000 | 640 |
| 3.4 | 2.7 | 83.9 | 1 | 9 | 73.1% | 94.6% | 1350 | 2000 | 650 |
| 3.5 | 1.6 | 83.9 | 2 | 9 | 62.1% | 98.4% | 1335 | 1745 | 410 |
| 3.5 | 0.6 | 83.9 | 0 | 12 | 63.3% | 100.0% | 1360 | 1465 | 105 |
| 3.6 | 0.5 | 83.9 | 1 | 11 | 65.5% | 98.2% | 1345 | 1420 | 75 |
| 3.7 | 3.4 | 83.9 | 2 | 7 | 70.4% | 92.5% | 1355 | 2000 | 645 |
| 3.8 | 2.3 | 83.9 | 0 | 10 | 58.6% | 95.0% | 1360 | 1995 | 635 |
| 3.9 | 0.2 | 83.9 | 1 | 11 | 56.9% | 99.3% | 1340 | 1435 | 95 |
| 4 | 0.1 | 83.9 | 2 | 10 | 31.8% | 100.0% | 1330 | 1425 | 95 |
| 4 | 3.1 | 83.9 | 0 | 9 | 57.9% | 91.5% | 1365 | 2000 | 635 |
| 0.4 | 0.7 | 83.9 | 1 | 14 | 42.5% | 97.3% | 1360 | 1440 | 80 |
| 0.5 | 3.6 | 83.9 | 2 | 10 | 28.0% | 94.1% | 1360 | 2000 | 640 |
| 0.6 | 2.5 | 83.9 | 0 | 13 | 49.5% | 93.7% | 1360 | 1905 | 545 |
| 0.7 | 2.4 | 83.9 | 1 | 12 | 45.1% | 93.2% | 1355 | 1850 | 495 |
| 0.8 | 1.3 | 83.9 | 2 | 12 | 45.1% | 96.8% | 1345 | 1520 | 175 |
| 0.8 | 3.3 | 83.9 | 0 | 12 | 58.2% | 94.4% | 1360 | 2000 | 640 |
| 0.9 | 3.2 | 83.9 | 1 | 11 | 48.3% | 93.2% | 1350 | 2000 | 650 |
| 1 | 3 | 84 | 2 | 10 | 43.0% | 96.3% | 1345 | 1970 | 625 |
| 1.1 | 1.9 | 84 | 0 | 13 | 88.4% | 98.4% | 1360 | 1770 | 410 |
| 1.2 | 1.8 | 84 | 1 | 12 | 78.4% | 94.0% | 1355 | 1715 | 360 |
| 1.2 | 0.8 | 84 | 2 | 12 | 68.9% | 97.7% | 1345 | 1400 | 55 |
| 1.3 | 3.7 | 84 | 0 | 11 | 72.2% | 92.8% | 1360 | 2000 | 640 |
| 1.5 | 2.5 | 84 | 2 | 10 | 61.8% | 97.5% | 1340 | 1875 | 535 |
| 1.6 | 1.4 | 84 | 0 | 13 | 97.3% | 99.8% | 1360 | 1655 | 295 |
| 1.7 | 1.3 | 84 | 1 | 12 | 97.8% | 95.2% | 1350 | 1600 | 250 |
| 1.7 | 3.3 | 84 | 2 | 9 | 74.2% | 94.6% | 1350 | 2000 | 650 |
| 1.8 | 2.2 | 84 | 0 | 12 | 94.6% | 97.0% | 1360 | 1880 | 520 |
| 1.9 | 2.1 | 84 | 1 | 11 | 95.0% | 94.8% | 1350 | 1830 | 480 |
| 2 | 0 | 84 | 0 | 14 | 100.0% | 100.0% | 1380 | 1395 | 15 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.1 | 2.9 | 84 | 0 | 11 | 92.3% | 94.6% | 1360 | 2000 | 640 |
| 2.2 | 2.8 | 84 | 1 | 10 | 92.6% | 95.3% | 1345 | 2000 | 655 |
| 2.3 | 1.7 | 84 | 2 | 10 | 72.7% | 99.3% | 1335 | 1710 | 375 |
| 2.3 | 0.7 | 84 | 0 | 13 | 96.4% | 100.0% | 1360 | 1455 | 95 |
| 2.4 | 0.6 | 84 | 1 | 12 | 95.8% | 97.8% | 1350 | 1390 | 40 |
| 2.5 | 3.5 | 84 | 2 | 8 | 86.7% | 93.2% | 1350 | 2000 | 650 |
| 2.6 | 2.4 | 84 | 0 | 11 | 86.7% | 95.7% | 1360 | 1970 | 610 |
| 2.7 | 2.3 | 84 | 1 | 10 | 82.2% | 95.9% | 1345 | 1920 | 575 |
| 2.8 | 1.2 | 84 | 2 | 10 | 79.9% | 100.0% | 1335 | 1590 | 255 |
| 2.8 | 3.2 | 84 | 0 | 10 | 82.3% | 93.2% | 1360 | 2000 | 640 |
| 2.9 | 3.1 | 84 | 1 | 9 | 86.1% | 93.7% | 1355 | 2000 | 645 |
| 3 | 3 | 84 | 2 | 8 | 81.9% | 94.4% | 1350 | 2000 | 650 |
| 3.1 | 1.9 | 84 | 1 | 10 | 76.2% | 96.3% | 1345 | 1835 | 490 |
| 3.1 | 0.9 | 84 | 2 | 10 | 77.6% | 100.0% | 1335 | 1505 | 170 |
| 3.2 | 3.8 | 84 | 0 | 9 | 81.2% | 89.8% | 1370 | 2000 | 630 |
| 3.3 | 3.7 | 84 | 1 | 8 | 76.4% | 90.8% | 1355 | 2000 | 645 |
| 3.4 | 2.6 | 84 | 2 | 8 | 78.3% | 95.2% | 1350 | 1990 | 640 |
| 3.5 | 1.5 | 84 | 0 | 11 | 66.2% | 97.7% | 1360 | 1770 | 410 |
| 3.6 | 1.4 | 84 | 1 | 10 | 65.3% | 96.9% | 1345 | 1720 | 375 |
| 3.7 | 0.3 | 84 | 0 | 12 | 56.7% | 100.0% | 1360 | 1435 | 75 |
| 3.9 | 1.1 | 84 | 2 | 9 | 61.0% | 99.6% | 1335 | 1610 | 275 |
| 4 | 1 | 84 | 0 | 11 | 55.2% | 98.8% | 1360 | 1635 | 275 |
| 4 | 0 | 84 | 1 | 11 | 54.8% | 100.0% | 1350 | 1440 | 90 |
| 0.4 | 3.6 | 84 | 2 | 10 | 22.4% | 93.6% | 1360 | 2000 | 640 |
| 0.6 | 2.4 | 84 | 1 | 12 | 38.6% | 93.6% | 1355 | 1840 | 485 |
| 0.7 | 1.3 | 84 | 2 | 12 | 39.3% | 97.2% | 1345 | 1510 | 165 |
| 0.7 | 3.3 | 84 | 0 | 12 | 51.0% | 94.5% | 1360 | 2000 | 640 |
| 0.9 | 2.1 | 84 | 2 | 11 | 45.4% | 97.6% | 1340 | 1740 | 400 |
| 1 | 2.9 | 84.1 | 0 | 12 | 72.2% | 95.6% | 1360 | 2000 | 640 |
| 1.1 | 2.8 | 84.1 | 1 | 11 | 57.8% | 94.3% | 1350 | 1960 | 610 |
| 1.2 | 1.7 | 84.1 | 2 | 11 | 59.1% | 98.4% | 1340 | 1645 | 305 |
| 1.3 | 0.6 | 84.1 | 1 | 13 | 90.3% | 97.7% | 1350 | 1395 | 45 |
| 1.4 | 3.5 | 84.1 | 2 | 9 | 79.2% | 94.2% | 1365 | 2000 | 635 |
| 1.5 | 2.4 | 84.1 | 0 | 12 | 94.1% | 96.7% | 1360 | 1910 | 550 |
| 1.7 | 3.2 | 84.1 | 0 | 11 | 91.5% | 94.1% | 1360 | 2000 | 640 |
| 1.8 | 3.1 | 84.1 | 1 | 10 | 79.6% | 94.8% | 1350 | 2000 | 650 |
| 1.9 | 3 | 84.1 | 2 | 9 | 82.6% | 95.4% | 1350 | 2000 | 650 |
| 0.2 | 1.7 | 84.1 | 0 | 14 | 26.4% | 94.0% | 1365 | 1665 | 300 |
| 2.1 | 3.8 | 84.1 | 1 | 9 | 89.8% | 91.8% | 1355 | 2000 | 645 |
| 2.2 | 2.7 | 84.1 | 2 | 9 | 89.6% | 96.1% | 1345 | 1955 | 610 |
| 2.4 | 0.5 | 84.1 | 2 | 11 | 97.4% | 99.6% | 1340 | 1370 | 30 |
| 2.6 | 0.3 | 84.1 | 1 | 12 | 87.8% | 98.9% | 1345 | 1395 | 50 |
| 2.8 | 0.1 | 84.1 | 0 | 13 | 77.2% | 100.0% | 1360 | 1410 | 50 |
| 2.9 | 4 | 84.1 | 2 | 7 | 81.0% | 91.1% | 1365 | 2000 | 635 |
| 3.1 | 1.8 | 84.1 | 2 | 9 | 81.5% | 98.2% | 1340 | 1770 | 430 |
| 3.2 | 0.7 | 84.1 | 1 | 11 | 74.6% | 97.5% | 1345 | 1460 | 115 |
| 3.4 | 2.5 | 84.1 | 0 | 10 | 68.6% | 94.8% | 1360 | 2000 | 640 |
| 3.6 | 1.3 | 84.1 | 2 | 9 | 61.1% | 99.3% | 1335 | 1655 | 320 |
| 3.6 | 3.3 | 84.1 | 0 | 9 | 71.4% | 90.8% | 1370 | 2000 | 630 |
| 3.7 | 3.2 | 84.1 | 1 | 8 | 71.9% | 91.8% | 1355 | 2000 | 645 |
| 3.8 | 2.1 | 84.1 | 2 | 8 | 72.1% | 96.5% | 1345 | 1880 | 535 |
| 4 | 1.9 | 84.1 | 1 | 9 | 58.2% | 96.6% | 1345 | 1870 | 525 |
| 0.4 | 3.5 | 84.1 | 0 | 12 | 28.9% | 92.6% | 1360 | 2000 | 640 |
| 0.6 | 2.3 | 84.1 | 2 | 11 | 31.2% | 97.7% | 1340 | 1770 | 430 |
| 0.7 | 1.2 | 84.1 | 0 | 14 | 70.9% | 95.6% | 1360 | 1545 | 185 |
| 0.8 | 0.1 | 84.1 | 1 | 14 | 45.3% | 99.7% | 1350 | 1460 | 110 |
| 0.8 | 3.1 | 84.1 | 2 | 10 | 34.7% | 96.2% | 1345 | 1980 | 635 |
| 0.9 | 3 | 84.1 | 0 | 12 | 65.9% | 95.4% | 1360 | 2000 | 640 |
| 1.1 | 1.7 | 84.2 | 2 | 11 | 54.6% | 98.7% | 1340 | 1635 | 295 |
| 1.1 | 0.7 | 84.2 | 0 | 14 | 100.0% | 99.6% | 1360 | 1390 | 30 |
| 1.2 | 0.6 | 84.2 | 1 | 13 | 83.5% | 97.7% | 1350 | 1405 | 55 |
| 1.3 | 3.5 | 84.2 | 2 | 9 | 75.0% | 93.8% | 1365 | 2000 | 635 |
| 1.4 | 2.4 | 84.2 | 0 | 12 | 92.6% | 96.9% | 1360 | 1905 | 545 |
| 1.5 | 2.3 | 84.2 | 1 | 11 | 77.0% | 95.2% | 1350 | 1850 | 500 |
| 1.6 | 1.2 | 84.2 | 2 | 11 | 77.3% | 99.3% | 1340 | 1520 | 180 |
| 1.6 | 3.2 | 84.2 | 0 | 11 | 87.8% | 94.2% | 1360 | 2000 | 640 |
| 1.7 | 3.1 | 84.2 | 1 | 10 | 75.1% | 95.0% | 1350 | 2000 | 650 |
| 1.8 | 3 | 84.2 | 2 | 9 | 78.7% | 95.6% | 1350 | 2000 | 650 |
| 1.9 | 1.9 | 84.2 | 0 | 12 | 95.6% | 98.0% | 1360 | 1800 | 440 |
| 2 | 1.8 | 84.2 | 1 | 11 | 96.1% | 95.8% | 1350 | 1745 | 395 |
| 2 | 0.8 | 84.2 | 2 | 11 | 95.3% | 99.7% | 1340 | 1410 | 70 |
| 2.1 | 2.7 | 84.2 | 2 | 9 | 82.6% | 96.2% | 1345 | 1945 | 600 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.2 | 1.6 | 84.2 | 0 | 12 | 96.5% | 98.7% | 1360 | 1730 | 370 |
| 2.3 | 1.5 | 84.2 | 1 | 11 | 96.9% | 96.1% | 1350 | 1680 | 330 |
| 2.3 | 0.5 | 84.2 | 2 | 11 | 100.0% | 100.0% | 1340 | 1365 | 25 |
| 2.4 | 3.4 | 84.2 | 0 | 10 | 90.7% | 93.0% | 1360 | 2000 | 640 |
| 2.5 | 0.3 | 84.2 | 1 | 12 | 92.8% | 98.9% | 1350 | 1390 | 40 |
| 2.6 | 0.2 | 84.2 | 2 | 11 | 50.0% | 100.0% | 1335 | 1380 | 45 |
| 2.7 | 0.1 | 84.2 | 0 | 13 | 81.2% | 100.0% | 1360 | 1410 | 50 |
| 2.8 | 1 | 84.2 | 1 | 11 | 86.2% | 96.7% | 1350 | 1550 | 200 |
| 2.8 | 4 | 84.2 | 2 | 7 | 82.4% | 90.7% | 1365 | 2000 | 635 |
| 2.9 | 2.9 | 84.2 | 0 | 10 | 80.8% | 94.1% | 1360 | 2000 | 640 |
| 3 | 2.8 | 84.2 | 1 | 9 | 85.9% | 94.7% | 1355 | 2000 | 645 |
| 0.3 | 1.5 | 84.2 | 2 | 12 | 16.4% | 97.6% | 1345 | 1535 | 190 |
| 3.1 | 0.7 | 84.2 | 1 | 11 | 77.2% | 97.4% | 1345 | 1455 | 110 |
| 3.2 | 3.6 | 84.2 | 2 | 7 | 76.0% | 92.2% | 1355 | 2000 | 645 |
| 3.4 | 2.4 | 84.2 | 1 | 9 | 74.3% | 95.6% | 1350 | 1965 | 615 |
| 3.5 | 1.3 | 84.2 | 2 | 9 | 63.5% | 99.5% | 1335 | 1645 | 310 |
| 3.6 | 3.2 | 84.2 | 1 | 8 | 74.5% | 92.0% | 1355 | 2000 | 645 |
| 3.7 | 2.1 | 84.2 | 2 | 8 | 74.8% | 96.6% | 1345 | 1875 | 530 |
| 3.8 | 2 | 84.2 | 0 | 10 | 59.6% | 96.0% | 1360 | 1910 | 550 |
| 3.9 | 1.9 | 84.2 | 1 | 9 | 58.3% | 96.7% | 1345 | 1860 | 515 |
| 3.9 | 0.9 | 84.2 | 2 | 9 | 61.1% | 100.0% | 1335 | 1530 | 195 |
| 4 | 3.8 | 84.2 | 0 | 8 | 65.1% | 89.2% | 1370 | 2000 | 630 |
| 0.4 | 3.4 | 84.2 | 1 | 11 | 23.5% | 93.8% | 1350 | 2000 | 650 |
| 0.5 | 2.3 | 84.2 | 2 | 11 | 26.0% | 98.1% | 1340 | 1760 | 420 |
| 0.6 | 1.2 | 84.2 | 0 | 14 | 68.3% | 95.4% | 1365 | 1535 | 170 |
| 0.7 | 0.1 | 84.2 | 1 | 14 | 43.3% | 99.7% | 1350 | 1465 | 115 |
| 0.7 | 3.1 | 84.2 | 2 | 10 | 30.9% | 96.3% | 1345 | 1965 | 620 |
| 0.8 | 3 | 84.2 | 0 | 12 | 58.7% | 95.5% | 1360 | 2000 | 640 |
| 0.9 | 2.9 | 84.2 | 1 | 11 | 48.2% | 94.4% | 1350 | 1970 | 620 |
| 1 | 1.7 | 84.3 | 2 | 11 | 50.0% | 99.1% | 1340 | 1625 | 285 |
| 1 | 0.7 | 84.3 | 0 | 14 | 96.7% | 99.1% | 1360 | 1390 | 30 |
| 1.1 | 0.6 | 84.3 | 1 | 13 | 76.7% | 97.7% | 1350 | 1410 | 60 |
| 1.2 | 3.5 | 84.3 | 2 | 9 | 71.1% | 93.3% | 1365 | 2000 | 635 |
| 1.3 | 2.4 | 84.3 | 0 | 12 | 87.6% | 97.0% | 1360 | 1895 | 535 |
| 1.4 | 2.3 | 84.3 | 1 | 11 | 72.3% | 95.5% | 1350 | 1840 | 490 |
| 1.5 | 1.2 | 84.3 | 2 | 11 | 72.9% | 99.6% | 1340 | 1510 | 170 |
| 1.5 | 3.2 | 84.3 | 0 | 11 | 82.7% | 94.4% | 1360 | 2000 | 640 |
| 1.6 | 3.1 | 84.3 | 1 | 10 | 70.6% | 95.1% | 1350 | 2000 | 650 |
| 1.7 | 3 | 84.3 | 2 | 9 | 74.9% | 95.7% | 1350 | 1990 | 640 |
| 1.8 | 1.9 | 84.3 | 0 | 12 | 95.7% | 98.2% | 1360 | 1790 | 430 |
| 1.9 | 1.8 | 84.3 | 1 | 11 | 96.1% | 96.1% | 1350 | 1735 | 385 |
| 1.9 | 0.8 | 84.3 | 2 | 11 | 92.1% | 100.0% | 1340 | 1400 | 60 |
| 2 | 3.7 | 84.3 | 0 | 10 | 90.0% | 92.5% | 1360 | 2000 | 640 |
| 2.1 | 1.6 | 84.3 | 0 | 12 | 96.6% | 98.8% | 1360 | 1720 | 360 |
| 2.2 | 1.5 | 84.3 | 1 | 11 | 97.0% | 96.4% | 1350 | 1670 | 320 |
| 2.2 | 0.5 | 84.3 | 2 | 11 | 98.6% | 100.0% | 1340 | 1370 | 30 |
| 2.3 | 3.4 | 84.3 | 0 | 10 | 90.8% | 93.1% | 1360 | 2000 | 640 |
| 2.4 | 0.3 | 84.3 | 1 | 12 | 95.4% | 98.9% | 1350 | 1385 | 35 |
| 2.5 | 0.2 | 84.3 | 2 | 11 | 48.9% | 100.0% | 1335 | 1380 | 45 |
| 2.6 | 0.1 | 84.3 | 0 | 13 | 85.3% | 100.0% | 1360 | 1405 | 45 |
| 2.7 | 1 | 84.3 | 1 | 11 | 88.9% | 97.0% | 1350 | 1540 | 190 |
| 2.7 | 4 | 84.3 | 2 | 7 | 83.8% | 90.3% | 1365 | 2000 | 635 |
| 2.8 | 2.9 | 84.3 | 0 | 10 | 83.6% | 94.2% | 1360 | 2000 | 640 |
| 2.9 | 2.8 | 84.3 | 1 | 9 | 87.1% | 94.6% | 1355 | 2000 | 645 |
| 3 | 1.7 | 84.3 | 2 | 9 | 86.0% | 98.7% | 1340 | 1730 | 390 |
| 3 | 0.7 | 84.3 | 0 | 12 | 80.4% | 100.0% | 1360 | 1470 | 110 |
| 0.3 | 0.4 | 84.3 | 1 | 14 | 32.4% | 98.5% | 1360 | 1475 | 115 |
| 3.1 | 3.6 | 84.3 | 2 | 7 | 77.3% | 92.4% | 1355 | 2000 | 645 |
| 3.2 | 2.5 | 84.3 | 0 | 10 | 74.1% | 95.1% | 1360 | 2000 | 640 |
| 3.3 | 2.4 | 84.3 | 1 | 9 | 77.0% | 95.7% | 1350 | 1955 | 605 |
| 3.4 | 1.3 | 84.3 | 2 | 9 | 77.9% | 99.6% | 1340 | 1635 | 295 |
| 3.4 | 3.3 | 84.3 | 0 | 9 | 77.4% | 91.1% | 1370 | 2000 | 630 |
| 3.5 | 3.2 | 84.3 | 1 | 8 | 75.6% | 92.1% | 1355 | 2000 | 645 |
| 3.6 | 2.1 | 84.3 | 2 | 8 | 77.4% | 96.8% | 1350 | 1865 | 515 |
| 3.7 | 2 | 84.3 | 0 | 10 | 62.3% | 96.2% | 1360 | 1900 | 540 |
| 3.8 | 1.9 | 84.3 | 1 | 9 | 65.6% | 96.9% | 1350 | 1855 | 505 |
| 3.8 | 0.9 | 84.3 | 2 | 9 | 61.2% | 100.0% | 1335 | 1525 | 190 |
| 3.9 | 3.8 | 84.3 | 0 | 8 | 68.1% | 89.4% | 1370 | 2000 | 630 |
| 4 | 3.7 | 84.3 | 1 | 7 | 66.5% | 90.4% | 1360 | 2000 | 640 |
| 0.4 | 2.3 | 84.3 | 2 | 11 | 20.8% | 98.4% | 1340 | 1745 | 405 |
| 0.5 | 1.2 | 84.3 | 0 | 14 | 58.4% | 95.4% | 1365 | 1525 | 160 |
| 0.6 | 3.1 | 84.3 | 2 | 10 | 34.0% | 96.2% | 1360 | 1955 | 595 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.7 | 3 | 84.3 | 0 | 12 | 51.5% | 95.7% | 1360 | 2000 | 640 |
| 0.8 | 2.9 | 84.3 | 1 | 11 | 43.3% | 94.7% | 1350 | 1955 | 605 |
| 0.9 | 1.8 | 84.3 | 2 | 11 | 45.4% | 99.0% | 1340 | 1645 | 305 |
| 0.9 | 0.8 | 84.3 | 0 | 14 | 88.3% | 98.2% | 1360 | 1410 | 50 |
| 1 | 0.6 | 84.4 | 1 | 13 | 69.8% | 97.7% | 1350 | 1420 | 70 |
| 1.2 | 2.4 | 84.4 | 0 | 12 | 82.5% | 97.2% | 1360 | 1880 | 520 |
| 1.3 | 2.3 | 84.4 | 1 | 11 | 67.6% | 95.8% | 1350 | 1830 | 480 |
| 1.4 | 1.2 | 84.4 | 2 | 11 | 68.5% | 100.0% | 1340 | 1500 | 160 |
| 1.4 | 3.2 | 84.4 | 0 | 11 | 77.6% | 94.5% | 1360 | 2000 | 640 |
| 1.5 | 3.1 | 84.4 | 1 | 10 | 70.4% | 95.2% | 1355 | 2000 | 645 |
| 1.6 | 3 | 84.4 | 2 | 9 | 71.2% | 95.8% | 1350 | 1980 | 630 |
| 1.7 | 1.9 | 84.4 | 0 | 12 | 95.7% | 98.3% | 1360 | 1780 | 420 |
| 1.8 | 1.8 | 84.4 | 1 | 11 | 91.6% | 96.4% | 1350 | 1725 | 375 |
| 1.8 | 0.8 | 84.4 | 2 | 11 | 88.1% | 100.0% | 1340 | 1390 | 50 |
| 1.9 | 3.7 | 84.4 | 0 | 10 | 90.0% | 92.6% | 1360 | 2000 | 640 |
| 2 | 3.6 | 84.4 | 1 | 9 | 88.4% | 92.7% | 1355 | 2000 | 645 |
| 2.1 | 1.5 | 84.4 | 1 | 11 | 97.1% | 96.7% | 1350 | 1660 | 310 |
| 2.1 | 0.5 | 84.4 | 2 | 11 | 95.0% | 100.0% | 1340 | 1380 | 40 |
| 2.2 | 3.4 | 84.4 | 0 | 10 | 90.9% | 93.3% | 1360 | 2000 | 640 |
| 2.3 | 0.3 | 84.4 | 1 | 12 | 98.1% | 98.9% | 1350 | 1380 | 30 |
| 2.5 | 0.1 | 84.4 | 0 | 13 | 89.4% | 100.0% | 1360 | 1400 | 40 |
| 2.6 | 1 | 84.4 | 1 | 11 | 91.7% | 97.3% | 1350 | 1530 | 180 |
| 2.6 | 4 | 84.4 | 2 | 7 | 85.2% | 89.8% | 1365 | 2000 | 635 |
| 2.7 | 2.9 | 84.4 | 0 | 10 | 86.5% | 94.4% | 1360 | 2000 | 640 |
| 2.8 | 2.8 | 84.4 | 1 | 9 | 88.2% | 94.6% | 1355 | 2000 | 645 |
| 2.9 | 1.7 | 84.4 | 2 | 9 | 87.9% | 98.8% | 1340 | 1720 | 380 |
| 2.9 | 0.7 | 84.4 | 0 | 12 | 83.0% | 100.0% | 1360 | 1465 | 105 |
| 3 | 0.6 | 84.4 | 1 | 11 | 82.6% | 97.8% | 1350 | 1405 | 55 |
| 3.1 | 2.5 | 84.4 | 0 | 10 | 76.9% | 95.2% | 1360 | 1995 | 635 |
| 3.3 | 1.3 | 84.4 | 2 | 9 | 79.5% | 99.8% | 1340 | 1625 | 285 |
| 3.3 | 3.3 | 84.4 | 0 | 9 | 80.5% | 91.3% | 1370 | 2000 | 630 |
| 3.4 | 3.2 | 84.4 | 1 | 8 | 76.7% | 92.3% | 1355 | 2000 | 645 |
| 3.5 | 2.1 | 84.4 | 2 | 8 | 78.6% | 96.9% | 1350 | 1855 | 505 |
| 3.7 | 1.9 | 84.4 | 1 | 9 | 68.3% | 97.0% | 1350 | 1845 | 495 |
| 3.7 | 0.9 | 84.4 | 2 | 9 | 71.6% | 100.0% | 1340 | 1515 | 175 |
| 3.8 | 3.8 | 84.4 | 0 | 8 | 71.0% | 89.6% | 1370 | 2000 | 630 |
| 4 | 2.6 | 84.4 | 2 | 7 | 68.1% | 94.8% | 1350 | 2000 | 650 |
| 0.4 | 1.2 | 84.4 | 0 | 14 | 48.2% | 95.4% | 1365 | 1515 | 150 |
| 0.5 | 0.1 | 84.4 | 1 | 14 | 35.2% | 99.7% | 1355 | 1485 | 130 |
| 0.5 | 3.1 | 84.4 | 2 | 10 | 28.3% | 95.7% | 1360 | 1945 | 585 |
| 0.7 | 2.9 | 84.4 | 1 | 11 | 38.4% | 95.0% | 1350 | 1945 | 595 |
| 0.8 | 1.8 | 84.4 | 2 | 11 | 40.7% | 99.3% | 1340 | 1635 | 295 |
| 0.8 | 0.8 | 84.4 | 0 | 14 | 79.7% | 97.8% | 1360 | 1400 | 40 |
| 1.1 | 2.4 | 84.5 | 0 | 12 | 77.4% | 97.3% | 1360 | 1870 | 510 |
| 1.2 | 2.3 | 84.5 | 1 | 11 | 62.8% | 96.1% | 1350 | 1820 | 470 |
| 1.3 | 1.2 | 84.5 | 2 | 11 | 64.6% | 100.0% | 1340 | 1485 | 145 |
| 1.4 | 3.1 | 84.5 | 1 | 10 | 65.7% | 95.2% | 1355 | 2000 | 645 |
| 1.5 | 3 | 84.5 | 2 | 9 | 67.7% | 96.0% | 1350 | 1965 | 615 |
| 1.6 | 1.9 | 84.5 | 0 | 12 | 95.8% | 98.5% | 1360 | 1770 | 410 |
| 1.8 | 3.7 | 84.5 | 0 | 10 | 90.2% | 92.6% | 1365 | 2000 | 635 |
| 2 | 2.5 | 84.5 | 2 | 9 | 87.7% | 97.1% | 1350 | 1875 | 525 |
| 2.1 | 3.4 | 84.5 | 0 | 10 | 90.9% | 93.4% | 1360 | 2000 | 640 |
| 2.3 | 0.2 | 84.5 | 2 | 11 | 46.9% | 100.0% | 1335 | 1390 | 55 |
| 2.5 | 4 | 84.5 | 2 | 7 | 86.6% | 89.4% | 1365 | 2000 | 635 |
| 2.7 | 2.8 | 84.5 | 1 | 9 | 89.4% | 94.6% | 1355 | 2000 | 645 |
| 2.8 | 0.7 | 84.5 | 0 | 12 | 85.7% | 100.0% | 1360 | 1455 | 95 |
| 3 | 3.5 | 84.5 | 2 | 7 | 78.9% | 92.9% | 1355 | 2000 | 645 |
| 0.3 | 0.2 | 84.5 | 0 | 15 | 44.9% | 100.0% | 1370 | 1475 | 105 |
| 3.2 | 1.3 | 84.5 | 2 | 9 | 80.1% | 99.9% | 1340 | 1615 | 275 |
| 3.2 | 3.3 | 84.5 | 0 | 9 | 83.6% | 91.5% | 1370 | 2000 | 630 |
| 3.5 | 2 | 84.5 | 0 | 10 | 67.8% | 96.5% | 1360 | 1885 | 525 |
| 3.6 | 1.9 | 84.5 | 1 | 9 | 71.0% | 97.1% | 1350 | 1835 | 485 |
| 3.7 | 3.8 | 84.5 | 0 | 8 | 74.0% | 89.8% | 1370 | 2000 | 630 |
| 3.8 | 3.7 | 84.5 | 1 | 7 | 68.6% | 90.8% | 1360 | 2000 | 640 |
| 3.9 | 2.6 | 84.5 | 2 | 7 | 70.3% | 95.0% | 1355 | 1990 | 635 |
| 4 | 1.5 | 84.5 | 0 | 10 | 56.1% | 97.5% | 1360 | 1770 | 410 |
| 0.4 | 3.1 | 84.5 | 2 | 10 | 22.6% | 95.2% | 1360 | 1930 | 570 |
| 0.5 | 3 | 84.5 | 0 | 12 | 36.8% | 95.0% | 1360 | 1990 | 630 |
| 0.6 | 2.9 | 84.5 | 1 | 11 | 33.4% | 95.3% | 1350 | 1935 | 585 |
| 0.7 | 1.8 | 84.5 | 2 | 11 | 35.9% | 99.6% | 1340 | 1620 | 280 |
| 0.7 | 0.8 | 84.5 | 0 | 14 | 70.9% | 97.3% | 1360 | 1405 | 45 |
| 0.8 | 0.7 | 84.5 | 1 | 13 | 55.9% | 98.2% | 1350 | 1425 | 75 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.9 | 3.6 | 84.5 | 2 | 9 | 53.6% | 91.6% | 1365 | 2000 | 635 |
| 1.1 | 2.3 | 84.4 | 1 | 11 | 57.9% | 96.4% | 1350 | 1805 | 455 |
| 1.2 | 1.2 | 84.6 | 2 | 11 | 59.4% | 100.0% | 1340 | 1475 | 135 |
| 1.2 | 3.2 | 84.6 | 0 | 11 | 67.3% | 94.8% | 1360 | 2000 | 640 |
| 1.3 | 3.1 | 84.6 | 1 | 10 | 60.9% | 95.2% | 1355 | 2000 | 645 |
| 1.4 | 3 | 84.6 | 2 | 9 | 80.8% | 95.8% | 1365 | 1955 | 590 |
| 1.5 | 1.9 | 84.6 | 0 | 12 | 95.9% | 98.6% | 1360 | 1760 | 400 |
| 1.6 | 1.8 | 84.6 | 1 | 11 | 82.2% | 97.0% | 1350 | 1705 | 355 |
| 1.6 | 0.8 | 84.6 | 2 | 11 | 78.1% | 100.0% | 1340 | 1390 | 50 |
| 1.7 | 3.7 | 84.6 | 0 | 10 | 88.1% | 92.5% | 1365 | 2000 | 635 |
| 1.8 | 3.6 | 84.6 | 1 | 9 | 86.3% | 93.1% | 1360 | 2000 | 640 |
| 1.9 | 2.5 | 84.6 | 2 | 9 | 83.8% | 97.3% | 1350 | 1860 | 510 |
| 2 | 1.4 | 84.6 | 0 | 12 | 97.4% | 99.7% | 1360 | 1645 | 285 |
| 0.2 | 1.2 | 84.6 | 0 | 14 | 26.0% | 95.7% | 1365 | 1490 | 125 |
| 2.1 | 0.3 | 84.6 | 1 | 12 | 98.5% | 98.9% | 1350 | 1380 | 30 |
| 2.2 | 0.2 | 84.6 | 2 | 11 | 61.1% | 100.0% | 1340 | 1400 | 60 |
| 2.3 | 0.1 | 84.6 | 0 | 13 | 97.0% | 100.0% | 1360 | 1390 | 30 |
| 2.4 | 1 | 84.6 | 1 | 11 | 97.2% | 97.9% | 1350 | 1510 | 160 |
| 2.4 | 4 | 84.6 | 2 | 7 | 88.0% | 88.9% | 1365 | 2000 | 635 |
| 2.5 | 2.9 | 84.6 | 0 | 10 | 92.2% | 94.6% | 1360 | 2000 | 640 |
| 2.6 | 2.8 | 84.6 | 1 | 9 | 90.6% | 94.5% | 1355 | 2000 | 645 |
| 2.7 | 1.7 | 84.6 | 2 | 9 | 91.7% | 99.1% | 1345 | 1700 | 355 |
| 2.8 | 0.6 | 84.6 | 1 | 11 | 88.0% | 98.4% | 1350 | 1395 | 45 |
| 2.9 | 3.5 | 84.6 | 2 | 7 | 82.6% | 92.6% | 1365 | 2000 | 635 |
| 0.3 | 1.1 | 84.6 | 1 | 13 | 22.4% | 97.8% | 1355 | 1435 | 80 |
| 3.1 | 1.3 | 84.6 | 2 | 9 | 84.2% | 100.0% | 1340 | 1605 | 265 |
| 3.2 | 3.2 | 84.6 | 1 | 8 | 80.2% | 92.7% | 1360 | 2000 | 640 |
| 3.3 | 2.1 | 84.6 | 2 | 8 | 81.0% | 97.2% | 1350 | 1835 | 485 |
| 3.4 | 2 | 84.6 | 0 | 10 | 70.6% | 96.6% | 1360 | 1875 | 515 |
| 3.5 | 1.9 | 84.6 | 1 | 9 | 73.7% | 97.3% | 1350 | 1825 | 475 |
| 3.5 | 0.9 | 84.6 | 2 | 9 | 76.9% | 100.0% | 1340 | 1500 | 160 |
| 3.6 | 3.8 | 84.6 | 0 | 8 | 75.3% | 89.9% | 1370 | 2000 | 630 |
| 3.7 | 3.7 | 84.6 | 1 | 7 | 69.8% | 90.9% | 1360 | 2000 | 640 |
| 3.8 | 2.6 | 84.6 | 2 | 7 | 71.5% | 95.1% | 1355 | 1980 | 625 |
| 3.9 | 1.5 | 84.6 | 0 | 10 | 58.7% | 97.7% | 1360 | 1765 | 405 |
| 4 | 1.4 | 84.6 | 1 | 9 | 58.4% | 98.4% | 1345 | 1710 | 365 |
| 4 | 0.4 | 84.6 | 2 | 9 | 65.5% | 100.0% | 1340 | 1440 | 100 |
| 0.4 | 3 | 84.6 | 0 | 12 | 29.4% | 94.6% | 1360 | 1980 | 620 |
| 0.5 | 2.9 | 84.6 | 1 | 11 | 28.4% | 95.6% | 1350 | 1925 | 575 |
| 0.6 | 1.8 | 84.6 | 2 | 11 | 31.1% | 100.0% | 1340 | 1610 | 270 |
| 0.6 | 0.8 | 84.6 | 0 | 14 | 68.2% | 96.9% | 1365 | 1415 | 50 |
| 0.7 | 0.7 | 84.6 | 1 | 13 | 48.9% | 98.6% | 1350 | 1435 | 85 |
| 0.8 | 3.6 | 84.6 | 2 | 9 | 47.8% | 91.1% | 1365 | 2000 | 635 |
| 0.9 | 2.5 | 84.6 | 0 | 12 | 66.9% | 97.2% | 1360 | 1880 | 520 |
| 1 | 2.3 | 84.7 | 1 | 11 | 53.0% | 96.7% | 1350 | 1795 | 445 |
| 1.1 | 1.2 | 84.7 | 2 | 11 | 54.3% | 100.0% | 1340 | 1465 | 125 |
| 1.1 | 3.2 | 84.7 | 0 | 11 | 62.1% | 94.9% | 1360 | 2000 | 640 |
| 1.2 | 3.1 | 84.7 | 1 | 10 | 56.2% | 95.2% | 1355 | 2000 | 645 |
| 1.3 | 3 | 84.7 | 2 | 9 | 76.6% | 95.3% | 1365 | 1945 | 580 |
| 1.4 | 1.9 | 84.7 | 0 | 12 | 93.1% | 98.8% | 1360 | 1750 | 390 |
| 1.5 | 1.8 | 84.7 | 1 | 11 | 77.4% | 97.3% | 1350 | 1695 | 345 |
| 1.5 | 0.8 | 84.7 | 2 | 11 | 73.0% | 100.0% | 1340 | 1395 | 55 |
| 1.6 | 3.7 | 84.7 | 0 | 10 | 82.8% | 92.4% | 1365 | 2000 | 635 |
| 1.7 | 3.6 | 84.7 | 1 | 9 | 82.0% | 93.3% | 1360 | 2000 | 640 |
| 1.8 | 2.5 | 84.7 | 2 | 9 | 79.9% | 97.4% | 1350 | 1850 | 500 |
| 1.9 | 1.4 | 84.7 | 0 | 12 | 97.4% | 99.9% | 1360 | 1635 | 275 |
| 2 | 1.3 | 84.7 | 1 | 11 | 97.9% | 97.9% | 1350 | 1580 | 230 |
| 2 | 3.3 | 84.7 | 2 | 8 | 92.0% | 93.3% | 1365 | 2000 | 635 |
| 2.1 | 0.2 | 84.7 | 2 | 11 | 59.3% | 100.0% | 1340 | 1405 | 65 |
| 2.2 | 0.1 | 84.7 | 0 | 13 | 99.8% | 100.0% | 1360 | 1390 | 30 |
| 2.3 | 1 | 84.7 | 1 | 11 | 98.8% | 98.2% | 1350 | 1500 | 150 |
| 2.3 | 4 | 84.7 | 2 | 7 | 89.5% | 88.5% | 1365 | 2000 | 635 |
| 2.4 | 2.9 | 84.7 | 0 | 10 | 92.4% | 94.8% | 1360 | 2000 | 640 |
| 2.5 | 2.8 | 84.7 | 1 | 9 | 91.9% | 94.6% | 1355 | 2000 | 645 |
| 2.6 | 1.7 | 84.7 | 2 | 9 | 93.0% | 99.3% | 1345 | 1690 | 345 |
| 2.6 | 0.7 | 84.7 | 0 | 12 | 91.1% | 100.0% | 1360 | 1440 | 80 |
| 2.7 | 0.6 | 84.7 | 1 | 11 | 90.7% | 98.7% | 1350 | 1390 | 40 |
| 2.8 | 3.5 | 84.7 | 2 | 7 | 84.0% | 92.2% | 1365 | 2000 | 635 |
| 2.9 | 2.4 | 84.7 | 0 | 10 | 83.0% | 95.9% | 1360 | 1950 | 590 |
| 3 | 2.3 | 84.7 | 1 | 9 | 87.5% | 96.3% | 1355 | 1900 | 545 |
| 0.3 | 1 | 84.7 | 2 | 12 | 16.7% | 99.9% | 1345 | 1460 | 115 |
| 0.3 | 4 | 84.7 | 0 | 11 | 20.5% | 93.1% | 1360 | 2000 | 640 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.1 | 2.2 | 84.7 | 2 | 8 | 83.2% | 97.1% | 1350 | 1845 | 495 |
| 3.2 | 1.1 | 84.7 | 0 | 11 | 75.7% | 99.6% | 1360 | 1605 | 245 |
| 3.3 | 2 | 84.7 | 1 | 9 | 81.5% | 97.2% | 1355 | 1840 | 485 |
| 3.3 | 0 | 84.7 | 2 | 10 | 75.4% | 100.0% | 1355 | 1410 | 55 |
| 3.4 | 3.9 | 84.7 | 0 | 8 | 77.2% | 90.0% | 1370 | 2000 | 630 |
| 3.5 | 3.8 | 84.7 | 1 | 7 | 71.9% | 91.0% | 1360 | 2000 | 640 |
| 3.6 | 2.7 | 84.7 | 2 | 7 | 73.6% | 94.8% | 1355 | 1990 | 635 |
| 3.7 | 1.6 | 84.7 | 0 | 10 | 63.8% | 97.6% | 1360 | 1780 | 420 |
| 3.8 | 1.5 | 84.7 | 1 | 9 | 67.2% | 98.3% | 1350 | 1725 | 375 |
| 3.8 | 0.5 | 84.7 | 2 | 9 | 70.6% | 100.0% | 1340 | 1430 | 90 |
| 3.9 | 3.4 | 84.7 | 0 | 8 | 69.8% | 90.7% | 1370 | 2000 | 630 |
| 4 | 0.3 | 84.7 | 1 | 10 | 54.2% | 100.0% | 1340 | 1435 | 95 |
| 0.5 | 1.8 | 84.7 | 0 | 13 | 41.5% | 96.1% | 1360 | 1675 | 315 |
| 0.6 | 1.7 | 84.7 | 1 | 12 | 39.5% | 96.5% | 1355 | 1615 | 260 |
| 0.6 | 0.7 | 84.7 | 2 | 12 | 34.3% | 100.0% | 1345 | 1460 | 115 |
| 0.7 | 3.6 | 84.7 | 0 | 11 | 41.2% | 94.0% | 1360 | 2000 | 640 |
| 0.8 | 3.5 | 84.7 | 1 | 10 | 37.3% | 94.6% | 1355 | 2000 | 645 |
| 0.9 | 2.4 | 84.7 | 2 | 10 | 39.5% | 98.7% | 1345 | 1775 | 430 |
| 1.1 | 0.1 | 84.8 | 1 | 13 | 55.4% | 99.7% | 1350 | 1455 | 105 |
| 1.1 | 3.1 | 84.8 | 2 | 9 | 66.2% | 94.1% | 1365 | 1950 | 585 |
| 1.2 | 3 | 84.8 | 0 | 11 | 67.4% | 95.5% | 1360 | 2000 | 640 |
| 1.3 | 2.9 | 84.8 | 1 | 10 | 61.1% | 95.9% | 1355 | 1955 | 600 |
| 1.4 | 1.8 | 84.8 | 2 | 10 | 57.5% | 100.0% | 1340 | 1645 | 305 |
| 1.4 | 0.8 | 84.8 | 0 | 13 | 99.8% | 100.0% | 1360 | 1415 | 55 |
| 1.5 | 0.7 | 84.8 | 1 | 12 | 91.3% | 97.7% | 1350 | 1390 | 40 |
| 1.6 | 3.6 | 84.8 | 2 | 8 | 91.4% | 90.6% | 1365 | 2000 | 635 |
| 1.7 | 2.5 | 84.8 | 0 | 11 | 93.6% | 96.6% | 1360 | 1910 | 550 |
| 1.8 | 2.4 | 84.8 | 1 | 10 | 80.6% | 97.4% | 1350 | 1860 | 510 |
| 1.9 | 1.3 | 84.8 | 2 | 10 | 80.1% | 100.0% | 1340 | 1535 | 195 |
| 1.9 | 3.3 | 84.8 | 0 | 10 | 91.5% | 93.8% | 1365 | 2000 | 635 |
| 2 | 3.2 | 84.8 | 1 | 9 | 89.3% | 94.2% | 1355 | 2000 | 645 |
| 2.1 | 1.1 | 84.8 | 1 | 11 | 98.6% | 98.4% | 1350 | 1520 | 170 |
| 2.2 | 1 | 84.8 | 2 | 10 | 93.3% | 100.0% | 1340 | 1460 | 120 |
| 2.2 | 4 | 84.8 | 0 | 9 | 89.3% | 90.9% | 1370 | 2000 | 630 |
| 2.3 | 3.9 | 84.8 | 1 | 8 | 89.4% | 92.0% | 1360 | 2000 | 640 |
| 2.4 | 2.8 | 84.8 | 2 | 8 | 91.7% | 95.8% | 1355 | 1950 | 595 |
| 2.6 | 1.6 | 84.8 | 1 | 10 | 87.1% | 99.1% | 1345 | 1695 | 350 |
| 2.6 | 0.6 | 84.8 | 2 | 10 | 93.9% | 100.0% | 1340 | 1375 | 35 |
| 2.7 | 3.5 | 84.8 | 0 | 9 | 90.0% | 91.7% | 1370 | 2000 | 630 |
| 2.8 | 3.4 | 84.8 | 1 | 8 | 84.5% | 92.8% | 1360 | 2000 | 640 |
| 2.9 | 2.3 | 84.8 | 2 | 8 | 85.4% | 97.0% | 1350 | 1855 | 505 |
| 3 | 1.2 | 84.8 | 0 | 11 | 80.8% | 99.6% | 1360 | 1625 | 265 |
| 0.3 | 1.9 | 84.8 | 1 | 12 | 19.4% | 97.0% | 1355 | 1645 | 290 |
| 0.3 | 0.9 | 84.8 | 2 | 12 | 16.8% | 100.0% | 1345 | 1470 | 125 |
| 3.2 | 3 | 84.8 | 1 | 8 | 80.8% | 93.4% | 1360 | 2000 | 640 |
| 3.3 | 0.9 | 84.8 | 0 | 11 | 73.7% | 100.0% | 1360 | 1540 | 180 |
| 3.4 | 0.8 | 84.8 | 1 | 10 | 72.8% | 100.0% | 1345 | 1480 | 135 |
| 3.5 | 3.7 | 84.8 | 2 | 6 | 72.7% | 90.6% | 1370 | 2000 | 630 |
| 3.6 | 2.6 | 84.8 | 0 | 9 | 74.5% | 93.2% | 1370 | 2000 | 630 |
| 3.8 | 1.4 | 84.8 | 2 | 8 | 75.0% | 99.1% | 1345 | 1660 | 315 |
| 3.9 | 3.3 | 84.8 | 1 | 7 | 68.6% | 91.9% | 1360 | 2000 | 640 |
| 0.4 | 2.8 | 84.8 | 0 | 12 | 29.6% | 95.4% | 1360 | 1920 | 560 |
| 0.5 | 2.7 | 84.8 | 1 | 11 | 28.3% | 96.5% | 1350 | 1865 | 515 |
| 0.6 | 1.6 | 84.8 | 2 | 11 | 30.0% | 100.0% | 1340 | 1545 | 205 |
| 0.6 | 0.6 | 84.8 | 0 | 14 | 61.9% | 97.8% | 1360 | 1435 | 75 |
| 0.8 | 3.4 | 84.8 | 2 | 9 | 48.1% | 91.7% | 1365 | 2000 | 635 |
| 0.9 | 2.3 | 84.8 | 0 | 12 | 67.2% | 98.0% | 1360 | 1820 | 460 |
| 1 | 1.1 | 84.9 | 1 | 12 | 66.9% | 97.6% | 1355 | 1455 | 100 |
| 1.2 | 3.9 | 84.9 | 1 | 9 | 73.1% | 92.1% | 1370 | 2000 | 630 |
| 1.3 | 2.8 | 84.9 | 2 | 9 | 77.3% | 96.0% | 1365 | 1885 | 520 |
| 1.4 | 1.7 | 84.9 | 0 | 12 | 93.2% | 99.5% | 1360 | 1685 | 325 |
| 1.5 | 0.6 | 84.9 | 2 | 11 | 72.5% | 100.0% | 1340 | 1415 | 75 |
| 1.6 | 3.5 | 84.9 | 0 | 10 | 83.1% | 93.0% | 1365 | 2000 | 635 |
| 1.7 | 3.4 | 84.9 | 1 | 9 | 82.6% | 94.0% | 1360 | 2000 | 640 |
| 2 | 0.1 | 84.9 | 1 | 12 | 62.7% | 99.7% | 1350 | 1405 | 55 |
| 2.1 | 3 | 84.9 | 1 | 9 | 92.5% | 94.7% | 1355 | 2000 | 645 |
| 2.2 | 0.9 | 84.9 | 0 | 12 | 99.1% | 100.0% | 1360 | 1485 | 125 |
| 2.4 | 3.7 | 84.9 | 2 | 7 | 89.0% | 89.8% | 1365 | 2000 | 635 |
| 2.6 | 2.5 | 84.9 | 1 | 9 | 91.7% | 95.5% | 1355 | 1920 | 565 |
| 2.7 | 0.4 | 84.9 | 0 | 12 | 88.6% | 100.0% | 1360 | 1405 | 45 |
| 3 | 1.1 | 84.9 | 0 | 11 | 81.2% | 99.9% | 1360 | 1590 | 230 |
| 3.1 | 0 | 84.9 | 1 | 11 | 87.9% | 100.0% | 1365 | 1410 | 45 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.2 | 3.9 | 84.9 | 2 | 6 | 76.3% | 88.7% | 1370 | 2000 | 630 |
| 3.3 | 2.8 | 84.9 | 0 | 9 | 82.8% | 93.0% | 1370 | 2000 | 630 |
| 3.4 | 2.7 | 84.9 | 1 | 8 | 78.2% | 94.1% | 1355 | 2000 | 645 |
| 3.5 | 0.6 | 84.9 | 0 | 11 | 69.5% | 100.0% | 1360 | 1425 | 65 |
| 3.7 | 3.4 | 84.9 | 2 | 6 | 70.9% | 92.3% | 1370 | 2000 | 630 |
| 3.9 | 0.2 | 84.9 | 1 | 10 | 52.4% | 100.0% | 1345 | 1430 | 85 |
| 4 | 0.1 | 84.9 | 2 | 9 | 52.4% | 100.0% | 1345 | 1445 | 100 |
| 4 | 3.1 | 84.9 | 0 | 8 | 68.1% | 91.6% | 1370 | 2000 | 630 |
| 0.4 | 0.7 | 84.9 | 1 | 13 | 30.1% | 100.0% | 1355 | 1460 | 105 |
| 0.6 | 2.5 | 84.9 | 0 | 12 | 44.8% | 97.6% | 1360 | 1850 | 490 |
| 0.7 | 2.4 | 84.9 | 1 | 11 | 38.2% | 97.1% | 1350 | 1795 | 445 |
| 0.8 | 1.3 | 84.9 | 2 | 11 | 39.3% | 100.0% | 1340 | 1465 | 125 |
| 0.8 | 3.3 | 84.9 | 0 | 11 | 46.4% | 95.0% | 1360 | 2000 | 640 |
| 0.9 | 3.2 | 84.9 | 1 | 10 | 42.1% | 95.5% | 1355 | 2000 | 645 |
| 1 | 3 | 85 | 2 | 9 | 60.5% | 93.9% | 1365 | 1910 | 545 |
| 1.1 | 1.9 | 85 | 0 | 12 | 77.6% | 99.2% | 1360 | 1715 | 355 |
| 1.2 | 1.8 | 85 | 1 | 11 | 62.9% | 98.2% | 1350 | 1660 | 310 |
| 1.2 | 0.8 | 85 | 2 | 11 | 61.3% | 100.0% | 1345 | 1420 | 75 |
| 1.4 | 3.6 | 85 | 1 | 9 | 69.9% | 93.9% | 1360 | 2000 | 640 |
| 1.5 | 2.5 | 85 | 2 | 9 | 69.0% | 97.8% | 1350 | 1815 | 465 |
| 1.6 | 1.4 | 85 | 0 | 12 | 97.7% | 100.0% | 1360 | 1605 | 245 |
| 1.7 | 1.3 | 85 | 1 | 11 | 87.4% | 98.8% | 1350 | 1550 | 200 |
| 1.7 | 3.3 | 85 | 2 | 8 | 92.4% | 91.9% | 1365 | 2000 | 635 |
| 1.8 | 2.2 | 85 | 0 | 11 | 95.0% | 97.6% | 1360 | 1830 | 470 |
| 1.9 | 2.1 | 85 | 1 | 10 | 85.5% | 98.4% | 1350 | 1780 | 430 |
| 2 | 2 | 85 | 2 | 9 | 89.0% | 99.0% | 1350 | 1720 | 370 |
| 2 | 0 | 85 | 0 | 13 | 100.0% | 100.0% | 1380 | 1400 | 20 |
| 2.1 | 3.9 | 85 | 2 | 7 | 90.4% | 87.8% | 1370 | 2000 | 630 |
| 2.2 | 2.8 | 85 | 0 | 10 | 92.9% | 95.4% | 1360 | 2000 | 640 |
| 2.3 | 2.7 | 85 | 1 | 9 | 93.4% | 95.4% | 1355 | 1950 | 595 |
| 2.4 | 1.6 | 85 | 2 | 9 | 96.0% | 100.0% | 1345 | 1635 | 290 |
| 2.4 | 0.6 | 85 | 0 | 12 | 97.1% | 100.0% | 1360 | 1390 | 30 |
| 2.5 | 0.5 | 85 | 1 | 11 | 96.1% | 99.7% | 1350 | 1385 | 35 |
| 2.6 | 3.4 | 85 | 2 | 7 | 87.2% | 91.6% | 1365 | 2000 | 635 |
| 2.7 | 2.3 | 85 | 0 | 10 | 89.2% | 96.5% | 1360 | 1905 | 545 |
| 2.8 | 0.2 | 85 | 1 | 11 | 79.5% | 100.0% | 1350 | 1395 | 45 |
| 2.9 | 0.1 | 85 | 2 | 10 | 52.9% | 100.0% | 1345 | 1395 | 50 |
| 2.9 | 3.1 | 85 | 0 | 9 | 88.9% | 92.7% | 1370 | 2000 | 630 |
| 3 | 4 | 85 | 1 | 7 | 78.6% | 91.2% | 1365 | 2000 | 635 |
| 3.1 | 1.9 | 85 | 0 | 10 | 79.5% | 97.4% | 1360 | 1820 | 460 |
| 3.2 | 1.8 | 85 | 1 | 9 | 85.3% | 98.0% | 1355 | 1770 | 415 |
| 3.2 | 0.8 | 85 | 2 | 9 | 88.1% | 100.0% | 1345 | 1430 | 85 |
| 3.3 | 3.7 | 85 | 0 | 8 | 78.9% | 90.8% | 1370 | 2000 | 630 |
| 3.4 | 3.6 | 85 | 1 | 7 | 73.6% | 91.8% | 1360 | 2000 | 640 |
| 3.5 | 2.5 | 85 | 2 | 7 | 75.5% | 95.5% | 1355 | 1925 | 570 |
| 3.6 | 1.4 | 85 | 0 | 10 | 67.4% | 98.5% | 1360 | 1705 | 345 |
| 3.7 | 1.3 | 85 | 1 | 9 | 70.7% | 99.2% | 1350 | 1650 | 300 |
| 3.7 | 3.3 | 85 | 2 | 6 | 71.2% | 92.6% | 1370 | 2000 | 630 |
| 3.8 | 2.2 | 85 | 0 | 9 | 70.2% | 94.2% | 1370 | 1930 | 560 |
| 3.9 | 2.1 | 85 | 1 | 8 | 70.9% | 95.2% | 1355 | 1880 | 525 |
| 4 | 2 | 85 | 2 | 7 | 70.8% | 96.9% | 1355 | 1825 | 470 |
| 4 | 0 | 85 | 0 | 11 | 64.7% | 100.0% | 1380 | 1445 | 65 |
| 0.4 | 0.6 | 85 | 1 | 13 | 30.2% | 100.0% | 1355 | 1470 | 115 |
| 0.5 | 3.5 | 85 | 2 | 9 | 30.3% | 89.9% | 1365 | 2000 | 635 |
| 0.6 | 2.4 | 85 | 0 | 12 | 45.0% | 98.0% | 1360 | 1820 | 460 |
| 0.7 | 2.3 | 85 | 1 | 11 | 38.1% | 97.6% | 1350 | 1760 | 410 |
| 0.8 | 1.2 | 85 | 2 | 11 | 41.2% | 100.0% | 1345 | 1430 | 85 |
| 0.8 | 3.2 | 85 | 0 | 11 | 46.4% | 95.3% | 1360 | 2000 | 640 |
| 0.9 | 3.1 | 85 | 1 | 10 | 42.2% | 95.9% | 1355 | 1970 | 615 |
| 1 | 3.9 | 85.1 | 2 | 8 | 60.9% | 86.8% | 1365 | 2000 | 635 |
| 1.1 | 2.8 | 85.1 | 0 | 11 | 62.2% | 96.4% | 1360 | 1940 | 580 |
| 1.2 | 2.7 | 85.1 | 1 | 10 | 56.6% | 96.8% | 1355 | 1885 | 530 |
| 1.3 | 1.6 | 85.1 | 2 | 10 | 57.5% | 100.0% | 1345 | 1565 | 220 |
| 1.3 | 0.6 | 85.1 | 0 | 13 | 93.7% | 100.0% | 1360 | 1400 | 40 |
| 1.4 | 0.5 | 85.1 | 1 | 12 | 81.7% | 98.9% | 1355 | 1415 | 60 |
| 1.5 | 3.4 | 85.1 | 2 | 8 | 89.6% | 90.7% | 1365 | 2000 | 635 |
| 1.6 | 2.3 | 85.1 | 0 | 11 | 88.7% | 97.5% | 1360 | 1840 | 480 |
| 1.7 | 0.2 | 85.1 | 1 | 12 | 77.5% | 99.3% | 1350 | 1420 | 70 |
| 1.8 | 0.1 | 85.1 | 2 | 11 | 49.7% | 100.0% | 1345 | 1440 | 95 |
| 1.8 | 3.1 | 85.1 | 0 | 10 | 92.2% | 94.4% | 1365 | 2000 | 635 |
| 1.9 | 4 | 85.1 | 1 | 8 | 89.9% | 90.8% | 1370 | 2000 | 630 |
| 2 | 2.9 | 85.1 | 2 | 8 | 93.5% | 94.6% | 1365 | 1935 | 570 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.1 | 1.8 | 85.1 | 1 | 10 | 95.1% | 99.2% | 1350 | 1705 | 355 |
| 2.1 | 0.8 | 85.1 | 2 | 10 | 96.9% | 100.0% | 1345 | 1375 | 30 |
| 2.2 | 3.7 | 85.1 | 0 | 9 | 90.3% | 92.0% | 1370 | 2000 | 630 |
| 2.3 | 3.6 | 85.1 | 1 | 8 | 90.4% | 93.0% | 1360 | 2000 | 640 |
| 2.4 | 2.5 | 85.1 | 2 | 8 | 92.8% | 96.9% | 1355 | 1860 | 505 |
| 2.5 | 1.4 | 85.1 | 0 | 11 | 94.1% | 99.6% | 1360 | 1650 | 290 |
| 2.6 | 1.3 | 85.1 | 1 | 10 | 88.6% | 100.0% | 1345 | 1595 | 250 |
| 2.6 | 3.3 | 85.1 | 2 | 7 | 87.5% | 91.8% | 1365 | 2000 | 635 |
| 2.7 | 2.2 | 85.1 | 0 | 10 | 89.7% | 96.9% | 1360 | 1875 | 515 |
| 2.8 | 2.1 | 85.1 | 1 | 9 | 90.5% | 96.9% | 1355 | 1820 | 465 |
| 2.9 | 2 | 85.1 | 2 | 8 | 86.4% | 98.1% | 1350 | 1765 | 415 |
| 2.9 | 0 | 85.1 | 0 | 12 | 95.2% | 100.0% | 1380 | 1415 | 35 |
| 3 | 0.9 | 85.1 | 1 | 10 | 81.3% | 100.0% | 1345 | 1485 | 140 |
| 0.3 | 3.6 | 85.1 | 2 | 9 | 18.2% | 88.6% | 1365 | 2000 | 635 |
| 3.1 | 2.8 | 85.1 | 0 | 9 | 87.6% | 93.4% | 1370 | 2000 | 630 |
| 3.2 | 2.7 | 85.1 | 1 | 8 | 81.7% | 94.5% | 1360 | 1990 | 630 |
| 3.3 | 1.6 | 85.1 | 2 | 8 | 82.6% | 99.0% | 1350 | 1680 | 330 |
| 3.3 | 0.6 | 85.1 | 0 | 11 | 74.9% | 100.0% | 1360 | 1420 | 60 |
| 3.4 | 0.5 | 85.1 | 1 | 10 | 73.8% | 100.0% | 1345 | 1410 | 65 |
| 3.5 | 3.4 | 85.1 | 2 | 6 | 73.6% | 91.5% | 1370 | 2000 | 630 |
| 3.6 | 2.3 | 85.1 | 0 | 9 | 75.9% | 94.2% | 1370 | 1940 | 570 |
| 3.7 | 0.2 | 85.1 | 1 | 10 | 52.4% | 100.0% | 1345 | 1425 | 80 |
| 3.8 | 0.1 | 85.1 | 2 | 9 | 50.3% | 100.0% | 1345 | 1440 | 95 |
| 3.8 | 3.1 | 85.1 | 0 | 8 | 74.1% | 91.9% | 1370 | 2000 | 630 |
| 3.9 | 4 | 85.1 | 1 | 6 | 64.8% | 90.4% | 1365 | 2000 | 635 |
| 4 | 2.9 | 85.1 | 2 | 6 | 65.4% | 94.0% | 1355 | 2000 | 645 |
| 0.4 | 1.5 | 85.1 | 0 | 13 | 33.3% | 97.0% | 1360 | 1565 | 205 |
| 0.5 | 1.4 | 85.1 | 1 | 12 | 33.1% | 98.2% | 1355 | 1505 | 150 |
| 0.5 | 0.4 | 85.1 | 2 | 12 | 28.4% | 100.0% | 1345 | 1495 | 150 |
| 0.6 | 0.3 | 85.1 | 0 | 14 | 54.0% | 99.1% | 1360 | 1460 | 100 |
| 0.7 | 2.2 | 85.1 | 1 | 11 | 38.1% | 98.0% | 1350 | 1730 | 380 |
| 0.8 | 1.1 | 85.1 | 2 | 11 | 40.9% | 100.0% | 1345 | 1425 | 80 |
| 0.9 | 1 | 85.1 | 0 | 13 | 73.5% | 100.0% | 1360 | 1440 | 80 |
| 0.9 | 0 | 85.1 | 1 | 13 | 47.3% | 100.0% | 1370 | 1485 | 115 |
| 1.1 | 2.7 | 85.2 | 0 | 11 | 62.3% | 96.8% | 1360 | 1910 | 550 |
| 1.2 | 2.6 | 85.2 | 1 | 10 | 56.7% | 97.1% | 1355 | 1855 | 500 |
| 1.3 | 1.5 | 85.2 | 2 | 10 | 57.6% | 100.0% | 1345 | 1535 | 190 |
| 1.3 | 0.5 | 85.2 | 0 | 13 | 88.5% | 100.0% | 1360 | 1410 | 50 |
| 1.4 | 0.4 | 85.2 | 1 | 12 | 76.8% | 99.4% | 1355 | 1425 | 70 |
| 1.5 | 0.3 | 85.2 | 2 | 11 | 66.1% | 100.0% | 1345 | 1445 | 100 |
| 1.6 | 0.2 | 85.2 | 0 | 13 | 86.5% | 100.0% | 1360 | 1410 | 50 |
| 1.7 | 1.1 | 85.2 | 1 | 11 | 87.7% | 99.7% | 1350 | 1480 | 130 |
| 1.8 | 4 | 85.2 | 0 | 9 | 89.6% | 91.7% | 1370 | 2000 | 630 |
| 1.9 | 3.9 | 85.2 | 1 | 8 | 90.2% | 91.1% | 1370 | 2000 | 630 |
| 2 | 2.8 | 85.2 | 2 | 8 | 93.8% | 94.9% | 1365 | 1905 | 540 |
| 2.1 | 1.7 | 85.2 | 1 | 10 | 95.3% | 99.6% | 1350 | 1675 | 325 |
| 2.1 | 0.7 | 85.2 | 2 | 10 | 97.5% | 100.0% | 1345 | 1380 | 35 |
| 2.2 | 3.6 | 85.2 | 0 | 9 | 90.7% | 92.3% | 1370 | 2000 | 630 |
| 2.3 | 3.5 | 85.2 | 1 | 8 | 90.7% | 93.4% | 1360 | 2000 | 640 |
| 2.4 | 2.4 | 85.2 | 2 | 8 | 93.2% | 97.3% | 1355 | 1830 | 475 |
| 2.5 | 1.3 | 85.2 | 0 | 11 | 94.6% | 99.9% | 1360 | 1615 | 255 |
| 2.6 | 1.2 | 85.2 | 1 | 10 | 89.0% | 100.0% | 1345 | 1560 | 215 |
| 2.6 | 3.2 | 85.2 | 2 | 7 | 87.9% | 92.2% | 1365 | 2000 | 635 |
| 2.7 | 2.1 | 85.2 | 0 | 10 | 90.2% | 97.2% | 1360 | 1845 | 485 |
| 2.8 | 3 | 85.2 | 1 | 8 | 85.8% | 94.2% | 1360 | 2000 | 640 |
| 2.9 | 1.9 | 85.2 | 2 | 8 | 86.7% | 98.5% | 1350 | 1735 | 385 |
| 2.9 | 0.9 | 85.2 | 0 | 11 | 84.9% | 100.0% | 1360 | 1505 | 145 |
| 3 | 0.8 | 85.2 | 1 | 10 | 81.3% | 100.0% | 1345 | 1445 | 100 |
| 0.3 | 3.5 | 85.2 | 2 | 9 | 18.3% | 88.9% | 1365 | 1980 | 615 |
| 3.1 | 2.7 | 85.2 | 0 | 9 | 87.9% | 93.8% | 1370 | 2000 | 630 |
| 3.2 | 2.6 | 85.2 | 1 | 8 | 82.0% | 94.8% | 1360 | 1960 | 600 |
| 3.3 | 0.5 | 85.2 | 0 | 11 | 75.2% | 100.0% | 1360 | 1420 | 60 |
| 3.4 | 0.4 | 85.2 | 1 | 10 | 66.6% | 100.0% | 1345 | 1410 | 65 |
| 3.5 | 0.3 | 85.2 | 2 | 9 | 74.0% | 100.0% | 1345 | 1425 | 80 |
| 3.6 | 0.2 | 85.2 | 0 | 11 | 66.9% | 100.0% | 1360 | 1430 | 70 |
| 3.7 | 1.1 | 85.2 | 1 | 9 | 71.6% | 99.9% | 1350 | 1580 | 230 |
| 3.8 | 1 | 85.2 | 2 | 8 | 76.7% | 100.0% | 1345 | 1520 | 175 |
| 3.8 | 4 | 85.2 | 0 | 7 | 69.0% | 89.7% | 1370 | 2000 | 630 |
| 3.9 | 3.9 | 85.2 | 1 | 6 | 65.0% | 90.7% | 1365 | 2000 | 635 |
| 0.4 | 1.4 | 85.2 | 0 | 13 | 33.3% | 97.4% | 1360 | 1530 | 170 |
| 0.5 | 3.3 | 85.2 | 2 | 9 | 30.5% | 90.5% | 1365 | 1940 | 575 |
| 0.6 | 2.2 | 85.2 | 0 | 12 | 45.3% | 98.9% | 1360 | 1755 | 395 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.7 | 2.1 | 85.2 | 1 | 11 | 38.0% | 98.4% | 1350 | 1700 | 350 |
| 0.8 | 2 | 85.2 | 2 | 10 | 36.1% | 100.0% | 1345 | 1635 | 290 |
| 0.9 | 0.9 | 85.2 | 1 | 12 | 60.7% | 98.7% | 1355 | 1420 | 65 |
| 1.1 | 2.6 | 85.3 | 0 | 11 | 62.3% | 97.1% | 1360 | 1880 | 520 |
| 1.3 | 1.4 | 85.3 | 2 | 10 | 60.2% | 100.0% | 1345 | 1500 | 155 |
| 1.3 | 0.4 | 85.3 | 0 | 13 | 83.3% | 100.0% | 1360 | 1415 | 55 |
| 1.4 | 3.3 | 85.3 | 1 | 9 | 83.9% | 94.9% | 1370 | 2000 | 630 |
| 1.5 | 2.2 | 85.3 | 2 | 9 | 87.6% | 98.9% | 1365 | 1725 | 360 |
| 1.7 | 2 | 85.3 | 1 | 10 | 81.5% | 99.1% | 1355 | 1725 | 370 |
| 1.7 | 0 | 85.3 | 2 | 11 | 67.2% | 100.0% | 1365 | 1460 | 95 |
| 1.8 | 3.9 | 85.3 | 0 | 9 | 90.0% | 92.0% | 1370 | 2000 | 630 |
| 2.1 | 1.6 | 85.3 | 1 | 10 | 95.5% | 100.0% | 1350 | 1640 | 290 |
| 2.1 | 0.6 | 85.3 | 2 | 10 | 93.3% | 100.0% | 1345 | 1390 | 45 |
| 2.2 | 3.5 | 85.3 | 0 | 9 | 91.0% | 92.7% | 1370 | 2000 | 630 |
| 2.4 | 2.3 | 85.3 | 2 | 8 | 93.5% | 97.7% | 1355 | 1800 | 445 |
| 2.5 | 1.2 | 85.3 | 0 | 11 | 95.1% | 100.0% | 1360 | 1580 | 220 |
| 2.6 | 0.1 | 85.3 | 1 | 11 | 53.9% | 100.0% | 1350 | 1390 | 40 |
| 2.7 | 3 | 85.3 | 0 | 9 | 91.6% | 93.5% | 1370 | 2000 | 630 |
| 2.9 | 1.8 | 85.3 | 2 | 8 | 87.1% | 98.8% | 1350 | 1700 | 350 |
| 0.3 | 3.4 | 85.3 | 2 | 9 | 18.3% | 89.2% | 1365 | 1945 | 580 |
| 3.3 | 1.4 | 85.3 | 2 | 8 | 83.2% | 99.8% | 1350 | 1615 | 265 |
| 3.5 | 2.2 | 85.3 | 2 | 7 | 76.4% | 96.6% | 1355 | 1835 | 480 |
| 3.8 | 3.9 | 85.3 | 0 | 7 | 69.3% | 90.1% | 1370 | 2000 | 630 |
| 4 | 2.7 | 85.3 | 2 | 6 | 65.9% | 94.7% | 1355 | 1980 | 625 |
| 0.4 | 1.3 | 85.3 | 0 | 13 | 33.3% | 97.8% | 1360 | 1495 | 135 |
| 0.5 | 1.2 | 85.3 | 1 | 12 | 33.4% | 99.1% | 1355 | 1435 | 80 |
| 0.5 | 3.2 | 85.3 | 2 | 9 | 30.6% | 90.8% | 1365 | 1910 | 545 |
| 0.8 | 1.9 | 85.3 | 2 | 10 | 38.7% | 100.0% | 1350 | 1605 | 255 |
| 0.9 | 0.8 | 85.3 | 1 | 12 | 60.0% | 99.2% | 1355 | 1430 | 75 |
| 1 | 3.6 | 85.4 | 2 | 8 | 61.5% | 87.7% | 1365 | 2000 | 635 |
| 1.1 | 2.5 | 85.4 | 0 | 11 | 62.3% | 97.5% | 1360 | 1850 | 490 |
| 1.2 | 2.4 | 85.4 | 1 | 10 | 56.9% | 97.9% | 1355 | 1790 | 435 |
| 1.4 | 3.2 | 85.4 | 1 | 9 | 84.2% | 95.2% | 1370 | 2000 | 630 |
| 1.5 | 2.1 | 85.4 | 2 | 9 | 88.0% | 99.2% | 1365 | 1690 | 325 |
| 1.6 | 2 | 85.4 | 0 | 11 | 89.0% | 98.7% | 1360 | 1750 | 390 |
| 1.7 | 1.9 | 85.4 | 1 | 10 | 81.7% | 99.4% | 1355 | 1695 | 340 |
| 1.7 | 0.9 | 85.4 | 2 | 10 | 79.4% | 100.0% | 1345 | 1390 | 45 |
| 1.8 | 3.8 | 85.4 | 0 | 9 | 90.3% | 92.4% | 1370 | 2000 | 630 |
| 1.9 | 3.7 | 85.4 | 1 | 8 | 90.9% | 91.7% | 1370 | 2000 | 630 |
| 2 | 2.6 | 85.4 | 2 | 8 | 94.6% | 95.5% | 1365 | 1845 | 480 |
| 2.1 | 1.5 | 85.4 | 1 | 10 | 90.5% | 100.0% | 1345 | 1610 | 265 |
| 2.2 | 3.4 | 85.4 | 0 | 9 | 91.3% | 93.0% | 1370 | 2000 | 630 |
| 2.3 | 0.3 | 85.4 | 1 | 11 | 87.3% | 100.0% | 1350 | 1385 | 35 |
| 2.4 | 0.2 | 85.4 | 2 | 10 | 63.4% | 100.0% | 1345 | 1400 | 55 |
| 2.6 | 1 | 85.4 | 1 | 10 | 90.0% | 100.0% | 1345 | 1485 | 140 |
| 2.6 | 4 | 85.4 | 2 | 6 | 84.6% | 86.0% | 1370 | 2000 | 630 |
| 2.7 | 2.9 | 85.4 | 0 | 9 | 91.9% | 93.8% | 1370 | 2000 | 630 |
| 2.8 | 2.8 | 85.4 | 1 | 8 | 86.4% | 94.9% | 1360 | 1975 | 615 |
| 2.9 | 1.7 | 85.4 | 2 | 8 | 87.4% | 99.2% | 1350 | 1670 | 320 |
| 2.9 | 0.7 | 85.4 | 0 | 11 | 85.8% | 100.0% | 1360 | 1425 | 65 |
| 3 | 0.6 | 85.4 | 1 | 10 | 81.1% | 100.0% | 1345 | 1395 | 50 |
| 0.3 | 0.3 | 85.4 | 2 | 12 | 16.6% | 100.0% | 1345 | 1525 | 180 |
| 3.1 | 2.5 | 85.4 | 0 | 9 | 88.6% | 94.5% | 1370 | 1955 | 585 |
| 3.2 | 2.4 | 85.4 | 1 | 8 | 82.7% | 95.6% | 1360 | 1900 | 540 |
| 3.3 | 1.3 | 85.4 | 2 | 8 | 83.5% | 100.0% | 1350 | 1580 | 230 |
| 3.3 | 3.3 | 85.4 | 0 | 8 | 80.1% | 92.2% | 1370 | 2000 | 630 |
| 3.4 | 3.2 | 85.4 | 1 | 7 | 74.8% | 93.2% | 1360 | 2000 | 640 |
| 3.5 | 2.1 | 85.4 | 2 | 7 | 76.7% | 97.0% | 1355 | 1805 | 450 |
| 3.6 | 2 | 85.4 | 0 | 9 | 77.3% | 95.3% | 1370 | 1850 | 480 |
| 3.7 | 1.9 | 85.4 | 1 | 8 | 77.1% | 96.4% | 1355 | 1800 | 445 |
| 3.7 | 0.9 | 85.4 | 2 | 8 | 78.7% | 100.0% | 1345 | 1470 | 125 |
| 3.8 | 3.8 | 85.4 | 0 | 7 | 69.5% | 90.4% | 1370 | 2000 | 630 |
| 3.9 | 3.7 | 85.4 | 1 | 6 | 65.6% | 91.4% | 1365 | 2000 | 635 |
| 4 | 2.6 | 85.4 | 2 | 6 | 66.2% | 95.0% | 1355 | 1950 | 595 |
| 0.4 | 1.2 | 85.4 | 0 | 13 | 33.3% | 98.3% | 1360 | 1460 | 100 |
| 0.5 | 0.1 | 85.4 | 1 | 13 | 28.5% | 100.0% | 1355 | 1505 | 150 |
| 0.5 | 3.1 | 85.4 | 2 | 9 | 30.7% | 91.1% | 1365 | 1880 | 515 |
| 0.6 | 3 | 85.4 | 0 | 11 | 35.6% | 96.4% | 1360 | 1945 | 585 |
| 0.7 | 2.9 | 85.4 | 1 | 10 | 36.6% | 97.1% | 1360 | 1885 | 525 |
| 0.8 | 1.8 | 85.4 | 2 | 10 | 41.8% | 100.0% | 1355 | 1570 | 215 |
| 0.8 | 0.8 | 85.4 | 0 | 13 | 65.7% | 100.0% | 1360 | 1420 | 60 |
| 0.9 | 0.7 | 85.4 | 1 | 12 | 59.3% | 99.6% | 1355 | 1440 | 85 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1 | 3.5 | 85.5 | 2 | 8 | 61.8% | 88.0% | 1365 | 1995 | 630 |
| 1.1 | 2.4 | 85.5 | 0 | 11 | 62.4% | 97.9% | 1360 | 1820 | 460 |
| 1.2 | 2.3 | 85.5 | 1 | 10 | 57.1% | 98.3% | 1355 | 1760 | 405 |
| 1.3 | 1.2 | 85.5 | 2 | 10 | 60.3% | 100.0% | 1345 | 1430 | 85 |
| 1.3 | 3.2 | 85.5 | 0 | 10 | 73.5% | 94.6% | 1370 | 2000 | 630 |
| 1.4 | 3.1 | 85.5 | 1 | 9 | 84.5% | 95.5% | 1370 | 1970 | 600 |
| 1.5 | 3 | 85.5 | 2 | 8 | 90.8% | 91.9% | 1365 | 1905 | 540 |
| 1.6 | 1.9 | 85.5 | 0 | 11 | 89.2% | 99.1% | 1360 | 1720 | 360 |
| 1.7 | 1.8 | 85.5 | 1 | 10 | 81.9% | 99.8% | 1355 | 1660 | 305 |
| 1.7 | 0.8 | 85.5 | 2 | 10 | 79.5% | 100.0% | 1345 | 1400 | 55 |
| 1.8 | 3.7 | 85.5 | 0 | 9 | 90.7% | 92.7% | 1370 | 2000 | 630 |
| 1.9 | 3.6 | 85.5 | 1 | 8 | 91.3% | 92.0% | 1370 | 2000 | 630 |
| 2 | 2.5 | 85.5 | 2 | 8 | 94.9% | 95.8% | 1365 | 1815 | 450 |
| 2.1 | 1.4 | 85.5 | 1 | 10 | 90.6% | 100.0% | 1345 | 1575 | 230 |
| 2.1 | 0.4 | 85.5 | 2 | 10 | 83.5% | 100.0% | 1345 | 1405 | 60 |
| 2.2 | 0.3 | 85.5 | 0 | 12 | 100.0% | 100.0% | 1360 | 1385 | 25 |
| 2.3 | 2.2 | 85.5 | 1 | 9 | 95.2% | 97.2% | 1355 | 1800 | 445 |
| 2.4 | 1.1 | 85.5 | 2 | 9 | 96.5% | 100.0% | 1345 | 1465 | 120 |
| 2.5 | 1 | 85.5 | 0 | 11 | 96.0% | 100.0% | 1360 | 1505 | 145 |
| 2.5 | 0 | 85.5 | 1 | 11 | 100.0% | 100.0% | 1370 | 1395 | 25 |
| 2.6 | 3.9 | 85.5 | 2 | 6 | 85.0% | 86.3% | 1370 | 2000 | 630 |
| 2.7 | 2.8 | 85.5 | 0 | 9 | 92.3% | 94.2% | 1370 | 2000 | 630 |
| 2.8 | 2.7 | 85.5 | 1 | 8 | 86.8% | 95.3% | 1360 | 1950 | 590 |
| 2.9 | 1.6 | 85.5 | 2 | 8 | 87.8% | 99.6% | 1350 | 1640 | 290 |
| 2.9 | 0.6 | 85.5 | 0 | 11 | 86.2% | 100.0% | 1360 | 1405 | 45 |
| 3 | 0.5 | 85.5 | 1 | 10 | 75.5% | 100.0% | 1345 | 1395 | 50 |
| 0.3 | 2.2 | 85.5 | 2 | 10 | 18.7% | 97.6% | 1365 | 1640 | 275 |
| 3.1 | 2.4 | 85.5 | 0 | 9 | 88.9% | 94.8% | 1370 | 1925 | 555 |
| 3.2 | 2.3 | 85.5 | 1 | 8 | 83.0% | 95.9% | 1360 | 1870 | 510 |
| 3.3 | 1.2 | 85.5 | 2 | 8 | 82.7% | 100.0% | 1345 | 1545 | 200 |
| 3.3 | 3.2 | 85.5 | 0 | 8 | 80.4% | 92.5% | 1370 | 2000 | 630 |
| 3.4 | 3.1 | 85.5 | 1 | 7 | 75.1% | 93.6% | 1360 | 2000 | 640 |
| 3.5 | 3 | 85.5 | 2 | 6 | 74.8% | 92.6% | 1370 | 2000 | 630 |
| 3.6 | 1.9 | 85.5 | 0 | 9 | 77.7% | 95.6% | 1370 | 1820 | 450 |
| 3.7 | 1.8 | 85.5 | 1 | 8 | 77.4% | 96.7% | 1355 | 1770 | 415 |
| 3.7 | 0.8 | 85.5 | 2 | 8 | 79.0% | 100.0% | 1345 | 1440 | 95 |
| 3.8 | 3.7 | 85.5 | 0 | 7 | 69.8% | 90.8% | 1370 | 2000 | 630 |
| 3.9 | 3.6 | 85.5 | 1 | 6 | 65.8% | 91.8% | 1365 | 2000 | 635 |
| 4 | 2.5 | 85.5 | 2 | 6 | 66.5% | 95.4% | 1355 | 1925 | 570 |
| 0.4 | 0.1 | 85.5 | 0 | 14 | 31.8% | 99.6% | 1365 | 1495 | 130 |
| 0.5 | 1 | 85.5 | 1 | 12 | 33.6% | 100.0% | 1355 | 1445 | 90 |
| 0.5 | 4 | 85.5 | 2 | 8 | 32.0% | 85.3% | 1365 | 2000 | 635 |
| 0.6 | 2.9 | 85.5 | 0 | 11 | 35.5% | 96.8% | 1360 | 1915 | 555 |
| 0.7 | 2.8 | 85.5 | 1 | 10 | 36.7% | 97.4% | 1360 | 1855 | 495 |
| 0.8 | 1.7 | 85.5 | 2 | 10 | 42.5% | 100.0% | 1355 | 1540 | 185 |
| 0.8 | 0.7 | 85.5 | 0 | 13 | 65.8% | 100.0% | 1360 | 1430 | 70 |
| 0.9 | 0.6 | 85.5 | 1 | 12 | 58.6% | 100.0% | 1355 | 1450 | 95 |
| 1 | 3.4 | 85.6 | 2 | 8 | 62.0% | 88.3% | 1365 | 1965 | 600 |
| 1.1 | 2.3 | 85.6 | 0 | 11 | 62.4% | 98.3% | 1360 | 1790 | 430 |
| 1.2 | 0.2 | 85.6 | 1 | 12 | 58.6% | 100.0% | 1355 | 1460 | 105 |
| 1.3 | 0.1 | 85.6 | 2 | 11 | 42.4% | 100.0% | 1345 | 1480 | 135 |
| 1.3 | 3.1 | 85.6 | 0 | 10 | 73.7% | 95.0% | 1370 | 1995 | 625 |
| 1.4 | 4 | 85.6 | 1 | 8 | 90.2% | 88.7% | 1370 | 2000 | 630 |
| 1.5 | 2.9 | 85.6 | 2 | 8 | 91.1% | 92.2% | 1365 | 1875 | 510 |
| 1.6 | 1.8 | 85.6 | 0 | 11 | 89.3% | 99.4% | 1360 | 1685 | 325 |
| 1.7 | 1.7 | 85.6 | 1 | 10 | 82.0% | 100.0% | 1355 | 1630 | 275 |
| 1.7 | 0.7 | 85.6 | 2 | 10 | 79.6% | 100.0% | 1345 | 1410 | 65 |
| 1.8 | 3.6 | 85.6 | 0 | 9 | 91.0% | 93.1% | 1370 | 2000 | 630 |
| 1.9 | 3.5 | 85.6 | 1 | 8 | 91.6% | 92.4% | 1370 | 2000 | 630 |
| 2 | 2.4 | 85.6 | 2 | 8 | 95.3% | 96.1% | 1365 | 1785 | 420 |
| 2.1 | 1.3 | 85.6 | 1 | 10 | 90.8% | 100.0% | 1345 | 1540 | 195 |
| 2.1 | 3.3 | 85.6 | 2 | 7 | 92.5% | 89.6% | 1370 | 2000 | 630 |
| 2.2 | 2.2 | 85.6 | 0 | 10 | 95.1% | 97.4% | 1365 | 1825 | 460 |
| 2.3 | 2.1 | 85.6 | 1 | 9 | 95.6% | 97.6% | 1355 | 1770 | 415 |
| 2.4 | 2 | 85.6 | 2 | 8 | 94.6% | 98.8% | 1355 | 1710 | 355 |
| 2.4 | 0 | 85.6 | 0 | 12 | 100.0% | 100.0% | 1380 | 1395 | 15 |
| 2.6 | 3.8 | 85.6 | 2 | 6 | 85.3% | 86.6% | 1370 | 2000 | 630 |
| 2.7 | 2.7 | 85.6 | 0 | 9 | 92.6% | 94.6% | 1370 | 1975 | 605 |
| 2.8 | 2.6 | 85.6 | 1 | 8 | 87.1% | 95.6% | 1360 | 1920 | 560 |
| 2.9 | 1.5 | 85.6 | 2 | 8 | 88.1% | 100.0% | 1350 | 1605 | 255 |
| 2.9 | 0.5 | 85.6 | 0 | 11 | 86.1% | 100.0% | 1360 | 1405 | 45 |
| 3 | 0.4 | 85.6 | 1 | 10 | 74.1% | 100.0% | 1345 | 1395 | 50 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.3 | 2.1 | 85.6 | 2 | 10 | 18.8% | 98.0% | 1365 | 1605 | 240 |
| 3.1 | 2.3 | 85.6 | 0 | 9 | 89.2% | 95.2% | 1370 | 1895 | 525 |
| 3.2 | 0.2 | 85.6 | 1 | 10 | 49.1% | 100.0% | 1345 | 1405 | 60 |
| 3.3 | 3.1 | 85.6 | 0 | 8 | 80.7% | 92.9% | 1370 | 2000 | 630 |
| 3.4 | 4 | 85.6 | 1 | 6 | 72.2% | 89.4% | 1370 | 2000 | 630 |
| 3.5 | 2.9 | 85.6 | 2 | 6 | 75.1% | 92.9% | 1370 | 1990 | 620 |
| 3.6 | 1.8 | 85.6 | 0 | 9 | 78.2% | 96.0% | 1370 | 1790 | 420 |
| 3.7 | 1.7 | 85.6 | 1 | 8 | 77.7% | 97.1% | 1355 | 1740 | 385 |
| 3.7 | 0.7 | 85.6 | 2 | 8 | 79.3% | 100.0% | 1345 | 1440 | 95 |
| 3.8 | 3.6 | 85.6 | 0 | 7 | 70.1% | 91.1% | 1370 | 2000 | 630 |
| 3.9 | 3.5 | 85.6 | 1 | 6 | 66.1% | 92.1% | 1365 | 2000 | 635 |
| 4 | 2.4 | 85.6 | 2 | 6 | 66.8% | 95.8% | 1355 | 1895 | 540 |
| 0.4 | 1 | 85.6 | 0 | 13 | 33.3% | 99.2% | 1360 | 1435 | 75 |
| 0.4 | 0 | 85.6 | 1 | 13 | 20.9% | 100.0% | 1370 | 1525 | 155 |
| 0.5 | 3.9 | 85.6 | 2 | 8 | 32.2% | 85.6% | 1365 | 2000 | 635 |
| 0.6 | 2.8 | 85.6 | 0 | 11 | 35.5% | 97.1% | 1360 | 1885 | 525 |
| 0.7 | 2.7 | 85.6 | 1 | 10 | 36.9% | 97.8% | 1360 | 1825 | 465 |
| 0.8 | 1.6 | 85.6 | 2 | 10 | 42.5% | 100.0% | 1355 | 1505 | 150 |
| 0.8 | 0.6 | 85.6 | 0 | 13 | 65.8% | 100.0% | 1360 | 1440 | 80 |
| 0.9 | 0.5 | 85.6 | 1 | 12 | 58.0% | 100.0% | 1355 | 1460 | 105 |
| 1 | 0.3 | 85.7 | 2 | 11 | 47.4% | 100.0% | 1345 | 1485 | 140 |
| 1.1 | 0.2 | 85.7 | 0 | 13 | 63.4% | 100.0% | 1360 | 1450 | 90 |
| 1.3 | 1 | 85.7 | 2 | 10 | 64.3% | 100.0% | 1350 | 1415 | 65 |
| 1.3 | 4 | 85.7 | 0 | 9 | 81.4% | 92.3% | 1375 | 2000 | 625 |
| 1.4 | 3.9 | 85.7 | 1 | 8 | 90.5% | 88.9% | 1370 | 2000 | 630 |
| 1.5 | 2.8 | 85.7 | 2 | 8 | 91.4% | 92.5% | 1365 | 1845 | 480 |
| 1.6 | 1.7 | 85.7 | 0 | 11 | 89.4% | 99.8% | 1360 | 1655 | 295 |
| 1.7 | 1.6 | 85.7 | 1 | 10 | 77.2% | 100.0% | 1350 | 1595 | 245 |
| 1.7 | 0.6 | 85.7 | 2 | 10 | 81.4% | 100.0% | 1350 | 1420 | 70 |
| 1.8 | 3.5 | 85.7 | 0 | 9 | 91.3% | 93.5% | 1370 | 2000 | 630 |
| 2 | 2.3 | 85.7 | 2 | 8 | 95.7% | 96.5% | 1365 | 1755 | 390 |
| 2.1 | 1.2 | 85.7 | 1 | 10 | 91.0% | 100.0% | 1345 | 1505 | 160 |
| 2.1 | 3.2 | 85.7 | 2 | 7 | 92.9% | 89.9% | 1370 | 1975 | 605 |
| 2.2 | 2.1 | 85.7 | 0 | 10 | 95.5% | 97.7% | 1365 | 1795 | 430 |
| 2.3 | 3 | 85.7 | 1 | 8 | 92.5% | 95.2% | 1360 | 1985 | 625 |
| 2.4 | 1.9 | 85.7 | 2 | 8 | 95.0% | 99.2% | 1355 | 1680 | 325 |
| 2.5 | 0.8 | 85.7 | 1 | 10 | 95.1% | 100.0% | 1345 | 1400 | 55 |
| 2.7 | 2.6 | 85.7 | 0 | 9 | 93.0% | 94.9% | 1370 | 1945 | 575 |
| 2.9 | 1.4 | 85.7 | 2 | 8 | 88.5% | 100.0% | 1350 | 1570 | 220 |
| 2.9 | 0.4 | 85.7 | 0 | 11 | 86.2% | 100.0% | 1360 | 1405 | 45 |
| 3 | 3.3 | 85.7 | 1 | 7 | 82.0% | 93.6% | 1370 | 2000 | 630 |
| 0.3 | 3 | 85.7 | 2 | 9 | 18.6% | 90.4% | 1365 | 1825 | 460 |
| 3.2 | 0.1 | 85.7 | 2 | 9 | 39.9% | 100.0% | 1345 | 1420 | 75 |
| 3.2 | 3.1 | 85.7 | 0 | 8 | 81.8% | 93.0% | 1370 | 2000 | 630 |
| 3.3 | 4 | 85.7 | 1 | 6 | 73.5% | 89.0% | 1370 | 2000 | 630 |
| 3.5 | 1.8 | 85.7 | 0 | 9 | 81.4% | 96.2% | 1370 | 1780 | 410 |
| 3.6 | 0.7 | 85.7 | 2 | 8 | 80.5% | 100.0% | 1345 | 1440 | 95 |
| 3.7 | 3.6 | 85.7 | 0 | 7 | 71.2% | 91.3% | 1370 | 2000 | 630 |
| 3.9 | 2.4 | 85.7 | 2 | 6 | 68.1% | 96.0% | 1355 | 1885 | 530 |
| 4 | 1.3 | 85.7 | 0 | 9 | 68.0% | 97.0% | 1370 | 1665 | 295 |
| 0.4 | 1.9 | 85.7 | 1 | 11 | 22.4% | 100.0% | 1350 | 1600 | 250 |
| 0.4 | 0.9 | 85.7 | 2 | 11 | 21.2% | 100.0% | 1350 | 1480 | 130 |
| 0.7 | 2.6 | 85.7 | 2 | 9 | 43.3% | 93.7% | 1365 | 1750 | 385 |
| 0.8 | 1.5 | 85.7 | 0 | 12 | 61.5% | 100.0% | 1360 | 1555 | 195 |
| 1 | 2.2 | 85.8 | 0 | 11 | 57.0% | 98.8% | 1360 | 1745 | 385 |
| 1.2 | 2 | 85.8 | 2 | 9 | 74.4% | 98.1% | 1365 | 1625 | 260 |
| 1.4 | 3.8 | 85.8 | 2 | 7 | 91.6% | 86.2% | 1370 | 2000 | 630 |
| 1.7 | 1.5 | 85.8 | 2 | 9 | 78.8% | 100.0% | 1350 | 1525 | 175 |
| 1.8 | 0.4 | 85.8 | 1 | 11 | 84.2% | 100.0% | 1355 | 1415 | 60 |
| 1.9 | 0.3 | 85.8 | 2 | 10 | 74.2% | 100.0% | 1350 | 1430 | 80 |
| 2 | 0.2 | 85.8 | 0 | 12 | 92.8% | 100.0% | 1360 | 1400 | 40 |
| 2.1 | 0.1 | 85.8 | 2 | 10 | 38.8% | 100.0% | 1345 | 1435 | 90 |
| 2.2 | 4 | 85.8 | 1 | 7 | 90.1% | 88.2% | 1370 | 2000 | 630 |
| 2.3 | 2.9 | 85.8 | 2 | 7 | 93.4% | 91.7% | 1365 | 1910 | 545 |
| 2.4 | 1.8 | 85.8 | 0 | 10 | 96.4% | 98.8% | 1365 | 1720 | 355 |
| 2.6 | 3.6 | 85.8 | 0 | 8 | 87.7% | 92.4% | 1370 | 2000 | 630 |
| 2.7 | 3.5 | 85.8 | 1 | 7 | 85.5% | 91.8% | 1370 | 2000 | 630 |
| 2.8 | 2.4 | 85.8 | 2 | 7 | 87.8% | 95.5% | 1365 | 1820 | 455 |
| 2.9 | 1.3 | 85.8 | 0 | 10 | 88.1% | 99.9% | 1360 | 1610 | 250 |
| 0.3 | 3.9 | 85.8 | 0 | 10 | 21.8% | 92.4% | 1375 | 2000 | 625 |
| 3.1 | 2.1 | 85.8 | 1 | 8 | 84.9% | 96.9% | 1360 | 1800 | 440 |
| 3.2 | 0 | 85.8 | 0 | 11 | 90.1% | 100.0% | 1380 | 1420 | 40 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.3 | 0.9 | 85.8 | 1 | 9 | 73.7% | 100.0% | 1345 | 1470 | 125 |
| 3.4 | 3.8 | 85.8 | 2 | 5 | 72.0% | 86.8% | 1370 | 2000 | 630 |
| 3.5 | 2.7 | 85.8 | 0 | 8 | 79.6% | 93.9% | 1370 | 2000 | 630 |
| 3.6 | 2.6 | 85.8 | 1 | 7 | 74.1% | 94.9% | 1360 | 1950 | 590 |
| 3.7 | 1.5 | 85.8 | 2 | 7 | 75.9% | 98.8% | 1355 | 1640 | 285 |
| 3.7 | 0.5 | 85.8 | 0 | 10 | 68.1% | 100.0% | 1360 | 1425 | 65 |
| 3.8 | 0.4 | 85.8 | 1 | 9 | 55.6% | 100.0% | 1345 | 1440 | 95 |
| 3.9 | 0.3 | 85.8 | 2 | 8 | 72.1% | 100.0% | 1345 | 1455 | 110 |
| 0.4 | 2.8 | 85.8 | 1 | 10 | 26.8% | 96.3% | 1370 | 1820 | 450 |
| 0.5 | 1.7 | 85.8 | 2 | 10 | 31.8% | 100.0% | 1365 | 1500 | 135 |
| 0.5 | 0.7 | 85.8 | 0 | 13 | 41.5% | 100.0% | 1360 | 1455 | 95 |
| 0.7 | 3.5 | 85.8 | 2 | 8 | 44.6% | 87.0% | 1365 | 1960 | 595 |
| 0.8 | 2.4 | 85.8 | 0 | 11 | 46.2% | 98.4% | 1360 | 1785 | 425 |
| 0.9 | 2.3 | 85.8 | 1 | 10 | 43.2% | 99.0% | 1355 | 1725 | 370 |
| 1 | 0.1 | 85.9 | 2 | 11 | 40.1% | 100.0% | 1350 | 1505 | 155 |
| 1 | 3.1 | 85.9 | 0 | 10 | 56.7% | 95.6% | 1370 | 1960 | 590 |
| 1.1 | 4 | 85.9 | 1 | 8 | 72.3% | 87.3% | 1370 | 2000 | 630 |
| 1.2 | 2.9 | 85.9 | 2 | 8 | 74.4% | 90.8% | 1365 | 1840 | 475 |
| 1.3 | 1.8 | 85.9 | 0 | 11 | 73.4% | 99.9% | 1360 | 1655 | 295 |
| 1.4 | 1.7 | 85.9 | 1 | 10 | 67.5% | 100.0% | 1355 | 1595 | 240 |
| 1.4 | 0.7 | 85.9 | 2 | 10 | 69.6% | 100.0% | 1350 | 1435 | 85 |
| 1.5 | 3.6 | 85.9 | 0 | 9 | 84.3% | 93.7% | 1370 | 2000 | 630 |
| 1.6 | 3.5 | 85.9 | 1 | 8 | 91.9% | 91.0% | 1370 | 2000 | 630 |
| 1.7 | 2.4 | 85.9 | 2 | 8 | 95.6% | 94.8% | 1365 | 1750 | 385 |
| 1.8 | 1.3 | 85.9 | 0 | 11 | 98.3% | 100.0% | 1360 | 1545 | 185 |
| 1.9 | 1.2 | 85.9 | 1 | 10 | 87.0% | 100.0% | 1350 | 1485 | 135 |
| 1.9 | 3.2 | 85.9 | 2 | 7 | 93.1% | 88.9% | 1370 | 1955 | 585 |
| 2 | 2.1 | 85.9 | 0 | 10 | 95.6% | 97.6% | 1365 | 1770 | 405 |
| 2.1 | 2 | 85.9 | 2 | 8 | 96.7% | 97.9% | 1365 | 1675 | 310 |
| 2.1 | 0 | 85.9 | 0 | 12 | 97.5% | 100.0% | 1380 | 1410 | 30 |
| 2.2 | 0.9 | 85.9 | 1 | 10 | 99.7% | 100.0% | 1350 | 1405 | 55 |
| 2.3 | 3.8 | 85.9 | 2 | 6 | 89.9% | 86.5% | 1370 | 2000 | 630 |
| 2.4 | 2.7 | 85.9 | 0 | 9 | 93.6% | 95.2% | 1370 | 1940 | 570 |
| 2.5 | 2.6 | 85.9 | 1 | 8 | 91.2% | 96.3% | 1360 | 1890 | 530 |
| 2.6 | 1.5 | 85.9 | 2 | 8 | 92.3% | 100.0% | 1350 | 1570 | 220 |
| 2.6 | 0.5 | 85.9 | 0 | 11 | 94.7% | 100.0% | 1360 | 1395 | 35 |
| 2.7 | 0.4 | 85.9 | 1 | 10 | 73.6% | 100.0% | 1345 | 1385 | 40 |
| 2.8 | 0.3 | 85.9 | 2 | 9 | 76.4% | 100.0% | 1350 | 1400 | 50 |
| 2.9 | 0.2 | 85.9 | 0 | 11 | 77.7% | 100.0% | 1360 | 1405 | 45 |
| 3 | 1.1 | 85.9 | 1 | 9 | 90.2% | 100.0% | 1350 | 1515 | 165 |
| 0.3 | 1.8 | 85.9 | 2 | 10 | 18.9% | 99.0% | 1365 | 1510 | 145 |
| 0.3 | 0.8 | 85.9 | 0 | 13 | 24.9% | 99.6% | 1360 | 1465 | 105 |
| 3.1 | 4 | 85.9 | 1 | 6 | 76.2% | 88.1% | 1370 | 2000 | 630 |
| 3.2 | 2.9 | 85.9 | 2 | 6 | 79.4% | 91.6% | 1370 | 1955 | 585 |
| 3.3 | 1.8 | 85.9 | 0 | 9 | 87.8% | 96.6% | 1370 | 1765 | 395 |
| 3.4 | 1.7 | 85.9 | 1 | 8 | 82.4% | 97.7% | 1360 | 1710 | 350 |
| 3.4 | 0.7 | 85.9 | 2 | 8 | 84.2% | 100.0% | 1350 | 1435 | 85 |
| 3.5 | 3.6 | 85.9 | 0 | 7 | 73.6% | 91.6% | 1370 | 2000 | 630 |
| 3.6 | 3.5 | 85.9 | 1 | 6 | 71.0% | 91.6% | 1370 | 2000 | 630 |
| 3.7 | 2.4 | 85.9 | 2 | 6 | 73.9% | 95.3% | 1370 | 1865 | 495 |
| 3.8 | 1.3 | 85.9 | 0 | 9 | 74.2% | 97.4% | 1370 | 1650 | 280 |
| 3.9 | 1.2 | 85.9 | 1 | 8 | 74.8% | 98.5% | 1355 | 1590 | 235 |
| 3.9 | 3.2 | 85.9 | 2 | 5 | 66.6% | 89.8% | 1370 | 2000 | 630 |
| 4 | 2.1 | 85.9 | 0 | 8 | 72.5% | 95.0% | 1370 | 1875 | 505 |
| 0.4 | 3.7 | 85.9 | 1 | 9 | 26.2% | 89.1% | 1370 | 2000 | 630 |
| 0.5 | 2.6 | 85.9 | 2 | 9 | 31.2% | 92.7% | 1365 | 1725 | 360 |
| 0.6 | 1.5 | 85.9 | 0 | 12 | 46.3% | 100.0% | 1360 | 1530 | 170 |
| 0.7 | 1.4 | 85.9 | 1 | 11 | 39.9% | 100.0% | 1355 | 1470 | 115 |
| 0.7 | 0.4 | 85.9 | 2 | 11 | 37.2% | 100.0% | 1350 | 1500 | 150 |
| 0.8 | 0.3 | 85.9 | 0 | 13 | 54.6% | 100.0% | 1360 | 1465 | 105 |
| 0.9 | 2.2 | 85.9 | 1 | 10 | 43.4% | 99.4% | 1355 | 1695 | 340 |
| 1 | 2 | 86 | 2 | 9 | 62.3% | 97.2% | 1365 | 1600 | 235 |
| 1 | 0 | 86 | 0 | 13 | 55.3% | 100.0% | 1380 | 1480 | 100 |
| 1.1 | 0.9 | 86 | 1 | 11 | 62.0% | 100.0% | 1355 | 1425 | 70 |
| 1.2 | 3.8 | 86 | 2 | 7 | 86.6% | 86.1% | 1370 | 2000 | 630 |
| 1.3 | 2.7 | 86 | 0 | 10 | 74.3% | 96.5% | 1370 | 1875 | 505 |
| 1.4 | 2.6 | 86 | 1 | 9 | 86.2% | 97.1% | 1370 | 1820 | 450 |
| 1.5 | 1.5 | 86 | 2 | 9 | 90.1% | 100.0% | 1365 | 1500 | 135 |
| 1.5 | 0.5 | 86 | 0 | 12 | 86.6% | 100.0% | 1360 | 1415 | 55 |
| 1.6 | 0.4 | 86 | 1 | 11 | 76.5% | 100.0% | 1355 | 1430 | 75 |
| 1.7 | 0.3 | 86 | 2 | 10 | 67.4% | 100.0% | 1350 | 1450 | 100 |
| 1.8 | 0.2 | 86 | 0 | 12 | 84.5% | 100.0% | 1360 | 1415 | 55 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.9 | 1.1 | 86 | 1 | 10 | 87.2% | 100.0% | 1350 | 1450 | 100 |
| 2 | 1 | 86 | 2 | 9 | 94.1% | 100.0% | 1350 | 1385 | 35 |
| 2 | 4 | 86 | 0 | 8 | 90.0% | 91.3% | 1375 | 2000 | 625 |
| 2.1 | 2.9 | 86 | 2 | 7 | 94.0% | 90.8% | 1370 | 1890 | 520 |
| 2.2 | 1.8 | 86 | 0 | 10 | 96.6% | 98.7% | 1365 | 1700 | 335 |
| 2.3 | 1.7 | 86 | 1 | 9 | 97.1% | 99.2% | 1355 | 1645 | 290 |
| 2.3 | 0.7 | 86 | 2 | 9 | 99.0% | 100.0% | 1350 | 1380 | 30 |
| 2.4 | 3.6 | 86 | 0 | 8 | 90.4% | 92.8% | 1370 | 2000 | 630 |
| 2.5 | 3.5 | 86 | 1 | 7 | 88.3% | 90.9% | 1370 | 2000 | 630 |
| 2.6 | 2.4 | 86 | 2 | 7 | 90.7% | 94.6% | 1365 | 1800 | 435 |
| 2.7 | 1.3 | 86 | 0 | 10 | 94.1% | 100.0% | 1360 | 1590 | 230 |
| 2.8 | 1.2 | 86 | 1 | 9 | 93.7% | 100.0% | 1355 | 1530 | 175 |
| 2.8 | 3.2 | 86 | 2 | 6 | 84.3% | 88.9% | 1370 | 2000 | 630 |
| 2.9 | 2.1 | 86 | 0 | 9 | 92.2% | 96.3% | 1370 | 1815 | 445 |
| 3 | 3 | 86 | 1 | 7 | 83.0% | 94.5% | 1370 | 2000 | 630 |
| 0.3 | 1.7 | 86 | 2 | 10 | 19.0% | 99.4% | 1365 | 1475 | 110 |
| 0.3 | 0.7 | 86 | 0 | 13 | 24.9% | 100.0% | 1360 | 1475 | 115 |
| 3.1 | 0.9 | 86 | 1 | 9 | 89.5% | 100.0% | 1350 | 1450 | 100 |
| 3.2 | 3.8 | 86 | 2 | 5 | 74.9% | 86.8% | 1370 | 2000 | 630 |
| 3.3 | 2.7 | 86 | 0 | 8 | 81.9% | 94.3% | 1370 | 1985 | 615 |
| 3.4 | 2.6 | 86 | 1 | 7 | 76.6% | 95.3% | 1360 | 1930 | 570 |
| 3.5 | 1.5 | 86 | 2 | 7 | 78.6% | 99.2% | 1355 | 1620 | 265 |
| 3.5 | 0.5 | 86 | 0 | 10 | 76.4% | 100.0% | 1365 | 1420 | 55 |
| 3.6 | 0.4 | 86 | 1 | 9 | 66.6% | 100.0% | 1350 | 1435 | 85 |
| 3.7 | 0.3 | 86 | 2 | 8 | 79.1% | 100.0% | 1350 | 1450 | 100 |
| 3.8 | 0.2 | 86 | 0 | 10 | 59.9% | 100.0% | 1365 | 1430 | 65 |
| 3.9 | 1.1 | 86 | 1 | 8 | 75.2% | 98.9% | 1355 | 1555 | 200 |
| 4 | 1 | 86 | 2 | 7 | 72.6% | 100.0% | 1350 | 1495 | 145 |
| 4 | 4 | 86 | 0 | 6 | 63.6% | 90.2% | 1370 | 2000 | 630 |
| 0.4 | 3.6 | 86 | 1 | 9 | 26.3% | 89.4% | 1370 | 2000 | 630 |
| 0.5 | 2.5 | 86 | 2 | 9 | 31.3% | 93.0% | 1365 | 1690 | 325 |
| 0.6 | 1.4 | 86 | 0 | 12 | 46.4% | 100.0% | 1360 | 1495 | 135 |
| 0.7 | 1.3 | 86 | 1 | 11 | 39.6% | 100.0% | 1355 | 1435 | 80 |
| 0.7 | 3.3 | 86 | 2 | 8 | 44.9% | 87.7% | 1365 | 1900 | 535 |
| 0.8 | 2.2 | 86 | 0 | 11 | 46.2% | 99.2% | 1360 | 1720 | 360 |
| 0.9 | 2.1 | 86 | 1 | 10 | 43.5% | 99.8% | 1355 | 1665 | 310 |
| 1 | 2.9 | 86.1 | 2 | 8 | 63.1% | 89.8% | 1365 | 1815 | 450 |
| 1.1 | 1.8 | 86.1 | 0 | 11 | 62.6% | 100.0% | 1360 | 1630 | 270 |
| 1.2 | 1.7 | 86.1 | 1 | 10 | 57.9% | 100.0% | 1355 | 1570 | 215 |
| 1.3 | 3.6 | 86.1 | 0 | 9 | 82.8% | 93.5% | 1375 | 2000 | 625 |
| 1.4 | 3.5 | 86.1 | 1 | 8 | 91.7% | 90.2% | 1370 | 2000 | 630 |
| 1.5 | 2.4 | 86.1 | 2 | 8 | 92.6% | 93.8% | 1365 | 1725 | 360 |
| 1.6 | 1.3 | 86.1 | 0 | 11 | 89.9% | 100.0% | 1360 | 1520 | 160 |
| 1.7 | 1.2 | 86.1 | 1 | 10 | 82.9% | 100.0% | 1355 | 1465 | 110 |
| 1.7 | 3.2 | 86.1 | 2 | 7 | 93.4% | 88.3% | 1370 | 1930 | 560 |
| 1.8 | 2.1 | 86.1 | 0 | 10 | 95.9% | 97.7% | 1370 | 1750 | 380 |
| 1.9 | 3 | 86.1 | 1 | 8 | 93.4% | 93.9% | 1370 | 1940 | 570 |
| 2 | 1.9 | 86.1 | 2 | 8 | 97.2% | 97.8% | 1365 | 1630 | 265 |
| 2.1 | 3.8 | 86.1 | 2 | 6 | 91.4% | 86.4% | 1370 | 2000 | 630 |
| 2.2 | 2.7 | 86.1 | 0 | 9 | 93.8% | 95.6% | 1370 | 1920 | 550 |
| 2.3 | 2.6 | 86.1 | 1 | 8 | 94.0% | 96.7% | 1360 | 1865 | 505 |
| 2.4 | 1.5 | 86.1 | 2 | 8 | 96.5% | 100.0% | 1355 | 1550 | 195 |
| 2.4 | 0.5 | 86.1 | 0 | 11 | 100.0% | 100.0% | 1360 | 1385 | 25 |
| 2.5 | 0.4 | 86.1 | 1 | 10 | 91.0% | 100.0% | 1350 | 1380 | 30 |
| 2.6 | 0.3 | 86.1 | 2 | 9 | 69.1% | 100.0% | 1350 | 1395 | 45 |
| 2.7 | 0.2 | 86.1 | 0 | 11 | 85.4% | 100.0% | 1360 | 1400 | 40 |
| 2.8 | 1.1 | 86.1 | 1 | 9 | 94.0% | 100.0% | 1355 | 1495 | 140 |
| 2.9 | 1 | 86.1 | 2 | 8 | 89.9% | 100.0% | 1350 | 1430 | 80 |
| 2.9 | 4 | 86.1 | 0 | 7 | 81.1% | 91.2% | 1375 | 2000 | 625 |
| 3 | 3.9 | 86.1 | 1 | 6 | 77.9% | 88.0% | 1370 | 2000 | 630 |
| 0.3 | 2.6 | 86.1 | 2 | 9 | 18.8% | 91.7% | 1365 | 1695 | 330 |
| 3.1 | 1.8 | 86.1 | 0 | 9 | 90.9% | 97.0% | 1370 | 1745 | 375 |
| 3.2 | 1.7 | 86.1 | 1 | 8 | 84.9% | 98.2% | 1360 | 1690 | 330 |
| 3.2 | 0.7 | 86.1 | 2 | 8 | 86.6% | 100.0% | 1350 | 1425 | 75 |
| 3.3 | 3.6 | 86.1 | 0 | 7 | 76.0% | 92.0% | 1370 | 2000 | 630 |
| 3.4 | 3.5 | 86.1 | 1 | 6 | 73.6% | 90.8% | 1370 | 2000 | 630 |
| 3.5 | 2.4 | 86.1 | 2 | 6 | 76.7% | 94.5% | 1370 | 1845 | 475 |
| 3.7 | 1.2 | 86.1 | 1 | 8 | 79.2% | 99.0% | 1355 | 1575 | 220 |
| 3.7 | 3.2 | 86.1 | 2 | 5 | 69.4% | 88.9% | 1370 | 2000 | 630 |
| 3.8 | 2.1 | 86.1 | 0 | 8 | 78.0% | 95.4% | 1370 | 1855 | 485 |
| 3.9 | 3 | 86.1 | 1 | 6 | 67.5% | 93.8% | 1365 | 2000 | 635 |
| 4 | 1.9 | 86.1 | 2 | 6 | 68.2% | 97.6% | 1355 | 1745 | 390 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 4 | 0.9 | 86.1 | 0 | 9 | 69.8% | 98.5% | 1370 | 1520 | 150 |
| 0.4 | 0.5 | 86.1 | 1 | 12 | 25.7% | 100.0% | 1355 | 1500 | 145 |
| 0.5 | 3.4 | 86.1 | 2 | 8 | 32.8% | 87.3% | 1365 | 1905 | 540 |
| 0.7 | 0.2 | 86.1 | 1 | 12 | 37.4% | 100.0% | 1355 | 1505 | 150 |
| 0.8 | 0.1 | 86.1 | 2 | 11 | 32.6% | 100.0% | 1350 | 1520 | 170 |
| 0.8 | 3.1 | 86.1 | 0 | 10 | 45.8% | 96.1% | 1370 | 1940 | 570 |
| 0.9 | 4 | 86.1 | 1 | 8 | 60.2% | 86.4% | 1370 | 2000 | 630 |
| 1 | 2.8 | 86.2 | 2 | 8 | 63.3% | 90.1% | 1365 | 1785 | 420 |
| 1.1 | 1.7 | 86.2 | 0 | 11 | 62.6% | 100.0% | 1360 | 1600 | 240 |
| 1.2 | 0.6 | 86.2 | 2 | 10 | 59.9% | 100.0% | 1350 | 1460 | 110 |
| 1.4 | 3.4 | 86.2 | 1 | 8 | 92.0% | 90.5% | 1370 | 2000 | 630 |
| 1.6 | 1.2 | 86.2 | 0 | 11 | 90.0% | 100.0% | 1360 | 1485 | 125 |
| 1.7 | 0.1 | 86.2 | 1 | 11 | 52.9% | 100.0% | 1355 | 1450 | 95 |
| 1.7 | 3.1 | 86.2 | 2 | 7 | 93.8% | 88.6% | 1370 | 1900 | 530 |
| 1.8 | 3 | 86.2 | 0 | 9 | 93.1% | 95.3% | 1370 | 1965 | 595 |
| 2 | 1.8 | 86.2 | 2 | 8 | 97.5% | 98.1% | 1365 | 1600 | 235 |
| 2 | 0.8 | 86.2 | 0 | 11 | 100.0% | 100.0% | 1360 | 1380 | 20 |
| 2.1 | 3.7 | 86.2 | 2 | 6 | 91.7% | 86.7% | 1370 | 2000 | 630 |
| 2.2 | 2.6 | 86.2 | 0 | 9 | 94.1% | 95.9% | 1370 | 1890 | 520 |
| 2.4 | 0.4 | 86.2 | 0 | 11 | 100.0% | 100.0% | 1360 | 1385 | 25 |
| 2.5 | 3.3 | 86.2 | 1 | 7 | 89.0% | 91.5% | 1370 | 2000 | 630 |
| 2.6 | 2.2 | 86.2 | 2 | 7 | 91.5% | 95.2% | 1365 | 1740 | 375 |
| 2.8 | 2 | 86.2 | 1 | 8 | 89.2% | 97.9% | 1360 | 1740 | 380 |
| 2.8 | 0 | 86.2 | 2 | 9 | 78.2% | 100.0% | 1370 | 1405 | 35 |
| 2.9 | 3.9 | 86.2 | 0 | 7 | 81.5% | 91.5% | 1375 | 2000 | 625 |
| 3.1 | 1.7 | 86.2 | 0 | 9 | 91.2% | 97.4% | 1370 | 1715 | 345 |
| 3.2 | 1.6 | 86.2 | 1 | 8 | 85.2% | 98.5% | 1360 | 1655 | 295 |
| 3.3 | 3.5 | 86.2 | 0 | 7 | 76.3% | 92.4% | 1370 | 2000 | 630 |
| 3.5 | 2.3 | 86.2 | 2 | 6 | 77.0% | 94.8% | 1370 | 1815 | 445 |
| 3.7 | 3.1 | 86.2 | 2 | 5 | 69.7% | 89.2% | 1370 | 2000 | 630 |
| 3.9 | 2.9 | 86.2 | 1 | 6 | 67.8% | 94.2% | 1365 | 2000 | 635 |
| 4 | 1.8 | 86.2 | 2 | 6 | 68.5% | 98.0% | 1355 | 1715 | 360 |
| 4 | 0.8 | 86.2 | 0 | 9 | 70.2% | 98.9% | 1370 | 1480 | 110 |
| 0.6 | 0.2 | 86.2 | 0 | 13 | 39.4% | 100.0% | 1360 | 1495 | 135 |
| 0.7 | 1.1 | 86.2 | 1 | 11 | 39.2% | 100.0% | 1355 | 1440 | 85 |
| 0.8 | 1 | 86.2 | 2 | 10 | 46.2% | 100.0% | 1360 | 1455 | 95 |
| 0.8 | 4 | 86.2 | 0 | 9 | 57.5% | 90.3% | 1375 | 2000 | 625 |
| 1 | 2.7 | 86.3 | 2 | 8 | 63.5% | 90.4% | 1365 | 1755 | 390 |
| 1.1 | 1.6 | 86.3 | 0 | 11 | 62.6% | 100.0% | 1360 | 1565 | 205 |
| 1.2 | 1.5 | 86.3 | 1 | 10 | 59.3% | 100.0% | 1355 | 1505 | 150 |
| 1.3 | 3.4 | 86.3 | 0 | 9 | 83.5% | 94.2% | 1375 | 2000 | 625 |
| 1.5 | 0.2 | 86.3 | 2 | 10 | 47.6% | 100.0% | 1350 | 1475 | 125 |
| 1.6 | 0.1 | 86.3 | 0 | 12 | 69.3% | 100.0% | 1360 | 1445 | 85 |
| 1.7 | 1 | 86.3 | 1 | 10 | 87.7% | 100.0% | 1355 | 1395 | 40 |
| 1.7 | 4 | 86.3 | 2 | 6 | 91.2% | 85.6% | 1365 | 2000 | 635 |
| 2 | 1.7 | 86.3 | 2 | 8 | 97.9% | 98.4% | 1365 | 1565 | 200 |
| 2 | 0.7 | 86.3 | 0 | 11 | 100.0% | 100.0% | 1360 | 1375 | 15 |
| 2.2 | 2.5 | 86.3 | 0 | 9 | 94.5% | 96.3% | 1370 | 1865 | 495 |
| 2.3 | 2.4 | 86.3 | 1 | 8 | 94.7% | 97.4% | 1360 | 1805 | 445 |
| 2.4 | 1.3 | 86.3 | 2 | 8 | 98.7% | 100.0% | 1360 | 1485 | 125 |
| 2.4 | 3.3 | 86.3 | 0 | 8 | 91.4% | 93.9% | 1370 | 2000 | 630 |
| 2.5 | 3.2 | 86.3 | 1 | 7 | 89.4% | 91.8% | 1370 | 2000 | 630 |
| 2.6 | 2.1 | 86.3 | 2 | 7 | 91.8% | 95.6% | 1365 | 1705 | 340 |
| 2.7 | 2 | 86.3 | 0 | 9 | 95.1% | 97.1% | 1370 | 1765 | 395 |
| 2.8 | 1.9 | 86.3 | 1 | 8 | 89.5% | 98.3% | 1360 | 1710 | 350 |
| 2.8 | 0.9 | 86.3 | 2 | 8 | 93.0% | 100.0% | 1355 | 1405 | 50 |
| 2.9 | 3.8 | 86.3 | 0 | 7 | 81.8% | 91.7% | 1375 | 2000 | 625 |
| 3 | 3.7 | 86.3 | 1 | 6 | 78.6% | 88.5% | 1370 | 2000 | 630 |
| 3.1 | 1.6 | 86.3 | 0 | 9 | 91.6% | 97.8% | 1370 | 1680 | 310 |
| 3.2 | 1.5 | 86.3 | 1 | 8 | 85.6% | 98.9% | 1360 | 1625 | 265 |
| 3.2 | 0.5 | 86.3 | 2 | 8 | 82.1% | 100.0% | 1350 | 1430 | 80 |
| 3.4 | 0.3 | 86.3 | 1 | 9 | 71.1% | 100.0% | 1350 | 1430 | 80 |
| 3.5 | 0.2 | 86.3 | 2 | 8 | 60.0% | 100.0% | 1350 | 1440 | 90 |
| 3.6 | 0.1 | 86.3 | 0 | 10 | 54.7% | 100.0% | 1365 | 1425 | 60 |
| 3.7 | 1 | 86.3 | 1 | 8 | 79.8% | 99.7% | 1355 | 1500 | 145 |
| 3.7 | 4 | 86.3 | 2 | 4 | 65.7% | 86.3% | 1370 | 2000 | 630 |
| 3.8 | 2.9 | 86.3 | 0 | 7 | 72.0% | 93.5% | 1370 | 2000 | 630 |
| 3.9 | 2.8 | 86.3 | 1 | 6 | 68.0% | 94.5% | 1365 | 1990 | 625 |
| 4 | 1.7 | 86.3 | 2 | 6 | 68.7% | 98.4% | 1355 | 1685 | 330 |
| 4 | 0.7 | 86.3 | 0 | 9 | 70.7% | 99.3% | 1370 | 1440 | 70 |
| 0.4 | 3.3 | 86.3 | 1 | 9 | 26.6% | 90.4% | 1370 | 1910 | 540 |
| 0.5 | 2.2 | 86.3 | 2 | 9 | 31.6% | 94.0% | 1365 | 1595 | 230 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.6 | 1.1 | 86.3 | 0 | 12 | 44.7% | 100.0% | 1360 | 1430 | 70 |
| 0.7 | 2 | 86.3 | 1 | 10 | 45.5% | 100.0% | 1370 | 1605 | 235 |
| 0.7 | 0 | 86.3 | 2 | 11 | 27.8% | 100.0% | 1370 | 1540 | 170 |
| 0.8 | 3.9 | 86.3 | 0 | 9 | 57.7% | 90.6% | 1375 | 2000 | 625 |
| 0.9 | 3.8 | 86.3 | 1 | 8 | 60.6% | 87.0% | 1370 | 2000 | 630 |
| 1 | 2.6 | 86.4 | 2 | 8 | 70.1% | 90.7% | 1370 | 1720 | 350 |
| 1.1 | 1.5 | 86.4 | 0 | 11 | 62.7% | 100.0% | 1360 | 1535 | 175 |
| 1.2 | 1.4 | 86.4 | 1 | 10 | 61.2% | 100.0% | 1355 | 1475 | 120 |
| 1.2 | 0.4 | 86.4 | 2 | 10 | 56.8% | 100.0% | 1355 | 1480 | 125 |
| 1.3 | 0.3 | 86.4 | 0 | 12 | 68.3% | 100.0% | 1360 | 1450 | 90 |
| 1.4 | 2.2 | 86.4 | 1 | 9 | 87.7% | 98.4% | 1370 | 1695 | 325 |
| 1.5 | 1.1 | 86.4 | 2 | 9 | 92.2% | 100.0% | 1365 | 1405 | 40 |
| 1.6 | 1 | 86.4 | 0 | 11 | 90.9% | 100.0% | 1360 | 1415 | 55 |
| 1.6 | 0 | 86.4 | 1 | 11 | 65.2% | 100.0% | 1375 | 1470 | 95 |
| 1.7 | 3.9 | 86.4 | 2 | 6 | 91.5% | 85.9% | 1365 | 2000 | 635 |
| 1.8 | 2.8 | 86.4 | 0 | 9 | 93.8% | 96.0% | 1370 | 1905 | 535 |
| 1.9 | 2.7 | 86.4 | 1 | 8 | 94.5% | 94.8% | 1370 | 1850 | 480 |
| 2 | 1.6 | 86.4 | 2 | 8 | 98.3% | 98.8% | 1365 | 1535 | 170 |
| 2 | 0.6 | 86.4 | 0 | 11 | 100.0% | 100.0% | 1365 | 1385 | 20 |
| 2.1 | 3.5 | 86.4 | 2 | 6 | 92.5% | 87.4% | 1370 | 2000 | 630 |
| 2.2 | 2.4 | 86.4 | 0 | 9 | 94.9% | 96.7% | 1370 | 1835 | 465 |
| 2.3 | 2.3 | 86.4 | 1 | 8 | 95.1% | 97.8% | 1360 | 1775 | 415 |
| 2.4 | 1.2 | 86.4 | 2 | 8 | 99.1% | 100.0% | 1360 | 1450 | 90 |
| 2.4 | 3.2 | 86.4 | 0 | 8 | 91.8% | 94.3% | 1370 | 2000 | 630 |
| 2.5 | 3.1 | 86.4 | 1 | 7 | 89.7% | 92.1% | 1370 | 1980 | 610 |
| 2.6 | 3 | 86.4 | 2 | 6 | 88.1% | 89.2% | 1370 | 1920 | 550 |
| 2.7 | 1.9 | 86.4 | 0 | 9 | 95.4% | 97.5% | 1370 | 1735 | 365 |
| 2.8 | 1.8 | 86.4 | 1 | 8 | 89.9% | 98.6% | 1360 | 1680 | 320 |
| 2.8 | 0.8 | 86.4 | 2 | 8 | 92.9% | 100.0% | 1355 | 1410 | 55 |
| 2.9 | 3.7 | 86.4 | 0 | 7 | 82.1% | 92.0% | 1375 | 2000 | 625 |
| 3 | 3.6 | 86.4 | 1 | 6 | 78.9% | 88.8% | 1370 | 2000 | 630 |
| 0.3 | 2.3 | 86.4 | 2 | 9 | 19.0% | 92.7% | 1365 | 1600 | 235 |
| 3.1 | 1.5 | 86.4 | 0 | 9 | 91.9% | 98.2% | 1370 | 1650 | 280 |
| 3.2 | 1.4 | 86.4 | 1 | 8 | 85.9% | 99.3% | 1360 | 1590 | 230 |
| 3.2 | 0.4 | 86.4 | 2 | 8 | 80.1% | 100.0% | 1355 | 1430 | 75 |
| 3.3 | 0.3 | 86.4 | 0 | 10 | 72.8% | 100.0% | 1365 | 1415 | 50 |
| 3.4 | 2.2 | 86.4 | 1 | 7 | 77.8% | 96.8% | 1360 | 1815 | 455 |
| 3.5 | 1.1 | 86.4 | 2 | 7 | 79.8% | 100.0% | 1355 | 1480 | 125 |
| 3.6 | 1 | 86.4 | 0 | 9 | 82.1% | 99.0% | 1370 | 1525 | 155 |
| 3.6 | 0 | 86.4 | 1 | 9 | 87.4% | 100.0% | 1370 | 1440 | 70 |
| 3.7 | 3.9 | 86.4 | 2 | 4 | 66.0% | 86.6% | 1370 | 2000 | 630 |
| 3.8 | 2.8 | 86.4 | 0 | 7 | 72.3% | 93.8% | 1370 | 2000 | 630 |
| 3.9 | 2.7 | 86.4 | 1 | 6 | 68.3% | 94.9% | 1365 | 1960 | 595 |
| 4 | 1.6 | 86.4 | 2 | 6 | 69.0% | 98.7% | 1355 | 1650 | 295 |
| 4 | 0.6 | 86.4 | 0 | 9 | 71.1% | 99.6% | 1370 | 1445 | 75 |
| 0.4 | 3.2 | 86.4 | 1 | 9 | 26.7% | 90.7% | 1370 | 1880 | 510 |
| 0.5 | 2.1 | 86.4 | 2 | 9 | 31.7% | 94.4% | 1365 | 1565 | 200 |
| 0.6 | 2 | 86.4 | 0 | 11 | 35.0% | 100.0% | 1360 | 1635 | 275 |
| 0.7 | 1.9 | 86.4 | 1 | 10 | 41.8% | 100.0% | 1365 | 1575 | 210 |
| 0.7 | 0.9 | 86.4 | 2 | 10 | 40.7% | 100.0% | 1360 | 1475 | 115 |
| 0.8 | 3.8 | 86.4 | 0 | 9 | 57.8% | 90.9% | 1375 | 2000 | 625 |
| 0.9 | 3.7 | 86.4 | 1 | 8 | 60.8% | 87.3% | 1370 | 2000 | 630 |
| 1 | 2.5 | 86.5 | 2 | 8 | 70.4% | 91.1% | 1370 | 1690 | 320 |
| 1.1 | 1.4 | 86.5 | 0 | 11 | 63.6% | 100.0% | 1360 | 1500 | 140 |
| 1.2 | 1.3 | 86.5 | 1 | 10 | 61.3% | 100.0% | 1355 | 1440 | 85 |
| 1.2 | 3.3 | 86.5 | 2 | 7 | 88.4% | 87.8% | 1370 | 1895 | 525 |
| 1.3 | 2.2 | 86.5 | 0 | 10 | 75.2% | 98.5% | 1370 | 1725 | 355 |
| 1.4 | 2.1 | 86.5 | 1 | 9 | 88.0% | 98.8% | 1370 | 1665 | 295 |
| 1.5 | 2 | 86.5 | 2 | 8 | 93.8% | 95.1% | 1365 | 1600 | 235 |
| 1.5 | 0 | 86.5 | 0 | 12 | 69.9% | 100.0% | 1380 | 1460 | 80 |
| 1.6 | 0.9 | 86.5 | 1 | 10 | 82.6% | 100.0% | 1355 | 1405 | 50 |
| 1.7 | 3.8 | 86.5 | 2 | 6 | 91.9% | 86.3% | 1365 | 2000 | 635 |
| 1.8 | 2.7 | 86.5 | 0 | 9 | 94.2% | 96.4% | 1370 | 1880 | 510 |
| 1.9 | 2.6 | 86.5 | 1 | 8 | 94.8% | 95.2% | 1370 | 1820 | 450 |
| 2 | 1.5 | 86.5 | 2 | 8 | 98.7% | 99.1% | 1365 | 1500 | 135 |
| 2 | 0.5 | 86.5 | 0 | 11 | 99.4% | 100.0% | 1365 | 1395 | 30 |
| 2.1 | 3.4 | 86.5 | 2 | 6 | 92.8% | 87.7% | 1370 | 1975 | 605 |
| 2.2 | 2.3 | 86.5 | 0 | 9 | 95.2% | 97.1% | 1370 | 1805 | 435 |
| 2.3 | 0.2 | 86.5 | 1 | 10 | 73.5% | 100.0% | 1355 | 1415 | 60 |
| 2.4 | 0.1 | 86.5 | 2 | 9 | 42.6% | 100.0% | 1355 | 1430 | 75 |
| 2.4 | 3.1 | 86.5 | 0 | 8 | 92.1% | 94.6% | 1370 | 2000 | 630 |
| 2.5 | 4 | 86.5 | 1 | 6 | 86.1% | 85.9% | 1375 | 2000 | 625 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.6 | 2.9 | 86.5 | 2 | 6 | 88.5% | 89.5% | 1370 | 1890 | 520 |
| 2.7 | 1.8 | 86.5 | 0 | 9 | 95.8% | 97.9% | 1370 | 1705 | 335 |
| 2.8 | 1.7 | 86.5 | 1 | 8 | 90.2% | 99.0% | 1360 | 1645 | 285 |
| 2.8 | 0.7 | 86.5 | 2 | 8 | 92.7% | 100.0% | 1355 | 1410 | 55 |
| 2.9 | 3.6 | 86.5 | 0 | 7 | 82.4% | 92.3% | 1375 | 2000 | 625 |
| 3 | 3.5 | 86.5 | 1 | 6 | 79.2% | 89.1% | 1370 | 2000 | 630 |
| 0.3 | 0.2 | 86.5 | 2 | 11 | 16.7% | 100.0% | 1355 | 1555 | 200 |
| 3.1 | 1.4 | 86.5 | 0 | 9 | 92.2% | 98.6% | 1370 | 1615 | 245 |
| 3.2 | 1.3 | 86.5 | 1 | 8 | 86.3% | 99.7% | 1360 | 1560 | 200 |
| 3.2 | 3.3 | 86.5 | 2 | 5 | 76.5% | 88.4% | 1370 | 2000 | 630 |
| 3.3 | 2.2 | 86.5 | 0 | 8 | 83.4% | 96.1% | 1370 | 1840 | 470 |
| 3.4 | 2.1 | 86.5 | 1 | 7 | 78.1% | 97.2% | 1360 | 1785 | 425 |
| 3.5 | 2 | 86.5 | 2 | 6 | 78.0% | 95.7% | 1370 | 1725 | 355 |
| 3.5 | 0 | 86.5 | 0 | 10 | 90.8% | 100.0% | 1385 | 1425 | 40 |
| 3.6 | 0.9 | 86.5 | 1 | 8 | 81.3% | 100.0% | 1355 | 1455 | 100 |
| 3.7 | 3.8 | 86.5 | 2 | 4 | 66.3% | 86.9% | 1370 | 2000 | 630 |
| 3.8 | 2.7 | 86.5 | 0 | 7 | 72.5% | 94.2% | 1370 | 1985 | 615 |
| 3.9 | 2.6 | 86.5 | 1 | 6 | 68.6% | 95.3% | 1365 | 1930 | 565 |
| 4 | 1.5 | 86.5 | 2 | 6 | 69.3% | 99.1% | 1355 | 1620 | 265 |
| 4 | 0.5 | 86.5 | 0 | 9 | 71.4% | 100.0% | 1370 | 1445 | 75 |
| 0.4 | 3.1 | 86.5 | 1 | 9 | 26.8% | 91.0% | 1370 | 1850 | 480 |
| 0.5 | 3 | 86.5 | 2 | 8 | 33.3% | 88.7% | 1365 | 1780 | 415 |
| 0.6 | 1.9 | 86.5 | 0 | 11 | 35.0% | 100.0% | 1360 | 1605 | 245 |
| 0.7 | 0.8 | 86.5 | 2 | 10 | 40.8% | 100.0% | 1360 | 1480 | 120 |
| 0.8 | 3.7 | 86.5 | 0 | 9 | 58.0% | 91.2% | 1375 | 2000 | 625 |
| 0.9 | 3.6 | 86.5 | 1 | 8 | 61.1% | 87.6% | 1370 | 2000 | 630 |
| 1 | 2.4 | 86.6 | 2 | 8 | 70.6% | 91.4% | 1370 | 1660 | 290 |
| 1.1 | 1.3 | 86.6 | 0 | 11 | 70.5% | 100.0% | 1365 | 1465 | 100 |
| 1.2 | 1.2 | 86.6 | 1 | 10 | 66.1% | 100.0% | 1360 | 1410 | 50 |
| 1.2 | 3.2 | 86.6 | 2 | 7 | 88.7% | 88.1% | 1370 | 1865 | 495 |
| 1.3 | 2.1 | 86.6 | 0 | 10 | 75.4% | 98.9% | 1370 | 1695 | 325 |
| 1.4 | 3 | 86.6 | 1 | 8 | 93.2% | 91.7% | 1370 | 1880 | 510 |
| 1.5 | 0.9 | 86.6 | 0 | 11 | 95.5% | 100.0% | 1365 | 1395 | 30 |
| 1.6 | 0.8 | 86.6 | 1 | 10 | 82.7% | 100.0% | 1355 | 1410 | 55 |
| 1.7 | 3.7 | 86.6 | 2 | 6 | 92.2% | 86.6% | 1365 | 2000 | 635 |
| 1.8 | 2.6 | 86.6 | 0 | 9 | 94.6% | 96.8% | 1370 | 1850 | 480 |
| 1.9 | 2.5 | 86.6 | 1 | 8 | 95.2% | 95.5% | 1370 | 1790 | 420 |
| 2 | 1.4 | 86.6 | 2 | 8 | 99.1% | 99.5% | 1365 | 1470 | 105 |
| 2 | 0.4 | 86.6 | 0 | 11 | 94.7% | 100.0% | 1365 | 1405 | 40 |
| 2.1 | 0.3 | 86.6 | 2 | 9 | 61.1% | 100.0% | 1355 | 1435 | 80 |
| 2.2 | 0.2 | 86.6 | 0 | 11 | 93.3% | 100.0% | 1365 | 1405 | 40 |
| 2.3 | 1.1 | 86.6 | 1 | 9 | 99.4% | 100.0% | 1360 | 1440 | 80 |
| 2.4 | 1 | 86.6 | 2 | 8 | 99.8% | 100.0% | 1360 | 1390 | 30 |
| 2.4 | 4 | 86.6 | 0 | 7 | 88.0% | 89.2% | 1375 | 2000 | 625 |
| 2.5 | 3.9 | 86.6 | 1 | 6 | 86.4% | 86.2% | 1375 | 2000 | 625 |
| 2.6 | 2.8 | 86.6 | 2 | 6 | 88.8% | 89.9% | 1370 | 1860 | 490 |
| 2.7 | 1.7 | 86.6 | 0 | 9 | 96.1% | 98.3% | 1370 | 1670 | 300 |
| 2.8 | 1.6 | 86.6 | 1 | 8 | 90.6% | 99.4% | 1360 | 1615 | 255 |
| 2.8 | 0.6 | 86.6 | 2 | 8 | 88.6% | 100.0% | 1355 | 1410 | 55 |
| 2.9 | 3.5 | 86.6 | 0 | 7 | 82.7% | 92.6% | 1375 | 2000 | 625 |
| 3 | 3.4 | 86.6 | 1 | 6 | 79.5% | 89.4% | 1370 | 2000 | 630 |
| 3.1 | 2.3 | 86.6 | 1 | 7 | 82.7% | 97.1% | 1365 | 1810 | 445 |
| 3.2 | 1.2 | 86.6 | 2 | 7 | 84.9% | 100.0% | 1360 | 1485 | 125 |
| 3.2 | 3.2 | 86.6 | 0 | 7 | 78.5% | 93.6% | 1370 | 2000 | 630 |
| 3.3 | 3.1 | 86.6 | 1 | 6 | 76.2% | 91.6% | 1370 | 2000 | 630 |
| 3.4 | 3 | 86.6 | 2 | 5 | 74.4% | 89.4% | 1370 | 1955 | 585 |
| 3.5 | 1.9 | 86.6 | 0 | 8 | 82.0% | 96.8% | 1370 | 1770 | 400 |
| 3.6 | 1.8 | 86.6 | 1 | 7 | 76.5% | 97.9% | 1360 | 1715 | 355 |
| 3.6 | 0.8 | 86.6 | 2 | 7 | 79.5% | 100.0% | 1355 | 1450 | 95 |
| 3.8 | 3.6 | 86.6 | 1 | 5 | 65.9% | 88.4% | 1370 | 2000 | 630 |
| 3.9 | 2.5 | 86.6 | 2 | 5 | 68.6% | 91.8% | 1370 | 1865 | 495 |
| 4 | 1.4 | 86.6 | 0 | 8 | 75.7% | 97.6% | 1370 | 1660 | 290 |
| 0.4 | 1 | 86.6 | 1 | 11 | 21.9% | 100.0% | 1355 | 1475 | 120 |
| 0.4 | 4 | 86.6 | 2 | 7 | 29.7% | 85.2% | 1365 | 2000 | 635 |
| 0.5 | 2.9 | 86.6 | 0 | 10 | 35.2% | 96.5% | 1375 | 1845 | 470 |
| 0.6 | 2.8 | 86.6 | 1 | 9 | 40.3% | 92.9% | 1370 | 1780 | 410 |
| 0.7 | 1.7 | 86.6 | 2 | 9 | 44.6% | 96.7% | 1365 | 1465 | 100 |
| 0.7 | 0.7 | 86.6 | 0 | 12 | 48.5% | 100.0% | 1360 | 1460 | 100 |
| 0.9 | 3.5 | 86.6 | 2 | 7 | 62.7% | 87.0% | 1365 | 1920 | 555 |
| 1.1 | 0.2 | 86.7 | 1 | 11 | 48.4% | 100.0% | 1355 | 1490 | 135 |
| 1.2 | 0.1 | 86.7 | 2 | 10 | 29.6% | 100.0% | 1355 | 1510 | 155 |
| 1.2 | 3.1 | 86.7 | 0 | 9 | 79.9% | 94.7% | 1375 | 1930 | 555 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.3 | 4 | 86.7 | 1 | 7 | 91.1% | 85.5% | 1370 | 2000 | 630 |
| 1.5 | 1.8 | 86.7 | 0 | 10 | 87.7% | 99.6% | 1370 | 1620 | 250 |
| 1.6 | 1.7 | 86.7 | 1 | 9 | 83.4% | 100.0% | 1360 | 1560 | 200 |
| 1.6 | 0.7 | 86.7 | 2 | 9 | 79.5% | 100.0% | 1360 | 1435 | 75 |
| 1.8 | 3.5 | 86.7 | 1 | 7 | 92.3% | 87.9% | 1370 | 2000 | 630 |
| 1.9 | 2.4 | 86.7 | 2 | 7 | 96.1% | 91.4% | 1370 | 1715 | 345 |
| 2 | 1.3 | 86.7 | 0 | 10 | 98.7% | 100.0% | 1370 | 1515 | 145 |
| 2.1 | 3.2 | 86.7 | 1 | 7 | 93.0% | 90.1% | 1370 | 1965 | 595 |
| 2.2 | 2.1 | 86.7 | 2 | 7 | 96.8% | 93.7% | 1370 | 1660 | 290 |
| 2.3 | 2 | 86.7 | 0 | 9 | 96.2% | 98.0% | 1370 | 1725 | 355 |
| 2.5 | 3.8 | 86.7 | 0 | 7 | 87.3% | 90.1% | 1375 | 2000 | 625 |
| 2.6 | 3.7 | 86.7 | 1 | 6 | 85.6% | 86.9% | 1375 | 2000 | 625 |
| 2.7 | 2.6 | 86.7 | 2 | 6 | 88.0% | 90.6% | 1370 | 1810 | 440 |
| 2.8 | 1.5 | 86.7 | 0 | 9 | 95.6% | 98.8% | 1370 | 1620 | 250 |
| 2.9 | 1.4 | 86.7 | 1 | 8 | 89.9% | 100.0% | 1360 | 1560 | 200 |
| 2.9 | 0.4 | 86.7 | 2 | 8 | 70.3% | 100.0% | 1355 | 1415 | 60 |
| 3 | 0.3 | 86.7 | 0 | 10 | 84.4% | 100.0% | 1365 | 1405 | 40 |
| 0.3 | 3 | 86.7 | 1 | 9 | 20.2% | 90.9% | 1370 | 1805 | 435 |
| 3.2 | 3.1 | 86.7 | 0 | 7 | 78.8% | 93.9% | 1370 | 2000 | 630 |
| 3.4 | 2.9 | 86.7 | 2 | 5 | 74.8% | 89.7% | 1370 | 1925 | 555 |
| 3.5 | 1.8 | 86.7 | 0 | 8 | 82.3% | 97.1% | 1370 | 1740 | 370 |
| 3.6 | 1.7 | 86.7 | 1 | 7 | 76.8% | 98.3% | 1360 | 1680 | 320 |
| 3.7 | 3.6 | 86.7 | 0 | 6 | 69.4% | 91.8% | 1375 | 2000 | 625 |
| 3.9 | 2.4 | 86.7 | 2 | 5 | 68.9% | 92.1% | 1370 | 1835 | 465 |
| 4 | 1.3 | 86.7 | 0 | 8 | 76.2% | 97.9% | 1370 | 1625 | 255 |
| 0.4 | 1.9 | 86.7 | 1 | 10 | 27.5% | 99.3% | 1370 | 1535 | 165 |
| 0.4 | 0.9 | 86.7 | 2 | 10 | 26.0% | 100.0% | 1365 | 1500 | 135 |
| 0.6 | 3.7 | 86.7 | 1 | 8 | 41.9% | 86.3% | 1370 | 1995 | 625 |
| 0.7 | 2.6 | 86.7 | 2 | 8 | 50.9% | 90.1% | 1370 | 1680 | 310 |
| 0.8 | 1.5 | 86.7 | 0 | 11 | 51.4% | 100.0% | 1365 | 1500 | 135 |
| 0.9 | 0.4 | 86.7 | 2 | 10 | 47.1% | 100.0% | 1360 | 1505 | 145 |
| 1.1 | 2.1 | 86.8 | 1 | 9 | 74.5% | 97.5% | 1370 | 1625 | 255 |
| 1.2 | 2 | 86.8 | 2 | 8 | 76.7% | 93.7% | 1365 | 1560 | 195 |
| 1.2 | 0 | 86.8 | 0 | 12 | 57.8% | 100.0% | 1385 | 1485 | 100 |
| 1.3 | 0.9 | 86.8 | 1 | 10 | 72.0% | 100.0% | 1360 | 1425 | 65 |
| 1.6 | 2.6 | 86.8 | 1 | 8 | 95.2% | 93.8% | 1370 | 1785 | 415 |
| 1.7 | 1.5 | 86.8 | 2 | 8 | 99.1% | 97.7% | 1365 | 1465 | 100 |
| 1.8 | 0.4 | 86.8 | 1 | 10 | 76.9% | 100.0% | 1355 | 1435 | 80 |
| 1.9 | 0.3 | 86.8 | 2 | 9 | 55.2% | 100.0% | 1355 | 1450 | 95 |
| 2 | 0.2 | 86.8 | 0 | 11 | 85.5% | 100.0% | 1365 | 1420 | 55 |
| 2.1 | 0.1 | 86.8 | 0 | 11 | 82.4% | 100.0% | 1365 | 1425 | 60 |
| 2.2 | 1 | 86.8 | 1 | 9 | 99.9% | 100.0% | 1360 | 1395 | 35 |
| 2.2 | 4 | 86.8 | 2 | 5 | 89.7% | 77.2% | 1370 | 2000 | 630 |
| 2.3 | 2.9 | 86.8 | 0 | 8 | 93.4% | 95.6% | 1370 | 1940 | 570 |
| 2.4 | 2.8 | 86.8 | 1 | 7 | 92.3% | 92.6% | 1370 | 1880 | 510 |
| 2.5 | 1.7 | 86.8 | 2 | 7 | 94.9% | 96.4% | 1365 | 1570 | 205 |
| 2.5 | 0.7 | 86.8 | 0 | 10 | 100.0% | 100.0% | 1370 | 1385 | 15 |
| 2.6 | 0.6 | 86.8 | 1 | 9 | 98.4% | 100.0% | 1360 | 1395 | 35 |
| 2.7 | 3.5 | 86.8 | 2 | 5 | 83.5% | 87.6% | 1370 | 2000 | 630 |
| 2.8 | 2.4 | 86.8 | 0 | 8 | 89.2% | 96.4% | 1370 | 1845 | 475 |
| 3 | 1.2 | 86.8 | 2 | 7 | 89.1% | 100.0% | 1365 | 1465 | 100 |
| 3 | 3.2 | 86.8 | 0 | 7 | 82.4% | 93.9% | 1375 | 2000 | 625 |
| 0.3 | 0.9 | 86.8 | 1 | 11 | 17.5% | 100.0% | 1360 | 1495 | 135 |
| 3.2 | 2 | 86.8 | 0 | 8 | 85.3% | 97.0% | 1370 | 1770 | 400 |
| 3.3 | 1.9 | 86.8 | 1 | 7 | 81.3% | 98.1% | 1365 | 1710 | 345 |
| 3.3 | 0.9 | 86.8 | 2 | 7 | 83.3% | 100.0% | 1355 | 1440 | 85 |
| 3.4 | 3.8 | 86.8 | 0 | 6 | 72.7% | 90.0% | 1375 | 2000 | 625 |
| 3.5 | 3.7 | 86.8 | 1 | 5 | 70.8% | 87.2% | 1375 | 2000 | 625 |
| 3.6 | 2.6 | 86.8 | 2 | 5 | 72.7% | 90.8% | 1370 | 1860 | 490 |
| 3.7 | 1.5 | 86.8 | 0 | 8 | 80.9% | 97.8% | 1370 | 1665 | 295 |
| 3.8 | 1.4 | 86.8 | 1 | 7 | 75.1% | 98.9% | 1360 | 1605 | 245 |
| 3.8 | 0.4 | 86.8 | 2 | 7 | 70.8% | 100.0% | 1355 | 1465 | 110 |
| 3.9 | 0.3 | 86.8 | 0 | 9 | 74.8% | 100.0% | 1370 | 1450 | 80 |
| 4 | 2.2 | 86.8 | 1 | 6 | 68.4% | 96.5% | 1365 | 1825 | 460 |
| 0.4 | 2.8 | 86.8 | 2 | 8 | 27.2% | 89.3% | 1365 | 1705 | 340 |
| 0.5 | 1.7 | 86.8 | 0 | 11 | 32.2% | 100.0% | 1365 | 1525 | 160 |
| 0.6 | 1.6 | 86.8 | 1 | 10 | 40.6% | 100.0% | 1370 | 1465 | 95 |
| 0.6 | 0.6 | 86.8 | 2 | 10 | 35.3% | 100.0% | 1360 | 1510 | 150 |
| 0.7 | 3.5 | 86.8 | 0 | 9 | 51.1% | 91.4% | 1375 | 1990 | 615 |
| 0.8 | 3.4 | 86.8 | 1 | 8 | 55.2% | 87.7% | 1370 | 1925 | 555 |
| 0.9 | 2.3 | 86.8 | 2 | 8 | 64.5% | 91.3% | 1370 | 1615 | 245 |
| 1 | 0.1 | 86.9 | 0 | 12 | 47.2% | 100.0% | 1365 | 1490 | 125 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.1 | 1 | 86.9 | 1 | 10 | 60.9% | 100.0% | 1360 | 1435 | 75 |
| 1.1 | 4 | 86.9 | 2 | 6 | 80.7% | 79.3% | 1365 | 2000 | 635 |
| 1.2 | 2.9 | 86.9 | 0 | 9 | 80.6% | 95.4% | 1375 | 1870 | 495 |
| 1.3 | 2.8 | 86.9 | 1 | 8 | 87.7% | 91.9% | 1370 | 1805 | 435 |
| 1.4 | 1.7 | 86.9 | 2 | 8 | 89.0% | 95.6% | 1365 | 1490 | 125 |
| 1.4 | 0.7 | 86.9 | 0 | 11 | 85.1% | 100.0% | 1365 | 1425 | 60 |
| 1.5 | 0.6 | 86.9 | 1 | 10 | 76.5% | 100.0% | 1360 | 1440 | 80 |
| 1.6 | 3.5 | 86.9 | 2 | 6 | 93.1% | 87.2% | 1365 | 1940 | 575 |
| 1.7 | 2.4 | 86.9 | 0 | 9 | 95.4% | 97.8% | 1370 | 1775 | 405 |
| 1.8 | 2.3 | 86.9 | 1 | 8 | 96.1% | 95.7% | 1370 | 1715 | 345 |
| 1.9 | 1.2 | 86.9 | 2 | 8 | 100.0% | 99.7% | 1365 | 1390 | 25 |
| 1.9 | 3.2 | 86.9 | 0 | 8 | 92.9% | 93.4% | 1375 | 1980 | 605 |
| 2 | 3.1 | 86.9 | 1 | 7 | 93.5% | 89.9% | 1370 | 1920 | 550 |
| 2.1 | 3 | 86.9 | 2 | 6 | 94.3% | 89.1% | 1370 | 1855 | 485 |
| 2.2 | 1.9 | 86.9 | 0 | 9 | 96.7% | 98.6% | 1370 | 1680 | 310 |
| 2.3 | 1.8 | 86.9 | 1 | 8 | 97.4% | 99.5% | 1370 | 1620 | 250 |
| 2.3 | 0.8 | 86.9 | 2 | 8 | 100.0% | 100.0% | 1365 | 1385 | 20 |
| 2.4 | 3.7 | 86.9 | 0 | 7 | 89.0% | 90.0% | 1375 | 2000 | 625 |
| 2.5 | 3.6 | 86.9 | 1 | 6 | 87.5% | 87.2% | 1375 | 2000 | 625 |
| 2.6 | 2.5 | 86.9 | 2 | 6 | 89.9% | 90.9% | 1370 | 1770 | 400 |
| 2.7 | 1.4 | 86.9 | 0 | 9 | 97.2% | 99.4% | 1370 | 1575 | 205 |
| 2.8 | 1.3 | 86.9 | 1 | 8 | 91.7% | 100.0% | 1360 | 1515 | 155 |
| 2.8 | 3.3 | 86.9 | 2 | 5 | 82.6% | 88.2% | 1370 | 1970 | 600 |
| 2.9 | 2.2 | 86.9 | 0 | 8 | 88.5% | 96.9% | 1370 | 1800 | 430 |
| 3 | 2.1 | 86.9 | 1 | 7 | 86.0% | 97.4% | 1370 | 1740 | 370 |
| 0.3 | 2.8 | 86.9 | 2 | 8 | 20.7% | 89.3% | 1365 | 1690 | 325 |
| 3.1 | 1 | 86.9 | 0 | 9 | 93.6% | 100.0% | 1370 | 1475 | 105 |
| 3.1 | 0 | 86.9 | 1 | 9 | 95.0% | 100.0% | 1375 | 1420 | 45 |
| 3.2 | 3.9 | 86.9 | 2 | 4 | 73.5% | 67.4% | 1370 | 2000 | 630 |
| 3.3 | 2.8 | 86.9 | 0 | 7 | 78.5% | 94.8% | 1370 | 1965 | 595 |
| 3.4 | 2.7 | 86.9 | 1 | 6 | 76.1% | 93.2% | 1370 | 1910 | 540 |
| 3.5 | 1.6 | 86.9 | 2 | 6 | 79.3% | 97.0% | 1370 | 1600 | 230 |
| 3.5 | 0.6 | 86.9 | 0 | 9 | 87.1% | 100.0% | 1370 | 1430 | 60 |
| 3.6 | 0.5 | 86.9 | 1 | 8 | 82.6% | 100.0% | 1360 | 1445 | 85 |
| 3.7 | 3.4 | 86.9 | 2 | 4 | 67.5% | 88.2% | 1370 | 2000 | 630 |
| 3.8 | 2.3 | 86.9 | 0 | 7 | 73.7% | 95.6% | 1370 | 1870 | 500 |
| 3.9 | 0.2 | 86.9 | 1 | 8 | 78.4% | 100.0% | 1360 | 1460 | 100 |
| 4 | 0.1 | 86.9 | 2 | 7 | 41.7% | 100.0% | 1355 | 1475 | 120 |
| 4 | 3.1 | 86.9 | 0 | 6 | 66.0% | 93.3% | 1370 | 2000 | 630 |
| 0.4 | 0.7 | 86.9 | 1 | 11 | 23.5% | 100.0% | 1360 | 1505 | 145 |
| 0.5 | 3.6 | 86.9 | 2 | 7 | 37.5% | 86.5% | 1365 | 1895 | 530 |
| 0.6 | 2.5 | 86.9 | 0 | 10 | 40.9% | 98.2% | 1375 | 1730 | 355 |
| 0.7 | 2.4 | 86.9 | 1 | 9 | 47.4% | 94.7% | 1370 | 1670 | 300 |
| 0.8 | 1.3 | 86.9 | 2 | 9 | 51.4% | 98.6% | 1365 | 1445 | 80 |
| 0.8 | 3.3 | 86.9 | 0 | 9 | 58.7% | 92.4% | 1375 | 1940 | 565 |
| 0.9 | 3.2 | 86.9 | 1 | 8 | 61.9% | 88.8% | 1370 | 1880 | 510 |
| 1 | 3 | 87 | 2 | 7 | 69.7% | 88.8% | 1365 | 1775 | 410 |
| 1.1 | 1.9 | 87 | 0 | 10 | 64.3% | 100.0% | 1370 | 1605 | 235 |
| 1.2 | 1.8 | 87 | 1 | 9 | 80.7% | 98.9% | 1370 | 1545 | 175 |
| 1.2 | 0.8 | 87 | 2 | 9 | 71.5% | 100.0% | 1365 | 1460 | 95 |
| 1.3 | 3.7 | 87 | 0 | 8 | 91.8% | 89.4% | 1375 | 2000 | 625 |
| 1.4 | 3.6 | 87 | 1 | 7 | 92.5% | 86.9% | 1370 | 1995 | 625 |
| 1.5 | 2.5 | 87 | 2 | 7 | 96.3% | 90.7% | 1370 | 1690 | 320 |
| 1.6 | 1.4 | 87 | 0 | 10 | 94.4% | 100.0% | 1370 | 1505 | 135 |
| 1.7 | 1.3 | 87 | 1 | 9 | 88.8% | 100.0% | 1360 | 1445 | 85 |
| 1.7 | 3.3 | 87 | 2 | 6 | 93.7% | 87.9% | 1365 | 1895 | 530 |
| 1.8 | 2.2 | 87 | 0 | 9 | 96.0% | 98.3% | 1370 | 1725 | 355 |
| 1.9 | 2.1 | 87 | 1 | 8 | 96.7% | 96.8% | 1370 | 1665 | 295 |
| 2 | 2 | 87 | 2 | 7 | 97.5% | 93.1% | 1370 | 1600 | 230 |
| 2 | 0 | 87 | 0 | 11 | 84.7% | 100.0% | 1385 | 1440 | 55 |
| 2.1 | 3.9 | 87 | 0 | 7 | 90.7% | 88.2% | 1375 | 2000 | 625 |
| 2.2 | 3.8 | 87 | 1 | 6 | 90.0% | 86.5% | 1370 | 2000 | 630 |
| 2.3 | 2.7 | 87 | 2 | 6 | 94.0% | 90.1% | 1370 | 1790 | 420 |
| 2.4 | 1.6 | 87 | 0 | 9 | 97.6% | 99.3% | 1370 | 1610 | 240 |
| 2.5 | 1.5 | 87 | 1 | 8 | 95.2% | 100.0% | 1360 | 1550 | 190 |
| 2.5 | 0.5 | 87 | 2 | 8 | 78.6% | 100.0% | 1360 | 1400 | 40 |
| 2.6 | 3.4 | 87 | 0 | 7 | 87.2% | 91.7% | 1375 | 2000 | 625 |
| 2.7 | 0.3 | 87 | 1 | 9 | 83.1% | 100.0% | 1360 | 1400 | 40 |
| 2.8 | 0.2 | 87 | 2 | 8 | 42.6% | 100.0% | 1355 | 1410 | 55 |
| 2.9 | 0.1 | 87 | 0 | 10 | 94.2% | 100.0% | 1370 | 1400 | 30 |
| 3 | 1 | 87 | 1 | 8 | 90.0% | 100.0% | 1360 | 1430 | 70 |
| 3 | 4 | 87 | 2 | 4 | 76.2% | 56.4% | 1370 | 2000 | 630 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.3 | 2.7 | 87 | 0 | 10 | 22.5% | 96.3% | 1375 | 1755 | 380 |
| 3.1 | 2.9 | 87 | 1 | 6 | 79.7% | 91.3% | 1370 | 1935 | 565 |
| 3.2 | 1.8 | 87 | 2 | 6 | 83.1% | 95.0% | 1370 | 1630 | 260 |
| 3.2 | 0.8 | 87 | 0 | 9 | 93.1% | 100.0% | 1370 | 1420 | 50 |
| 3.3 | 0.7 | 87 | 1 | 8 | 86.6% | 100.0% | 1360 | 1435 | 75 |
| 3.4 | 3.6 | 87 | 2 | 4 | 71.4% | 78.0% | 1370 | 2000 | 630 |
| 3.5 | 2.5 | 87 | 0 | 7 | 76.8% | 95.5% | 1370 | 1900 | 530 |
| 3.6 | 2.4 | 87 | 1 | 6 | 74.3% | 94.9% | 1370 | 1845 | 475 |
| 3.7 | 1.3 | 87 | 2 | 6 | 77.4% | 98.8% | 1370 | 1520 | 150 |
| 3.7 | 3.3 | 87 | 0 | 6 | 70.3% | 92.7% | 1375 | 2000 | 625 |
| 3.8 | 3.2 | 87 | 1 | 5 | 67.0% | 89.5% | 1370 | 2000 | 630 |
| 3.9 | 2.1 | 87 | 2 | 5 | 69.9% | 93.0% | 1370 | 1745 | 375 |
| 4 | 2 | 87 | 0 | 7 | 72.2% | 96.3% | 1370 | 1800 | 430 |
| 0.4 | 1.6 | 87 | 1 | 10 | 27.8% | 100.0% | 1370 | 1440 | 70 |
| 0.4 | 0.6 | 87 | 2 | 10 | 26.1% | 100.0% | 1365 | 1530 | 165 |
| 0.5 | 3.5 | 87 | 0 | 9 | 36.5% | 90.5% | 1375 | 1965 | 590 |
| 0.6 | 3.4 | 87 | 1 | 8 | 42.4% | 87.3% | 1370 | 1900 | 530 |
| 0.7 | 2.3 | 87 | 2 | 8 | 51.5% | 91.2% | 1370 | 1585 | 215 |
| 0.8 | 1.2 | 87 | 0 | 11 | 50.7% | 100.0% | 1365 | 1425 | 60 |
| 0.9 | 0.1 | 87 | 1 | 11 | 37.4% | 100.0% | 1360 | 1515 | 155 |
| 0.9 | 3.1 | 87 | 2 | 7 | 63.8% | 88.4% | 1365 | 1795 | 430 |
| 1.1 | 3.8 | 87.1 | 1 | 7 | 80.1% | 86.1% | 1370 | 2000 | 630 |
| 1.2 | 2.7 | 87.1 | 2 | 7 | 90.5% | 89.9% | 1370 | 1710 | 340 |
| 1.3 | 1.6 | 87.1 | 0 | 10 | 76.4% | 100.0% | 1370 | 1535 | 165 |
| 1.4 | 1.5 | 87.1 | 1 | 9 | 90.3% | 100.0% | 1370 | 1475 | 105 |
| 1.4 | 0.5 | 87.1 | 2 | 9 | 66.0% | 100.0% | 1365 | 1470 | 105 |
| 1.5 | 3.4 | 87.1 | 0 | 8 | 92.6% | 91.1% | 1375 | 1995 | 620 |
| 1.6 | 0.3 | 87.1 | 1 | 10 | 67.2% | 100.0% | 1360 | 1460 | 100 |
| 1.7 | 0.2 | 87.1 | 2 | 9 | 43.7% | 100.0% | 1360 | 1480 | 120 |
| 1.8 | 0.1 | 87.1 | 0 | 11 | 73.0% | 100.0% | 1365 | 1450 | 85 |
| 1.9 | 4 | 87.1 | 2 | 5 | 91.7% | 59.9% | 1370 | 2000 | 630 |
| 2 | 2.9 | 87.1 | 0 | 8 | 93.8% | 94.7% | 1375 | 1905 | 530 |
| 2.1 | 1.8 | 87.1 | 0 | 9 | 97.2% | 99.2% | 1370 | 1640 | 270 |
| 2.2 | 1.7 | 87.1 | 1 | 8 | 97.9% | 99.4% | 1370 | 1580 | 210 |
| 2.2 | 0.7 | 87.1 | 2 | 8 | 95.3% | 100.0% | 1365 | 1405 | 40 |
| 2.3 | 3.6 | 87.1 | 0 | 7 | 90.8% | 89.9% | 1375 | 2000 | 625 |
| 2.4 | 3.5 | 87.1 | 1 | 6 | 89.4% | 87.5% | 1375 | 2000 | 625 |
| 2.5 | 2.4 | 87.1 | 2 | 6 | 91.9% | 91.2% | 1370 | 1725 | 355 |
| 2.7 | 1.2 | 87.1 | 1 | 8 | 93.4% | 100.0% | 1360 | 1470 | 110 |
| 2.7 | 3.2 | 87.1 | 2 | 5 | 84.5% | 88.6% | 1370 | 1930 | 560 |
| 2.8 | 2.1 | 87.1 | 0 | 8 | 90.2% | 97.5% | 1370 | 1755 | 385 |
| 2.9 | 3 | 87.1 | 1 | 6 | 82.3% | 90.2% | 1370 | 1940 | 570 |
| 3 | 1.9 | 87.1 | 2 | 6 | 85.9% | 93.8% | 1370 | 1635 | 265 |
| 3 | 0.9 | 87.1 | 0 | 9 | 95.2% | 100.0% | 1370 | 1430 | 60 |
| 0.3 | 0.6 | 87.1 | 1 | 11 | 17.4% | 100.0% | 1360 | 1520 | 160 |
| 3.1 | 3.8 | 87.1 | 2 | 4 | 75.3% | 61.6% | 1370 | 2000 | 630 |
| 3.2 | 2.7 | 87.1 | 0 | 7 | 80.1% | 95.4% | 1370 | 1925 | 555 |
| 3.3 | 2.6 | 87.1 | 1 | 6 | 77.8% | 93.1% | 1370 | 1870 | 500 |
| 3.4 | 0.5 | 87.1 | 0 | 9 | 90.3% | 100.0% | 1370 | 1430 | 60 |
| 3.5 | 0.4 | 87.1 | 1 | 8 | 83.5% | 100.0% | 1360 | 1445 | 85 |
| 3.6 | 0.3 | 87.1 | 2 | 7 | 53.3% | 100.0% | 1355 | 1455 | 100 |
| 3.7 | 0.2 | 87.1 | 0 | 9 | 72.6% | 100.0% | 1370 | 1445 | 75 |
| 3.8 | 1.1 | 87.1 | 1 | 7 | 76.1% | 100.0% | 1360 | 1500 | 140 |
| 3.9 | 1 | 87.1 | 2 | 6 | 74.3% | 100.0% | 1365 | 1470 | 105 |
| 3.9 | 4 | 87.1 | 0 | 5 | 63.4% | 87.8% | 1375 | 2000 | 625 |
| 4 | 3.9 | 87.1 | 1 | 4 | 60.7% | 86.7% | 1370 | 2000 | 630 |
| 0.4 | 2.5 | 87.1 | 2 | 8 | 27.6% | 90.4% | 1365 | 1610 | 245 |
| 0.6 | 1.3 | 87.1 | 1 | 10 | 40.4% | 100.0% | 1370 | 1450 | 80 |
| 0.6 | 3.3 | 87.1 | 2 | 7 | 45.3% | 87.6% | 1365 | 1815 | 450 |
| 0.7 | 2.2 | 87.1 | 0 | 10 | 46.8% | 99.7% | 1375 | 1650 | 275 |
| 0.8 | 2.1 | 87.1 | 1 | 9 | 54.5% | 96.1% | 1370 | 1590 | 220 |
| 0.9 | 2 | 87.1 | 2 | 8 | 65.3% | 92.4% | 1370 | 1520 | 150 |
| 0.9 | 0 | 87.1 | 0 | 12 | 43.3% | 100.0% | 1385 | 1510 | 125 |
| 1 | 0.8 | 87.2 | 1 | 10 | 55.7% | 100.0% | 1360 | 1460 | 100 |
| 1.1 | 3.7 | 87.2 | 2 | 6 | 81.3% | 78.8% | 1365 | 1935 | 570 |
| 1.3 | 2.5 | 87.2 | 1 | 8 | 88.6% | 92.8% | 1370 | 1715 | 345 |
| 1.4 | 0.4 | 87.2 | 0 | 11 | 71.1% | 100.0% | 1365 | 1450 | 85 |
| 1.5 | 3.3 | 87.2 | 1 | 7 | 93.4% | 87.9% | 1370 | 1920 | 550 |
| 1.6 | 2.2 | 87.2 | 2 | 7 | 97.3% | 91.8% | 1370 | 1610 | 240 |
| 1.8 | 2 | 87.2 | 1 | 8 | 97.2% | 96.7% | 1370 | 1625 | 255 |
| 1.8 | 0 | 87.2 | 2 | 9 | 65.1% | 100.0% | 1385 | 1490 | 105 |
| 1.9 | 3.9 | 87.2 | 0 | 7 | 91.0% | 87.4% | 1375 | 2000 | 625 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.1 | 2.7 | 87.2 | 2 | 6 | 95.4% | 90.1% | 1370 | 1765 | 395 |
| 2.2 | 1.6 | 87.2 | 0 | 9 | 97.8% | 99.8% | 1370 | 1585 | 215 |
| 2.3 | 1.5 | 87.2 | 1 | 8 | 98.5% | 100.0% | 1370 | 1525 | 155 |
| 2.3 | 0.5 | 87.2 | 2 | 8 | 83.1% | 100.0% | 1365 | 1415 | 50 |
| 2.4 | 3.4 | 87.2 | 0 | 7 | 90.1% | 90.9% | 1375 | 2000 | 625 |
| 2.5 | 0.3 | 87.2 | 1 | 9 | 75.5% | 100.0% | 1360 | 1405 | 45 |
| 2.6 | 0.2 | 87.2 | 2 | 8 | 43.8% | 100.0% | 1360 | 1420 | 60 |
| 2.7 | 0.1 | 87.2 | 0 | 10 | 100.0% | 100.0% | 1370 | 1395 | 25 |
| 2.8 | 1 | 87.2 | 1 | 8 | 92.8% | 100.0% | 1360 | 1410 | 50 |
| 3 | 2.8 | 87.2 | 1 | 6 | 81.5% | 91.2% | 1370 | 1895 | 525 |
| 0.3 | 1.5 | 87.2 | 2 | 9 | 19.6% | 95.4% | 1365 | 1470 | 105 |
| 0.3 | 0.5 | 87.2 | 0 | 12 | 22.0% | 100.0% | 1365 | 1515 | 150 |
| 3.1 | 0.7 | 87.2 | 1 | 8 | 88.9% | 100.0% | 1360 | 1425 | 65 |
| 3.2 | 3.6 | 87.2 | 2 | 4 | 74.4% | 66.8% | 1370 | 2000 | 630 |
| 3.4 | 2.4 | 87.2 | 1 | 6 | 77.1% | 94.1% | 1370 | 1820 | 450 |
| 3.5 | 1.3 | 87.2 | 2 | 6 | 80.3% | 97.9% | 1370 | 1500 | 130 |
| 3.5 | 3.3 | 87.2 | 0 | 6 | 72.9% | 91.9% | 1375 | 2000 | 625 |
| 3.8 | 2 | 87.2 | 0 | 7 | 74.6% | 96.7% | 1370 | 1780 | 410 |
| 3.9 | 0.9 | 87.2 | 2 | 6 | 74.6% | 100.0% | 1365 | 1470 | 105 |
| 4 | 3.8 | 87.2 | 0 | 5 | 62.7% | 88.7% | 1375 | 2000 | 625 |
| 0.4 | 3.4 | 87.2 | 1 | 8 | 29.0% | 87.2% | 1370 | 1875 | 505 |
| 0.6 | 1.2 | 87.2 | 0 | 11 | 41.0% | 100.0% | 1370 | 1440 | 70 |
| 0.7 | 3.1 | 87.2 | 2 | 7 | 51.9% | 88.3% | 1365 | 1765 | 400 |
| 0.9 | 2.9 | 87.2 | 1 | 8 | 62.6% | 89.7% | 1370 | 1785 | 415 |
| 1 | 1.7 | 87.3 | 2 | 8 | 72.5% | 93.7% | 1370 | 1440 | 70 |
| 1.1 | 0.6 | 87.3 | 1 | 10 | 61.5% | 100.0% | 1360 | 1470 | 110 |
| 1.2 | 3.5 | 87.3 | 2 | 6 | 89.1% | 84.5% | 1365 | 1890 | 525 |
| 1.3 | 2.4 | 87.3 | 0 | 9 | 87.2% | 97.4% | 1375 | 1730 | 355 |
| 1.5 | 1.2 | 87.3 | 2 | 8 | 92.6% | 97.8% | 1365 | 1410 | 45 |
| 1.6 | 3.1 | 87.3 | 1 | 7 | 94.0% | 88.6% | 1370 | 1870 | 500 |
| 1.7 | 3 | 87.3 | 2 | 6 | 94.8% | 89.0% | 1365 | 1805 | 440 |
| 1.8 | 1.9 | 87.3 | 0 | 9 | 97.2% | 99.5% | 1370 | 1635 | 265 |
| 1.9 | 1.8 | 87.3 | 1 | 8 | 97.9% | 97.8% | 1370 | 1575 | 205 |
| 2.1 | 2.6 | 87.3 | 0 | 8 | 94.8% | 96.1% | 1375 | 1830 | 455 |
| 2.2 | 2.5 | 87.3 | 1 | 7 | 95.4% | 92.7% | 1370 | 1765 | 395 |
| 2.3 | 0.4 | 87.3 | 0 | 10 | 99.5% | 100.0% | 1370 | 1400 | 30 |
| 2.4 | 3.3 | 87.3 | 1 | 6 | 90.1% | 88.2% | 1375 | 1970 | 595 |
| 2.5 | 2.2 | 87.3 | 2 | 6 | 92.7% | 91.9% | 1370 | 1665 | 295 |
| 2.6 | 1.1 | 87.3 | 0 | 9 | 99.3% | 100.0% | 1370 | 1460 | 90 |
| 2.7 | 2 | 87.3 | 1 | 7 | 90.8% | 96.4% | 1370 | 1675 | 305 |
| 2.7 | 0 | 87.3 | 2 | 8 | 53.7% | 100.0% | 1380 | 1435 | 55 |
| 2.8 | 3.9 | 87.3 | 0 | 6 | 80.7% | 87.3% | 1375 | 2000 | 625 |
| 2.9 | 3.8 | 87.3 | 1 | 5 | 78.2% | 86.7% | 1370 | 2000 | 630 |
| 3 | 2.7 | 87.3 | 2 | 5 | 81.6% | 90.3% | 1370 | 1820 | 450 |
| 0.3 | 1.4 | 87.3 | 0 | 11 | 20.2% | 100.0% | 1370 | 1450 | 80 |
| 3.1 | 1.6 | 87.3 | 1 | 7 | 86.3% | 99.4% | 1370 | 1595 | 225 |
| 3.1 | 0.6 | 87.3 | 2 | 7 | 88.2% | 100.0% | 1365 | 1435 | 70 |
| 3.2 | 3.5 | 87.3 | 0 | 6 | 76.4% | 90.1% | 1375 | 2000 | 625 |
| 3.3 | 3.4 | 87.3 | 1 | 5 | 74.6% | 88.1% | 1375 | 2000 | 625 |
| 3.4 | 2.3 | 87.3 | 2 | 5 | 76.7% | 91.7% | 1370 | 1750 | 380 |
| 3.6 | 0.1 | 87.3 | 1 | 8 | 60.9% | 100.0% | 1360 | 1450 | 90 |
| 3.6 | 3.1 | 87.3 | 2 | 4 | 69.9% | 88.3% | 1370 | 1950 | 580 |
| 3.7 | 3 | 87.3 | 0 | 6 | 71.1% | 93.5% | 1375 | 2000 | 625 |
| 3.9 | 1.8 | 87.3 | 2 | 5 | 70.8% | 94.0% | 1370 | 1655 | 285 |
| 3.9 | 0.8 | 87.3 | 0 | 8 | 80.8% | 100.0% | 1370 | 1455 | 85 |
| 4 | 0.7 | 87.3 | 1 | 7 | 74.8% | 100.0% | 1360 | 1470 | 110 |
| 0.4 | 0.3 | 87.3 | 2 | 10 | 24.7% | 100.0% | 1365 | 1555 | 190 |
| 0.5 | 0.2 | 87.3 | 0 | 12 | 30.1% | 100.0% | 1365 | 1525 | 160 |
| 0.6 | 1.1 | 87.3 | 1 | 10 | 36.8% | 100.0% | 1365 | 1465 | 100 |
| 0.7 | 1 | 87.3 | 2 | 9 | 45.7% | 99.2% | 1365 | 1480 | 115 |
| 0.7 | 4 | 87.3 | 0 | 8 | 53.1% | 85.9% | 1375 | 2000 | 625 |
| 0.8 | 3.9 | 87.3 | 1 | 7 | 61.5% | 85.6% | 1370 | 2000 | 630 |
| 0.9 | 2.8 | 87.3 | 2 | 7 | 64.6% | 89.5% | 1365 | 1700 | 335 |
| 1 | 1.6 | 87.4 | 0 | 10 | 60.8% | 100.0% | 1370 | 1500 | 130 |
| 1.1 | 1.5 | 87.4 | 1 | 9 | 75.8% | 99.5% | 1370 | 1435 | 65 |
| 1.1 | 0.5 | 87.4 | 2 | 9 | 55.5% | 100.0% | 1365 | 1495 | 130 |
| 1.2 | 3.4 | 87.4 | 0 | 8 | 88.7% | 89.9% | 1375 | 1960 | 585 |
| 1.3 | 0.3 | 87.4 | 1 | 10 | 56.4% | 100.0% | 1360 | 1485 | 125 |
| 1.4 | 0.2 | 87.4 | 2 | 9 | 44.2% | 100.0% | 1365 | 1500 | 135 |
| 1.5 | 0.1 | 87.4 | 0 | 11 | 61.1% | 100.0% | 1365 | 1470 | 105 |
| 1.6 | 1 | 87.4 | 1 | 9 | 92.3% | 100.0% | 1365 | 1410 | 45 |
| 1.6 | 4 | 87.4 | 2 | 5 | 92.1% | 42.2% | 1370 | 2000 | 630 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.7 | 2.9 | 87.4 | 0 | 8 | 94.2% | 93.5% | 1375 | 1870 | 495 |
| 1.8 | 2.8 | 87.4 | 1 | 7 | 94.9% | 90.0% | 1370 | 1810 | 440 |
| 1.9 | 1.7 | 87.4 | 2 | 7 | 98.8% | 93.6% | 1370 | 1495 | 125 |
| 1.9 | 0.7 | 87.4 | 0 | 10 | 98.0% | 100.0% | 1370 | 1400 | 30 |
| 2 | 0.6 | 87.4 | 1 | 9 | 87.4% | 100.0% | 1360 | 1420 | 60 |
| 2.1 | 2.5 | 87.4 | 0 | 8 | 95.2% | 96.4% | 1375 | 1800 | 425 |
| 2.2 | 2.4 | 87.4 | 1 | 7 | 95.8% | 93.0% | 1370 | 1735 | 365 |
| 2.3 | 1.3 | 87.4 | 2 | 7 | 99.8% | 96.8% | 1370 | 1415 | 45 |
| 2.3 | 3.3 | 87.4 | 0 | 7 | 91.9% | 90.8% | 1375 | 2000 | 625 |
| 2.4 | 3.2 | 87.4 | 1 | 6 | 90.5% | 88.5% | 1375 | 1940 | 565 |
| 2.5 | 2.1 | 87.4 | 2 | 6 | 93.1% | 92.3% | 1370 | 1635 | 265 |
| 2.6 | 2 | 87.4 | 0 | 8 | 93.3% | 98.3% | 1370 | 1705 | 335 |
| 2.7 | 1.9 | 87.4 | 1 | 7 | 91.1% | 96.8% | 1370 | 1645 | 275 |
| 2.7 | 0.9 | 87.4 | 2 | 7 | 94.0% | 100.0% | 1365 | 1415 | 50 |
| 2.8 | 3.8 | 87.4 | 0 | 6 | 81.0% | 87.6% | 1375 | 2000 | 625 |
| 2.9 | 3.7 | 87.4 | 1 | 5 | 78.5% | 87.0% | 1370 | 2000 | 630 |
| 3 | 2.6 | 87.4 | 2 | 5 | 81.9% | 90.6% | 1370 | 1790 | 420 |
| 0.3 | 1.3 | 87.4 | 0 | 11 | 20.1% | 100.0% | 1370 | 1460 | 90 |
| 3.1 | 1.5 | 87.4 | 1 | 7 | 86.7% | 99.7% | 1370 | 1565 | 195 |
| 3.1 | 0.5 | 87.4 | 2 | 7 | 77.8% | 100.0% | 1365 | 1435 | 70 |
| 3.2 | 3.4 | 87.4 | 0 | 6 | 76.7% | 90.4% | 1375 | 2000 | 625 |
| 3.3 | 0.3 | 87.4 | 1 | 8 | 73.6% | 100.0% | 1360 | 1440 | 80 |
| 3.4 | 0.2 | 87.4 | 2 | 7 | 41.4% | 100.0% | 1360 | 1450 | 90 |
| 3.5 | 0.1 | 87.4 | 0 | 9 | 82.4% | 100.0% | 1370 | 1440 | 70 |
| 3.6 | 1 | 87.4 | 1 | 7 | 79.0% | 100.0% | 1360 | 1455 | 95 |
| 3.6 | 4 | 87.4 | 2 | 3 | 67.0% | 42.1% | 1375 | 2000 | 625 |
| 3.7 | 2.9 | 87.4 | 0 | 6 | 71.4% | 93.9% | 1375 | 1985 | 610 |
| 3.8 | 2.8 | 87.4 | 1 | 5 | 69.2% | 90.7% | 1375 | 1930 | 555 |
| 3.9 | 1.7 | 87.4 | 2 | 5 | 71.1% | 94.3% | 1370 | 1620 | 250 |
| 3.9 | 0.7 | 87.4 | 0 | 8 | 81.1% | 100.0% | 1370 | 1455 | 85 |
| 4 | 0.6 | 87.4 | 1 | 7 | 74.6% | 100.0% | 1360 | 1470 | 110 |
| 0.4 | 2.2 | 87.4 | 2 | 8 | 27.9% | 91.5% | 1365 | 1515 | 150 |
| 0.5 | 1.1 | 87.4 | 0 | 11 | 33.9% | 100.0% | 1370 | 1460 | 90 |
| 0.6 | 2 | 87.4 | 1 | 9 | 41.4% | 95.5% | 1370 | 1530 | 160 |
| 0.6 | 0 | 87.4 | 2 | 10 | 23.8% | 100.0% | 1390 | 1570 | 180 |
| 0.7 | 3.9 | 87.4 | 0 | 8 | 53.3% | 86.2% | 1375 | 2000 | 625 |
| 0.8 | 3.8 | 87.4 | 1 | 7 | 61.8% | 86.0% | 1370 | 1985 | 615 |
| 0.9 | 2.7 | 87.4 | 2 | 7 | 64.8% | 89.8% | 1365 | 1670 | 305 |
| 1 | 1.5 | 87.5 | 0 | 10 | 62.8% | 100.0% | 1370 | 1465 | 95 |
| 1.1 | 1.4 | 87.5 | 1 | 9 | 76.1% | 99.9% | 1370 | 1410 | 40 |
| 1.1 | 0.4 | 87.5 | 2 | 9 | 51.4% | 100.0% | 1365 | 1505 | 140 |
| 1.2 | 0.3 | 87.5 | 0 | 11 | 60.2% | 100.0% | 1370 | 1475 | 105 |
| 1.3 | 2.2 | 87.5 | 1 | 8 | 89.5% | 93.8% | 1370 | 1620 | 250 |
| 1.4 | 1.1 | 87.5 | 2 | 8 | 85.3% | 97.7% | 1365 | 1430 | 65 |
| 1.5 | 1 | 87.5 | 0 | 10 | 95.2% | 100.0% | 1370 | 1405 | 35 |
| 1.5 | 0 | 87.5 | 1 | 10 | 56.3% | 100.0% | 1380 | 1500 | 120 |
| 1.6 | 3.9 | 87.5 | 2 | 5 | 92.5% | 42.0% | 1370 | 1995 | 625 |
| 1.7 | 2.8 | 87.5 | 0 | 8 | 94.6% | 93.8% | 1375 | 1840 | 465 |
| 1.8 | 2.7 | 87.5 | 1 | 7 | 95.2% | 90.3% | 1370 | 1775 | 405 |
| 1.9 | 1.6 | 87.5 | 2 | 7 | 99.2% | 94.0% | 1370 | 1465 | 95 |
| 1.9 | 0.6 | 87.5 | 0 | 10 | 93.5% | 100.0% | 1370 | 1410 | 40 |
| 2 | 0.5 | 87.5 | 1 | 9 | 82.4% | 100.0% | 1360 | 1425 | 65 |
| 2.1 | 2.4 | 87.5 | 0 | 8 | 95.5% | 96.7% | 1375 | 1770 | 395 |
| 2.2 | 2.3 | 87.5 | 1 | 7 | 96.2% | 93.3% | 1370 | 1705 | 335 |
| 2.3 | 1.2 | 87.5 | 2 | 7 | 100.0% | 97.1% | 1370 | 1395 | 25 |
| 2.3 | 3.2 | 87.5 | 0 | 7 | 92.3% | 91.1% | 1375 | 1970 | 595 |
| 2.4 | 3.1 | 87.5 | 1 | 6 | 90.8% | 88.8% | 1375 | 1910 | 535 |
| 2.5 | 3 | 87.5 | 2 | 5 | 88.5% | 89.2% | 1370 | 1845 | 475 |
| 2.6 | 1.9 | 87.5 | 0 | 8 | 93.7% | 98.7% | 1370 | 1675 | 305 |
| 2.7 | 1.8 | 87.5 | 1 | 7 | 91.5% | 97.1% | 1370 | 1615 | 245 |
| 2.7 | 0.8 | 87.5 | 2 | 7 | 94.1% | 100.0% | 1365 | 1415 | 50 |
| 2.8 | 3.7 | 87.5 | 0 | 6 | 81.3% | 87.9% | 1375 | 2000 | 625 |
| 2.9 | 3.6 | 87.5 | 1 | 5 | 78.8% | 87.3% | 1370 | 2000 | 630 |
| 3 | 2.5 | 87.5 | 2 | 5 | 82.2% | 91.0% | 1370 | 1760 | 390 |
| 0.3 | 1.2 | 87.5 | 0 | 11 | 20.1% | 100.0% | 1370 | 1470 | 100 |
| 3.1 | 1.4 | 87.5 | 1 | 7 | 87.0% | 100.0% | 1370 | 1530 | 160 |
| 3.1 | 0.4 | 87.5 | 2 | 7 | 66.1% | 100.0% | 1365 | 1435 | 70 |
| 3.2 | 0.3 | 87.5 | 0 | 9 | 91.7% | 100.0% | 1370 | 1425 | 55 |
| 3.3 | 2.2 | 87.5 | 1 | 6 | 79.1% | 94.3% | 1370 | 1750 | 380 |
| 3.4 | 1.1 | 87.5 | 2 | 6 | 82.5% | 98.1% | 1370 | 1450 | 80 |
| 3.5 | 1 | 87.5 | 0 | 8 | 84.9% | 100.0% | 1370 | 1470 | 100 |
| 3.5 | 0 | 87.5 | 1 | 8 | 86.3% | 100.0% | 1380 | 1450 | 70 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.6 | 3.9 | 87.5 | 2 | 3 | 67.2% | 42.3% | 1375 | 2000 | 625 |
| 3.7 | 2.8 | 87.5 | 0 | 6 | 71.7% | 94.1% | 1375 | 1955 | 580 |
| 3.8 | 2.7 | 87.5 | 1 | 5 | 69.5% | 90.9% | 1375 | 1900 | 525 |
| 3.9 | 1.6 | 87.5 | 2 | 5 | 71.4% | 94.6% | 1370 | 1590 | 220 |
| 3.9 | 0.6 | 87.5 | 0 | 8 | 81.1% | 100.0% | 1370 | 1460 | 90 |
| 4 | 0.5 | 87.5 | 1 | 7 | 74.3% | 100.0% | 1360 | 1475 | 115 |
| 0.4 | 2.1 | 87.5 | 2 | 8 | 28.1% | 91.9% | 1365 | 1480 | 115 |
| 0.5 | 2 | 87.5 | 0 | 10 | 37.8% | 99.5% | 1375 | 1565 | 190 |
| 0.6 | 1.9 | 87.5 | 1 | 9 | 41.5% | 95.9% | 1370 | 1500 | 130 |
| 0.6 | 0.9 | 87.5 | 2 | 9 | 39.5% | 99.0% | 1365 | 1500 | 135 |
| 0.7 | 3.8 | 87.5 | 0 | 8 | 53.5% | 86.5% | 1375 | 2000 | 625 |
| 0.8 | 3.7 | 87.5 | 1 | 7 | 62.0% | 86.3% | 1370 | 1950 | 580 |
| 0.9 | 2.6 | 87.5 | 2 | 7 | 65.1% | 90.2% | 1365 | 1640 | 275 |
| 1 | 1.4 | 87.6 | 0 | 10 | 62.9% | 100.0% | 1370 | 1430 | 60 |
| 1.1 | 1.3 | 87.6 | 1 | 9 | 76.3% | 100.0% | 1370 | 1420 | 50 |
| 1.1 | 3.3 | 87.6 | 2 | 6 | 82.1% | 78.2% | 1365 | 1815 | 450 |
| 1.2 | 2.2 | 87.6 | 0 | 9 | 83.3% | 97.7% | 1375 | 1655 | 280 |
| 1.3 | 2.1 | 87.6 | 1 | 8 | 89.8% | 94.1% | 1370 | 1590 | 220 |
| 1.4 | 2 | 87.6 | 2 | 7 | 98.4% | 92.4% | 1370 | 1520 | 150 |
| 1.4 | 0 | 87.6 | 0 | 11 | 60.6% | 100.0% | 1390 | 1490 | 100 |
| 1.5 | 0.9 | 87.6 | 1 | 9 | 84.7% | 100.0% | 1365 | 1430 | 65 |
| 1.6 | 3.8 | 87.6 | 2 | 5 | 92.9% | 41.7% | 1370 | 1965 | 595 |
| 1.7 | 2.7 | 87.6 | 0 | 8 | 94.9% | 94.1% | 1375 | 1810 | 435 |
| 1.8 | 2.6 | 87.6 | 1 | 7 | 95.6% | 90.6% | 1370 | 1745 | 375 |
| 1.9 | 1.5 | 87.6 | 2 | 7 | 99.6% | 94.3% | 1370 | 1430 | 60 |
| 1.9 | 0.5 | 87.6 | 0 | 10 | 89.1% | 100.0% | 1370 | 1420 | 50 |
| 2 | 0.4 | 87.6 | 1 | 9 | 70.9% | 100.0% | 1360 | 1435 | 75 |
| 2.2 | 0.2 | 87.6 | 1 | 9 | 51.5% | 100.0% | 1360 | 1440 | 80 |
| 2.3 | 0.1 | 87.6 | 2 | 8 | 25.8% | 100.0% | 1365 | 1460 | 95 |
| 2.3 | 3.1 | 87.6 | 0 | 7 | 92.6% | 91.4% | 1375 | 1940 | 565 |
| 2.4 | 4 | 87.6 | 1 | 5 | 85.1% | 85.8% | 1370 | 2000 | 630 |
| 2.5 | 2.9 | 87.6 | 2 | 5 | 88.9% | 89.5% | 1370 | 1815 | 445 |
| 2.6 | 1.8 | 87.6 | 0 | 8 | 94.0% | 99.1% | 1370 | 1645 | 275 |
| 2.7 | 1.7 | 87.6 | 1 | 7 | 91.9% | 97.4% | 1370 | 1585 | 215 |
| 2.7 | 0.7 | 87.6 | 2 | 7 | 89.7% | 100.0% | 1365 | 1415 | 50 |
| 2.8 | 3.6 | 87.6 | 0 | 6 | 81.7% | 88.2% | 1375 | 2000 | 625 |
| 3 | 2.4 | 87.6 | 2 | 5 | 82.6% | 91.3% | 1370 | 1730 | 360 |
| 0.3 | 1.1 | 87.6 | 2 | 9 | 19.9% | 96.8% | 1365 | 1510 | 145 |
| 3.1 | 1.3 | 87.6 | 0 | 8 | 89.0% | 99.9% | 1370 | 1535 | 165 |
| 3.2 | 1.2 | 87.6 | 1 | 7 | 85.0% | 100.0% | 1365 | 1475 | 110 |
| 3.2 | 3.2 | 87.6 | 2 | 4 | 75.7% | 66.0% | 1370 | 1930 | 560 |
| 3.3 | 2.1 | 87.6 | 0 | 7 | 80.7% | 97.4% | 1370 | 1760 | 390 |
| 3.4 | 3 | 87.6 | 1 | 5 | 74.4% | 89.4% | 1375 | 1940 | 565 |
| 3.5 | 1.9 | 87.6 | 2 | 5 | 76.5% | 93.1% | 1370 | 1640 | 270 |
| 3.6 | 0.8 | 87.6 | 1 | 7 | 79.6% | 100.0% | 1360 | 1455 | 95 |
| 3.7 | 3.7 | 87.6 | 2 | 3 | 66.8% | 43.5% | 1375 | 2000 | 625 |
| 3.8 | 2.6 | 87.6 | 0 | 6 | 71.0% | 95.2% | 1375 | 1910 | 535 |
| 3.9 | 2.5 | 87.6 | 1 | 5 | 67.7% | 92.0% | 1370 | 1855 | 485 |
| 4 | 1.4 | 87.6 | 2 | 5 | 70.5% | 95.6% | 1370 | 1535 | 165 |
| 4 | 0.4 | 87.6 | 0 | 8 | 79.2% | 100.0% | 1370 | 1465 | 95 |
| 0.4 | 4 | 87.6 | 1 | 7 | 33.6% | 85.2% | 1370 | 1995 | 625 |
| 0.5 | 2.9 | 87.6 | 2 | 7 | 38.3% | 89.0% | 1365 | 1675 | 310 |
| 0.6 | 1.8 | 87.6 | 0 | 10 | 43.1% | 100.0% | 1375 | 1510 | 135 |
| 0.7 | 1.7 | 87.6 | 1 | 9 | 48.5% | 97.0% | 1370 | 1450 | 80 |
| 0.7 | 0.7 | 87.6 | 2 | 9 | 46.1% | 100.0% | 1365 | 1510 | 145 |
| 0.8 | 3.6 | 87.6 | 0 | 8 | 60.9% | 87.5% | 1375 | 1970 | 595 |
| 0.9 | 3.5 | 87.6 | 1 | 7 | 68.9% | 87.0% | 1370 | 1905 | 535 |
| 1 | 2.3 | 87.7 | 2 | 7 | 71.8% | 91.3% | 1365 | 1560 | 195 |
| 1.1 | 1.2 | 87.7 | 0 | 10 | 69.5% | 100.0% | 1370 | 1420 | 50 |
| 1.2 | 0.1 | 87.7 | 1 | 10 | 29.6% | 100.0% | 1360 | 1515 | 155 |
| 1.2 | 3.1 | 87.7 | 2 | 6 | 90.0% | 84.0% | 1365 | 1765 | 400 |
| 1.3 | 3 | 87.7 | 0 | 8 | 94.4% | 91.5% | 1375 | 1850 | 475 |
| 1.4 | 2.9 | 87.7 | 1 | 7 | 95.1% | 89.2% | 1370 | 1785 | 415 |
| 1.5 | 1.8 | 87.7 | 2 | 7 | 99.0% | 93.2% | 1370 | 1475 | 105 |
| 1.6 | 0.7 | 87.7 | 1 | 9 | 79.8% | 100.0% | 1365 | 1440 | 75 |
| 1.7 | 3.6 | 87.7 | 2 | 5 | 93.4% | 47.1% | 1370 | 1920 | 550 |
| 1.8 | 2.5 | 87.7 | 0 | 8 | 95.5% | 95.2% | 1375 | 1760 | 385 |
| 1.9 | 2.4 | 87.7 | 1 | 7 | 96.2% | 91.7% | 1370 | 1700 | 330 |
| 2 | 1.3 | 87.7 | 2 | 7 | 100.0% | 95.4% | 1370 | 1380 | 10 |
| 2 | 3.3 | 87.7 | 0 | 7 | 93.0% | 89.6% | 1375 | 1965 | 590 |
| 2.1 | 2.2 | 87.7 | 1 | 7 | 96.7% | 93.2% | 1370 | 1665 | 295 |
| 2.3 | 1 | 87.7 | 0 | 9 | 100.0% | 100.0% | 1370 | 1395 | 25 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.4 | 3.9 | 87.7 | 2 | 4 | 86.2% | 29.0% | 1370 | 2000 | 630 |
| 2.5 | 2.8 | 87.7 | 0 | 7 | 90.8% | 93.2% | 1375 | 1880 | 505 |
| 2.6 | 2.7 | 87.7 | 1 | 6 | 89.2% | 90.2% | 1375 | 1820 | 445 |
| 2.7 | 1.6 | 87.7 | 2 | 6 | 91.7% | 94.1% | 1370 | 1505 | 135 |
| 2.7 | 0.6 | 87.7 | 0 | 9 | 98.4% | 100.0% | 1370 | 1405 | 35 |
| 2.8 | 0.5 | 87.7 | 1 | 8 | 79.2% | 100.0% | 1360 | 1415 | 55 |
| 2.9 | 3.4 | 87.7 | 2 | 4 | 79.8% | 35.0% | 1370 | 1950 | 580 |
| 3 | 2.3 | 87.7 | 0 | 7 | 85.4% | 96.8% | 1375 | 1790 | 415 |
| 0.3 | 2 | 87.7 | 1 | 9 | 20.9% | 94.1% | 1370 | 1490 | 120 |
| 3.1 | 3.2 | 87.7 | 0 | 6 | 78.7% | 90.6% | 1375 | 2000 | 625 |
| 3.2 | 3.1 | 87.7 | 1 | 5 | 76.0% | 89.0% | 1370 | 1950 | 580 |
| 3.3 | 3 | 87.7 | 2 | 4 | 74.8% | 71.3% | 1370 | 1885 | 515 |
| 3.4 | 1.9 | 87.7 | 0 | 7 | 80.0% | 97.9% | 1370 | 1710 | 340 |
| 3.5 | 1.8 | 87.7 | 1 | 6 | 77.6% | 96.4% | 1370 | 1655 | 285 |
| 3.5 | 0.8 | 87.7 | 2 | 6 | 81.3% | 99.6% | 1370 | 1460 | 90 |
| 3.7 | 3.6 | 87.7 | 1 | 4 | 65.8% | 87.5% | 1370 | 2000 | 630 |
| 3.8 | 2.5 | 87.7 | 2 | 4 | 68.7% | 91.1% | 1370 | 1800 | 430 |
| 3.9 | 1.4 | 87.7 | 0 | 7 | 75.1% | 98.7% | 1370 | 1605 | 235 |
| 0.4 | 3.9 | 87.7 | 0 | 8 | 31.6% | 85.5% | 1375 | 2000 | 625 |
| 0.5 | 3.8 | 87.7 | 1 | 7 | 41.7% | 85.9% | 1370 | 1945 | 575 |
| 0.6 | 2.7 | 87.7 | 2 | 7 | 46.2% | 89.7% | 1365 | 1625 | 260 |
| 0.7 | 1.6 | 87.7 | 0 | 10 | 44.6% | 100.0% | 1370 | 1460 | 90 |
| 0.8 | 1.5 | 87.7 | 1 | 9 | 55.6% | 98.2% | 1370 | 1430 | 60 |
| 0.9 | 3.4 | 87.7 | 0 | 8 | 68.3% | 88.6% | 1375 | 1920 | 545 |
| 1 | 2.2 | 87.8 | 1 | 8 | 70.7% | 92.4% | 1370 | 1580 | 210 |
| 1.1 | 1.1 | 87.8 | 2 | 8 | 77.1% | 96.2% | 1370 | 1455 | 85 |
| 1.3 | 3.9 | 87.8 | 2 | 5 | 93.0% | 16.2% | 1370 | 1955 | 585 |
| 1.5 | 2.7 | 87.8 | 1 | 7 | 95.7% | 90.0% | 1370 | 1740 | 370 |
| 1.6 | 1.6 | 87.8 | 2 | 7 | 99.7% | 93.9% | 1370 | 1425 | 55 |
| 1.6 | 0.6 | 87.8 | 0 | 10 | 82.4% | 100.0% | 1370 | 1435 | 65 |
| 1.8 | 3.4 | 87.8 | 2 | 5 | 94.0% | 52.6% | 1370 | 1870 | 500 |
| 2 | 0.2 | 87.8 | 1 | 9 | 44.9% | 100.0% | 1360 | 1460 | 100 |
| 2.1 | 1.1 | 87.8 | 0 | 9 | 99.9% | 100.0% | 1370 | 1405 | 35 |
| 2.2 | 2 | 87.8 | 1 | 7 | 97.3% | 94.3% | 1370 | 1615 | 245 |
| 2.3 | 3.9 | 87.8 | 0 | 6 | 88.0% | 86.2% | 1375 | 2000 | 625 |
| 2.4 | 3.8 | 87.8 | 1 | 5 | 85.8% | 86.5% | 1370 | 2000 | 630 |
| 2.5 | 2.7 | 87.8 | 2 | 5 | 89.6% | 90.2% | 1370 | 1755 | 385 |
| 2.7 | 1.5 | 87.8 | 1 | 7 | 92.6% | 98.1% | 1370 | 1520 | 150 |
| 2.8 | 3.4 | 87.8 | 0 | 6 | 82.3% | 88.8% | 1375 | 2000 | 625 |
| 2.9 | 0.3 | 87.8 | 1 | 8 | 59.5% | 100.0% | 1360 | 1420 | 60 |
| 3 | 0.2 | 87.8 | 2 | 7 | 37.1% | 100.0% | 1365 | 1430 | 65 |
| 0.3 | 1.9 | 87.8 | 0 | 10 | 23.0% | 99.1% | 1375 | 1505 | 130 |
| 3.2 | 3 | 87.8 | 0 | 6 | 77.9% | 91.6% | 1375 | 1960 | 585 |
| 3.3 | 2.9 | 87.8 | 1 | 5 | 76.2% | 89.7% | 1375 | 1905 | 530 |
| 3.4 | 0.8 | 87.8 | 0 | 8 | 86.8% | 100.0% | 1370 | 1440 | 70 |
| 3.5 | 0.7 | 87.8 | 1 | 7 | 80.7% | 100.0% | 1360 | 1455 | 95 |
| 3.6 | 3.6 | 87.8 | 2 | 3 | 67.8% | 42.9% | 1375 | 2000 | 625 |
| 3.7 | 2.5 | 87.8 | 0 | 6 | 72.6% | 95.1% | 1375 | 1870 | 495 |
| 3.8 | 2.4 | 87.8 | 1 | 5 | 70.4% | 91.8% | 1375 | 1815 | 440 |
| 3.9 | 1.3 | 87.8 | 2 | 5 | 72.3% | 95.5% | 1370 | 1495 | 125 |
| 3.9 | 3.3 | 87.8 | 0 | 5 | 65.4% | 89.8% | 1375 | 2000 | 625 |
| 4 | 3.2 | 87.8 | 1 | 4 | 62.7% | 88.9% | 1370 | 2000 | 630 |
| 0.4 | 3.8 | 87.8 | 2 | 6 | 29.5% | 36.2% | 1365 | 1870 | 505 |
| 0.5 | 2.7 | 87.8 | 0 | 9 | 37.4% | 93.1% | 1375 | 1720 | 345 |
| 0.6 | 2.6 | 87.8 | 1 | 8 | 43.7% | 90.1% | 1370 | 1650 | 280 |
| 0.7 | 1.5 | 87.8 | 2 | 8 | 53.2% | 94.2% | 1370 | 1450 | 80 |
| 0.7 | 0.5 | 87.8 | 0 | 11 | 47.7% | 100.0% | 1370 | 1500 | 130 |
| 0.8 | 0.4 | 87.8 | 1 | 10 | 43.6% | 100.0% | 1365 | 1515 | 150 |
| 0.9 | 0.3 | 87.8 | 2 | 9 | 40.5% | 100.0% | 1365 | 1535 | 170 |
| 1 | 1.1 | 87.9 | 0 | 10 | 63.5% | 100.0% | 1370 | 1435 | 65 |
| 1.1 | 2 | 87.9 | 1 | 8 | 77.6% | 93.5% | 1370 | 1535 | 165 |
| 1.2 | 3.9 | 87.9 | 0 | 7 | 91.9% | 85.8% | 1375 | 2000 | 625 |
| 1.3 | 3.8 | 87.9 | 1 | 6 | 92.6% | 86.1% | 1370 | 1980 | 610 |
| 1.4 | 2.7 | 87.9 | 2 | 6 | 96.4% | 89.9% | 1365 | 1670 | 305 |
| 1.6 | 1.5 | 87.9 | 1 | 8 | 99.5% | 97.5% | 1370 | 1440 | 70 |
| 1.6 | 0.5 | 87.9 | 2 | 8 | 67.0% | 100.0% | 1365 | 1475 | 110 |
| 1.7 | 3.4 | 87.9 | 0 | 7 | 93.0% | 88.0% | 1375 | 1960 | 585 |
| 1.8 | 0.3 | 87.9 | 1 | 9 | 52.7% | 100.0% | 1360 | 1465 | 105 |
| 1.9 | 0.2 | 87.9 | 2 | 8 | 33.6% | 100.0% | 1365 | 1480 | 115 |
| 2 | 0.1 | 87.9 | 0 | 10 | 73.6% | 100.0% | 1370 | 1450 | 80 |
| 0.2 | 1.9 | 87.9 | 0 | 10 | 15.2% | 98.7% | 1375 | 1490 | 115 |
| 2.1 | 2 | 87.9 | 2 | 6 | 98.0% | 92.6% | 1370 | 1550 | 180 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.1 | 0 | 87.9 | 0 | 10 | 84.1% | 100.0% | 1395 | 1455 | 60 |
| 2.2 | 0.9 | 87.9 | 1 | 8 | 100.0% | 100.0% | 1370 | 1390 | 20 |
| 2.3 | 3.8 | 87.9 | 2 | 4 | 88.2% | 28.0% | 1370 | 1990 | 620 |
| 2.4 | 2.7 | 87.9 | 0 | 7 | 92.6% | 93.1% | 1375 | 1835 | 460 |
| 2.5 | 2.6 | 87.9 | 1 | 6 | 91.1% | 90.5% | 1375 | 1775 | 400 |
| 2.6 | 1.5 | 87.9 | 2 | 6 | 93.8% | 94.4% | 1370 | 1460 | 90 |
| 2.6 | 0.5 | 87.9 | 0 | 9 | 99.6% | 100.0% | 1370 | 1400 | 30 |
| 2.7 | 0.4 | 87.9 | 1 | 8 | 65.1% | 100.0% | 1360 | 1410 | 50 |
| 2.8 | 0.3 | 87.9 | 2 | 7 | 46.1% | 100.0% | 1365 | 1415 | 50 |
| 2.9 | 0.2 | 87.9 | 0 | 9 | 91.2% | 100.0% | 1370 | 1415 | 45 |
| 3 | 1.1 | 87.9 | 1 | 7 | 89.6% | 100.0% | 1370 | 1430 | 60 |
| 0.3 | 1.8 | 87.9 | 2 | 8 | 21.6% | 93.0% | 1365 | 1455 | 90 |
| 0.3 | 0.8 | 87.9 | 0 | 11 | 20.0% | 100.0% | 1370 | 1510 | 140 |
| 3.1 | 4 | 87.9 | 1 | 4 | 73.5% | 68.6% | 1370 | 2000 | 630 |
| 3.2 | 2.9 | 87.9 | 2 | 4 | 76.7% | 65.4% | 1370 | 1845 | 475 |
| 3.3 | 1.8 | 87.9 | 0 | 7 | 81.7% | 98.5% | 1370 | 1670 | 300 |
| 3.4 | 1.7 | 87.9 | 1 | 6 | 79.3% | 96.3% | 1370 | 1610 | 240 |
| 3.4 | 0.7 | 87.9 | 2 | 6 | 82.8% | 99.5% | 1370 | 1455 | 85 |
| 3.5 | 3.6 | 87.9 | 0 | 5 | 70.0% | 87.5% | 1375 | 2000 | 625 |
| 3.6 | 3.5 | 87.9 | 1 | 4 | 67.6% | 87.8% | 1370 | 2000 | 630 |
| 3.7 | 2.4 | 87.9 | 2 | 4 | 70.5% | 91.5% | 1370 | 1755 | 385 |
| 3.8 | 1.3 | 87.9 | 0 | 7 | 76.7% | 99.3% | 1370 | 1560 | 190 |
| 3.9 | 1.2 | 87.9 | 1 | 6 | 73.8% | 100.0% | 1370 | 1500 | 130 |
| 3.9 | 3.2 | 87.9 | 2 | 3 | 64.2% | 46.2% | 1370 | 1955 | 585 |
| 4 | 2.1 | 87.9 | 0 | 6 | 68.8% | 96.9% | 1370 | 1785 | 415 |
| 0.4 | 3.7 | 87.9 | 1 | 7 | 33.9% | 86.2% | 1370 | 1900 | 530 |
| 0.5 | 2.6 | 87.9 | 2 | 7 | 38.7% | 90.1% | 1365 | 1580 | 215 |
| 0.6 | 1.5 | 87.9 | 0 | 10 | 42.8% | 100.0% | 1375 | 1435 | 60 |
| 0.7 | 1.4 | 87.9 | 1 | 9 | 49.0% | 98.1% | 1370 | 1445 | 75 |
| 0.7 | 0.4 | 87.9 | 2 | 9 | 37.4% | 100.0% | 1365 | 1540 | 175 |
| 0.8 | 0.3 | 87.9 | 0 | 11 | 43.9% | 100.0% | 1370 | 1510 | 140 |
| 0.9 | 2.2 | 87.9 | 1 | 8 | 64.3% | 92.0% | 1370 | 1570 | 200 |
| 1 | 2 | 88 | 2 | 7 | 72.7% | 92.4% | 1365 | 1465 | 100 |
| 1 | 0 | 88 | 0 | 11 | 42.9% | 100.0% | 1390 | 1520 | 130 |
| 1.1 | 0.9 | 88 | 1 | 9 | 72.5% | 100.0% | 1370 | 1460 | 90 |
| 1.2 | 3.8 | 88 | 2 | 5 | 93.5% | 15.0% | 1370 | 1910 | 540 |
| 1.3 | 2.7 | 88 | 0 | 8 | 95.5% | 92.5% | 1375 | 1760 | 385 |
| 1.4 | 2.6 | 88 | 1 | 7 | 96.2% | 90.3% | 1370 | 1695 | 325 |
| 1.5 | 1.5 | 88 | 2 | 7 | 100.0% | 94.3% | 1370 | 1395 | 25 |
| 1.5 | 0.5 | 88 | 0 | 10 | 74.2% | 100.0% | 1370 | 1455 | 85 |
| 1.6 | 0.4 | 88 | 1 | 9 | 67.4% | 100.0% | 1365 | 1470 | 105 |
| 1.7 | 0.3 | 88 | 2 | 8 | 44.0% | 100.0% | 1365 | 1485 | 120 |
| 1.8 | 0.2 | 88 | 0 | 10 | 72.1% | 100.0% | 1370 | 1460 | 90 |
| 1.9 | 1.1 | 88 | 1 | 8 | 100.0% | 100.0% | 1370 | 1395 | 25 |
| 2 | 1 | 88 | 2 | 7 | 97.0% | 96.4% | 1370 | 1405 | 35 |
| 2 | 4 | 88 | 0 | 6 | 91.1% | 85.7% | 1375 | 2000 | 625 |
| 2.1 | 1.9 | 88 | 1 | 7 | 97.8% | 94.2% | 1370 | 1570 | 200 |
| 2.1 | 0.9 | 88 | 2 | 7 | 96.2% | 97.2% | 1370 | 1410 | 40 |
| 2.2 | 3.8 | 88 | 0 | 6 | 89.9% | 86.4% | 1375 | 2000 | 625 |
| 2.3 | 3.7 | 88 | 1 | 5 | 87.7% | 86.8% | 1370 | 2000 | 630 |
| 2.4 | 2.6 | 88 | 2 | 5 | 91.6% | 86.6% | 1370 | 1710 | 340 |
| 2.5 | 1.5 | 88 | 0 | 8 | 96.6% | 100.0% | 1370 | 1535 | 165 |
| 2.6 | 1.4 | 88 | 1 | 7 | 94.6% | 98.0% | 1370 | 1475 | 105 |
| 2.6 | 0.4 | 88 | 2 | 7 | 54.2% | 100.0% | 1365 | 1420 | 55 |
| 2.7 | 0.3 | 88 | 0 | 9 | 95.2% | 100.0% | 1370 | 1405 | 35 |
| 2.8 | 2.2 | 88 | 1 | 6 | 86.6% | 92.2% | 1370 | 1695 | 325 |
| 2.9 | 1.1 | 88 | 2 | 6 | 90.1% | 95.9% | 1370 | 1430 | 60 |
| 3 | 1 | 88 | 0 | 8 | 91.4% | 100.0% | 1370 | 1425 | 55 |
| 3 | 0 | 88 | 1 | 8 | 73.5% | 100.0% | 1385 | 1425 | 40 |
| 0.3 | 3.7 | 88 | 2 | 6 | 22.1% | 29.6% | 1365 | 1825 | 460 |
| 3.1 | 2.9 | 88 | 0 | 6 | 79.7% | 91.5% | 1375 | 1920 | 545 |
| 3.2 | 2.8 | 88 | 1 | 5 | 76.9% | 90.0% | 1370 | 1860 | 490 |
| 3.3 | 1.7 | 88 | 2 | 5 | 80.3% | 93.8% | 1370 | 1555 | 185 |
| 3.3 | 0.7 | 88 | 0 | 8 | 87.7% | 100.0% | 1370 | 1440 | 70 |
| 3.4 | 0.6 | 88 | 1 | 7 | 80.2% | 100.0% | 1360 | 1450 | 90 |
| 3.5 | 3.5 | 88 | 2 | 3 | 66.0% | 43.1% | 1370 | 1990 | 620 |
| 3.6 | 2.4 | 88 | 0 | 6 | 74.3% | 95.0% | 1375 | 1830 | 455 |
| 3.7 | 2.3 | 88 | 1 | 5 | 72.2% | 91.8% | 1375 | 1775 | 400 |
| 3.8 | 1.2 | 88 | 2 | 5 | 74.2% | 95.7% | 1370 | 1475 | 105 |
| 3.8 | 3.2 | 88 | 0 | 5 | 67.0% | 89.6% | 1375 | 2000 | 625 |
| 3.9 | 3.1 | 88 | 1 | 4 | 64.4% | 89.2% | 1370 | 1970 | 600 |
| 4 | 3 | 88 | 2 | 3 | 63.3% | 47.5% | 1370 | 1910 | 540 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.4 | 1.6 | 88 | 0 | 10 | 30.2% | 100.0% | 1375 | 1440 | 65 |
| 0.5 | 1.5 | 88 | 1 | 9 | 35.2% | 96.8% | 1370 | 1455 | 85 |
| 0.5 | 0.5 | 88 | 2 | 9 | 33.6% | 100.0% | 1365 | 1550 | 185 |
| 0.6 | 3.4 | 88 | 0 | 8 | 47.1% | 87.3% | 1375 | 1885 | 510 |
| 0.7 | 0.3 | 88 | 1 | 10 | 35.6% | 100.0% | 1365 | 1535 | 170 |
| 0.8 | 0.2 | 88 | 2 | 9 | 31.7% | 100.0% | 1365 | 1550 | 185 |
| 0.9 | 0.1 | 88 | 0 | 11 | 38.7% | 100.0% | 1370 | 1520 | 150 |
| 1 | 1.9 | 88.1 | 1 | 8 | 71.5% | 93.4% | 1370 | 1490 | 120 |
| 1 | 0.9 | 88.1 | 2 | 8 | 65.6% | 96.6% | 1370 | 1485 | 115 |
| 1.1 | 3.8 | 88.1 | 0 | 7 | 89.2% | 86.1% | 1375 | 2000 | 625 |
| 1.2 | 3.7 | 88.1 | 1 | 6 | 93.2% | 86.4% | 1370 | 1935 | 565 |
| 1.3 | 2.6 | 88.1 | 2 | 6 | 97.0% | 89.4% | 1365 | 1625 | 260 |
| 1.4 | 1.5 | 88.1 | 0 | 9 | 95.6% | 100.0% | 1375 | 1460 | 85 |
| 1.5 | 1.4 | 88.1 | 1 | 8 | 100.0% | 97.4% | 1370 | 1395 | 25 |
| 1.5 | 0.4 | 88.1 | 2 | 8 | 53.3% | 100.0% | 1365 | 1490 | 125 |
| 1.6 | 0.3 | 88.1 | 0 | 10 | 69.1% | 100.0% | 1370 | 1465 | 95 |
| 1.7 | 2.2 | 88.1 | 1 | 7 | 97.3% | 91.8% | 1370 | 1610 | 240 |
| 1.8 | 1.1 | 88.1 | 2 | 7 | 94.7% | 95.8% | 1370 | 1410 | 40 |
| 1.9 | 1 | 88.1 | 0 | 9 | 100.0% | 100.0% | 1370 | 1390 | 20 |
| 1.9 | 0 | 88.1 | 1 | 9 | 61.7% | 100.0% | 1385 | 1485 | 100 |
| 2 | 3.9 | 88.1 | 2 | 4 | 91.0% | 24.5% | 1370 | 1980 | 610 |
| 0.2 | 3.7 | 88.1 | 0 | 8 | 16.3% | 86.1% | 1375 | 1925 | 550 |
| 2.1 | 0.8 | 88.1 | 1 | 8 | 96.4% | 100.0% | 1370 | 1405 | 35 |
| 2.2 | 3.7 | 88.1 | 2 | 4 | 90.2% | 26.9% | 1370 | 1950 | 580 |
| 2.3 | 2.6 | 88.1 | 0 | 7 | 94.5% | 93.0% | 1375 | 1795 | 420 |
| 2.4 | 2.5 | 88.1 | 1 | 6 | 91.7% | 90.9% | 1370 | 1735 | 365 |
| 2.5 | 1.4 | 88.1 | 2 | 6 | 95.8% | 94.8% | 1370 | 1415 | 45 |
| 2.5 | 0.4 | 88.1 | 0 | 9 | 98.6% | 100.0% | 1370 | 1400 | 30 |
| 2.6 | 3.3 | 88.1 | 1 | 5 | 84.4% | 88.2% | 1370 | 1935 | 565 |
| 2.7 | 2.2 | 88.1 | 2 | 5 | 88.2% | 92.0% | 1370 | 1630 | 260 |
| 2.8 | 1.1 | 88.1 | 0 | 8 | 93.8% | 100.0% | 1370 | 1435 | 65 |
| 2.9 | 2 | 88.1 | 1 | 6 | 85.8% | 93.2% | 1370 | 1645 | 275 |
| 2.9 | 0 | 88.1 | 2 | 7 | 97.2% | 100.0% | 1400 | 1435 | 35 |
| 3 | 3.9 | 88.1 | 0 | 5 | 76.2% | 86.4% | 1375 | 2000 | 625 |
| 0.3 | 3.6 | 88.1 | 1 | 7 | 25.5% | 86.5% | 1370 | 1855 | 485 |
| 3.1 | 2.8 | 88.1 | 2 | 4 | 78.7% | 59.4% | 1370 | 1800 | 430 |
| 3.2 | 1.7 | 88.1 | 0 | 7 | 83.4% | 99.1% | 1370 | 1630 | 260 |
| 3.3 | 1.6 | 88.1 | 1 | 6 | 81.2% | 96.2% | 1370 | 1565 | 195 |
| 3.3 | 0.6 | 88.1 | 2 | 6 | 78.1% | 99.4% | 1370 | 1450 | 80 |
| 3.4 | 3.5 | 88.1 | 0 | 5 | 71.7% | 87.8% | 1375 | 2000 | 625 |
| 3.5 | 3.4 | 88.1 | 1 | 4 | 69.4% | 88.1% | 1370 | 2000 | 630 |
| 3.6 | 2.3 | 88.1 | 2 | 4 | 72.4% | 87.2% | 1370 | 1715 | 345 |
| 3.7 | 1.2 | 88.1 | 0 | 7 | 78.3% | 99.9% | 1370 | 1520 | 150 |
| 3.8 | 0.1 | 88.1 | 1 | 7 | 34.9% | 100.0% | 1360 | 1470 | 110 |
| 3.8 | 3.1 | 88.1 | 2 | 3 | 67.1% | 45.3% | 1375 | 1915 | 540 |
| 3.9 | 3 | 88.1 | 0 | 5 | 66.2% | 90.6% | 1375 | 1985 | 610 |
| 4 | 2.9 | 88.1 | 1 | 4 | 63.5% | 89.9% | 1370 | 1925 | 555 |
| 0.4 | 1.5 | 88.1 | 2 | 8 | 28.8% | 94.2% | 1365 | 1475 | 110 |
| 0.4 | 0.5 | 88.1 | 0 | 11 | 26.8% | 100.0% | 1370 | 1525 | 155 |
| 0.5 | 0.4 | 88.1 | 1 | 10 | 33.1% | 100.0% | 1370 | 1545 | 175 |
| 0.6 | 0.3 | 88.1 | 2 | 9 | 29.9% | 100.0% | 1365 | 1560 | 195 |
| 0.7 | 0.2 | 88.1 | 0 | 11 | 35.2% | 100.0% | 1370 | 1530 | 160 |
| 0.8 | 1.1 | 88.1 | 2 | 8 | 60.9% | 95.8% | 1370 | 1480 | 110 |
| 0.9 | 1 | 88.1 | 0 | 10 | 57.4% | 100.0% | 1370 | 1455 | 85 |
| 1 | 3.8 | 88.2 | 2 | 5 | 79.5% | 12.6% | 1370 | 1880 | 510 |
| 1.1 | 2.7 | 88.2 | 0 | 8 | 84.0% | 91.6% | 1375 | 1735 | 360 |
| 1.2 | 2.6 | 88.2 | 1 | 7 | 90.2% | 90.2% | 1370 | 1665 | 295 |
| 1.3 | 1.5 | 88.2 | 2 | 7 | 94.5% | 94.3% | 1370 | 1410 | 40 |
| 1.3 | 0.5 | 88.2 | 0 | 10 | 66.8% | 100.0% | 1370 | 1470 | 100 |
| 1.4 | 0.4 | 88.2 | 1 | 9 | 62.0% | 100.0% | 1370 | 1485 | 115 |
| 1.5 | 0.3 | 88.2 | 2 | 8 | 40.6% | 100.0% | 1365 | 1505 | 140 |
| 1.6 | 0.2 | 88.2 | 0 | 10 | 64.7% | 100.0% | 1370 | 1475 | 105 |
| 1.8 | 1 | 88.2 | 0 | 9 | 99.6% | 100.0% | 1370 | 1400 | 30 |
| 1.8 | 0 | 88.2 | 1 | 9 | 65.1% | 100.0% | 1390 | 1495 | 105 |
| 1.9 | 3.9 | 88.2 | 2 | 4 | 91.3% | 23.4% | 1370 | 1965 | 595 |
| 2 | 2.8 | 88.2 | 0 | 7 | 94.8% | 91.1% | 1375 | 1820 | 445 |
| 0.2 | 2.6 | 88.2 | 0 | 9 | 15.0% | 92.1% | 1375 | 1650 | 275 |
| 2.1 | 3.7 | 88.2 | 1 | 5 | 90.9% | 80.1% | 1370 | 1990 | 620 |
| 2.2 | 2.6 | 88.2 | 2 | 5 | 95.0% | 74.7% | 1370 | 1685 | 315 |
| 2.3 | 1.5 | 88.2 | 0 | 8 | 98.7% | 100.0% | 1375 | 1515 | 140 |
| 2.4 | 1.4 | 88.2 | 1 | 7 | 97.7% | 97.1% | 1370 | 1450 | 80 |
| 2.4 | 0.4 | 88.2 | 2 | 7 | 58.4% | 100.0% | 1370 | 1435 | 65 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.5 | 0.3 | 88.2 | 0 | 9 | 86.9% | 100.0% | 1370 | 1410 | 40 |
| 2.6 | 2.2 | 88.2 | 1 | 6 | 91.0% | 91.9% | 1375 | 1670 | 295 |
| 2.7 | 1.1 | 88.2 | 2 | 6 | 93.1% | 95.9% | 1370 | 1420 | 50 |
| 2.8 | 1 | 88.2 | 0 | 8 | 94.2% | 100.0% | 1370 | 1415 | 45 |
| 2.8 | 0 | 88.2 | 1 | 8 | 61.5% | 100.0% | 1385 | 1430 | 45 |
| 2.9 | 3.9 | 88.2 | 2 | 3 | 67.7% | 41.9% | 1370 | 2000 | 630 |
| 3 | 2.8 | 88.2 | 1 | 6 | 81.5% | 91.4% | 1375 | 1880 | 505 |
| 3 | 2.8 | 88.2 | 0 | 6 | 81.5% | 91.4% | 1375 | 1880 | 505 |
| 0.3 | 2.5 | 88.2 | 1 | 8 | 22.9% | 90.4% | 1370 | 1580 | 210 |
| 3.1 | 1.7 | 88.2 | 2 | 5 | 83.5% | 93.8% | 1370 | 1530 | 160 |
| 3.2 | 0.6 | 88.2 | 1 | 7 | 83.2% | 100.0% | 1365 | 1440 | 75 |
| 3.3 | 3.5 | 88.2 | 2 | 3 | 66.8% | 43.0% | 1370 | 1970 | 600 |
| 3.4 | 2.4 | 88.2 | 0 | 6 | 77.0% | 94.2% | 1375 | 1810 | 435 |
| 3.5 | 2.3 | 88.2 | 1 | 5 | 75.2% | 91.8% | 1375 | 1750 | 375 |
| 3.6 | 1.2 | 88.2 | 2 | 5 | 77.3% | 95.6% | 1370 | 1470 | 100 |
| 3.6 | 3.2 | 88.2 | 0 | 5 | 69.8% | 88.8% | 1375 | 2000 | 625 |
| 3.7 | 3.1 | 88.2 | 1 | 4 | 67.3% | 89.1% | 1370 | 1950 | 580 |
| 3.8 | 3 | 88.2 | 2 | 3 | 67.4% | 45.4% | 1375 | 1885 | 510 |
| 3.9 | 1.9 | 88.2 | 0 | 6 | 71.7% | 97.7% | 1375 | 1715 | 340 |
| 4 | 0.8 | 88.2 | 2 | 5 | 71.9% | 97.6% | 1370 | 1485 | 115 |
| 0.5 | 0.3 | 88.2 | 1 | 10 | 28.8% | 100.0% | 1370 | 1555 | 185 |
| 0.6 | 0.2 | 88.2 | 2 | 9 | 26.2% | 100.0% | 1365 | 1570 | 205 |
| 0.7 | 1.1 | 88.2 | 1 | 9 | 49.5% | 99.1% | 1370 | 1475 | 105 |
| 0.8 | 1 | 88.2 | 2 | 8 | 61.1% | 96.1% | 1370 | 1490 | 120 |
| 0.8 | 4 | 88.2 | 0 | 7 | 68.3% | 85.3% | 1375 | 2000 | 625 |
| 0.9 | 3.9 | 88.2 | 1 | 6 | 75.4% | 80.2% | 1370 | 1960 | 590 |
| 1 | 2.7 | 88.3 | 2 | 6 | 75.9% | 71.1% | 1365 | 1610 | 245 |
| 1.1 | 1.6 | 88.3 | 0 | 9 | 81.5% | 99.3% | 1375 | 1455 | 80 |
| 1.2 | 1.5 | 88.3 | 1 | 8 | 85.4% | 95.7% | 1370 | 1410 | 40 |
| 1.2 | 0.5 | 88.3 | 2 | 8 | 56.3% | 98.8% | 1370 | 1505 | 135 |
| 1.4 | 0.3 | 88.3 | 1 | 9 | 57.9% | 100.0% | 1370 | 1495 | 125 |
| 1.5 | 0.2 | 88.3 | 2 | 8 | 26.8% | 100.0% | 1365 | 1515 | 150 |
| 1.6 | 1.1 | 88.3 | 1 | 8 | 92.2% | 98.9% | 1370 | 1415 | 45 |
| 1.7 | 1 | 88.3 | 2 | 7 | 87.7% | 96.2% | 1370 | 1430 | 60 |
| 1.7 | 4 | 88.3 | 0 | 6 | 91.5% | 85.6% | 1375 | 2000 | 625 |
| 1.8 | 3.9 | 88.3 | 1 | 5 | 92.3% | 63.4% | 1370 | 2000 | 630 |
| 2 | 1.7 | 88.3 | 0 | 8 | 98.3% | 98.7% | 1375 | 1540 | 165 |
| 0.2 | 1.5 | 88.3 | 0 | 10 | 15.4% | 100.0% | 1375 | 1470 | 95 |
| 2.1 | 2.6 | 88.3 | 1 | 6 | 95.9% | 90.4% | 1370 | 1725 | 355 |
| 2.3 | 0.4 | 88.3 | 1 | 8 | 62.2% | 100.0% | 1365 | 1430 | 65 |
| 2.4 | 0.3 | 88.3 | 2 | 7 | 45.3% | 100.0% | 1370 | 1445 | 75 |
| 2.5 | 0.2 | 88.3 | 0 | 9 | 73.4% | 100.0% | 1370 | 1420 | 50 |
| 2.6 | 1.1 | 88.3 | 1 | 7 | 95.4% | 99.0% | 1370 | 1415 | 45 |
| 2.7 | 1 | 88.3 | 2 | 6 | 93.3% | 96.3% | 1370 | 1420 | 50 |
| 2.8 | 3.9 | 88.3 | 1 | 4 | 78.4% | 33.4% | 1370 | 2000 | 630 |
| 2.9 | 2.8 | 88.3 | 2 | 4 | 81.9% | 35.6% | 1370 | 1775 | 405 |
| 3 | 1.7 | 88.3 | 0 | 7 | 87.5% | 98.7% | 1375 | 1605 | 230 |
| 3.1 | 3.6 | 88.3 | 0 | 5 | 75.7% | 87.4% | 1375 | 2000 | 625 |
| 3.3 | 2.4 | 88.3 | 2 | 4 | 76.8% | 70.1% | 1370 | 1710 | 340 |
| 3.4 | 1.3 | 88.3 | 0 | 7 | 82.0% | 100.0% | 1370 | 1520 | 150 |
| 3.5 | 1.2 | 88.3 | 1 | 6 | 79.6% | 98.4% | 1370 | 1460 | 90 |
| 3.6 | 2.1 | 88.3 | 0 | 6 | 75.2% | 95.9% | 1375 | 1745 | 370 |
| 3.8 | 1.9 | 88.3 | 2 | 4 | 70.5% | 93.2% | 1370 | 1620 | 250 |
| 3.9 | 0.8 | 88.3 | 1 | 6 | 74.8% | 100.0% | 1370 | 1480 | 110 |
| 4 | 3.7 | 88.3 | 2 | 2 | 44.5% | 60.0% | 1370 | 2000 | 630 |
| 0.5 | 0.2 | 88.3 | 1 | 10 | 24.7% | 100.0% | 1370 | 1565 | 195 |
| 0.6 | 0.1 | 88.3 | 0 | 11 | 26.6% | 100.0% | 1370 | 1545 | 175 |
| 0.7 | 1 | 88.3 | 1 | 9 | 49.7% | 99.5% | 1370 | 1485 | 115 |
| 0.8 | 2.9 | 88.3 | 0 | 8 | 62.5% | 89.7% | 1375 | 1755 | 380 |
| 1 | 1.6 | 88.4 | 2 | 7 | 73.9% | 93.9% | 1365 | 1425 | 60 |
| 1 | 0.6 | 88.4 | 0 | 10 | 60.1% | 100.0% | 1370 | 1485 | 115 |
| 1.1 | 0.5 | 88.4 | 1 | 9 | 55.7% | 100.0% | 1370 | 1500 | 130 |
| 1.2 | 3.4 | 88.4 | 2 | 5 | 95.0% | 15.2% | 1370 | 1785 | 415 |
| 1.5 | 0.1 | 88.4 | 0 | 10 | 50.1% | 100.0% | 1370 | 1495 | 125 |
| 1.6 | 1 | 88.4 | 1 | 8 | 88.2% | 99.2% | 1370 | 1425 | 55 |
| 1.7 | 2.9 | 88.4 | 0 | 7 | 94.8% | 89.6% | 1375 | 1810 | 435 |
| 1.8 | 2.8 | 88.4 | 1 | 6 | 95.6% | 89.7% | 1370 | 1745 | 375 |
| 1.9 | 1.7 | 88.4 | 2 | 6 | 99.5% | 93.6% | 1365 | 1430 | 65 |
| 1.9 | 0.7 | 88.4 | 0 | 9 | 90.4% | 100.0% | 1370 | 1420 | 50 |
| 2 | 0.6 | 88.4 | 1 | 8 | 85.1% | 100.0% | 1370 | 1435 | 65 |
| 2.1 | 1.5 | 88.4 | 1 | 7 | 99.4% | 95.5% | 1370 | 1445 | 75 |
| 2.1 | 0.5 | 88.4 | 2 | 7 | 65.1% | 98.6% | 1370 | 1450 | 80 |
| 2.2 | 3.4 | 88.4 | 0 | 6 | 91.3% | 87.8% | 1375 | 1960 | 585 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.3 | 0.3 | 88.4 | 1 | 8 | 49.7% | 100.0% | 1365 | 1440 | 75 |
| 2.4 | 0.2 | 88.4 | 2 | 7 | 31.0% | 100.0% | 1370 | 1455 | 85 |
| 2.5 | 0.1 | 88.4 | 0 | 9 | 58.2% | 100.0% | 1370 | 1430 | 60 |
| 2.6 | 1 | 88.4 | 1 | 7 | 95.4% | 99.3% | 1370 | 1415 | 45 |
| 2.6 | 4 | 88.4 | 2 | 3 | 68.9% | 41.4% | 1370 | 2000 | 630 |
| 2.7 | 2.9 | 88.4 | 0 | 6 | 85.5% | 89.8% | 1375 | 1875 | 500 |
| 2.8 | 2.8 | 88.4 | 1 | 5 | 83.1% | 89.9% | 1370 | 1815 | 445 |
| 2.9 | 1.7 | 88.4 | 2 | 5 | 86.8% | 93.8% | 1370 | 1505 | 135 |
| 2.9 | 0.7 | 88.4 | 0 | 8 | 92.6% | 100.0% | 1370 | 1425 | 55 |
| 3 | 0.6 | 88.4 | 1 | 7 | 87.4% | 100.0% | 1370 | 1435 | 65 |
| 0.3 | 0.3 | 88.4 | 2 | 9 | 18.9% | 99.7% | 1365 | 1585 | 220 |
| 3.2 | 2.4 | 88.4 | 1 | 5 | 78.3% | 91.4% | 1370 | 1745 | 375 |
| 3.3 | 1.3 | 88.4 | 2 | 5 | 81.7% | 95.3% | 1370 | 1455 | 85 |
| 3.3 | 3.3 | 88.4 | 0 | 5 | 73.8% | 88.4% | 1375 | 2000 | 625 |
| 3.5 | 2.1 | 88.4 | 2 | 4 | 74.6% | 81.1% | 1370 | 1645 | 275 |
| 3.6 | 2 | 88.4 | 0 | 6 | 75.5% | 96.3% | 1375 | 1715 | 340 |
| 3.7 | 1.9 | 88.4 | 1 | 5 | 73.5% | 93.2% | 1375 | 1655 | 280 |
| 3.7 | 0.9 | 88.4 | 2 | 5 | 76.2% | 96.7% | 1370 | 1475 | 105 |
| 3.8 | 3.8 | 88.4 | 0 | 4 | 63.7% | 86.9% | 1375 | 2000 | 625 |
| 3.9 | 3.7 | 88.4 | 1 | 3 | 62.5% | 45.6% | 1375 | 2000 | 625 |
| 4 | 2.6 | 88.4 | 2 | 3 | 64.4% | 48.0% | 1370 | 1795 | 425 |
| 0.4 | 1.2 | 88.4 | 0 | 10 | 29.3% | 100.0% | 1375 | 1480 | 105 |
| 0.5 | 0.1 | 88.4 | 1 | 10 | 20.8% | 100.0% | 1370 | 1570 | 200 |
| 0.5 | 3.1 | 88.4 | 0 | 8 | 40.3% | 88.3% | 1375 | 1780 | 405 |
| 0.6 | 4 | 88.4 | 1 | 6 | 50.2% | 62.8% | 1370 | 1950 | 580 |
| 0.7 | 2.9 | 88.4 | 2 | 6 | 52.9% | 52.7% | 1365 | 1630 | 265 |
| 0.8 | 1.8 | 88.4 | 0 | 9 | 61.3% | 97.4% | 1375 | 1475 | 100 |
| 0.9 | 1.7 | 88.4 | 1 | 8 | 65.5% | 93.6% | 1370 | 1415 | 45 |
| 0.9 | 0.7 | 88.4 | 2 | 8 | 54.2% | 97.3% | 1370 | 1510 | 140 |
| 1 | 3.5 | 88.5 | 0 | 7 | 83.6% | 87.1% | 1375 | 1900 | 525 |
| 1.1 | 3.4 | 88.5 | 1 | 6 | 93.1% | 87.4% | 1370 | 1830 | 460 |
| 1.2 | 2.3 | 88.5 | 2 | 6 | 91.9% | 82.8% | 1365 | 1520 | 155 |
| 1.3 | 1.2 | 88.5 | 0 | 9 | 92.7% | 100.0% | 1375 | 1420 | 45 |
| 1.4 | 0.1 | 88.5 | 1 | 9 | 25.5% | 100.0% | 1370 | 1515 | 145 |
| 1.4 | 3.1 | 88.5 | 0 | 7 | 94.5% | 88.6% | 1375 | 1830 | 455 |
| 1.5 | 4 | 88.5 | 1 | 5 | 92.4% | 46.4% | 1370 | 2000 | 630 |
| 1.6 | 2.9 | 88.5 | 2 | 5 | 96.2% | 39.2% | 1370 | 1690 | 320 |
| 1.7 | 1.8 | 88.5 | 0 | 8 | 98.4% | 97.1% | 1375 | 1535 | 160 |
| 1.8 | 1.7 | 88.5 | 1 | 7 | 99.1% | 93.6% | 1370 | 1470 | 100 |
| 1.8 | 0.7 | 88.5 | 2 | 7 | 79.3% | 97.4% | 1370 | 1455 | 85 |
| 1.9 | 3.6 | 88.5 | 0 | 6 | 92.7% | 87.0% | 1375 | 1985 | 610 |
| 2 | 3.5 | 88.5 | 1 | 5 | 93.2% | 74.1% | 1370 | 1915 | 545 |
| 0.2 | 3.3 | 88.5 | 1 | 7 | 17.1% | 87.5% | 1370 | 1745 | 375 |
| 2.1 | 3.4 | 88.5 | 2 | 4 | 91.9% | 26.0% | 1370 | 1845 | 475 |
| 2.2 | 2.3 | 88.5 | 0 | 7 | 96.4% | 93.5% | 1375 | 1695 | 320 |
| 2.3 | 0.2 | 88.5 | 1 | 8 | 36.0% | 100.0% | 1365 | 1450 | 85 |
| 2.4 | 0.1 | 88.5 | 0 | 9 | 53.6% | 100.0% | 1370 | 1440 | 70 |
| 2.5 | 1 | 88.5 | 1 | 7 | 96.9% | 98.9% | 1370 | 1410 | 40 |
| 2.5 | 4 | 88.5 | 2 | 3 | 69.4% | 41.3% | 1370 | 2000 | 630 |
| 2.6 | 2.9 | 88.5 | 0 | 6 | 87.0% | 89.5% | 1375 | 1865 | 490 |
| 2.7 | 2.8 | 88.5 | 1 | 5 | 84.6% | 89.9% | 1370 | 1800 | 430 |
| 2.8 | 1.7 | 88.5 | 2 | 5 | 88.4% | 93.8% | 1370 | 1490 | 120 |
| 2.8 | 0.7 | 88.5 | 0 | 8 | 93.9% | 100.0% | 1370 | 1420 | 50 |
| 2.9 | 0.6 | 88.5 | 1 | 7 | 84.7% | 100.0% | 1370 | 1430 | 60 |
| 3 | 3.5 | 88.5 | 2 | 3 | 68.0% | 42.8% | 1370 | 1930 | 560 |
| 0.3 | 0.2 | 88.5 | 0 | 11 | 18.6% | 100.0% | 1370 | 1565 | 195 |
| 3.1 | 2.4 | 88.5 | 1 | 5 | 79.8% | 91.3% | 1370 | 1735 | 365 |
| 3.2 | 1.3 | 88.5 | 2 | 5 | 83.3% | 95.2% | 1370 | 1450 | 80 |
| 3.2 | 3.3 | 88.5 | 0 | 5 | 75.2% | 88.4% | 1375 | 1995 | 620 |
| 3.3 | 3.2 | 88.5 | 1 | 4 | 73.0% | 78.1% | 1370 | 1935 | 565 |
| 3.4 | 2.1 | 88.5 | 2 | 4 | 76.2% | 75.3% | 1370 | 1630 | 260 |
| 3.5 | 2 | 88.5 | 0 | 6 | 76.9% | 95.9% | 1375 | 1705 | 330 |
| 3.6 | 1.9 | 88.5 | 1 | 5 | 75.0% | 93.2% | 1375 | 1640 | 265 |
| 3.6 | 0.9 | 88.5 | 2 | 5 | 77.7% | 96.7% | 1370 | 1470 | 100 |
| 3.7 | 3.8 | 88.5 | 0 | 4 | 65.1% | 86.9% | 1375 | 2000 | 625 |
| 3.8 | 3.7 | 88.5 | 1 | 3 | 62.8% | 44.5% | 1375 | 2000 | 625 |
| 3.9 | 2.6 | 88.5 | 2 | 3 | 67.0% | 47.0% | 1375 | 1780 | 405 |
| 4 | 1.5 | 88.5 | 0 | 6 | 70.5% | 99.1% | 1370 | 1600 | 230 |
| 0.4 | 0.1 | 88.5 | 1 | 10 | 17.0% | 100.0% | 1370 | 1580 | 210 |
| 0.4 | 3.1 | 88.5 | 0 | 8 | 32.7% | 88.3% | 1375 | 1765 | 390 |
| 0.5 | 4 | 88.5 | 1 | 6 | 41.9% | 56.9% | 1370 | 1935 | 565 |
| 0.6 | 2.9 | 88.5 | 2 | 6 | 45.3% | 46.4% | 1365 | 1615 | 250 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.7 | 1.8 | 88.5 | 0 | 9 | 53.7% | 97.0% | 1375 | 1465 | 90 |
| 0.8 | 1.7 | 88.5 | 1 | 8 | 58.9% | 93.5% | 1370 | 1425 | 55 |
| 0.8 | 0.7 | 88.5 | 2 | 8 | 50.8% | 97.3% | 1370 | 1520 | 150 |
| 0.9 | 3.6 | 88.5 | 0 | 7 | 76.5% | 86.7% | 1375 | 1920 | 545 |
| 1 | 3.4 | 88.6 | 1 | 6 | 84.7% | 85.3% | 1370 | 1820 | 450 |
| 1.1 | 2.3 | 88.6 | 2 | 6 | 84.3% | 76.6% | 1365 | 1505 | 140 |
| 1.2 | 1.2 | 88.6 | 0 | 9 | 87.3% | 100.0% | 1375 | 1430 | 55 |
| 1.3 | 0.1 | 88.6 | 1 | 9 | 23.0% | 100.0% | 1370 | 1525 | 155 |
| 1.3 | 3.1 | 88.6 | 0 | 7 | 94.7% | 88.5% | 1375 | 1820 | 445 |
| 1.4 | 4 | 88.6 | 1 | 5 | 92.6% | 17.3% | 1370 | 1985 | 615 |
| 1.5 | 2.9 | 88.6 | 2 | 5 | 96.4% | 19.1% | 1370 | 1675 | 305 |
| 1.6 | 1.8 | 88.6 | 0 | 8 | 98.5% | 96.7% | 1375 | 1520 | 145 |
| 1.7 | 1.7 | 88.6 | 1 | 7 | 99.2% | 93.6% | 1370 | 1455 | 85 |
| 1.7 | 0.7 | 88.6 | 2 | 7 | 76.2% | 97.4% | 1370 | 1460 | 90 |
| 1.8 | 3.6 | 88.6 | 0 | 6 | 92.8% | 87.0% | 1375 | 1970 | 595 |
| 1.9 | 3.5 | 88.6 | 1 | 5 | 93.6% | 68.4% | 1370 | 1905 | 535 |
| 2 | 2.4 | 88.6 | 2 | 5 | 97.4% | 62.3% | 1370 | 1595 | 225 |
| 0.2 | 2.2 | 88.6 | 1 | 8 | 15.7% | 91.5% | 1370 | 1470 | 100 |
| 2.1 | 2.3 | 88.6 | 2 | 5 | 97.7% | 68.2% | 1370 | 1580 | 210 |
| 2.2 | 1.2 | 88.6 | 0 | 8 | 100.0% | 100.0% | 1375 | 1400 | 25 |
| 2.3 | 0.1 | 88.6 | 1 | 8 | 19.9% | 100.0% | 1365 | 1460 | 95 |
| 2.3 | 3.1 | 88.6 | 0 | 6 | 90.9% | 88.8% | 1375 | 1885 | 510 |
| 2.4 | 4 | 88.6 | 1 | 4 | 85.5% | 29.0% | 1375 | 2000 | 625 |
| 2.5 | 2.9 | 88.6 | 2 | 4 | 88.2% | 31.0% | 1370 | 1750 | 380 |
| 2.6 | 1.8 | 88.6 | 0 | 7 | 93.0% | 96.8% | 1375 | 1590 | 215 |
| 2.7 | 1.7 | 88.6 | 1 | 6 | 91.3% | 93.7% | 1375 | 1525 | 150 |
| 2.7 | 0.7 | 88.6 | 2 | 6 | 77.7% | 97.4% | 1370 | 1420 | 50 |
| 2.8 | 3.6 | 88.6 | 0 | 5 | 80.1% | 87.3% | 1375 | 2000 | 625 |
| 2.9 | 3.5 | 88.6 | 1 | 4 | 78.2% | 56.5% | 1370 | 1970 | 600 |
| 3 | 2.4 | 88.6 | 2 | 4 | 81.7% | 52.6% | 1370 | 1670 | 300 |
| 0.3 | 1.1 | 88.6 | 0 | 10 | 22.4% | 100.0% | 1375 | 1500 | 125 |
| 3.1 | 2.3 | 88.6 | 1 | 5 | 80.1% | 91.7% | 1370 | 1705 | 335 |
| 3.2 | 1.2 | 88.6 | 2 | 5 | 83.5% | 95.6% | 1370 | 1450 | 80 |
| 3.2 | 3.2 | 88.6 | 0 | 5 | 75.5% | 88.7% | 1375 | 1965 | 590 |
| 3.3 | 3.1 | 88.6 | 2 | 3 | 67.6% | 43.9% | 1370 | 1850 | 480 |
| 3.4 | 3 | 88.6 | 0 | 5 | 73.2% | 89.4% | 1375 | 1930 | 555 |
| 3.5 | 2.9 | 88.6 | 1 | 4 | 70.9% | 88.6% | 1370 | 1870 | 500 |
| 3.6 | 1.8 | 88.6 | 2 | 4 | 74.0% | 86.4% | 1370 | 1565 | 195 |
| 3.6 | 0.8 | 88.6 | 0 | 7 | 80.7% | 100.0% | 1370 | 1460 | 90 |
| 3.7 | 0.7 | 88.6 | 1 | 6 | 77.4% | 100.0% | 1370 | 1470 | 100 |
| 3.8 | 3.6 | 88.6 | 2 | 2 | 45.2% | 60.3% | 1370 | 1995 | 625 |
| 3.9 | 2.5 | 88.6 | 0 | 5 | 67.7% | 92.1% | 1375 | 1845 | 470 |
| 4 | 2.4 | 88.6 | 1 | 4 | 65.0% | 91.5% | 1370 | 1785 | 415 |
| 0.4 | 1 | 88.6 | 2 | 8 | 29.4% | 96.1% | 1365 | 1525 | 160 |
| 0.4 | 4 | 88.6 | 0 | 7 | 38.2% | 85.1% | 1375 | 1980 | 605 |
| 0.5 | 3.9 | 88.6 | 1 | 6 | 42.0% | 56.7% | 1370 | 1905 | 535 |
| 0.6 | 2.8 | 88.6 | 2 | 6 | 45.4% | 46.1% | 1365 | 1585 | 220 |
| 0.7 | 1.7 | 88.6 | 0 | 9 | 53.9% | 97.3% | 1375 | 1430 | 55 |
| 0.8 | 1.6 | 88.6 | 1 | 8 | 59.1% | 93.8% | 1370 | 1435 | 65 |
| 0.8 | 0.6 | 88.6 | 2 | 8 | 46.9% | 97.7% | 1370 | 1530 | 160 |
| 0.9 | 3.5 | 88.6 | 0 | 7 | 76.8% | 87.0% | 1375 | 1890 | 515 |
| 1 | 0.3 | 88.7 | 1 | 9 | 44.0% | 100.0% | 1370 | 1530 | 160 |
| 1.1 | 0.2 | 88.7 | 2 | 8 | 27.4% | 99.4% | 1370 | 1545 | 175 |
| 1.2 | 1.1 | 88.7 | 1 | 8 | 79.0% | 97.1% | 1370 | 1450 | 80 |
| 1.3 | 1 | 88.7 | 2 | 7 | 75.3% | 96.2% | 1370 | 1465 | 95 |
| 1.3 | 4 | 88.7 | 0 | 6 | 92.1% | 85.5% | 1375 | 2000 | 625 |
| 1.4 | 3.9 | 88.7 | 1 | 5 | 92.9% | 17.4% | 1370 | 1955 | 585 |
| 1.5 | 2.8 | 88.7 | 2 | 5 | 96.8% | 19.1% | 1370 | 1645 | 275 |
| 1.6 | 1.7 | 88.7 | 0 | 8 | 98.9% | 97.0% | 1375 | 1490 | 115 |
| 1.7 | 1.6 | 88.7 | 1 | 7 | 99.6% | 94.0% | 1370 | 1425 | 55 |
| 1.7 | 0.6 | 88.7 | 2 | 7 | 70.5% | 97.8% | 1370 | 1470 | 100 |
| 1.8 | 3.5 | 88.7 | 0 | 6 | 93.2% | 87.3% | 1375 | 1940 | 565 |
| 1.9 | 3.4 | 88.7 | 1 | 5 | 93.9% | 68.2% | 1370 | 1875 | 505 |
| 2 | 2.3 | 88.7 | 2 | 5 | 97.8% | 62.1% | 1370 | 1565 | 195 |
| 0.2 | 2.1 | 88.7 | 1 | 8 | 15.7% | 91.8% | 1370 | 1440 | 70 |
| 2.1 | 0.2 | 88.7 | 2 | 7 | 26.4% | 99.7% | 1370 | 1480 | 110 |
| 2.2 | 1.1 | 88.7 | 1 | 7 | 100.0% | 97.3% | 1370 | 1390 | 20 |
| 2.3 | 1 | 88.7 | 2 | 6 | 99.9% | 96.3% | 1370 | 1400 | 30 |
| 2.3 | 4 | 88.7 | 0 | 5 | 86.4% | 85.8% | 1375 | 2000 | 625 |
| 2.4 | 3.9 | 88.7 | 1 | 4 | 85.9% | 29.0% | 1375 | 2000 | 625 |
| 2.5 | 2.8 | 88.7 | 2 | 4 | 88.6% | 31.1% | 1370 | 1720 | 350 |
| 2.6 | 1.7 | 88.7 | 0 | 7 | 93.4% | 97.1% | 1375 | 1560 | 185 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.7 | 1.6 | 88.7 | 1 | 6 | 91.7% | 94.1% | 1375 | 1495 | 120 |
| 2.7 | 0.6 | 88.7 | 2 | 6 | 67.2% | 97.8% | 1370 | 1420 | 50 |
| 2.8 | 3.5 | 88.7 | 0 | 5 | 80.5% | 87.6% | 1375 | 2000 | 625 |
| 2.9 | 3.4 | 88.7 | 1 | 4 | 78.5% | 35.0% | 1370 | 1940 | 570 |
| 3 | 2.3 | 88.7 | 2 | 4 | 82.0% | 37.3% | 1370 | 1640 | 270 |
| 0.3 | 1 | 88.7 | 0 | 10 | 22.2% | 100.0% | 1375 | 1510 | 135 |
| 3.1 | 1.2 | 88.7 | 1 | 6 | 85.6% | 96.7% | 1370 | 1445 | 75 |
| 3.1 | 3.2 | 88.7 | 2 | 3 | 68.2% | 43.5% | 1370 | 1855 | 485 |
| 3.2 | 3.1 | 88.7 | 1 | 4 | 74.8% | 72.4% | 1370 | 1890 | 520 |
| 3.3 | 3 | 88.7 | 2 | 3 | 67.8% | 44.1% | 1370 | 1825 | 455 |
| 3.4 | 1.9 | 88.7 | 0 | 6 | 78.7% | 95.8% | 1375 | 1660 | 285 |
| 3.5 | 1.8 | 88.7 | 1 | 5 | 76.8% | 93.5% | 1375 | 1600 | 225 |
| 3.6 | 3.7 | 88.7 | 0 | 4 | 66.8% | 87.2% | 1375 | 2000 | 625 |
| 3.7 | 3.6 | 88.7 | 1 | 3 | 63.2% | 44.5% | 1375 | 2000 | 625 |
| 3.8 | 2.5 | 88.7 | 2 | 3 | 68.9% | 46.1% | 1375 | 1740 | 365 |
| 3.9 | 1.4 | 88.7 | 0 | 6 | 73.3% | 99.4% | 1375 | 1560 | 185 |
| 4 | 1.3 | 88.7 | 1 | 5 | 69.9% | 96.1% | 1370 | 1500 | 130 |
| 4 | 3.3 | 88.7 | 2 | 2 | 45.0% | 61.0% | 1370 | 1935 | 565 |
| 0.4 | 3.9 | 88.7 | 0 | 7 | 38.3% | 85.5% | 1375 | 1945 | 570 |
| 0.5 | 3.8 | 88.7 | 1 | 6 | 42.1% | 56.4% | 1370 | 1875 | 505 |
| 0.6 | 2.7 | 88.7 | 2 | 6 | 45.6% | 45.9% | 1365 | 1550 | 185 |
| 0.8 | 1.5 | 88.7 | 1 | 8 | 59.4% | 94.2% | 1370 | 1445 | 75 |
| 0.8 | 0.5 | 88.7 | 2 | 8 | 42.9% | 98.1% | 1370 | 1540 | 170 |
| 0.9 | 3.4 | 88.7 | 0 | 7 | 77.1% | 87.4% | 1375 | 1860 | 485 |
| 1 | 2.2 | 88.8 | 1 | 7 | 79.2% | 91.6% | 1370 | 1515 | 145 |
| 1.1 | 1.1 | 88.8 | 0 | 9 | 81.1% | 100.0% | 1375 | 1445 | 70 |
| 1.2 | 2 | 88.8 | 1 | 7 | 92.4% | 92.4% | 1370 | 1480 | 110 |
| 1.2 | 0 | 88.8 | 2 | 8 | 44.7% | 100.0% | 1410 | 1560 | 150 |
| 1.3 | 3.9 | 88.8 | 0 | 6 | 92.5% | 85.8% | 1375 | 1995 | 620 |
| 1.4 | 3.8 | 88.8 | 1 | 5 | 93.3% | 17.4% | 1370 | 1925 | 555 |
| 1.5 | 2.7 | 88.8 | 2 | 5 | 97.2% | 19.2% | 1370 | 1615 | 245 |
| 1.6 | 1.6 | 88.8 | 0 | 8 | 99.3% | 97.4% | 1375 | 1460 | 85 |
| 1.7 | 1.5 | 88.8 | 1 | 7 | 100.0% | 94.3% | 1370 | 1395 | 25 |
| 1.7 | 0.5 | 88.8 | 2 | 7 | 59.2% | 98.2% | 1370 | 1485 | 115 |
| 1.8 | 3.4 | 88.8 | 0 | 6 | 93.5% | 87.6% | 1375 | 1910 | 535 |
| 1.9 | 0.3 | 88.8 | 1 | 8 | 47.8% | 100.0% | 1370 | 1475 | 105 |
| 2 | 0.2 | 88.8 | 2 | 7 | 25.1% | 99.4% | 1370 | 1490 | 120 |
| 0.2 | 2 | 88.8 | 1 | 8 | 15.8% | 92.2% | 1370 | 1450 | 80 |
| 2.1 | 0.1 | 88.8 | 0 | 9 | 40.6% | 100.0% | 1370 | 1465 | 95 |
| 2.2 | 1 | 88.8 | 1 | 7 | 100.0% | 97.6% | 1370 | 1395 | 25 |
| 2.3 | 2.9 | 88.8 | 0 | 6 | 91.6% | 89.5% | 1375 | 1825 | 450 |
| 2.4 | 2.8 | 88.8 | 1 | 5 | 89.4% | 89.8% | 1370 | 1760 | 390 |
| 2.5 | 1.7 | 88.8 | 2 | 5 | 93.5% | 91.2% | 1370 | 1450 | 80 |
| 2.5 | 0.7 | 88.8 | 0 | 8 | 98.0% | 100.0% | 1370 | 1405 | 35 |
| 2.6 | 0.6 | 88.8 | 1 | 7 | 77.4% | 100.0% | 1370 | 1410 | 40 |
| 2.7 | 3.5 | 88.8 | 2 | 3 | 69.4% | 42.6% | 1370 | 1890 | 520 |
| 2.8 | 2.4 | 88.8 | 0 | 6 | 85.8% | 91.8% | 1375 | 1740 | 365 |
| 2.9 | 2.3 | 88.8 | 1 | 5 | 83.3% | 91.6% | 1370 | 1680 | 310 |
| 3 | 1.2 | 88.8 | 2 | 5 | 86.6% | 95.6% | 1370 | 1440 | 70 |
| 3 | 3.2 | 88.8 | 0 | 5 | 78.5% | 88.6% | 1375 | 1945 | 570 |
| 3.1 | 2.1 | 88.8 | 0 | 6 | 82.4% | 93.9% | 1375 | 1690 | 315 |
| 3.3 | 1.9 | 88.8 | 2 | 4 | 78.5% | 69.1% | 1370 | 1555 | 185 |
| 3.3 | 0.9 | 88.8 | 0 | 7 | 84.5% | 100.0% | 1370 | 1450 | 80 |
| 3.4 | 0.8 | 88.8 | 1 | 6 | 81.6% | 99.3% | 1370 | 1460 | 90 |
| 3.5 | 3.7 | 88.8 | 2 | 2 | 46.1% | 60.0% | 1370 | 1990 | 620 |
| 3.6 | 2.6 | 88.8 | 0 | 5 | 71.6% | 90.8% | 1375 | 1840 | 465 |
| 3.7 | 2.5 | 88.8 | 1 | 4 | 69.1% | 91.1% | 1370 | 1780 | 410 |
| 3.8 | 1.4 | 88.8 | 2 | 4 | 72.1% | 95.0% | 1370 | 1480 | 110 |
| 3.8 | 0.4 | 88.8 | 0 | 7 | 77.6% | 100.0% | 1370 | 1470 | 100 |
| 3.9 | 3.3 | 88.8 | 1 | 3 | 63.2% | 46.1% | 1375 | 1975 | 600 |
| 4 | 2.2 | 88.8 | 2 | 3 | 65.6% | 48.6% | 1370 | 1675 | 305 |
| 0.5 | 2.7 | 88.8 | 1 | 7 | 43.7% | 89.7% | 1370 | 1600 | 230 |
| 0.6 | 1.6 | 88.8 | 2 | 7 | 47.8% | 93.8% | 1365 | 1465 | 100 |
| 0.6 | 0.6 | 88.8 | 0 | 10 | 39.0% | 100.0% | 1370 | 1520 | 150 |
| 0.7 | 0.5 | 88.8 | 1 | 9 | 41.5% | 100.0% | 1370 | 1535 | 165 |
| 0.8 | 3.4 | 88.8 | 2 | 5 | 64.7% | 10.3% | 1370 | 1725 | 355 |
| 0.9 | 2.3 | 88.8 | 0 | 8 | 71.2% | 92.1% | 1375 | 1585 | 210 |
| 1.1 | 1 | 88.9 | 0 | 9 | 77.0% | 100.0% | 1375 | 1455 | 80 |
| 1.1 | 0 | 88.9 | 1 | 9 | 42.2% | 100.0% | 1405 | 1550 | 145 |
| 1.2 | 3.9 | 88.9 | 2 | 4 | 94.1% | 21.8% | 1370 | 1865 | 495 |
| 1.5 | 1.6 | 88.9 | 2 | 6 | 98.0% | 93.9% | 1365 | 1400 | 35 |
| 1.5 | 0.6 | 88.9 | 0 | 9 | 72.5% | 100.0% | 1370 | 1460 | 90 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.6 | 0.5 | 88.9 | 1 | 8 | 66.8% | 100.0% | 1370 | 1480 | 110 |
| 1.7 | 3.4 | 88.9 | 2 | 4 | 93.7% | 23.8% | 1370 | 1785 | 415 |
| 1.8 | 2.3 | 88.9 | 0 | 7 | 96.9% | 91.9% | 1375 | 1640 | 265 |
| 2 | 0.1 | 88.9 | 0 | 9 | 36.6% | 100.0% | 1370 | 1470 | 100 |
| 0.2 | 1.9 | 88.9 | 1 | 8 | 15.9% | 92.6% | 1370 | 1460 | 90 |
| 2.1 | 1 | 88.9 | 1 | 7 | 98.5% | 97.2% | 1370 | 1400 | 30 |
| 2.3 | 2.8 | 88.9 | 1 | 5 | 91.0% | 89.8% | 1370 | 1750 | 380 |
| 2.4 | 0.7 | 88.9 | 0 | 8 | 99.2% | 100.0% | 1370 | 1400 | 30 |
| 2.5 | 0.6 | 88.9 | 1 | 7 | 75.2% | 100.0% | 1370 | 1410 | 40 |
| 2.6 | 3.5 | 88.9 | 2 | 3 | 69.9% | 42.5% | 1370 | 1875 | 505 |
| 2.8 | 2.3 | 88.9 | 1 | 5 | 84.8% | 91.6% | 1370 | 1665 | 295 |
| 2.9 | 3.2 | 88.9 | 0 | 5 | 80.0% | 88.6% | 1375 | 1930 | 555 |
| 3.1 | 3 | 88.9 | 1 | 4 | 76.7% | 66.6% | 1370 | 1850 | 480 |
| 3.2 | 0.9 | 88.9 | 0 | 7 | 85.8% | 100.0% | 1370 | 1445 | 75 |
| 3.3 | 0.8 | 88.9 | 1 | 6 | 83.0% | 98.9% | 1370 | 1455 | 85 |
| 3.4 | 3.7 | 88.9 | 2 | 2 | 46.5% | 60.0% | 1370 | 1975 | 605 |
| 3.6 | 2.5 | 88.9 | 1 | 4 | 70.6% | 91.1% | 1370 | 1765 | 395 |
| 3.7 | 0.4 | 88.9 | 0 | 7 | 78.0% | 100.0% | 1370 | 1470 | 100 |
| 3.8 | 3.3 | 88.9 | 1 | 3 | 63.5% | 45.2% | 1375 | 1965 | 590 |
| 3.9 | 2.2 | 88.9 | 2 | 3 | 68.3% | 47.5% | 1375 | 1665 | 290 |
| 4 | 2.1 | 88.9 | 1 | 4 | 65.8% | 92.5% | 1370 | 1695 | 325 |
| 0.6 | 1.5 | 88.9 | 1 | 8 | 45.8% | 94.2% | 1370 | 1465 | 95 |
| 0.7 | 3.4 | 88.9 | 0 | 7 | 62.8% | 87.3% | 1375 | 1830 | 455 |
| 0.8 | 0.3 | 88.9 | 1 | 9 | 37.0% | 100.0% | 1370 | 1545 | 175 |
| 0.9 | 0.2 | 88.9 | 2 | 8 | 25.2% | 99.4% | 1370 | 1565 | 195 |
| 1 | 1 | 89 | 0 | 9 | 73.4% | 100.0% | 1375 | 1465 | 90 |
| 1 | 0 | 89 | 1 | 9 | 38.3% | 100.0% | 1405 | 1560 | 155 |
| 1.1 | 3.9 | 89 | 2 | 4 | 89.8% | 21.5% | 1370 | 1850 | 480 |
| 1.2 | 2.8 | 89 | 0 | 7 | 96.0% | 89.5% | 1375 | 1715 | 340 |
| 1.3 | 2.7 | 89 | 1 | 6 | 96.8% | 89.9% | 1370 | 1645 | 275 |
| 1.4 | 1.6 | 89 | 2 | 6 | 94.7% | 93.9% | 1365 | 1405 | 40 |
| 1.4 | 0.6 | 89 | 0 | 9 | 70.6% | 100.0% | 1375 | 1470 | 95 |
| 1.5 | 0.5 | 89 | 1 | 8 | 64.8% | 100.0% | 1370 | 1485 | 115 |
| 1.6 | 3.4 | 89 | 2 | 4 | 94.4% | 23.6% | 1370 | 1770 | 400 |
| 1.7 | 2.3 | 89 | 0 | 7 | 97.1% | 91.4% | 1375 | 1630 | 255 |
| 1.8 | 0.2 | 89 | 1 | 8 | 31.3% | 100.0% | 1370 | 1495 | 125 |
| 1.9 | 0.1 | 89 | 0 | 9 | 32.9% | 100.0% | 1370 | 1480 | 110 |
| 2 | 1 | 89 | 1 | 7 | 95.5% | 96.7% | 1370 | 1410 | 40 |
| 2 | 4 | 89 | 2 | 3 | 71.3% | 40.6% | 1370 | 1940 | 570 |
| 0.2 | 2.8 | 89 | 0 | 8 | 17.0% | 89.3% | 1375 | 1645 | 270 |
| 2.1 | 2.9 | 89 | 0 | 6 | 94.8% | 89.4% | 1375 | 1800 | 425 |
| 2.2 | 2.8 | 89 | 1 | 5 | 92.7% | 84.3% | 1370 | 1735 | 365 |
| 2.3 | 0.7 | 89 | 0 | 8 | 96.4% | 100.0% | 1370 | 1405 | 35 |
| 2.4 | 0.6 | 89 | 1 | 7 | 73.1% | 99.9% | 1370 | 1420 | 50 |
| 2.5 | 3.5 | 89 | 2 | 3 | 70.4% | 42.4% | 1370 | 1860 | 490 |
| 2.7 | 2.3 | 89 | 1 | 5 | 86.4% | 91.6% | 1370 | 1650 | 280 |
| 2.8 | 1.2 | 89 | 2 | 5 | 89.9% | 95.6% | 1370 | 1430 | 60 |
| 2.8 | 3.2 | 89 | 0 | 5 | 81.5% | 88.6% | 1375 | 1920 | 545 |
| 2.9 | 3.1 | 89 | 2 | 3 | 69.3% | 43.6% | 1370 | 1800 | 430 |
| 3 | 3 | 89 | 0 | 5 | 79.1% | 89.3% | 1375 | 1885 | 510 |
| 0.3 | 2.7 | 89 | 1 | 7 | 26.3% | 89.6% | 1370 | 1570 | 200 |
| 3.1 | 1.9 | 89 | 2 | 4 | 81.8% | 57.3% | 1370 | 1530 | 160 |
| 3.1 | 0.9 | 89 | 0 | 7 | 87.1% | 100.0% | 1370 | 1440 | 70 |
| 3.2 | 0.8 | 89 | 1 | 6 | 84.5% | 98.4% | 1370 | 1450 | 80 |
| 3.3 | 3.7 | 89 | 2 | 2 | 46.9% | 60.0% | 1370 | 1965 | 595 |
| 3.4 | 2.6 | 89 | 0 | 5 | 74.5% | 90.7% | 1375 | 1815 | 440 |
| 3.5 | 2.5 | 89 | 1 | 4 | 72.2% | 88.1% | 1370 | 1755 | 385 |
| 3.6 | 1.4 | 89 | 2 | 4 | 75.4% | 85.8% | 1370 | 1475 | 105 |
| 3.6 | 0.4 | 89 | 0 | 7 | 74.5% | 100.0% | 1370 | 1465 | 95 |
| 3.7 | 3.3 | 89 | 1 | 3 | 63.8% | 45.2% | 1375 | 1950 | 575 |
| 3.8 | 2.2 | 89 | 2 | 3 | 69.8% | 46.5% | 1375 | 1650 | 275 |
| 3.9 | 2.1 | 89 | 1 | 4 | 67.3% | 92.5% | 1370 | 1685 | 315 |
| 4 | 2 | 89 | 2 | 3 | 67.3% | 48.9% | 1375 | 1615 | 240 |
| 4 | 0 | 89 | 0 | 7 | 80.5% | 100.0% | 1395 | 1480 | 85 |
| 0.4 | 0.6 | 89 | 1 | 9 | 29.3% | 99.6% | 1370 | 1555 | 185 |
| 0.5 | 3.5 | 89 | 2 | 5 | 40.6% | 6.5% | 1370 | 1710 | 340 |
| 0.6 | 2.4 | 89 | 0 | 8 | 49.0% | 90.8% | 1375 | 1575 | 200 |
| 0.7 | 2.3 | 89 | 1 | 7 | 59.1% | 91.2% | 1370 | 1505 | 135 |
| 0.8 | 1.2 | 89 | 2 | 7 | 62.9% | 95.4% | 1365 | 1485 | 120 |
| 0.8 | 3.2 | 89 | 0 | 7 | 70.7% | 88.0% | 1375 | 1780 | 405 |
| 0.9 | 3.1 | 89 | 2 | 5 | 73.3% | 11.6% | 1370 | 1645 | 275 |
| 1 | 3.9 | 89.1 | 0 | 6 | 93.0% | 85.7% | 1375 | 1960 | 585 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.1 | 3.8 | 89.1 | 1 | 5 | 93.9% | 13.8% | 1375 | 1885 | 510 |
| 1.2 | 2.7 | 89.1 | 2 | 5 | 97.8% | 15.5% | 1370 | 1570 | 200 |
| 1.3 | 1.6 | 89.1 | 0 | 8 | 99.8% | 96.1% | 1375 | 1420 | 45 |
| 1.4 | 1.5 | 89.1 | 1 | 7 | 96.1% | 94.3% | 1370 | 1410 | 40 |
| 1.4 | 0.5 | 89.1 | 2 | 7 | 55.7% | 98.2% | 1370 | 1510 | 140 |
| 1.5 | 3.4 | 89.1 | 0 | 6 | 94.0% | 87.5% | 1375 | 1870 | 495 |
| 1.6 | 0.3 | 89.1 | 1 | 8 | 41.7% | 100.0% | 1370 | 1500 | 130 |
| 1.7 | 0.2 | 89.1 | 2 | 7 | 22.0% | 99.4% | 1370 | 1515 | 145 |
| 1.8 | 1.1 | 89.1 | 1 | 7 | 93.2% | 95.8% | 1370 | 1415 | 45 |
| 1.9 | 1 | 89.1 | 2 | 6 | 87.5% | 96.3% | 1365 | 1430 | 65 |
| 1.9 | 4 | 89.1 | 0 | 5 | 91.9% | 86.1% | 1375 | 2000 | 625 |
| 2 | 3.9 | 89.1 | 1 | 4 | 88.0% | 26.1% | 1375 | 1970 | 595 |
| 0.2 | 2.7 | 89.1 | 2 | 6 | 16.9% | 19.9% | 1370 | 1490 | 120 |
| 2.1 | 2.8 | 89.1 | 2 | 4 | 93.6% | 26.5% | 1370 | 1660 | 290 |
| 2.2 | 1.7 | 89.1 | 0 | 7 | 98.7% | 95.5% | 1375 | 1510 | 135 |
| 2.3 | 1.6 | 89.1 | 1 | 6 | 96.9% | 94.0% | 1370 | 1445 | 75 |
| 2.3 | 0.6 | 89.1 | 2 | 6 | 62.1% | 97.8% | 1370 | 1440 | 70 |
| 2.4 | 3.5 | 89.1 | 0 | 5 | 86.6% | 87.5% | 1375 | 1955 | 580 |
| 2.5 | 3.4 | 89.1 | 1 | 4 | 86.1% | 30.6% | 1375 | 1890 | 515 |
| 2.6 | 2.3 | 89.1 | 2 | 4 | 88.8% | 32.7% | 1370 | 1585 | 215 |
| 2.7 | 1.2 | 89.1 | 0 | 7 | 93.8% | 99.2% | 1375 | 1425 | 50 |
| 2.8 | 0.1 | 89.1 | 1 | 7 | 16.9% | 100.0% | 1370 | 1435 | 65 |
| 2.8 | 3.1 | 89.1 | 0 | 5 | 81.8% | 88.9% | 1375 | 1890 | 515 |
| 2.9 | 4 | 89.1 | 1 | 3 | 64.9% | 43.6% | 1375 | 2000 | 625 |
| 3 | 2.9 | 89.1 | 2 | 3 | 69.3% | 44.1% | 1370 | 1755 | 385 |
| 0.3 | 1.6 | 89.1 | 0 | 9 | 23.5% | 96.0% | 1375 | 1470 | 95 |
| 3.1 | 1.8 | 89.1 | 1 | 5 | 81.9% | 93.4% | 1370 | 1550 | 180 |
| 3.1 | 0.8 | 89.1 | 2 | 5 | 75.8% | 97.1% | 1370 | 1445 | 75 |
| 3.2 | 3.7 | 89.1 | 0 | 4 | 72.7% | 87.5% | 1375 | 2000 | 625 |
| 3.3 | 3.6 | 89.1 | 1 | 3 | 64.4% | 44.5% | 1375 | 1990 | 615 |
| 3.4 | 2.5 | 89.1 | 2 | 3 | 68.3% | 45.3% | 1370 | 1690 | 320 |
| 3.5 | 1.4 | 89.1 | 0 | 6 | 78.9% | 97.8% | 1375 | 1515 | 140 |
| 3.6 | 1.3 | 89.1 | 1 | 5 | 77.0% | 95.3% | 1375 | 1470 | 95 |
| 3.6 | 3.3 | 89.1 | 2 | 2 | 46.3% | 61.1% | 1370 | 1885 | 515 |
| 3.7 | 2.2 | 89.1 | 0 | 5 | 71.4% | 92.2% | 1375 | 1735 | 360 |
| 3.8 | 2.1 | 89.1 | 2 | 3 | 70.0% | 46.6% | 1375 | 1620 | 245 |
| 3.9 | 2 | 89.1 | 0 | 5 | 69.1% | 93.6% | 1375 | 1700 | 325 |
| 4 | 1.9 | 89.1 | 1 | 4 | 66.4% | 93.2% | 1370 | 1635 | 265 |
| 4 | 0.9 | 89.1 | 2 | 4 | 70.2% | 96.8% | 1370 | 1490 | 120 |
| 0.4 | 3.5 | 89.1 | 0 | 7 | 39.1% | 86.8% | 1375 | 1820 | 445 |
| 0.5 | 3.4 | 89.1 | 1 | 6 | 42.5% | 55.5% | 1370 | 1745 | 375 |
| 0.6 | 2.3 | 89.1 | 2 | 6 | 46.1% | 44.8% | 1365 | 1425 | 60 |
| 0.7 | 1.2 | 89.1 | 0 | 9 | 54.7% | 99.1% | 1375 | 1470 | 95 |
| 0.8 | 0.1 | 89.1 | 0 | 10 | 24.3% | 100.0% | 1370 | 1550 | 180 |
| 0.9 | 1 | 89.1 | 1 | 8 | 65.0% | 96.2% | 1370 | 1485 | 115 |
| 0.9 | 4 | 89.1 | 2 | 4 | 74.1% | 20.7% | 1370 | 1855 | 485 |
| 1 | 2.8 | 89.2 | 0 | 7 | 86.1% | 89.5% | 1375 | 1685 | 310 |
| 1.1 | 2.7 | 89.2 | 1 | 6 | 94.8% | 89.8% | 1370 | 1615 | 245 |
| 1.2 | 1.6 | 89.2 | 2 | 6 | 85.7% | 81.7% | 1365 | 1425 | 60 |
| 1.2 | 0.6 | 89.2 | 0 | 9 | 63.6% | 100.0% | 1375 | 1485 | 110 |
| 1.3 | 0.5 | 89.2 | 1 | 8 | 58.5% | 99.7% | 1370 | 1505 | 135 |
| 1.4 | 3.4 | 89.2 | 2 | 4 | 95.6% | 23.1% | 1370 | 1740 | 370 |
| 1.5 | 2.3 | 89.2 | 0 | 7 | 97.4% | 91.4% | 1375 | 1600 | 225 |
| 1.6 | 0.2 | 89.2 | 1 | 8 | 27.8% | 100.0% | 1370 | 1510 | 140 |
| 1.7 | 1.1 | 89.2 | 1 | 7 | 90.1% | 95.8% | 1370 | 1425 | 55 |
| 1.8 | 1 | 89.2 | 2 | 6 | 84.9% | 96.3% | 1365 | 1435 | 70 |
| 1.8 | 4 | 89.2 | 0 | 5 | 92.1% | 86.3% | 1375 | 2000 | 625 |
| 1.9 | 3.9 | 89.2 | 1 | 4 | 88.3% | 26.0% | 1375 | 1955 | 580 |
| 2 | 2.8 | 89.2 | 2 | 4 | 94.0% | 25.4% | 1370 | 1645 | 275 |
| 0.2 | 1.6 | 89.2 | 0 | 9 | 15.6% | 95.5% | 1375 | 1480 | 105 |
| 2.1 | 1.7 | 89.2 | 0 | 7 | 98.8% | 95.1% | 1375 | 1495 | 120 |
| 2.2 | 1.6 | 89.2 | 1 | 6 | 98.5% | 94.0% | 1370 | 1430 | 60 |
| 2.2 | 0.6 | 89.2 | 2 | 6 | 61.0% | 97.8% | 1370 | 1445 | 75 |
| 2.3 | 3.5 | 89.2 | 0 | 5 | 88.2% | 87.4% | 1375 | 1945 | 570 |
| 2.4 | 3.4 | 89.2 | 1 | 4 | 87.7% | 29.5% | 1375 | 1875 | 500 |
| 2.5 | 2.3 | 89.2 | 2 | 4 | 90.5% | 31.6% | 1370 | 1570 | 200 |
| 2.6 | 1.2 | 89.2 | 0 | 7 | 95.3% | 98.8% | 1375 | 1420 | 45 |
| 2.7 | 0.1 | 89.2 | 1 | 7 | 15.1% | 100.0% | 1370 | 1445 | 75 |
| 2.7 | 3.1 | 89.2 | 0 | 5 | 83.4% | 88.9% | 1375 | 1880 | 505 |
| 2.8 | 4 | 89.2 | 1 | 3 | 65.3% | 43.5% | 1375 | 2000 | 625 |
| 2.9 | 2.9 | 89.2 | 2 | 3 | 69.7% | 44.1% | 1370 | 1740 | 370 |
| 3 | 1.8 | 89.2 | 0 | 6 | 84.9% | 94.5% | 1375 | 1585 | 210 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.3 | 1.5 | 89.2 | 1 | 8 | 24.0% | 94.1% | 1370 | 1490 | 120 |
| 0.3 | 0.5 | 89.2 | 2 | 8 | 22.9% | 98.2% | 1365 | 1585 | 220 |
| 3.1 | 3.7 | 89.2 | 0 | 4 | 74.2% | 87.7% | 1375 | 2000 | 625 |
| 3.2 | 3.6 | 89.2 | 1 | 3 | 64.7% | 44.5% | 1375 | 1975 | 600 |
| 3.3 | 2.5 | 89.2 | 2 | 3 | 68.8% | 45.2% | 1370 | 1675 | 305 |
| 3.4 | 1.4 | 89.2 | 0 | 6 | 80.3% | 97.4% | 1375 | 1505 | 130 |
| 3.5 | 1.3 | 89.2 | 1 | 5 | 78.5% | 95.3% | 1375 | 1470 | 95 |
| 3.5 | 3.3 | 89.2 | 2 | 2 | 46.7% | 61.1% | 1370 | 1875 | 505 |
| 3.6 | 2.2 | 89.2 | 0 | 5 | 72.8% | 92.1% | 1375 | 1725 | 350 |
| 3.7 | 2.1 | 89.2 | 2 | 3 | 70.4% | 46.3% | 1375 | 1610 | 235 |
| 3.8 | 2 | 89.2 | 0 | 5 | 70.6% | 93.2% | 1375 | 1685 | 310 |
| 3.9 | 1.9 | 89.2 | 1 | 4 | 67.9% | 93.2% | 1370 | 1625 | 255 |
| 3.9 | 0.9 | 89.2 | 2 | 4 | 71.8% | 96.8% | 1370 | 1485 | 115 |
| 4 | 3.8 | 89.2 | 0 | 3 | 58.3% | 53.6% | 1375 | 2000 | 625 |
| 0.4 | 3.4 | 89.2 | 1 | 6 | 34.0% | 49.4% | 1370 | 1730 | 360 |
| 0.5 | 2.3 | 89.2 | 2 | 6 | 38.4% | 38.3% | 1365 | 1430 | 65 |
| 0.6 | 1.2 | 89.2 | 0 | 9 | 47.1% | 98.7% | 1375 | 1480 | 105 |
| 0.7 | 0.1 | 89.2 | 0 | 10 | 21.7% | 100.0% | 1370 | 1560 | 190 |
| 0.8 | 1 | 89.2 | 1 | 8 | 60.6% | 96.1% | 1370 | 1495 | 125 |
| 0.8 | 4 | 89.2 | 2 | 4 | 66.3% | 20.3% | 1370 | 1840 | 470 |
| 0.9 | 2.9 | 89.2 | 0 | 7 | 78.8% | 89.1% | 1375 | 1705 | 330 |
| 1 | 2.7 | 89.3 | 1 | 6 | 86.3% | 84.3% | 1370 | 1600 | 230 |
| 1.1 | 1.6 | 89.3 | 2 | 6 | 81.3% | 75.4% | 1365 | 1435 | 70 |
| 1.1 | 0.6 | 89.3 | 0 | 9 | 60.1% | 100.0% | 1375 | 1495 | 120 |
| 1.2 | 0.5 | 89.3 | 1 | 8 | 55.2% | 99.2% | 1370 | 1510 | 140 |
| 1.3 | 3.4 | 89.3 | 2 | 4 | 95.8% | 22.9% | 1370 | 1725 | 355 |
| 1.4 | 2.3 | 89.3 | 0 | 7 | 97.6% | 91.4% | 1375 | 1590 | 215 |
| 1.5 | 0.2 | 89.3 | 1 | 8 | 26.2% | 100.0% | 1370 | 1520 | 150 |
| 1.6 | 1.1 | 89.3 | 1 | 7 | 87.1% | 95.8% | 1370 | 1430 | 60 |
| 1.7 | 1 | 89.3 | 2 | 6 | 82.1% | 96.3% | 1365 | 1445 | 80 |
| 1.7 | 4 | 89.3 | 0 | 5 | 92.2% | 86.5% | 1375 | 2000 | 625 |
| 1.8 | 3.9 | 89.3 | 1 | 4 | 88.7% | 25.9% | 1375 | 1945 | 570 |
| 1.9 | 2.8 | 89.3 | 2 | 4 | 94.3% | 25.2% | 1370 | 1630 | 260 |
| 2 | 1.7 | 89.3 | 0 | 7 | 99.0% | 94.7% | 1375 | 1485 | 110 |
| 0.2 | 1.5 | 89.3 | 1 | 8 | 16.2% | 94.1% | 1370 | 1505 | 135 |
| 2.1 | 1.6 | 89.3 | 1 | 6 | 99.7% | 94.0% | 1370 | 1420 | 50 |
| 2.1 | 0.6 | 89.3 | 2 | 6 | 60.1% | 97.8% | 1370 | 1455 | 85 |
| 2.2 | 3.5 | 89.3 | 0 | 5 | 89.7% | 87.4% | 1375 | 1930 | 555 |
| 2.3 | 3.4 | 89.3 | 1 | 4 | 88.2% | 28.3% | 1375 | 1860 | 485 |
| 2.4 | 2.3 | 89.3 | 2 | 4 | 92.2% | 30.4% | 1370 | 1555 | 185 |
| 2.5 | 1.2 | 89.3 | 0 | 7 | 96.7% | 98.4% | 1375 | 1415 | 40 |
| 2.6 | 0.1 | 89.3 | 0 | 8 | 28.4% | 100.0% | 1370 | 1440 | 70 |
| 2.7 | 1 | 89.3 | 1 | 6 | 93.2% | 96.3% | 1375 | 1425 | 50 |
| 2.7 | 4 | 89.3 | 2 | 2 | 49.1% | 59.0% | 1370 | 1970 | 600 |
| 2.8 | 2.9 | 89.3 | 0 | 5 | 82.5% | 89.6% | 1375 | 1830 | 455 |
| 2.9 | 2.8 | 89.3 | 1 | 4 | 80.5% | 35.6% | 1370 | 1765 | 395 |
| 3 | 1.7 | 89.3 | 2 | 4 | 84.2% | 37.9% | 1370 | 1455 | 85 |
| 3 | 0.7 | 89.3 | 0 | 7 | 89.6% | 100.0% | 1375 | 1435 | 60 |
| 0.3 | 0.4 | 89.3 | 1 | 9 | 22.2% | 99.8% | 1370 | 1585 | 215 |
| 3.1 | 3.6 | 89.3 | 2 | 2 | 47.9% | 60.3% | 1370 | 1905 | 535 |
| 3.2 | 2.5 | 89.3 | 0 | 5 | 77.8% | 91.0% | 1375 | 1765 | 390 |
| 3.3 | 2.4 | 89.3 | 1 | 4 | 75.6% | 76.7% | 1370 | 1700 | 330 |
| 3.4 | 3.3 | 89.3 | 0 | 4 | 71.0% | 88.5% | 1375 | 1965 | 590 |
| 3.5 | 3.2 | 89.3 | 1 | 3 | 64.5% | 45.4% | 1375 | 1900 | 525 |
| 3.6 | 2.1 | 89.3 | 0 | 5 | 73.2% | 92.5% | 1375 | 1695 | 320 |
| 3.7 | 3 | 89.3 | 1 | 3 | 64.3% | 45.8% | 1375 | 1865 | 490 |
| 3.8 | 1.9 | 89.3 | 2 | 3 | 70.4% | 46.9% | 1375 | 1560 | 185 |
| 3.8 | 0.9 | 89.3 | 0 | 6 | 76.1% | 100.0% | 1375 | 1480 | 105 |
| 3.9 | 0.8 | 89.3 | 1 | 5 | 73.3% | 97.3% | 1375 | 1485 | 110 |
| 0.4 | 2.3 | 89.3 | 0 | 8 | 33.8% | 91.1% | 1375 | 1515 | 140 |
| 0.5 | 0.2 | 89.3 | 1 | 9 | 22.6% | 100.0% | 1370 | 1585 | 215 |
| 0.6 | 1.1 | 89.3 | 1 | 8 | 46.5% | 95.7% | 1370 | 1505 | 135 |
| 0.7 | 1 | 89.3 | 2 | 7 | 54.8% | 96.2% | 1365 | 1515 | 150 |
| 0.7 | 4 | 89.3 | 0 | 6 | 68.3% | 85.6% | 1375 | 1950 | 575 |
| 0.8 | 3.9 | 89.3 | 1 | 5 | 73.3% | 10.1% | 1375 | 1875 | 500 |
| 0.9 | 2.8 | 89.3 | 2 | 5 | 73.9% | 11.7% | 1370 | 1550 | 180 |
| 1 | 1.6 | 89.4 | 0 | 8 | 80.3% | 94.8% | 1375 | 1420 | 45 |
| 1.1 | 1.5 | 89.4 | 1 | 7 | 86.7% | 94.3% | 1370 | 1435 | 65 |
| 1.1 | 0.5 | 89.4 | 2 | 7 | 46.2% | 98.2% | 1365 | 1535 | 170 |
| 1.2 | 3.4 | 89.4 | 0 | 6 | 94.5% | 87.4% | 1375 | 1830 | 455 |
| 1.3 | 0.3 | 89.4 | 1 | 8 | 36.8% | 100.0% | 1370 | 1525 | 155 |
| 1.4 | 0.2 | 89.4 | 2 | 7 | 19.6% | 99.4% | 1370 | 1540 | 170 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.5 | 1.1 | 89.4 | 2 | 6 | 80.0% | 95.9% | 1365 | 1450 | 85 |
| 1.6 | 1 | 89.4 | 0 | 8 | 88.5% | 99.5% | 1375 | 1430 | 55 |
| 1.6 | 0 | 89.4 | 1 | 8 | 58.2% | 100.0% | 1410 | 1530 | 120 |
| 1.7 | 3.9 | 89.4 | 2 | 3 | 73.3% | 40.2% | 1370 | 1865 | 495 |
| 1.8 | 2.8 | 89.4 | 0 | 6 | 95.8% | 89.7% | 1375 | 1730 | 355 |
| 1.9 | 2.7 | 89.4 | 1 | 5 | 96.6% | 66.7% | 1370 | 1660 | 290 |
| 2 | 1.6 | 89.4 | 2 | 5 | 100.0% | 60.5% | 1370 | 1390 | 20 |
| 2 | 0.6 | 89.4 | 0 | 8 | 85.4% | 100.0% | 1375 | 1440 | 65 |
| 0.2 | 0.4 | 89.4 | 2 | 8 | 15.6% | 98.6% | 1365 | 1605 | 240 |
| 2.2 | 3.4 | 89.4 | 2 | 3 | 71.9% | 42.2% | 1370 | 1785 | 415 |
| 2.3 | 2.3 | 89.4 | 0 | 6 | 93.9% | 91.5% | 1375 | 1650 | 275 |
| 2.4 | 0.2 | 89.4 | 1 | 7 | 25.2% | 100.0% | 1370 | 1460 | 90 |
| 2.5 | 1.1 | 89.4 | 1 | 6 | 96.2% | 95.9% | 1375 | 1415 | 40 |
| 2.6 | 1 | 89.4 | 2 | 5 | 89.2% | 96.3% | 1370 | 1420 | 50 |
| 2.6 | 4 | 89.4 | 0 | 4 | 80.3% | 39.8% | 1375 | 2000 | 625 |
| 2.7 | 3.9 | 89.4 | 1 | 3 | 65.8% | 43.7% | 1375 | 2000 | 625 |
| 2.8 | 2.8 | 89.4 | 2 | 3 | 70.4% | 44.2% | 1370 | 1695 | 325 |
| 2.9 | 1.7 | 89.4 | 0 | 6 | 86.8% | 94.4% | 1375 | 1540 | 165 |
| 3 | 1.6 | 89.4 | 1 | 5 | 84.2% | 94.1% | 1370 | 1475 | 105 |
| 0.3 | 0.3 | 89.4 | 0 | 10 | 21.0% | 100.0% | 1375 | 1575 | 200 |
| 3.2 | 2.4 | 89.4 | 2 | 3 | 69.4% | 45.4% | 1370 | 1630 | 260 |
| 3.3 | 1.3 | 89.4 | 0 | 6 | 82.2% | 97.3% | 1375 | 1460 | 85 |
| 3.4 | 1.2 | 89.4 | 1 | 5 | 80.4% | 95.6% | 1375 | 1465 | 90 |
| 3.4 | 3.2 | 89.4 | 2 | 2 | 47.2% | 61.4% | 1370 | 1830 | 460 |
| 3.5 | 3.1 | 89.4 | 2 | 2 | 47.0% | 61.6% | 1370 | 1815 | 445 |
| 3.6 | 3 | 89.4 | 0 | 4 | 68.9% | 89.4% | 1375 | 1900 | 525 |
| 3.7 | 2.9 | 89.4 | 1 | 3 | 64.5% | 46.1% | 1375 | 1840 | 465 |
| 3.8 | 1.8 | 89.4 | 2 | 3 | 70.6% | 47.0% | 1375 | 1530 | 155 |
| 3.8 | 0.8 | 89.4 | 0 | 6 | 76.0% | 100.0% | 1375 | 1480 | 105 |
| 3.9 | 0.7 | 89.4 | 1 | 5 | 73.4% | 97.7% | 1375 | 1485 | 110 |
| 0.4 | 0.2 | 89.4 | 0 | 10 | 20.9% | 100.0% | 1375 | 1575 | 200 |
| 0.5 | 1.1 | 89.4 | 0 | 9 | 39.6% | 98.6% | 1375 | 1500 | 125 |
| 0.6 | 2 | 89.4 | 1 | 7 | 52.8% | 92.3% | 1370 | 1430 | 60 |
| 0.6 | 0 | 89.4 | 2 | 8 | 22.8% | 100.0% | 1415 | 1610 | 195 |
| 0.7 | 3.9 | 89.4 | 0 | 6 | 68.5% | 85.9% | 1375 | 1920 | 545 |
| 0.8 | 3.8 | 89.4 | 1 | 5 | 73.6% | 10.1% | 1375 | 1840 | 465 |
| 1 | 1.5 | 89.5 | 0 | 8 | 80.6% | 95.2% | 1375 | 1430 | 55 |
| 1.1 | 1.4 | 89.5 | 1 | 7 | 82.9% | 94.6% | 1370 | 1445 | 75 |
| 1.1 | 0.4 | 89.5 | 2 | 7 | 36.0% | 98.6% | 1365 | 1545 | 180 |
| 1.4 | 2.1 | 89.5 | 1 | 6 | 99.0% | 92.1% | 1370 | 1475 | 105 |
| 1.5 | 2 | 89.5 | 2 | 5 | 100.0% | 19.6% | 1370 | 1400 | 30 |
| 1.5 | 0 | 89.5 | 0 | 9 | 55.2% | 100.0% | 1400 | 1525 | 125 |
| 1.6 | 0.9 | 89.5 | 1 | 7 | 79.5% | 96.6% | 1370 | 1455 | 85 |
| 1.7 | 3.8 | 89.5 | 2 | 3 | 73.6% | 40.4% | 1370 | 1835 | 465 |
| 1.9 | 2.6 | 89.5 | 1 | 5 | 96.9% | 66.5% | 1370 | 1630 | 260 |
| 2 | 1.5 | 89.5 | 2 | 5 | 100.0% | 60.3% | 1370 | 1390 | 20 |
| 2 | 0.5 | 89.5 | 0 | 8 | 75.8% | 100.0% | 1375 | 1450 | 75 |
| 2.2 | 0.3 | 89.5 | 0 | 8 | 55.2% | 100.0% | 1375 | 1455 | 80 |
| 2.4 | 2.1 | 89.5 | 1 | 5 | 92.1% | 92.3% | 1370 | 1550 | 180 |
| 2.5 | 2 | 89.5 | 2 | 4 | 91.7% | 31.9% | 1370 | 1480 | 110 |
| 2.5 | 0 | 89.5 | 0 | 8 | 63.6% | 100.0% | 1395 | 1460 | 65 |
| 2.7 | 3.8 | 89.5 | 2 | 2 | 49.4% | 59.6% | 1370 | 1910 | 540 |
| 2.9 | 2.6 | 89.5 | 1 | 4 | 81.2% | 35.8% | 1370 | 1705 | 335 |
| 0.3 | 3.2 | 89.5 | 2 | 5 | 24.7% | 3.9% | 1370 | 1585 | 215 |
| 3.3 | 0.2 | 89.5 | 2 | 5 | 17.1% | 99.4% | 1370 | 1450 | 80 |
| 3.4 | 1.1 | 89.5 | 2 | 4 | 79.4% | 73.4% | 1370 | 1465 | 95 |
| 3.5 | 1 | 89.5 | 0 | 6 | 80.1% | 99.1% | 1375 | 1465 | 90 |
| 3.5 | 0 | 89.5 | 1 | 6 | 92.0% | 100.0% | 1410 | 1460 | 50 |
| 3.7 | 2.8 | 89.5 | 0 | 4 | 68.1% | 90.1% | 1375 | 1855 | 480 |
| 3.8 | 2.7 | 89.5 | 1 | 3 | 64.6% | 46.5% | 1375 | 1795 | 420 |
| 3.9 | 0.6 | 89.5 | 0 | 6 | 73.6% | 100.0% | 1370 | 1485 | 115 |
| 4 | 0.5 | 89.5 | 1 | 5 | 59.7% | 98.7% | 1375 | 1490 | 115 |
| 0.4 | 3.1 | 89.5 | 1 | 6 | 34.3% | 48.7% | 1370 | 1635 | 265 |
| 0.7 | 1.8 | 89.5 | 1 | 7 | 60.5% | 93.1% | 1370 | 1440 | 70 |
| 0.7 | 0.8 | 89.5 | 2 | 7 | 47.6% | 97.0% | 1365 | 1535 | 170 |
| 0.8 | 3.7 | 89.5 | 0 | 6 | 78.5% | 86.5% | 1375 | 1870 | 495 |
| 0.9 | 3.6 | 89.5 | 1 | 5 | 83.1% | 11.4% | 1375 | 1795 | 420 |
| 1 | 2.4 | 89.6 | 2 | 5 | 83.0% | 13.1% | 1370 | 1445 | 75 |
| 1.1 | 1.3 | 89.6 | 0 | 8 | 83.9% | 96.3% | 1375 | 1445 | 70 |
| 1.2 | 1.2 | 89.6 | 1 | 7 | 78.5% | 95.4% | 1370 | 1455 | 85 |
| 1.2 | 3.2 | 89.6 | 2 | 4 | 96.8% | 22.9% | 1370 | 1645 | 275 |
| 1.3 | 3.1 | 89.6 | 2 | 4 | 97.0% | 23.4% | 1370 | 1630 | 260 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.4 | 3 | 89.6 | 0 | 6 | 95.7% | 88.9% | 1375 | 1735 | 360 |
| 1.5 | 2.9 | 89.6 | 1 | 5 | 96.5% | 19.1% | 1370 | 1665 | 295 |
| 1.6 | 1.8 | 89.6 | 2 | 5 | 100.0% | 21.0% | 1370 | 1395 | 25 |
| 1.6 | 0.8 | 89.6 | 0 | 8 | 80.4% | 100.0% | 1375 | 1450 | 75 |
| 1.7 | 0.7 | 89.6 | 1 | 7 | 71.8% | 97.4% | 1370 | 1465 | 95 |
| 1.8 | 3.6 | 89.6 | 2 | 3 | 73.3% | 41.1% | 1370 | 1785 | 415 |
| 1.9 | 2.5 | 89.6 | 0 | 6 | 96.7% | 90.7% | 1375 | 1655 | 280 |
| 2 | 2.4 | 89.6 | 1 | 5 | 97.5% | 72.0% | 1370 | 1585 | 215 |
| 0.2 | 1.2 | 89.6 | 2 | 7 | 16.2% | 95.6% | 1365 | 1545 | 180 |
| 2.1 | 1.3 | 89.6 | 0 | 7 | 100.0% | 96.4% | 1375 | 1395 | 20 |
| 2.2 | 1.2 | 89.6 | 1 | 6 | 99.5% | 95.5% | 1370 | 1400 | 30 |
| 2.3 | 3.1 | 89.6 | 2 | 3 | 72.3% | 43.0% | 1370 | 1710 | 340 |
| 2.4 | 3 | 89.6 | 0 | 5 | 88.4% | 89.1% | 1375 | 1810 | 435 |
| 2.5 | 2.9 | 89.6 | 1 | 4 | 87.9% | 31.0% | 1375 | 1740 | 365 |
| 2.8 | 3.6 | 89.6 | 2 | 2 | 49.2% | 60.2% | 1370 | 1865 | 495 |
| 2.9 | 2.5 | 89.6 | 0 | 5 | 82.4% | 91.0% | 1375 | 1725 | 350 |
| 3 | 2.4 | 89.6 | 1 | 4 | 80.3% | 59.6% | 1370 | 1660 | 290 |
| 0.3 | 1.1 | 89.6 | 2 | 7 | 24.4% | 95.8% | 1365 | 1545 | 180 |
| 3.1 | 1.3 | 89.6 | 0 | 6 | 85.2% | 96.5% | 1375 | 1450 | 75 |
| 3.2 | 1.2 | 89.6 | 1 | 5 | 82.2% | 95.6% | 1370 | 1455 | 85 |
| 3.2 | 3.2 | 89.6 | 2 | 2 | 48.0% | 61.4% | 1370 | 1805 | 435 |
| 3.3 | 3.1 | 89.6 | 2 | 2 | 47.7% | 61.6% | 1370 | 1785 | 415 |
| 3.4 | 3 | 89.6 | 0 | 4 | 71.9% | 89.5% | 1375 | 1880 | 505 |
| 3.5 | 2.9 | 89.6 | 1 | 3 | 65.1% | 46.1% | 1375 | 1815 | 440 |
| 3.6 | 1.8 | 89.6 | 2 | 3 | 71.5% | 47.0% | 1375 | 1505 | 130 |
| 3.6 | 0.8 | 89.6 | 0 | 6 | 78.7% | 100.0% | 1375 | 1470 | 95 |
| 3.7 | 0.7 | 89.6 | 1 | 5 | 75.2% | 97.5% | 1375 | 1480 | 105 |
| 3.8 | 3.6 | 89.6 | 2 | 1 | 24.6% | 78.3% | 1370 | 1935 | 565 |
| 3.9 | 2.5 | 89.6 | 0 | 4 | 66.0% | 91.2% | 1375 | 1795 | 420 |
| 4 | 2.4 | 89.6 | 1 | 3 | 64.5% | 48.3% | 1375 | 1730 | 355 |
| 0.4 | 1 | 89.6 | 2 | 7 | 32.6% | 96.2% | 1365 | 1545 | 180 |
| 0.4 | 4 | 89.6 | 0 | 6 | 39.2% | 86.1% | 1375 | 1910 | 535 |
| 0.5 | 3.9 | 89.6 | 1 | 5 | 46.2% | 6.5% | 1375 | 1830 | 455 |
| 0.6 | 2.8 | 89.6 | 2 | 5 | 49.7% | 7.9% | 1370 | 1505 | 135 |
| 0.7 | 1.7 | 89.6 | 0 | 8 | 58.1% | 93.4% | 1375 | 1440 | 65 |
| 0.8 | 1.6 | 89.6 | 1 | 7 | 68.0% | 93.8% | 1370 | 1450 | 80 |
| 0.8 | 0.6 | 89.6 | 2 | 7 | 43.4% | 97.8% | 1365 | 1550 | 185 |
| 0.9 | 3.5 | 89.6 | 0 | 6 | 88.6% | 87.0% | 1375 | 1820 | 445 |
| 1 | 0.3 | 89.7 | 1 | 8 | 32.9% | 99.0% | 1370 | 1550 | 180 |
| 1.1 | 0.2 | 89.7 | 0 | 9 | 35.1% | 100.0% | 1375 | 1535 | 160 |
| 1.2 | 1.1 | 89.7 | 0 | 8 | 79.3% | 97.4% | 1375 | 1455 | 80 |
| 1.3 | 2 | 89.7 | 1 | 6 | 99.6% | 92.4% | 1370 | 1430 | 60 |
| 1.3 | 0 | 89.7 | 2 | 7 | 47.1% | 100.0% | 1420 | 1570 | 150 |
| 1.4 | 3.9 | 89.7 | 0 | 5 | 93.1% | 25.6% | 1375 | 1945 | 570 |
| 1.5 | 3.8 | 89.7 | 1 | 4 | 91.1% | 25.8% | 1375 | 1870 | 495 |
| 1.6 | 2.7 | 89.7 | 2 | 4 | 96.5% | 24.8% | 1370 | 1555 | 185 |
| 1.7 | 1.6 | 89.7 | 0 | 7 | 99.9% | 93.9% | 1375 | 1415 | 40 |
| 1.8 | 1.5 | 89.7 | 1 | 6 | 100.0% | 94.4% | 1370 | 1390 | 20 |
| 1.8 | 0.5 | 89.7 | 2 | 6 | 41.6% | 98.2% | 1365 | 1490 | 125 |
| 1.9 | 3.4 | 89.7 | 0 | 5 | 94.1% | 88.2% | 1375 | 1860 | 485 |
| 2 | 0.3 | 89.7 | 1 | 7 | 32.3% | 99.2% | 1370 | 1485 | 115 |
| 0.2 | 2.1 | 89.7 | 2 | 6 | 17.2% | 2.7% | 1370 | 1480 | 110 |
| 2.1 | 0.2 | 89.7 | 0 | 8 | 37.6% | 100.0% | 1375 | 1475 | 100 |
| 2.2 | 1.1 | 89.7 | 0 | 7 | 100.0% | 97.5% | 1375 | 1400 | 25 |
| 2.3 | 2 | 89.7 | 1 | 5 | 94.2% | 88.9% | 1370 | 1505 | 135 |
| 2.3 | 0 | 89.7 | 2 | 6 | 78.0% | 100.0% | 1420 | 1505 | 85 |
| 2.4 | 3.9 | 89.7 | 0 | 4 | 81.0% | 40.0% | 1375 | 2000 | 625 |
| 2.5 | 3.8 | 89.7 | 1 | 3 | 66.7% | 43.9% | 1375 | 1945 | 570 |
| 2.6 | 2.7 | 89.7 | 2 | 3 | 71.6% | 44.2% | 1370 | 1635 | 265 |
| 2.7 | 1.6 | 89.7 | 0 | 6 | 90.3% | 94.1% | 1375 | 1485 | 110 |
| 2.8 | 1.5 | 89.7 | 1 | 5 | 87.8% | 94.5% | 1370 | 1435 | 65 |
| 2.8 | 0.5 | 89.7 | 2 | 5 | 44.5% | 98.2% | 1370 | 1425 | 55 |
| 2.9 | 3.4 | 89.7 | 0 | 4 | 78.2% | 89.0% | 1375 | 1930 | 555 |
| 3 | 0.3 | 89.7 | 1 | 6 | 37.4% | 99.3% | 1375 | 1435 | 60 |
| 0.3 | 2 | 89.7 | 2 | 6 | 25.9% | 24.2% | 1370 | 1480 | 110 |
| 3.1 | 1.2 | 89.7 | 0 | 6 | 85.5% | 96.9% | 1375 | 1450 | 75 |
| 3.2 | 0.1 | 89.7 | 0 | 7 | 21.4% | 100.0% | 1370 | 1445 | 75 |
| 3.3 | 1 | 89.7 | 1 | 5 | 81.0% | 96.4% | 1370 | 1460 | 90 |
| 3.3 | 4 | 89.7 | 2 | 1 | 26.0% | 77.4% | 1370 | 1985 | 615 |
| 3.4 | 2.9 | 89.7 | 0 | 4 | 72.2% | 89.9% | 1375 | 1850 | 475 |
| 3.5 | 2.8 | 89.7 | 1 | 3 | 65.3% | 46.3% | 1375 | 1785 | 410 |
| 3.6 | 1.7 | 89.7 | 2 | 3 | 71.7% | 47.2% | 1375 | 1475 | 100 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.6 | 0.7 | 89.7 | 0 | 6 | 78.7% | 100.0% | 1375 | 1470 | 95 |
| 3.7 | 0.6 | 89.7 | 1 | 5 | 64.9% | 97.8% | 1375 | 1480 | 105 |
| 3.8 | 3.5 | 89.7 | 2 | 1 | 24.7% | 78.6% | 1370 | 1905 | 535 |
| 3.9 | 2.4 | 89.7 | 0 | 4 | 66.3% | 91.5% | 1375 | 1765 | 390 |
| 4 | 2.3 | 89.7 | 1 | 3 | 64.7% | 48.5% | 1375 | 1700 | 325 |
| 0.4 | 1.9 | 89.7 | 2 | 6 | 34.6% | 30.5% | 1370 | 1475 | 105 |
| 0.4 | 0.9 | 89.7 | 0 | 9 | 32.1% | 98.9% | 1375 | 1530 | 155 |
| 0.5 | 0.8 | 89.7 | 1 | 8 | 39.9% | 96.9% | 1370 | 1545 | 175 |
| 0.6 | 3.7 | 89.7 | 2 | 4 | 50.9% | 20.0% | 1370 | 1710 | 340 |
| 0.7 | 2.6 | 89.7 | 0 | 7 | 65.1% | 90.1% | 1375 | 1580 | 205 |
| 0.8 | 2.5 | 89.7 | 1 | 6 | 69.5% | 71.8% | 1370 | 1510 | 140 |
| 0.9 | 1.4 | 89.7 | 2 | 6 | 64.4% | 62.1% | 1365 | 1470 | 105 |
| 0.9 | 0.4 | 89.7 | 0 | 9 | 44.6% | 100.0% | 1375 | 1535 | 160 |
| 1 | 3.2 | 89.8 | 2 | 4 | 84.0% | 22.3% | 1370 | 1615 | 245 |
| 1.1 | 3.1 | 89.8 | 2 | 4 | 92.2% | 22.8% | 1370 | 1600 | 230 |
| 1.2 | 3 | 89.8 | 0 | 6 | 96.0% | 88.8% | 1375 | 1710 | 335 |
| 1.3 | 2.9 | 89.8 | 1 | 5 | 97.0% | 16.7% | 1375 | 1635 | 260 |
| 1.4 | 1.8 | 89.8 | 2 | 5 | 94.1% | 18.5% | 1370 | 1410 | 40 |
| 1.4 | 0.8 | 89.8 | 0 | 8 | 73.8% | 99.3% | 1375 | 1470 | 95 |
| 1.5 | 0.7 | 89.8 | 1 | 7 | 68.8% | 97.4% | 1370 | 1485 | 115 |
| 1.6 | 3.6 | 89.8 | 2 | 3 | 74.9% | 40.7% | 1370 | 1755 | 385 |
| 1.7 | 2.5 | 89.8 | 0 | 6 | 97.1% | 90.7% | 1375 | 1630 | 255 |
| 1.8 | 2.4 | 89.8 | 1 | 5 | 97.9% | 60.2% | 1370 | 1555 | 185 |
| 1.9 | 1.3 | 89.8 | 2 | 5 | 94.1% | 53.5% | 1370 | 1410 | 40 |
| 1.9 | 3.3 | 89.8 | 0 | 5 | 94.5% | 88.6% | 1375 | 1830 | 455 |
| 2 | 3.2 | 89.8 | 2 | 3 | 73.0% | 42.3% | 1370 | 1695 | 325 |
| 0.2 | 3 | 89.8 | 0 | 7 | 20.1% | 88.5% | 1375 | 1635 | 260 |
| 2.1 | 2.1 | 89.8 | 0 | 6 | 97.9% | 92.2% | 1375 | 1560 | 185 |
| 2.2 | 3 | 89.8 | 1 | 4 | 89.6% | 27.9% | 1375 | 1730 | 355 |
| 2.3 | 1.9 | 89.8 | 2 | 4 | 95.0% | 29.6% | 1370 | 1420 | 50 |
| 2.3 | 0.9 | 89.8 | 0 | 7 | 100.0% | 98.6% | 1375 | 1405 | 30 |
| 2.4 | 0.8 | 89.8 | 1 | 6 | 74.8% | 97.0% | 1370 | 1410 | 40 |
| 2.5 | 3.7 | 89.8 | 2 | 2 | 50.6% | 59.7% | 1370 | 1850 | 480 |
| 2.6 | 2.6 | 89.8 | 0 | 5 | 86.7% | 90.5% | 1375 | 1720 | 345 |
| 2.7 | 2.5 | 89.8 | 1 | 4 | 86.1% | 33.7% | 1375 | 1650 | 275 |
| 2.8 | 1.4 | 89.8 | 2 | 4 | 88.6% | 36.0% | 1370 | 1435 | 65 |
| 2.8 | 0.4 | 89.8 | 0 | 7 | 59.1% | 100.0% | 1375 | 1425 | 50 |
| 2.9 | 3.3 | 89.8 | 1 | 3 | 66.3% | 45.1% | 1375 | 1850 | 475 |
| 3 | 2.2 | 89.8 | 2 | 3 | 70.7% | 45.7% | 1370 | 1545 | 175 |
| 0.3 | 2.9 | 89.8 | 0 | 7 | 30.3% | 88.9% | 1375 | 1620 | 245 |
| 3.1 | 1.1 | 89.8 | 0 | 6 | 85.6% | 97.2% | 1375 | 1450 | 75 |
| 3.2 | 2 | 89.8 | 1 | 4 | 78.5% | 70.3% | 1370 | 1570 | 200 |
| 3.2 | 0 | 89.8 | 2 | 5 | 100.0% | 100.0% | 1425 | 1440 | 15 |
| 3.3 | 3.9 | 89.8 | 0 | 3 | 59.5% | 53.8% | 1375 | 2000 | 625 |
| 3.4 | 3.8 | 89.8 | 1 | 2 | 44.0% | 61.2% | 1375 | 2000 | 625 |
| 3.5 | 2.7 | 89.8 | 2 | 2 | 47.5% | 62.7% | 1370 | 1695 | 325 |
| 3.6 | 1.6 | 89.8 | 0 | 5 | 74.8% | 94.2% | 1375 | 1540 | 165 |
| 3.7 | 1.5 | 89.8 | 1 | 4 | 72.3% | 94.6% | 1370 | 1480 | 110 |
| 3.7 | 0.5 | 89.8 | 2 | 4 | 41.0% | 90.3% | 1370 | 1475 | 105 |
| 3.8 | 3.4 | 89.8 | 0 | 3 | 59.4% | 54.7% | 1375 | 1985 | 610 |
| 3.9 | 0.3 | 89.8 | 1 | 5 | 35.1% | 99.0% | 1375 | 1485 | 110 |
| 4 | 0.2 | 89.8 | 0 | 6 | 34.6% | 100.0% | 1370 | 1490 | 120 |
| 0.4 | 2.8 | 89.8 | 1 | 6 | 34.6% | 47.9% | 1370 | 1540 | 170 |
| 0.5 | 1.7 | 89.8 | 2 | 6 | 43.5% | 36.6% | 1370 | 1485 | 115 |
| 0.5 | 0.7 | 89.8 | 0 | 9 | 40.2% | 100.0% | 1375 | 1540 | 165 |
| 0.6 | 0.6 | 89.8 | 1 | 8 | 39.2% | 97.7% | 1370 | 1555 | 185 |
| 0.7 | 3.5 | 89.8 | 2 | 4 | 59.4% | 20.8% | 1370 | 1660 | 290 |
| 0.8 | 2.4 | 89.8 | 0 | 7 | 73.2% | 90.9% | 1375 | 1535 | 160 |
| 0.9 | 2.3 | 89.8 | 1 | 6 | 78.6% | 77.6% | 1370 | 1460 | 90 |
| 1 | 1.1 | 89.9 | 1 | 7 | 68.5% | 95.8% | 1370 | 1485 | 115 |
| 1.1 | 1 | 89.9 | 2 | 6 | 60.8% | 74.3% | 1365 | 1495 | 130 |
| 1.1 | 4 | 89.9 | 0 | 5 | 93.3% | 25.4% | 1375 | 1935 | 560 |
| 1.2 | 3.9 | 89.9 | 1 | 4 | 94.2% | 25.2% | 1375 | 1855 | 480 |
| 1.3 | 2.8 | 89.9 | 2 | 4 | 98.2% | 23.9% | 1370 | 1535 | 165 |
| 1.4 | 1.7 | 89.9 | 0 | 7 | 100.0% | 93.5% | 1375 | 1405 | 30 |
| 1.5 | 1.6 | 89.9 | 1 | 6 | 98.3% | 93.9% | 1370 | 1405 | 35 |
| 1.5 | 0.6 | 89.9 | 2 | 6 | 49.2% | 97.8% | 1365 | 1505 | 140 |
| 1.6 | 3.5 | 89.9 | 0 | 5 | 94.2% | 88.4% | 1375 | 1850 | 475 |
| 1.7 | 3.4 | 89.9 | 1 | 4 | 90.6% | 26.7% | 1375 | 1775 | 400 |
| 1.8 | 2.3 | 89.9 | 2 | 4 | 96.3% | 25.9% | 1370 | 1465 | 95 |
| 1.9 | 1.2 | 89.9 | 0 | 7 | 100.0% | 95.9% | 1375 | 1400 | 25 |
| 2 | 1.1 | 89.9 | 1 | 6 | 94.5% | 95.9% | 1370 | 1415 | 45 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.2 | 1.9 | 89.9 | 2 | 6 | 17.3% | 2.7% | 1370 | 1500 | 130 |
| 0.2 | 0.9 | 89.9 | 0 | 9 | 16.0% | 98.1% | 1375 | 1550 | 175 |
| 2.1 | 4 | 89.9 | 1 | 3 | 67.5% | 43.2% | 1375 | 1945 | 570 |
| 2.2 | 2.9 | 89.9 | 2 | 3 | 72.9% | 43.3% | 1370 | 1635 | 265 |
| 2.3 | 1.8 | 89.9 | 0 | 6 | 95.9% | 93.3% | 1375 | 1495 | 120 |
| 2.4 | 1.7 | 89.9 | 1 | 5 | 93.7% | 93.7% | 1370 | 1430 | 60 |
| 2.4 | 0.7 | 89.9 | 2 | 5 | 60.7% | 83.6% | 1370 | 1435 | 65 |
| 2.5 | 3.6 | 89.9 | 0 | 4 | 81.4% | 40.6% | 1375 | 1940 | 565 |
| 2.6 | 3.5 | 89.9 | 1 | 3 | 66.9% | 44.6% | 1375 | 1870 | 495 |
| 2.7 | 2.4 | 89.9 | 2 | 3 | 71.8% | 45.0% | 1370 | 1560 | 190 |
| 2.8 | 1.3 | 89.9 | 0 | 6 | 89.8% | 95.3% | 1375 | 1435 | 60 |
| 2.9 | 1.2 | 89.9 | 1 | 5 | 86.9% | 95.6% | 1370 | 1440 | 70 |
| 2.9 | 3.2 | 89.9 | 0 | 4 | 78.9% | 89.7% | 1375 | 1875 | 500 |
| 3 | 3.1 | 89.9 | 0 | 4 | 77.7% | 89.9% | 1375 | 1860 | 485 |
| 0.3 | 0.8 | 89.9 | 1 | 8 | 24.8% | 96.9% | 1370 | 1565 | 195 |
| 3.1 | 3 | 89.9 | 2 | 2 | 48.7% | 61.9% | 1370 | 1730 | 360 |
| 3.2 | 1.9 | 89.9 | 0 | 5 | 79.8% | 93.1% | 1375 | 1585 | 210 |
| 3.3 | 1.8 | 89.9 | 1 | 4 | 77.6% | 75.6% | 1370 | 1520 | 150 |
| 3.3 | 0.8 | 89.9 | 2 | 4 | 60.2% | 66.8% | 1370 | 1455 | 85 |
| 3.4 | 3.7 | 89.9 | 0 | 3 | 59.6% | 54.2% | 1375 | 2000 | 625 |
| 3.5 | 3.6 | 89.9 | 1 | 2 | 43.9% | 61.7% | 1375 | 1955 | 580 |
| 3.6 | 2.5 | 89.9 | 2 | 2 | 47.4% | 63.3% | 1370 | 1650 | 280 |
| 3.7 | 1.4 | 89.9 | 0 | 5 | 73.9% | 94.9% | 1375 | 1490 | 115 |
| 3.8 | 1.3 | 89.9 | 1 | 4 | 71.4% | 95.3% | 1370 | 1485 | 115 |
| 3.8 | 3.3 | 89.9 | 2 | 1 | 24.9% | 79.2% | 1370 | 1850 | 480 |
| 3.9 | 2.2 | 89.9 | 0 | 4 | 66.9% | 92.2% | 1375 | 1705 | 330 |
| 0.4 | 3.7 | 89.9 | 1 | 5 | 37.3% | 6.6% | 1370 | 1750 | 375 |
| 0.5 | 2.6 | 89.9 | 2 | 5 | 41.8% | 6.6% | 1370 | 1425 | 55 |
| 0.6 | 1.5 | 89.9 | 0 | 8 | 50.9% | 94.2% | 1375 | 1470 | 95 |
| 0.7 | 1.4 | 89.9 | 1 | 7 | 61.6% | 94.6% | 1370 | 1480 | 110 |
| 0.7 | 0.4 | 89.9 | 2 | 7 | 33.1% | 98.6% | 1365 | 1580 | 215 |
| 0.8 | 0.3 | 89.9 | 0 | 9 | 37.0% | 100.0% | 1375 | 1550 | 175 |
| 0.9 | 2.2 | 89.9 | 2 | 5 | 75.3% | 11.9% | 1370 | 1420 | 50 |
| 1 | 2 | 90 | 0 | 7 | 89.1% | 92.4% | 1375 | 1440 | 65 |
| 1.1 | 1.9 | 90 | 1 | 6 | 95.2% | 89.2% | 1370 | 1410 | 40 |
| 1.1 | 0.9 | 90 | 2 | 6 | 58.0% | 74.1% | 1365 | 1510 | 145 |
| 1.2 | 3.8 | 90 | 0 | 5 | 93.8% | 25.7% | 1375 | 1885 | 510 |
| 1.3 | 3.7 | 90 | 1 | 4 | 93.5% | 25.7% | 1375 | 1810 | 435 |
| 1.4 | 2.6 | 90 | 2 | 4 | 98.8% | 24.5% | 1370 | 1490 | 120 |
| 1.5 | 1.5 | 90 | 0 | 7 | 99.5% | 94.3% | 1375 | 1405 | 30 |
| 1.6 | 1.4 | 90 | 1 | 6 | 93.9% | 94.7% | 1370 | 1415 | 45 |
| 1.6 | 0.4 | 90 | 2 | 6 | 31.2% | 98.6% | 1365 | 1520 | 155 |
| 1.7 | 0.3 | 90 | 0 | 8 | 42.7% | 100.0% | 1375 | 1495 | 120 |
| 1.8 | 2.2 | 90 | 1 | 5 | 98.7% | 59.7% | 1370 | 1495 | 125 |
| 1.9 | 2.1 | 90 | 1 | 5 | 98.9% | 65.5% | 1370 | 1480 | 110 |
| 2 | 2 | 90 | 2 | 4 | 96.4% | 26.8% | 1370 | 1405 | 35 |
| 0.2 | 0.8 | 90 | 1 | 8 | 16.7% | 96.9% | 1370 | 1575 | 205 |
| 2.1 | 3.9 | 90 | 2 | 2 | 51.1% | 58.7% | 1370 | 1850 | 480 |
| 2.2 | 2.8 | 90 | 0 | 5 | 92.4% | 89.8% | 1375 | 1725 | 350 |
| 2.3 | 2.7 | 90 | 1 | 4 | 90.0% | 28.9% | 1375 | 1655 | 280 |
| 2.4 | 1.6 | 90 | 2 | 4 | 94.9% | 31.1% | 1370 | 1415 | 45 |
| 2.4 | 0.6 | 90 | 0 | 7 | 73.1% | 100.0% | 1375 | 1425 | 50 |
| 2.5 | 0.5 | 90 | 1 | 6 | 46.9% | 98.2% | 1370 | 1435 | 65 |
| 2.6 | 3.4 | 90 | 2 | 2 | 50.5% | 60.6% | 1370 | 1775 | 405 |
| 2.7 | 2.3 | 90 | 0 | 5 | 86.2% | 91.6% | 1375 | 1640 | 265 |
| 2.8 | 0.2 | 90 | 1 | 6 | 21.9% | 99.4% | 1375 | 1445 | 70 |
| 2.9 | 1.1 | 90 | 2 | 4 | 80.7% | 37.5% | 1370 | 1435 | 65 |
| 3 | 1 | 90 | 0 | 6 | 87.1% | 97.1% | 1375 | 1445 | 70 |
| 0.3 | 3.7 | 90 | 2 | 4 | 40.1% | 12.3% | 1385 | 1660 | 275 |
| 3.1 | 2.9 | 90 | 0 | 4 | 76.8% | 90.4% | 1375 | 1810 | 435 |
| 3.2 | 2.8 | 90 | 1 | 3 | 66.2% | 46.3% | 1375 | 1745 | 370 |
| 3.3 | 1.7 | 90 | 2 | 3 | 71.1% | 47.1% | 1370 | 1460 | 90 |
| 3.3 | 0.7 | 90 | 0 | 6 | 80.8% | 99.4% | 1375 | 1460 | 85 |
| 3.4 | 0.6 | 90 | 1 | 5 | 53.5% | 97.8% | 1370 | 1465 | 95 |
| 3.5 | 3.5 | 90 | 2 | 1 | 25.7% | 78.9% | 1370 | 1865 | 495 |
| 3.6 | 2.4 | 90 | 0 | 4 | 70.8% | 91.4% | 1375 | 1730 | 355 |
| 3.7 | 2.3 | 90 | 1 | 3 | 65.6% | 47.5% | 1375 | 1665 | 290 |
| 3.8 | 1.2 | 90 | 2 | 3 | 73.1% | 48.5% | 1375 | 1485 | 110 |
| 3.9 | 3.1 | 90 | 0 | 3 | 59.7% | 55.4% | 1375 | 1910 | 535 |
| 0.4 | 2.6 | 90 | 2 | 5 | 33.5% | 5.3% | 1370 | 1435 | 65 |
| 0.5 | 1.5 | 90 | 0 | 8 | 43.1% | 94.2% | 1375 | 1475 | 100 |
| 0.6 | 1.4 | 90 | 1 | 7 | 54.4% | 94.6% | 1370 | 1490 | 120 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.6 | 0.4 | 90 | 2 | 7 | 29.8% | 98.6% | 1365 | 1590 | 225 |
| 0.7 | 0.3 | 90 | 0 | 9 | 33.5% | 100.0% | 1375 | 1560 | 185 |
| 0.8 | 2.2 | 90 | 2 | 5 | 67.2% | 10.7% | 1370 | 1430 | 60 |
| 0.9 | 2.1 | 90 | 0 | 7 | 81.5% | 92.0% | 1375 | 1455 | 80 |
| 1 | 3.9 | 90.1 | 1 | 4 | 94.3% | 24.8% | 1375 | 1825 | 450 |
| 1.1 | 2.8 | 90.1 | 2 | 4 | 93.1% | 23.3% | 1370 | 1505 | 135 |
| 1.2 | 1.7 | 90.1 | 0 | 7 | 97.7% | 93.5% | 1375 | 1410 | 35 |
| 1.3 | 0.6 | 90.1 | 2 | 6 | 48.3% | 86.6% | 1365 | 1525 | 160 |
| 1.4 | 3.5 | 90.1 | 0 | 5 | 94.6% | 26.3% | 1375 | 1825 | 450 |
| 1.5 | 3.4 | 90.1 | 1 | 4 | 92.2% | 26.5% | 1375 | 1745 | 370 |
| 1.6 | 2.3 | 90.1 | 2 | 4 | 97.8% | 25.5% | 1370 | 1430 | 60 |
| 1.7 | 1.2 | 90.1 | 0 | 7 | 94.2% | 95.5% | 1375 | 1420 | 45 |
| 1.8 | 1.1 | 90.1 | 2 | 5 | 83.1% | 46.6% | 1370 | 1440 | 70 |
| 1.9 | 0 | 90.1 | 1 | 7 | 67.2% | 100.0% | 1420 | 1525 | 105 |
| 2 | 3.9 | 90.1 | 2 | 2 | 51.5% | 58.6% | 1370 | 1835 | 465 |
| 0.2 | 2.7 | 90.1 | 0 | 7 | 20.3% | 89.6% | 1375 | 1540 | 165 |
| 2.2 | 0.7 | 90.1 | 0 | 7 | 79.9% | 98.9% | 1375 | 1430 | 55 |
| 2.3 | 0.6 | 90.1 | 1 | 6 | 54.5% | 97.8% | 1370 | 1440 | 70 |
| 2.4 | 3.5 | 90.1 | 2 | 2 | 50.9% | 60.2% | 1370 | 1775 | 405 |
| 2.5 | 2.4 | 90.1 | 0 | 5 | 89.1% | 91.2% | 1375 | 1645 | 270 |
| 2.6 | 2.3 | 90.1 | 1 | 4 | 88.5% | 32.7% | 1375 | 1575 | 200 |
| 2.7 | 3.2 | 90.1 | 0 | 4 | 81.8% | 41.4% | 1375 | 1850 | 475 |
| 2.8 | 3.1 | 90.1 | 0 | 4 | 80.8% | 41.6% | 1375 | 1830 | 455 |
| 2.9 | 4 | 90.1 | 1 | 2 | 45.1% | 60.8% | 1375 | 1990 | 615 |
| 3.1 | 1.8 | 90.1 | 1 | 4 | 80.8% | 64.0% | 1370 | 1495 | 125 |
| 3.1 | 0.8 | 90.1 | 2 | 4 | 54.6% | 40.1% | 1370 | 1445 | 75 |
| 3.3 | 3.6 | 90.1 | 1 | 2 | 44.5% | 61.8% | 1370 | 1930 | 555 |
| 3.4 | 2.5 | 90.1 | 2 | 2 | 48.2% | 63.3% | 1370 | 1625 | 255 |
| 3.5 | 1.4 | 90.1 | 0 | 5 | 76.9% | 94.9% | 1375 | 1470 | 95 |
| 3.6 | 1.3 | 90.1 | 1 | 4 | 74.5% | 92.0% | 1370 | 1480 | 110 |
| 3.7 | 2.2 | 90.1 | 0 | 4 | 69.9% | 92.1% | 1375 | 1685 | 310 |
| 4 | 1.9 | 90.1 | 2 | 2 | 46.9% | 64.9% | 1370 | 1525 | 155 |
| 0.4 | 0.5 | 90.1 | 1 | 8 | 28.4% | 98.1% | 1370 | 1585 | 215 |
| 0.6 | 2.3 | 90.1 | 0 | 7 | 58.2% | 91.2% | 1375 | 1475 | 100 |
| 0.7 | 0.2 | 90.1 | 1 | 8 | 17.6% | 99.4% | 1370 | 1585 | 215 |
| 0.8 | 1.1 | 90.1 | 2 | 6 | 48.9% | 54.9% | 1365 | 1515 | 150 |
| 0.9 | 0 | 90.1 | 1 | 8 | 34.0% | 100.0% | 1420 | 1590 | 170 |
| 1.1 | 2.7 | 90.2 | 0 | 6 | 97.4% | 89.8% | 1375 | 1605 | 230 |
| 1.2 | 2.6 | 90.2 | 1 | 5 | 98.3% | 15.6% | 1375 | 1525 | 150 |
| 1.3 | 1.5 | 90.2 | 2 | 5 | 78.4% | 17.4% | 1370 | 1450 | 80 |
| 1.3 | 0.5 | 90.2 | 0 | 8 | 58.5% | 100.0% | 1375 | 1510 | 135 |
| 1.6 | 0.2 | 90.2 | 0 | 8 | 26.8% | 100.0% | 1375 | 1515 | 140 |
| 1.7 | 2.1 | 90.2 | 1 | 5 | 99.3% | 53.4% | 1370 | 1450 | 80 |
| 1.8 | 2 | 90.2 | 2 | 4 | 98.9% | 26.4% | 1370 | 1400 | 30 |
| 1.8 | 0 | 90.2 | 0 | 8 | 65.6% | 100.0% | 1415 | 1520 | 105 |
| 1.9 | 0.9 | 90.2 | 1 | 6 | 78.3% | 96.6% | 1370 | 1445 | 75 |
| 2 | 3.8 | 90.2 | 2 | 2 | 51.7% | 58.9% | 1370 | 1805 | 435 |
| 0.2 | 2.6 | 90.2 | 0 | 7 | 20.4% | 90.0% | 1375 | 1510 | 135 |
| 2.1 | 2.7 | 90.2 | 2 | 3 | 73.7% | 43.6% | 1370 | 1555 | 185 |
| 2.2 | 1.6 | 90.2 | 0 | 6 | 98.4% | 94.0% | 1375 | 1420 | 45 |
| 2.3 | 1.5 | 90.2 | 1 | 5 | 95.9% | 88.2% | 1370 | 1410 | 40 |
| 2.3 | 0.5 | 90.2 | 2 | 5 | 41.7% | 77.0% | 1370 | 1465 | 95 |
| 2.4 | 3.4 | 90.2 | 0 | 4 | 82.2% | 41.1% | 1375 | 1865 | 490 |
| 2.5 | 0.3 | 90.2 | 1 | 6 | 26.5% | 99.0% | 1370 | 1460 | 90 |
| 2.6 | 0.2 | 90.2 | 2 | 5 | 20.2% | 95.3% | 1380 | 1475 | 95 |
| 2.7 | 1.1 | 90.2 | 0 | 6 | 91.6% | 95.9% | 1375 | 1430 | 55 |
| 2.8 | 2 | 90.2 | 1 | 4 | 86.3% | 35.3% | 1375 | 1515 | 140 |
| 2.8 | 0 | 90.2 | 2 | 5 | 92.7% | 100.0% | 1430 | 1480 | 50 |
| 2.9 | 3.9 | 90.2 | 0 | 3 | 60.2% | 54.1% | 1375 | 2000 | 625 |
| 3 | 3.8 | 90.2 | 1 | 2 | 45.1% | 61.3% | 1375 | 1945 | 570 |
| 0.3 | 2.5 | 90.2 | 2 | 5 | 25.3% | 4.0% | 1370 | 1455 | 85 |
| 3.2 | 1.6 | 90.2 | 1 | 4 | 79.9% | 69.4% | 1370 | 1460 | 90 |
| 3.2 | 0.6 | 90.2 | 2 | 4 | 37.4% | 60.2% | 1370 | 1445 | 75 |
| 3.3 | 3.5 | 90.2 | 0 | 3 | 60.1% | 54.8% | 1375 | 1950 | 575 |
| 3.4 | 3.4 | 90.2 | 1 | 2 | 44.5% | 62.3% | 1375 | 1885 | 510 |
| 3.5 | 2.3 | 90.2 | 2 | 2 | 48.1% | 63.9% | 1370 | 1580 | 210 |
| 3.6 | 1.2 | 90.2 | 0 | 5 | 76.1% | 95.6% | 1375 | 1475 | 100 |
| 3.9 | 2.9 | 90.2 | 0 | 3 | 60.0% | 55.9% | 1375 | 1855 | 480 |
| 4 | 2.8 | 90.2 | 1 | 2 | 43.7% | 63.6% | 1375 | 1790 | 415 |
| 0.4 | 1.4 | 90.2 | 2 | 6 | 35.1% | 29.0% | 1370 | 1520 | 150 |
| 0.4 | 0.4 | 90.2 | 0 | 9 | 26.6% | 100.0% | 1375 | 1580 | 205 |
| 0.5 | 3.3 | 90.2 | 1 | 5 | 47.1% | 7.3% | 1375 | 1635 | 260 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.6 | 2.2 | 90.2 | 2 | 5 | 50.7% | 8.0% | 1370 | 1450 | 80 |
| 0.7 | 2.1 | 90.2 | 0 | 7 | 66.6% | 91.9% | 1375 | 1430 | 55 |
| 0.8 | 3 | 90.2 | 1 | 5 | 75.4% | 10.4% | 1375 | 1590 | 215 |
| 0.9 | 1.9 | 90.2 | 2 | 5 | 76.1% | 12.1% | 1370 | 1450 | 80 |
| 0.9 | 0.9 | 90.2 | 0 | 8 | 61.2% | 96.8% | 1375 | 1500 | 125 |
| 1 | 0.7 | 90.3 | 1 | 7 | 53.4% | 97.4% | 1370 | 1525 | 155 |
| 1.1 | 3.6 | 90.3 | 2 | 3 | 52.8% | 39.2% | 1370 | 1675 | 305 |
| 1.2 | 2.5 | 90.3 | 0 | 6 | 98.0% | 90.6% | 1375 | 1555 | 180 |
| 1.3 | 2.4 | 90.3 | 1 | 5 | 98.9% | 16.9% | 1375 | 1480 | 105 |
| 1.4 | 1.3 | 90.3 | 2 | 5 | 75.0% | 18.8% | 1370 | 1460 | 90 |
| 1.4 | 3.3 | 90.3 | 0 | 5 | 95.3% | 26.7% | 1375 | 1760 | 385 |
| 1.5 | 3.2 | 90.3 | 1 | 4 | 92.8% | 26.8% | 1375 | 1685 | 310 |
| 1.6 | 3.1 | 90.3 | 2 | 3 | 76.1% | 41.8% | 1370 | 1600 | 230 |
| 1.7 | 3 | 90.3 | 0 | 5 | 95.9% | 90.0% | 1375 | 1715 | 340 |
| 1.8 | 2.9 | 90.3 | 1 | 4 | 91.4% | 27.7% | 1375 | 1640 | 265 |
| 1.9 | 1.8 | 90.3 | 2 | 4 | 100.0% | 27.0% | 1370 | 1395 | 25 |
| 1.9 | 0.8 | 90.3 | 0 | 7 | 84.7% | 97.3% | 1375 | 1445 | 70 |
| 2 | 0.7 | 90.3 | 1 | 6 | 61.0% | 97.4% | 1370 | 1455 | 85 |
| 0.2 | 3.5 | 90.3 | 2 | 4 | 32.5% | 8.7% | 1390 | 1580 | 190 |
| 2.1 | 3.6 | 90.3 | 1 | 3 | 68.3% | 44.1% | 1375 | 1825 | 450 |
| 2.2 | 2.5 | 90.3 | 2 | 3 | 73.8% | 44.2% | 1370 | 1510 | 140 |
| 2.3 | 1.4 | 90.3 | 0 | 6 | 97.3% | 94.8% | 1375 | 1410 | 35 |
| 2.4 | 1.3 | 90.3 | 1 | 5 | 94.9% | 93.8% | 1370 | 1415 | 45 |
| 2.4 | 3.3 | 90.3 | 2 | 2 | 51.2% | 60.7% | 1370 | 1710 | 340 |
| 2.5 | 2.2 | 90.3 | 0 | 5 | 89.8% | 91.9% | 1375 | 1585 | 210 |
| 2.6 | 3.1 | 90.3 | 1 | 3 | 67.7% | 45.5% | 1375 | 1750 | 375 |
| 2.7 | 3 | 90.3 | 2 | 2 | 50.6% | 61.8% | 1370 | 1670 | 300 |
| 2.8 | 1.9 | 90.3 | 0 | 5 | 86.1% | 93.0% | 1375 | 1535 | 160 |
| 2.9 | 1.8 | 90.3 | 1 | 4 | 85.4% | 36.7% | 1375 | 1465 | 90 |
| 2.9 | 0.8 | 90.3 | 2 | 4 | 49.7% | 37.8% | 1370 | 1430 | 60 |
| 3 | 3.7 | 90.3 | 0 | 3 | 60.4% | 54.5% | 1375 | 1970 | 595 |
| 0.3 | 3.4 | 90.3 | 1 | 5 | 28.3% | 6.7% | 1375 | 1640 | 265 |
| 3.1 | 2.6 | 90.3 | 2 | 2 | 49.3% | 63.0% | 1370 | 1610 | 240 |
| 3.2 | 1.5 | 90.3 | 0 | 5 | 81.2% | 94.5% | 1375 | 1465 | 90 |
| 3.3 | 1.4 | 90.3 | 1 | 4 | 78.9% | 74.9% | 1370 | 1465 | 95 |
| 3.3 | 0.4 | 90.3 | 2 | 4 | 40.3% | 65.9% | 1380 | 1450 | 70 |
| 3.4 | 0.3 | 90.3 | 0 | 6 | 38.5% | 100.0% | 1375 | 1460 | 85 |
| 3.5 | 2.2 | 90.3 | 1 | 3 | 66.4% | 47.7% | 1375 | 1610 | 235 |
| 3.6 | 2.1 | 90.3 | 1 | 3 | 66.3% | 47.9% | 1375 | 1590 | 215 |
| 3.7 | 2 | 90.3 | 2 | 2 | 47.8% | 64.7% | 1370 | 1515 | 145 |
| 3.7 | 0 | 90.3 | 0 | 6 | 87.3% | 100.0% | 1410 | 1475 | 65 |
| 3.8 | 0.9 | 90.3 | 1 | 4 | 70.2% | 96.8% | 1370 | 1485 | 115 |
| 3.9 | 3.8 | 90.3 | 2 | 0 | 39.4% | 96.9% | 1460 | 1940 | 480 |
| 4 | 2.7 | 90.3 | 0 | 3 | 60.1% | 56.3% | 1375 | 1810 | 435 |
| 0.4 | 2.3 | 90.3 | 1 | 6 | 35.0% | 46.6% | 1370 | 1440 | 70 |
| 0.5 | 1.2 | 90.3 | 2 | 6 | 38.9% | 35.1% | 1370 | 1530 | 160 |
| 0.5 | 3.2 | 90.3 | 0 | 6 | 49.9% | 88.8% | 1375 | 1670 | 295 |
| 0.7 | 1 | 90.3 | 1 | 7 | 55.1% | 96.2% | 1370 | 1520 | 150 |
| 0.7 | 4 | 90.3 | 2 | 3 | 96.0% | 30.6% | 1385 | 1735 | 350 |
| 0.8 | 2.9 | 90.3 | 0 | 6 | 80.1% | 89.4% | 1375 | 1620 | 245 |
| 0.9 | 2.8 | 90.3 | 1 | 5 | 85.1% | 11.7% | 1375 | 1540 | 165 |
| 1 | 1.6 | 90.4 | 2 | 5 | 69.6% | 13.5% | 1370 | 1470 | 100 |
| 1 | 0.6 | 90.4 | 0 | 8 | 52.7% | 98.4% | 1375 | 1525 | 150 |
| 1.1 | 0.5 | 90.4 | 1 | 7 | 44.9% | 98.2% | 1370 | 1540 | 170 |
| 1.2 | 3.4 | 90.4 | 2 | 3 | 62.1% | 40.0% | 1370 | 1625 | 255 |
| 1.3 | 2.3 | 90.4 | 0 | 6 | 98.6% | 91.3% | 1375 | 1510 | 135 |
| 1.4 | 0.2 | 90.4 | 1 | 7 | 15.3% | 99.4% | 1370 | 1545 | 175 |
| 1.5 | 1.1 | 90.4 | 2 | 5 | 71.9% | 20.2% | 1370 | 1470 | 100 |
| 1.6 | 1 | 90.4 | 0 | 7 | 83.5% | 96.2% | 1375 | 1445 | 70 |
| 1.6 | 0 | 90.4 | 1 | 7 | 57.7% | 100.0% | 1425 | 1550 | 125 |
| 1.7 | 3.9 | 90.4 | 2 | 2 | 44.8% | 58.0% | 1365 | 1785 | 420 |
| 1.8 | 2.8 | 90.4 | 0 | 5 | 96.5% | 90.6% | 1375 | 1670 | 295 |
| 1.9 | 2.7 | 90.4 | 1 | 4 | 91.5% | 28.2% | 1375 | 1595 | 220 |
| 2 | 1.6 | 90.4 | 2 | 4 | 99.7% | 27.6% | 1370 | 1400 | 30 |
| 2 | 0.6 | 90.4 | 0 | 7 | 65.3% | 98.4% | 1375 | 1455 | 80 |
| 0.2 | 0.4 | 90.4 | 1 | 8 | 17.1% | 98.6% | 1370 | 1615 | 245 |
| 2.1 | 3.5 | 90.4 | 0 | 4 | 82.8% | 40.9% | 1375 | 1855 | 480 |
| 2.2 | 3.4 | 90.4 | 1 | 3 | 68.3% | 44.7% | 1375 | 1780 | 405 |
| 2.3 | 2.3 | 90.4 | 2 | 3 | 74.0% | 44.8% | 1370 | 1470 | 100 |
| 2.4 | 1.2 | 90.4 | 0 | 6 | 96.1% | 95.5% | 1375 | 1415 | 40 |
| 2.5 | 1.1 | 90.4 | 1 | 5 | 88.0% | 95.9% | 1370 | 1420 | 50 |
| 2.6 | 1 | 90.4 | 2 | 4 | 63.8% | 34.0% | 1370 | 1415 | 45 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.6 | 4 | 90.4 | 0 | 3 | 60.7% | 54.0% | 1375 | 2000 | 625 |
| 2.7 | 3.9 | 90.4 | 1 | 2 | 45.9% | 61.1% | 1375 | 1935 | 560 |
| 2.8 | 2.8 | 90.4 | 2 | 2 | 50.4% | 62.4% | 1370 | 1625 | 255 |
| 2.9 | 1.7 | 90.4 | 0 | 5 | 85.3% | 93.8% | 1375 | 1490 | 115 |
| 3 | 1.6 | 90.4 | 1 | 4 | 83.2% | 38.0% | 1370 | 1450 | 80 |
| 3 | 0.6 | 90.4 | 2 | 4 | 30.2% | 39.2% | 1370 | 1435 | 65 |
| 0.3 | 0.3 | 90.4 | 0 | 9 | 18.9% | 100.0% | 1375 | 1600 | 225 |
| 3.1 | 3.5 | 90.4 | 1 | 2 | 45.2% | 62.1% | 1375 | 1870 | 495 |
| 3.2 | 2.4 | 90.4 | 2 | 2 | 49.2% | 63.6% | 1370 | 1565 | 195 |
| 3.3 | 1.3 | 90.4 | 0 | 5 | 80.4% | 95.3% | 1375 | 1465 | 90 |
| 3.4 | 1.2 | 90.4 | 1 | 4 | 77.8% | 80.3% | 1370 | 1470 | 100 |
| 3.4 | 3.2 | 90.4 | 0 | 3 | 60.5% | 55.5% | 1375 | 1880 | 505 |
| 3.5 | 3.1 | 90.4 | 0 | 3 | 60.4% | 55.7% | 1375 | 1865 | 490 |
| 3.6 | 4 | 90.4 | 1 | 1 | 22.9% | 78.0% | 1375 | 2000 | 625 |
| 3.7 | 2.9 | 90.4 | 2 | 1 | 25.5% | 80.6% | 1370 | 1720 | 350 |
| 3.8 | 1.8 | 90.4 | 0 | 4 | 69.6% | 93.5% | 1375 | 1575 | 200 |
| 3.9 | 1.7 | 90.4 | 1 | 3 | 66.2% | 48.8% | 1375 | 1510 | 135 |
| 3.9 | 0.7 | 90.4 | 2 | 3 | 43.2% | 49.7% | 1375 | 1485 | 110 |
| 4 | 3.6 | 90.4 | 0 | 2 | 39.4% | 68.1% | 1375 | 2000 | 625 |
| 0.4 | 2.2 | 90.4 | 1 | 6 | 35.1% | 46.3% | 1370 | 1450 | 80 |
| 0.5 | 2.1 | 90.4 | 2 | 5 | 42.5% | 6.7% | 1370 | 1470 | 100 |
| 0.6 | 2 | 90.4 | 0 | 7 | 59.1% | 92.3% | 1375 | 1430 | 55 |
| 0.7 | 1.9 | 90.4 | 1 | 6 | 61.9% | 64.5% | 1370 | 1445 | 75 |
| 0.7 | 0.9 | 90.4 | 2 | 6 | 38.7% | 47.7% | 1365 | 1545 | 180 |
| 0.8 | 3.8 | 90.4 | 0 | 5 | 75.4% | 25.5% | 1375 | 1830 | 455 |
| 0.9 | 3.7 | 90.4 | 1 | 4 | 86.0% | 25.0% | 1375 | 1750 | 375 |
| 1 | 2.5 | 90.5 | 2 | 4 | 86.0% | 23.5% | 1370 | 1405 | 35 |
| 1.1 | 1.4 | 90.5 | 0 | 7 | 83.2% | 94.6% | 1375 | 1450 | 75 |
| 1.2 | 1.3 | 90.5 | 1 | 6 | 77.3% | 94.5% | 1370 | 1460 | 90 |
| 1.2 | 3.3 | 90.5 | 2 | 3 | 62.1% | 40.2% | 1370 | 1595 | 225 |
| 1.3 | 3.2 | 90.5 | 1 | 4 | 95.1% | 26.5% | 1375 | 1655 | 280 |
| 1.4 | 3.1 | 90.5 | 2 | 3 | 78.5% | 41.2% | 1370 | 1565 | 195 |
| 1.5 | 3 | 90.5 | 0 | 5 | 96.3% | 27.2% | 1375 | 1685 | 310 |
| 1.6 | 2.9 | 90.5 | 1 | 4 | 92.8% | 27.5% | 1375 | 1610 | 235 |
| 1.7 | 1.8 | 90.5 | 2 | 4 | 96.4% | 26.6% | 1370 | 1405 | 35 |
| 1.7 | 0.8 | 90.5 | 0 | 7 | 78.9% | 97.0% | 1375 | 1460 | 85 |
| 1.8 | 0.7 | 90.5 | 1 | 6 | 59.3% | 97.4% | 1370 | 1475 | 105 |
| 1.9 | 3.6 | 90.5 | 2 | 2 | 50.9% | 59.2% | 1365 | 1725 | 360 |
| 2 | 2.5 | 90.5 | 0 | 5 | 96.9% | 91.3% | 1375 | 1605 | 230 |
| 0.2 | 2.3 | 90.5 | 1 | 6 | 17.5% | 33.9% | 1370 | 1465 | 95 |
| 2.1 | 2.4 | 90.5 | 2 | 3 | 74.6% | 44.3% | 1370 | 1465 | 95 |
| 2.2 | 1.3 | 90.5 | 0 | 6 | 99.1% | 95.1% | 1375 | 1405 | 30 |
| 2.3 | 1.2 | 90.5 | 1 | 5 | 94.6% | 87.7% | 1370 | 1410 | 40 |
| 2.3 | 3.2 | 90.5 | 0 | 4 | 82.9% | 41.5% | 1375 | 1795 | 420 |
| 2.5 | 1 | 90.5 | 1 | 5 | 79.7% | 96.3% | 1370 | 1415 | 45 |
| 2.5 | 4 | 90.5 | 2 | 1 | 27.9% | 77.8% | 1365 | 1865 | 500 |
| 2.6 | 2.9 | 90.5 | 0 | 4 | 82.8% | 42.1% | 1375 | 1745 | 370 |
| 2.7 | 2.8 | 90.5 | 1 | 3 | 67.9% | 46.2% | 1375 | 1675 | 300 |
| 2.8 | 1.7 | 90.5 | 2 | 3 | 78.1% | 46.8% | 1370 | 1435 | 65 |
| 2.8 | 0.7 | 90.5 | 0 | 6 | 70.9% | 97.4% | 1375 | 1435 | 60 |
| 2.9 | 0.6 | 90.5 | 1 | 5 | 48.5% | 97.9% | 1370 | 1435 | 65 |
| 3 | 3.5 | 90.5 | 2 | 1 | 27.6% | 79.2% | 1370 | 1790 | 420 |
| 0.3 | 2.2 | 90.5 | 2 | 5 | 25.5% | 4.1% | 1370 | 1485 | 115 |
| 3.1 | 2.4 | 90.5 | 0 | 4 | 78.5% | 92.3% | 1375 | 1665 | 290 |
| 3.2 | 2.3 | 90.5 | 1 | 3 | 67.2% | 47.5% | 1375 | 1595 | 220 |
| 3.3 | 1.2 | 90.5 | 2 | 3 | 70.6% | 48.3% | 1370 | 1460 | 90 |
| 3.4 | 0.1 | 90.5 | 2 | 4 | 16.2% | 90.6% | 1395 | 1450 | 55 |
| 3.5 | 1 | 90.5 | 1 | 4 | 75.7% | 85.8% | 1370 | 1470 | 100 |
| 3.5 | 4 | 90.5 | 2 | 0 | 26.3% | 97.2% | 1450 | 1945 | 495 |
| 3.6 | 2.9 | 90.5 | 0 | 3 | 60.6% | 56.1% | 1375 | 1820 | 445 |
| 3.7 | 2.8 | 90.5 | 1 | 2 | 44.5% | 63.8% | 1375 | 1750 | 375 |
| 3.8 | 1.7 | 90.5 | 2 | 2 | 51.4% | 65.5% | 1370 | 1485 | 115 |
| 3.8 | 0.7 | 90.5 | 0 | 5 | 69.1% | 97.5% | 1375 | 1485 | 110 |
| 3.9 | 0.6 | 90.5 | 1 | 4 | 46.2% | 97.9% | 1370 | 1490 | 120 |
| 4 | 3.5 | 90.5 | 2 | 0 | 37.9% | 97.7% | 1460 | 1870 | 410 |
| 0.4 | 2.1 | 90.5 | 0 | 7 | 41.5% | 91.9% | 1375 | 1440 | 65 |
| 0.5 | 3 | 90.5 | 1 | 5 | 47.5% | 7.6% | 1375 | 1540 | 165 |
| 0.6 | 1.9 | 90.5 | 2 | 5 | 51.2% | 8.1% | 1370 | 1480 | 110 |
| 0.6 | 0.9 | 90.5 | 0 | 8 | 51.0% | 96.5% | 1375 | 1530 | 155 |
| 0.7 | 0.8 | 90.5 | 1 | 7 | 47.7% | 97.0% | 1370 | 1545 | 175 |
| 0.8 | 3.7 | 90.5 | 2 | 3 | 89.3% | 33.6% | 1380 | 1655 | 275 |
| 0.9 | 2.6 | 90.5 | 0 | 6 | 90.6% | 90.3% | 1375 | 1540 | 165 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1 | 2.4 | 90.6 | 1 | 5 | 95.5% | 13.1% | 1375 | 1435 | 60 |
| 1.1 | 1.3 | 90.6 | 2 | 5 | 62.8% | 14.9% | 1370 | 1485 | 115 |
| 1.1 | 3.3 | 90.6 | 0 | 5 | 95.9% | 26.6% | 1375 | 1720 | 345 |
| 1.2 | 3.2 | 90.6 | 2 | 3 | 62.0% | 40.4% | 1370 | 1565 | 195 |
| 1.3 | 3.1 | 90.6 | 0 | 5 | 96.3% | 27.0% | 1375 | 1685 | 310 |
| 1.4 | 4 | 90.6 | 1 | 3 | 60.5% | 42.6% | 1370 | 1845 | 475 |
| 1.5 | 2.9 | 90.6 | 2 | 3 | 77.7% | 42.0% | 1370 | 1520 | 150 |
| 1.6 | 1.8 | 90.6 | 0 | 6 | 100.0% | 93.2% | 1375 | 1400 | 25 |
| 1.7 | 1.7 | 90.6 | 1 | 5 | 100.0% | 52.4% | 1370 | 1395 | 25 |
| 1.7 | 0.7 | 90.6 | 2 | 5 | 41.4% | 23.0% | 1370 | 1495 | 125 |
| 1.8 | 3.6 | 90.6 | 0 | 4 | 83.5% | 40.8% | 1375 | 1845 | 470 |
| 1.9 | 3.5 | 90.6 | 1 | 3 | 69.4% | 44.2% | 1375 | 1765 | 390 |
| 2 | 2.4 | 90.6 | 2 | 3 | 76.0% | 44.2% | 1370 | 1450 | 80 |
| 0.2 | 1.2 | 90.6 | 0 | 8 | 18.3% | 95.3% | 1375 | 1540 | 165 |
| 2.1 | 2.3 | 90.6 | 1 | 4 | 92.0% | 29.1% | 1375 | 1505 | 130 |
| 2.2 | 1.2 | 90.6 | 2 | 4 | 75.7% | 29.0% | 1370 | 1420 | 50 |
| 2.3 | 1.1 | 90.6 | 1 | 5 | 86.4% | 87.6% | 1370 | 1405 | 35 |
| 2.4 | 1 | 90.6 | 2 | 4 | 59.4% | 31.6% | 1370 | 1420 | 50 |
| 2.4 | 4 | 90.6 | 0 | 3 | 61.1% | 54.1% | 1375 | 1980 | 605 |
| 2.5 | 3.9 | 90.6 | 1 | 2 | 44.9% | 61.1% | 1370 | 1905 | 535 |
| 2.6 | 2.8 | 90.6 | 2 | 2 | 51.5% | 62.3% | 1370 | 1590 | 220 |
| 2.7 | 1.7 | 90.6 | 0 | 5 | 88.5% | 93.7% | 1375 | 1460 | 85 |
| 2.8 | 0.6 | 90.6 | 2 | 4 | 25.0% | 36.9% | 1370 | 1425 | 55 |
| 2.9 | 3.5 | 90.6 | 0 | 3 | 60.9% | 55.1% | 1375 | 1900 | 525 |
| 3 | 3.4 | 90.6 | 1 | 2 | 45.6% | 62.4% | 1375 | 1830 | 455 |
| 0.3 | 2.1 | 90.6 | 2 | 5 | 25.6% | 4.1% | 1370 | 1495 | 125 |
| 3.1 | 2.3 | 90.6 | 0 | 4 | 78.9% | 92.6% | 1375 | 1635 | 260 |
| 3.2 | 0.2 | 90.6 | 2 | 4 | 35.3% | 42.0% | 1395 | 1440 | 45 |
| 3.3 | 1.1 | 90.6 | 2 | 3 | 61.9% | 48.5% | 1370 | 1455 | 85 |
| 3.4 | 1 | 90.6 | 0 | 5 | 79.3% | 96.4% | 1375 | 1470 | 95 |
| 3.4 | 0 | 90.6 | 1 | 5 | 100.0% | 100.0% | 1430 | 1455 | 25 |
| 3.5 | 3.9 | 90.6 | 2 | 0 | 26.4% | 97.5% | 1450 | 1915 | 465 |
| 3.7 | 2.7 | 90.6 | 1 | 2 | 44.6% | 64.0% | 1375 | 1720 | 345 |
| 3.8 | 1.6 | 90.6 | 2 | 2 | 53.5% | 65.8% | 1370 | 1485 | 115 |
| 3.8 | 0.6 | 90.6 | 0 | 5 | 59.4% | 97.8% | 1375 | 1485 | 110 |
| 3.9 | 0.5 | 90.6 | 1 | 4 | 37.7% | 98.3% | 1370 | 1490 | 120 |
| 4 | 3.4 | 90.6 | 2 | 0 | 38.0% | 98.1% | 1460 | 1840 | 380 |
| 0.4 | 2 | 90.6 | 0 | 7 | 41.6% | 92.3% | 1375 | 1450 | 75 |
| 0.5 | 1.9 | 90.6 | 2 | 5 | 42.8% | 6.8% | 1370 | 1490 | 120 |
| 0.5 | 0.9 | 90.6 | 0 | 8 | 44.2% | 96.5% | 1375 | 1540 | 165 |
| 0.6 | 0.8 | 90.6 | 1 | 7 | 44.4% | 97.0% | 1370 | 1550 | 180 |
| 0.7 | 3.7 | 90.6 | 2 | 3 | 97.2% | 31.0% | 1385 | 1640 | 255 |
| 0.8 | 2.6 | 90.6 | 0 | 6 | 80.7% | 90.5% | 1375 | 1525 | 150 |
| 0.9 | 2.5 | 90.6 | 1 | 5 | 85.9% | 11.8% | 1375 | 1450 | 75 |
| 1 | 3.3 | 90.7 | 0 | 5 | 95.1% | 26.6% | 1375 | 1705 | 330 |
| 1.1 | 3.2 | 90.7 | 2 | 3 | 52.5% | 40.0% | 1370 | 1545 | 175 |
| 1.2 | 3.1 | 90.7 | 0 | 5 | 96.5% | 27.0% | 1375 | 1670 | 295 |
| 1.3 | 4 | 90.7 | 1 | 3 | 50.6% | 42.4% | 1370 | 1830 | 460 |
| 1.4 | 2.9 | 90.7 | 2 | 3 | 79.0% | 41.7% | 1370 | 1505 | 135 |
| 1.5 | 1.8 | 90.7 | 0 | 6 | 100.0% | 93.2% | 1375 | 1385 | 10 |
| 1.6 | 1.7 | 90.7 | 1 | 5 | 97.3% | 21.0% | 1370 | 1405 | 35 |
| 1.6 | 0.7 | 90.7 | 2 | 5 | 37.8% | 21.7% | 1370 | 1505 | 135 |
| 1.7 | 3.6 | 90.7 | 0 | 4 | 84.1% | 40.8% | 1375 | 1830 | 455 |
| 1.8 | 3.5 | 90.7 | 1 | 3 | 70.1% | 44.1% | 1375 | 1750 | 375 |
| 2 | 1.3 | 90.7 | 0 | 6 | 100.0% | 95.1% | 1375 | 1395 | 20 |
| 0.2 | 1.1 | 90.7 | 1 | 7 | 18.4% | 95.8% | 1370 | 1560 | 190 |
| 2.1 | 1.2 | 90.7 | 2 | 4 | 73.7% | 28.5% | 1370 | 1430 | 60 |
| 2.2 | 0.1 | 90.7 | 2 | 5 | 18.3% | 92.0% | 1395 | 1520 | 125 |
| 2.3 | 1 | 90.7 | 1 | 5 | 78.2% | 87.4% | 1370 | 1410 | 40 |
| 2.3 | 4 | 90.7 | 2 | 1 | 27.9% | 77.8% | 1365 | 1835 | 470 |
| 2.4 | 2.9 | 90.7 | 0 | 4 | 83.4% | 42.2% | 1375 | 1720 | 345 |
| 2.5 | 2.8 | 90.7 | 1 | 3 | 68.7% | 46.2% | 1375 | 1645 | 270 |
| 2.6 | 1.7 | 90.7 | 2 | 3 | 81.3% | 46.6% | 1370 | 1425 | 55 |
| 2.6 | 0.7 | 90.7 | 0 | 6 | 67.7% | 97.4% | 1375 | 1420 | 45 |
| 2.7 | 0.6 | 90.7 | 1 | 5 | 47.0% | 97.9% | 1370 | 1425 | 55 |
| 2.8 | 3.5 | 90.7 | 2 | 1 | 27.4% | 79.3% | 1365 | 1760 | 395 |
| 3 | 2.3 | 90.7 | 1 | 3 | 67.9% | 47.5% | 1375 | 1570 | 195 |
| 0.3 | 1 | 90.7 | 2 | 6 | 21.7% | 4.2% | 1370 | 1575 | 205 |
| 0.3 | 4 | 90.7 | 0 | 5 | 32.7% | 9.9% | 1380 | 1820 | 440 |
| 3.1 | 3.2 | 90.7 | 2 | 1 | 27.4% | 80.1% | 1370 | 1715 | 345 |
| 3.2 | 3.1 | 90.7 | 2 | 1 | 27.1% | 80.4% | 1370 | 1700 | 330 |
| 3.3 | 3 | 90.7 | 0 | 3 | 61.0% | 56.1% | 1375 | 1810 | 435 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.5 | 1.8 | 90.7 | 2 | 2 | 53.6% | 65.3% | 1370 | 1470 | 100 |
| 3.5 | 0.8 | 90.7 | 0 | 5 | 73.6% | 97.1% | 1375 | 1475 | 100 |
| 3.6 | 0.7 | 90.7 | 1 | 4 | 52.2% | 91.2% | 1370 | 1475 | 105 |
| 3.9 | 2.4 | 90.7 | 1 | 2 | 44.5% | 64.8% | 1375 | 1660 | 285 |
| 4 | 1.3 | 90.7 | 2 | 2 | 41.0% | 66.6% | 1370 | 1490 | 120 |
| 0.4 | 0.9 | 90.7 | 1 | 7 | 36.3% | 96.6% | 1370 | 1560 | 190 |
| 0.5 | 3.8 | 90.7 | 2 | 3 | 97.3% | 24.7% | 1395 | 1635 | 240 |
| 0.6 | 2.7 | 90.7 | 0 | 6 | 60.6% | 90.5% | 1375 | 1530 | 155 |
| 0.7 | 2.6 | 90.7 | 1 | 5 | 67.0% | 9.2% | 1375 | 1450 | 75 |
| 0.8 | 1.5 | 90.7 | 2 | 5 | 56.9% | 10.9% | 1370 | 1495 | 125 |
| 0.8 | 0.5 | 90.7 | 0 | 8 | 42.1% | 98.1% | 1375 | 1550 | 175 |
| 1.1 | 3.1 | 90.8 | 1 | 4 | 97.5% | 26.4% | 1375 | 1590 | 215 |
| 1.3 | 1.9 | 90.8 | 0 | 6 | 100.0% | 92.8% | 1375 | 1390 | 15 |
| 1.4 | 1.8 | 90.8 | 1 | 5 | 95.5% | 18.5% | 1375 | 1415 | 40 |
| 1.4 | 0.8 | 90.8 | 2 | 5 | 43.1% | 19.1% | 1370 | 1510 | 140 |
| 1.5 | 3.7 | 90.8 | 0 | 4 | 85.5% | 40.6% | 1375 | 1830 | 455 |
| 1.6 | 3.6 | 90.8 | 1 | 3 | 71.6% | 43.7% | 1375 | 1750 | 375 |
| 1.8 | 1.4 | 90.8 | 0 | 6 | 100.0% | 94.7% | 1375 | 1405 | 30 |
| 1.9 | 3.3 | 90.8 | 2 | 2 | 51.4% | 60.1% | 1365 | 1630 | 265 |
| 2.1 | 2.1 | 90.8 | 2 | 3 | 80.3% | 45.0% | 1370 | 1430 | 60 |
| 2.3 | 1.9 | 90.8 | 1 | 4 | 92.4% | 30.0% | 1375 | 1420 | 45 |
| 2.3 | 0.9 | 90.8 | 2 | 4 | 46.8% | 30.5% | 1370 | 1440 | 70 |
| 2.4 | 3.8 | 90.8 | 0 | 3 | 61.4% | 54.6% | 1375 | 1920 | 545 |
| 2.6 | 2.6 | 90.8 | 2 | 2 | 51.8% | 62.8% | 1370 | 1530 | 160 |
| 2.7 | 1.5 | 90.8 | 0 | 5 | 89.2% | 94.5% | 1375 | 1440 | 65 |
| 2.8 | 1.4 | 90.8 | 1 | 4 | 88.4% | 36.0% | 1375 | 1440 | 65 |
| 2.8 | 0.4 | 90.8 | 2 | 4 | 55.5% | 37.1% | 1390 | 1445 | 55 |
| 3 | 2.2 | 90.8 | 2 | 2 | 53.0% | 64.1% | 1370 | 1475 | 105 |
| 0.3 | 2.9 | 90.8 | 0 | 6 | 30.2% | 90.1% | 1375 | 1545 | 170 |
| 3.1 | 1.1 | 90.8 | 0 | 5 | 83.8% | 96.0% | 1375 | 1455 | 80 |
| 3.2 | 2 | 90.8 | 1 | 3 | 67.8% | 48.2% | 1375 | 1505 | 130 |
| 3.2 | 0 | 90.8 | 2 | 4 | 100.0% | 42.3% | 1430 | 1455 | 25 |
| 3.3 | 3.9 | 90.8 | 0 | 2 | 40.0% | 68.0% | 1375 | 2000 | 625 |
| 3.5 | 2.7 | 90.8 | 2 | 1 | 26.3% | 81.5% | 1370 | 1630 | 260 |
| 3.6 | 1.6 | 90.8 | 0 | 4 | 73.4% | 94.2% | 1375 | 1490 | 115 |
| 3.7 | 1.5 | 90.8 | 1 | 3 | 68.1% | 49.4% | 1375 | 1485 | 110 |
| 3.7 | 0.5 | 90.8 | 2 | 3 | 36.1% | 49.1% | 1385 | 1470 | 85 |
| 3.8 | 3.4 | 90.8 | 0 | 2 | 39.9% | 68.8% | 1375 | 1930 | 555 |
| 3.9 | 0.3 | 90.8 | 1 | 4 | 20.7% | 99.0% | 1370 | 1490 | 120 |
| 4 | 0.2 | 90.8 | 0 | 5 | 20.5% | 99.9% | 1375 | 1495 | 120 |
| 0.4 | 2.8 | 90.8 | 1 | 5 | 38.3% | 7.7% | 1375 | 1460 | 85 |
| 0.5 | 1.7 | 90.8 | 2 | 5 | 43.1% | 6.8% | 1370 | 1510 | 140 |
| 0.5 | 0.7 | 90.8 | 0 | 8 | 39.6% | 97.3% | 1375 | 1560 | 185 |
| 0.6 | 0.6 | 90.8 | 1 | 7 | 37.0% | 97.8% | 1370 | 1575 | 205 |
| 0.7 | 3.5 | 90.8 | 2 | 3 | 98.0% | 31.2% | 1385 | 1575 | 190 |
| 0.8 | 2.4 | 90.8 | 0 | 6 | 81.1% | 91.3% | 1375 | 1465 | 90 |
| 0.9 | 2.3 | 90.8 | 1 | 5 | 86.4% | 11.9% | 1375 | 1415 | 40 |
| 1 | 1.1 | 90.9 | 2 | 5 | 52.0% | 13.7% | 1370 | 1515 | 145 |
| 1.1 | 1 | 90.9 | 0 | 7 | 68.0% | 96.2% | 1375 | 1490 | 115 |
| 1.1 | 0 | 90.9 | 1 | 7 | 40.4% | 100.0% | 1430 | 1590 | 160 |
| 1.2 | 3.9 | 90.9 | 2 | 2 | 63.8% | 53.6% | 1380 | 1700 | 320 |
| 1.3 | 2.8 | 90.9 | 0 | 5 | 97.5% | 27.6% | 1375 | 1595 | 220 |
| 1.6 | 0.5 | 90.9 | 1 | 6 | 39.5% | 98.2% | 1370 | 1515 | 145 |
| 1.7 | 3.4 | 90.9 | 2 | 2 | 44.4% | 59.4% | 1365 | 1625 | 260 |
| 1.8 | 2.3 | 90.9 | 0 | 5 | 98.5% | 92.5% | 1375 | 1515 | 140 |
| 1.9 | 0.2 | 90.9 | 2 | 5 | 39.0% | 74.4% | 1395 | 1535 | 140 |
| 2 | 1.1 | 90.9 | 2 | 4 | 61.5% | 28.5% | 1370 | 1445 | 75 |
| 0.2 | 1.9 | 90.9 | 0 | 7 | 20.8% | 92.6% | 1375 | 1485 | 110 |
| 2.3 | 2.8 | 90.9 | 2 | 2 | 52.2% | 62.0% | 1370 | 1545 | 175 |
| 2.4 | 1.7 | 90.9 | 0 | 5 | 93.4% | 93.7% | 1375 | 1425 | 50 |
| 2.5 | 1.6 | 90.9 | 1 | 4 | 92.9% | 32.2% | 1375 | 1425 | 50 |
| 2.5 | 0.6 | 90.9 | 2 | 4 | 39.7% | 33.3% | 1380 | 1450 | 70 |
| 2.6 | 3.5 | 90.9 | 0 | 3 | 61.5% | 55.3% | 1375 | 1860 | 485 |
| 2.7 | 3.4 | 90.9 | 1 | 2 | 46.6% | 62.5% | 1375 | 1785 | 410 |
| 2.8 | 2.3 | 90.9 | 2 | 2 | 54.0% | 63.8% | 1370 | 1475 | 105 |
| 2.9 | 1.2 | 90.9 | 0 | 5 | 86.7% | 95.6% | 1375 | 1445 | 70 |
| 3 | 1.1 | 90.9 | 1 | 4 | 74.0% | 38.6% | 1370 | 1445 | 75 |
| 0.3 | 1.8 | 90.9 | 2 | 5 | 25.9% | 4.1% | 1370 | 1520 | 150 |
| 0.3 | 0.8 | 90.9 | 0 | 8 | 27.6% | 96.9% | 1375 | 1570 | 195 |
| 3.1 | 4 | 90.9 | 1 | 1 | 23.1% | 78.5% | 1370 | 1955 | 585 |
| 3.2 | 2.9 | 90.9 | 2 | 1 | 27.3% | 81.1% | 1370 | 1640 | 270 |
| 3.3 | 1.8 | 90.9 | 0 | 4 | 77.4% | 94.1% | 1375 | 1515 | 140 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.4 | 1.7 | 90.9 | 1 | 3 | 68.2% | 48.9% | 1375 | 1470 | 95 |
| 3.4 | 0.7 | 90.9 | 2 | 3 | 43.2% | 49.2% | 1380 | 1455 | 75 |
| 3.5 | 3.6 | 90.9 | 0 | 2 | 40.0% | 68.6% | 1375 | 1950 | 575 |
| 3.6 | 3.5 | 90.9 | 1 | 1 | 23.2% | 79.6% | 1375 | 1875 | 500 |
| 3.7 | 2.4 | 90.9 | 2 | 1 | 26.9% | 82.3% | 1370 | 1570 | 200 |
| 3.8 | 1.3 | 90.9 | 0 | 4 | 71.2% | 95.3% | 1375 | 1490 | 115 |
| 3.9 | 1.2 | 90.9 | 1 | 3 | 70.2% | 50.1% | 1375 | 1495 | 120 |
| 3.9 | 3.2 | 90.9 | 0 | 2 | 40.0% | 69.3% | 1375 | 1885 | 510 |
| 4 | 3.1 | 90.9 | 0 | 2 | 40.0% | 69.5% | 1375 | 1870 | 495 |
| 0.4 | 0.7 | 90.9 | 1 | 7 | 30.9% | 97.4% | 1370 | 1580 | 210 |
| 0.5 | 3.6 | 90.9 | 2 | 3 | 98.1% | 24.9% | 1395 | 1570 | 175 |
| 0.6 | 2.5 | 90.9 | 0 | 6 | 60.9% | 91.3% | 1375 | 1465 | 90 |
| 0.7 | 2.4 | 90.9 | 1 | 5 | 67.4% | 9.3% | 1375 | 1425 | 50 |
| 0.8 | 1.3 | 90.9 | 2 | 5 | 49.9% | 11.0% | 1370 | 1515 | 145 |
| 0.8 | 3.3 | 90.9 | 0 | 5 | 76.5% | 26.1% | 1375 | 1670 | 295 |
| 0.9 | 3.2 | 90.9 | 2 | 3 | 93.1% | 36.7% | 1380 | 1510 | 130 |
| 1 | 3 | 91 | 0 | 5 | 96.0% | 27.1% | 1375 | 1610 | 235 |
| 1.1 | 2.9 | 91 | 1 | 4 | 98.3% | 26.8% | 1375 | 1530 | 155 |
| 1.2 | 1.8 | 91 | 2 | 4 | 77.3% | 25.4% | 1370 | 1455 | 85 |
| 1.2 | 0.8 | 91 | 0 | 7 | 63.5% | 97.0% | 1375 | 1505 | 130 |
| 1.3 | 0.7 | 91 | 1 | 6 | 55.9% | 97.4% | 1370 | 1515 | 145 |
| 1.4 | 3.6 | 91 | 2 | 2 | 59.1% | 57.2% | 1375 | 1640 | 265 |
| 1.5 | 2.5 | 91 | 0 | 5 | 98.3% | 28.2% | 1375 | 1535 | 160 |
| 1.6 | 2.4 | 91 | 1 | 4 | 94.3% | 28.4% | 1375 | 1455 | 80 |
| 1.7 | 1.3 | 91 | 2 | 4 | 76.1% | 27.5% | 1370 | 1455 | 85 |
| 1.7 | 3.3 | 91 | 0 | 4 | 84.9% | 41.5% | 1375 | 1735 | 360 |
| 1.8 | 3.2 | 91 | 2 | 2 | 51.8% | 60.1% | 1365 | 1580 | 215 |
| 1.9 | 3.1 | 91 | 2 | 2 | 51.7% | 60.6% | 1365 | 1565 | 200 |
| 2 | 3 | 91 | 0 | 4 | 84.2% | 42.1% | 1375 | 1690 | 315 |
| 0.2 | 2.8 | 91 | 1 | 5 | 22.1% | 7.0% | 1380 | 1440 | 60 |
| 2.1 | 1.9 | 91 | 0 | 5 | 97.7% | 93.4% | 1375 | 1440 | 65 |
| 2.2 | 1.8 | 91 | 1 | 4 | 95.5% | 30.2% | 1375 | 1410 | 35 |
| 2.2 | 0.8 | 91 | 2 | 4 | 33.8% | 29.4% | 1370 | 1460 | 90 |
| 2.3 | 3.7 | 91 | 0 | 3 | 61.8% | 55.0% | 1375 | 1875 | 500 |
| 2.4 | 3.6 | 91 | 1 | 2 | 45.4% | 61.9% | 1370 | 1800 | 430 |
| 2.5 | 2.5 | 91 | 2 | 2 | 54.6% | 63.0% | 1370 | 1485 | 115 |
| 2.6 | 1.4 | 91 | 0 | 5 | 91.0% | 94.8% | 1375 | 1435 | 60 |
| 2.7 | 1.3 | 91 | 1 | 4 | 90.6% | 34.9% | 1375 | 1435 | 60 |
| 2.7 | 3.3 | 91 | 2 | 1 | 28.1% | 80.0% | 1365 | 1685 | 320 |
| 2.8 | 3.2 | 91 | 1 | 2 | 46.5% | 63.0% | 1375 | 1740 | 365 |
| 2.9 | 3.1 | 91 | 1 | 2 | 46.3% | 63.3% | 1375 | 1725 | 350 |
| 3 | 3 | 91 | 2 | 1 | 28.1% | 80.9% | 1370 | 1640 | 270 |
| 0.3 | 1.7 | 91 | 0 | 7 | 31.5% | 93.4% | 1375 | 1495 | 120 |
| 3.1 | 1.9 | 91 | 1 | 3 | 68.4% | 48.4% | 1375 | 1465 | 90 |
| 3.1 | 0.9 | 91 | 2 | 3 | 61.2% | 48.9% | 1380 | 1440 | 60 |
| 3.2 | 3.8 | 91 | 0 | 2 | 40.2% | 68.4% | 1375 | 1965 | 590 |
| 3.3 | 3.7 | 91 | 1 | 1 | 22.8% | 79.3% | 1370 | 1895 | 525 |
| 3.4 | 2.6 | 91 | 2 | 1 | 27.5% | 81.9% | 1370 | 1585 | 215 |
| 3.5 | 1.5 | 91 | 0 | 4 | 75.3% | 94.8% | 1375 | 1480 | 105 |
| 3.6 | 1.4 | 91 | 1 | 3 | 71.2% | 49.6% | 1375 | 1480 | 105 |
| 3.6 | 0.4 | 91 | 2 | 3 | 52.1% | 46.7% | 1395 | 1465 | 70 |
| 3.7 | 0.3 | 91 | 0 | 5 | 27.6% | 99.0% | 1375 | 1480 | 105 |
| 3.8 | 2.2 | 91 | 2 | 1 | 29.0% | 82.9% | 1370 | 1525 | 155 |
| 3.9 | 2.1 | 91 | 2 | 1 | 29.5% | 83.1% | 1370 | 1510 | 140 |
| 4 | 2 | 91 | 0 | 3 | 61.4% | 58.1% | 1375 | 1605 | 230 |
| 0.4 | 1.6 | 91 | 2 | 5 | 34.7% | 5.5% | 1370 | 1530 | 160 |
| 0.4 | 0.6 | 91 | 0 | 8 | 32.2% | 97.7% | 1375 | 1580 | 205 |
| 0.5 | 0.5 | 91 | 1 | 7 | 30.0% | 98.2% | 1370 | 1595 | 225 |
| 0.6 | 3.4 | 91 | 2 | 3 | 98.7% | 28.4% | 1390 | 1520 | 130 |
| 0.7 | 2.3 | 91 | 0 | 6 | 71.3% | 91.9% | 1375 | 1420 | 45 |
| 0.8 | 0.2 | 91 | 2 | 6 | 30.8% | 75.6% | 1390 | 1610 | 220 |
| 0.9 | 1.1 | 91 | 2 | 5 | 47.8% | 12.4% | 1370 | 1525 | 155 |
| 1 | 1.9 | 91.1 | 0 | 6 | 92.3% | 92.8% | 1375 | 1420 | 45 |
| 1.1 | 1.8 | 91.1 | 1 | 5 | 83.1% | 14.7% | 1375 | 1440 | 65 |
| 1.1 | 0.8 | 91.1 | 2 | 5 | 36.1% | 15.2% | 1370 | 1535 | 165 |
| 1.2 | 3.7 | 91.1 | 0 | 4 | 89.2% | 39.4% | 1375 | 1785 | 410 |
| 1.3 | 3.6 | 91.1 | 1 | 3 | 75.5% | 43.3% | 1375 | 1700 | 325 |
| 1.4 | 2.5 | 91.1 | 2 | 3 | 64.8% | 42.6% | 1370 | 1425 | 55 |
| 1.5 | 1.4 | 91.1 | 0 | 6 | 91.2% | 94.7% | 1375 | 1430 | 55 |
| 1.6 | 1.3 | 91.1 | 1 | 5 | 82.1% | 21.3% | 1370 | 1445 | 75 |
| 1.6 | 3.3 | 91.1 | 2 | 2 | 37.0% | 59.4% | 1365 | 1575 | 210 |
| 1.7 | 3.2 | 91.1 | 1 | 3 | 71.6% | 44.7% | 1375 | 1640 | 265 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.8 | 3.1 | 91.1 | 1 | 3 | 71.0% | 45.1% | 1375 | 1625 | 250 |
| 1.9 | 3 | 91.1 | 2 | 2 | 49.8% | 60.9% | 1365 | 1535 | 170 |
| 2 | 1.9 | 91.1 | 0 | 5 | 99.4% | 93.6% | 1375 | 1425 | 50 |
| 0.2 | 1.7 | 91.1 | 1 | 6 | 17.8% | 2.7% | 1370 | 1520 | 150 |
| 0.2 | 0.7 | 91.1 | 0 | 8 | 18.8% | 97.3% | 1375 | 1590 | 215 |
| 2.1 | 0.8 | 91.1 | 1 | 5 | 57.0% | 74.9% | 1370 | 1450 | 80 |
| 2.2 | 3.7 | 91.1 | 2 | 1 | 28.2% | 78.8% | 1365 | 1725 | 360 |
| 2.3 | 2.6 | 91.1 | 0 | 4 | 84.4% | 42.9% | 1375 | 1615 | 240 |
| 2.4 | 2.5 | 91.1 | 1 | 3 | 69.7% | 46.8% | 1375 | 1540 | 165 |
| 2.5 | 1.4 | 91.1 | 2 | 3 | 59.5% | 47.2% | 1370 | 1415 | 45 |
| 2.5 | 0.4 | 91.1 | 0 | 6 | 36.1% | 98.6% | 1375 | 1450 | 75 |
| 2.6 | 3.3 | 91.1 | 1 | 2 | 47.1% | 62.8% | 1375 | 1740 | 365 |
| 2.7 | 2.2 | 91.1 | 0 | 4 | 84.3% | 43.7% | 1375 | 1555 | 180 |
| 2.8 | 2.1 | 91.1 | 0 | 4 | 84.2% | 43.9% | 1375 | 1535 | 160 |
| 2.9 | 3 | 91.1 | 1 | 2 | 46.5% | 63.6% | 1375 | 1695 | 320 |
| 3 | 1.9 | 91.1 | 2 | 2 | 55.8% | 65.0% | 1370 | 1455 | 85 |
| 3 | 0.9 | 91.1 | 0 | 5 | 75.8% | 96.7% | 1375 | 1450 | 75 |
| 0.3 | 0.6 | 91.1 | 1 | 7 | 22.3% | 97.8% | 1370 | 1605 | 235 |
| 3.1 | 3.8 | 91.1 | 2 | 0 | 21.4% | 99.0% | 1440 | 1825 | 385 |
| 3.2 | 2.7 | 91.1 | 0 | 3 | 61.7% | 56.9% | 1375 | 1710 | 335 |
| 3.3 | 2.6 | 91.1 | 1 | 2 | 45.8% | 64.5% | 1375 | 1635 | 260 |
| 3.4 | 1.5 | 91.1 | 2 | 2 | 54.0% | 66.0% | 1375 | 1465 | 90 |
| 3.4 | 0.5 | 91.1 | 0 | 5 | 43.8% | 98.2% | 1375 | 1465 | 90 |
| 3.5 | 0.4 | 91.1 | 1 | 4 | 23.7% | 84.8% | 1370 | 1465 | 95 |
| 3.6 | 0.3 | 91.1 | 2 | 3 | 83.2% | 46.9% | 1405 | 1460 | 55 |
| 3.7 | 0.2 | 91.1 | 0 | 5 | 17.1% | 99.4% | 1375 | 1480 | 105 |
| 3.8 | 1.1 | 91.1 | 0 | 4 | 71.6% | 96.0% | 1375 | 1490 | 115 |
| 3.9 | 2 | 91.1 | 1 | 2 | 45.0% | 65.9% | 1375 | 1540 | 165 |
| 3.9 | 0 | 91.1 | 0 | 5 | 87.2% | 100.0% | 1425 | 1490 | 65 |
| 4 | 0.9 | 91.1 | 2 | 2 | 75.9% | 62.4% | 1390 | 1490 | 100 |
| 0.4 | 3.5 | 91.1 | 0 | 5 | 38.5% | 13.4% | 1375 | 1675 | 300 |
| 0.5 | 3.4 | 91.1 | 1 | 4 | 66.9% | 19.0% | 1385 | 1585 | 200 |
| 0.6 | 2.3 | 91.1 | 2 | 4 | 49.9% | 22.3% | 1370 | 1465 | 95 |
| 0.7 | 1.2 | 91.1 | 0 | 7 | 62.7% | 95.4% | 1375 | 1505 | 130 |
| 0.8 | 1.1 | 91.1 | 1 | 6 | 51.1% | 69.1% | 1370 | 1520 | 150 |
| 0.9 | 1 | 91.1 | 2 | 5 | 44.8% | 12.4% | 1370 | 1535 | 165 |
| 0.9 | 4 | 91.1 | 0 | 4 | 94.6% | 29.6% | 1380 | 1835 | 455 |
| 1 | 3.8 | 91.2 | 1 | 3 | 85.6% | 38.1% | 1385 | 1715 | 330 |
| 1.1 | 2.7 | 91.2 | 2 | 3 | 52.1% | 41.2% | 1370 | 1420 | 50 |
| 1.2 | 1.6 | 91.2 | 0 | 6 | 89.6% | 93.9% | 1375 | 1435 | 60 |
| 1.3 | 1.5 | 91.2 | 1 | 5 | 79.6% | 17.4% | 1375 | 1450 | 75 |
| 1.3 | 0.5 | 91.2 | 2 | 5 | 53.2% | 18.0% | 1390 | 1555 | 165 |
| 1.4 | 3.4 | 91.2 | 0 | 4 | 87.4% | 41.3% | 1375 | 1720 | 345 |
| 1.5 | 0.3 | 91.2 | 1 | 6 | 20.3% | 99.0% | 1370 | 1545 | 175 |
| 1.6 | 0.2 | 91.2 | 0 | 7 | 15.8% | 99.4% | 1375 | 1535 | 160 |
| 1.7 | 1.1 | 91.2 | 0 | 6 | 86.1% | 95.9% | 1375 | 1445 | 70 |
| 1.8 | 2 | 91.2 | 1 | 4 | 96.8% | 29.4% | 1375 | 1410 | 35 |
| 1.8 | 0 | 91.2 | 2 | 5 | 60.1% | 24.8% | 1430 | 1570 | 140 |
| 1.9 | 3.9 | 91.2 | 0 | 3 | 63.0% | 54.7% | 1375 | 1880 | 505 |
| 2 | 3.8 | 91.2 | 1 | 2 | 46.7% | 61.2% | 1370 | 1800 | 430 |
| 0.2 | 2.6 | 91.2 | 2 | 4 | 33.6% | 9.1% | 1390 | 1480 | 90 |
| 2.1 | 2.7 | 91.2 | 1 | 3 | 70.1% | 46.2% | 1375 | 1550 | 175 |
| 2.2 | 1.6 | 91.2 | 2 | 3 | 66.2% | 46.4% | 1370 | 1410 | 40 |
| 2.2 | 0.6 | 91.2 | 0 | 6 | 52.7% | 97.8% | 1375 | 1455 | 80 |
| 2.3 | 0.5 | 91.2 | 1 | 5 | 35.9% | 86.7% | 1370 | 1470 | 100 |
| 2.4 | 3.4 | 91.2 | 2 | 1 | 28.3% | 79.8% | 1365 | 1665 | 300 |
| 2.5 | 2.3 | 91.2 | 0 | 4 | 84.6% | 43.5% | 1375 | 1555 | 180 |
| 2.6 | 0.2 | 91.2 | 1 | 5 | 15.8% | 99.4% | 1380 | 1480 | 100 |
| 2.7 | 1.1 | 91.2 | 1 | 4 | 78.6% | 35.1% | 1375 | 1430 | 55 |
| 2.8 | 1 | 91.2 | 2 | 3 | 67.3% | 47.6% | 1380 | 1425 | 45 |
| 2.8 | 4 | 91.2 | 0 | 2 | 40.5% | 68.2% | 1375 | 1970 | 595 |
| 2.9 | 3.9 | 91.2 | 1 | 1 | 23.8% | 79.0% | 1370 | 1895 | 525 |
| 3 | 2.8 | 91.2 | 2 | 1 | 29.6% | 81.5% | 1370 | 1580 | 210 |
| 0.3 | 1.5 | 91.2 | 0 | 7 | 31.7% | 94.2% | 1375 | 1515 | 140 |
| 3.1 | 1.7 | 91.2 | 1 | 3 | 71.8% | 48.9% | 1375 | 1455 | 80 |
| 3.1 | 0.7 | 91.2 | 2 | 3 | 51.0% | 45.6% | 1385 | 1440 | 55 |
| 3.2 | 3.6 | 91.2 | 0 | 2 | 40.4% | 68.9% | 1375 | 1910 | 535 |
| 3.3 | 3.5 | 91.2 | 1 | 1 | 23.0% | 79.9% | 1370 | 1835 | 465 |
| 3.4 | 2.4 | 91.2 | 2 | 1 | 30.9% | 82.6% | 1370 | 1525 | 155 |
| 3.5 | 1.3 | 91.2 | 0 | 4 | 75.8% | 95.6% | 1375 | 1480 | 105 |
| 3.6 | 1.2 | 91.2 | 1 | 3 | 75.3% | 50.1% | 1375 | 1480 | 105 |
| 3.6 | 3.2 | 91.2 | 2 | 0 | 25.2% | 99.9% | 1450 | 1720 | 270 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.7 | 3.1 | 91.2 | 2 | 0 | 32.5% | 100.0% | 1455 | 1705 | 250 |
| 3.8 | 3 | 91.2 | 0 | 2 | 40.3% | 70.0% | 1375 | 1815 | 440 |
| 3.9 | 2.9 | 91.2 | 0 | 2 | 40.3% | 70.2% | 1375 | 1800 | 425 |
| 4 | 2.8 | 91.2 | 0 | 2 | 40.3% | 70.4% | 1375 | 1785 | 410 |
| 0.4 | 2.4 | 91.2 | 2 | 4 | 47.4% | 16.6% | 1380 | 1475 | 95 |
| 0.5 | 1.3 | 91.2 | 0 | 7 | 52.6% | 95.0% | 1375 | 1515 | 140 |
| 0.6 | 1.2 | 91.2 | 1 | 6 | 43.9% | 56.5% | 1370 | 1525 | 155 |
| 0.6 | 3.2 | 91.2 | 0 | 5 | 57.9% | 20.2% | 1375 | 1610 | 235 |
| 0.7 | 3.1 | 91.2 | 0 | 5 | 67.6% | 23.6% | 1375 | 1595 | 220 |
| 0.8 | 4 | 91.2 | 1 | 3 | 93.1% | 33.3% | 1390 | 1750 | 360 |
| 0.9 | 2.9 | 91.2 | 2 | 3 | 93.0% | 37.2% | 1380 | 1415 | 35 |
| 1 | 1.7 | 91.3 | 0 | 6 | 84.1% | 93.6% | 1375 | 1440 | 65 |
| 1.1 | 1.6 | 91.3 | 1 | 5 | 75.2% | 14.8% | 1375 | 1460 | 85 |
| 1.1 | 0.6 | 91.3 | 2 | 5 | 46.0% | 15.3% | 1385 | 1560 | 175 |
| 1.2 | 3.5 | 91.3 | 0 | 4 | 89.8% | 39.6% | 1375 | 1725 | 350 |
| 1.3 | 3.4 | 91.3 | 1 | 3 | 76.0% | 43.8% | 1375 | 1635 | 260 |
| 1.4 | 2.3 | 91.3 | 2 | 3 | 55.8% | 43.1% | 1370 | 1415 | 45 |
| 1.5 | 1.2 | 91.3 | 0 | 6 | 83.9% | 95.5% | 1375 | 1450 | 75 |
| 1.7 | 1 | 91.3 | 1 | 5 | 62.2% | 22.8% | 1370 | 1465 | 95 |
| 1.7 | 4 | 91.3 | 2 | 1 | 31.7% | 76.9% | 1375 | 1730 | 355 |
| 1.8 | 2.9 | 91.3 | 0 | 4 | 85.3% | 42.4% | 1375 | 1630 | 255 |
| 1.9 | 2.8 | 91.3 | 1 | 3 | 71.0% | 45.9% | 1375 | 1550 | 175 |
| 2 | 1.7 | 91.3 | 2 | 3 | 65.4% | 45.8% | 1370 | 1410 | 40 |
| 2 | 0.7 | 91.3 | 0 | 6 | 60.1% | 97.4% | 1375 | 1460 | 85 |
| 0.2 | 0.5 | 91.3 | 0 | 8 | 18.9% | 98.1% | 1375 | 1610 | 235 |
| 2.1 | 0.6 | 91.3 | 1 | 5 | 38.3% | 74.5% | 1370 | 1475 | 105 |
| 2.2 | 3.5 | 91.3 | 2 | 1 | 28.4% | 79.4% | 1365 | 1660 | 295 |
| 2.3 | 2.4 | 91.3 | 0 | 4 | 84.9% | 43.4% | 1375 | 1555 | 180 |
| 2.5 | 1.2 | 91.3 | 2 | 3 | 84.9% | 47.5% | 1380 | 1415 | 35 |
| 2.5 | 3.2 | 91.3 | 0 | 3 | 62.3% | 56.1% | 1375 | 1755 | 380 |
| 2.6 | 3.1 | 91.3 | 0 | 3 | 62.3% | 56.3% | 1375 | 1740 | 365 |
| 2.7 | 4 | 91.3 | 1 | 1 | 24.2% | 78.8% | 1370 | 1895 | 525 |
| 2.8 | 2.9 | 91.3 | 0 | 3 | 62.2% | 56.7% | 1375 | 1710 | 335 |
| 2.9 | 2.8 | 91.3 | 2 | 1 | 30.0% | 81.6% | 1365 | 1565 | 200 |
| 3 | 1.7 | 91.3 | 0 | 4 | 82.6% | 44.7% | 1375 | 1455 | 80 |
| 0.3 | 1.4 | 91.3 | 1 | 6 | 26.9% | 37.6% | 1370 | 1535 | 165 |
| 0.3 | 0.4 | 91.3 | 0 | 8 | 21.0% | 98.6% | 1375 | 1610 | 235 |
| 3.1 | 0.6 | 91.3 | 1 | 4 | 28.2% | 40.4% | 1370 | 1445 | 75 |
| 3.2 | 3.5 | 91.3 | 2 | 0 | 25.8% | 99.9% | 1445 | 1750 | 305 |
| 3.3 | 2.4 | 91.3 | 0 | 3 | 62.1% | 57.6% | 1375 | 1635 | 260 |
| 3.5 | 1.2 | 91.3 | 2 | 2 | 77.3% | 62.1% | 1385 | 1465 | 80 |
| 3.6 | 0.1 | 91.3 | 2 | 3 | 94.8% | 47.2% | 1415 | 1460 | 45 |
| 3.7 | 1 | 91.3 | 2 | 2 | 81.3% | 60.8% | 1390 | 1475 | 85 |
| 3.7 | 0 | 91.3 | 2 | 3 | 99.8% | 48.5% | 1435 | 1465 | 30 |
| 3.8 | 0.9 | 91.3 | 2 | 2 | 81.4% | 60.1% | 1395 | 1475 | 80 |
| 3.9 | 0.8 | 91.3 | 2 | 2 | 80.0% | 59.4% | 1395 | 1480 | 85 |
| 4 | 0.7 | 91.3 | 2 | 2 | 78.7% | 58.7% | 1395 | 1485 | 90 |
| 0.4 | 0.3 | 91.3 | 0 | 8 | 21.0% | 99.0% | 1375 | 1610 | 235 |
| 0.5 | 2.2 | 91.3 | 0 | 6 | 51.2% | 92.7% | 1375 | 1440 | 65 |
| 0.6 | 2.1 | 91.3 | 0 | 6 | 61.6% | 92.9% | 1375 | 1440 | 65 |
| 0.8 | 1.9 | 91.3 | 2 | 4 | 61.5% | 23.8% | 1370 | 1480 | 110 |
| 0.8 | 0.9 | 91.3 | 0 | 7 | 54.7% | 96.6% | 1375 | 1530 | 155 |
| 0.9 | 0.8 | 91.3 | 1 | 6 | 48.1% | 74.9% | 1370 | 1540 | 170 |
| 1 | 3.6 | 91.4 | 2 | 2 | 74.0% | 50.6% | 1390 | 1565 | 175 |
| 1.1 | 2.5 | 91.4 | 0 | 5 | 99.1% | 28.1% | 1375 | 1470 | 95 |
| 1.2 | 2.4 | 91.4 | 1 | 4 | 99.8% | 27.9% | 1375 | 1405 | 30 |
| 1.3 | 1.3 | 91.4 | 2 | 4 | 63.7% | 26.6% | 1370 | 1490 | 120 |
| 1.3 | 3.3 | 91.4 | 0 | 4 | 88.9% | 41.6% | 1375 | 1675 | 300 |
| 1.4 | 3.2 | 91.4 | 2 | 2 | 51.1% | 58.2% | 1375 | 1510 | 135 |
| 1.5 | 3.1 | 91.4 | 2 | 2 | 41.6% | 59.7% | 1370 | 1495 | 125 |
| 1.7 | 2.9 | 91.4 | 1 | 3 | 72.3% | 45.4% | 1375 | 1550 | 175 |
| 1.8 | 0.8 | 91.4 | 0 | 6 | 67.4% | 97.0% | 1375 | 1470 | 95 |
| 1.9 | 0.7 | 91.4 | 1 | 5 | 40.7% | 62.3% | 1370 | 1480 | 110 |
| 2 | 3.6 | 91.4 | 2 | 1 | 27.5% | 79.0% | 1365 | 1655 | 290 |
| 0.2 | 2.4 | 91.4 | 0 | 6 | 20.4% | 73.4% | 1375 | 1455 | 80 |
| 2.1 | 2.5 | 91.4 | 0 | 4 | 85.2% | 43.2% | 1375 | 1555 | 180 |
| 2.2 | 2.4 | 91.4 | 1 | 3 | 70.6% | 47.0% | 1375 | 1480 | 105 |
| 2.3 | 1.3 | 91.4 | 2 | 3 | 92.9% | 46.9% | 1380 | 1425 | 45 |
| 2.3 | 3.3 | 91.4 | 0 | 3 | 62.5% | 56.0% | 1375 | 1760 | 385 |
| 2.4 | 3.2 | 91.4 | 2 | 1 | 30.5% | 80.4% | 1365 | 1600 | 235 |
| 2.5 | 3.1 | 91.4 | 2 | 1 | 30.7% | 80.8% | 1365 | 1590 | 225 |
| 2.8 | 2.8 | 91.4 | 1 | 2 | 47.1% | 64.2% | 1375 | 1620 | 245 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3 | 1.6 | 91.4 | 1 | 3 | 75.2% | 49.2% | 1375 | 1450 | 75 |
| 3 | 0.6 | 91.4 | 2 | 3 | 52.1% | 42.4% | 1390 | 1430 | 40 |
| 0.3 | 3.3 | 91.4 | 1 | 4 | 59.8% | 12.6% | 1395 | 1520 | 125 |
| 3.1 | 3.5 | 91.4 | 0 | 2 | 40.7% | 69.4% | 1375 | 1865 | 490 |
| 3.2 | 3.4 | 91.4 | 1 | 1 | 23.3% | 80.3% | 1370 | 1790 | 420 |
| 3.4 | 0.2 | 91.4 | 2 | 3 | 98.6% | 44.7% | 1415 | 1445 | 30 |
| 3.5 | 2.1 | 91.4 | 1 | 2 | 46.2% | 65.9% | 1375 | 1515 | 140 |
| 3.6 | 2 | 91.4 | 0 | 3 | 62.2% | 58.5% | 1375 | 1555 | 180 |
| 3.9 | 1.7 | 91.4 | 0 | 3 | 62.1% | 59.0% | 1375 | 1505 | 130 |
| 4 | 1.6 | 91.4 | 0 | 3 | 62.1% | 59.2% | 1375 | 1500 | 125 |
| 0.4 | 1.2 | 91.4 | 0 | 7 | 42.7% | 95.4% | 1375 | 1535 | 160 |
| 0.5 | 1.1 | 91.4 | 2 | 5 | 29.9% | 7.0% | 1370 | 1565 | 195 |
| 0.6 | 1 | 91.4 | 0 | 7 | 51.9% | 96.2% | 1375 | 1535 | 160 |
| 0.6 | 0 | 91.4 | 1 | 7 | 21.9% | 100.0% | 1430 | 1635 | 205 |
| 0.7 | 3.9 | 91.4 | 2 | 2 | 89.9% | 42.5% | 1400 | 1610 | 210 |
| 1 | 1.5 | 91.5 | 2 | 4 | 56.5% | 25.3% | 1370 | 1500 | 130 |
| 1.1 | 0.4 | 91.5 | 1 | 6 | 32.2% | 87.0% | 1375 | 1570 | 195 |
| 1.2 | 0.3 | 91.5 | 2 | 5 | 46.5% | 16.7% | 1400 | 1585 | 185 |
| 1.3 | 2.2 | 91.5 | 1 | 4 | 98.1% | 28.4% | 1375 | 1405 | 30 |
| 1.4 | 2.1 | 91.5 | 1 | 4 | 98.0% | 28.7% | 1375 | 1405 | 30 |
| 1.5 | 2 | 91.5 | 2 | 3 | 49.6% | 44.0% | 1370 | 1430 | 60 |
| 1.5 | 0 | 91.5 | 0 | 7 | 55.0% | 100.0% | 1435 | 1565 | 130 |
| 1.7 | 3.8 | 91.5 | 2 | 1 | 31.5% | 77.5% | 1375 | 1665 | 290 |
| 1.8 | 2.7 | 91.5 | 0 | 4 | 85.9% | 42.8% | 1375 | 1570 | 195 |
| 1.9 | 2.6 | 91.5 | 1 | 3 | 71.4% | 46.3% | 1375 | 1490 | 115 |
| 2 | 0.5 | 91.5 | 0 | 6 | 41.1% | 98.2% | 1375 | 1485 | 110 |
| 2.1 | 1.4 | 91.5 | 1 | 4 | 95.9% | 30.9% | 1375 | 1410 | 35 |
| 2.1 | 0.4 | 91.5 | 2 | 4 | 74.4% | 28.5% | 1400 | 1510 | 110 |
| 2.2 | 0.3 | 91.5 | 0 | 6 | 23.3% | 99.0% | 1375 | 1490 | 115 |
| 2.3 | 2.2 | 91.5 | 2 | 2 | 47.1% | 63.7% | 1370 | 1455 | 85 |
| 2.4 | 2.1 | 91.5 | 2 | 2 | 49.0% | 64.1% | 1370 | 1450 | 80 |
| 2.6 | 1.9 | 91.5 | 2 | 2 | 61.2% | 63.7% | 1375 | 1450 | 75 |
| 2.7 | 1.8 | 91.5 | 1 | 3 | 75.2% | 48.6% | 1375 | 1440 | 65 |
| 2.7 | 0.8 | 91.5 | 0 | 5 | 63.8% | 97.1% | 1375 | 1430 | 55 |
| 2.8 | 0.7 | 91.5 | 2 | 3 | 63.8% | 41.9% | 1390 | 1435 | 45 |
| 2.9 | 0.6 | 91.5 | 1 | 4 | 30.5% | 38.0% | 1375 | 1435 | 60 |
| 3 | 3.5 | 91.5 | 0 | 2 | 40.8% | 69.5% | 1375 | 1855 | 480 |
| 0.3 | 3.2 | 91.5 | 1 | 4 | 60.0% | 12.7% | 1395 | 1490 | 95 |
| 3.1 | 3.4 | 91.5 | 0 | 2 | 40.8% | 69.7% | 1375 | 1835 | 460 |
| 3.2 | 0.3 | 91.5 | 1 | 4 | 33.7% | 66.7% | 1390 | 1445 | 55 |
| 3.3 | 2.2 | 91.5 | 1 | 2 | 46.7% | 65.7% | 1375 | 1520 | 145 |
| 3.4 | 2.1 | 91.5 | 1 | 2 | 47.2% | 65.9% | 1375 | 1500 | 125 |
| 3.5 | 2 | 91.5 | 0 | 3 | 62.4% | 58.5% | 1375 | 1545 | 170 |
| 3.6 | 1.9 | 91.5 | 0 | 3 | 62.4% | 58.7% | 1375 | 1525 | 150 |
| 3.7 | 1.8 | 91.5 | 0 | 3 | 62.3% | 58.9% | 1375 | 1510 | 135 |
| 3.8 | 1.7 | 91.5 | 0 | 3 | 62.3% | 59.1% | 1375 | 1495 | 120 |
| 3.9 | 1.6 | 91.5 | 0 | 3 | 62.3% | 59.3% | 1375 | 1500 | 125 |
| 4 | 1.5 | 91.5 | 0 | 3 | 62.3% | 59.5% | 1375 | 1500 | 125 |
| 0.4 | 1.1 | 91.5 | 2 | 5 | 24.9% | 5.6% | 1370 | 1575 | 205 |
| 0.5 | 1 | 91.5 | 0 | 7 | 48.5% | 96.2% | 1375 | 1545 | 170 |
| 0.5 | 0 | 91.5 | 1 | 7 | 18.2% | 100.0% | 1430 | 1645 | 215 |
| 0.6 | 3.9 | 91.5 | 2 | 2 | 94.4% | 39.3% | 1400 | 1595 | 195 |
| 0.7 | 2.8 | 91.5 | 0 | 5 | 68.2% | 23.8% | 1375 | 1500 | 125 |
| 0.8 | 2.7 | 91.5 | 1 | 4 | 79.6% | 26.6% | 1375 | 1415 | 40 |
| 1.1 | 0.3 | 91.6 | 2 | 5 | 43.4% | 15.4% | 1400 | 1595 | 195 |
| 1.2 | 2.2 | 91.6 | 1 | 4 | 94.1% | 28.2% | 1375 | 1415 | 40 |
| 1.3 | 2.1 | 91.6 | 1 | 4 | 94.1% | 28.6% | 1375 | 1415 | 40 |
| 1.4 | 2 | 91.6 | 2 | 3 | 44.6% | 43.8% | 1370 | 1440 | 70 |
| 1.4 | 0 | 91.6 | 0 | 7 | 51.2% | 100.0% | 1435 | 1570 | 135 |
| 1.5 | 0.9 | 91.6 | 1 | 5 | 58.7% | 20.3% | 1375 | 1495 | 120 |
| 1.9 | 1.5 | 91.6 | 2 | 3 | 67.6% | 45.5% | 1375 | 1440 | 65 |
| 1.9 | 0.5 | 91.6 | 0 | 6 | 40.3% | 98.2% | 1375 | 1495 | 120 |
| 2 | 0.4 | 91.6 | 1 | 5 | 41.0% | 67.9% | 1385 | 1510 | 125 |
| 0.2 | 3.2 | 91.6 | 2 | 3 | 68.0% | 12.4% | 1400 | 1445 | 45 |
| 2.1 | 0.3 | 91.6 | 0 | 6 | 22.6% | 99.0% | 1375 | 1500 | 125 |
| 2.2 | 2.2 | 91.6 | 2 | 2 | 42.8% | 63.6% | 1370 | 1450 | 80 |
| 2.3 | 2.1 | 91.6 | 2 | 2 | 52.6% | 63.5% | 1375 | 1450 | 75 |
| 2.4 | 2 | 91.6 | 0 | 4 | 85.6% | 44.3% | 1375 | 1450 | 75 |
| 2.5 | 1.9 | 91.6 | 2 | 2 | 66.4% | 62.6% | 1380 | 1445 | 65 |
| 2.6 | 1.8 | 91.6 | 1 | 3 | 76.6% | 48.6% | 1375 | 1435 | 60 |
| 2.6 | 0.8 | 91.6 | 0 | 5 | 62.9% | 97.1% | 1375 | 1425 | 50 |
| 2.7 | 0.7 | 91.6 | 2 | 3 | 61.9% | 40.6% | 1390 | 1445 | 55 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.8 | 0.6 | 91.6 | 1 | 4 | 26.9% | 36.9% | 1375 | 1425 | 50 |
| 2.9 | 3.5 | 91.6 | 0 | 2 | 40.9% | 69.6% | 1375 | 1840 | 465 |
| 3 | 3.4 | 91.6 | 1 | 1 | 23.8% | 80.5% | 1370 | 1760 | 390 |
| 0.3 | 2.1 | 91.6 | 0 | 6 | 30.9% | 89.7% | 1375 | 1475 | 100 |
| 3.1 | 0.3 | 91.6 | 1 | 4 | 41.0% | 40.7% | 1395 | 1440 | 45 |
| 3.2 | 2.2 | 91.6 | 1 | 2 | 47.8% | 65.8% | 1375 | 1505 | 130 |
| 3.3 | 2.1 | 91.6 | 2 | 1 | 44.2% | 78.3% | 1385 | 1480 | 95 |
| 3.4 | 3 | 91.6 | 1 | 1 | 23.1% | 81.4% | 1370 | 1700 | 330 |
| 3.5 | 2.9 | 91.6 | 1 | 1 | 23.0% | 81.7% | 1370 | 1685 | 315 |
| 3.6 | 2.8 | 91.6 | 1 | 1 | 23.7% | 81.9% | 1375 | 1670 | 295 |
| 3.7 | 2.7 | 91.6 | 1 | 1 | 23.6% | 82.1% | 1375 | 1655 | 280 |
| 3.8 | 2.6 | 91.6 | 1 | 1 | 23.4% | 82.3% | 1375 | 1645 | 270 |
| 3.9 | 2.5 | 91.6 | 1 | 1 | 23.3% | 82.5% | 1375 | 1630 | 255 |
| 4 | 2.4 | 91.6 | 1 | 1 | 23.2% | 82.7% | 1375 | 1610 | 235 |
| 0.4 | 2 | 91.6 | 1 | 5 | 39.4% | 8.7% | 1375 | 1495 | 120 |
| 0.5 | 1.9 | 91.6 | 1 | 5 | 49.2% | 9.1% | 1375 | 1495 | 120 |
| 0.5 | 0.9 | 91.6 | 2 | 5 | 25.9% | 7.0% | 1375 | 1585 | 210 |
| 0.6 | 3.8 | 91.6 | 0 | 4 | 95.3% | 21.6% | 1390 | 1725 | 335 |
| 0.7 | 3.7 | 91.6 | 1 | 3 | 97.3% | 31.0% | 1395 | 1635 | 240 |
| 0.8 | 2.6 | 91.6 | 2 | 3 | 89.3% | 35.2% | 1385 | 1440 | 55 |
| 0.9 | 1.5 | 91.6 | 0 | 6 | 71.8% | 94.7% | 1375 | 1470 | 95 |
| 1 | 1.3 | 91.7 | 1 | 5 | 59.8% | 13.6% | 1375 | 1500 | 125 |
| 1 | 3.3 | 91.7 | 2 | 2 | 79.3% | 51.3% | 1390 | 1470 | 80 |
| 1.1 | 3.2 | 91.7 | 1 | 3 | 82.6% | 41.2% | 1380 | 1540 | 160 |
| 1.2 | 3.1 | 91.7 | 1 | 3 | 80.9% | 43.2% | 1380 | 1525 | 145 |
| 1.3 | 3 | 91.7 | 2 | 2 | 47.8% | 57.3% | 1380 | 1455 | 75 |
| 1.4 | 1.9 | 91.7 | 0 | 5 | 98.7% | 29.3% | 1375 | 1405 | 30 |
| 1.5 | 1.8 | 91.7 | 1 | 4 | 90.2% | 29.4% | 1375 | 1425 | 50 |
| 1.5 | 0.8 | 91.7 | 2 | 4 | 60.1% | 24.5% | 1385 | 1525 | 140 |
| 1.6 | 3.7 | 91.7 | 0 | 3 | 66.1% | 52.2% | 1375 | 1775 | 400 |
| 1.7 | 3.6 | 91.7 | 1 | 2 | 50.8% | 61.0% | 1375 | 1685 | 310 |
| 1.8 | 2.5 | 91.7 | 2 | 2 | 33.3% | 62.1% | 1370 | 1450 | 80 |
| 1.9 | 1.4 | 91.7 | 0 | 5 | 98.1% | 95.8% | 1375 | 1405 | 30 |
| 2 | 1.3 | 91.7 | 1 | 4 | 83.8% | 31.0% | 1375 | 1430 | 55 |
| 2 | 3.3 | 91.7 | 2 | 1 | 16.7% | 80.1% | 1365 | 1560 | 195 |
| 2.1 | 1.2 | 91.7 | 1 | 4 | 75.7% | 31.3% | 1375 | 1430 | 55 |
| 2.1 | 3.2 | 91.7 | 0 | 3 | 63.3% | 56.4% | 1375 | 1695 | 320 |
| 2.2 | 3.1 | 91.7 | 0 | 3 | 63.1% | 56.6% | 1375 | 1685 | 310 |
| 2.3 | 4 | 91.7 | 1 | 1 | 24.6% | 79.0% | 1370 | 1830 | 460 |
| 2.4 | 2.9 | 91.7 | 0 | 3 | 63.0% | 57.0% | 1375 | 1655 | 280 |
| 2.5 | 2.8 | 91.7 | 2 | 1 | 33.3% | 79.8% | 1375 | 1495 | 120 |
| 2.6 | 2.7 | 91.7 | 1 | 2 | 47.9% | 64.5% | 1375 | 1560 | 185 |
| 2.7 | 1.6 | 91.7 | 0 | 4 | 87.8% | 45.1% | 1375 | 1440 | 65 |
| 2.8 | 1.5 | 91.7 | 2 | 2 | 82.3% | 59.4% | 1385 | 1435 | 50 |
| 2.9 | 1.4 | 91.7 | 1 | 3 | 71.7% | 49.7% | 1375 | 1445 | 70 |
| 2.9 | 0.4 | 91.7 | 0 | 5 | 29.9% | 98.6% | 1375 | 1435 | 60 |
| 3 | 3.3 | 91.7 | 1 | 1 | 23.9% | 80.9% | 1370 | 1730 | 360 |
| 0.3 | 3 | 91.7 | 0 | 5 | 33.8% | 10.3% | 1380 | 1500 | 120 |
| 3.1 | 2.2 | 91.7 | 2 | 1 | 45.5% | 77.6% | 1385 | 1480 | 95 |
| 3.2 | 2.1 | 91.7 | 2 | 1 | 46.3% | 77.2% | 1385 | 1480 | 95 |
| 3.3 | 3 | 91.7 | 1 | 1 | 23.3% | 81.6% | 1370 | 1685 | 315 |
| 3.4 | 2.9 | 91.7 | 1 | 1 | 23.2% | 81.8% | 1370 | 1670 | 300 |
| 3.5 | 2.8 | 91.7 | 1 | 1 | 23.0% | 82.0% | 1370 | 1655 | 285 |
| 3.6 | 2.7 | 91.7 | 1 | 1 | 23.8% | 82.2% | 1375 | 1645 | 270 |
| 3.7 | 2.6 | 91.7 | 1 | 1 | 23.6% | 82.4% | 1375 | 1630 | 255 |
| 3.8 | 2.5 | 91.7 | 1 | 1 | 23.5% | 82.6% | 1375 | 1615 | 240 |
| 3.9 | 2.4 | 91.7 | 1 | 1 | 23.4% | 82.8% | 1375 | 1600 | 225 |
| 4 | 2.3 | 91.7 | 1 | 1 | 23.3% | 83.0% | 1375 | 1585 | 210 |
| 0.4 | 2.9 | 91.7 | 1 | 4 | 65.5% | 16.3% | 1390 | 1430 | 40 |
| 0.5 | 1.8 | 91.7 | 2 | 4 | 49.4% | 20.3% | 1380 | 1525 | 145 |
| 0.5 | 0.8 | 91.7 | 0 | 7 | 41.1% | 97.0% | 1375 | 1570 | 195 |
| 0.6 | 0.7 | 91.7 | 1 | 6 | 31.4% | 55.2% | 1370 | 1580 | 210 |
| 0.7 | 3.6 | 91.7 | 2 | 2 | 90.9% | 43.1% | 1400 | 1510 | 110 |
| 0.8 | 2.5 | 91.7 | 0 | 5 | 78.4% | 27.1% | 1375 | 1425 | 50 |
| 0.9 | 2.4 | 91.7 | 1 | 4 | 89.6% | 27.3% | 1375 | 1425 | 50 |
| 1 | 1.2 | 91.8 | 2 | 4 | 50.2% | 25.5% | 1375 | 1530 | 155 |
| 1.1 | 0.1 | 91.8 | 2 | 5 | 37.9% | 15.5% | 1410 | 1615 | 205 |
| 1.2 | 1 | 91.8 | 1 | 5 | 57.9% | 16.4% | 1375 | 1510 | 135 |
| 1.2 | 4 | 91.8 | 2 | 1 | 48.6% | 73.0% | 1395 | 1640 | 245 |
| 1.3 | 2.9 | 91.8 | 0 | 4 | 90.1% | 42.4% | 1375 | 1550 | 175 |
| 1.4 | 2.8 | 91.8 | 1 | 3 | 59.4% | 45.3% | 1370 | 1465 | 95 |
| 1.5 | 1.7 | 91.8 | 2 | 3 | 52.3% | 44.0% | 1375 | 1460 | 85 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.5 | 0.7 | 91.8 | 0 | 6 | 55.6% | 97.4% | 1375 | 1505 | 130 |
| 1.6 | 0.6 | 91.8 | 1 | 5 | 45.4% | 21.8% | 1380 | 1520 | 140 |
| 1.7 | 3.5 | 91.8 | 2 | 1 | 19.2% | 78.5% | 1375 | 1570 | 195 |
| 1.8 | 2.4 | 91.8 | 0 | 4 | 86.7% | 43.5% | 1375 | 1480 | 105 |
| 1.9 | 2.3 | 91.8 | 1 | 3 | 76.2% | 47.1% | 1375 | 1440 | 65 |
| 2 | 1.2 | 91.8 | 0 | 5 | 92.1% | 96.4% | 1375 | 1420 | 45 |
| 0.2 | 2 | 91.8 | 1 | 5 | 22.7% | 7.3% | 1380 | 1515 | 135 |
| 2.1 | 0.1 | 91.8 | 2 | 4 | 67.2% | 28.8% | 1415 | 1550 | 135 |
| 2.2 | 1 | 91.8 | 1 | 4 | 57.0% | 31.7% | 1375 | 1440 | 65 |
| 2.2 | 4 | 91.8 | 0 | 2 | 41.9% | 68.8% | 1375 | 1885 | 510 |
| 2.3 | 3.9 | 91.8 | 1 | 1 | 24.6% | 79.4% | 1370 | 1800 | 430 |
| 2.4 | 2.8 | 91.8 | 0 | 3 | 63.2% | 57.3% | 1375 | 1625 | 250 |
| 2.5 | 2.7 | 91.8 | 2 | 1 | 31.1% | 78.4% | 1375 | 1485 | 110 |
| 2.6 | 2.6 | 91.8 | 1 | 2 | 48.4% | 64.8% | 1375 | 1530 | 155 |
| 2.7 | 1.5 | 91.8 | 0 | 4 | 88.2% | 45.3% | 1375 | 1440 | 65 |
| 2.8 | 1.4 | 91.8 | 2 | 2 | 89.1% | 57.6% | 1390 | 1430 | 40 |
| 2.9 | 1.3 | 91.8 | 1 | 3 | 63.3% | 49.9% | 1375 | 1440 | 65 |
| 2.9 | 3.3 | 91.8 | 0 | 2 | 41.2% | 70.2% | 1375 | 1780 | 405 |
| 3 | 3.2 | 91.8 | 0 | 2 | 41.2% | 70.4% | 1375 | 1765 | 390 |
| 0.3 | 0.9 | 91.8 | 1 | 6 | 19.4% | 36.0% | 1370 | 1590 | 220 |
| 3.1 | 2.1 | 91.8 | 0 | 3 | 63.0% | 58.6% | 1375 | 1520 | 145 |
| 3.2 | 3 | 91.8 | 0 | 2 | 41.1% | 70.7% | 1375 | 1735 | 360 |
| 3.3 | 2.9 | 91.8 | 0 | 2 | 41.1% | 70.9% | 1375 | 1720 | 345 |
| 3.4 | 2.8 | 91.8 | 0 | 2 | 41.1% | 71.1% | 1375 | 1705 | 330 |
| 3.5 | 2.7 | 91.8 | 0 | 2 | 41.1% | 71.3% | 1375 | 1690 | 315 |
| 3.6 | 2.6 | 91.8 | 0 | 2 | 41.1% | 71.5% | 1375 | 1675 | 300 |
| 3.7 | 2.5 | 91.8 | 2 | 0 | 16.1% | 93.1% | 1390 | 1530 | 140 |
| 3.8 | 2.4 | 91.8 | 1 | 1 | 23.7% | 83.0% | 1375 | 1585 | 210 |
| 3.9 | 1.3 | 91.8 | 0 | 3 | 65.8% | 60.1% | 1375 | 1500 | 125 |
| 4 | 1.2 | 91.8 | 2 | 1 | 70.2% | 70.7% | 1405 | 1485 | 80 |
| 0.4 | 1.8 | 91.8 | 2 | 4 | 44.0% | 17.0% | 1380 | 1535 | 155 |
| 0.4 | 0.8 | 91.8 | 0 | 7 | 36.7% | 97.0% | 1375 | 1580 | 205 |
| 0.5 | 0.7 | 91.8 | 1 | 6 | 27.4% | 48.7% | 1375 | 1590 | 215 |
| 0.6 | 3.6 | 91.8 | 2 | 2 | 95.5% | 39.8% | 1400 | 1490 | 90 |
| 0.7 | 2.5 | 91.8 | 0 | 5 | 68.8% | 24.0% | 1375 | 1415 | 40 |
| 0.8 | 2.4 | 91.8 | 1 | 4 | 80.4% | 27.1% | 1375 | 1435 | 60 |
| 0.9 | 1.3 | 91.8 | 2 | 4 | 49.2% | 25.3% | 1375 | 1530 | 155 |
| 0.9 | 3.3 | 91.8 | 0 | 4 | 97.3% | 30.2% | 1380 | 1610 | 230 |
| 1 | 3.1 | 91.9 | 0 | 4 | 84.2% | 33.6% | 1375 | 1565 | 190 |
| 1.1 | 4 | 91.7 | 1 | 2 | 67.4% | 51.7% | 1395 | 1715 | 320 |
| 1.2 | 2.9 | 91.9 | 2 | 2 | 52.4% | 55.9% | 1385 | 1445 | 60 |
| 1.3 | 1.8 | 91.9 | 0 | 5 | 90.8% | 29.5% | 1375 | 1425 | 50 |
| 1.4 | 1.7 | 91.9 | 1 | 4 | 81.2% | 29.5% | 1375 | 1445 | 70 |
| 1.4 | 0.7 | 91.9 | 2 | 4 | 55.1% | 21.0% | 1390 | 1545 | 155 |
| 1.5 | 3.6 | 91.9 | 0 | 3 | 67.5% | 49.3% | 1375 | 1725 | 350 |
| 1.6 | 3.5 | 91.9 | 1 | 2 | 53.7% | 60.2% | 1380 | 1640 | 260 |
| 1.7 | 2.4 | 91.9 | 2 | 2 | 26.1% | 61.0% | 1370 | 1445 | 75 |
| 1.8 | 1.3 | 91.9 | 0 | 5 | 90.6% | 96.4% | 1375 | 1425 | 50 |
| 1.9 | 1.2 | 91.9 | 1 | 4 | 71.6% | 31.1% | 1375 | 1450 | 75 |
| 2 | 0.1 | 91.9 | 2 | 4 | 64.2% | 27.5% | 1415 | 1560 | 145 |
| 0.2 | 1.9 | 91.9 | 1 | 5 | 22.7% | 7.3% | 1380 | 1525 | 145 |
| 2.1 | 1 | 91.9 | 1 | 4 | 54.8% | 31.7% | 1375 | 1450 | 75 |
| 2.1 | 4 | 91.9 | 0 | 2 | 42.5% | 67.4% | 1375 | 1870 | 495 |
| 2.2 | 3.9 | 91.9 | 1 | 1 | 24.9% | 79.4% | 1370 | 1785 | 415 |
| 2.3 | 2.8 | 91.9 | 0 | 3 | 63.4% | 57.3% | 1375 | 1610 | 235 |
| 2.4 | 2.7 | 91.9 | 2 | 1 | 27.6% | 77.2% | 1375 | 1485 | 110 |
| 2.5 | 2.6 | 91.9 | 1 | 2 | 47.9% | 64.8% | 1370 | 1515 | 145 |
| 2.6 | 1.5 | 91.9 | 0 | 4 | 89.9% | 45.4% | 1375 | 1435 | 60 |
| 2.7 | 1.4 | 91.9 | 2 | 2 | 91.3% | 56.4% | 1390 | 1430 | 40 |
| 2.8 | 1.3 | 91.9 | 1 | 3 | 59.4% | 49.9% | 1375 | 1435 | 60 |
| 2.8 | 3.3 | 91.9 | 0 | 2 | 41.3% | 70.3% | 1375 | 1765 | 390 |
| 2.9 | 3.2 | 91.9 | 0 | 2 | 41.3% | 70.5% | 1375 | 1750 | 375 |
| 3 | 3.1 | 91.9 | 0 | 2 | 41.3% | 70.7% | 1375 | 1735 | 360 |
| 0.3 | 0.8 | 91.9 | 1 | 6 | 17.6% | 35.7% | 1370 | 1600 | 230 |
| 3.1 | 3 | 91.9 | 0 | 2 | 41.3% | 70.9% | 1375 | 1720 | 345 |
| 3.2 | 2.9 | 91.9 | 2 | 0 | 15.6% | 93.0% | 1380 | 1565 | 185 |
| 3.3 | 2.8 | 91.9 | 1 | 1 | 23.5% | 82.2% | 1370 | 1625 | 255 |
| 3.4 | 1.7 | 91.9 | 0 | 3 | 64.2% | 59.5% | 1375 | 1475 | 100 |
| 3.5 | 1.6 | 91.9 | 2 | 1 | 60.4% | 72.2% | 1395 | 1465 | 70 |
| 3.6 | 1.5 | 91.9 | 1 | 2 | 40.9% | 67.6% | 1375 | 1480 | 105 |
| 3.6 | 0.5 | 91.9 | 0 | 4 | 35.3% | 98.5% | 1375 | 1475 | 100 |
| 3.7 | 0.4 | 91.9 | 2 | 2 | 92.0% | 48.8% | 1410 | 1460 | 50 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.8 | 0.3 | 91.9 | 0 | 4 | 19.8% | 99.0% | 1375 | 1485 | 110 |
| 3.9 | 2.2 | 91.9 | 0 | 2 | 41.1% | 72.3% | 1375 | 1600 | 225 |
| 4 | 2.1 | 91.9 | 0 | 2 | 41.1% | 72.5% | 1375 | 1580 | 205 |
| 0.4 | 3.7 | 91.9 | 2 | 2 | 99.3% | 31.3% | 1405 | 1490 | 85 |
| 0.5 | 2.6 | 91.9 | 0 | 5 | 49.3% | 17.2% | 1375 | 1430 | 55 |
| 0.6 | 2.5 | 91.9 | 1 | 4 | 82.1% | 22.7% | 1385 | 1450 | 65 |
| 0.7 | 1.4 | 91.9 | 2 | 4 | 43.8% | 24.3% | 1375 | 1540 | 165 |
| 0.7 | 0.4 | 91.9 | 0 | 7 | 30.2% | 98.6% | 1375 | 1590 | 215 |
| 0.8 | 3.3 | 91.9 | 1 | 3 | 98.7% | 34.3% | 1395 | 1520 | 125 |
| 0.9 | 2.2 | 91.9 | 0 | 5 | 88.8% | 28.6% | 1375 | 1425 | 50 |
| 1 | 3 | 92 | 1 | 3 | 88.1% | 39.5% | 1385 | 1460 | 75 |
| 1.1 | 1.9 | 92 | 2 | 3 | 37.4% | 42.2% | 1375 | 1475 | 100 |
| 1.1 | 0.9 | 92 | 0 | 6 | 61.2% | 96.7% | 1375 | 1520 | 145 |
| 1.2 | 0.8 | 92 | 1 | 5 | 39.5% | 16.5% | 1375 | 1530 | 155 |
| 1.3 | 3.7 | 92 | 2 | 1 | 53.6% | 75.0% | 1395 | 1560 | 165 |
| 1.4 | 2.6 | 92 | 0 | 4 | 89.7% | 43.2% | 1375 | 1475 | 100 |
| 1.5 | 2.5 | 92 | 1 | 3 | 54.8% | 46.2% | 1370 | 1435 | 65 |
| 1.6 | 1.4 | 92 | 2 | 3 | 75.7% | 39.8% | 1385 | 1480 | 95 |
| 1.6 | 0.4 | 92 | 0 | 6 | 28.9% | 98.6% | 1375 | 1530 | 155 |
| 1.7 | 3.3 | 92 | 1 | 2 | 51.3% | 61.8% | 1375 | 1590 | 215 |
| 1.8 | 2.2 | 92 | 0 | 4 | 88.0% | 44.0% | 1375 | 1420 | 45 |
| 1.9 | 2.1 | 92 | 2 | 2 | 44.7% | 58.7% | 1380 | 1440 | 60 |
| 2 | 2 | 92 | 0 | 4 | 88.9% | 44.4% | 1375 | 1420 | 45 |
| 0.2 | 1.8 | 92 | 0 | 6 | 20.7% | 7.0% | 1375 | 1515 | 140 |
| 2.1 | 1.9 | 92 | 0 | 4 | 89.6% | 44.6% | 1375 | 1420 | 45 |
| 2.3 | 1.7 | 92 | 1 | 3 | 74.2% | 48.8% | 1375 | 1425 | 50 |
| 2.3 | 0.7 | 92 | 0 | 5 | 52.1% | 97.7% | 1375 | 1450 | 75 |
| 2.4 | 0.6 | 92 | 2 | 3 | 64.9% | 34.5% | 1395 | 1485 | 90 |
| 2.5 | 0.5 | 92 | 1 | 4 | 46.6% | 33.4% | 1390 | 1465 | 75 |
| 2.6 | 3.4 | 92 | 0 | 2 | 41.5% | 70.2% | 1375 | 1765 | 390 |
| 2.7 | 0.3 | 92 | 1 | 4 | 50.2% | 36.0% | 1400 | 1475 | 75 |
| 2.8 | 2.2 | 92 | 1 | 2 | 52.6% | 65.9% | 1375 | 1470 | 95 |
| 2.9 | 2.1 | 92 | 1 | 2 | 53.2% | 66.2% | 1375 | 1465 | 90 |
| 3 | 2 | 92 | 0 | 3 | 63.6% | 59.0% | 1375 | 1475 | 100 |
| 0.3 | 1.7 | 92 | 2 | 4 | 35.9% | 13.5% | 1385 | 1555 | 170 |
| 3.1 | 0.9 | 92 | 2 | 2 | 98.0% | 51.7% | 1400 | 1435 | 35 |
| 3.2 | 0.8 | 92 | 1 | 3 | 53.4% | 49.4% | 1385 | 1450 | 65 |
| 3.3 | 3.7 | 92 | 0 | 1 | 20.2% | 83.0% | 1375 | 1890 | 515 |
| 3.4 | 3.6 | 92 | 1 | 0 | 33.2% | 98.5% | 1470 | 1810 | 340 |
| 3.5 | 2.5 | 92 | 0 | 2 | 41.3% | 71.9% | 1375 | 1630 | 255 |
| 3.6 | 2.4 | 92 | 2 | 0 | 22.3% | 90.0% | 1390 | 1505 | 115 |
| 3.7 | 2.3 | 92 | 1 | 1 | 25.8% | 83.4% | 1375 | 1540 | 165 |
| 3.8 | 1.2 | 92 | 0 | 3 | 69.1% | 60.5% | 1375 | 1495 | 120 |
| 3.9 | 1.1 | 92 | 1 | 2 | 70.5% | 65.5% | 1390 | 1490 | 100 |
| 4 | 1 | 92 | 0 | 3 | 61.0% | 60.9% | 1375 | 1500 | 125 |
| 0.4 | 1.6 | 92 | 2 | 4 | 36.9% | 17.2% | 1380 | 1550 | 170 |
| 0.4 | 0.6 | 92 | 0 | 7 | 30.3% | 97.8% | 1375 | 1600 | 225 |
| 0.6 | 3.4 | 92 | 2 | 2 | 97.7% | 40.1% | 1400 | 1430 | 30 |
| 0.7 | 2.3 | 92 | 0 | 5 | 69.3% | 24.1% | 1375 | 1435 | 60 |
| 0.8 | 0.2 | 92 | 1 | 6 | 29.0% | 78.9% | 1395 | 1615 | 220 |
| 0.9 | 1.1 | 92 | 2 | 4 | 44.5% | 22.1% | 1380 | 1550 | 170 |
| 1 | 1.9 | 92.1 | 0 | 5 | 82.3% | 29.2% | 1375 | 1445 | 70 |
| 1.1 | 1.8 | 92.1 | 1 | 4 | 69.2% | 28.9% | 1375 | 1465 | 90 |
| 1.1 | 0.8 | 92.1 | 2 | 4 | 45.5% | 18.8% | 1385 | 1560 | 175 |
| 1.2 | 3.7 | 92.1 | 0 | 3 | 78.5% | 42.4% | 1390 | 1710 | 320 |
| 1.3 | 3.6 | 92.1 | 1 | 2 | 61.8% | 56.0% | 1390 | 1620 | 230 |
| 1.4 | 2.5 | 92.1 | 2 | 2 | 32.6% | 58.0% | 1380 | 1435 | 55 |
| 1.6 | 1.3 | 92.1 | 1 | 4 | 75.9% | 30.6% | 1375 | 1465 | 90 |
| 1.6 | 3.3 | 92.1 | 2 | 1 | 34.3% | 74.5% | 1390 | 1485 | 95 |
| 1.7 | 3.2 | 92.1 | 1 | 2 | 51.3% | 62.0% | 1375 | 1560 | 185 |
| 1.8 | 2.1 | 92.1 | 0 | 4 | 89.7% | 44.2% | 1375 | 1420 | 45 |
| 1.9 | 3 | 92.1 | 1 | 2 | 44.0% | 63.4% | 1370 | 1535 | 165 |
| 2 | 1.9 | 92.1 | 2 | 2 | 56.3% | 56.5% | 1385 | 1430 | 45 |
| 0.2 | 1.7 | 92.1 | 1 | 5 | 22.9% | 7.4% | 1380 | 1545 | 165 |
| 2.1 | 1.8 | 92.1 | 1 | 3 | 67.4% | 48.4% | 1375 | 1425 | 50 |
| 2.1 | 0.8 | 92.1 | 0 | 5 | 59.3% | 97.8% | 1375 | 1455 | 80 |
| 2.2 | 0.7 | 92.1 | 2 | 3 | 77.8% | 33.9% | 1395 | 1495 | 100 |
| 2.4 | 3.5 | 92.1 | 0 | 2 | 41.8% | 70.2% | 1375 | 1765 | 390 |
| 2.6 | 2.3 | 92.1 | 0 | 3 | 63.7% | 58.5% | 1375 | 1505 | 130 |
| 2.7 | 0.2 | 92.1 | 2 | 3 | 86.0% | 36.4% | 1420 | 1500 | 80 |
| 2.8 | 1.1 | 92.1 | 0 | 4 | 71.0% | 46.3% | 1375 | 1440 | 65 |
| 2.9 | 2 | 92.1 | 2 | 1 | 57.5% | 72.1% | 1390 | 1470 | 80 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3 | 1.9 | 92.1 | 0 | 3 | 65.0% | 59.2% | 1375 | 1460 | 85 |
| 0.3 | 1.6 | 92.1 | 2 | 4 | 32.5% | 13.5% | 1385 | 1565 | 180 |
| 3.1 | 1.8 | 92.1 | 1 | 2 | 47.0% | 67.0% | 1375 | 1460 | 85 |
| 3.1 | 0.8 | 92.1 | 0 | 4 | 49.8% | 98.4% | 1375 | 1455 | 80 |
| 3.3 | 0.6 | 92.1 | 1 | 3 | 43.3% | 46.8% | 1390 | 1455 | 65 |
| 3.4 | 3.5 | 92.1 | 0 | 1 | 20.3% | 83.5% | 1375 | 1845 | 470 |
| 3.5 | 3.4 | 92.1 | 1 | 0 | 36.4% | 99.0% | 1470 | 1765 | 295 |
| 3.7 | 0.2 | 92.1 | 2 | 2 | 98.4% | 48.6% | 1425 | 1455 | 30 |
| 3.8 | 1.1 | 92.1 | 0 | 3 | 65.1% | 60.8% | 1375 | 1490 | 115 |
| 3.9 | 2 | 92.1 | 2 | 0 | 29.4% | 86.9% | 1395 | 1500 | 105 |
| 4 | 2.9 | 92.1 | 1 | 0 | 83.7% | 99.7% | 1480 | 1695 | 215 |
| 0.4 | 2.5 | 92.1 | 0 | 5 | 45.6% | 13.9% | 1380 | 1450 | 70 |
| 0.5 | 2.4 | 92.1 | 1 | 4 | 69.3% | 19.9% | 1385 | 1470 | 85 |
| 0.6 | 1.3 | 92.1 | 2 | 4 | 37.3% | 21.7% | 1380 | 1560 | 180 |
| 0.6 | 3.3 | 92.1 | 0 | 4 | 97.0% | 22.1% | 1390 | 1565 | 175 |
| 0.9 | 3 | 92.1 | 2 | 2 | 88.7% | 49.7% | 1395 | 1435 | 40 |
| 1 | 1.8 | 92.2 | 0 | 5 | 78.3% | 29.4% | 1375 | 1455 | 80 |
| 1.1 | 1.7 | 92.2 | 1 | 4 | 64.8% | 29.1% | 1375 | 1475 | 100 |
| 1.1 | 0.7 | 92.2 | 2 | 4 | 44.2% | 16.7% | 1390 | 1570 | 180 |
| 1.2 | 3.6 | 92.2 | 0 | 3 | 78.7% | 42.6% | 1390 | 1680 | 290 |
| 1.3 | 3.5 | 92.2 | 1 | 2 | 62.0% | 56.2% | 1390 | 1585 | 195 |
| 1.4 | 2.4 | 92.2 | 2 | 2 | 29.7% | 56.5% | 1380 | 1430 | 50 |
| 1.5 | 1.3 | 92.2 | 0 | 5 | 79.4% | 30.5% | 1375 | 1455 | 80 |
| 1.6 | 3.2 | 92.2 | 0 | 3 | 67.2% | 53.0% | 1375 | 1620 | 245 |
| 1.8 | 3 | 92.2 | 0 | 3 | 65.7% | 57.2% | 1375 | 1590 | 215 |
| 2 | 1.8 | 92.2 | 0 | 4 | 92.9% | 44.9% | 1375 | 1415 | 40 |
| 0.2 | 1.6 | 92.2 | 2 | 4 | 27.1% | 9.5% | 1390 | 1575 | 185 |
| 2.1 | 1.7 | 92.2 | 2 | 2 | 71.4% | 54.3% | 1390 | 1425 | 35 |
| 2.2 | 1.6 | 92.2 | 1 | 3 | 62.1% | 49.0% | 1375 | 1420 | 45 |
| 2.2 | 0.6 | 92.2 | 0 | 5 | 43.0% | 98.4% | 1375 | 1470 | 95 |
| 2.3 | 0.5 | 92.2 | 2 | 3 | 78.2% | 31.2% | 1405 | 1505 | 100 |
| 2.4 | 0.4 | 92.2 | 1 | 4 | 66.9% | 32.2% | 1400 | 1490 | 90 |
| 2.5 | 0.3 | 92.2 | 2 | 3 | 81.7% | 33.9% | 1415 | 1505 | 90 |
| 2.7 | 2.1 | 92.2 | 2 | 1 | 51.4% | 71.3% | 1390 | 1470 | 80 |
| 2.8 | 3 | 92.2 | 1 | 1 | 24.8% | 82.1% | 1370 | 1605 | 235 |
| 3 | 2.8 | 92.2 | 2 | 0 | 18.8% | 88.5% | 1380 | 1510 | 130 |
| 0.3 | 2.5 | 92.2 | 1 | 4 | 61.6% | 13.1% | 1395 | 1480 | 85 |
| 3.1 | 1.7 | 92.2 | 0 | 3 | 67.4% | 59.7% | 1375 | 1465 | 90 |
| 3.2 | 1.6 | 92.2 | 2 | 1 | 70.8% | 68.6% | 1400 | 1460 | 60 |
| 3.3 | 1.5 | 92.2 | 1 | 2 | 66.2% | 66.0% | 1385 | 1460 | 75 |
| 3.3 | 0.5 | 92.2 | 0 | 4 | 29.3% | 99.2% | 1375 | 1460 | 85 |
| 3.5 | 0.3 | 92.2 | 0 | 4 | 20.9% | 99.5% | 1380 | 1470 | 90 |
| 3.6 | 2.2 | 92.2 | 0 | 2 | 41.5% | 72.7% | 1375 | 1560 | 185 |
| 3.7 | 2.1 | 92.2 | 0 | 2 | 41.5% | 72.9% | 1375 | 1540 | 165 |
| 3.8 | 3 | 92.2 | 0 | 1 | 20.3% | 84.6% | 1375 | 1755 | 380 |
| 3.9 | 0.9 | 92.2 | 2 | 1 | 85.7% | 63.4% | 1405 | 1475 | 70 |
| 0.4 | 1.4 | 92.2 | 1 | 5 | 34.9% | 9.5% | 1375 | 1550 | 175 |
| 0.4 | 0.4 | 92.2 | 2 | 5 | 17.1% | 5.7% | 1405 | 1645 | 240 |
| 0.5 | 0.3 | 92.2 | 0 | 7 | 19.4% | 99.0% | 1375 | 1620 | 245 |
| 0.6 | 2.2 | 92.2 | 2 | 3 | 66.1% | 29.9% | 1390 | 1495 | 105 |
| 0.7 | 2.1 | 92.2 | 1 | 4 | 70.6% | 25.9% | 1380 | 1475 | 95 |
| 0.8 | 2 | 92.2 | 2 | 3 | 56.5% | 36.1% | 1385 | 1495 | 110 |
| 0.8 | 0 | 92.2 | 0 | 7 | 29.6% | 100.0% | 1440 | 1625 | 185 |
| 0.9 | 0.9 | 92.2 | 1 | 5 | 42.8% | 12.5% | 1375 | 1550 | 175 |
| 1 | 3.7 | 92.3 | 2 | 1 | 69.0% | 69.3% | 1405 | 1500 | 95 |
| 1.1 | 2.6 | 92.3 | 0 | 4 | 94.3% | 37.4% | 1375 | 1430 | 55 |
| 1.2 | 2.5 | 92.3 | 1 | 3 | 62.6% | 44.3% | 1380 | 1425 | 45 |
| 1.3 | 1.4 | 92.3 | 2 | 3 | 64.7% | 35.7% | 1385 | 1505 | 120 |
| 1.3 | 0.4 | 92.3 | 0 | 6 | 27.3% | 98.6% | 1375 | 1555 | 180 |
| 1.4 | 3.3 | 92.3 | 1 | 2 | 62.7% | 58.1% | 1390 | 1540 | 150 |
| 1.5 | 2.2 | 92.3 | 0 | 4 | 92.8% | 44.1% | 1375 | 1415 | 40 |
| 1.6 | 2.1 | 92.3 | 2 | 2 | 32.3% | 54.7% | 1380 | 1430 | 50 |
| 1.7 | 2 | 92.3 | 0 | 4 | 93.3% | 44.5% | 1375 | 1415 | 40 |
| 1.8 | 1.9 | 92.3 | 1 | 3 | 54.9% | 48.0% | 1375 | 1420 | 45 |
| 1.8 | 0.9 | 92.3 | 2 | 3 | 70.1% | 32.6% | 1395 | 1510 | 115 |
| 1.9 | 0.8 | 92.3 | 2 | 3 | 70.7% | 31.9% | 1395 | 1510 | 115 |
| 2 | 0.7 | 92.3 | 1 | 4 | 42.7% | 30.2% | 1385 | 1490 | 105 |
| 2.3 | 2.4 | 92.3 | 0 | 3 | 64.3% | 58.5% | 1375 | 1490 | 115 |
| 2.4 | 2.3 | 92.3 | 2 | 1 | 35.2% | 70.8% | 1385 | 1470 | 85 |
| 2.5 | 0.2 | 92.3 | 1 | 4 | 64.3% | 33.7% | 1410 | 1505 | 95 |
| 2.6 | 1.1 | 92.3 | 2 | 2 | 96.9% | 49.3% | 1400 | 1440 | 40 |
| 2.7 | 2 | 92.3 | 1 | 2 | 49.2% | 66.5% | 1375 | 1460 | 85 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 2.8 | 1.9 | 92.3 | 2 | 1 | 65.2% | 69.0% | 1395 | 1465 | 70 |
| 3.1 | 1.6 | 92.3 | 1 | 2 | 66.9% | 65.6% | 1385 | 1455 | 70 |
| 3.1 | 0.6 | 92.3 | 0 | 4 | 31.6% | 47.4% | 1375 | 1450 | 75 |
| 3.2 | 0.5 | 92.3 | 2 | 2 | 99.3% | 44.4% | 1405 | 1435 | 30 |
| 3.3 | 0.4 | 92.3 | 1 | 3 | 81.8% | 43.3% | 1405 | 1450 | 45 |
| 3.4 | 0.3 | 92.3 | 2 | 2 | 100.0% | 45.0% | 1420 | 1440 | 20 |
| 3.5 | 2.2 | 92.3 | 1 | 1 | 31.0% | 82.9% | 1380 | 1490 | 110 |
| 3.6 | 2.1 | 92.3 | 1 | 1 | 33.0% | 82.4% | 1385 | 1490 | 105 |
| 3.7 | 2 | 92.3 | 0 | 2 | 42.0% | 73.2% | 1375 | 1515 | 140 |
| 3.8 | 2.9 | 92.3 | 0 | 1 | 20.4% | 84.9% | 1375 | 1730 | 355 |
| 3.9 | 0.8 | 92.3 | 2 | 1 | 88.1% | 61.2% | 1410 | 1470 | 60 |
| 0.4 | 1.3 | 92.3 | 2 | 4 | 27.6% | 17.1% | 1380 | 1580 | 200 |
| 0.4 | 3.3 | 92.3 | 0 | 4 | 80.6% | 16.1% | 1395 | 1530 | 135 |
| 0.5 | 3.2 | 92.3 | 2 | 2 | 99.6% | 36.6% | 1405 | 1435 | 30 |
| 0.6 | 3.1 | 92.3 | 1 | 3 | 100.0% | 28.8% | 1400 | 1420 | 20 |
| 0.7 | 3 | 92.3 | 2 | 2 | 98.5% | 44.2% | 1400 | 1430 | 30 |
| 0.8 | 1.9 | 92.3 | 0 | 5 | 73.5% | 27.8% | 1375 | 1465 | 90 |
| 0.9 | 1.8 | 92.3 | 1 | 4 | 58.4% | 28.5% | 1375 | 1485 | 110 |
| 0.9 | 0.8 | 92.3 | 2 | 4 | 38.9% | 15.9% | 1390 | 1580 | 190 |
| 1 | 3.6 | 92.4 | 0 | 3 | 85.7% | 38.7% | 1395 | 1645 | 250 |
| 1.1 | 3.5 | 92.4 | 1 | 2 | 71.4% | 52.8% | 1400 | 1550 | 150 |
| 1.2 | 2.4 | 92.4 | 2 | 2 | 47.4% | 52.4% | 1390 | 1440 | 50 |
| 1.3 | 1.3 | 92.4 | 0 | 5 | 71.6% | 30.5% | 1375 | 1475 | 100 |
| 1.4 | 1.2 | 92.4 | 1 | 4 | 66.7% | 30.5% | 1380 | 1495 | 115 |
| 1.4 | 3.2 | 92.4 | 0 | 3 | 71.9% | 46.7% | 1380 | 1585 | 205 |
| 1.5 | 3.1 | 92.4 | 2 | 1 | 37.6% | 69.5% | 1395 | 1475 | 80 |
| 1.6 | 3 | 92.4 | 0 | 3 | 67.7% | 53.4% | 1375 | 1555 | 180 |
| 1.7 | 2.9 | 92.4 | 1 | 2 | 36.0% | 62.8% | 1375 | 1470 | 95 |
| 1.8 | 1.8 | 92.4 | 2 | 2 | 47.1% | 52.1% | 1385 | 1445 | 60 |
| 1.8 | 0.8 | 92.4 | 0 | 5 | 50.2% | 98.5% | 1375 | 1485 | 110 |
| 1.9 | 0.7 | 92.4 | 0 | 5 | 44.3% | 98.7% | 1375 | 1485 | 110 |
| 2 | 0.6 | 92.4 | 2 | 3 | 70.0% | 29.0% | 1400 | 1525 | 125 |
| 0.2 | 3.4 | 92.4 | 0 | 4 | 52.3% | 8.8% | 1400 | 1530 | 130 |
| 2.1 | 0.5 | 92.4 | 2 | 3 | 71.9% | 28.7% | 1405 | 1525 | 120 |
| 2.2 | 0.4 | 92.4 | 1 | 4 | 77.2% | 29.8% | 1405 | 1505 | 100 |
| 2.3 | 0.3 | 92.4 | 2 | 3 | 75.6% | 31.4% | 1415 | 1525 | 110 |
| 2.4 | 2.2 | 92.4 | 2 | 1 | 34.8% | 69.1% | 1385 | 1470 | 85 |
| 2.5 | 2.1 | 92.4 | 2 | 1 | 45.4% | 68.7% | 1390 | 1465 | 75 |
| 2.6 | 3 | 92.4 | 1 | 1 | 25.5% | 82.2% | 1370 | 1575 | 205 |
| 2.7 | 2.9 | 92.4 | 0 | 2 | 41.9% | 71.7% | 1375 | 1630 | 255 |
| 2.8 | 2.8 | 92.4 | 0 | 2 | 41.9% | 71.8% | 1375 | 1615 | 240 |
| 2.9 | 2.7 | 92.4 | 0 | 2 | 41.9% | 72.0% | 1375 | 1600 | 225 |
| 3 | 2.6 | 92.4 | 0 | 2 | 41.9% | 72.2% | 1375 | 1590 | 215 |
| 0.3 | 2.3 | 92.4 | 2 | 3 | 57.3% | 18.0% | 1400 | 1520 | 120 |
| 3.1 | 2.5 | 92.4 | 1 | 1 | 29.6% | 83.2% | 1375 | 1505 | 130 |
| 3.2 | 1.4 | 92.4 | 0 | 3 | 64.5% | 60.5% | 1375 | 1465 | 90 |
| 3.3 | 1.3 | 92.4 | 2 | 1 | 81.2% | 64.1% | 1400 | 1450 | 50 |
| 3.4 | 1.2 | 92.4 | 1 | 2 | 80.4% | 62.0% | 1395 | 1465 | 70 |
| 3.4 | 3.2 | 92.4 | 0 | 1 | 20.5% | 84.5% | 1375 | 1760 | 385 |
| 3.5 | 3.1 | 92.4 | 0 | 1 | 20.5% | 84.7% | 1375 | 1745 | 370 |
| 3.6 | 0 | 92.4 | 0 | 4 | 100.0% | 100.0% | 1445 | 1470 | 25 |
| 3.8 | 1.8 | 92.4 | 0 | 2 | 43.9% | 73.7% | 1375 | 1495 | 120 |
| 3.9 | 0.7 | 92.4 | 2 | 1 | 89.0% | 59.0% | 1410 | 1470 | 60 |
| 0.4 | 1.2 | 92.4 | 2 | 4 | 25.0% | 16.0% | 1380 | 1590 | 210 |
| 0.5 | 0.1 | 92.4 | 1 | 6 | 18.3% | 7.1% | 1405 | 1655 | 250 |
| 0.5 | 3.1 | 92.4 | 0 | 4 | 99.2% | 19.4% | 1395 | 1485 | 90 |
| 0.6 | 4 | 92.4 | 1 | 2 | 94.7% | 38.6% | 1410 | 1625 | 215 |
| 0.7 | 2.9 | 92.4 | 2 | 2 | 94.4% | 44.4% | 1400 | 1440 | 40 |
| 0.8 | 1.8 | 92.4 | 0 | 5 | 69.5% | 27.9% | 1375 | 1475 | 100 |
| 0.9 | 1.7 | 92.4 | 1 | 4 | 53.7% | 28.7% | 1375 | 1495 | 120 |
| 0.9 | 0.7 | 92.4 | 2 | 4 | 37.5% | 13.7% | 1395 | 1590 | 195 |
| 1 | 3.5 | 92.5 | 0 | 3 | 86.0% | 38.8% | 1395 | 1615 | 220 |
| 1.1 | 3.4 | 92.5 | 1 | 2 | 73.5% | 53.0% | 1400 | 1520 | 120 |
| 1.2 | 2.3 | 92.5 | 2 | 2 | 44.2% | 50.9% | 1390 | 1450 | 60 |
| 1.3 | 1.2 | 92.5 | 0 | 5 | 68.0% | 30.7% | 1375 | 1485 | 110 |
| 1.4 | 0.1 | 92.5 | 2 | 4 | 47.0% | 19.7% | 1420 | 1610 | 190 |
| 1.5 | 1 | 92.5 | 1 | 4 | 65.4% | 29.7% | 1385 | 1505 | 120 |
| 1.5 | 4 | 92.5 | 2 | 0 | 40.9% | 83.5% | 1415 | 1600 | 185 |
| 1.6 | 2.9 | 92.5 | 0 | 3 | 67.9% | 53.5% | 1375 | 1525 | 150 |
| 1.7 | 2.8 | 92.5 | 1 | 2 | 31.2% | 63.1% | 1375 | 1470 | 95 |
| 1.8 | 1.7 | 92.5 | 2 | 2 | 59.1% | 50.3% | 1390 | 1455 | 65 |
| 1.9 | 1.6 | 92.5 | 1 | 3 | 63.0% | 48.7% | 1380 | 1430 | 50 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.9 | 0.6 | 92.5 | 0 | 5 | 34.8% | 99.1% | 1375 | 1500 | 125 |
| 2 | 0.5 | 92.5 | 2 | 3 | 68.7% | 27.4% | 1405 | 1535 | 130 |
| 0.2 | 3.3 | 92.5 | 0 | 4 | 52.5% | 8.9% | 1400 | 1500 | 100 |
| 2.1 | 0.4 | 92.5 | 2 | 3 | 70.6% | 28.8% | 1410 | 1535 | 125 |
| 2.2 | 0.3 | 92.5 | 0 | 5 | 23.6% | 99.6% | 1385 | 1505 | 120 |
| 2.3 | 2.2 | 92.5 | 2 | 1 | 32.1% | 67.7% | 1385 | 1465 | 80 |
| 2.4 | 2.1 | 92.5 | 2 | 1 | 42.6% | 67.3% | 1390 | 1465 | 75 |
| 2.5 | 3 | 92.5 | 1 | 1 | 20.6% | 82.3% | 1370 | 1555 | 185 |
| 2.6 | 2.9 | 92.5 | 0 | 2 | 42.1% | 71.8% | 1375 | 1615 | 240 |
| 2.7 | 2.8 | 92.5 | 0 | 2 | 42.1% | 72.0% | 1375 | 1600 | 225 |
| 2.8 | 2.7 | 92.5 | 0 | 2 | 42.0% | 72.2% | 1375 | 1585 | 210 |
| 2.9 | 2.6 | 92.5 | 0 | 2 | 42.0% | 72.3% | 1375 | 1575 | 200 |
| 3 | 2.5 | 92.5 | 0 | 2 | 42.0% | 72.5% | 1375 | 1560 | 185 |
| 0.3 | 2.2 | 92.5 | 2 | 3 | 53.2% | 18.1% | 1400 | 1530 | 130 |
| 3.1 | 2.4 | 92.5 | 0 | 2 | 42.0% | 72.7% | 1375 | 1545 | 170 |
| 3.2 | 2.3 | 92.5 | 0 | 2 | 42.1% | 72.9% | 1375 | 1530 | 155 |
| 3.3 | 0.2 | 92.5 | 0 | 4 | 19.6% | 100.0% | 1395 | 1455 | 60 |
| 3.4 | 2.1 | 92.5 | 1 | 1 | 37.6% | 80.8% | 1390 | 1490 | 100 |
| 3.5 | 3 | 92.5 | 0 | 1 | 20.5% | 85.1% | 1375 | 1715 | 340 |
| 3.6 | 0.9 | 92.5 | 0 | 3 | 40.7% | 61.5% | 1375 | 1480 | 105 |
| 3.8 | 1.7 | 92.5 | 0 | 2 | 45.6% | 74.0% | 1375 | 1495 | 120 |
| 3.9 | 0.6 | 92.5 | 2 | 1 | 89.9% | 56.8% | 1410 | 1470 | 60 |
| 0.4 | 1.1 | 92.5 | 1 | 5 | 25.9% | 9.9% | 1375 | 1580 | 205 |
| 0.5 | 1 | 92.5 | 2 | 4 | 25.9% | 14.1% | 1385 | 1600 | 215 |
| 0.5 | 4 | 92.5 | 0 | 3 | 96.8% | 24.4% | 1405 | 1695 | 290 |
| 0.6 | 3.9 | 92.5 | 1 | 2 | 95.0% | 38.7% | 1410 | 1590 | 180 |
| 0.7 | 2.8 | 92.5 | 2 | 2 | 90.4% | 44.6% | 1400 | 1450 | 50 |
| 0.8 | 1.7 | 92.5 | 0 | 5 | 65.6% | 28.0% | 1375 | 1485 | 110 |
| 0.9 | 1.6 | 92.5 | 1 | 4 | 49.4% | 28.9% | 1375 | 1505 | 130 |
| 0.9 | 0.6 | 92.5 | 2 | 4 | 36.3% | 12.7% | 1400 | 1600 | 200 |
| 1 | 3.4 | 92.6 | 0 | 3 | 86.4% | 39.0% | 1395 | 1580 | 185 |
| 1.1 | 0.3 | 92.6 | 1 | 5 | 43.1% | 15.4% | 1405 | 1600 | 195 |
| 1.2 | 0.2 | 92.6 | 2 | 4 | 43.3% | 17.0% | 1420 | 1615 | 195 |
| 1.3 | 1.1 | 92.6 | 2 | 3 | 56.8% | 29.7% | 1390 | 1535 | 145 |
| 1.4 | 1 | 92.6 | 0 | 5 | 56.0% | 31.1% | 1375 | 1495 | 120 |
| 1.4 | 0 | 92.6 | 1 | 5 | 47.5% | 19.6% | 1440 | 1605 | 165 |
| 1.5 | 3.9 | 92.6 | 2 | 0 | 44.6% | 81.9% | 1415 | 1565 | 150 |
| 1.6 | 2.8 | 92.6 | 0 | 3 | 68.6% | 53.7% | 1375 | 1495 | 120 |
| 1.7 | 2.7 | 92.6 | 1 | 2 | 26.6% | 63.3% | 1375 | 1465 | 90 |
| 1.8 | 1.6 | 92.6 | 2 | 2 | 58.9% | 48.4% | 1390 | 1465 | 75 |
| 1.9 | 1.5 | 92.6 | 1 | 3 | 74.8% | 47.0% | 1385 | 1440 | 55 |
| 1.9 | 0.5 | 92.6 | 0 | 5 | 35.9% | 99.5% | 1380 | 1510 | 130 |
| 2 | 0.4 | 92.6 | 2 | 3 | 67.4% | 27.5% | 1410 | 1545 | 135 |
| 0.2 | 3.2 | 92.6 | 0 | 4 | 52.7% | 8.9% | 1400 | 1465 | 65 |
| 2.1 | 3.3 | 92.6 | 1 | 1 | 16.7% | 81.0% | 1375 | 1580 | 205 |
| 2.2 | 2.2 | 92.6 | 0 | 3 | 68.8% | 59.1% | 1375 | 1450 | 75 |
| 2.3 | 3.1 | 92.6 | 0 | 2 | 42.6% | 71.5% | 1375 | 1630 | 255 |
| 2.4 | 0 | 92.6 | 1 | 4 | 76.8% | 32.6% | 1440 | 1540 | 100 |
| 2.5 | 0.9 | 92.6 | 2 | 2 | 88.0% | 43.7% | 1400 | 1470 | 70 |
| 2.6 | 0.8 | 92.6 | 0 | 4 | 36.4% | 47.1% | 1375 | 1425 | 50 |
| 2.7 | 0.7 | 92.6 | 0 | 4 | 28.5% | 47.3% | 1375 | 1430 | 55 |
| 2.8 | 0.6 | 92.6 | 0 | 4 | 21.2% | 47.5% | 1375 | 1430 | 55 |
| 2.9 | 0.5 | 92.6 | 0 | 4 | 34.6% | 47.3% | 1385 | 1435 | 50 |
| 3 | 0.4 | 92.6 | 0 | 4 | 37.1% | 46.6% | 1390 | 1440 | 50 |
| 3.1 | 1.3 | 92.6 | 1 | 2 | 83.2% | 60.5% | 1395 | 1450 | 55 |
| 3.2 | 1.2 | 92.6 | 1 | 2 | 88.5% | 59.8% | 1400 | 1450 | 50 |
| 3.3 | 0.1 | 92.6 | 1 | 3 | 99.4% | 43.7% | 1425 | 1455 | 30 |
| 3.4 | 1 | 92.6 | 2 | 1 | 96.2% | 59.1% | 1405 | 1445 | 40 |
| 3.5 | 1.9 | 92.6 | 2 | 0 | 45.0% | 79.7% | 1395 | 1490 | 95 |
| 3.6 | 0.8 | 92.6 | 1 | 2 | 87.8% | 56.7% | 1405 | 1470 | 65 |
| 3.8 | 1.6 | 92.6 | 1 | 1 | 51.8% | 77.0% | 1405 | 1485 | 80 |
| 3.9 | 2.5 | 92.6 | 0 | 1 | 20.5% | 86.1% | 1375 | 1625 | 250 |
| 4 | 0.4 | 92.6 | 0 | 3 | 36.6% | 56.4% | 1395 | 1495 | 100 |
| 0.4 | 4 | 92.6 | 1 | 2 | 98.1% | 30.1% | 1410 | 1590 | 180 |
| 0.5 | 3.9 | 92.6 | 2 | 1 | 88.6% | 57.5% | 1410 | 1470 | 60 |
| 0.6 | 2.8 | 92.6 | 0 | 4 | 98.4% | 22.6% | 1390 | 1420 | 30 |
| 0.7 | 2.7 | 92.6 | 1 | 3 | 92.4% | 32.4% | 1395 | 1440 | 45 |
| 0.8 | 1.6 | 92.6 | 2 | 3 | 42.9% | 31.5% | 1385 | 1535 | 150 |
| 0.8 | 0.6 | 92.6 | 0 | 6 | 40.8% | 98.7% | 1375 | 1580 | 205 |
| 0.9 | 0.5 | 92.6 | 1 | 5 | 39.0% | 12.6% | 1400 | 1595 | 195 |
| 1 | 0.3 | 92.7 | 2 | 4 | 36.8% | 14.2% | 1415 | 1620 | 205 |
| 1.1 | 0.2 | 92.7 | 0 | 6 | 15.8% | 99.7% | 1390 | 1595 | 205 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.2 | 1.1 | 92.7 | 2 | 3 | 53.1% | 28.2% | 1390 | 1545 | 155 |
| 1.3 | 1 | 92.7 | 0 | 5 | 53.6% | 31.1% | 1375 | 1505 | 130 |
| 1.3 | 0 | 92.7 | 1 | 5 | 44.1% | 18.2% | 1440 | 1615 | 175 |
| 1.4 | 3.9 | 92.7 | 2 | 0 | 48.5% | 80.0% | 1415 | 1545 | 130 |
| 1.5 | 2.8 | 92.7 | 0 | 3 | 72.5% | 50.5% | 1380 | 1480 | 100 |
| 1.6 | 2.7 | 92.7 | 1 | 2 | 29.8% | 62.2% | 1380 | 1460 | 80 |
| 1.7 | 1.6 | 92.7 | 2 | 2 | 54.9% | 47.0% | 1390 | 1475 | 85 |
| 1.8 | 1.5 | 92.7 | 1 | 3 | 69.4% | 45.8% | 1385 | 1450 | 65 |
| 1.9 | 1.4 | 92.7 | 1 | 3 | 73.3% | 45.2% | 1385 | 1455 | 70 |
| 1.9 | 0.4 | 92.7 | 0 | 5 | 32.7% | 99.9% | 1385 | 1520 | 135 |
| 2 | 3.3 | 92.7 | 1 | 1 | 16.4% | 80.7% | 1380 | 1560 | 180 |
| 2.1 | 1.2 | 92.7 | 1 | 3 | 87.5% | 43.9% | 1390 | 1455 | 65 |
| 2.1 | 3.2 | 92.7 | 0 | 2 | 43.6% | 69.0% | 1375 | 1625 | 250 |
| 2.3 | 1 | 92.7 | 1 | 3 | 89.2% | 42.5% | 1395 | 1455 | 60 |
| 2.3 | 0 | 92.7 | 0 | 5 | 77.4% | 100.0% | 1445 | 1535 | 90 |
| 2.5 | 1.8 | 92.7 | 1 | 2 | 67.9% | 62.5% | 1390 | 1450 | 60 |
| 2.6 | 1.7 | 92.7 | 2 | 1 | 60.8% | 62.7% | 1395 | 1450 | 55 |
| 2.7 | 1.6 | 92.7 | 2 | 1 | 78.8% | 62.1% | 1400 | 1450 | 50 |
| 2.8 | 1.5 | 92.7 | 2 | 1 | 84.0% | 61.5% | 1400 | 1445 | 45 |
| 2.9 | 1.4 | 92.7 | 2 | 1 | 87.5% | 60.9% | 1400 | 1445 | 45 |
| 3 | 1.3 | 92.7 | 2 | 1 | 89.3% | 60.2% | 1400 | 1440 | 40 |
| 0.3 | 1 | 92.7 | 2 | 4 | 16.5% | 11.0% | 1385 | 1620 | 235 |
| 0.3 | 4 | 92.7 | 0 | 3 | 97.2% | 16.5% | 1410 | 1660 | 250 |
| 3.1 | 3.2 | 92.7 | 0 | 1 | 20.7% | 85.0% | 1375 | 1715 | 340 |
| 3.3 | 1 | 92.7 | 1 | 2 | 91.1% | 57.2% | 1400 | 1455 | 55 |
| 3.4 | 1.9 | 92.7 | 1 | 1 | 47.3% | 77.8% | 1400 | 1485 | 85 |
| 3.5 | 2.8 | 92.7 | 0 | 1 | 20.6% | 85.7% | 1375 | 1655 | 280 |
| 3.6 | 0.7 | 92.7 | 0 | 3 | 39.9% | 59.6% | 1385 | 1475 | 90 |
| 3.8 | 1.5 | 92.7 | 0 | 2 | 33.9% | 74.6% | 1375 | 1495 | 120 |
| 3.9 | 0.4 | 92.7 | 2 | 1 | 93.3% | 52.1% | 1415 | 1465 | 50 |
| 0.4 | 1.9 | 92.7 | 2 | 3 | 47.3% | 22.9% | 1400 | 1550 | 150 |
| 0.4 | 0.9 | 92.7 | 0 | 6 | 26.7% | 98.2% | 1375 | 1585 | 210 |
| 0.5 | 0.8 | 92.7 | 1 | 5 | 25.2% | 9.4% | 1385 | 1600 | 215 |
| 0.6 | 3.7 | 92.7 | 2 | 1 | 89.7% | 60.8% | 1410 | 1455 | 45 |
| 0.7 | 2.6 | 92.7 | 0 | 4 | 92.5% | 25.5% | 1385 | 1430 | 45 |
| 0.8 | 2.5 | 92.7 | 1 | 3 | 88.7% | 35.5% | 1395 | 1450 | 55 |
| 0.9 | 1.4 | 92.7 | 2 | 3 | 45.3% | 29.9% | 1385 | 1545 | 160 |
| 0.9 | 0.4 | 92.7 | 0 | 6 | 29.2% | 99.3% | 1380 | 1590 | 210 |
| 1 | 3.2 | 92.8 | 1 | 2 | 82.0% | 51.4% | 1400 | 1455 | 55 |
| 1.1 | 2.1 | 92.8 | 0 | 4 | 67.5% | 38.0% | 1375 | 1440 | 65 |
| 1.2 | 3 | 92.8 | 1 | 2 | 67.6% | 55.7% | 1395 | 1460 | 65 |
| 1.3 | 1.9 | 92.8 | 2 | 2 | 28.4% | 46.9% | 1385 | 1480 | 95 |
| 1.3 | 0.9 | 92.8 | 0 | 5 | 42.9% | 31.3% | 1375 | 1515 | 140 |
| 1.5 | 3.7 | 92.8 | 2 | 0 | 34.5% | 78.7% | 1410 | 1505 | 95 |
| 1.6 | 2.6 | 92.8 | 0 | 3 | 60.2% | 54.0% | 1375 | 1450 | 75 |
| 1.7 | 2.5 | 92.8 | 1 | 2 | 26.6% | 63.9% | 1380 | 1455 | 75 |
| 1.8 | 1.4 | 92.8 | 0 | 4 | 70.8% | 45.9% | 1375 | 1440 | 65 |
| 1.9 | 1.3 | 92.8 | 0 | 4 | 66.7% | 46.2% | 1375 | 1440 | 65 |
| 2 | 1.2 | 92.8 | 2 | 2 | 80.7% | 43.2% | 1400 | 1485 | 85 |
| 0.2 | 1 | 92.8 | 0 | 6 | 16.8% | 7.2% | 1375 | 1595 | 220 |
| 2.1 | 0.1 | 92.8 | 1 | 4 | 67.0% | 28.8% | 1420 | 1555 | 135 |
| 2.2 | 1 | 92.8 | 1 | 3 | 85.9% | 41.2% | 1395 | 1465 | 70 |
| 2.2 | 0 | 92.8 | 0 | 5 | 74.0% | 100.0% | 1445 | 1540 | 95 |
| 2.5 | 1.7 | 92.8 | 2 | 1 | 57.9% | 61.3% | 1395 | 1445 | 50 |
| 2.6 | 1.6 | 92.8 | 0 | 3 | 55.6% | 60.4% | 1375 | 1435 | 60 |
| 2.7 | 1.5 | 92.8 | 0 | 3 | 51.7% | 60.6% | 1375 | 1440 | 65 |
| 2.8 | 1.4 | 92.8 | 0 | 3 | 47.7% | 60.8% | 1375 | 1445 | 70 |
| 2.9 | 1.3 | 92.8 | 0 | 3 | 43.7% | 61.0% | 1375 | 1445 | 70 |
| 3 | 1.2 | 92.8 | 0 | 3 | 39.7% | 61.2% | 1375 | 1450 | 75 |
| 0.3 | 1.9 | 92.8 | 0 | 5 | 35.0% | 10.6% | 1380 | 1520 | 140 |
| 3.1 | 0.1 | 92.8 | 1 | 3 | 93.8% | 41.3% | 1425 | 1475 | 50 |
| 3.2 | 1 | 92.8 | 1 | 2 | 94.9% | 56.0% | 1405 | 1445 | 40 |
| 3.3 | 1.9 | 92.8 | 1 | 1 | 49.3% | 76.8% | 1400 | 1485 | 85 |
| 3.4 | 2.8 | 92.8 | 0 | 1 | 20.7% | 85.9% | 1375 | 1640 | 265 |
| 3.5 | 0.7 | 92.8 | 0 | 3 | 37.6% | 57.7% | 1385 | 1470 | 85 |
| 3.8 | 0.4 | 92.8 | 2 | 1 | 95.6% | 50.8% | 1415 | 1455 | 40 |
| 4 | 1.2 | 92.8 | 2 | 0 | 66.0% | 72.2% | 1405 | 1475 | 70 |
| 0.4 | 2.8 | 92.8 | 2 | 2 | 77.9% | 32.5% | 1405 | 1485 | 80 |
| 0.5 | 1.7 | 92.8 | 0 | 5 | 50.7% | 17.7% | 1375 | 1515 | 140 |
| 0.6 | 1.6 | 92.8 | 1 | 4 | 48.5% | 23.6% | 1385 | 1535 | 150 |
| 0.6 | 0.6 | 92.8 | 2 | 4 | 24.8% | 8.6% | 1400 | 1625 | 225 |
| 0.7 | 3.5 | 92.8 | 0 | 3 | 98.3% | 31.3% | 1405 | 1565 | 160 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.8 | 3.4 | 92.8 | 1 | 2 | 87.1% | 46.0% | 1405 | 1465 | 60 |
| 0.9 | 2.3 | 92.8 | 2 | 2 | 76.7% | 44.3% | 1400 | 1480 | 80 |
| 1 | 1.1 | 92.9 | 1 | 4 | 49.4% | 25.1% | 1385 | 1545 | 160 |
| 1.1 | 4 | 92.9 | 0 | 2 | 66.8% | 51.6% | 1405 | 1710 | 305 |
| 1.2 | 3.9 | 92.9 | 1 | 1 | 51.1% | 72.9% | 1405 | 1610 | 205 |
| 1.3 | 2.8 | 92.9 | 2 | 1 | 39.8% | 60.7% | 1400 | 1455 | 55 |
| 1.4 | 1.7 | 92.9 | 0 | 4 | 63.9% | 45.4% | 1375 | 1450 | 75 |
| 1.5 | 1.6 | 92.9 | 1 | 3 | 55.0% | 44.0% | 1385 | 1470 | 85 |
| 1.5 | 0.6 | 92.9 | 2 | 3 | 54.5% | 21.6% | 1405 | 1570 | 165 |
| 1.6 | 3.5 | 92.9 | 0 | 2 | 54.0% | 60.4% | 1395 | 1635 | 240 |
| 1.7 | 3.4 | 92.9 | 1 | 1 | 41.9% | 78.0% | 1400 | 1540 | 140 |
| 1.8 | 2.3 | 92.9 | 2 | 1 | 19.6% | 62.3% | 1385 | 1450 | 65 |
| 1.9 | 0.2 | 92.9 | 1 | 4 | 64.5% | 26.2% | 1420 | 1560 | 140 |
| 2 | 1.1 | 92.9 | 1 | 3 | 82.4% | 40.7% | 1395 | 1475 | 80 |
| 0.2 | 1.9 | 92.9 | 0 | 5 | 27.3% | 7.4% | 1385 | 1530 | 145 |
| 2.2 | 1.9 | 92.9 | 1 | 2 | 54.8% | 60.9% | 1390 | 1450 | 60 |
| 2.4 | 1.7 | 92.9 | 0 | 3 | 55.4% | 60.3% | 1375 | 1435 | 60 |
| 2.5 | 2.6 | 92.9 | 1 | 1 | 21.9% | 79.0% | 1385 | 1495 | 110 |
| 2.6 | 2.5 | 92.9 | 1 | 1 | 30.4% | 78.6% | 1390 | 1490 | 100 |
| 2.7 | 2.4 | 92.9 | 1 | 1 | 32.3% | 78.2% | 1390 | 1490 | 100 |
| 2.8 | 2.3 | 92.9 | 1 | 1 | 34.5% | 77.8% | 1390 | 1490 | 100 |
| 2.9 | 0.2 | 92.9 | 1 | 3 | 91.6% | 38.8% | 1425 | 1485 | 60 |
| 3 | 1.1 | 92.9 | 1 | 2 | 98.4% | 55.6% | 1405 | 1435 | 30 |
| 0.3 | 2.8 | 92.9 | 1 | 3 | 80.4% | 17.5% | 1405 | 1475 | 70 |
| 3.2 | 1.9 | 92.9 | 0 | 2 | 41.0% | 74.2% | 1375 | 1470 | 95 |
| 3.3 | 0.8 | 92.9 | 2 | 1 | 100.0% | 53.4% | 1410 | 1430 | 20 |
| 3.5 | 1.6 | 92.9 | 2 | 0 | 59.5% | 73.8% | 1400 | 1480 | 80 |
| 3.6 | 0.5 | 92.9 | 1 | 2 | 92.0% | 50.4% | 1410 | 1460 | 50 |
| 3.8 | 1.3 | 92.9 | 1 | 1 | 67.5% | 71.6% | 1410 | 1480 | 70 |
| 3.9 | 0.2 | 92.9 | 1 | 2 | 92.3% | 50.8% | 1425 | 1475 | 50 |
| 4 | 2.1 | 92.9 | 1 | 0 | 16.6% | 92.7% | 1405 | 1510 | 105 |
| 0.4 | 3.7 | 92.9 | 0 | 3 | 98.2% | 20.9% | 1410 | 1575 | 165 |
| 0.5 | 3.6 | 92.9 | 1 | 2 | 99.6% | 35.3% | 1410 | 1475 | 65 |
| 0.7 | 1.4 | 92.9 | 0 | 5 | 49.9% | 24.9% | 1375 | 1525 | 150 |
| 0.8 | 3.3 | 92.9 | 2 | 1 | 95.7% | 58.3% | 1415 | 1450 | 35 |
| 0.9 | 2.2 | 92.9 | 0 | 4 | 77.7% | 31.3% | 1380 | 1450 | 70 |
| 1 | 3 | 93 | 1 | 2 | 84.0% | 51.8% | 1400 | 1450 | 50 |
| 1.1 | 1.9 | 93 | 2 | 2 | 32.2% | 42.7% | 1390 | 1500 | 110 |
| 1.1 | 0.9 | 93 | 0 | 5 | 38.0% | 31.3% | 1375 | 1535 | 160 |
| 1.2 | 0.8 | 93 | 1 | 4 | 49.8% | 21.5% | 1390 | 1555 | 165 |
| 1.3 | 3.7 | 93 | 2 | 0 | 61.7% | 74.8% | 1420 | 1495 | 75 |
| 1.4 | 2.6 | 93 | 0 | 3 | 60.5% | 47.8% | 1380 | 1445 | 65 |
| 1.5 | 2.5 | 93 | 1 | 2 | 38.3% | 60.2% | 1390 | 1450 | 60 |
| 1.6 | 1.4 | 93 | 2 | 2 | 67.1% | 41.5% | 1395 | 1505 | 110 |
| 1.8 | 2.2 | 93 | 0 | 3 | 50.5% | 59.4% | 1375 | 1445 | 70 |
| 2 | 3 | 93 | 0 | 2 | 47.4% | 66.3% | 1380 | 1550 | 170 |
| 0.2 | 2.8 | 93 | 2 | 2 | 68.3% | 20.0% | 1410 | 1510 | 100 |
| 2.1 | 3.9 | 93 | 1 | 0 | 19.7% | 92.8% | 1430 | 1685 | 255 |
| 2.2 | 3.8 | 93 | 1 | 0 | 18.8% | 93.0% | 1425 | 1670 | 245 |
| 2.3 | 3.7 | 93 | 1 | 0 | 18.0% | 93.2% | 1420 | 1655 | 235 |
| 2.4 | 3.6 | 93 | 1 | 0 | 16.1% | 93.4% | 1415 | 1645 | 230 |
| 2.5 | 2.5 | 93 | 0 | 2 | 44.8% | 73.2% | 1375 | 1480 | 105 |
| 2.6 | 2.4 | 93 | 0 | 2 | 45.6% | 73.4% | 1375 | 1480 | 105 |
| 2.8 | 0.2 | 93 | 0 | 4 | 41.4% | 37.3% | 1410 | 1480 | 70 |
| 2.9 | 1.1 | 93 | 0 | 3 | 65.4% | 59.3% | 1385 | 1445 | 60 |
| 0.3 | 2.7 | 93 | 0 | 4 | 79.5% | 13.0% | 1400 | 1465 | 65 |
| 3.1 | 0.9 | 93 | 1 | 2 | 98.0% | 52.8% | 1405 | 1440 | 35 |
| 3.3 | 1.7 | 93 | 1 | 1 | 59.4% | 73.5% | 1405 | 1475 | 70 |
| 3.4 | 2.6 | 93 | 0 | 1 | 21.0% | 86.6% | 1375 | 1585 | 210 |
| 3.5 | 0.5 | 93 | 2 | 1 | 100.0% | 49.1% | 1410 | 1435 | 25 |
| 3.7 | 1.3 | 93 | 1 | 1 | 70.1% | 70.5% | 1410 | 1475 | 65 |
| 3.9 | 1.1 | 93 | 2 | 0 | 77.7% | 68.7% | 1410 | 1465 | 55 |
| 0.4 | 3.6 | 93 | 0 | 3 | 98.6% | 21.0% | 1410 | 1545 | 135 |
| 0.5 | 3.5 | 93 | 1 | 2 | 100.0% | 35.4% | 1410 | 1440 | 30 |
| 0.6 | 2.4 | 93 | 2 | 2 | 71.7% | 38.7% | 1405 | 1500 | 95 |
| 0.7 | 1.3 | 93 | 0 | 5 | 46.4% | 24.9% | 1375 | 1535 | 160 |
| 0.8 | 1.2 | 93 | 1 | 4 | 44.2% | 24.4% | 1385 | 1555 | 170 |
| 0.8 | 3.2 | 93 | 2 | 1 | 99.0% | 56.6% | 1415 | 1445 | 30 |
| 0.9 | 3.1 | 93 | 1 | 2 | 90.9% | 49.3% | 1405 | 1445 | 40 |
| 1 | 3.9 | 93.1 | 2 | 0 | 69.7% | 72.2% | 1425 | 1490 | 65 |
| 1.1 | 2.8 | 93.1 | 0 | 3 | 87.1% | 42.1% | 1390 | 1440 | 50 |
| 1.2 | 2.7 | 93.1 | 1 | 2 | 70.8% | 56.5% | 1400 | 1445 | 45 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.3 | 1.6 | 93.1 | 2 | 2 | 39.6% | 41.1% | 1390 | 1510 | 120 |
| 1.3 | 0.6 | 93.4 | 0 | 5 | 54.9% | 29.4% | 1390 | 1550 | 160 |
| 1.4 | 0.5 | 93.1 | 1 | 4 | 52.7% | 19.4% | 1405 | 1570 | 165 |
| 1.5 | 3.4 | 93.1 | 2 | 0 | 20.5% | 73.9% | 1405 | 1495 | 90 |
| 1.6 | 0.3 | 93.1 | 1 | 4 | 58.0% | 22.2% | 1415 | 1575 | 160 |
| 1.7 | 0.2 | 93.1 | 0 | 5 | 30.7% | 24.3% | 1405 | 1565 | 160 |
| 1.8 | 1.1 | 93.1 | 2 | 2 | 71.1% | 38.2% | 1400 | 1515 | 115 |
| 1.9 | 2 | 93.1 | 1 | 2 | 42.0% | 59.1% | 1390 | 1445 | 55 |
| 2 | 1.9 | 93.1 | 1 | 2 | 44.9% | 58.6% | 1390 | 1440 | 50 |
| 0.2 | 1.7 | 93.1 | 1 | 4 | 32.0% | 9.5% | 1395 | 1570 | 175 |
| 2.1 | 1.8 | 93.1 | 2 | 1 | 45.8% | 57.5% | 1395 | 1440 | 45 |
| 2.2 | 1.7 | 93.1 | 2 | 1 | 49.8% | 57.1% | 1395 | 1440 | 45 |
| 2.3 | 1.6 | 93.1 | 2 | 1 | 54.1% | 56.5% | 1395 | 1440 | 45 |
| 2.4 | 1.5 | 93.1 | 2 | 1 | 71.6% | 56.0% | 1400 | 1445 | 45 |
| 2.5 | 1.4 | 93.1 | 1 | 2 | 96.7% | 55.5% | 1400 | 1430 | 30 |
| 2.6 | 1.3 | 93.1 | 1 | 2 | 98.6% | 54.7% | 1400 | 1430 | 30 |
| 2.7 | 1.2 | 93.1 | 1 | 2 | 100.0% | 54.0% | 1405 | 1425 | 20 |
| 0.3 | 2.6 | 93.1 | 1 | 3 | 71.7% | 17.6% | 1405 | 1495 | 90 |
| 3.1 | 2.8 | 93.1 | 0 | 1 | 20.9% | 86.4% | 1375 | 1595 | 220 |
| 3.2 | 0.7 | 93.1 | 0 | 3 | 57.2% | 48.3% | 1395 | 1455 | 60 |
| 3.4 | 1.5 | 93.1 | 0 | 2 | 44.6% | 72.4% | 1385 | 1475 | 90 |
| 3.5 | 2.4 | 93.1 | 0 | 1 | 22.2% | 87.1% | 1375 | 1540 | 165 |
| 3.6 | 0.3 | 93.1 | 2 | 1 | 100.0% | 47.7% | 1420 | 1440 | 20 |
| 0.4 | 0.5 | 93.1 | 1 | 5 | 18.1% | 5.7% | 1405 | 1640 | 235 |
| 0.5 | 3.4 | 93.1 | 2 | 1 | 100.0% | 53.2% | 1415 | 1435 | 20 |
| 0.6 | 2.3 | 93.1 | 0 | 4 | 77.4% | 23.1% | 1390 | 1470 | 80 |
| 0.7 | 0.2 | 93.1 | 1 | 5 | 27.8% | 10.0% | 1415 | 1645 | 230 |
| 0.8 | 0.1 | 93.1 | 2 | 4 | 28.0% | 11.5% | 1420 | 1665 | 245 |
| 0.9 | 1 | 93.1 | 1 | 4 | 43.6% | 21.6% | 1390 | 1565 | 175 |
| 0.9 | 4 | 93.1 | 2 | 0 | 70.7% | 71.8% | 1425 | 1490 | 65 |
| 1 | 2.8 | 93.2 | 0 | 3 | 92.6% | 40.0% | 1395 | 1435 | 40 |
| 1.1 | 2.7 | 93.2 | 1 | 2 | 67.3% | 54.6% | 1400 | 1440 | 40 |
| 1.2 | 1.6 | 93.2 | 2 | 2 | 35.9% | 39.6% | 1390 | 1520 | 130 |
| 1.2 | 0.6 | 93.2 | 0 | 5 | 50.9% | 28.2% | 1390 | 1560 | 170 |
| 1.3 | 0.5 | 93.2 | 1 | 4 | 50.1% | 18.1% | 1410 | 1575 | 165 |
| 1.4 | 3.4 | 93.2 | 2 | 0 | 32.6% | 71.9% | 1410 | 1490 | 80 |
| 1.5 | 2.3 | 93.2 | 0 | 3 | 49.1% | 51.3% | 1380 | 1435 | 55 |
| 1.6 | 0.2 | 93.2 | 1 | 4 | 55.4% | 22.3% | 1420 | 1585 | 165 |
| 1.7 | 0.1 | 93.2 | 0 | 5 | 16.7% | 23.4% | 1410 | 1575 | 165 |
| 1.8 | 1 | 93.2 | 2 | 2 | 68.4% | 36.0% | 1400 | 1525 | 125 |
| 1.8 | 0 | 93.2 | 2 | 3 | 55.5% | 25.2% | 1430 | 1610 | 180 |
| 1.9 | 0.9 | 93.2 | 2 | 2 | 69.1% | 35.2% | 1400 | 1525 | 125 |
| 2 | 0.8 | 93.2 | 2 | 2 | 70.9% | 34.4% | 1405 | 1530 | 125 |
| 0.2 | 3.6 | 93.2 | 0 | 3 | 99.1% | 11.9% | 1410 | 1510 | 100 |
| 2.1 | 0.7 | 93.2 | 0 | 4 | 45.7% | 39.2% | 1390 | 1485 | 95 |
| 2.2 | 0.6 | 93.2 | 0 | 4 | 34.2% | 36.1% | 1390 | 1485 | 95 |
| 2.3 | 0.5 | 93.2 | 0 | 4 | 65.7% | 33.0% | 1400 | 1490 | 90 |
| 2.4 | 0.4 | 93.2 | 2 | 2 | 76.1% | 32.8% | 1415 | 1530 | 115 |
| 2.5 | 0.3 | 93.2 | 0 | 4 | 64.1% | 33.6% | 1410 | 1495 | 85 |
| 2.6 | 2.2 | 93.2 | 0 | 2 | 37.0% | 74.0% | 1375 | 1475 | 100 |
| 2.7 | 2.1 | 93.2 | 0 | 2 | 36.1% | 74.2% | 1375 | 1475 | 100 |
| 2.8 | 0 | 93.2 | 2 | 2 | 81.4% | 38.2% | 1430 | 1535 | 105 |
| 3 | 1.8 | 93.2 | 2 | 0 | 42.6% | 70.7% | 1395 | 1475 | 80 |
| 0.3 | 2.5 | 93.2 | 2 | 2 | 61.7% | 27.2% | 1410 | 1525 | 115 |
| 3.1 | 0.7 | 93.2 | 1 | 2 | 100.0% | 48.5% | 1410 | 1435 | 25 |
| 3.3 | 1.5 | 93.2 | 1 | 1 | 71.2% | 69.8% | 1410 | 1465 | 55 |
| 3.4 | 2.4 | 93.2 | 1 | 0 | 16.4% | 90.0% | 1395 | 1510 | 115 |
| 3.5 | 0.3 | 93.2 | 1 | 2 | 100.0% | 46.1% | 1425 | 1450 | 25 |
| 3.6 | 2.2 | 93.2 | 0 | 1 | 24.7% | 87.3% | 1380 | 1500 | 120 |
| 3.8 | 1 | 93.2 | 2 | 0 | 86.4% | 65.1% | 1410 | 1455 | 45 |
| 3.9 | 0.9 | 93.2 | 2 | 0 | 89.0% | 64.2% | 1410 | 1460 | 50 |
| 0.4 | 2.4 | 93.2 | 1 | 3 | 68.9% | 22.2% | 1405 | 1505 | 100 |
| 0.5 | 1.3 | 93.2 | 2 | 3 | 31.0% | 19.9% | 1395 | 1595 | 200 |
| 0.5 | 3.3 | 93.2 | 0 | 3 | 99.6% | 25.1% | 1405 | 1465 | 60 |
| 0.6 | 3.2 | 93.2 | 1 | 2 | 100.0% | 39.9% | 1410 | 1430 | 20 |
| 0.7 | 2.1 | 93.2 | 0 | 4 | 74.0% | 26.0% | 1390 | 1480 | 90 |
| 0.8 | 3 | 93.2 | 1 | 2 | 97.6% | 46.8% | 1405 | 1435 | 30 |
| 0.9 | 1.9 | 93.2 | 2 | 2 | 61.7% | 38.2% | 1400 | 1520 | 120 |
| 0.9 | 0.9 | 93.2 | 0 | 5 | 43.7% | 30.3% | 1380 | 1555 | 175 |
| 1 | 0.7 | 93.3 | 1 | 4 | 41.8% | 16.5% | 1400 | 1585 | 185 |
| 1.1 | 3.6 | 93.3 | 2 | 0 | 73.9% | 69.2% | 1420 | 1485 | 65 |
| 1.2 | 2.5 | 93.3 | 0 | 3 | 72.4% | 44.6% | 1390 | 1435 | 45 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.3 | 2.4 | 93.3 | 1 | 2 | 58.9% | 54.7% | 1400 | 1435 | 35 |
| 1.4 | 1.3 | 93.3 | 2 | 2 | 60.5% | 36.5% | 1395 | 1530 | 135 |
| 1.4 | 3.3 | 93.3 | 0 | 2 | 62.1% | 58.3% | 1400 | 1535 | 135 |
| 1.5 | 3.2 | 93.3 | 1 | 1 | 62.8% | 71.2% | 1410 | 1490 | 80 |
| 1.6 | 2.1 | 93.3 | 2 | 1 | 16.1% | 55.6% | 1385 | 1460 | 75 |
| 1.7 | 2 | 93.3 | 0 | 3 | 35.6% | 58.2% | 1375 | 1430 | 55 |
| 1.8 | 1.9 | 93.3 | 0 | 3 | 37.0% | 60.2% | 1375 | 1430 | 55 |
| 1.9 | 1.8 | 93.3 | 0 | 3 | 38.7% | 60.5% | 1375 | 1430 | 55 |
| 2 | 1.7 | 93.3 | 0 | 3 | 51.2% | 60.2% | 1380 | 1430 | 50 |
| 0.2 | 1.5 | 93.3 | 0 | 5 | 27.6% | 7.5% | 1385 | 1570 | 185 |
| 2.1 | 2.6 | 93.3 | 1 | 1 | 30.5% | 73.2% | 1400 | 1485 | 85 |
| 2.2 | 2.5 | 93.3 | 1 | 1 | 22.6% | 73.6% | 1395 | 1485 | 90 |
| 2.3 | 2.4 | 93.3 | 1 | 1 | 24.9% | 73.6% | 1395 | 1480 | 85 |
| 2.4 | 2.3 | 93.3 | 1 | 1 | 27.4% | 73.2% | 1395 | 1480 | 85 |
| 2.5 | 1.2 | 93.3 | 0 | 3 | 89.7% | 53.4% | 1390 | 1420 | 30 |
| 2.6 | 0.1 | 93.3 | 0 | 4 | 55.8% | 35.0% | 1420 | 1510 | 90 |
| 2.7 | 1 | 93.3 | 0 | 3 | 89.8% | 48.3% | 1395 | 1430 | 35 |
| 2.8 | 1.9 | 93.3 | 0 | 2 | 36.6% | 73.5% | 1380 | 1470 | 90 |
| 2.9 | 0.8 | 93.3 | 2 | 1 | 93.4% | 47.8% | 1410 | 1465 | 55 |
| 0.3 | 1.4 | 93.3 | 2 | 3 | 24.6% | 15.3% | 1400 | 1605 | 205 |
| 3.1 | 1.6 | 93.3 | 2 | 0 | 56.9% | 68.2% | 1400 | 1465 | 65 |
| 3.2 | 0.5 | 93.3 | 1 | 2 | 99.9% | 45.3% | 1410 | 1440 | 30 |
| 3.3 | 0.4 | 93.3 | 0 | 3 | 83.1% | 43.5% | 1410 | 1455 | 45 |
| 3.5 | 1.2 | 93.3 | 2 | 0 | 81.3% | 65.5% | 1405 | 1455 | 50 |
| 3.6 | 1.1 | 93.3 | 1 | 1 | 86.9% | 65.3% | 1415 | 1465 | 50 |
| 3.7 | 0 | 93.3 | 1 | 2 | 100.0% | 48.9% | 1440 | 1455 | 15 |
| 3.9 | 0.8 | 93.3 | 1 | 1 | 88.1% | 62.4% | 1415 | 1475 | 60 |
| 0.4 | 1.3 | 93.3 | 0 | 5 | 32.9% | 14.4% | 1380 | 1565 | 185 |
| 0.5 | 1.2 | 93.3 | 1 | 4 | 31.8% | 18.8% | 1390 | 1585 | 195 |
| 0.5 | 3.2 | 93.3 | 2 | 1 | 94.4% | 49.6% | 1415 | 1455 | 40 |
| 0.6 | 2.1 | 93.3 | 0 | 4 | 69.2% | 23.3% | 1390 | 1490 | 100 |
| 0.7 | 3 | 93.3 | 1 | 2 | 99.9% | 43.8% | 1405 | 1435 | 30 |
| 0.8 | 1.9 | 93.3 | 2 | 2 | 58.1% | 35.8% | 1400 | 1530 | 130 |
| 0.8 | 0.9 | 93.3 | 0 | 5 | 39.5% | 28.4% | 1380 | 1565 | 185 |
| 0.9 | 0.8 | 93.3 | 1 | 4 | 39.4% | 17.3% | 1395 | 1585 | 190 |
| 1 | 3.6 | 93.4 | 2 | 0 | 80.9% | 67.1% | 1425 | 1480 | 55 |
| 1.1 | 2.5 | 93.4 | 0 | 3 | 67.8% | 42.6% | 1390 | 1430 | 40 |
| 1.2 | 2.4 | 93.4 | 1 | 2 | 80.3% | 52.6% | 1405 | 1440 | 35 |
| 1.3 | 1.3 | 93.4 | 2 | 2 | 56.6% | 35.0% | 1395 | 1540 | 145 |
| 1.3 | 3.3 | 93.4 | 0 | 2 | 65.1% | 56.8% | 1400 | 1520 | 120 |
| 1.4 | 3.2 | 93.4 | 1 | 1 | 68.5% | 69.3% | 1415 | 1485 | 70 |
| 1.5 | 2.1 | 93.4 | 0 | 3 | 38.8% | 51.6% | 1380 | 1430 | 50 |
| 1.6 | 3 | 93.4 | 0 | 2 | 59.8% | 61.7% | 1395 | 1480 | 85 |
| 1.7 | 2.9 | 93.4 | 0 | 2 | 46.6% | 63.1% | 1390 | 1480 | 90 |
| 1.8 | 2.8 | 93.4 | 0 | 2 | 36.5% | 64.4% | 1385 | 1480 | 95 |
| 1.9 | 2.7 | 93.4 | 0 | 2 | 36.5% | 65.7% | 1385 | 1480 | 95 |
| 2 | 2.6 | 93.4 | 0 | 2 | 29.0% | 67.2% | 1380 | 1475 | 95 |
| 0.2 | 2.4 | 93.4 | 2 | 2 | 51.3% | 20.3% | 1410 | 1545 | 135 |
| 2.1 | 3.5 | 93.4 | 1 | 0 | 33.7% | 86.7% | 1425 | 1555 | 130 |
| 2.2 | 3.4 | 93.4 | 1 | 0 | 25.3% | 86.9% | 1420 | 1545 | 125 |
| 2.3 | 2.3 | 93.4 | 0 | 2 | 24.8% | 74.1% | 1375 | 1475 | 100 |
| 2.4 | 0.2 | 93.4 | 2 | 2 | 73.9% | 33.0% | 1425 | 1555 | 130 |
| 2.5 | 1.1 | 93.4 | 2 | 1 | 88.3% | 48.9% | 1405 | 1475 | 70 |
| 2.6 | 2 | 93.4 | 2 | 0 | 29.1% | 68.6% | 1390 | 1470 | 80 |
| 2.7 | 0.9 | 93.4 | 1 | 2 | 96.3% | 47.7% | 1410 | 1450 | 40 |
| 2.9 | 1.7 | 93.4 | 1 | 1 | 70.5% | 68.8% | 1405 | 1470 | 65 |
| 3 | 2.6 | 93.4 | 0 | 1 | 19.5% | 87.3% | 1375 | 1520 | 145 |
| 0.3 | 0.3 | 93.4 | 0 | 6 | 15.6% | 9.3% | 1400 | 1660 | 260 |
| 3.1 | 0.5 | 93.4 | 0 | 3 | 66.4% | 43.1% | 1405 | 1440 | 35 |
| 3.3 | 1.3 | 93.4 | 0 | 2 | 76.0% | 63.9% | 1400 | 1465 | 65 |
| 3.4 | 0.2 | 93.4 | 2 | 1 | 96.7% | 45.5% | 1425 | 1470 | 45 |
| 3.5 | 2.1 | 93.4 | 1 | 0 | 25.3% | 86.1% | 1400 | 1505 | 105 |
| 3.7 | 1.9 | 93.4 | 1 | 0 | 33.9% | 85.1% | 1405 | 1500 | 95 |
| 3.9 | 1.7 | 93.4 | 1 | 0 | 37.4% | 83.8% | 1410 | 1495 | 85 |
| 0.4 | 1.2 | 93.4 | 1 | 4 | 27.9% | 16.1% | 1395 | 1595 | 200 |
| 0.4 | 3.2 | 93.4 | 0 | 3 | 100.0% | 21.4% | 1410 | 1425 | 15 |
| 0.5 | 3.1 | 93.4 | 1 | 2 | 96.9% | 36.0% | 1410 | 1445 | 35 |
| 0.6 | 3 | 93.4 | 2 | 1 | 90.9% | 48.5% | 1415 | 1465 | 50 |
| 0.7 | 1.9 | 93.4 | 0 | 4 | 66.0% | 26.3% | 1390 | 1500 | 110 |
| 0.8 | 1.8 | 93.4 | 1 | 3 | 62.9% | 34.5% | 1400 | 1520 | 120 |
| 0.8 | 0.8 | 93.4 | 2 | 3 | 32.9% | 15.4% | 1400 | 1610 | 210 |
| 0.9 | 3.7 | 93.4 | 0 | 2 | 76.4% | 47.8% | 1410 | 1575 | 165 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1 | 3.5 | 93.5 | 1 | 1 | 75.0% | 66.1% | 1415 | 1480 | 65 |
| 1.1 | 2.4 | 93.5 | 2 | 1 | 46.5% | 50.1% | 1405 | 1475 | 70 |
| 1.2 | 1.3 | 93.5 | 0 | 4 | 63.4% | 40.8% | 1385 | 1505 | 120 |
| 1.3 | 1.2 | 93.5 | 1 | 3 | 62.0% | 33.5% | 1400 | 1530 | 130 |
| 1.3 | 3.2 | 93.5 | 2 | 0 | 31.2% | 66.6% | 1410 | 1475 | 65 |
| 1.4 | 2.1 | 93.5 | 0 | 3 | 33.1% | 48.9% | 1380 | 1430 | 50 |
| 1.5 | 3 | 93.5 | 0 | 2 | 55.1% | 60.4% | 1395 | 1475 | 80 |
| 1.6 | 2.9 | 93.5 | 0 | 2 | 53.8% | 62.0% | 1395 | 1475 | 80 |
| 1.7 | 2.8 | 93.5 | 0 | 2 | 40.9% | 63.4% | 1390 | 1475 | 85 |
| 1.8 | 2.7 | 93.5 | 0 | 2 | 31.0% | 64.7% | 1385 | 1475 | 90 |
| 1.9 | 2.6 | 93.5 | 0 | 2 | 31.2% | 65.9% | 1385 | 1475 | 90 |
| 2 | 2.5 | 93.5 | 0 | 2 | 24.0% | 67.4% | 1380 | 1475 | 95 |
| 0.2 | 2.3 | 93.5 | 2 | 2 | 47.1% | 20.4% | 1410 | 1555 | 145 |
| 2.1 | 3.4 | 93.5 | 1 | 0 | 37.4% | 85.1% | 1425 | 1525 | 100 |
| 2.2 | 0.3 | 93.5 | 1 | 3 | 73.8% | 30.1% | 1425 | 1540 | 115 |
| 2.3 | 0.2 | 93.5 | 0 | 4 | 75.2% | 31.2% | 1420 | 1530 | 110 |
| 2.4 | 1.1 | 93.5 | 2 | 1 | 85.3% | 47.5% | 1405 | 1485 | 80 |
| 2.5 | 2 | 93.5 | 2 | 0 | 27.9% | 67.1% | 1390 | 1465 | 75 |
| 2.6 | 0.9 | 93.5 | 2 | 1 | 86.1% | 45.9% | 1405 | 1485 | 80 |
| 2.8 | 1.7 | 93.5 | 0 | 2 | 68.3% | 65.7% | 1395 | 1460 | 65 |
| 2.9 | 0.6 | 93.5 | 0 | 3 | 83.4% | 42.8% | 1405 | 1440 | 35 |
| 0.3 | 1.2 | 93.5 | 0 | 5 | 25.3% | 11.0% | 1385 | 1585 | 200 |
| 3.1 | 2.4 | 93.5 | 0 | 1 | 23.6% | 86.0% | 1385 | 1500 | 115 |
| 3.2 | 0.3 | 93.5 | 2 | 1 | 92.6% | 43.0% | 1420 | 1485 | 65 |
| 3.4 | 0.1 | 93.5 | 1 | 2 | 100.0% | 45.3% | 1435 | 1460 | 25 |
| 3.5 | 1 | 93.5 | 0 | 2 | 86.6% | 60.5% | 1405 | 1470 | 65 |
| 3.6 | 0.9 | 93.5 | 0 | 2 | 86.8% | 59.7% | 1410 | 1475 | 65 |
| 3.8 | 0.7 | 93.5 | 2 | 0 | 96.9% | 58.1% | 1410 | 1445 | 35 |
| 4 | 2.5 | 93.5 | 0 | 0 | 99.2% | 100.0% | 1495 | 1580 | 85 |
| 0.4 | 3.1 | 93.5 | 1 | 2 | 91.9% | 31.3% | 1410 | 1455 | 45 |
| 0.5 | 3 | 93.5 | 2 | 1 | 86.3% | 46.0% | 1415 | 1475 | 60 |
| 0.6 | 1.9 | 93.5 | 0 | 4 | 61.2% | 23.5% | 1390 | 1510 | 120 |
| 0.7 | 1.8 | 93.5 | 1 | 3 | 58.4% | 32.0% | 1400 | 1530 | 130 |
| 0.7 | 0.8 | 93.5 | 2 | 3 | 29.0% | 13.8% | 1400 | 1620 | 220 |
| 0.8 | 3.7 | 93.5 | 0 | 2 | 80.1% | 45.1% | 1410 | 1560 | 150 |
| 0.9 | 3.6 | 93.5 | 1 | 1 | 76.3% | 65.6% | 1415 | 1475 | 60 |
| 1 | 2.4 | 93.6 | 2 | 1 | 71.2% | 47.8% | 1410 | 1485 | 75 |
| 1.1 | 1.3 | 93.6 | 0 | 4 | 59.5% | 37.3% | 1385 | 1515 | 130 |
| 1.2 | 1.2 | 93.6 | 1 | 3 | 58.2% | 32.2% | 1400 | 1540 | 140 |
| 1.2 | 3.2 | 93.6 | 2 | 0 | 52.3% | 64.6% | 1415 | 1470 | 55 |
| 1.3 | 2.1 | 93.6 | 0 | 3 | 39.3% | 47.2% | 1385 | 1440 | 55 |
| 1.4 | 3 | 93.6 | 1 | 1 | 77.6% | 66.1% | 1420 | 1475 | 55 |
| 1.5 | 1.9 | 93.6 | 0 | 3 | 41.1% | 51.9% | 1385 | 1440 | 55 |
| 1.6 | 1.8 | 93.6 | 0 | 3 | 43.0% | 53.8% | 1385 | 1440 | 55 |
| 1.7 | 1.7 | 93.6 | 0 | 3 | 45.4% | 55.4% | 1385 | 1445 | 60 |
| 1.8 | 1.6 | 93.6 | 0 | 3 | 63.4% | 53.9% | 1390 | 1445 | 55 |
| 1.9 | 1.5 | 93.6 | 0 | 3 | 67.3% | 50.8% | 1390 | 1445 | 55 |
| 2 | 1.4 | 93.6 | 0 | 3 | 71.8% | 47.9% | 1390 | 1445 | 55 |
| 0.2 | 2.2 | 93.6 | 1 | 3 | 49.8% | 12.8% | 1410 | 1545 | 135 |
| 2.1 | 2.3 | 93.6 | 0 | 2 | 27.8% | 69.8% | 1385 | 1470 | 85 |
| 2.2 | 0.2 | 93.6 | 2 | 2 | 68.1% | 30.5% | 1425 | 1575 | 150 |
| 2.3 | 1.1 | 93.6 | 1 | 2 | 88.3% | 46.8% | 1405 | 1470 | 65 |
| 2.4 | 1 | 93.6 | 0 | 3 | 93.3% | 44.9% | 1400 | 1450 | 50 |
| 2.5 | 0.9 | 93.6 | 1 | 2 | 90.0% | 45.1% | 1410 | 1470 | 60 |
| 2.7 | 1.7 | 93.6 | 2 | 0 | 41.1% | 64.4% | 1395 | 1460 | 65 |
| 2.8 | 0.6 | 93.6 | 2 | 1 | 86.0% | 41.7% | 1410 | 1495 | 85 |
| 3 | 1.4 | 93.6 | 2 | 0 | 62.3% | 62.7% | 1400 | 1450 | 50 |
| 0.3 | 2.1 | 93.6 | 2 | 2 | 47.2% | 25.3% | 1415 | 1565 | 150 |
| 3.1 | 0.3 | 93.6 | 2 | 1 | 89.9% | 41.8% | 1420 | 1495 | 75 |
| 3.3 | 0.1 | 93.6 | 1 | 2 | 98.0% | 44.1% | 1435 | 1470 | 35 |
| 3.4 | 1 | 93.6 | 0 | 2 | 90.3% | 59.4% | 1410 | 1465 | 55 |
| 3.5 | 0.9 | 93.6 | 0 | 2 | 89.0% | 58.6% | 1410 | 1470 | 60 |
| 3.7 | 0.7 | 93.6 | 1 | 1 | 95.2% | 57.6% | 1420 | 1460 | 40 |
| 3.9 | 1.5 | 93.6 | 0 | 1 | 51.4% | 78.0% | 1415 | 1495 | 80 |
| 4 | 0.4 | 93.6 | 0 | 2 | 84.0% | 53.8% | 1415 | 1490 | 75 |
| 0.4 | 4 | 93.6 | 1 | 1 | 90.2% | 49.7% | 1415 | 1490 | 75 |
| 0.5 | 3.9 | 93.6 | 2 | 0 | 96.2% | 61.4% | 1425 | 1460 | 35 |
| 0.6 | 2.8 | 93.6 | 0 | 3 | 95.5% | 29.2% | 1405 | 1445 | 40 |
| 0.7 | 2.7 | 93.6 | 1 | 2 | 89.7% | 44.3% | 1410 | 1465 | 55 |
| 0.8 | 1.6 | 93.6 | 2 | 2 | 33.8% | 31.4% | 1395 | 1560 | 165 |
| 0.9 | 0.5 | 93.6 | 1 | 4 | 35.4% | 12.7% | 1410 | 1615 | 205 |
| 1 | 0.3 | 93.7 | 2 | 3 | 34.6% | 14.3% | 1420 | 1645 | 225 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.1 | 0.2 | 93.7 | 0 | 5 | 40.0% | 15.4% | 1415 | 1615 | 200 |
| 1.2 | 1.1 | 93.7 | 1 | 3 | 55.1% | 30.0% | 1400 | 1550 | 150 |
| 1.3 | 1 | 93.7 | 2 | 2 | 51.4% | 28.4% | 1400 | 1570 | 170 |
| 1.3 | 0 | 93.7 | 1 | 4 | 42.2% | 18.4% | 1440 | 1635 | 195 |
| 1.4 | 3.9 | 93.7 | 0 | 1 | 42.0% | 74.8% | 1410 | 1645 | 235 |
| 1.5 | 3.8 | 93.7 | 0 | 1 | 41.2% | 76.1% | 1410 | 1630 | 220 |
| 1.6 | 3.7 | 93.7 | 0 | 1 | 39.4% | 77.2% | 1405 | 1615 | 210 |
| 1.7 | 3.6 | 93.7 | 0 | 1 | 38.8% | 78.2% | 1405 | 1605 | 200 |
| 1.9 | 3.4 | 93.7 | 0 | 1 | 25.7% | 80.0% | 1400 | 1575 | 175 |
| 2 | 0.3 | 93.7 | 2 | 2 | 63.2% | 27.8% | 1420 | 1580 | 160 |
| 0.2 | 3.1 | 93.7 | 2 | 1 | 74.9% | 38.5% | 1415 | 1505 | 90 |
| 2.1 | 2.2 | 93.7 | 0 | 2 | 32.9% | 67.7% | 1390 | 1465 | 75 |
| 2.2 | 2.1 | 93.7 | 2 | 0 | 19.5% | 64.4% | 1385 | 1460 | 75 |
| 2.3 | 3 | 93.7 | 0 | 1 | 17.7% | 82.7% | 1395 | 1525 | 130 |
| 2.4 | 0.9 | 93.7 | 0 | 3 | 90.1% | 42.9% | 1400 | 1460 | 60 |
| 2.6 | 1.7 | 93.7 | 0 | 2 | 75.8% | 63.8% | 1400 | 1455 | 55 |
| 2.7 | 0.6 | 93.7 | 0 | 3 | 77.8% | 40.3% | 1405 | 1460 | 55 |
| 2.9 | 1.4 | 93.7 | 0 | 2 | 84.1% | 61.6% | 1405 | 1450 | 45 |
| 3 | 0.3 | 93.7 | 2 | 1 | 87.3% | 40.6% | 1420 | 1505 | 85 |
| 0.3 | 3 | 93.7 | 0 | 3 | 90.9% | 17.2% | 1410 | 1460 | 50 |
| 3.1 | 2.2 | 93.7 | 1 | 0 | 19.7% | 82.4% | 1400 | 1500 | 100 |
| 3.3 | 1 | 93.7 | 1 | 1 | 100.0% | 59.4% | 1415 | 1440 | 25 |
| 3.4 | 0.9 | 93.7 | 1 | 1 | 98.7% | 58.4% | 1415 | 1445 | 30 |
| 3.6 | 0.7 | 93.7 | 1 | 1 | 97.6% | 56.3% | 1420 | 1455 | 35 |
| 3.8 | 2.5 | 93.7 | 0 | 0 | 54.6% | 100.0% | 1485 | 1550 | 65 |
| 4 | 1.3 | 93.7 | 1 | 0 | 57.9% | 76.6% | 1415 | 1480 | 65 |
| 0.4 | 2.9 | 93.7 | 2 | 1 | 79.2% | 41.7% | 1420 | 1500 | 80 |
| 0.5 | 1.8 | 93.7 | 0 | 4 | 53.9% | 20.5% | 1395 | 1530 | 135 |
| 0.6 | 1.7 | 93.7 | 1 | 3 | 51.5% | 28.1% | 1405 | 1550 | 145 |
| 0.6 | 0.7 | 93.7 | 2 | 3 | 24.2% | 9.8% | 1405 | 1640 | 235 |
| 0.7 | 3.6 | 93.7 | 0 | 2 | 87.9% | 42.2% | 1415 | 1510 | 95 |
| 0.8 | 3.5 | 93.7 | 1 | 1 | 86.5% | 61.8% | 1420 | 1470 | 50 |
| 0.9 | 2.4 | 93.7 | 2 | 1 | 70.1% | 45.5% | 1410 | 1495 | 85 |
| 1.1 | 0.1 | 93.8 | 1 | 4 | 37.3% | 15.6% | 1425 | 1640 | 215 |
| 1.1 | 3.1 | 93.8 | 2 | 0 | 51.8% | 60.8% | 1415 | 1460 | 45 |
| 1.2 | 3 | 93.8 | 0 | 2 | 77.7% | 55.8% | 1405 | 1465 | 60 |
| 1.3 | 2.9 | 93.8 | 2 | 0 | 19.2% | 61.7% | 1405 | 1460 | 55 |
| 1.4 | 2.8 | 93.8 | 1 | 1 | 84.6% | 62.9% | 1420 | 1470 | 50 |
| 1.5 | 2.7 | 93.8 | 1 | 1 | 84.5% | 63.4% | 1420 | 1470 | 50 |
| 1.6 | 2.6 | 93.8 | 1 | 1 | 69.6% | 63.8% | 1415 | 1470 | 55 |
| 1.7 | 2.5 | 93.8 | 1 | 1 | 70.2% | 64.2% | 1415 | 1465 | 50 |
| 1.9 | 2.3 | 93.8 | 1 | 1 | 31.6% | 65.1% | 1405 | 1465 | 60 |
| 0.2 | 2 | 93.8 | 2 | 2 | 36.7% | 20.3% | 1415 | 1585 | 170 |
| 2.1 | 0.1 | 93.8 | 0 | 4 | 66.7% | 28.8% | 1425 | 1560 | 135 |
| 2.2 | 1 | 93.8 | 2 | 1 | 76.6% | 42.3% | 1405 | 1515 | 110 |
| 2.3 | 1.9 | 93.8 | 1 | 1 | 33.5% | 64.9% | 1400 | 1460 | 60 |
| 2.4 | 2.8 | 93.8 | 0 | 1 | 30.0% | 81.5% | 1405 | 1505 | 100 |
| 2.5 | 0.7 | 93.8 | 0 | 3 | 88.6% | 39.9% | 1405 | 1470 | 65 |
| 2.7 | 1.5 | 93.8 | 0 | 2 | 84.5% | 61.4% | 1405 | 1450 | 45 |
| 2.8 | 0.4 | 93.8 | 2 | 1 | 82.9% | 38.0% | 1415 | 1520 | 105 |
| 3 | 1.2 | 93.8 | 2 | 0 | 82.3% | 58.4% | 1405 | 1440 | 35 |
| 3.1 | 0.1 | 93.8 | 0 | 3 | 93.8% | 41.4% | 1430 | 1480 | 50 |
| 3.2 | 2 | 93.8 | 0 | 1 | 42.6% | 79.8% | 1405 | 1490 | 85 |
| 3.4 | 1.8 | 93.8 | 0 | 1 | 46.9% | 78.5% | 1410 | 1490 | 80 |
| 3.6 | 1.6 | 93.8 | 0 | 1 | 53.6% | 77.0% | 1415 | 1485 | 70 |
| 3.8 | 1.4 | 93.8 | 0 | 1 | 61.6% | 75.3% | 1420 | 1485 | 65 |
| 4 | 1.2 | 93.8 | 0 | 1 | 66.7% | 73.5% | 1420 | 1495 | 75 |
| 0.4 | 3.8 | 93.8 | 1 | 1 | 96.3% | 50.2% | 1415 | 1450 | 35 |
| 0.5 | 2.7 | 93.8 | 2 | 1 | 76.1% | 40.7% | 1420 | 1510 | 90 |
| 0.6 | 1.6 | 93.8 | 0 | 4 | 49.9% | 23.8% | 1390 | 1540 | 150 |
| 0.7 | 1.5 | 93.8 | 1 | 3 | 48.9% | 27.9% | 1405 | 1560 | 155 |
| 0.7 | 0.5 | 93.8 | 2 | 3 | 25.8% | 10.1% | 1410 | 1650 | 240 |
| 0.8 | 3.4 | 93.8 | 0 | 2 | 85.0% | 45.7% | 1410 | 1460 | 50 |
| 1.1 | 1 | 93.9 | 0 | 4 | 52.4% | 25.9% | 1395 | 1545 | 150 |
| 1.1 | 0 | 93.9 | 2 | 3 | 34.2% | 15.8% | 1425 | 1670 | 245 |
| 1.2 | 0.9 | 93.9 | 1 | 3 | 50.6% | 25.6% | 1405 | 1570 | 165 |
| 1.3 | 3.8 | 93.9 | 0 | 1 | 48.3% | 74.0% | 1410 | 1595 | 185 |
| 1.4 | 3.7 | 93.9 | 0 | 1 | 47.4% | 75.4% | 1410 | 1580 | 170 |
| 1.5 | 3.6 | 93.9 | 0 | 1 | 46.6% | 76.7% | 1410 | 1565 | 155 |
| 1.6 | 3.5 | 93.9 | 0 | 1 | 43.5% | 77.8% | 1410 | 1555 | 145 |
| 1.7 | 3.4 | 93.9 | 0 | 1 | 40.8% | 78.1% | 1410 | 1540 | 130 |
| 1.8 | 0.3 | 93.9 | 2 | 2 | 57.2% | 25.2% | 1420 | 1600 | 180 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.9 | 2.2 | 93.9 | 1 | 1 | 31.1% | 63.6% | 1405 | 1460 | 55 |
| 2.1 | 3 | 93.9 | 1 | 0 | 25.7% | 79.0% | 1420 | 1505 | 85 |
| 2.3 | 0.8 | 93.9 | 2 | 1 | 75.1% | 39.1% | 1405 | 1530 | 125 |
| 2.5 | 1.6 | 93.9 | 2 | 0 | 40.9% | 59.4% | 1395 | 1455 | 60 |
| 2.6 | 0.5 | 93.9 | 1 | 2 | 83.6% | 37.2% | 1415 | 1505 | 90 |
| 2.8 | 1.3 | 93.9 | 1 | 1 | 95.2% | 59.5% | 1410 | 1445 | 35 |
| 2.9 | 0.2 | 93.9 | 1 | 2 | 88.5% | 39.2% | 1430 | 1505 | 75 |
| 3 | 2.1 | 93.9 | 1 | 0 | 20.1% | 79.2% | 1400 | 1495 | 95 |
| 0.3 | 3.8 | 93.9 | 0 | 2 | 99.3% | 24.1% | 1415 | 1505 | 90 |
| 3.2 | 1.9 | 93.9 | 1 | 0 | 32.5% | 78.3% | 1405 | 1490 | 85 |
| 3.6 | 1.5 | 93.9 | 1 | 0 | 57.7% | 75.8% | 1410 | 1485 | 75 |
| 3.8 | 1.3 | 93.9 | 1 | 0 | 64.1% | 74.0% | 1415 | 1480 | 65 |
| 0.4 | 2.7 | 93.9 | 0 | 3 | 83.2% | 21.8% | 1410 | 1475 | 65 |
| 0.5 | 2.6 | 93.9 | 1 | 2 | 76.2% | 36.8% | 1410 | 1495 | 85 |
| 0.6 | 1.5 | 93.9 | 2 | 2 | 37.6% | 25.0% | 1400 | 1590 | 190 |
| 0.6 | 0.5 | 93.9 | 0 | 5 | 28.0% | 8.5% | 1410 | 1630 | 220 |
| 0.7 | 0.4 | 93.9 | 1 | 4 | 27.5% | 10.0% | 1420 | 1645 | 225 |
| 0.8 | 0.3 | 93.9 | 2 | 3 | 27.9% | 11.5% | 1420 | 1660 | 240 |
| 1 | 2 | 94 | 1 | 2 | 76.6% | 42.2% | 1415 | 1500 | 85 |
| 1.1 | 0.9 | 94 | 2 | 2 | 42.2% | 22.9% | 1400 | 1600 | 200 |
| 1.2 | 0.8 | 94 | 1 | 3 | 48.1% | 23.2% | 1405 | 1580 | 175 |
| 1.3 | 3.7 | 94 | 0 | 1 | 52.5% | 74.3% | 1415 | 1560 | 145 |
| 1.4 | 3.6 | 94 | 0 | 1 | 51.6% | 75.7% | 1415 | 1550 | 135 |
| 1.5 | 3.5 | 94 | 0 | 1 | 50.8% | 76.0% | 1415 | 1535 | 120 |
| 1.6 | 3.4 | 94 | 0 | 1 | 50.1% | 76.3% | 1415 | 1520 | 105 |
| 1.7 | 0.3 | 94 | 2 | 2 | 54.2% | 23.9% | 1420 | 1610 | 190 |
| 1.8 | 2.2 | 94 | 1 | 1 | 44.1% | 61.7% | 1410 | 1455 | 45 |
| 1.9 | 2.1 | 94 | 1 | 1 | 31.2% | 62.1% | 1405 | 1455 | 50 |
| 2 | 2 | 94 | 0 | 2 | 46.3% | 62.5% | 1400 | 1455 | 55 |
| 0.2 | 2.8 | 94 | 1 | 2 | 69.8% | 19.0% | 1415 | 1510 | 95 |
| 2.1 | 2.9 | 94 | 0 | 1 | 48.4% | 77.8% | 1415 | 1500 | 85 |
| 2.2 | 0.8 | 94 | 1 | 2 | 77.8% | 38.8% | 1410 | 1510 | 100 |
| 2.3 | 0.7 | 94 | 0 | 3 | 83.5% | 37.4% | 1410 | 1490 | 80 |
| 2.5 | 1.5 | 94 | 2 | 0 | 50.9% | 57.4% | 1400 | 1465 | 65 |
| 2.6 | 2.4 | 94 | 0 | 1 | 49.6% | 79.2% | 1415 | 1495 | 80 |
| 2.7 | 0.3 | 94 | 2 | 1 | 79.3% | 36.9% | 1420 | 1540 | 120 |
| 2.8 | 3.2 | 94 | 0 | 0 | 18.7% | 94.2% | 1460 | 1595 | 135 |
| 3 | 1 | 94 | 1 | 1 | 100.0% | 55.5% | 1415 | 1435 | 20 |
| 0.3 | 1.7 | 94 | 2 | 2 | 32.4% | 19.0% | 1415 | 1600 | 185 |
| 3.1 | 1.9 | 94 | 0 | 1 | 54.0% | 77.5% | 1415 | 1490 | 75 |
| 3.2 | 0.8 | 94 | 0 | 2 | 98.3% | 53.0% | 1415 | 1445 | 30 |
| 3.4 | 0.6 | 94 | 1 | 1 | 100.0% | 51.2% | 1420 | 1435 | 15 |
| 3.6 | 1.4 | 94 | 0 | 1 | 66.7% | 73.4% | 1420 | 1475 | 55 |
| 3.7 | 0.3 | 94 | 0 | 2 | 94.7% | 48.4% | 1425 | 1470 | 45 |
| 3.9 | 1.1 | 94 | 1 | 0 | 76.6% | 70.8% | 1420 | 1470 | 50 |
| 0.4 | 1.6 | 94 | 2 | 2 | 33.5% | 20.7% | 1410 | 1600 | 190 |
| 0.4 | 0.6 | 94 | 0 | 5 | 19.4% | 5.7% | 1405 | 1640 | 235 |
| 0.5 | 0.5 | 94 | 1 | 4 | 20.6% | 7.2% | 1415 | 1650 | 235 |
| 0.6 | 3.4 | 94 | 2 | 0 | 100.0% | 54.8% | 1425 | 1450 | 25 |
| 0.9 | 3.1 | 94 | 0 | 2 | 88.5% | 49.0% | 1410 | 1455 | 45 |
| 1 | 0.9 | 94.1 | 2 | 2 | 38.7% | 21.3% | 1400 | 1610 | 210 |
| 1.1 | 0.8 | 94.1 | 1 | 3 | 44.5% | 21.8% | 1405 | 1590 | 185 |
| 1.2 | 3.7 | 94.1 | 0 | 1 | 56.4% | 73.0% | 1415 | 1545 | 130 |
| 1.3 | 3.6 | 94.1 | 0 | 1 | 57.0% | 73.8% | 1420 | 1530 | 110 |
| 1.4 | 3.5 | 94.1 | 0 | 1 | 56.1% | 74.1% | 1420 | 1515 | 95 |
| 1.8 | 2.1 | 94.1 | 1 | 1 | 43.9% | 60.2% | 1410 | 1450 | 40 |
| 1.9 | 3 | 94.1 | 1 | 0 | 43.1% | 75.3% | 1425 | 1500 | 75 |
| 2 | 2.9 | 94.1 | 0 | 1 | 53.4% | 76.0% | 1420 | 1500 | 80 |
| 0.2 | 2.7 | 94.1 | 0 | 3 | 73.6% | 12.4% | 1415 | 1500 | 85 |
| 2.1 | 0.8 | 94.1 | 1 | 2 | 74.6% | 37.4% | 1410 | 1520 | 110 |
| 2.2 | 0.7 | 94.1 | 0 | 3 | 80.3% | 36.1% | 1410 | 1500 | 90 |
| 2.4 | 1.5 | 94.1 | 2 | 0 | 42.1% | 55.9% | 1395 | 1475 | 80 |
| 2.5 | 2.4 | 94.1 | 0 | 1 | 54.9% | 77.5% | 1420 | 1495 | 75 |
| 2.6 | 0.3 | 94.1 | 2 | 1 | 76.6% | 35.7% | 1420 | 1550 | 130 |
| 2.7 | 3.2 | 94.1 | 0 | 0 | 23.5% | 92.6% | 1460 | 1575 | 115 |
| 2.9 | 1 | 94.1 | 1 | 1 | 99.5% | 54.1% | 1415 | 1445 | 30 |
| 3 | 1.9 | 94.1 | 0 | 1 | 56.9% | 76.7% | 1415 | 1485 | 70 |
| 0.3 | 2.6 | 94.1 | 0 | 3 | 73.3% | 17.5% | 1410 | 1495 | 85 |
| 3.2 | 1.7 | 94.1 | 1 | 0 | 48.7% | 74.5% | 1410 | 1485 | 75 |
| 3.3 | 0.6 | 94.1 | 2 | 0 | 93.9% | 48.7% | 1410 | 1470 | 60 |
| 3.5 | 2.4 | 94.1 | 0 | 0 | 23.6% | 94.1% | 1450 | 1520 | 70 |
| 3.7 | 1.2 | 94.1 | 1 | 0 | 73.3% | 70.5% | 1415 | 1470 | 55 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 3.8 | 1.1 | 94.1 | 0 | 1 | 82.2% | 69.4% | 1425 | 1480 | 55 |
| 4 | 0.9 | 94.1 | 0 | 1 | 86.3% | 67.2% | 1425 | 1490 | 65 |
| 0.4 | 0.5 | 94.1 | 1 | 4 | 16.6% | 5.8% | 1415 | 1660 | 245 |
| 0.5 | 3.4 | 94.1 | 0 | 2 | 100.0% | 34.9% | 1415 | 1440 | 25 |
| 0.6 | 0.3 | 94.1 | 1 | 4 | 22.9% | 8.6% | 1425 | 1665 | 240 |
| 0.7 | 0.2 | 94.1 | 2 | 3 | 23.6% | 10.2% | 1420 | 1680 | 260 |
| 0.8 | 0.1 | 94.1 | 0 | 5 | 27.6% | 11.4% | 1420 | 1655 | 235 |
| 0.9 | 1 | 94.1 | 1 | 3 | 41.8% | 23.5% | 1405 | 1585 | 180 |
| 0.9 | 4 | 94.1 | 0 | 1 | 60.3% | 66.7% | 1415 | 1585 | 170 |
| 1 | 3.8 | 94.2 | 1 | 0 | 72.4% | 70.6% | 1435 | 1495 | 60 |
| 1.1 | 2.7 | 94.2 | 0 | 2 | 83.2% | 54.5% | 1410 | 1450 | 40 |
| 1.2 | 2.6 | 94.2 | 2 | 0 | 19.2% | 54.8% | 1405 | 1475 | 70 |
| 1.3 | 2.5 | 94.2 | 1 | 1 | 100.0% | 56.2% | 1425 | 1450 | 25 |
| 1.4 | 2.4 | 94.2 | 1 | 1 | 98.0% | 56.7% | 1420 | 1450 | 30 |
| 1.5 | 2.3 | 94.2 | 1 | 1 | 98.3% | 57.2% | 1420 | 1450 | 30 |
| 1.6 | 0.2 | 94.2 | 1 | 3 | 53.5% | 22.5% | 1430 | 1605 | 175 |
| 1.7 | 1.1 | 94.2 | 1 | 2 | 69.8% | 38.7% | 1410 | 1525 | 115 |
| 1.8 | 2 | 94.2 | 1 | 1 | 28.4% | 58.7% | 1405 | 1450 | 45 |
| 1.9 | 1.9 | 94.2 | 2 | 0 | 22.1% | 55.9% | 1390 | 1480 | 90 |
| 2 | 1.8 | 94.2 | 0 | 2 | 61.7% | 59.6% | 1405 | 1445 | 40 |
| 0.2 | 2.6 | 94.2 | 1 | 2 | 61.1% | 19.2% | 1415 | 1530 | 115 |
| 2.1 | 2.7 | 94.2 | 0 | 1 | 59.1% | 74.9% | 1425 | 1495 | 70 |
| 2.2 | 0.6 | 94.2 | 1 | 2 | 73.9% | 34.0% | 1415 | 1535 | 120 |
| 2.3 | 0.5 | 94.2 | 0 | 3 | 79.1% | 32.9% | 1415 | 1510 | 95 |
| 2.5 | 1.3 | 94.2 | 2 | 0 | 58.0% | 53.2% | 1400 | 1485 | 85 |
| 2.6 | 0.2 | 94.2 | 1 | 2 | 79.9% | 35.5% | 1430 | 1535 | 105 |
| 2.7 | 1.1 | 94.2 | 0 | 2 | 100.0% | 53.6% | 1415 | 1430 | 15 |
| 2.8 | 0 | 94.2 | 1 | 2 | 82.2% | 38.2% | 1440 | 1540 | 100 |
| 3 | 1.8 | 94.2 | 0 | 1 | 61.2% | 75.0% | 1415 | 1480 | 65 |
| 0.3 | 2.5 | 94.2 | 0 | 3 | 69.0% | 17.6% | 1410 | 1505 | 95 |
| 3.2 | 1.6 | 94.2 | 1 | 0 | 52.9% | 72.5% | 1410 | 1480 | 70 |
| 3.3 | 0.5 | 94.2 | 2 | 0 | 92.9% | 46.2% | 1415 | 1480 | 65 |
| 3.5 | 2.3 | 94.2 | 0 | 0 | 27.2% | 92.7% | 1445 | 1520 | 75 |
| 3.7 | 0.1 | 94.2 | 1 | 1 | 100.0% | 49.1% | 1435 | 1445 | 10 |
| 3.8 | 0 | 94.2 | 2 | 0 | 98.3% | 50.9% | 1425 | 1465 | 40 |
| 0.4 | 1.4 | 94.2 | 0 | 4 | 35.3% | 17.5% | 1400 | 1580 | 180 |
| 0.5 | 1.3 | 94.2 | 2 | 2 | 27.6% | 19.7% | 1400 | 1615 | 215 |
| 0.5 | 3.3 | 94.2 | 0 | 2 | 100.0% | 35.1% | 1415 | 1435 | 20 |
| 0.6 | 3.2 | 94.2 | 1 | 1 | 100.0% | 52.1% | 1420 | 1445 | 25 |
| 0.7 | 2.1 | 94.2 | 2 | 1 | 60.5% | 35.9% | 1415 | 1545 | 130 |
| 0.8 | 2 | 94.2 | 0 | 3 | 72.0% | 36.3% | 1405 | 1500 | 95 |
| 0.9 | 1.9 | 94.2 | 2 | 1 | 37.7% | 37.7% | 1405 | 1545 | 140 |
| 1 | 1.7 | 94.3 | 1 | 2 | 65.2% | 37.8% | 1415 | 1530 | 115 |
| 1 | 0.7 | 94.3 | 0 | 4 | 42.3% | 17.9% | 1405 | 1585 | 180 |
| 1.1 | 0.6 | 94.3 | 2 | 2 | 38.5% | 15.7% | 1410 | 1630 | 220 |
| 1.2 | 0.5 | 94.3 | 2 | 2 | 40.9% | 17.1% | 1415 | 1630 | 215 |
| 1.3 | 0.4 | 94.3 | 2 | 2 | 42.7% | 18.5% | 1415 | 1630 | 215 |
| 1.4 | 3.3 | 94.3 | 1 | 0 | 72.9% | 70.5% | 1435 | 1495 | 60 |
| 1.5 | 3.2 | 94.3 | 1 | 0 | 72.6% | 70.8% | 1435 | 1495 | 60 |
| 1.6 | 3.1 | 94.3 | 1 | 0 | 69.8% | 71.2% | 1430 | 1495 | 65 |
| 1.7 | 0 | 94.3 | 1 | 3 | 52.9% | 23.9% | 1440 | 1625 | 185 |
| 1.8 | 0.9 | 94.3 | 2 | 1 | 62.1% | 33.9% | 1405 | 1565 | 160 |
| 1.9 | 0.8 | 94.3 | 0 | 3 | 73.2% | 34.5% | 1410 | 1515 | 105 |
| 0.2 | 1.5 | 94.3 | 1 | 3 | 24.4% | 13.2% | 1415 | 1610 | 195 |
| 2.1 | 1.6 | 94.3 | 2 | 0 | 35.3% | 53.2% | 1395 | 1495 | 100 |
| 2.2 | 2.5 | 94.3 | 0 | 1 | 63.2% | 73.7% | 1425 | 1490 | 65 |
| 2.3 | 0.4 | 94.3 | 1 | 2 | 73.4% | 31.6% | 1420 | 1545 | 125 |
| 2.4 | 3.3 | 94.3 | 0 | 0 | 32.6% | 89.0% | 1460 | 1550 | 90 |
| 2.6 | 0.1 | 94.3 | 2 | 1 | 74.2% | 35.9% | 1425 | 1575 | 150 |
| 2.7 | 1 | 94.3 | 0 | 2 | 100.0% | 51.4% | 1415 | 1440 | 25 |
| 2.8 | 0.9 | 94.3 | 1 | 1 | 93.9% | 50.4% | 1415 | 1465 | 50 |
| 3 | 1.7 | 94.3 | 0 | 1 | 69.0% | 73.2% | 1420 | 1480 | 60 |
| 0.3 | 2.4 | 94.3 | 0 | 3 | 64.7% | 17.6% | 1410 | 1515 | 105 |
| 3.2 | 1.5 | 94.3 | 1 | 0 | 57.7% | 70.4% | 1410 | 1475 | 65 |
| 3.3 | 0.4 | 94.3 | 2 | 0 | 91.2% | 44.4% | 1415 | 1495 | 80 |
| 3.5 | 0.2 | 94.3 | 1 | 1 | 99.8% | 46.7% | 1430 | 1460 | 30 |
| 3.7 | 1 | 94.3 | 1 | 0 | 89.5% | 65.8% | 1420 | 1460 | 40 |
| 3.9 | 0.8 | 94.3 | 1 | 0 | 94.9% | 63.5% | 1420 | 1465 | 45 |
| 0.4 | 2.3 | 94.3 | 0 | 3 | 66.2% | 22.2% | 1410 | 1515 | 105 |
| 0.5 | 0.2 | 94.3 | 2 | 3 | 17.0% | 7.3% | 1420 | 1700 | 280 |
| 0.6 | 0.1 | 94.3 | 0 | 5 | 21.5% | 8.6% | 1425 | 1670 | 245 |
| 0.7 | 1 | 94.3 | 1 | 3 | 33.7% | 20.5% | 1405 | 1605 | 200 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.7 | 4 | 94.3 | 0 | 1 | 71.8% | 61.2% | 1420 | 1550 | 130 |
| 0.8 | 3.9 | 94.3 | 1 | 0 | 79.0% | 68.1% | 1435 | 1490 | 55 |
| 0.9 | 2.8 | 94.3 | 0 | 2 | 87.2% | 49.7% | 1410 | 1445 | 35 |
| 1 | 2.6 | 94.4 | 2 | 0 | 46.1% | 50.3% | 1415 | 1495 | 80 |
| 1.1 | 2.5 | 94.4 | 1 | 1 | 94.9% | 51.9% | 1425 | 1465 | 40 |
| 1.2 | 1.4 | 94.4 | 0 | 3 | 66.0% | 38.1% | 1405 | 1520 | 115 |
| 1.3 | 1.3 | 94.4 | 0 | 3 | 66.3% | 37.8% | 1405 | 1520 | 115 |
| 1.4 | 1.2 | 94.4 | 0 | 3 | 66.7% | 36.9% | 1405 | 1525 | 120 |
| 1.5 | 0.1 | 94.4 | 0 | 4 | 49.4% | 21.0% | 1430 | 1610 | 180 |
| 1.6 | 1 | 94.4 | 0 | 3 | 68.9% | 35.1% | 1410 | 1525 | 115 |
| 1.7 | 1.9 | 94.4 | 2 | 0 | 16.0% | 52.6% | 1385 | 1500 | 115 |
| 1.8 | 1.8 | 94.4 | 0 | 2 | 98.5% | 56.0% | 1415 | 1445 | 30 |
| 1.9 | 2.7 | 94.4 | 1 | 0 | 25.2% | 70.7% | 1420 | 1490 | 70 |
| 2 | 2.6 | 94.4 | 0 | 1 | 69.0% | 71.6% | 1430 | 1490 | 60 |
| 0.2 | 2.4 | 94.4 | 0 | 3 | 60.1% | 12.5% | 1415 | 1530 | 115 |
| 2.1 | 0.5 | 94.4 | 2 | 1 | 65.2% | 29.2% | 1415 | 1580 | 165 |
| 2.3 | 1.3 | 94.4 | 1 | 1 | 81.6% | 52.8% | 1410 | 1475 | 65 |
| 2.4 | 1.2 | 94.4 | 0 | 2 | 97.2% | 52.2% | 1415 | 1450 | 35 |
| 2.5 | 1.1 | 94.4 | 2 | 0 | 77.6% | 48.8% | 1405 | 1510 | 105 |
| 2.6 | 0 | 94.4 | 1 | 2 | 76.7% | 35.7% | 1440 | 1560 | 120 |
| 2.8 | 1.8 | 94.4 | 0 | 1 | 70.5% | 73.1% | 1420 | 1480 | 60 |
| 2.9 | 0.7 | 94.4 | 0 | 2 | 98.6% | 47.1% | 1420 | 1455 | 35 |
| 0.3 | 2.3 | 94.4 | 1 | 2 | 54.9% | 26.5% | 1415 | 1545 | 130 |
| 3.1 | 0.5 | 94.4 | 2 | 0 | 87.9% | 43.3% | 1415 | 1505 | 90 |
| 3.3 | 2.3 | 94.4 | 0 | 0 | 39.3% | 89.5% | 1450 | 1515 | 65 |
| 3.5 | 0.1 | 94.4 | 1 | 1 | 98.7% | 46.8% | 1435 | 1470 | 35 |
| 3.6 | 0 | 94.4 | 2 | 0 | 93.8% | 48.5% | 1425 | 1495 | 70 |
| 3.9 | 0.7 | 94.4 | 0 | 1 | 90.4% | 61.4% | 1425 | 1480 | 55 |
| 0.4 | 2.2 | 94.4 | 0 | 3 | 62.1% | 22.3% | 1410 | 1525 | 115 |
| 0.5 | 2.1 | 94.4 | 1 | 2 | 59.6% | 31.3% | 1420 | 1545 | 125 |
| 0.6 | 2 | 94.4 | 2 | 1 | 52.4% | 31.7% | 1415 | 1565 | 150 |
| 0.7 | 1.9 | 94.4 | 1 | 2 | 61.4% | 33.5% | 1420 | 1540 | 120 |
| 0.7 | 0.9 | 94.4 | 0 | 4 | 35.4% | 18.3% | 1405 | 1595 | 190 |
| 0.8 | 0.8 | 94.4 | 2 | 2 | 30.5% | 15.6% | 1405 | 1635 | 230 |
| 0.9 | 0.7 | 94.4 | 1 | 3 | 35.8% | 16.3% | 1410 | 1615 | 205 |
| 1 | 3.5 | 94.5 | 0 | 1 | 74.5% | 66.2% | 1425 | 1490 | 65 |
| 1.1 | 3.4 | 94.5 | 1 | 0 | 85.4% | 66.0% | 1440 | 1485 | 45 |
| 1.2 | 0.3 | 94.5 | 1 | 3 | 41.4% | 17.1% | 1425 | 1630 | 205 |
| 1.3 | 0.2 | 94.5 | 0 | 4 | 46.6% | 18.3% | 1430 | 1615 | 185 |
| 1.4 | 1.1 | 94.5 | 0 | 3 | 64.8% | 34.7% | 1410 | 1535 | 125 |
| 1.5 | 3 | 94.5 | 1 | 0 | 80.6% | 67.6% | 1435 | 1485 | 50 |
| 1.6 | 3.9 | 94.5 | 0 | 0 | 41.7% | 84.0% | 1455 | 1595 | 140 |
| 1.7 | 0.8 | 94.5 | 1 | 2 | 62.8% | 31.7% | 1415 | 1560 | 145 |
| 1.8 | 0.7 | 94.5 | 2 | 1 | 58.3% | 29.1% | 1405 | 1585 | 180 |
| 1.9 | 0.6 | 94.5 | 0 | 3 | 68.8% | 29.8% | 1415 | 1540 | 125 |
| 0.2 | 1.3 | 94.5 | 1 | 3 | 18.5% | 10.8% | 1415 | 1630 | 215 |
| 2.1 | 1.4 | 94.5 | 0 | 2 | 94.2% | 52.9% | 1415 | 1460 | 45 |
| 2.2 | 0.3 | 94.5 | 1 | 2 | 69.3% | 30.4% | 1425 | 1565 | 140 |
| 2.3 | 2.2 | 94.5 | 0 | 1 | 75.4% | 71.1% | 1430 | 1485 | 55 |
| 2.5 | 1 | 94.5 | 1 | 1 | 87.6% | 48.7% | 1415 | 1490 | 75 |
| 2.6 | 1.9 | 94.5 | 0 | 1 | 75.7% | 72.2% | 1425 | 1480 | 55 |
| 2.7 | 0.8 | 94.5 | 0 | 2 | 95.4% | 46.9% | 1420 | 1465 | 45 |
| 2.9 | 0.6 | 94.5 | 1 | 1 | 90.4% | 44.4% | 1420 | 1490 | 70 |
| 0.3 | 1.2 | 94.5 | 2 | 2 | 16.9% | 12.7% | 1405 | 1645 | 240 |
| 3.1 | 2.4 | 94.5 | 0 | 0 | 42.7% | 87.7% | 1450 | 1515 | 65 |
| 3.3 | 1.2 | 94.5 | 1 | 0 | 86.8% | 65.1% | 1415 | 1460 | 45 |
| 3.4 | 1.1 | 94.5 | 0 | 1 | 94.3% | 64.9% | 1425 | 1460 | 35 |
| 3.6 | 0.9 | 94.5 | 0 | 1 | 95.6% | 62.6% | 1425 | 1465 | 40 |
| 4 | 1.5 | 94.5 | 0 | 0 | 42.8% | 86.2% | 1430 | 1500 | 70 |
| 0.4 | 3.1 | 94.5 | 2 | 0 | 80.0% | 44.4% | 1425 | 1505 | 80 |
| 0.5 | 3 | 94.5 | 0 | 2 | 94.1% | 35.5% | 1415 | 1455 | 40 |
| 0.6 | 2.9 | 94.5 | 2 | 0 | 81.2% | 45.9% | 1425 | 1505 | 80 |
| 0.7 | 2.8 | 94.5 | 1 | 1 | 90.4% | 47.6% | 1425 | 1475 | 50 |
| 0.8 | 1.7 | 94.5 | 0 | 3 | 62.0% | 33.2% | 1410 | 1530 | 120 |
| 0.9 | 1.6 | 94.5 | 2 | 1 | 19.0% | 33.4% | 1395 | 1575 | 180 |
| 1 | 1.4 | 94.6 | 1 | 2 | 53.4% | 33.6% | 1410 | 1560 | 150 |
| 1 | 0.4 | 94.6 | 0 | 4 | 39.2% | 14.1% | 1425 | 1620 | 195 |
| 1.1 | 3.3 | 94.6 | 0 | 1 | 78.7% | 64.9% | 1430 | 1485 | 55 |
| 1.2 | 3.2 | 94.6 | 0 | 1 | 77.7% | 65.4% | 1430 | 1485 | 55 |
| 1.3 | 3.1 | 94.6 | 0 | 1 | 76.9% | 65.8% | 1430 | 1485 | 55 |
| 1.4 | 0 | 94.6 | 2 | 2 | 42.2% | 20.1% | 1425 | 1665 | 240 |
| 1.6 | 1.8 | 94.6 | 1 | 1 | 39.2% | 51.8% | 1410 | 1490 | 80 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.7 | 1.7 | 94.6 | 2 | 0 | 22.7% | 48.8% | 1390 | 1520 | 130 |
| 1.8 | 1.6 | 94.6 | 0 | 2 | 91.1% | 53.2% | 1415 | 1470 | 55 |
| 1.9 | 2.5 | 94.6 | 1 | 0 | 17.2% | 67.7% | 1415 | 1480 | 65 |
| 2 | 3.4 | 94.6 | 0 | 0 | 46.4% | 83.5% | 1460 | 1525 | 65 |
| 0.2 | 3.2 | 94.6 | 2 | 0 | 73.9% | 40.8% | 1425 | 1520 | 95 |
| 2.2 | 1.2 | 94.6 | 1 | 1 | 82.6% | 49.1% | 1410 | 1495 | 85 |
| 2.3 | 0.1 | 94.6 | 0 | 3 | 72.0% | 31.6% | 1435 | 1560 | 125 |
| 2.4 | 3 | 94.6 | 0 | 0 | 47.7% | 84.5% | 1460 | 1520 | 60 |
| 2.6 | 1.8 | 94.6 | 1 | 0 | 26.9% | 67.9% | 1405 | 1470 | 65 |
| 2.7 | 0.7 | 94.6 | 2 | 0 | 80.3% | 42.4% | 1410 | 1530 | 120 |
| 2.9 | 2.5 | 94.6 | 0 | 0 | 49.1% | 85.8% | 1455 | 1515 | 60 |
| 0.3 | 1.1 | 94.6 | 1 | 3 | 18.7% | 12.1% | 1410 | 1635 | 225 |
| 3.1 | 2.3 | 94.6 | 0 | 0 | 48.3% | 86.3% | 1450 | 1515 | 65 |
| 3.3 | 0.1 | 94.6 | 1 | 1 | 93.5% | 44.5% | 1435 | 1495 | 60 |
| 3.4 | 0 | 94.6 | 2 | 0 | 89.2% | 46.2% | 1425 | 1525 | 100 |
| 3.7 | 0.7 | 94.6 | 0 | 1 | 95.1% | 58.9% | 1425 | 1465 | 40 |
| 0.4 | 1 | 94.6 | 1 | 3 | 20.7% | 14.1% | 1405 | 1635 | 230 |
| 0.4 | 4 | 94.6 | 0 | 1 | 89.0% | 47.1% | 1420 | 1495 | 75 |
| 0.5 | 0.9 | 94.6 | 2 | 2 | 20.3% | 12.9% | 1400 | 1655 | 255 |
| 0.6 | 0.8 | 94.6 | 1 | 3 | 26.1% | 14.1% | 1410 | 1635 | 225 |
| 0.7 | 3.7 | 94.6 | 0 | 1 | 80.6% | 62.0% | 1420 | 1480 | 60 |
| 0.8 | 3.6 | 94.6 | 1 | 0 | 89.8% | 62.9% | 1435 | 1475 | 40 |
| 0.9 | 3.5 | 94.6 | 1 | 0 | 91.5% | 63.4% | 1440 | 1480 | 40 |
| 1 | 2.3 | 94.7 | 0 | 2 | 89.7% | 46.9% | 1420 | 1475 | 55 |
| 1.1 | 0.2 | 94.7 | 2 | 2 | 34.8% | 15.9% | 1420 | 1665 | 245 |
| 1.2 | 1.1 | 94.7 | 2 | 1 | 45.9% | 28.8% | 1400 | 1595 | 195 |
| 1.3 | 2 | 94.7 | 0 | 2 | 91.5% | 48.9% | 1425 | 1475 | 50 |
| 1.4 | 2.9 | 94.7 | 0 | 1 | 82.9% | 64.7% | 1435 | 1485 | 50 |
| 1.5 | 0.8 | 94.7 | 1 | 2 | 56.0% | 28.7% | 1415 | 1575 | 160 |
| 1.6 | 0.7 | 94.7 | 2 | 1 | 52.3% | 25.9% | 1405 | 1605 | 200 |
| 1.7 | 0.6 | 94.7 | 0 | 3 | 62.1% | 27.1% | 1415 | 1555 | 140 |
| 1.9 | 1.4 | 94.7 | 1 | 1 | 61.7% | 49.2% | 1410 | 1505 | 95 |
| 2 | 1.3 | 94.7 | 2 | 0 | 49.4% | 45.5% | 1400 | 1535 | 135 |
| 0.2 | 2.1 | 94.7 | 0 | 3 | 47.1% | 12.7% | 1415 | 1560 | 145 |
| 2.1 | 2.2 | 94.7 | 0 | 1 | 86.1% | 67.5% | 1435 | 1475 | 40 |
| 2.4 | 2.9 | 94.7 | 0 | 0 | 53.0% | 83.1% | 1460 | 1520 | 60 |
| 2.6 | 1.7 | 94.7 | 1 | 0 | 29.6% | 65.9% | 1405 | 1465 | 60 |
| 2.7 | 0.6 | 94.7 | 2 | 0 | 78.6% | 39.9% | 1410 | 1540 | 130 |
| 2.9 | 2.4 | 94.7 | 0 | 0 | 54.9% | 84.3% | 1455 | 1515 | 60 |
| 0.3 | 1 | 94.7 | 1 | 3 | 16.6% | 11.2% | 1410 | 1645 | 235 |
| 3.1 | 1.2 | 94.7 | 1 | 0 | 90.2% | 62.4% | 1415 | 1450 | 35 |
| 3.2 | 1.1 | 94.7 | 0 | 1 | 100.0% | 62.6% | 1425 | 1450 | 25 |
| 3.8 | 1.5 | 94.7 | 0 | 0 | 51.9% | 83.9% | 1430 | 1495 | 65 |
| 0.4 | 1.9 | 94.7 | 2 | 1 | 40.5% | 24.5% | 1420 | 1595 | 175 |
| 0.5 | 1.8 | 94.7 | 1 | 2 | 49.5% | 26.6% | 1425 | 1575 | 150 |
| 0.5 | 0.8 | 94.7 | 0 | 4 | 24.3% | 13.1% | 1405 | 1625 | 220 |
| 0.6 | 0.7 | 94.7 | 2 | 2 | 22.1% | 9.8% | 1405 | 1660 | 255 |
| 0.7 | 0.6 | 94.7 | 1 | 3 | 27.3% | 10.7% | 1415 | 1645 | 230 |
| 0.8 | 3.5 | 94.7 | 0 | 1 | 83.8% | 61.9% | 1425 | 1475 | 50 |
| 0.9 | 3.4 | 94.7 | 1 | 0 | 95.3% | 61.7% | 1440 | 1475 | 35 |
| 1 | 0.2 | 94.8 | 0 | 4 | 37.0% | 14.2% | 1430 | 1645 | 215 |
| 1.1 | 1.1 | 94.8 | 2 | 1 | 42.5% | 27.2% | 1400 | 1605 | 205 |
| 1.2 | 2 | 94.8 | 0 | 2 | 87.6% | 46.7% | 1425 | 1485 | 60 |
| 1.3 | 2.9 | 94.8 | 0 | 1 | 87.0% | 62.6% | 1435 | 1480 | 45 |
| 1.4 | 0.8 | 94.8 | 1 | 2 | 52.6% | 27.2% | 1415 | 1585 | 170 |
| 1.5 | 0.7 | 94.8 | 2 | 1 | 49.3% | 24.3% | 1405 | 1610 | 205 |
| 1.6 | 0.6 | 94.8 | 0 | 3 | 58.7% | 25.7% | 1415 | 1565 | 150 |
| 1.8 | 1.4 | 94.8 | 1 | 1 | 57.9% | 47.8% | 1410 | 1515 | 105 |
| 1.9 | 1.3 | 94.8 | 2 | 0 | 47.6% | 43.9% | 1400 | 1545 | 145 |
| 2 | 0.2 | 94.8 | 1 | 2 | 62.4% | 27.9% | 1430 | 1595 | 165 |
| 0.2 | 3 | 94.8 | 0 | 2 | 80.1% | 18.1% | 1420 | 1495 | 75 |
| 2.1 | 3.1 | 94.8 | 0 | 0 | 56.3% | 80.7% | 1460 | 1520 | 60 |
| 2.3 | 1.9 | 94.8 | 0 | 1 | 89.4% | 66.9% | 1430 | 1470 | 40 |
| 2.4 | 0.8 | 94.8 | 0 | 2 | 86.1% | 43.1% | 1420 | 1495 | 75 |
| 2.6 | 0.6 | 94.8 | 1 | 1 | 81.9% | 40.2% | 1420 | 1520 | 100 |
| 2.8 | 1.4 | 94.8 | 0 | 1 | 94.7% | 64.9% | 1425 | 1460 | 35 |
| 2.9 | 0.3 | 94.8 | 0 | 2 | 90.2% | 39.1% | 1430 | 1495 | 65 |
| 0.3 | 2.9 | 94.8 | 1 | 1 | 73.5% | 39.0% | 1420 | 1515 | 95 |
| 3.3 | 0.9 | 94.8 | 0 | 1 | 100.0% | 59.0% | 1425 | 1445 | 20 |
| 3.7 | 1.5 | 94.8 | 0 | 0 | 56.1% | 82.7% | 1430 | 1495 | 65 |
| 4 | 0.2 | 94.8 | 1 | 0 | 100.0% | 52.8% | 1430 | 1455 | 25 |
| 0.4 | 0.8 | 94.8 | 1 | 3 | 17.9% | 11.0% | 1410 | 1655 | 245 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.5 | 3.7 | 94.8 | 0 | 1 | 91.4% | 53.6% | 1420 | 1465 | 45 |
| 0.6 | 3.6 | 94.8 | 1 | 0 | 100.0% | 58.4% | 1435 | 1460 | 25 |
| 0.7 | 2.5 | 94.8 | 0 | 2 | 84.8% | 43.1% | 1420 | 1485 | 65 |
| 0.8 | 2.4 | 94.8 | 2 | 0 | 44.3% | 42.4% | 1415 | 1535 | 120 |
| 0.9 | 2.3 | 94.8 | 1 | 1 | 80.9% | 44.1% | 1430 | 1505 | 75 |
| 1 | 0.1 | 94.9 | 0 | 4 | 34.3% | 14.3% | 1435 | 1655 | 220 |
| 1.1 | 1 | 94.9 | 0 | 3 | 51.5% | 28.5% | 1415 | 1570 | 155 |
| 1.3 | 2.8 | 94.9 | 0 | 1 | 90.8% | 61.1% | 1435 | 1475 | 40 |
| 1.4 | 3.7 | 94.9 | 0 | 0 | 59.6% | 77.0% | 1455 | 1520 | 65 |
| 1.5 | 0.6 | 94.9 | 1 | 2 | 51.8% | 23.7% | 1415 | 1595 | 180 |
| 1.6 | 0.5 | 94.9 | 2 | 1 | 50.6% | 22.7% | 1415 | 1625 | 210 |
| 1.7 | 0.4 | 94.9 | 0 | 3 | 59.3% | 23.6% | 1425 | 1580 | 155 |
| 1.9 | 1.2 | 94.9 | 1 | 1 | 70.9% | 44.8% | 1410 | 1525 | 115 |
| 2 | 0.1 | 94.9 | 0 | 3 | 64.0% | 27.8% | 1440 | 1590 | 150 |
| 0.2 | 2.9 | 94.9 | 2 | 0 | 61.8% | 35.0% | 1425 | 1550 | 125 |
| 2.1 | 0 | 94.9 | 2 | 1 | 59.8% | 29.7% | 1425 | 1630 | 205 |
| 2.3 | 0.8 | 94.9 | 1 | 1 | 76.6% | 41.0% | 1415 | 1530 | 115 |
| 2.6 | 0.5 | 94.9 | 0 | 2 | 85.2% | 38.3% | 1425 | 1505 | 80 |
| 3 | 0.1 | 94.9 | 2 | 0 | 81.1% | 41.2% | 1425 | 1565 | 140 |
| 0.3 | 2.8 | 94.9 | 0 | 2 | 77.2% | 25.1% | 1420 | 1500 | 80 |
| 3.2 | 1.9 | 94.9 | 0 | 0 | 60.1% | 82.3% | 1440 | 1500 | 60 |
| 3.5 | 0.6 | 94.9 | 1 | 0 | 100.0% | 53.0% | 1420 | 1445 | 25 |
| 3.8 | 0.3 | 94.9 | 0 | 1 | 98.3% | 50.0% | 1430 | 1465 | 35 |
| 0.4 | 2.7 | 94.9 | 1 | 1 | 72.3% | 38.2% | 1425 | 1520 | 95 |
| 0.5 | 2.6 | 94.9 | 1 | 1 | 75.0% | 39.1% | 1430 | 1520 | 90 |
| 0.6 | 1.5 | 94.9 | 0 | 3 | 48.2% | 25.5% | 1420 | 1570 | 150 |
| 0.7 | 1.4 | 94.9 | 2 | 1 | 18.3% | 25.7% | 1395 | 1610 | 215 |
| 0.8 | 1.3 | 94.9 | 1 | 2 | 42.2% | 27.6% | 1410 | 1590 | 180 |
| 0.8 | 3.3 | 94.9 | 0 | 1 | 92.5% | 58.5% | 1430 | 1470 | 40 |
| 1.1 | 0.9 | 95 | 0 | 3 | 48.6% | 26.1% | 1415 | 1580 | 165 |
| 1.3 | 1.7 | 95 | 0 | 2 | 79.9% | 44.5% | 1425 | 1505 | 80 |
| 1.4 | 2.6 | 95 | 1 | 0 | 86.3% | 59.3% | 1430 | 1460 | 30 |
| 1.5 | 2.5 | 95 | 0 | 1 | 99.0% | 60.5% | 1440 | 1470 | 30 |
| 1.6 | 3.4 | 95 | 0 | 0 | 65.6% | 76.1% | 1460 | 1515 | 55 |
| 1.7 | 0.3 | 95 | 2 | 1 | 51.6% | 24.1% | 1420 | 1635 | 215 |
| 1.8 | 3.2 | 95 | 0 | 0 | 65.4% | 76.8% | 1460 | 1515 | 55 |
| 2 | 1 | 95 | 2 | 0 | 65.5% | 38.8% | 1405 | 1570 | 165 |
| 0.2 | 2.8 | 95 | 1 | 1 | 63.5% | 34.2% | 1420 | 1535 | 115 |
| 2.2 | 1.8 | 95 | 1 | 0 | 15.9% | 61.8% | 1400 | 1465 | 65 |
| 2.7 | 1.3 | 95 | 1 | 0 | 58.3% | 59.0% | 1410 | 1465 | 55 |
| 3 | 2 | 95 | 0 | 0 | 66.1% | 80.4% | 1445 | 1500 | 55 |
| 0.3 | 3.7 | 95 | 1 | 0 | 100.0% | 53.0% | 1430 | 1455 | 25 |
| 3.3 | 0.7 | 95 | 0 | 1 | 100.0% | 53.9% | 1430 | 1440 | 10 |
| 3.7 | 1.3 | 95 | 0 | 0 | 68.7% | 77.3% | 1430 | 1485 | 55 |
| 4 | 0 | 95 | 1 | 0 | 100.0% | 53.2% | 1435 | 1445 | 10 |
| 0.4 | 0.6 | 95 | 1 | 3 | 15.9% | 5.9% | 1415 | 1670 | 255 |
| 0.5 | 0.5 | 95 | 1 | 3 | 19.1% | 7.2% | 1420 | 1670 | 250 |
| 0.6 | 3.4 | 95 | 0 | 1 | 96.9% | 55.7% | 1425 | 1460 | 35 |
| 0.8 | 0.2 | 95 | 0 | 4 | 29.7% | 11.5% | 1430 | 1660 | 230 |
| 0.9 | 1.1 | 95 | 2 | 1 | 35.4% | 23.8% | 1400 | 1620 | 220 |
| 1.1 | 0.8 | 95.1 | 1 | 2 | 42.2% | 22.6% | 1415 | 1610 | 195 |
| 1.2 | 0.7 | 95.1 | 0 | 3 | 47.2% | 22.5% | 1415 | 1590 | 175 |
| 1.4 | 1.5 | 95.1 | 1 | 1 | 39.6% | 43.5% | 1410 | 1540 | 130 |
| 1.5 | 1.4 | 95.1 | 2 | 0 | 31.1% | 39.4% | 1395 | 1570 | 175 |
| 1.6 | 1.3 | 95.1 | 0 | 2 | 74.9% | 44.7% | 1420 | 1520 | 100 |
| 1.7 | 0.2 | 95.1 | 1 | 2 | 53.5% | 24.0% | 1430 | 1620 | 190 |
| 1.9 | 0 | 95.1 | 2 | 1 | 54.5% | 27.0% | 1425 | 1650 | 225 |
| 2.2 | 1.7 | 95.1 | 1 | 0 | 23.6% | 59.9% | 1405 | 1475 | 70 |
| 2.3 | 0.6 | 95.1 | 2 | 0 | 68.0% | 33.8% | 1410 | 1580 | 170 |
| 2.5 | 2.4 | 95.1 | 0 | 0 | 72.2% | 77.5% | 1455 | 1505 | 50 |
| 2.7 | 1.2 | 95.1 | 1 | 0 | 79.9% | 56.7% | 1415 | 1475 | 60 |
| 2.8 | 1.1 | 95.1 | 0 | 1 | 100.0% | 57.8% | 1425 | 1445 | 20 |
| 3 | 0.9 | 95.1 | 0 | 1 | 100.0% | 55.3% | 1430 | 1445 | 15 |
| 3.1 | 0.8 | 95.1 | 1 | 0 | 94.4% | 52.6% | 1420 | 1475 | 55 |
| 3.4 | 0.5 | 95.1 | 0 | 1 | 100.0% | 50.0% | 1430 | 1440 | 10 |
| 3.8 | 0.1 | 95.1 | 1 | 0 | 100.0% | 50.7% | 1430 | 1455 | 25 |
| 0.4 | 2.5 | 95.1 | 1 | 1 | 65.9% | 34.6% | 1430 | 1540 | 110 |
| 0.5 | 2.4 | 95.1 | 1 | 1 | 67.0% | 35.7% | 1430 | 1540 | 110 |
| 0.6 | 1.3 | 95.1 | 0 | 3 | 41.1% | 22.9% | 1420 | 1590 | 170 |
| 0.7 | 1.2 | 95.1 | 2 | 1 | 24.2% | 22.5% | 1395 | 1630 | 235 |
| 0.8 | 0.1 | 95.1 | 1 | 3 | 26.3% | 11.6% | 1430 | 1690 | 260 |
| 0.8 | 3.1 | 95.1 | 0 | 1 | 98.9% | 55.1% | 1430 | 1460 | 30 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.9 | 0 | 95.1 | 2 | 2 | 27.6% | 13.2% | 1425 | 1705 | 280 |
| 1.1 | 1.7 | 95.2 | 1 | 1 | 63.4% | 39.7% | 1420 | 1550 | 130 |
| 1.2 | 1.6 | 95.2 | 0 | 2 | 72.2% | 41.0% | 1425 | 1525 | 100 |
| 1.3 | 2.5 | 95.2 | 1 | 0 | 85.5% | 55.6% | 1430 | 1475 | 45 |
| 1.4 | 2.4 | 95.2 | 0 | 1 | 100.0% | 56.9% | 1440 | 1460 | 20 |
| 1.5 | 0.3 | 95.2 | 1 | 2 | 48.2% | 21.3% | 1425 | 1630 | 205 |
| 1.6 | 2.2 | 95.2 | 1 | 0 | 27.1% | 57.2% | 1420 | 1480 | 60 |
| 1.7 | 2.1 | 95.2 | 0 | 1 | 100.0% | 58.4% | 1440 | 1455 | 15 |
| 1.8 | 0 | 95.2 | 0 | 3 | 56.3% | 25.3% | 1450 | 1620 | 170 |
| 2 | 0.8 | 95.2 | 0 | 2 | 74.4% | 37.8% | 1425 | 1535 | 110 |
| 2.1 | 1.7 | 95.2 | 0 | 1 | 100.0% | 60.4% | 1430 | 1455 | 25 |
| 2.2 | 0.6 | 95.2 | 0 | 2 | 75.5% | 35.4% | 1425 | 1535 | 110 |
| 2.4 | 0.4 | 95.2 | 1 | 1 | 73.2% | 33.1% | 1425 | 1565 | 140 |
| 2.6 | 1.2 | 95.2 | 0 | 1 | 98.8% | 57.8% | 1425 | 1455 | 30 |
| 2.7 | 2.1 | 95.2 | 0 | 0 | 76.7% | 76.7% | 1450 | 1495 | 45 |
| 3 | 1.8 | 95.2 | 0 | 0 | 73.7% | 77.6% | 1440 | 1490 | 50 |
| 0.3 | 3.5 | 95.2 | 0 | 1 | 97.7% | 40.5% | 1420 | 1455 | 35 |
| 3.4 | 1.4 | 95.2 | 0 | 0 | 74.1% | 76.4% | 1430 | 1480 | 50 |
| 0.6 | 0.2 | 95.2 | 1 | 3 | 20.6% | 8.7% | 1430 | 1695 | 265 |
| 0.7 | 0.1 | 95.2 | 0 | 4 | 24.5% | 10.1% | 1435 | 1680 | 245 |
| 0.8 | 1 | 95.2 | 2 | 1 | 30.3% | 19.7% | 1400 | 1640 | 240 |
| 0.8 | 0 | 95.2 | 0 | 4 | 26.2% | 11.5% | 1450 | 1685 | 235 |
| 1 | 1.7 | 95.3 | 0 | 2 | 69.5% | 37.9% | 1430 | 1535 | 105 |
| 1.1 | 2.6 | 95.3 | 1 | 0 | 92.2% | 52.8% | 1435 | 1485 | 50 |
| 1.5 | 2.2 | 95.3 | 0 | 1 | 100.0% | 55.9% | 1440 | 1460 | 20 |
| 1.6 | 3.1 | 95.3 | 0 | 0 | 79.8% | 71.4% | 1460 | 1505 | 45 |
| 1.8 | 1.9 | 95.3 | 0 | 1 | 100.0% | 57.5% | 1440 | 1460 | 20 |
| 2 | 1.7 | 95.3 | 1 | 0 | 15.3% | 56.8% | 1400 | 1495 | 95 |
| 0.2 | 2.5 | 95.3 | 2 | 0 | 46.1% | 27.4% | 1425 | 1590 | 165 |
| 2.2 | 1.5 | 95.3 | 1 | 0 | 29.7% | 55.9% | 1405 | 1495 | 90 |
| 2.3 | 0.4 | 95.3 | 2 | 0 | 66.0% | 32.1% | 1415 | 1605 | 190 |
| 2.5 | 0.2 | 95.3 | 1 | 1 | 73.3% | 34.6% | 1430 | 1575 | 145 |
| 2.7 | 1 | 95.3 | 1 | 0 | 87.0% | 52.0% | 1415 | 1500 | 85 |
| 2.9 | 0.8 | 95.3 | 1 | 0 | 89.0% | 49.8% | 1420 | 1500 | 80 |
| 0.3 | 2.4 | 95.3 | 0 | 2 | 60.3% | 25.6% | 1420 | 1540 | 120 |
| 3.3 | 0.4 | 95.3 | 1 | 0 | 92.6% | 44.9% | 1425 | 1495 | 70 |
| 3.6 | 1.1 | 95.3 | 0 | 0 | 86.0% | 70.5% | 1430 | 1470 | 40 |
| 0.4 | 2.3 | 95.3 | 1 | 1 | 57.9% | 31.2% | 1430 | 1560 | 130 |
| 0.5 | 0.2 | 95.3 | 2 | 2 | 16.2% | 7.4% | 1420 | 1715 | 295 |
| 0.6 | 1.1 | 95.3 | 1 | 2 | 28.7% | 20.2% | 1410 | 1630 | 220 |
| 0.7 | 1 | 95.3 | 0 | 3 | 35.3% | 21.9% | 1415 | 1610 | 195 |
| 0.8 | 1.9 | 95.3 | 1 | 1 | 61.4% | 35.5% | 1430 | 1555 | 125 |
| 0.9 | 2.8 | 95.3 | 1 | 0 | 94.0% | 51.6% | 1440 | 1485 | 45 |
| 1 | 3.6 | 95.4 | 0 | 0 | 81.1% | 67.3% | 1450 | 1500 | 50 |
| 1.1 | 0.5 | 95.4 | 1 | 2 | 37.8% | 15.7% | 1420 | 1640 | 220 |
| 1.2 | 0.4 | 95.4 | 2 | 1 | 37.6% | 17.3% | 1415 | 1665 | 250 |
| 1.3 | 3.3 | 95.4 | 0 | 0 | 81.3% | 68.6% | 1455 | 1500 | 45 |
| 1.5 | 0.1 | 95.4 | 1 | 2 | 46.7% | 21.4% | 1435 | 1650 | 215 |
| 1.6 | 1 | 95.4 | 2 | 0 | 53.0% | 32.3% | 1400 | 1600 | 200 |
| 1.7 | 2.9 | 95.4 | 0 | 0 | 85.2% | 70.2% | 1460 | 1500 | 40 |
| 1.9 | 2.7 | 95.4 | 0 | 0 | 86.6% | 71.0% | 1460 | 1500 | 40 |
| 0.2 | 1.4 | 95.4 | 1 | 2 | 18.8% | 11.6% | 1425 | 1645 | 220 |
| 2.1 | 0.5 | 95.4 | 1 | 1 | 65.6% | 30.3% | 1420 | 1580 | 160 |
| 2.3 | 1.3 | 95.4 | 0 | 1 | 92.6% | 56.6% | 1425 | 1475 | 50 |
| 2.4 | 2.2 | 95.4 | 0 | 0 | 88.1% | 72.8% | 1455 | 1495 | 40 |
| 2.6 | 0 | 95.4 | 1 | 1 | 73.7% | 36.1% | 1435 | 1585 | 150 |
| 2.9 | 0.7 | 95.4 | 1 | 0 | 87.0% | 47.2% | 1420 | 1510 | 90 |
| 0.3 | 2.3 | 95.4 | 0 | 2 | 56.2% | 25.7% | 1420 | 1550 | 130 |
| 3.3 | 0.3 | 95.4 | 1 | 0 | 90.9% | 44.6% | 1425 | 1505 | 80 |
| 3.6 | 0 | 95.4 | 0 | 1 | 100.0% | 48.1% | 1445 | 1470 | 25 |
| 0.4 | 2.2 | 95.4 | 2 | 0 | 46.0% | 28.4% | 1425 | 1595 | 170 |
| 0.5 | 2.1 | 95.4 | 1 | 1 | 56.8% | 30.7% | 1435 | 1570 | 135 |
| 0.6 | 2 | 95.4 | 0 | 2 | 63.4% | 32.6% | 1430 | 1545 | 115 |
| 0.7 | 2.9 | 95.4 | 1 | 0 | 89.9% | 48.6% | 1440 | 1495 | 55 |
| 0.8 | 3.8 | 95.4 | 0 | 0 | 81.7% | 66.5% | 1445 | 1495 | 50 |
| 0.9 | 0.7 | 95.4 | 2 | 1 | 30.4% | 14.2% | 1405 | 1660 | 255 |
| 1 | 0.5 | 95.5 | 0 | 3 | 37.4% | 14.4% | 1425 | 1630 | 205 |
| 1.2 | 1.3 | 95.5 | 1 | 1 | 40.2% | 36.3% | 1410 | 1580 | 170 |
| 1.3 | 1.2 | 95.5 | 2 | 0 | 33.6% | 31.7% | 1395 | 1605 | 210 |
| 1.4 | 0.1 | 95.5 | 0 | 3 | 46.0% | 19.9% | 1440 | 1640 | 200 |
| 1.5 | 2 | 95.5 | 1 | 0 | 18.6% | 52.2% | 1415 | 1510 | 95 |
| 1.6 | 0.9 | 95.5 | 2 | 0 | 52.1% | 30.0% | 1405 | 1610 | 205 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.8 | 0.7 | 95.5 | 2 | 0 | 55.1% | 28.4% | 1405 | 1615 | 210 |
| 2 | 2.5 | 95.5 | 0 | 0 | 93.4% | 69.9% | 1460 | 1495 | 35 |
| 0.2 | 3.3 | 95.5 | 0 | 1 | 84.0% | 30.9% | 1420 | 1485 | 65 |
| 2.2 | 0.3 | 95.5 | 1 | 1 | 66.6% | 30.7% | 1430 | 1595 | 165 |
| 2.4 | 0.1 | 95.5 | 2 | 0 | 65.9% | 33.7% | 1420 | 1625 | 205 |
| 2.5 | 0 | 95.5 | 0 | 2 | 73.8% | 34.5% | 1445 | 1575 | 130 |
| 2.9 | 1.6 | 95.5 | 0 | 0 | 89.2% | 73.2% | 1440 | 1480 | 40 |
| 0.3 | 2.2 | 95.5 | 0 | 2 | 53.7% | 25.8% | 1425 | 1560 | 135 |
| 3.3 | 0.2 | 95.5 | 1 | 0 | 90.1% | 44.7% | 1430 | 1515 | 85 |
| 3.8 | 0.7 | 95.5 | 0 | 0 | 99.7% | 61.7% | 1430 | 1460 | 30 |
| 0.4 | 3.1 | 95.5 | 0 | 1 | 88.1% | 45.4% | 1425 | 1485 | 60 |
| 0.5 | 0 | 95.5 | 1 | 3 | 15.8% | 7.4% | 1435 | 1725 | 290 |
| 0.6 | 0.9 | 95.5 | 2 | 1 | 22.0% | 13.8% | 1400 | 1665 | 265 |
| 0.7 | 0.8 | 95.5 | 0 | 3 | 31.3% | 17.9% | 1420 | 1630 | 210 |
| 0.9 | 1.6 | 95.5 | 0 | 2 | 61.5% | 34.2% | 1430 | 1555 | 125 |
| 1 | 2.4 | 95.6 | 1 | 0 | 81.1% | 47.4% | 1435 | 1515 | 80 |
| 1.1 | 2.3 | 95.6 | 0 | 1 | 93.8% | 48.9% | 1445 | 1490 | 45 |
| 1.2 | 0.2 | 95.6 | 0 | 3 | 41.2% | 17.1% | 1440 | 1645 | 205 |
| 1.3 | 2.1 | 95.6 | 1 | 0 | 41.7% | 49.4% | 1425 | 1520 | 95 |
| 1.4 | 0 | 95.6 | 2 | 1 | 40.9% | 20.3% | 1425 | 1690 | 265 |
| 1.6 | 2.8 | 95.6 | 0 | 0 | 95.2% | 66.7% | 1460 | 1490 | 30 |
| 1.8 | 1.6 | 95.6 | 0 | 1 | 89.3% | 53.2% | 1435 | 1495 | 60 |
| 1.9 | 0.5 | 95.6 | 0 | 2 | 63.7% | 28.6% | 1425 | 1575 | 150 |
| 0.2 | 2.2 | 95.6 | 0 | 2 | 45.6% | 18.7% | 1420 | 1570 | 150 |
| 2.2 | 1.2 | 95.6 | 0 | 1 | 87.6% | 52.8% | 1430 | 1500 | 70 |
| 2.3 | 2.1 | 95.6 | 0 | 0 | 93.0% | 69.6% | 1450 | 1485 | 35 |
| 2.6 | 1.8 | 95.6 | 0 | 0 | 93.5% | 70.7% | 1445 | 1480 | 35 |
| 2.9 | 0.5 | 95.6 | 1 | 0 | 83.4% | 41.9% | 1420 | 1530 | 110 |
| 0.3 | 3.1 | 95.6 | 1 | 0 | 76.2% | 41.8% | 1430 | 1520 | 90 |
| 3.3 | 1.1 | 95.6 | 0 | 0 | 96.6% | 66.7% | 1430 | 1460 | 30 |
| 0.4 | 1 | 95.6 | 1 | 2 | 18.4% | 13.9% | 1410 | 1660 | 250 |
| 0.5 | 1.9 | 95.6 | 2 | 0 | 38.1% | 26.5% | 1415 | 1610 | 195 |
| 0.6 | 1.8 | 95.6 | 0 | 2 | 57.1% | 29.5% | 1435 | 1565 | 130 |
| 0.7 | 2.7 | 95.6 | 0 | 1 | 89.6% | 46.0% | 1435 | 1490 | 55 |
| 0.8 | 0.6 | 95.6 | 1 | 2 | 29.0% | 12.6% | 1420 | 1655 | 235 |
| 0.9 | 0.5 | 95.6 | 0 | 3 | 33.8% | 12.9% | 1425 | 1640 | 215 |
| 1.1 | 1.2 | 95.7 | 1 | 1 | 41.3% | 32.4% | 1410 | 1600 | 190 |
| 1.2 | 0.1 | 95.7 | 2 | 1 | 35.6% | 17.5% | 1420 | 1690 | 270 |
| 1.3 | 1 | 95.7 | 0 | 2 | 55.9% | 33.4% | 1425 | 1575 | 150 |
| 1.4 | 0.9 | 95.7 | 1 | 1 | 50.6% | 30.0% | 1415 | 1600 | 185 |
| 1.6 | 2.7 | 95.7 | 0 | 0 | 100.0% | 65.2% | 1460 | 1485 | 25 |
| 1.8 | 1.5 | 95.7 | 1 | 0 | 23.0% | 49.6% | 1405 | 1535 | 130 |
| 1.9 | 0.4 | 95.7 | 2 | 0 | 55.4% | 26.9% | 1415 | 1635 | 220 |
| 0.2 | 2.1 | 95.7 | 2 | 0 | 32.5% | 20.2% | 1430 | 1625 | 195 |
| 2.2 | 0.1 | 95.7 | 1 | 1 | 64.4% | 30.9% | 1435 | 1615 | 180 |
| 2.3 | 0 | 95.7 | 2 | 0 | 63.0% | 32.5% | 1425 | 1645 | 220 |
| 2.6 | 0.7 | 95.7 | 0 | 1 | 85.9% | 44.7% | 1430 | 1510 | 80 |
| 3 | 1.3 | 95.7 | 0 | 0 | 94.6% | 68.6% | 1430 | 1465 | 35 |
| 3.1 | 1.2 | 95.7 | 0 | 0 | 97.2% | 67.0% | 1430 | 1460 | 30 |
| 3.5 | 0.8 | 95.7 | 0 | 0 | 100.0% | 60.7% | 1430 | 1445 | 15 |
| 0.4 | 2.9 | 95.7 | 0 | 1 | 81.7% | 41.8% | 1430 | 1505 | 75 |
| 0.5 | 0.8 | 95.7 | 1 | 2 | 20.2% | 13.0% | 1415 | 1665 | 250 |
| 0.6 | 0.7 | 95.7 | 2 | 1 | 20.6% | 9.0% | 1405 | 1685 | 280 |
| 0.8 | 1.5 | 95.7 | 1 | 1 | 44.9% | 29.8% | 1420 | 1595 | 175 |
| 0.9 | 1.4 | 95.7 | 0 | 2 | 54.3% | 31.5% | 1430 | 1575 | 145 |
| 1 | 0.2 | 95.8 | 1 | 2 | 32.1% | 14.5% | 1430 | 1680 | 250 |
| 1.1 | 1.1 | 95.8 | 2 | 0 | 39.0% | 26.0% | 1400 | 1630 | 230 |
| 1.2 | 3 | 95.8 | 0 | 0 | 100.0% | 61.7% | 1460 | 1485 | 25 |
| 1.4 | 1.8 | 95.8 | 1 | 0 | 21.5% | 47.2% | 1415 | 1540 | 125 |
| 1.5 | 0.7 | 95.8 | 2 | 0 | 46.5% | 23.5% | 1405 | 1635 | 230 |
| 1.7 | 0.5 | 95.8 | 1 | 1 | 53.8% | 24.1% | 1420 | 1615 | 195 |
| 1.9 | 1.3 | 95.8 | 0 | 1 | 81.0% | 51.0% | 1430 | 1515 | 85 |
| 2 | 2.2 | 95.8 | 0 | 0 | 100.0% | 65.4% | 1455 | 1480 | 25 |
| 2.1 | 1.1 | 95.8 | 1 | 0 | 70.9% | 45.5% | 1415 | 1550 | 135 |
| 2.3 | 0.9 | 95.8 | 1 | 0 | 73.6% | 43.6% | 1415 | 1550 | 135 |
| 2.6 | 0.6 | 95.8 | 0 | 1 | 83.5% | 42.0% | 1430 | 1520 | 90 |
| 3 | 1.2 | 95.8 | 0 | 0 | 100.0% | 65.7% | 1430 | 1455 | 25 |
| 3.1 | 0.1 | 95.8 | 1 | 0 | 83.9% | 42.4% | 1430 | 1550 | 120 |
| 3.7 | 0.5 | 95.8 | 0 | 0 | 100.0% | 54.7% | 1430 | 1445 | 15 |
| 0.4 | 0.8 | 95.8 | 1 | 2 | 16.3% | 11.3% | 1415 | 1675 | 260 |
| 0.5 | 0.7 | 95.8 | 0 | 3 | 21.4% | 12.2% | 1420 | 1655 | 235 |
| 0.7 | 1.5 | 95.8 | 0 | 2 | 50.5% | 27.9% | 1435 | 1585 | 150 |

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 0.8 | 2.4 | 95.8 | 0 | 1 | 83.7% | 43.5% | 1440 | 1510 | 70 |
| 0.9 | 0.3 | 95.8 | 1 | 2 | 29.5% | 13.1% | 1425 | 1675 | 250 |
| 1 | 2.1 | 95.9 | 1 | 0 | 68.6% | 42.7% | 1430 | 1545 | 115 |
| 1.1 | 0 | 95.9 | 2 | 1 | 32.2% | 16.1% | 1420 | 1710 | 290 |
| 1.3 | 2.8 | 95.9 | 0 | 0 | 100.0% | 60.6% | 1460 | 1480 | 20 |
| 1.5 | 1.6 | 95.9 | 1 | 0 | 15.2% | 46.5% | 1405 | 1550 | 145 |
| 1.6 | 0.5 | 95.9 | 2 | 0 | 47.7% | 22.9% | 1410 | 1650 | 240 |
| 1.8 | 2.3 | 95.9 | 0 | 0 | 100.0% | 63.0% | 1460 | 1475 | 15 |
| 2 | 0.1 | 95.9 | 1 | 1 | 58.3% | 28.3% | 1430 | 1630 | 200 |
| 0.2 | 2.9 | 95.9 | 0 | 1 | 67.2% | 31.5% | 1420 | 1530 | 110 |
| 2.2 | 0.9 | 95.9 | 0 | 1 | 78.9% | 44.8% | 1430 | 1530 | 100 |
| 2.6 | 1.5 | 95.9 | 0 | 0 | 100.0% | 66.6% | 1440 | 1460 | 20 |
| 2.9 | 0.2 | 95.9 | 1 | 0 | 80.3% | 39.9% | 1430 | 1565 | 135 |
| 0.3 | 3.8 | 95.9 | 0 | 0 | 100.0% | 54.9% | 1430 | 1450 | 20 |
| 3.8 | 0.3 | 95.9 | 0 | 0 | 100.0% | 50.4% | 1435 | 1445 | 10 |
| 0.4 | 0.7 | 95.9 | 0 | 3 | 17.3% | 10.7% | 1420 | 1665 | 245 |
| 0.6 | 1.5 | 95.9 | 1 | 1 | 37.6% | 24.6% | 1425 | 1615 | 190 |
| 0.7 | 2.4 | 95.9 | 1 | 0 | 70.7% | 40.1% | 1440 | 1545 | 105 |
| 0.8 | 2.3 | 95.9 | 0 | 1 | 81.4% | 41.9% | 1445 | 1520 | 75 |
| 0.9 | 0.2 | 95.9 | 0 | 3 | 31.0% | 13.0% | 1440 | 1670 | 230 |
| 1 | 0 | 96 | 1 | 2 | 30.5% | 14.6% | 1435 | 1700 | 265 |
| 1.2 | 1.8 | 96 | 0 | 1 | 78.1% | 43.6% | 1445 | 1530 | 85 |
| 1.3 | 0.7 | 96 | 0 | 2 | 48.4% | 25.3% | 1425 | 1605 | 180 |
| 1.5 | 0.5 | 96 | 2 | 0 | 44.9% | 21.5% | 1410 | 1655 | 245 |
| 1.7 | 2.3 | 96 | 0 | 0 | 100.0% | 61.1% | 1460 | 1470 | 10 |
| 1.9 | 0.1 | 96 | 1 | 1 | 55.6% | 27.0% | 1430 | 1640 | 210 |
| 2 | 0 | 96 | 2 | 0 | 55.0% | 28.6% | 1420 | 1670 | 250 |
| 2.1 | 0.9 | 96 | 0 | 1 | 75.7% | 43.4% | 1430 | 1540 | 110 |
| 2.5 | 1.5 | 96 | 0 | 0 | 100.0% | 64.8% | 1440 | 1465 | 25 |
| 2.8 | 0.2 | 96 | 1 | 0 | 77.8% | 38.6% | 1430 | 1575 | 145 |
| 0.3 | 1.7 | 96 | 0 | 2 | 37.1% | 19.2% | 1435 | 1610 | 175 |
| 3.7 | 0.3 | 96 | 0 | 0 | 100.0% | 49.3% | 1435 | 1450 | 15 |
| 0.4 | 0.6 | 96 | 0 | 3 | 16.5% | 7.9% | 1425 | 1675 | 250 |
| 0.6 | 1.4 | 96 | 0 | 2 | 42.3% | 24.0% | 1435 | 1605 | 170 |
| 0.7 | 2.3 | 96 | 1 | 0 | 66.9% | 38.5% | 1440 | 1555 | 115 |
| 0.8 | 0.2 | 96 | 2 | 1 | 24.6% | 11.8% | 1420 | 1710 | 290 |
| 0.9 | 1.1 | 96 | 0 | 2 | 43.5% | 27.7% | 1425 | 1605 | 180 |
| 1.1 | 1.8 | 96.1 | 1 | 0 | 25.2% | 40.6% | 1420 | 1565 | 145 |
| 1.2 | 0.7 | 96.1 | 2 | 0 | 37.7% | 18.4% | 1405 | 1660 | 255 |
| 1.4 | 2.5 | 96.1 | 0 | 0 | 100.0% | 58.0% | 1460 | 1465 | 5 |
| 1.6 | 1.3 | 96.1 | 1 | 0 | 34.8% | 42.2% | 1410 | 1570 | 160 |
| 1.7 | 0.2 | 96.1 | 0 | 2 | 54.2% | 24.0% | 1440 | 1625 | 185 |
| 1.9 | 2 | 96.1 | 0 | 0 | 100.0% | 60.6% | 1455 | 1470 | 15 |
| 0.2 | 2.7 | 96.1 | 1 | 0 | 54.7% | 31.3% | 1430 | 1570 | 140 |
| 2.3 | 0.6 | 96.1 | 1 | 0 | 69.1% | 35.8% | 1420 | 1580 | 160 |
| 2.6 | 0.3 | 96.1 | 0 | 1 | 78.1% | 35.7% | 1435 | 1555 | 120 |
| 3 | 0.9 | 96.1 | 0 | 0 | 95.8% | 57.0% | 1430 | 1475 | 45 |
| 3.4 | 0.5 | 96.1 | 0 | 0 | 97.6% | 50.7% | 1430 | 1470 | 40 |
| 0.4 | 2.5 | 96.1 | 0 | 1 | 67.1% | 34.7% | 1435 | 1545 | 110 |
| 0.5 | 0.4 | 96.1 | 0 | 3 | 18.5% | 7.3% | 1430 | 1685 | 255 |
| 0.7 | 1.2 | 96.1 | 2 | 0 | 21.9% | 21.0% | 1395 | 1655 | 260 |
| 0.8 | 0.1 | 96.1 | 0 | 3 | 26.8% | 11.6% | 1440 | 1690 | 250 |
| 0.9 | 2 | 96.1 | 1 | 0 | 62.6% | 38.8% | 1435 | 1565 | 130 |
| 1 | 0.8 | 96.2 | 2 | 0 | 32.6% | 17.3% | 1405 | 1665 | 260 |
| 1.2 | 2.6 | 96.2 | 0 | 0 | 100.0% | 55.3% | 1460 | 1475 | 15 |
| 1.4 | 1.4 | 96.2 | 0 | 1 | 68.2% | 42.3% | 1435 | 1550 | 115 |
| 1.5 | 0.3 | 96.2 | 0 | 2 | 49.0% | 21.3% | 1435 | 1630 | 195 |
| 1.7 | 1.1 | 96.2 | 1 | 0 | 47.5% | 39.2% | 1410 | 1585 | 175 |
| 1.9 | 0.9 | 96.2 | 1 | 0 | 62.1% | 37.5% | 1415 | 1585 | 170 |
| 0.2 | 3.6 | 96.2 | 0 | 0 | 90.5% | 48.6% | 1430 | 1485 | 55 |
| 2.4 | 1.4 | 96.2 | 0 | 0 | 93.3% | 61.6% | 1435 | 1485 | 50 |
| 2.7 | 0.1 | 96.2 | 0 | 1 | 78.1% | 37.2% | 1440 | 1565 | 125 |
| 0.3 | 2.5 | 96.2 | 1 | 0 | 54.1% | 30.8% | 1435 | 1580 | 145 |
| 3.8 | 0 | 96.2 | 0 | 0 | 100.0% | 50.9% | 1440 | 1470 | 30 |
| 0.5 | 0.3 | 96.2 | 1 | 2 | 16.6% | 7.4% | 1425 | 1710 | 285 |
| 0.6 | 2.2 | 96.2 | 1 | 0 | 58.9% | 34.3% | 1440 | 1575 | 135 |
| 0.7 | 2.1 | 96.2 | 0 | 1 | 69.0% | 36.3% | 1445 | 1550 | 105 |
| 0.8 | 0 | 96.2 | 0 | 3 | 25.4% | 11.6% | 1450 | 1705 | 255 |
| 1 | 0.7 | 96.3 | 1 | 1 | 34.3% | 18.4% | 1415 | 1655 | 240 |
| 1.2 | 1.5 | 96.3 | 0 | 1 | 65.5% | 39.4% | 1440 | 1560 | 120 |
| 1.3 | 0.4 | 96.3 | 0 | 2 | 44.2% | 18.5% | 1435 | 1635 | 200 |
| 1.5 | 0.2 | 96.3 | 2 | 0 | 43.3% | 21.7% | 1420 | 1685 | 265 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.7 | 1 | 96.3 | 0 | 1 | 65.4% | 40.7% | 1430 | 1565 | 135 |
| 1.9 | 0.8 | 96.3 | 0 | 1 | 66.9% | 37.9% | 1430 | 1570 | 140 |
| 2.1 | 0.6 | 96.3 | 1 | 0 | 63.6% | 32.7% | 1420 | 1600 | 180 |
| 2.4 | 0.3 | 96.3 | 0 | 1 | 72.5% | 33.2% | 1435 | 1575 | 140 |
| 2.8 | 0.9 | 96.3 | 0 | 0 | 90.3% | 54.4% | 1430 | 1500 | 70 |
| 3.3 | 0.4 | 96.3 | 0 | 0 | 93.2% | 46.4% | 1430 | 1495 | 65 |
| 0.5 | 1.2 | 96.3 | 1 | 1 | 24.5% | 18.3% | 1420 | 1650 | 230 |
| 0.6 | 0.1 | 96.3 | 0 | 3 | 20.1% | 8.8% | 1440 | 1710 | 270 |
| 0.7 | 2 | 96.3 | 1 | 0 | 55.9% | 33.8% | 1440 | 1585 | 145 |
| 0.8 | 0.9 | 96.3 | 2 | 0 | 26.9% | 16.1% | 1400 | 1670 | 270 |
| 1 | 2.6 | 96.4 | 0 | 0 | 96.9% | 50.8% | 1460 | 1495 | 35 |
| 1.2 | 1.4 | 96.4 | 1 | 0 | 15.6% | 37.3% | 1405 | 1595 | 190 |
| 1.3 | 0.3 | 96.4 | 2 | 0 | 38.1% | 18.9% | 1415 | 1685 | 270 |
| 1.5 | 0.1 | 96.4 | 0 | 2 | 46.7% | 21.4% | 1440 | 1655 | 215 |
| 2 | 0.6 | 96.4 | 1 | 0 | 60.8% | 31.2% | 1420 | 1610 | 190 |
| 2.2 | 1.4 | 96.4 | 0 | 0 | 88.5% | 57.9% | 1440 | 1505 | 65 |
| 2.5 | 0.1 | 96.4 | 0 | 1 | 72.7% | 34.7% | 1440 | 1585 | 145 |
| 0.3 | 1.3 | 96.4 | 0 | 2 | 24.8% | 14.1% | 1440 | 1645 | 205 |
| 0.4 | 1.2 | 96.4 | 1 | 1 | 20.2% | 15.4% | 1420 | 1660 | 240 |
| 0.5 | 1.1 | 96.4 | 0 | 2 | 28.4% | 17.8% | 1435 | 1640 | 205 |
| 0.6 | 0 | 96.4 | 1 | 2 | 18.7% | 8.9% | 1435 | 1735 | 300 |
| 0.9 | 0.7 | 96.4 | 0 | 2 | 34.3% | 19.4% | 1425 | 1640 | 215 |
| 1.1 | 0.4 | 96.5 | 1 | 1 | 35.1% | 15.9% | 1425 | 1675 | 250 |
| 1.3 | 1.2 | 96.5 | 0 | 1 | 58.2% | 37.6% | 1435 | 1580 | 145 |
| 1.4 | 2.1 | 96.5 | 0 | 0 | 92.3% | 51.9% | 1460 | 1510 | 50 |
| 1.7 | 1.8 | 96.5 | 0 | 0 | 88.4% | 53.7% | 1450 | 1510 | 60 |
| 2 | 0.5 | 96.5 | 1 | 0 | 59.5% | 28.4% | 1420 | 1620 | 200 |
| 2.2 | 0.3 | 96.5 | 1 | 0 | 63.1% | 30.9% | 1425 | 1620 | 195 |
| 2.5 | 0 | 96.5 | 0 | 1 | 71.9% | 34.8% | 1445 | 1600 | 155 |
| 0.3 | 3.2 | 96.5 | 0 | 0 | 81.2% | 43.7% | 1435 | 1510 | 75 |
| 0.4 | 3.1 | 96.5 | 0 | 0 | 83.9% | 44.6% | 1440 | 1510 | 70 |
| 0.6 | 1.9 | 96.5 | 1 | 0 | 48.0% | 29.6% | 1440 | 1600 | 160 |
| 0.7 | 0.8 | 96.5 | 2 | 0 | 22.9% | 11.9% | 1400 | 1685 | 285 |
| 0.9 | 2.6 | 96.5 | 0 | 0 | 93.0% | 48.5% | 1460 | 1505 | 45 |
| 1.1 | 1.3 | 96.6 | 1 | 0 | 17.0% | 33.8% | 1405 | 1615 | 210 |
| 1.2 | 0.2 | 96.6 | 0 | 2 | 38.8% | 17.3% | 1440 | 1665 | 225 |
| 1.4 | 2 | 96.6 | 0 | 0 | 88.5% | 50.4% | 1460 | 1520 | 60 |
| 1.7 | 1.7 | 96.6 | 0 | 0 | 84.9% | 52.3% | 1450 | 1520 | 70 |
| 2 | 0.4 | 96.6 | 1 | 0 | 58.8% | 28.2% | 1425 | 1630 | 205 |
| 2.2 | 0.2 | 96.6 | 1 | 0 | 62.5% | 31.0% | 1430 | 1630 | 200 |
| 2.7 | 0.7 | 96.6 | 0 | 0 | 83.2% | 47.1% | 1430 | 1530 | 100 |
| 3.3 | 0.1 | 96.6 | 0 | 0 | 89.8% | 44.8% | 1440 | 1525 | 85 |
| 0.5 | 0.9 | 96.6 | 1 | 1 | 19.3% | 15.2% | 1415 | 1675 | 260 |
| 0.8 | 0.6 | 96.6 | 0 | 2 | 29.2% | 15.0% | 1425 | 1660 | 235 |
| 1 | 0.3 | 96.7 | 1 | 1 | 31.2% | 14.6% | 1425 | 1690 | 265 |
| 1.2 | 0.1 | 96.7 | 2 | 0 | 34.3% | 17.6% | 1415 | 1710 | 295 |
| 1.3 | 0 | 96.7 | 0 | 2 | 39.5% | 18.7% | 1445 | 1680 | 235 |
| 1.7 | 1.6 | 96.7 | 0 | 0 | 80.0% | 50.9% | 1445 | 1535 | 90 |
| 2 | 0.3 | 96.7 | 1 | 0 | 57.8% | 28.3% | 1425 | 1640 | 215 |
| 2.2 | 1.1 | 96.7 | 0 | 0 | 77.8% | 52.2% | 1430 | 1540 | 110 |
| 3 | 0.3 | 96.7 | 0 | 0 | 84.7% | 41.0% | 1435 | 1540 | 105 |
| 0.4 | 2.9 | 96.7 | 0 | 0 | 77.6% | 41.0% | 1445 | 1530 | 85 |
| 0.6 | 1.7 | 96.7 | 0 | 1 | 50.4% | 27.6% | 1450 | 1600 | 150 |
| 0.9 | 0.4 | 96.7 | 1 | 1 | 28.9% | 13.1% | 1425 | 1690 | 265 |
| 1.1 | 0.1 | 96.8 | 2 | 0 | 31.6% | 16.2% | 1415 | 1715 | 300 |
| 1.2 | 0 | 96.8 | 0 | 2 | 36.5% | 17.4% | 1445 | 1690 | 245 |
| 1.6 | 1.6 | 96.8 | 0 | 0 | 78.0% | 48.9% | 1450 | 1540 | 90 |
| 1.9 | 0.3 | 96.8 | 1 | 0 | 55.1% | 27.0% | 1425 | 1645 | 220 |
| 2.1 | 1.1 | 96.8 | 0 | 0 | 74.8% | 50.8% | 1430 | 1550 | 120 |
| 2.9 | 0.3 | 96.8 | 0 | 0 | 82.2% | 39.7% | 1435 | 1555 | 120 |
| 0.4 | 0.8 | 96.8 | 0 | 2 | 16.9% | 12.3% | 1425 | 1680 | 255 |
| 0.6 | 0.6 | 96.8 | 1 | 1 | 20.5% | 8.9% | 1420 | 1695 | 275 |
| 0.8 | 1.4 | 96.8 | 0 | 1 | 47.4% | 28.7% | 1445 | 1610 | 165 |
| 0.9 | 0.3 | 96.8 | 0 | 2 | 29.9% | 13.1% | 1435 | 1680 | 245 |
| 1.4 | 0.7 | 96.9 | 1 | 0 | 44.3% | 24.3% | 1415 | 1645 | 230 |
| 0.2 | 1.9 | 96.9 | 1 | 0 | 27.3% | 17.1% | 1440 | 1645 | 205 |
| 2.6 | 0.5 | 96.9 | 0 | 0 | 76.8% | 39.6% | 1430 | 1565 | 135 |
| 0.4 | 1.7 | 96.9 | 0 | 1 | 40.3% | 21.9% | 1450 | 1620 | 170 |
| 0.6 | 1.5 | 96.9 | 0 | 1 | 43.2% | 24.9% | 1450 | 1620 | 170 |
| 0.7 | 0.4 | 96.9 | 0 | 2 | 24.3% | 10.2% | 1435 | 1685 | 250 |
| 0.9 | 0.2 | 96.9 | 2 | 0 | 26.4% | 13.3% | 1415 | 1720 | 305 |
| 1.1 | 0.9 | 97 | 1 | 0 | 37.5% | 24.6% | 1415 | 1650 | 235 |

-continued

| B wt % | C wt % | Fe wt % | Mn wt % | Si wt % | Mole Fraction of Liquid at 25K Above Solidus | Mole Fraction Total Hard at 1300K | Solidus (Kelvin) | Liquidus (Kelvin) | Mushy Zone (Kelvin) |
|---|---|---|---|---|---|---|---|---|---|
| 1.4 | 0.6 | 97 | 0 | 1 | 47.1% | 24.7% | 1430 | 1630 | 200 |
| 1.8 | 1.2 | 97 | 0 | 0 | 68.9% | 47.6% | 1435 | 1565 | 130 |
| 0.2 | 1.8 | 97 | 0 | 1 | 30.5% | 16.5% | 1445 | 1630 | 185 |
| 2.9 | 0.1 | 97 | 0 | 0 | 80.0% | 40.0% | 1440 | 1575 | 135 |
| 0.8 | 0.2 | 97 | 2 | 0 | 23.6% | 11.9% | 1415 | 1725 | 310 |
| 1 | 0.9 | 97.1 | 1 | 0 | 34.3% | 22.9% | 1415 | 1655 | 240 |
| 1.3 | 0.6 | 97.1 | 0 | 1 | 43.9% | 23.1% | 1430 | 1640 | 210 |
| 1.7 | 1.2 | 97.1 | 0 | 0 | 65.7% | 45.6% | 1435 | 1575 | 140 |
| 0.2 | 1.7 | 97.1 | 1 | 0 | 22.0% | 14.1% | 1445 | 1660 | 215 |
| 2.8 | 0.1 | 97.1 | 0 | 0 | 77.6% | 38.8% | 1440 | 1585 | 145 |
| 0.5 | 2.4 | 97.1 | 0 | 0 | 65.9% | 35.0% | 1455 | 1570 | 115 |
| 0.7 | 1.2 | 97.1 | 1 | 0 | 18.3% | 23.1% | 1410 | 1655 | 245 |
| 0.8 | 1.1 | 97.1 | 0 | 1 | 36.6% | 25.1% | 1435 | 1635 | 200 |
| 1 | 0.8 | 97.2 | 0 | 1 | 37.1% | 24.7% | 1430 | 1645 | 215 |
| 2.1 | 0.7 | 97.2 | 0 | 0 | 66.4% | 38.6% | 1430 | 1590 | 160 |
| 0.6 | 1.2 | 97.2 | 1 | 0 | 23.2% | 20.5% | 1415 | 1665 | 250 |
| 0.7 | 1.1 | 97.2 | 0 | 1 | 33.5% | 22.6% | 1440 | 1645 | 205 |
| 0.9 | 0.9 | 97.2 | 0 | 1 | 35.4% | 25.2% | 1430 | 1645 | 215 |
| 1.3 | 1.4 | 97.3 | 0 | 0 | 59.8% | 39.9% | 1445 | 1590 | 145 |
| 1.6 | 0.1 | 97.3 | 0 | 1 | 47.8% | 23.0% | 1440 | 1665 | 225 |
| 0.2 | 2.5 | 97.3 | 0 | 0 | 49.0% | 27.6% | 1440 | 1590 | 150 |
| 0.3 | 2.4 | 97.3 | 0 | 0 | 54.0% | 29.1% | 1450 | 1590 | 140 |
| 0.6 | 0.1 | 97.3 | 2 | 0 | 17.6% | 9.0% | 1415 | 1750 | 335 |
| 1.1 | 1.5 | 97.4 | 0 | 0 | 56.8% | 36.7% | 1450 | 1595 | 145 |
| 1.4 | 0.2 | 97.4 | 1 | 0 | 40.7% | 20.4% | 1425 | 1690 | 265 |
| 0.3 | 1.3 | 97.4 | 1 | 0 | 15.5% | 12.9% | 1430 | 1680 | 250 |
| 0.5 | 2.1 | 97.4 | 0 | 0 | 55.8% | 30.1% | 1460 | 1595 | 135 |
| 0.8 | 1.8 | 97.4 | 0 | 0 | 58.0% | 33.7% | 1460 | 1595 | 135 |
| 1.1 | 0.4 | 97.5 | 1 | 0 | 33.5% | 16.1% | 1425 | 1695 | 270 |
| 1.4 | 1.1 | 97.5 | 0 | 0 | 53.4% | 38.2% | 1435 | 1610 | 175 |
| 0.2 | 2.3 | 97.5 | 0 | 0 | 42.5% | 24.0% | 1445 | 1610 | 165 |
| 0.7 | 0.8 | 97.5 | 1 | 0 | 23.6% | 15.1% | 1415 | 1690 | 275 |
| 1.4 | 1 | 97.6 | 0 | 0 | 50.5% | 37.0% | 1430 | 1620 | 190 |
| 2.1 | 0.3 | 97.6 | 0 | 0 | 61.3% | 29.6% | 1435 | 1630 | 195 |
| 0.5 | 0.9 | 97.6 | 0 | 1 | 20.9% | 15.5% | 1435 | 1680 | 245 |
| 0.9 | 1.5 | 97.6 | 0 | 0 | 50.3% | 32.0% | 1455 | 1615 | 160 |
| 1.2 | 0.1 | 97.7 | 0 | 1 | 36.3% | 17.5% | 1440 | 1695 | 255 |
| 1.9 | 0.4 | 97.7 | 0 | 0 | 57.0% | 26.9% | 1435 | 1635 | 200 |
| 0.5 | 0.8 | 97.7 | 1 | 0 | 17.0% | 11.6% | 1415 | 1705 | 290 |
| 0.8 | 0.5 | 97.7 | 0 | 1 | 27.0% | 12.2% | 1435 | 1690 | 255 |
| 1.2 | 1 | 97.8 | 0 | 0 | 44.6% | 32.7% | 1435 | 1635 | 200 |
| 2 | 0.2 | 97.8 | 0 | 0 | 58.0% | 28.4% | 1440 | 1650 | 210 |
| 0.6 | 1.6 | 97.8 | 0 | 0 | 42.2% | 25.6% | 1460 | 1630 | 170 |
| 0.9 | 0.3 | 97.8 | 1 | 0 | 27.1% | 13.3% | 1425 | 1715 | 290 |
| 1.4 | 0.7 | 97.9 | 0 | 0 | 45.6% | 28.1% | 1430 | 1645 | 215 |
| 0.4 | 1.7 | 97.9 | 0 | 0 | 36.1% | 21.2% | 1460 | 1640 | 180 |
| 0.8 | 1.3 | 97.9 | 0 | 0 | 39.3% | 27.0% | 1450 | 1640 | 190 |
| 1.2 | 0.8 | 98 | 0 | 0 | 40.7% | 28.3% | 1430 | 1650 | 220 |
| 0.3 | 1.7 | 98 | 0 | 0 | 30.6% | 17.9% | 1460 | 1650 | 190 |
| 0.7 | 0.3 | 98 | 0 | 1 | 22.6% | 10.3% | 1440 | 1715 | 275 |
| 1.3 | 0.6 | 98.1 | 0 | 0 | 41.4% | 23.4% | 1430 | 1665 | 235 |
| 0.5 | 1.4 | 98.1 | 0 | 0 | 30.4% | 20.3% | 1455 | 1655 | 200 |
| 0.8 | 0.1 | 98.1 | 0 | 1 | 24.5% | 11.8% | 1440 | 1725 | 285 |
| 1.5 | 0.3 | 98.2 | 0 | 0 | 44.7% | 21.7% | 1435 | 1675 | 240 |
| 0.6 | 1.2 | 98.2 | 0 | 0 | 28.8% | 20.8% | 1450 | 1665 | 215 |
| 1 | 0.7 | 98.3 | 0 | 0 | 33.2% | 22.0% | 1430 | 1675 | 245 |
| 0.4 | 1.3 | 98.3 | 0 | 0 | 23.1% | 16.2% | 1455 | 1675 | 220 |
| 0.8 | 0.9 | 98.3 | 0 | 0 | 29.3% | 22.6% | 1435 | 1675 | 240 |
| 0.3 | 1.3 | 98.4 | 0 | 0 | 18.3% | 13.1% | 1455 | 1685 | 230 |
| 1 | 0.5 | 98.5 | 0 | 0 | 31.7% | 15.3% | 1435 | 1690 | 255 |
| 0.6 | 0.9 | 98.5 | 0 | 0 | 22.3% | 17.8% | 1435 | 1690 | 255 |
| 0.5 | 0.9 | 98.6 | 0 | 0 | 19.1% | 15.2% | 1440 | 1700 | 260 |
| 0.5 | 0.8 | 98.7 | 0 | 0 | 17.9% | 14.4% | 1435 | 1705 | 270 |
| 0.7 | 0.5 | 98.8 | 0 | 0 | 22.4% | 10.4% | 1435 | 1715 | 280 |
| 1 | 0 | 99 | 0 | 0 | 29.2% | 14.9% | 1440 | 1740 | 300 |
| 0.9 | 0 | 99.1 | 0 | 0 | 26.3% | 13.4% | 1440 | 1745 | 305 |

What is claimed is:

1. A thermal spray feedstock material comprising Fe and, in wt. %:
 B: about 0.2 to about 2.5;
 C: about 0.15 to about 2.0; and
 Mo: at most about 1;
 wherein the thermal spray feedstock material comprises a powder having ≥7 wt % and ≤80 wt % of particles being larger than about 44 microns and smaller than about 90 microns; and
 wherein the thermal spray feedstock material is configured to form a matrix and is characterized by having, under thermodynamic equilibrium conditions:
  a solidus temperature less than or equal to about 1550K;
  a liquidus temperature less than or equal to about 1750K;
  between about 5 and about 35 mol % of total hard particles at 1300K; and
  greater than or equal to about 15 mol % of a mole fraction of liquid 25K above the solidus temperature;
 wherein a difference between the liquidus temperature and the solidus temperature is between about 30 and about 150K.

2. The thermal spray feedstock material of claim 1, further comprising at most about 0.5 wt. % Cr.

3. The thermal spray feedstock material of claim 1, further comprising at most about 1.0 wt. % Mn.

4. The thermal spray feedstock material of claim 1, wherein the thermal spray feedstock material is selected from the group consisting of, in wt. %:
 B: about 0.6, C: about 0.3, Si: about 1.0, Fe: bal;
 B: about 1.5, C: about 0.2, Si: about 1.0, Fe: bal;
 B: about 0.3, C: about 1.4, Si: about 5.0, Fe: bal;
 B: about 0.6, C: about 1.8, Si: about 5.0, Fe: bal; and
 B: about 2.2, C: about 1.1, Si: about 6.0, Fe: bal.

5. The thermal spray feedstock material of claim 1, wherein the thermal spray feedstock material is configured to form a matrix and is characterized by having, under thermodynamic equilibrium conditions:
 a solidus temperature less than or equal to about 1500K;
 a liquidus temperature less than or equal to about 1700K; and
 between about 5 and about 35 mol % of total hard particles at 1300K;
 wherein a difference between the liquidus temperature and the solidus temperature is between about 35 and about 150K.

6. A coating formed from the thermal spray feedstock material of claim 1.

7. The coating of claim 6, wherein the coating comprises:
 a bulk coating hardness of between about 290 HV0.3 and about 600 HV0.3; and
 an individual particle hardness of between 550 HV0.1 and about 950 HV0.1.

8. The coating of claim 6, wherein the coating comprises:
 between about 5 and about 35 vol. % total hard phases;
 between about 5 and about 35 vol. % of a total spinel phase; and
 between about 5 and about 35 vol. % of a total aluminum rich oxide phase.

9. The coating of claim 6, wherein the coating is deposited on an internal surface of a cylinder bore of an internal combustion engine.

10. A thermal spray feedstock material consisting of, in wt. %:
 Al: about 1.5 to about 4.5; and
 C: about 0.2 to about 1.6;
 Cr: less than 0.5;
 other elements and inevitable impurities: less than 1% each; and
 Fe: balance;
 wherein the thermal feedstock material comprises a powder that, under equilibrium solidification conditions with 4 wt % oxygen added, forms a matrix having at 1300K about 7.5 to about 30 mol % oxide phase comprising greater than 10 wt % aluminum.

11. The material of claim 10, consisting of:
 C: about 0.9 to about 1.4;
 Al: about 3 to about 3.8;
 Cr: less than 0.5;
 other elements and inevitable impurities: less than 1% each; and
 Fe: balance.

12. The material of claim 10, wherein B, N, Ca, Ti, V, Co, Ni, Cu, Zn, Y, Zr, Nb, Mo, Pd, Ag, Cd, In, Sn, La, Hf, Ta, W, Pt, and Au are each at a maximum amount of 0.5 wt. %.

13. The material of claim 10, wherein the other elements and inevitable impurities comprise at least one of Si and Mn each at a maximum amount of 0.5 wt. %.

14. A coating on an internal bore of an engine formed from the material claim 10.

15. The coating of claim 14, wherein the coating has a $HV_{0.3}$ hardness in excess of 450.

16. The thermal spray feedstock material of claim 1, further comprising Si in an amount not more than about 7 wt. %.

17. The material of claim 10, wherein Cr is at most about 0.25 wt. %.

* * * * *